US007198827B1

(12) United States Patent
Takeuchi et al.

(10) Patent No.: US 7,198,827 B1
(45) **Date of Patent: *Apr. 3, 2007**

(54) NEMATIC LIQUID CRYSTAL COMPOSITION AND LIQUID CRYSTAL DISPLAY DEVICE USING THE SAME

(75) Inventors: Kiyofumi Takeuchi, Tokyo (JP); Haruyoshi Takatsu, Tokyo (JP); Hirokazu Yanagihara, Shiojiri (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/787,614

(22) PCT Filed: Sep. 10, 1999

(86) PCT No.: PCT/JP99/04918

§ 371 (c)(1), (2), (4) Date: Mar. 20, 2001

(87) PCT Pub. No.: WO00/17287

PCT Pub. Date: Mar. 30, 2000

(30) Foreign Application Priority Data

| | | |
|---|---|---|
| Sep. 21, 1998 | (JP) | 10-266993 |
| May 28, 1999 | (JP) | 11-150024 |
| Jun. 30, 1999 | (JP) | 11-187087 |

(51) Int. Cl.
*C09K 19/32* (2006.01)
*C09K 19/30* (2006.01)

(52) U.S. Cl. ............. 428/1.1; 252/299.01; 252/299.62; 252/299.63

(58) Field of Classification Search ........... 252/299.62, 252/299.01, 299.63; 428/1.1
See application file for complete search history.

(56) References Cited

U.S. PATENT DOCUMENTS

| | | | | |
|---|---|---|---|---|
| 4,133,647 A | 1/1979 | Burke | | |
| 4,391,731 A | 7/1983 | Boller et al. | | |
| 4,680,137 A | 7/1987 | Isoyama et al. | | |
| 5,084,204 A | 1/1992 | Reiffenrath et al. | | |
| 5,252,253 A | 10/1993 | Gray et al. | | |
| 5,374,374 A | 12/1994 | Weber et al. | | |
| 5,389,292 A | 2/1995 | Dorsch et al. | 252/299.61 | |
| 5,487,845 A | 1/1996 | Reiffenrath et al. | 252/299.63 | |
| 5,523,127 A | 6/1996 | Ohnishi et al. | | |
| 5,942,648 A | 8/1999 | Coates et al. | | |
| 6,010,642 A * | 1/2000 | Takatsu et al. | 252/299.6 | |
| 6,468,607 B1 * | 10/2002 | Takehara et al. | 428/1.1 | |
| 6,746,728 B1 * | 6/2004 | Kusumoto et al. | 428/1.1 | |
| 2003/0222244 A1 * | 12/2003 | Torii et al. | 252/299.66 | |

FOREIGN PATENT DOCUMENTS

| | | |
|---|---|---|
| DE | 27 36 525 | 3/1978 |
| DE | 38 37 208 | 5/1989 |
| DE | 40 32 579 | 4/1992 |
| EP | 0 047 817 | 3/1982 |
| EP | 0 205 340 | 12/1986 |
| EP | 0 481 293 | 10/1991 |
| EP | 0 575 791 | 12/1993 |
| EP | 0 656 412 | 6/1995 |
| EP | 0 952 135 | 10/1999 |
| FR | 2 361 455 | 3/1978 |
| GB | 2 082 179 | 3/1982 |
| GB | 2 227 019 A | 7/1990 |
| GB | 2 238 309 A | 5/1991 |
| GB | 2-271 771 | 4/1994 |
| JP | 53-22882 | 3/1978 |
| JP | 57-54130 | 3/1982 |
| JP | 59-141527 | 8/1984 |
| JP | 61-134364 | 6/1986 |
| JP | 61-282345 | 12/1986 |
| JP | 1-160924 | 6/1989 |
| JP | 3-91718 * | 4/1991 |
| JP | 4-504571 | 8/1992 |
| JP | 4-283291 | 10/1992 |
| JP | 5-341273 | 12/1993 |
| JP | 9-59623 | 3/1997 |
| JP | 11-302207 | 11/1999 |
| WO | WO 90/08119 | 7/1990 |
| WO | WO 94/03558 | 2/1994 |

OTHER PUBLICATIONS

English abstract fot JP 3-91718, 1991.*

(Continued)

*Primary Examiner*—Shean C Wu
(74) *Attorney, Agent, or Firm*—Armstrong, Kratz, Quintos, Hanson & Brooks, LLP

(57) ABSTRACT

A nematic liquid crystal composition comprising compounds of the general formulas (I-1) to (I-5) each having naphthalene-2,6-diyl, decahydronaphthalene-2,6-diyl and 1,2,3,4-tetrahydronaphthalene-2,6-diyl, and a liquid display device using the same. This nematic liquid crystal composition broadens the operating temperature range of liquid crystal display characteristics due to an improvement in co-solubility and storage at low temperature, thereby making it possible to improve a reduction in driving voltage and a change in temperature and to attain comparatively fast response characteristics for a predetermined driving voltage. Accordingly, the nematic liquid crystal composition is best suited for use as TN, STN, TFT, IPS, MVA, OCB, ECB, PC, PNLC, PDLC, PSCT or the like.

19 Claims, No Drawings

OTHER PUBLICATIONS

V. Vill et al.; J. Mater Chem. vol. 7, pp. 893-899, 1997. See PCT search report.

A.I. Pavluchenko et al.; Mol. Cryst. Liq. Cryst., vol. 209, pp. 225-235, 1991. See PCT search rpt.

Marco Cereghetti et al.; Helvetica Chimica Acta—vol. 65, Fasc.4, pp. 1318-1331, 1982. See PCT search report.

T. A. Lobkyo et al.; Liquid Crystals, vol. 15, No. 3, pp. 361-376, 1993. See PCT search report.

Supplementary European Search Report date Dec. 12, 2003.

Second Page of Taiwanese Office Action dated Nov. 30, 2005.

* cited by examiner

NEMATIC LIQUID CRYSTAL COMPOSITION AND LIQUID CRYSTAL DISPLAY DEVICE USING THE SAME

TECHNICAL FIELD

The present invention relates to nematic liquid crystal compositions which are useful as electro-optical display materials, and a liquid crystal display device using the same.

BACKGROUND ART

Representative liquid crystal display elements include TN-LCDs (twisted nematic liquid crystal display element), that is used in clocks, electronic calculators, handheld organizers, pocket computers, word processors and personal computers. As the volume of information processed by office automation equipment increased, the STN (super twisted nematic) LCD was developed by Scheffer et al. (SID '85 Digest, p. 120, 1985) and Kinugawa et al. (SID '86 Digest, p. 122, 1986), and found wide use in portable terminals, handheld organizers, pocket computers, word processors, personal computers and display terminals for sophisticated information processing.

Recently, the active addressing drive method (Proc. $12^{th}$ IDRC p. 503, 1992) and multi-alignment addressing drive method (SID '92 Digest, p. 232, 1992) have been proposed for improving the response characteristics of STN-LCDs. For the purpose of providing displays with a higher brightness and higher contrast ratio, the use of a modified reflection type color LCD display method (Television Association Technical Report, vol. 14, No. 10, p. 51, 1990) that utilizes the birefringence of a liquid crystal and a retardation plate instead of a color filter, and a liquid crystal display device provided with a reflecting surface having small parabolic surfaces formed on the substrate electrode side have been proposed.

For application to large display areas, in particular, it is required to achieve uniformity of the display, despite the temperature distribution of the backlight, and high contrast. This calls for a liquid crystal material that has more stable orientation and lower dependence on the temperature, or an appropriate birefringent index for limiting the variations in the cell thickness. Also because the display is driven with a higher duty ratio as the number of pixels increases, it is required to improve the response characteristics and the display tone characteristics accordingly.

For the medium- and small displays for portable applications, on the other hand, it is important to achieve stability of the display regardless of the operating temperature. This calls for a liquid crystal material that allows a lower driving voltage in order to improve the response characteristics and reduce the power consumption, lower temperature dependence of the driving voltage in extreme temperature ranges from −30 to 0° C. and 40 to 80° C., higher sharpness and lower frequency dependence for driving with the desired duty ratio in the temperature range. Moreover, although it should be avoided to make the electric resistance (resistivity) of the liquid crystal too low to decrease the power consumption, the resistivity should be set to a proper level that is not high enough to cause burning of the display. Thus there still remain various requirements for improved liquid crystal materials having slightly different characteristics that are differente from each other.

For this purpose, the liquid crystal material is required to have an optimized set of characteristics including physical properties such as birefringent index, elastic constant, dielectric constant anisotropy, lower viscosity, broader nematic temperature range, chemical stability and electrical stability (a desired resistivity and voltage holding ratio), a pre-tilt angle related to the orientation and a wider d/p margin. Accordingly, there are still demands for new liquid crystal compounds and liquid crystal compositions.

Meanwhile, active matrix liquid crystal display devices have been used for such applications as portable terminals, liquid crystal television screens, projectors and computers, by taking advantage of the high display quality thereof. In the active matrix liquid crystal display device, a TFT (thin film transistor), an MIM (metal-insulator-metal) element or the like is used for each pixel, and a high voltage holding ratio is required for this display method. For the purpose of achieving a wider viewing angle, a super TFT that combines the IPS mode was proposed by Kondo et al. (Asia Display '95 Digest, p. 707, 1995). (The liquid crystal display elements of the active matrix display method will be hereinafter collectively referred to as TFT-LCDs.) In order to provide for such new display elements, various proposals have been made of new liquid crystal compounds and new liquid crystal compositions, such as Japanese Unexamined Patent Application, First Publication No. Hei 2-233626 and Published Japanese Translation No. Hei 4-501575 of the PCT Application.

In order to provide for a TFT-LCD based on polysilicon technology, which has been a focus of attention recently, there are demands for a liquid crystal material having a higher voltage holding ratio and higher immunity to staining, a liquid crystal material having faster response characteristics with a lower driving voltage and a liquid crystal material having a birefringent index within a range from 0.08 to 0.15. Requirements are becoming further differentiated, such as a liquid crystal materials with lower possibilities of display defects, in order to improve the production yield, and liquid crystal materials capable of providing greater pre-tilt angles.

As a liquid crystal material capable of providing a brighter display and higher contrast without the need for a polarizer plate or an alignment treatment process, liquid crystal display elements made by dispersing liquid crystal droplets in a polymer are disclosed in Published Japanese Translation No. Sho 58-501631 of the PCT Application, U.S. Pat. No. 4,435,047, Published Japanese Translation No. Sho 61-502128 of the PCT Application, Japanese Unexamined Patent Application, First Publication No. Sho 62-2231, and the like. (These liquid crystal display elements will be hereinafter collectively referred to as PDLCs.) These elements have such problems that it is necessary to optimize the birefringences of the liquid crystal materials and the birefringence of the polymer, and a high voltage is required to achieve sufficient transparency. On the other hand, in order to achieve low-voltage drive capability, high contrast and multiplexing drive, U.S. Pat. No. 5,304,323 and Japanese Unexamined Patent Application, First Publication No. Hei 1-198725 disclose liquid crystal display elements having such a structure that the liquid crystal material forms a continuous layer and a polymer is distributed in the continuous layer in a three-dimensional network structure. (This liquid crystal display element will be hereinafter referred to as a PN-LCD.)

For a liquid crystal material used for the purpose described above, European Patent Publication No. 359,146 discloses a method for optimizing the birefringent index and dielectric constant anisotropy of the liquid crystal material, Japanese Unexamined Patent Application, First Publication No. Hei 6-222320 discloses a technology to set a particular elastic constant of the liquid crystal material, and Japanese Unexamined Patent Application, First Publication No. Hei 5-339573 discloses the use of a fluoro compound. However, there remain problems in the voltage holding ratio with high resistance, low driving voltage, contrast ratio related to the intensity of light scattering, response speed, temperature characteristics and other properties, and development efforts are still being made.

As described above, liquid crystal display elements are still required to have a capability to display with higher resolution and higher density, faster response speed for a driving voltage and ambient temperature, lower driving voltage with high chemical and electrical stability, higher tone display characteristics, and higher contrast for the operating temperature and view angle. For this purpose, research and development activities are underway to find liquid crystal materials that have nematic characteristics over a wide temperature range, maintain the nematic phase for a long period of time while being stored at a low temperatures, with a lower viscosity that allows improved response characteristics and capable of operating at a desired driving voltage, particularly at a lower driving voltage. Efforts for improvements are also focused on the design and temperature dependence of the birefringent index, dielectric constant anisotropy, elastic constant, light wavelength dependence of the birefringent index, and frequency dependency of the dielectric constant anisotropy in correspondence to the duty number.

As compounds related to the general formula (I-1) of the present invention, compounds of the following general formulas (a1-1) to (a1-8) are described. For example, compounds of the general formula (a1-1) are disclosed in Helvetica Chimica Acta, vol. 68, p. 1406 (1985), Mol. Cryst. Liq. Cryst., vol. 206, p. 187 (1991), and Liq. Cryst., vol. 15, p. 123 (1993); compounds of the general formula (a1-2) are disclosed in Published Japanese Translation No. Hei 4-504571 (1992) of the PCT Application, U.S. Pat. No. 5,252,253 (1993); compounds of the general formula (a1-3) are disclosed in Mol. Cryst. Liq. Cryst., vol. 206, p. 187 (1991), Liq. Cryst., vol. 15, p. 123 (1993), Japanese Unexamined Patent Application, First Publication No. Hei 1-160924 (1989), German Patent Application No. 3837208A (1998) and U.S. Pat. No. 5,084,204 (1992); compounds of the general formula (a1-4) are disclosed in Mol. Cryst. Liq. Cryst., vol. 37, p. 249 (1976) and U.S. Pat. No. 3,925,237 (1975); compounds of the general formula (a1-5) are disclosed in Mol. Cryst. Liq. Cryst., vol. 53, p. 147 (1979) and Japanese Unexamined Patent Application, First Publication No. Sho 53-22882 (1978); compounds of the general formula (a1-6) are disclosed in Japanese Unexamined Patent Application, First Publication No. Hei 54-157541 (1979), U.S. Pat. No. 4,261,651 (1981) and GB Patent No. 2023136B (1979); compounds of the general formula (a1-7) are disclosed in Mol. Cryst. Liq. Cryst., vol. 37, p. 249 (1976); and compounds of the general formula (a1-8) are disclosed in GB Patent Application No. 2271771A (1994).

(a1-1)

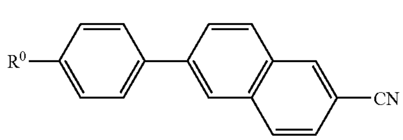

-continued (a1-2)

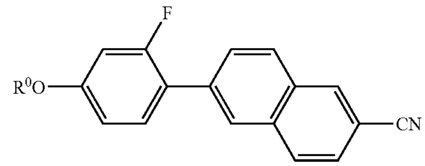

(a1-3)

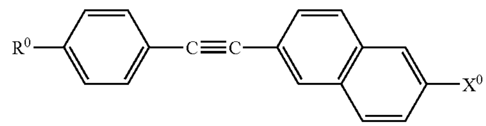

(a1-4)

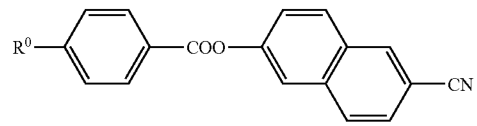

(a1-5)

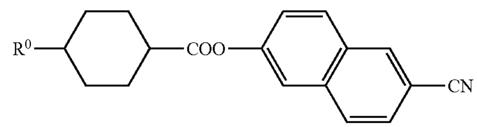

(a1-6)

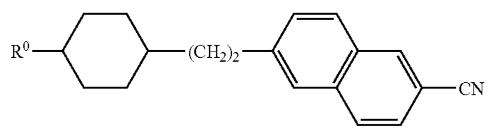

(a1-7)

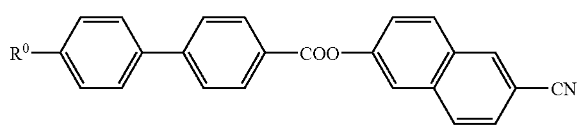

(a1-8)

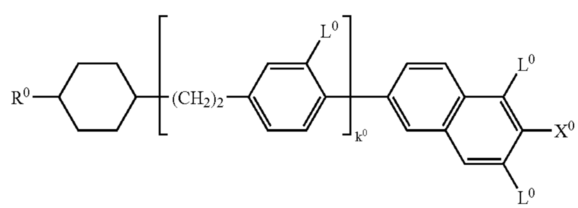

(a1-9)

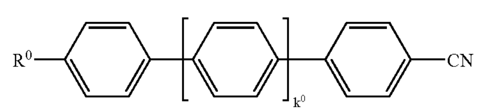

(a1-10)

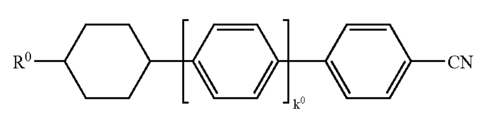

(a1-11)

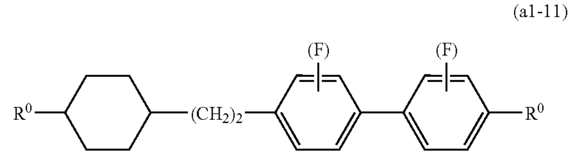

(a1-12)

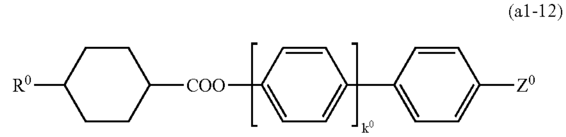

-continued (a1-13)

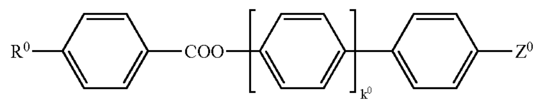

(a1-14)

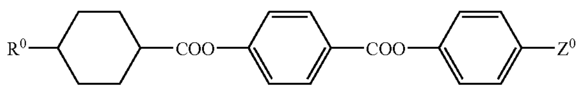

(a1-15)

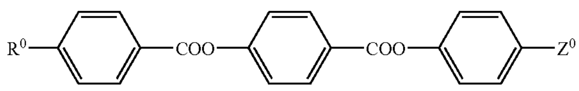

(a1-16)

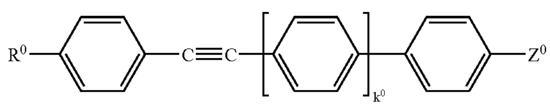

(wherein $R^0$ represents an alkyl group, an alkoxy group, or an alkanoyloxy group, $X^0$ represents CN or F, $Z^0$ represents $R^0$ or CN, and $k^0$ represents 1 or 2).

However, patents with respect to Japanese Unexamined Patent Application, First Publication No. Hei 1-160924 (1989), German Patent Application No. 3837208A (1998), and GB Patent Application No. 2271771A (1994) were not completed and, therefore, techniques related to compounds of the general formulas (a1-1) to (a1-8) are scarcely known. Concerning detailed description of the compounds, although the phase transition temperatures of the compounds of the general formulas (a1-1) to (a1-5) and (a1-7) as well as the birefringent index, dielectric constant anisotropy or transition enthalpy of some of these compounds have been reported, the elastic constants and viscosities were not known. As for compositions, although combinations of compounds of the general formulas (a1-1) to (a1-8) with general compounds, or combinations with compounds of the general formulas (a1-9) to (a1-11), or combinations with compounds of the general formulas (a1-9) to (a1-16) are described, specific examples thereof are scarcely disclosed. Application examples using the liquid crystal compositions, e.g. specific examples related to liquid crystal display elements, liquid crystal display devices or the like are scarcely disclosed.

As compounds related to the general formula (I-2), compounds of the following general formulas (a2-1) to (a2-2) are described. For example, the compound of the general formula (a2-1) is disclosed in GB Patent Application No. 2271771A (1994); and the compound of the general formula (a2-2) is disclosed in Mol. Cryst. Liq. Cryst., vol. 206, p. 187 (1991), Liq. Cryst. vol. 15, p. 123 (1993), Japanese Unexamined Patent Application, First. Publication No. Hei 1-160924 (1989), German Patent Application No. 3837208A (1989), U.S. Pat. No. 5,084,204A (1992) and Mol. Cryst. Liq. Cryst., vol. 37, p. 249 (1976).

(a2-1)

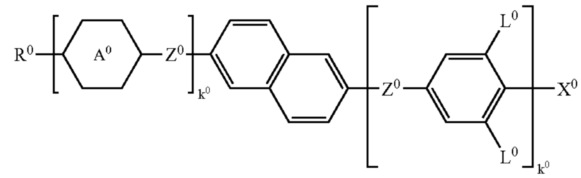

(a2-2)

$$R^0—(A^0—Z^0)m—A^0—C{\equiv}C—A^0—(Z^0—A^0)n—R^0$$

(a2-3)

$$R^0—L^0—G^0—E—R^0$$

(a2-4)

$$R^0—L^0—COO—E—R^0$$

(a2-5)

$$R^0—L^0—OCO—E—R^0$$

(a2-6)

$$R^0—L^0—CH_2CH_2—E—R^0$$

(a2-7)

$$R^0—L^0—C{\equiv}C—E—R^0$$

(wherein $R^0$ represents an alkyl group, $X^0$ represents CN of F, $L^0$ represents F, $Z^0$ represents a single bond, the ring $A^0$ represents cyclohexylene, and $k^0$, m and n represent 0 or a natural number).

However, patents with respect to Japanese Unexamined Patent Application, First Publication No. Hei. 1-160924 (1989), German Patent Application No. 3837208A (1998), and GB Patent Application No. 2271771A (1994) were not completed and, therefore, techniques related to compounds of the general formulas (a2-1) to (a2-2) are scarcely known. Concerning detailed description of the compounds, the phase transition temperature, birefringent index, dielectric constant anisotropy, elastic constant and viscosity of compounds of the general formulas (a2-1) to (a2-2) are not known. General advantages are described, while Liq. Cryst., vol. 15, p. 123 (1993) describes that the viscosity of the compounds included in these documents is disadvantageous; Mol. Cryst. Liq. Cryst., vol. 261, p. 79 (1995) describes the compound in a narrow range exhibits liquid crystal properties; and Japanese Unexamined Patent Application, First Publication No. Hei 1-160924 (1989) describes that the compound of the general formula (a-2) makes the dielectric constant anisotropy of a liquid crystal mixture negative, so that the physical properties reported in these documents and those of the present invention conflict with each other. Therefore, these diclosures are far from technically reporting the present invention in a manner such that a person with ordinary skill in the art can easily use the present invention.

As for compositions, although combinations with general compounds such as combinations with compounds of the general formulas (a2-3) to (a2-7) are described, specific examples thereof are not disclosed. Accordingly, application examples using the liquid crystal composition, e.g. specific examples related to liquid crystal display elements, liquid crystal display devices or the like are not disclosed.

As compounds related to the general formula (I-3), compounds of the following general formulas (a3-1) to (a3-15) are described. For example, the compound of the general formula (a3-1) is disclosed in Mol. Cryst. Liq. Cryst., vol. 37, p. 249 (1976); compounds of the general formulas (a3-2) to (a3-4) are disclosed in Helvetica Chimica Acta, vol. 64, Fasc. 6, p. 1847 (1985)-Nr.176, Helvetica Chimica Acta vol. 68, p. 1406 (1985), Mol. Cryst. Liq. Cryst., vol. 206, p. 187 (1991), and Liq. Cryst., vol. 15, p. 123 (1993); the compound of the general formula (a3-5) is disclosed in Japanese Unexamined Patent Application, First Publication No. Sho 61-282345 (1986), compounds of the general formulas (a3-6) to (a3-10) are disclosed in Helvetica Chimica Acta, vol. 68, p. 1406 (1985), Published Japanese Translation No. Hei 4-504571 (1992) of the PCT Application, Japanese Patent No. 2667577, U.S. Pat. No. 5,252,253 (1993), GB Patent Application No. 2244710A (1992) and European Patent No. 453503B1 (1995); the compound of the general formula (a3-11) is disclosed in Mol. Cryst. Liq. Cryst., vol. 206, p. 187 (1991), Liq. Cryst., vol. 15, p. 123 (1993), Japanese Unexamined Patent Application, First Publication No. Hei 1-160924 (1989), German Patent Application No. 3837208A (1989) and U.S. Pat. No. 5,084,204A (1992); the compound of the general formula (a3-12) is disclosed in Japanese Unexamined Patent Application, First Publication No. Hei 1-160924 (1989), German Patent Application No. 3837208A (1989), U.S. Pat. No. 5,084,204A (1992) and Mol. Cryst. Liq. Cryst., vol. 261, p. 79 (1995); and compounds of the general formulas (a3-13) to (a3-15) are disclosed in GB Patent Application No. 2271771A (1994).

(a2-1)

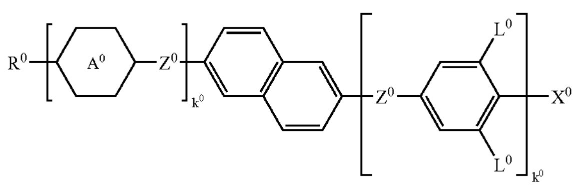

(a2-2)

$$R^0—(A^0—Z^0)m—A^0—C{\equiv}C—A^0—(Z^0—A^0)n—R^0$$

(a2-3)

$$R^0—L^0—G^0—E—R^0$$

(a2-4)

$$R^0—L^0—COO—E—R^0$$

(a2-5)

$$R^0—L^0—OCO—E—R^0$$

(a2-6)

$$R^0—L^0—CH_2CH_2—E—R^0$$

(a2-7)

$$R^0—L^0—C{\equiv}C—E—R^0$$

(wherein $R^0$ represents an alkyl group or an alkoxy group, $X^0$ represents CN or F, $Z^0$ represents a single bond, and $k^0$ represents 0, 1 or 2).

However, patents with respect to Japanese Unexamined Patent Application, First Publication No. Hei 1-160924 (1989), German Patent Application No. 3837208A (1998), and GB Patent Application No. 2271771A (1994) were not completed and, therefore, techniques related to compounds of the general formulas (a3-1) to (a3-15) are scarcely known. Concerning detailed description of the compounds, only the phase transition temperatures of the compounds of the general formulas (a3-1) to (a3-12) and the physical properties of a limited number of these compounds, e.g. the dielectric constant anisotropy of the compound of the general formula (3a-1), the birefringent index of compounds of the general formulas (a3-2) and (a3-3), the birefringent index and dielectric constant anisotropy of the compound of the general formula (a3-5), the birefringent index of the compound of the general formula (a3-11), and the birefringent index, dielectric constant anisotropy or transition enthalpy of the compound of the general formula (a3-12) are known, and the elastic constants and viscosities are not known. General advantages are described, while Liq. Cryst., vol. 15, p. 123 (1993) describes that the viscosity of compounds of the general formulas (a3-2) and (a3-3) is disadvantageous; Mol. Cryst. Liq. Cryst., vol. 261, p. 79 (1995) describes that the compound of the general formula (a3-12) in a narrow range exhibits liquid crystal properties; and Japanese Unexamined Patent Application, First Publication No. Hei 1-160924 (1989) describes that compounds of the general formulas (a3-11) and (a3-12) make the dielectric constant anisotropy of a liquid crystal mixture negative, so that the physical properties reported in these documents and those of the present invention conflict with each other. Therefore, these diclosures are far from technically reporting the present invention in a manner such that a person with ordinary skill in the art can easily use the present invention.

As for compositions, although combinations with general compounds such as combinations of compounds of the general formulas (a3-2) to (a3-4) with the compound of the general formula (a3-18), combinations of the compound of the general formula (a3-5) with the compound of the general formula (a3-17) and combinations of compounds of the general formulas (a3-6) to (a3-10) with compounds of the general formulas (a3-16) to (a3-18) are described, specific examples thereof are not disclosed. Accordingly, application examples using the liquid crystal composition, e.g. specific examples related to liquid crystal display elements, liquid crystal display devices or the like are not disclosed.

As compounds related to the general formula (I-4), compounds of the following general formulas (a4-1) to (a4-2) are described. For example, the compound of the general formula (a4-1) is disclosed in Japanese Unexamined Patent Application, First Publication No. Sho 57-130929 (1982), German Patent Application No. 3150312A (1982), U.S. Pat. No. 4,432,885A (1984), GB Patent Application No. 2090593A (1982); and the compound of the general formula (a4-2) is disclosed in German Patent Application No. 156258A (1982), U.S. Pat. No. 4,391,731A (1983) and Japanese Unexamined Patent Application, First Publication No. Sho 57-54130 (1982).

(a4-1)

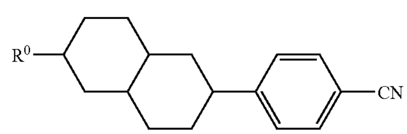

(a4-2)

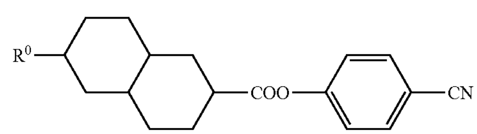

(wherein $R^0$ represents an alkyl group).

However, these techniques do not disclose the characteristics which are required at present. Only the temperature range of the liquid crystal in the compounds or compositions is known, but the dielectric constant anisotropy, birefringent index, elastic constant and viscosity are not known. Although general advantages are described, no technical knowledge related to STN-LCD and TFT-LCD, which would enable a person with ordinary skill in the art to use them easily, is disclosed.

Furthermore, although the compositions are generally described in Published Japanese Translation No. Hei 4-502781 (1992) of the PCT Application, WO91-05029 (1991) and U.S. Pat. No. 5,487,845, specific examples thereof are not disclosed. Accordingly, application examples using the liquid crystal composition, e.g. specific examples related to liquid crystal display elements, liquid crystal display devices or the like are not disclosed.

As compounds related to the general formula (I-5), the compound of the following general formula (a5-1) are described, for example, Helvetica Chimica Acta, vol. 65, Fasc. 4, p. 1318 (1982)-Nr.125.

(a5-1)

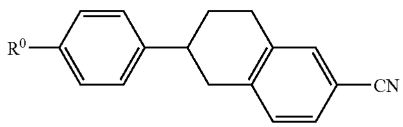

(wherein $R^0$ represents an alkyl group).

However, techniques related to the characteristics required at present are scarcely known. In detail, the dielectric constant anisotropy, birefringent index, elastic constant and viscosity of the general formula (a5-1) are not known. Accordingly, no technical knowledge related to TN-LCDs, STN-LCDs and TFT-LCDs, which would enable a person with ordinary skill in the art to use them easily, is disclosed.

Furthermore, although the compositions are generally described in Published Japanese Translation No. Hei 4-502781 (1992) of the PCT Application, WO 91-05029 (1991) and U.S. Pat. No. 5,487,845, specific examples thereof are not disclosed. Accordingly, application examples using the liquid crystal composition, e.g. specific examples related to liquid crystal display elements, liquid crystal display devices or the like are not disclosed.

DISCLOSURE OF INVENTION

The present invention has the feature that the liquid crystal component A is composed of a compound of the general formula selected appropriately from compounds represented by the general formulas (I-1) to (I-5). Such a nematic liquid crystal composition was not previously known.

The present invention is directed to a nematic liquid crystal composition containing at least one of the compounds represented by the general formulas (I-1) to (I-5) and, more particularly, to a nematic liquid crystal composition containing one, or two or more kinds of compounds of the general formulas (I-1) to (I-5). The present invention intends to meet the requirements for the liquid crystal materials described above, or improve their properties, with a novel nematic liquid crystal composition containing compounds having a fused ring, e.g. compound having a naphthalene-2,6-diyl ring, a 1,2,3,4-tetrahydronaphthalene-2,6-diyl ring and a decahydronaphthalene-2,6-diyl ring and compounds having a substituent in any of these rings, or a combination of these with compounds other than the compounds of the general formulas (I-1) to (I-5), thus improving the characteristics of the liquid crystal display elements described above.

More particularly, the present invention intends to extend the operating temperature of the liquid crystal display by making improvements in the co-solubility and in the storage at low temperature, and to remedy the reduction in driving voltage and the change in temperature, thereby to attain comparatively fast response characteristics or to improve the response characteristics for a predetermined driving voltage. Also the present invention intends to improve various display characteristics of MIM or TFT-LCDs or PDLCs by a liquid crystal material having a desired birefringent index and to improve display characteristics of PN-LCDs or PDLCs by a liquid crystal material having a comparatively large birefringent index.

To solve the problems described above, the present invention provides a nematic liquid crystal composition comprising a liquid crystal component A composed of one, or two or more kinds of compounds represented by one, two, or three or more general formulas selected from the general formulas (I-1) to (I-5):

(I-1)

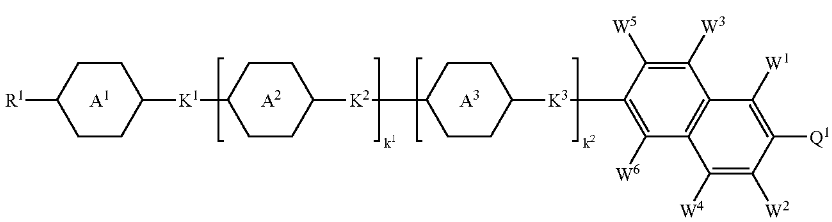

(I-2)

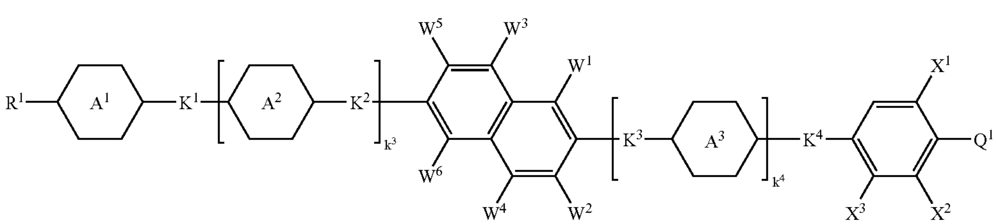

-continued

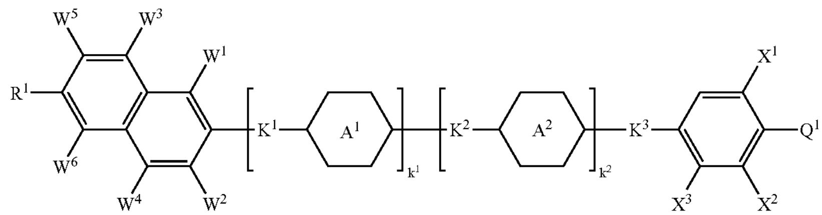
(I-3)

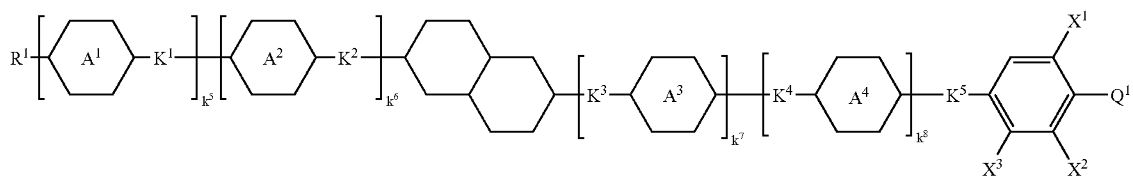
(I-4)

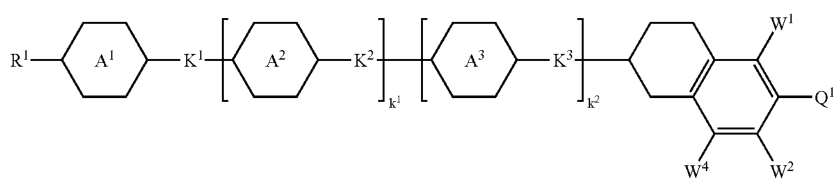
(I-5)

(wherein one, or two or more CH groups, which are present in a naphthalene-2,6-diyl ring, may be substituted with a N group, one, or two or more —$CH_2$— groups, which are present in a decahydronaphthalene-2,6-diyl ring, may be substituted with $CF_2$—, one, or two or more —$CH_2$—$CH_2$— groups, which are present in said ring, may be substituted with —$CH_2O$—, —CH═CH—, —CH═CF—, —CF═CF—, —CH═N— or —CF═N—, one, or two or more >CH—$CH_2$-groups, which are present in said ring, may be substituted with >CH—O—, >C═CH—, >C═CF—, >C═N— or >N—$CH_2$—, a >CH—CH< group, which is present in the ring, may be substituted with >CH—CF<, >CF—CF<or >C═C<, and at least one C in said non-substituted or substituted ring may be substituted with Si;

$R^1$ each independently represents an alkyl group having 1 to 10 carbon atoms or an alkenyl group having 2 to 10 carbon atoms, said alkyl or alkenyl group can have one, or two or more F, Cl, CN, $CH_3$ or $CF_3$ as a non-substituent or substituent group, and one, or two or more $CH_2$ group, which are present in said alkyl or alkenyl group, may be substituted with O, CO or COO, while O atoms do not bond with each other directly;

$Q^1$ each independently represents F, Cl, $CF_3$, $OCF_3$, $OCF_2H$, $OCFH_2$, NCS, or CN;

$X^1$ to $X^3$ each independently represents H, F, Cl, $CF_3$, $OCF_3$, or CN;

$W^1$ to $W^6$ each independently represents H, F, Cl, $CF_3$, $OCF_3$, or CN, and also $W^4$ each independently represents $CH_3$;

$K^1$ to $K^5$ each independently represents, a single bond, —COO—, —OCO—, —$CH_2O$—, —$OCH_2$—, —CH═CH—, —CF═CF—, —C≡C—, —$(CH_2)_2$—, —$(CH_2)_4$—, —CH═CH—$(CH_2)_2$—, —$(CH_2)_2$—CH═CH—, —CH═N—, ═CH═N—N═CH—, or —N(O)═N—;

rings $A^1$ to $A^4$ each independently represents 1,4-phenylene, 2- or 3-fluoro-1,4-phenylene, 2,3-difluoro-1,4-phenylene, 3,5-difluoro-1,4-phenylene, 2- or 3-chloro-1,4-phenylene, 2,3-dichloro-1,4-phenylene, 3,5-dichloro-1,4-phenylene, pyrimidine-2,5-diyl, trans-1,4-cyclohexylene, trans-1,4-cyclohexenylene, trans-1,3-dioxane-2,5-diyl, trans-1-sila-1,4-cyclohexylene, trans-4-sila-1,4-cyclohexylene, naphthalene-2,6-diyl, 1,2,3,4-tetrahydronaphthalene-2,6-diyl, or decahydronaphthalene-2,6-diyl, and naphthalene-2,6-diyl and 1,2,3,4-tetrahydronaphthalene-2,6-diyl can have one, or two or more F, Cl, $CF_3$ or $CH_3$ as a non-substituent or substituent group;

one, or two or more hydrogen atoms, which are present in a naphthalene-2,6-diyl ring, a 1,2,3,4-tetrahydronaphthalene-2,6-diyl ring, a decahydronaphthalene-2,6-diyl ring, a side chain group $R^1$, a polar group $Q^1$, linking groups $K^1$ to $K^5$ and rings $A^1$ to $A^4$, may be substituted with a deuterium atom;

$k^1$ to $k^8$ each independently represents 0 or 1, $k^3+k^4$ is 0 or 1, and $k^5+k^6+k^7+k^8$ is 0, 1 or 2; and atoms, which constitute the compounds of the general formulas (I-1) to (I-5), may be substituted with isotope atoms thereof); 0 to 99.9% by weight of a liquid crystal component B composed of a compound having a dielectric constant anisotropy of +2 or more as a liquid crystal component excluding the compounds of the general formulas (I-1) to (I-5); and 0 to 85% by weight of a liquid crystal component C composed of a compound having a dielectric constant anisotropy within a range from −10 to +2; the sum total of said liquid crystal component B and said liquid crystal component C being within a range from 0 to 99.9% by weight.

The liquid crystal component B can contain one, or two or more kinds of compounds selected from the group of compounds represented by the general formulas (II-1) to (I-4):

(II-1)

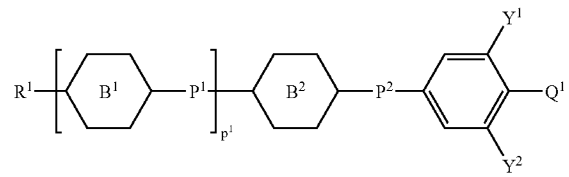

(II-2)

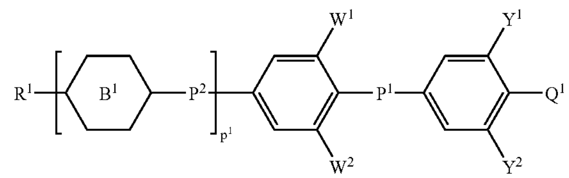

(II-3)

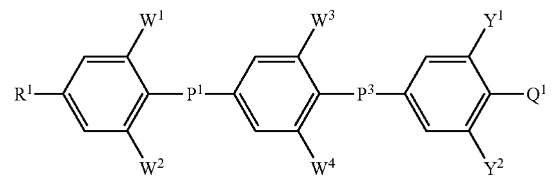

(II-4)

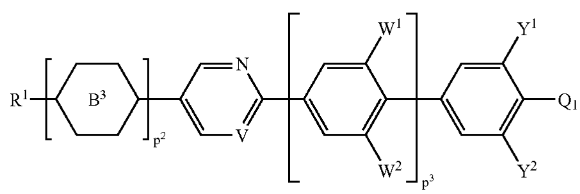

(wherein $R^1$, $Q^1$ and $W^1$ to $W^4$ are as defined above;

$Y^1$ and $Y^2$ each independently represents H, F, Cl, $CF_3$, $OC_3$, or CN;

V represents CH or N;

$P^1$ to $P^3$ each independently represents, a single bond, —COO—, —OCO—, —$CH_2O$—, —$OCH_2$—, —$(CH_2)_2$—, —$(CH_2)_4$—, —CH═CH—$(CH_2)_2$—, —$(CH_2)_2$—CH═CH—, —CH═N—, ═CH═N—N═CH—, or —N(O)═N—, and $P^1$ and $P^3$ each independently represents —CH═CH—, —CF═CF—, or C≡C—;

rings $B^1$ to $B^3$ each independently represents trans-1,4-cyclohexylene, trans-1,4-cyclohexenylene, trans-1,3-dioxane-2,5-diyl, trans-1-sila-1,4-cyclohexylene, or trans-4-sila-1,4-cyclohexylene, and the ring $B^3$ may also be 1,4-phenylene, 2- or 3-fluoro-1,4-phenylene, 3,5-difluoro1,4-phenylene, 2- or 3-chloro-1,4-phenylene, 2,3-dichloro-1,4-phenylene, or 3,5-dichloro-1,4-phenylene;

one, or two or more hydrogen atoms, which are present in a side chain group $R^1$, a polar group $Q^1$, linking groups $P^1$ to $P^3$ and rings $B^1$ to $B^3$, may be substituted with a deuterium atom;

$p^1$ to $p^3$ each independently represents 0 or 1, and $p^2+p^3$ is 0 or 1; and atoms, which constitute the compounds of the general formulas (II-1) to (II-4), may be substituted with isotope atoms thereof).

Also the liquid crystal component C can contain compounds selected from the group of compounds represented by the general formulas (III-1) to (III-4):

(III-1)

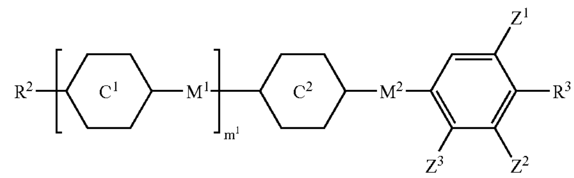

(III-2)

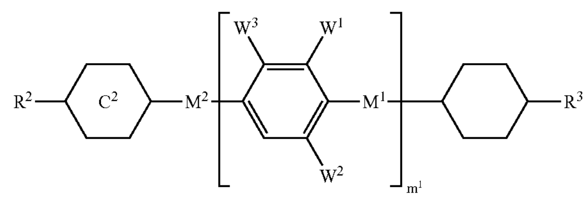

(III-3)

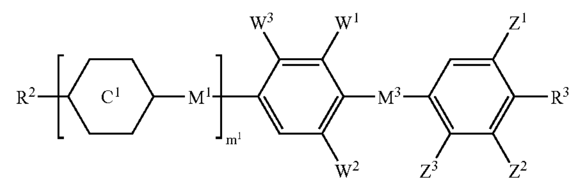

(III-4)

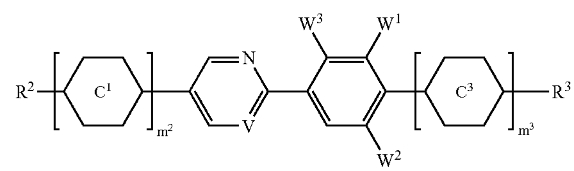

(wherein $W^1$ to $W^3$ are as defined above;

$R^2$ and $R^3$ each independently represents an alkyl or alkoxy group having 1 to 10 carbon atoms or an alkenyl or alkenyloxy group having 2 to 10 carbon atoms, said alkyl, alkoxy, alkenyl or alkenyloxy group can have one, or two or more F, Cl, CN, $CH_3$ or $CF_3$ as a non-substituent or substituent group, and one, or two or more $CH_2$ group, which are present in said alkyl, alkoxy, alkenyl or alkenyloxy group, may be substituted with O, CO or COO, while O atoms do not bond with each other directly;

$Z^1$ to $Z^3$ each independently represents H, F, Cl, $CF_3$, $OCF_3$, or CN, and $Z^3$ each independently represents —$CH_3$;

$M^1$ to $M^3$ each independently represents, a single bond, —COO—, —OCO—, —$CH_2O$—, —$OCH_2$—, —$(CH_2)_2$—, —$(CH_2)_4$—, —CH═CH—$(CH_2)_2$—, —$(CH_2)_2$—CH═CH—, —CH═N—, ═CH═N—N═CH—, or —N(O)═N—, and $M^1$ and $M^3$ each independently represents —CH═CH—, —CF═CF—, or C≡C—;

rings $C^1$ to $C^3$ each independently represents trans-1,4-cyclohexylene, trans-1,4-cyclohexenylene, trans-1,3-dioxane-2,5-diyl, trans-1-sila-1,4-cyclohexylene, trans-4-sila-1,4-cyclohexylene, naphthalene-2,6-diyl, 1,2,3,4-tetrahydronaphthalene-2,6-diyl, or decahydronaphthalene-2,6-diyl, naphthalene-2,6-diyl and 1,2,3,4-tetrahydronaphthalene-2,6-diyl can have one, or two or more F, Cl, $CF_3$ or $CH_3$ as a non-substituent or substituent group, and rings $C^1$ and $C^3$ may also be 1,4-phenylene, 2- or 3-fluoro-1,4-phenylene, 3,5-difluoro1,4-phenylene, 2- or 3-chloro-1,4-phenylene, 2,3-dichloro-1,4-phenylene, or 3,5-dichloro-1,4-phenylene;

one, or two or more hydrogen atoms, which are present in side chain groups $R^2$ and $R^3$, linking groups $M^1$ to $M^3$ and rings $C^1$ to $C^3$, may be substituted with a deuterium atom;

$m^1$ to $m^3$ each independently represents 0 or 1, and $m^2+m^3$ is 0 or 1; and atoms, which constitute the compounds of the general formulas (III-1) to (III-4), may be substituted with isotope atoms thereof).

Furthermore, the present invention provides an active matrix, twisted nematic or super twisted nematic liquid display device using the above nematic liquid crystal composition, or a light scattering type liquid display device comprising a light modulation layer which contains the above liquid crystal composition and a transparent solid substance.

BEST MODE FOR CARRYING OUT THE INVENTION

The liquid crystal composition of the present invention contains, as an essential component, a liquid crystal component A composed of compounds of the general formulas (I-51) to (I-5). The compounds represented by the general formulas (I-1) to (I-5) are characterized by a molecular structure having, as a partial structure, non-substituted or substituted naphthalene-2,6-diyl, decahydronaphthalene-2,6-diyl and 1,2,3,4-tetrahydronaphthalene-2,6-diyl rings. The liquid crystal component A having this feature has the effects that the response characteristics are maintained because of the comparatively good nematic phase-isotropic liquid phase transition temperature, or that the driving voltage is reduced without deteriorating the response characteristics, when mixing the liquid crystal component A with a liquid crystal compound or composition, and has excellent characteristics which are not found in a conventional liquid crystal compounds having a reduced driving voltage. The present inventors have found that this effect can be exerted when the liquid crystal composition contains a liquid crystal component A composed of compounds of the general formulas (I-1) to (I-5), 0 to 99.9% by weight of a liquid crystal component B composed of a compound having a dielectric constant anisotropy of +2 or more and 0 to 85% by weight of a liquid crystal component C composed of a compound having a dielectric constant anisotropy within a range from −10 to +2, the sum total of the liquid crystal component B and the liquid crystal component C being within a range from 0 to 99.9% by weight. The liquid crystal component A noticeably reduces the solid phase- or smectic phase-nematic phase transition temperature and lengthens the storage time at low temperature, thereby making it possible to widen the display temperature range, when mixing the liquid crystal component A with liquid crystal materials of the liquid crystal component B and the liquid crystal component C.

As used herein, terms “naphthalene-2,6-diyl ring”, “decahydronaphthalene-2,6-diyl ring” and “1,2,3,4-tetrahydronaphthalene-2,6-diyl ring” are defined as those including both non-substituted and substituted rings, unless otherwise specified. This definition is applied to the liquid crystal components A and C. The substitution means the following. In the case of the naphthalene-2,6-diyl ring, substituted ones include those in which one, or two or more CH groups present in the ring are substituted with an N group, and those having one, or two or more F, Cl, $CF_3$ or $CH_3$ groups as substituents. In the case of the 1,2,3,4-tetrahydronaphthalene-2,6-diyl ring ring, substituted ones include those having one, or two or more F, Cl, $CF_3$, $OCF_3$ or $CH_3$ groups as the substituent. In the case of the decahydronaphthalene-2,6-diyl ring, substituted ones include those in which one, or two or more —$CH_2$— groups, which are present in the ring, are substituted with —$CF_2$—, one, or two or more —$CH_2$—$CH_2$— groups, which are present in said ring, are substituted with —$CH_2O$—, —CH═CH—, —CH═CF—, —CF═CF—, —CH═N— or —CF═N—, one, or two or more >CH—$CH_2$-groups, which are present in the ring, are substituted with >CH—O—, >C═CH—, >C═CF—, >C═N— or >N—$CH_2$—, a >CH—CH< group, which is present in the ring, is substituted with >CH—CF<, >CF—CF<or >C═C<, and at least one C in the non-substituted or substituted decahydronaphthalene-2,6-diyl ring is substituted with Si. Furthermore, those in which one, or two or more hydrogen atoms, which are present in the naphthalene-2,6-diyl ring, the decahydronaphthalene-2,6-diyl ring and the 1,2,3,4-tetrahydronaphthalene-2,6-diyl ring, are substituted with a deuterium atom are included.

Similarly, the terms “alkyl group” and “alkenyl group” are defined as those including both non-substituent and substituent groups, unless otherwise specified. The alkyl group and alkenyl group may be straight-chain or branched. This definition is applied to the liquid crystal components A, B and C.

In the present invention, more preferred compounds of the general formulas (I-1) to (I-5) include the following compounds of the specific general formulas (I-11) to (I-53).

(I-11)

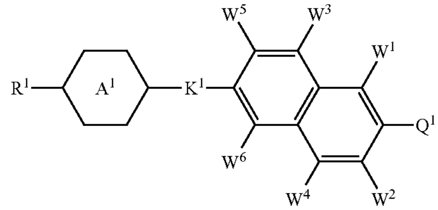

-continued
(I-12)
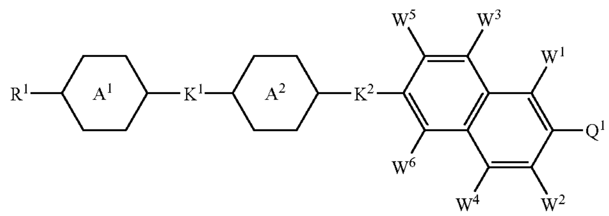
(I-13)
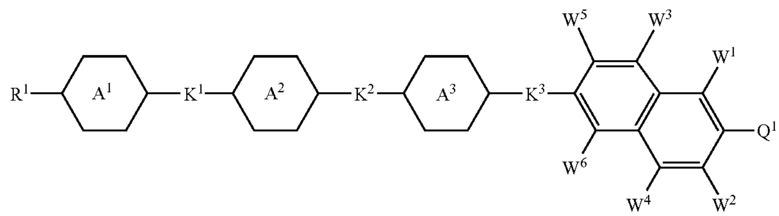
(I-21)
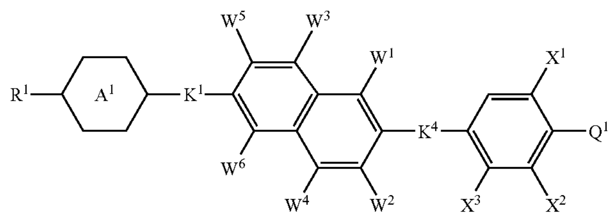
(I-22)
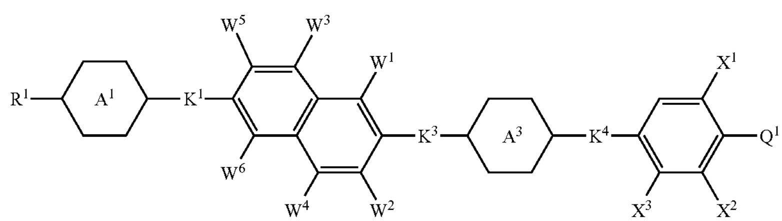
(I-23)
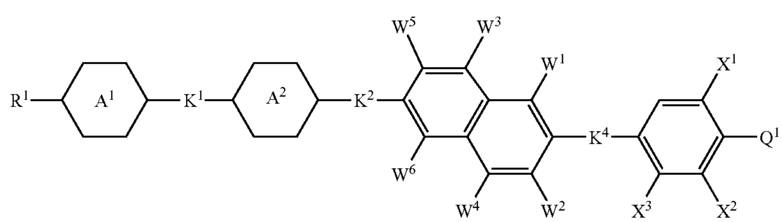
(I-31)
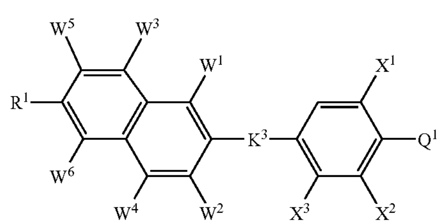
(I-32)
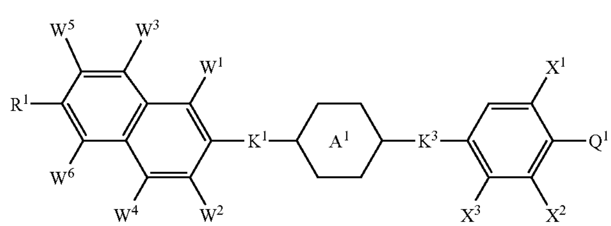

-continued
(I-33)
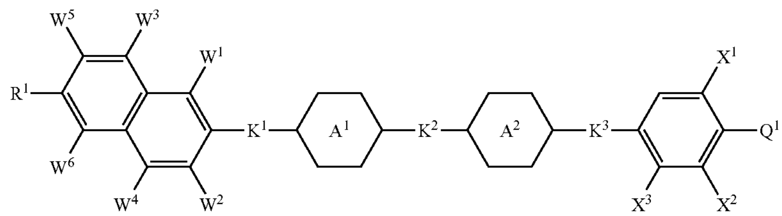
(I-41)
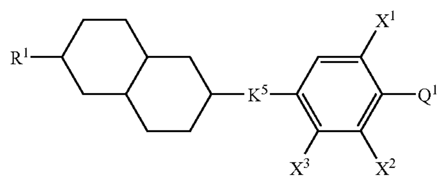
(I-42)
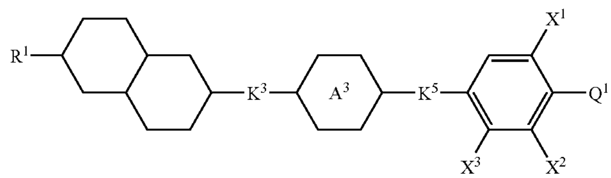
(I-43)
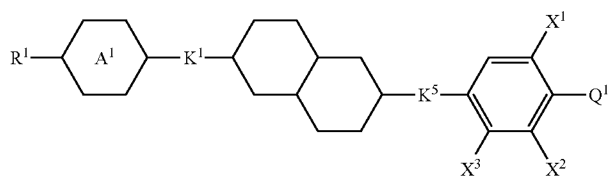
(I-44)
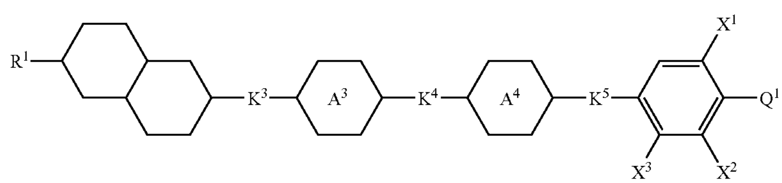
(I-45)
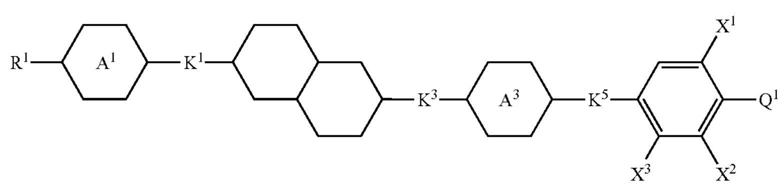
(I-46)
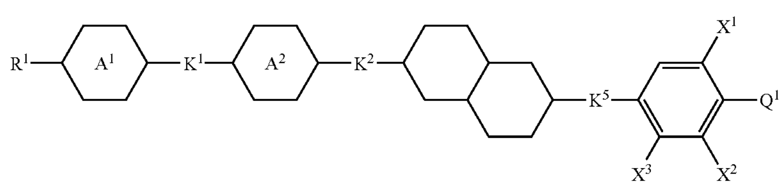
(I-51)
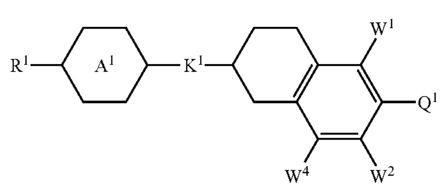

-continued

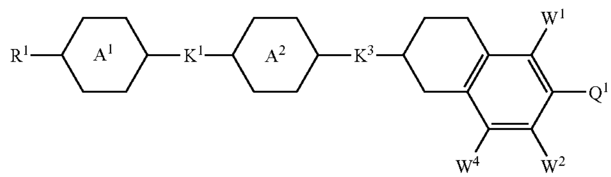
(I-52)

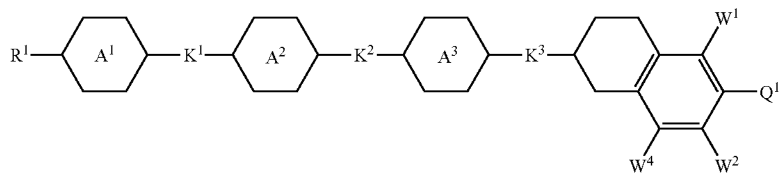
(I-53)

The present inventors have found it preferable in order to obtain the effects of the present invention that the liquid crystal component A contains one, or two or more kinds of compounds selected from compounds represented by the general formula (I-11) or (I-12) or contains compounds represented by the general formulas (I-11) and (I-12) in combination, the content of the compounds being within a range from 5 to 100% by weight, if the liquid crystal component A contains compounds represented by the general formula (I-1).

The present inventors have found it preferable in order to obtain the effects of the present invention that the liquid crystal component A contains one, or two or more kinds of compounds selected from compounds represented by the general formula (I-21) and/or contains compounds represented by the general formulas (I-22) and (I-23) alone or in combination, the content of the compounds being within a range from 5 to 100% by weight, if the liquid crystal component A contains compounds represented by the general formula (I-2).

The present inventors have found it preferable in order to obtain the effects of the present invention that the liquid crystal component A contains one, or two or more kinds of compounds selected from compounds represented by the general formula (I-31) or (I-32) or contains compounds represented by the general formulas (I-31) and (I-32) in combination, the content of the compounds being within a range from 5 to 100% by weight, if the liquid crystal component A contains compounds represented by the general formula (I-3).

If the liquid crystal component A contains compounds represented by the general formula (I-4), the liquid crystal component A can be composed of compounds selected from one, two, three or four general formulas among the general formulas (I-41) to (I-46). The liquid crystal component A may be composed of each of the compounds of the general formula (I-41) alone, or may be composed of a combination with compounds selected from one, two or three general formulas among the general formulas (I-42) to (I-46). In this case, it is preferred to use it in combination with compounds selected from compounds of the general formula (I-42) or (I-43). The liquid crystal component A may be composed of each of the compounds of the general formula (I-42) or (I-43) alone, or may be composed of a combination with compounds selected from one, two or three general formulas among the general formulas (I-41) and (I-44) to (I-46). In this case, it is preferred to use it in combination with compounds selected from compounds of the general formula (I-41). The liquid crystal component A may be composed of each of the compounds of the general formulas (I-44) to (I-46) alone because the temperature range of the nematic phase can be adjusted using a small amount of these compounds, or may be composed of a combination of it with compounds selected from one, two or three general formulas among the general formulas (I-41) to (I-43). The liquid crystal component A thus composed can contain one to forty kinds of compounds selected from compounds of the general formulas (I-41) to (I-46), but preferably contains one to twenty kinds of compounds. The present inventors have found that the liquid crystal component A is preferable in order to obtain the effects of the present invention.

The present inventors have found it preferable in order to obtain the effects of the present invention that the liquid crystal component A contains one, or two or more kinds of compounds selected from compounds represented by the general formula (I-51) or contains compounds represented by the general formulas (I-51) and (I-52) in combination, the content of the compounds being within a range from 5 to 100% by weight, if the liquid crystal component A contains compounds represented by the general formula (I-5).

According to the present invention, the liquid crystal component A can be composed of compounds selected from one, two, or three or more general formulas among the general formulas (I-1) to (I-5). The liquid crystal component A may be composed of any of the compounds of the general formulas (I-1) to (I-5) alone, or may be composed of compounds selected from compounds of two, or three or more general formulas in combination. In this case, compounds selected from compounds of the general formulas (I-11), (I-12), (I-21), (I-31), (I-32), (I-41), (I-42), (I-43), (I-51) and (I-52) are used alone or in combination, particularly preferably.

In view of the above, more preferred embodiments of basic structures of the compounds represented by the general formulas (I-1) to (I-5) are compounds represented by the general formulas (I-11a) to (I-53ab).

(I-11a)
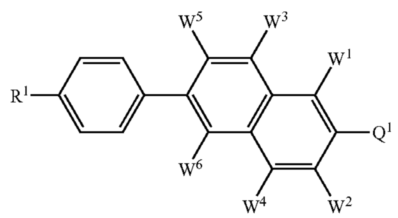
(I-11b)
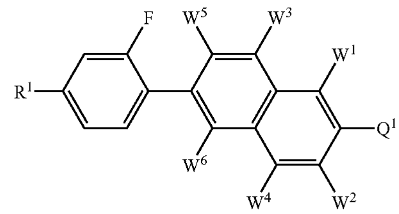
(I-11c)
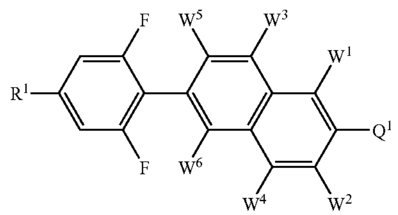
(I-11d)
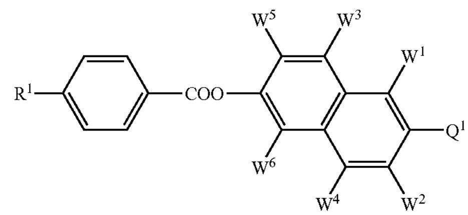
(I-11e)
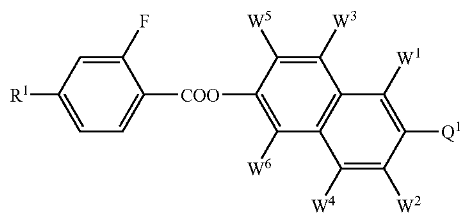
(I-11f)
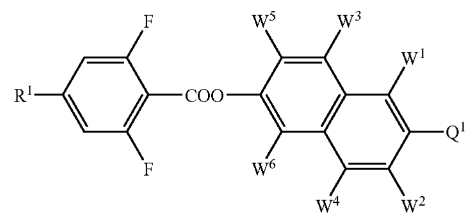
(I-11g)
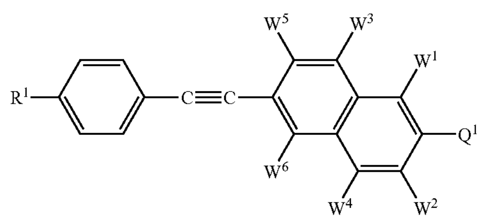
(I-11h)
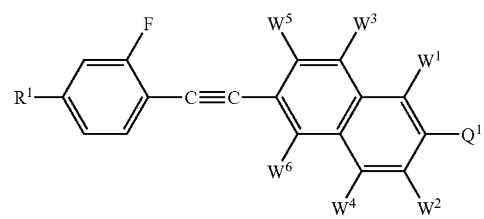
(I-11i)
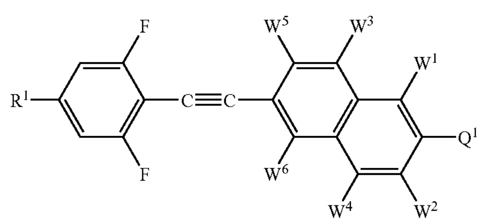
(I-11j)
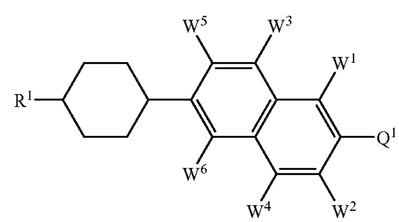
(I-11k)
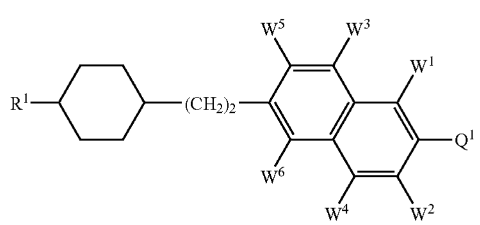
(I-11l)
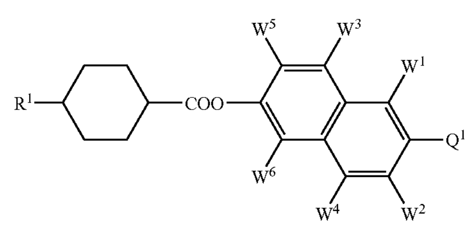
(I-11m)
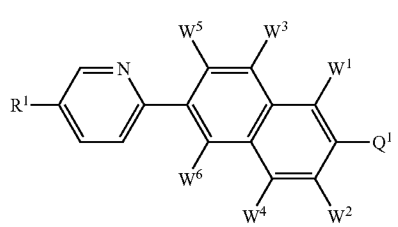
(I-11n)
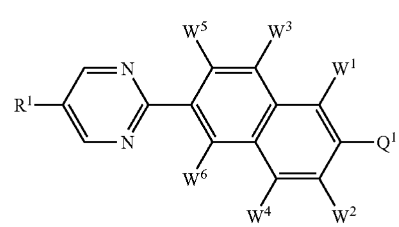

-continued
(I-11o)
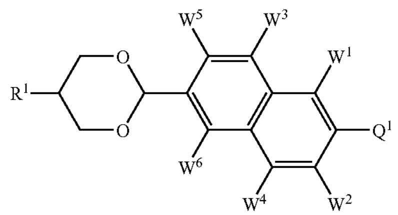
(I-11p)
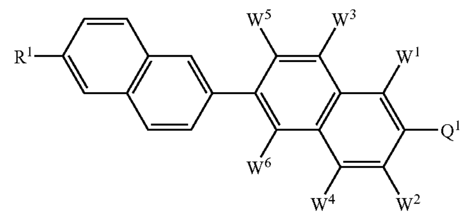
(I-11q)
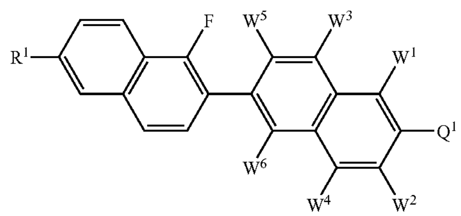
(I-11r)
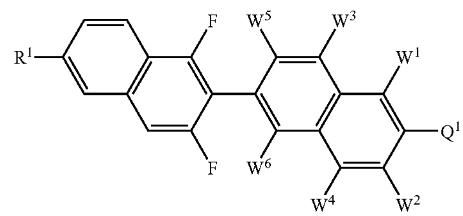
(I-11s)
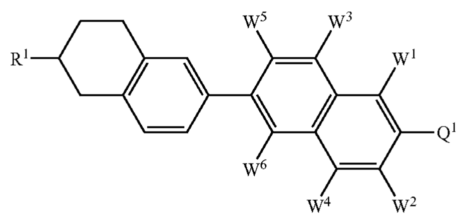
(I-11t)
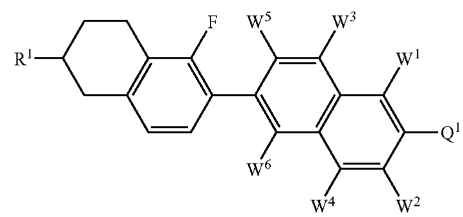
(I-11u)
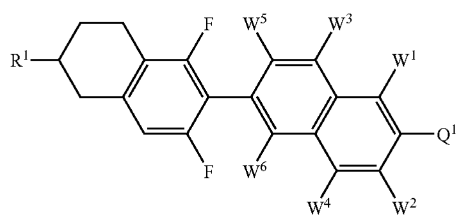
(I-11v)
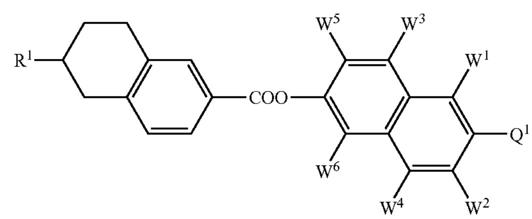
(I-11w)
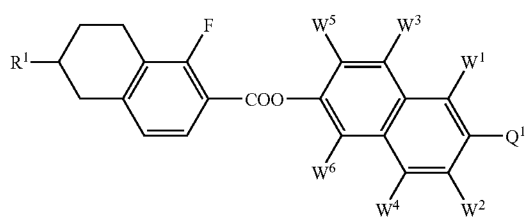
(I-11x)
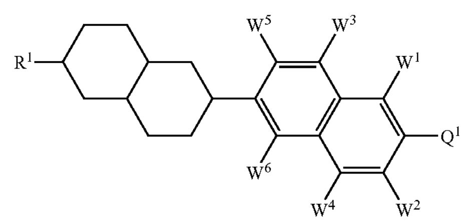
(I-11y)
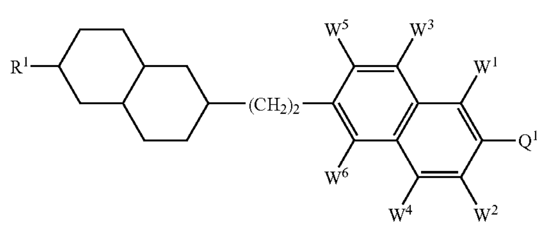
(I-12a)
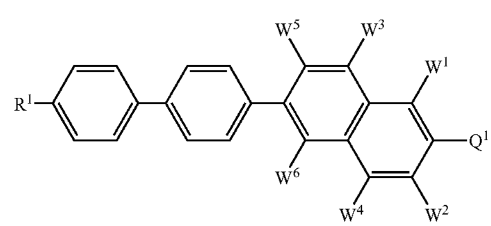
(I-12b)
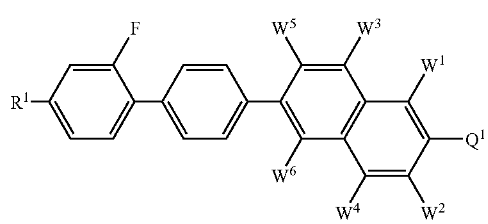
(I-12c)
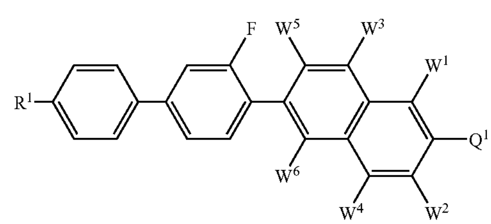

-continued
(I-12d)
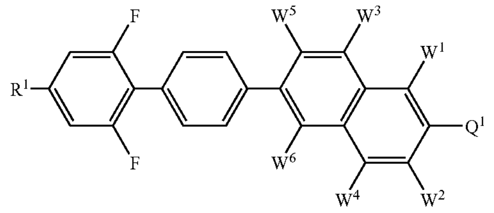
(I-12e)
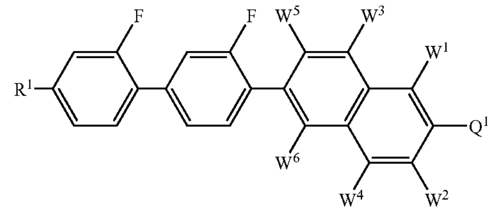
(I-12f)
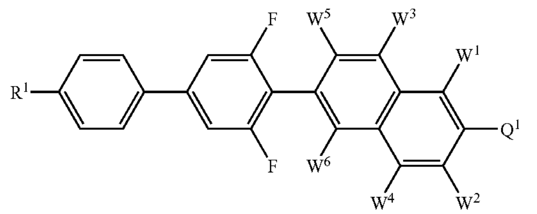
(I-12g)
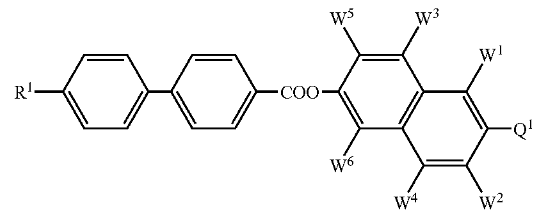
(I-12h)
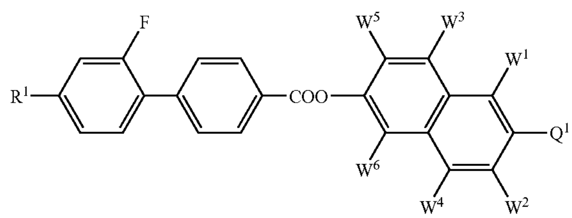
(I-12i)
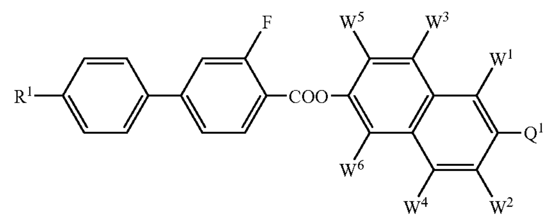
(I-12j)
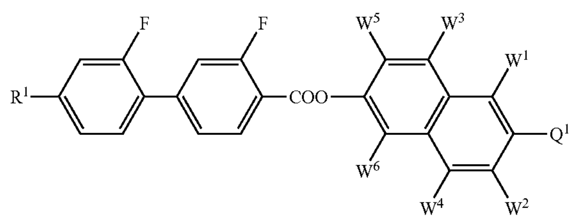
(I-12k)
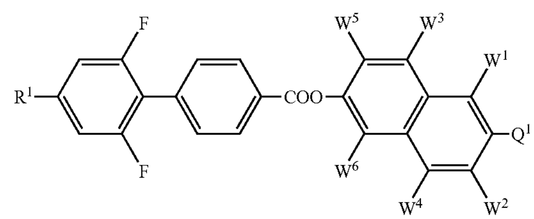
(I-12l)
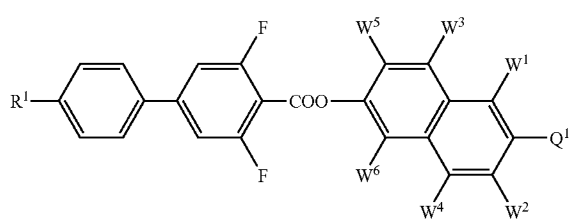
(I-12m)
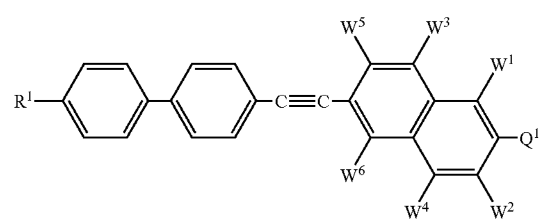
(I-12n)
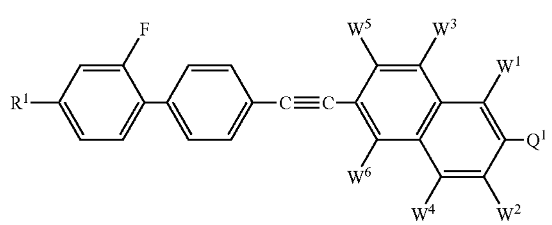
(I-12o)
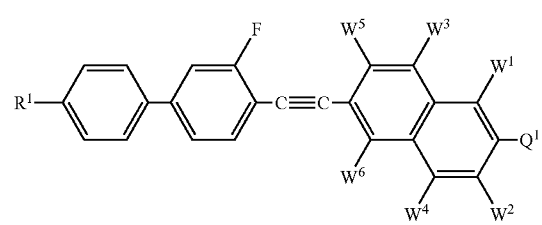

-continued
(I-12p)
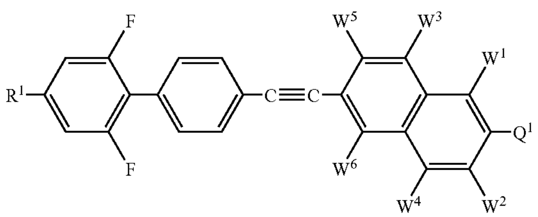
(I-12q)
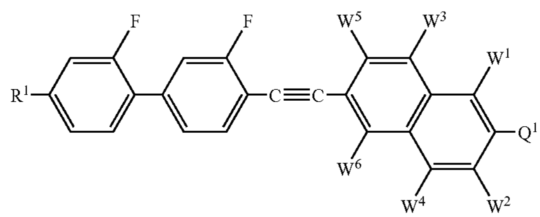
(I-12r)
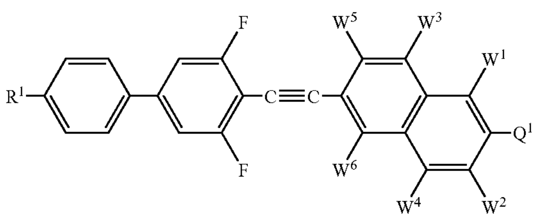
(I-12s)
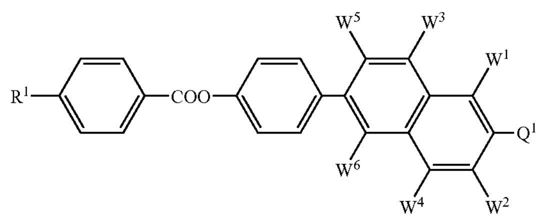
(I-12t)
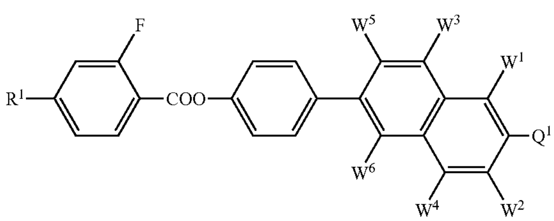
(I-12u)
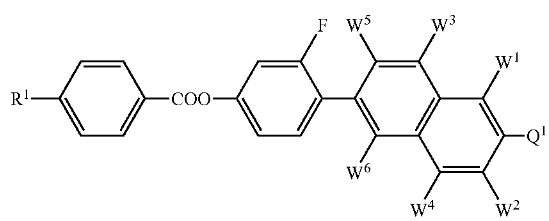
(I-12v)
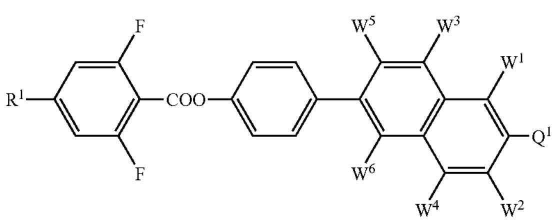
(I-12w)
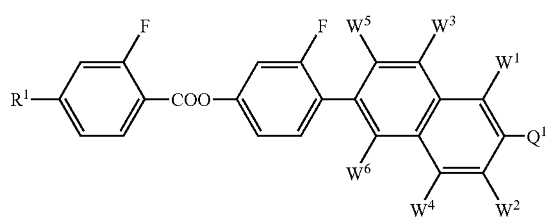
(I-12x)
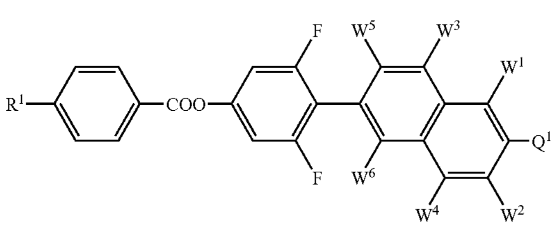
(I-12y)
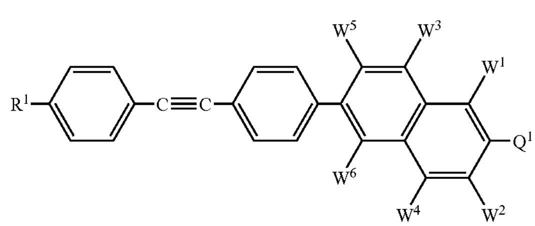
(I-12z)
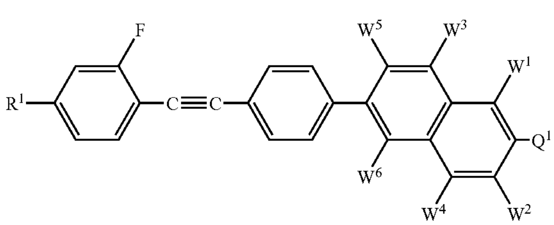
(I-12aa)
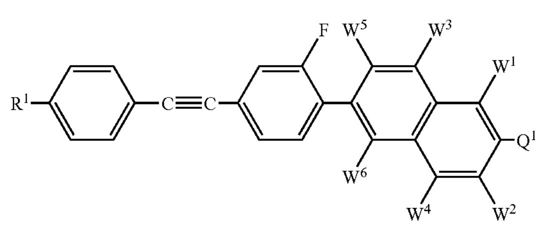

-continued
(I-12ab)
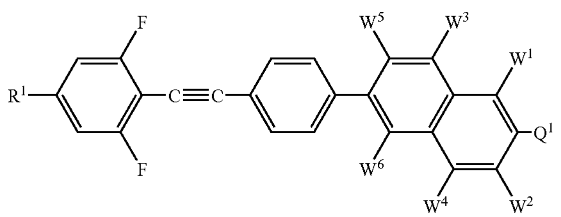
(I-12ac)
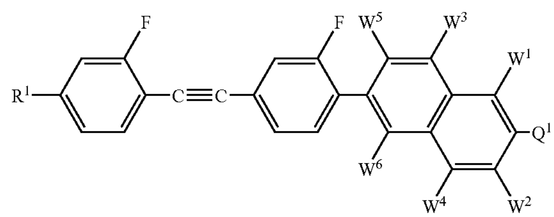
(I-12ad)
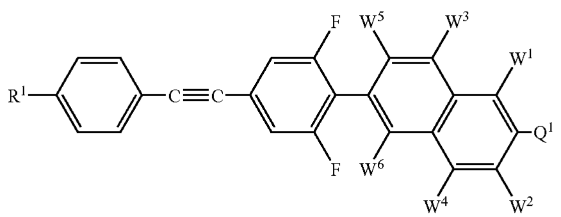
(I-12ae)
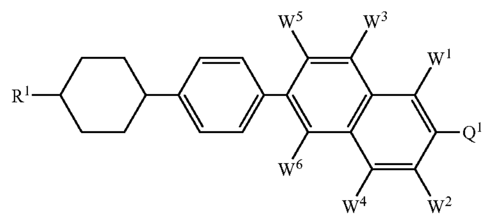
(I-12af)
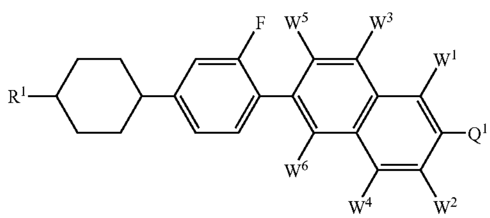
(I-12ag)
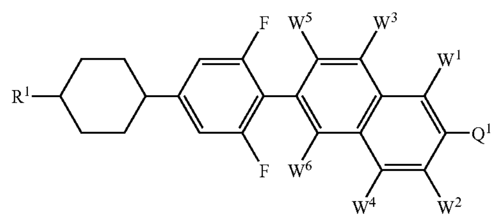
(I-12ah)
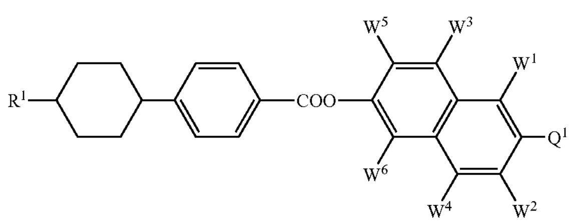
(I-12ai)
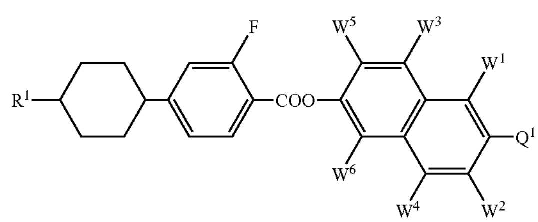
(I-12aj)
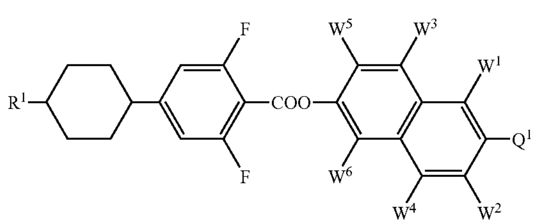
(I-12ak)
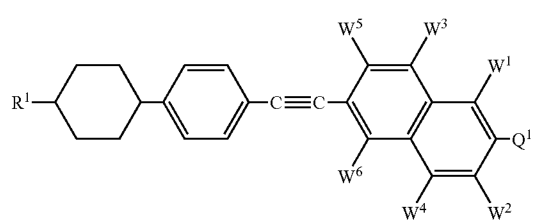
(I-12al)
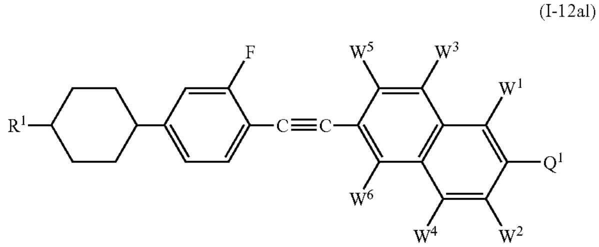
(I-12am)
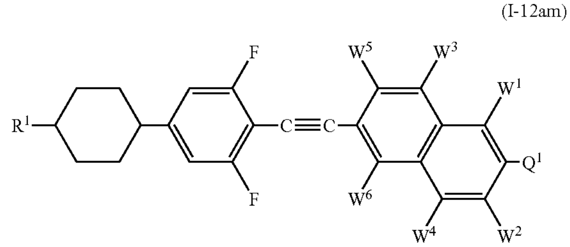

-continued
(I-12an)
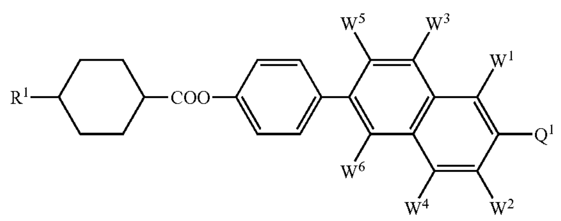
(I-12ao)
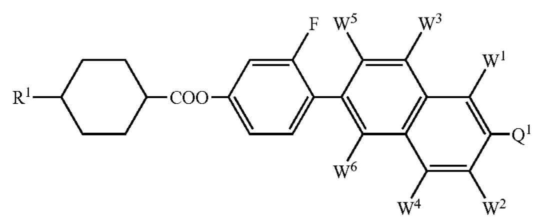
(I-12ap)
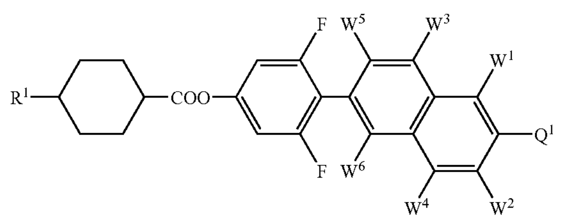
(I-12aq)
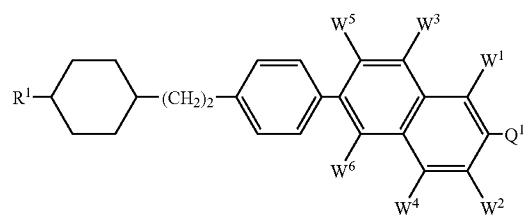
(I-12ar)
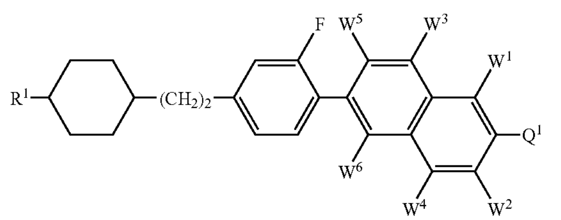
(I-12as)
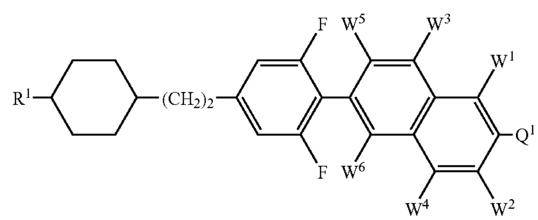
(I-12at)
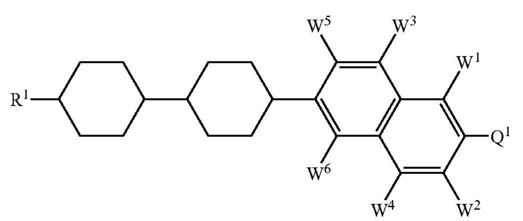
(I-12au)
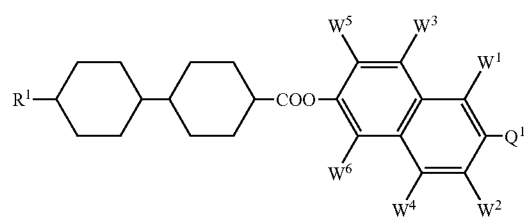
(I-12av)
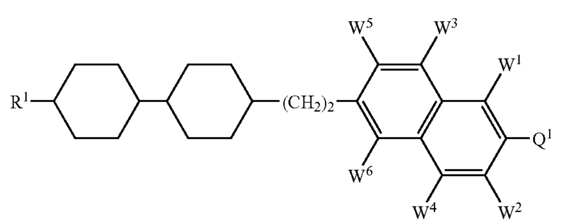
(I-12aw)
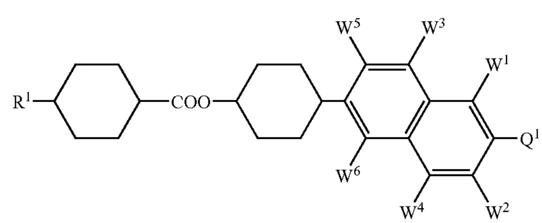
(I-12ax)
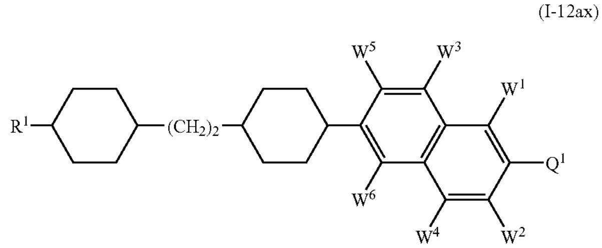
(I-12ay)
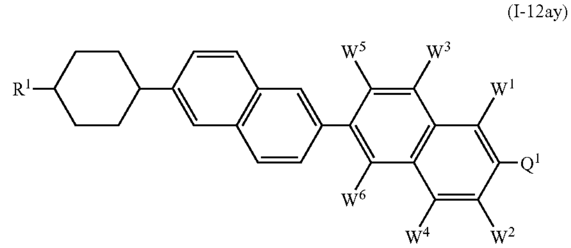

-continued
(I-12az)
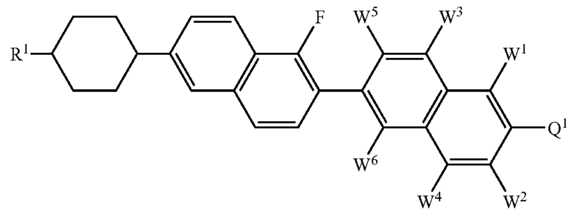
(I-12ba)
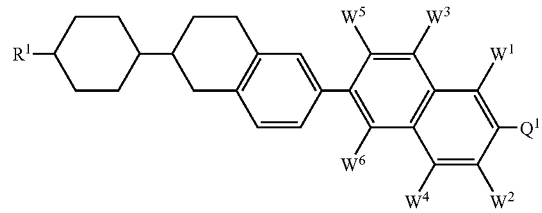
(I-12bb)
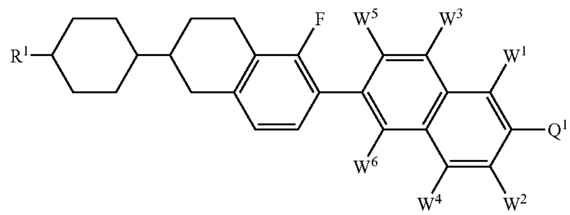
(I-12bc)
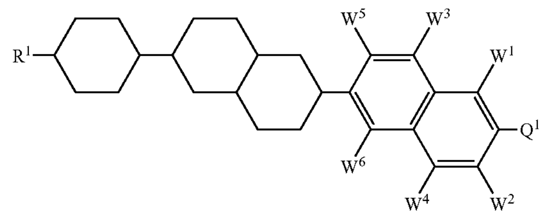
(I-12bd)
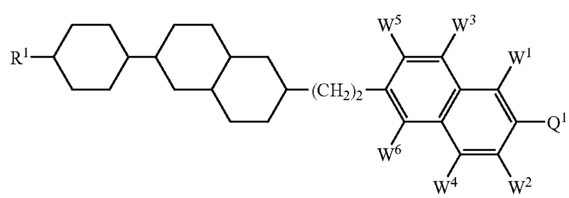
(I-13a)
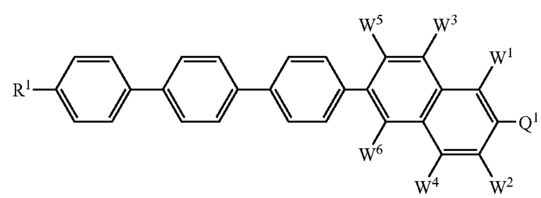
(I-13b)
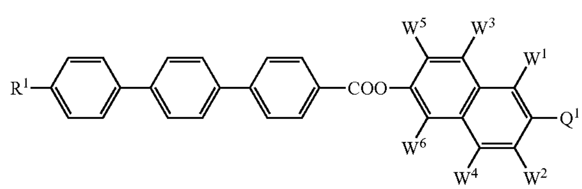
(I-13c)
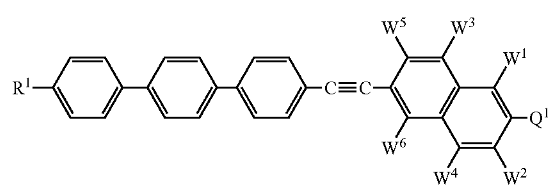
(I-13d)
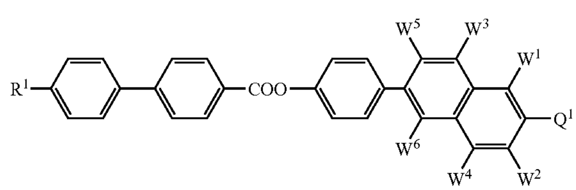
(I-13e)
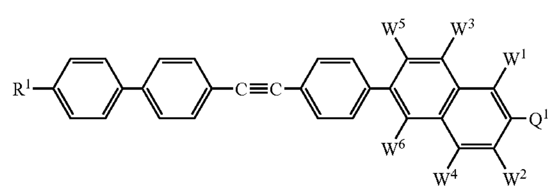
(I-13f)
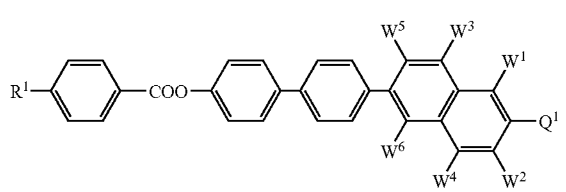
(I-13g)
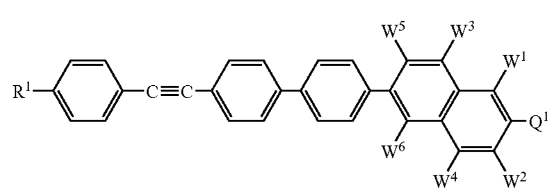
(I-13h)
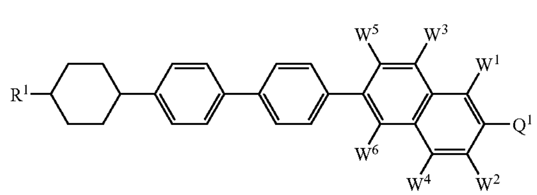
(I-13i)
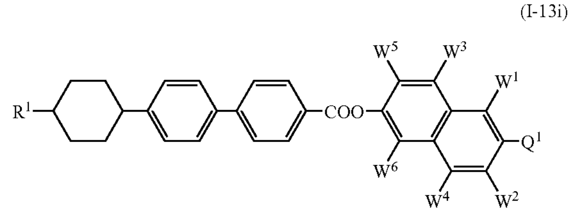

-continued
(I-13j)
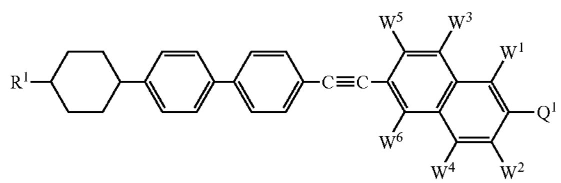
(I-13k)
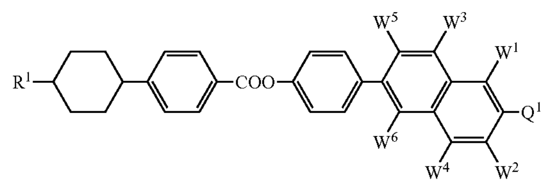
(I-13l)
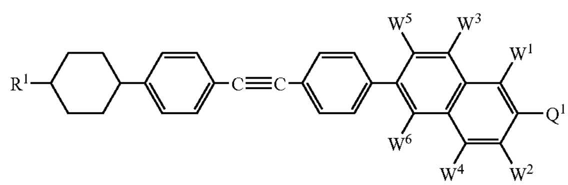
(I-13m)
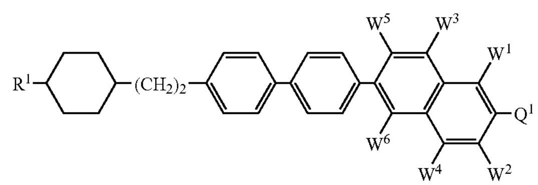
(I-13n)
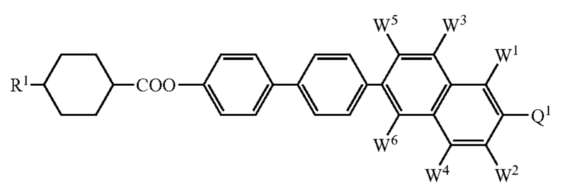
(I-13o)
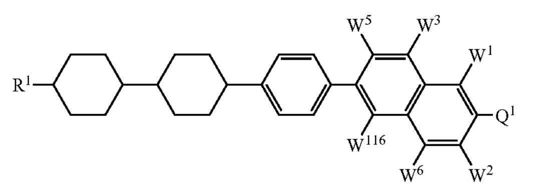
(I-13p)
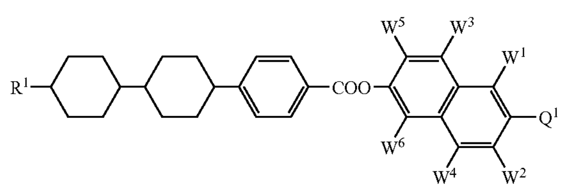
(I-13q)
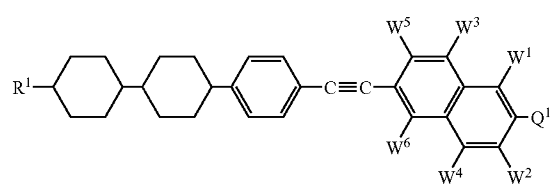
(I-13r)
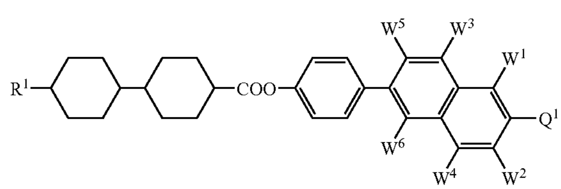
(I-13s)
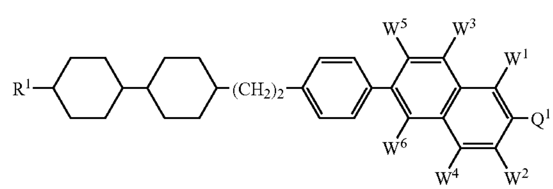
(I-13t)
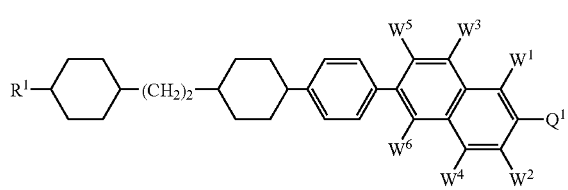
(I-13u)
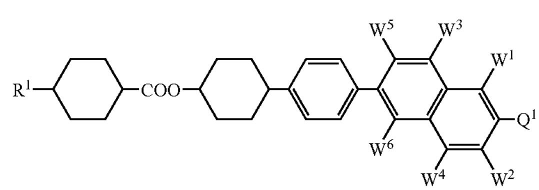
(I-13v)
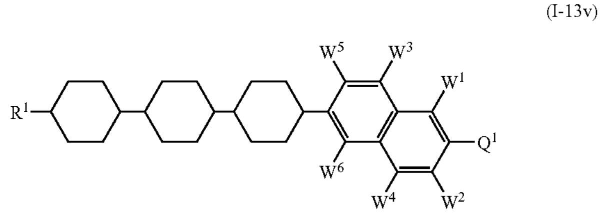
(I-13w)
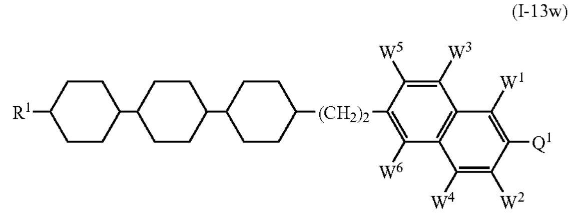

-continued
(I-13x)
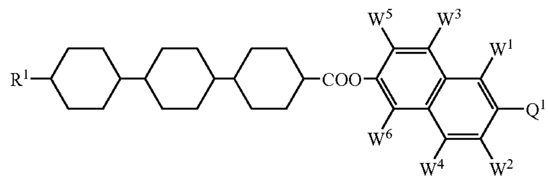
(I-13y)
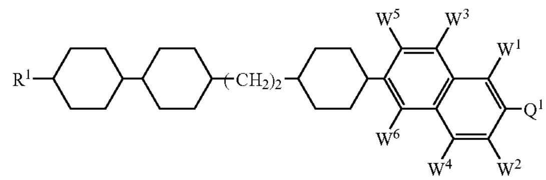
(I-13z)
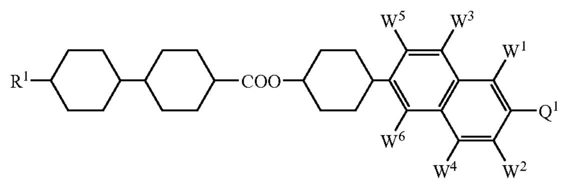
(I-13aa)
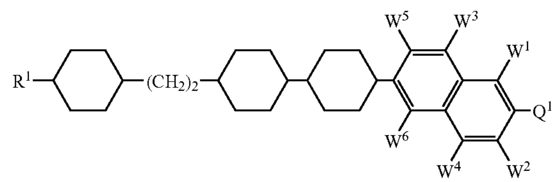
(I-13ab)
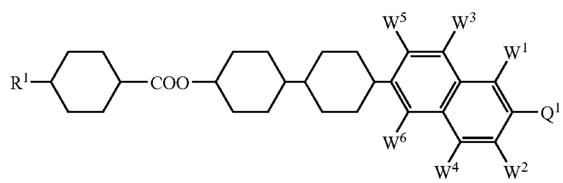
(I-21a)
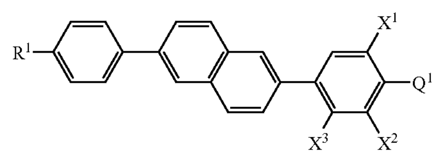
(I-21b)
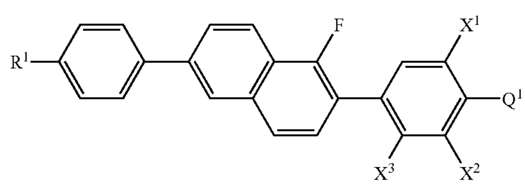
(I-21c)
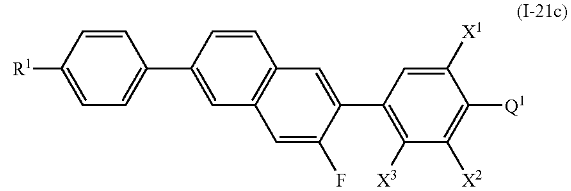
(I-21d)
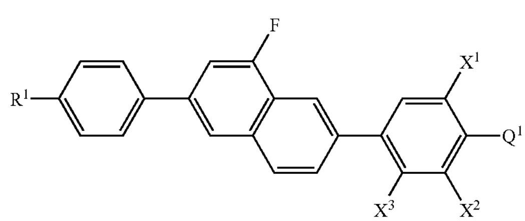
(I-21e)
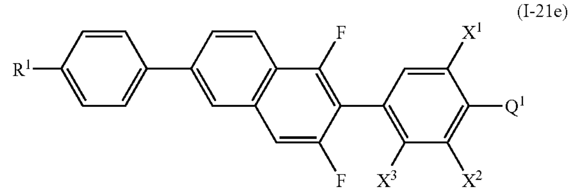
(21f)
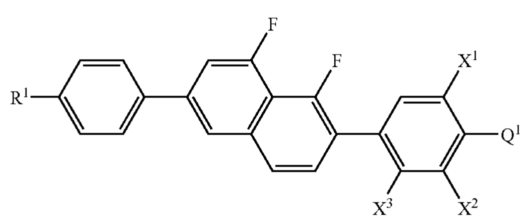
(I-21g)
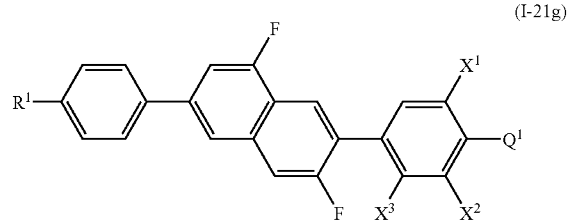
(I-21h)
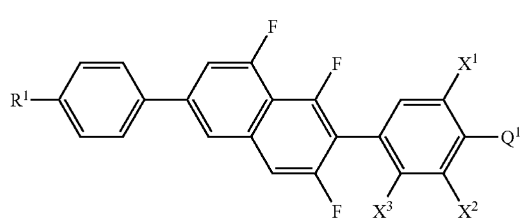
(I-21i)
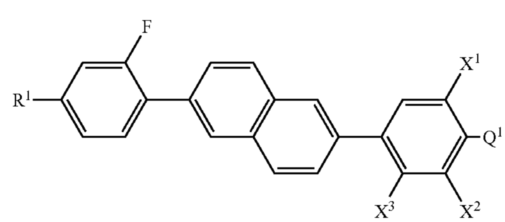

-continued
(I-21j)
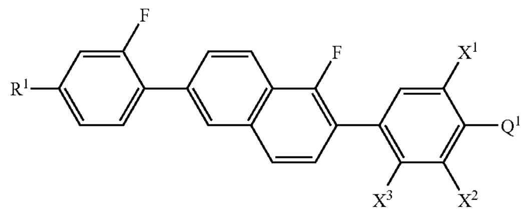
(I-21k)
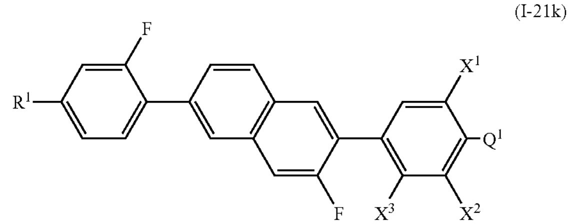
(I-21l)
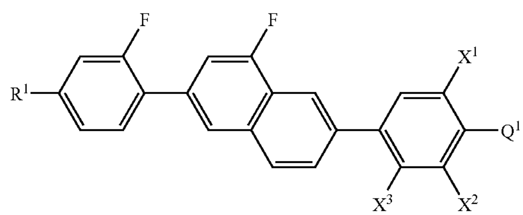
(I-21m)
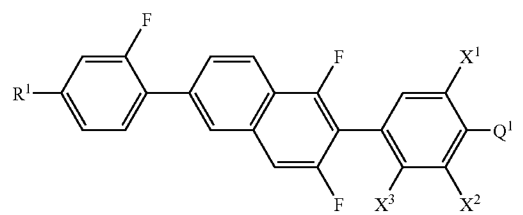
(I-21n)
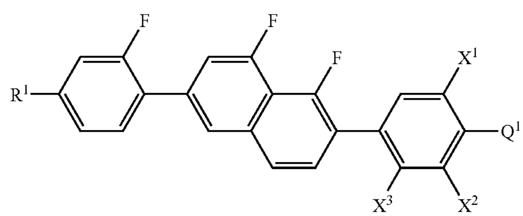
(I-21o)
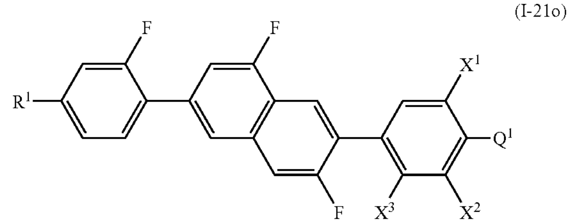
(I-21p)
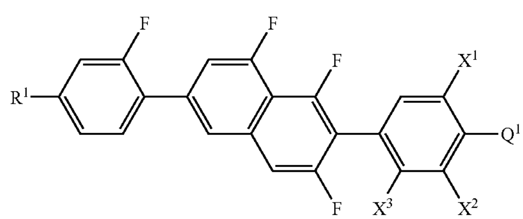
(I-21q)
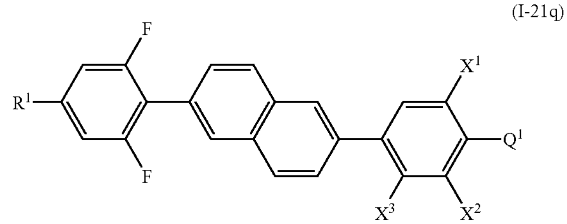
(I-21r)
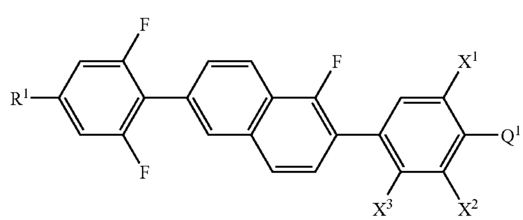
(I-21s)
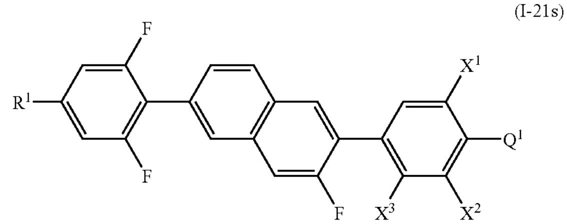
(I-21t)
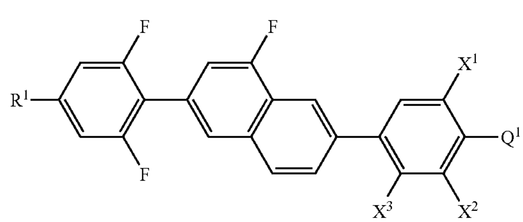
(I-21u)
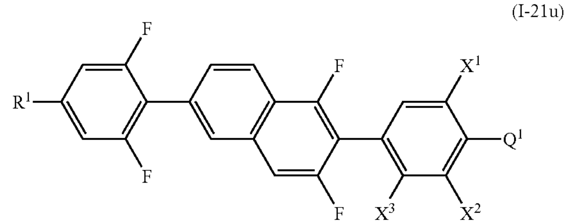
(I-21v)
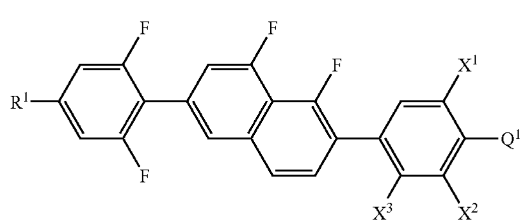
(I-21w)
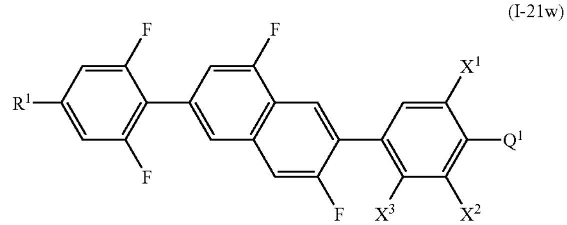

-continued
(I-21x)
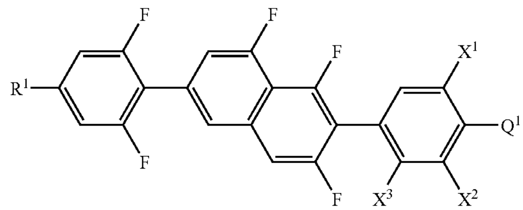
(I-21y)
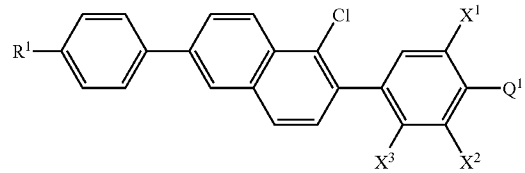
(I-21z)
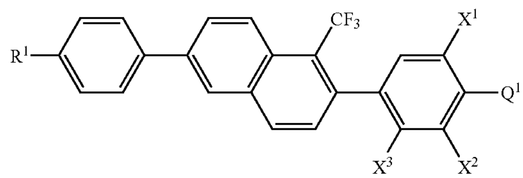
(I-21aa)
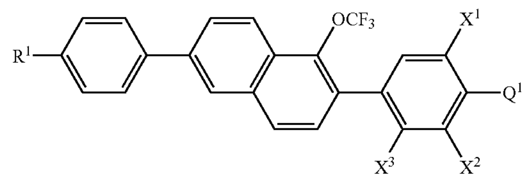
(I-21ab)
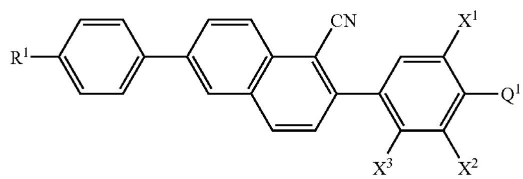
(I-21ac)
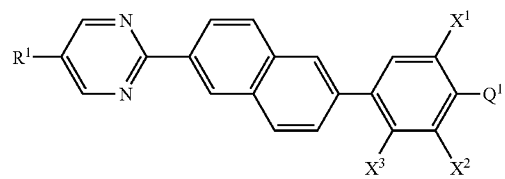
(I-21ad)
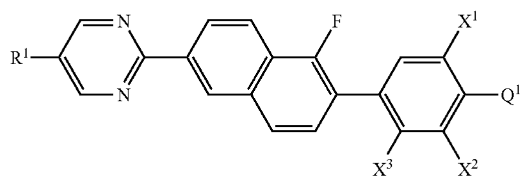
(I-21ae)
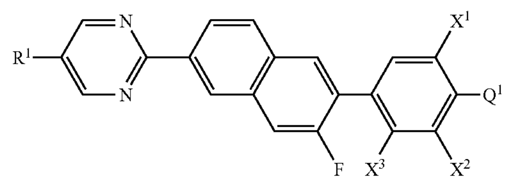
(I-21af)
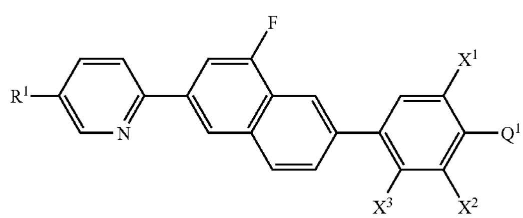
(I-21ag)
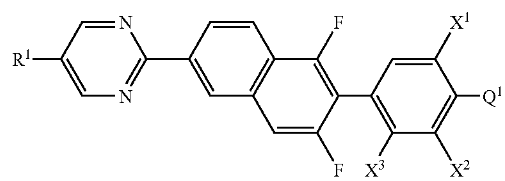
(I-21ah)
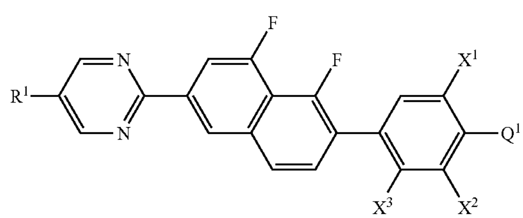
(I-21ai)
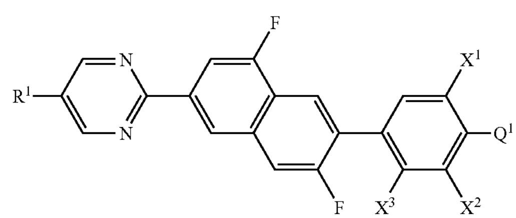
(I-21aj)
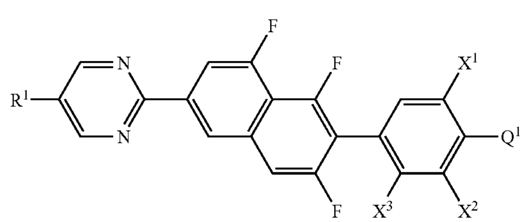
(I-21ak)
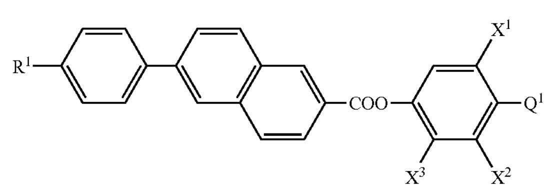

-continued
(I-21al)
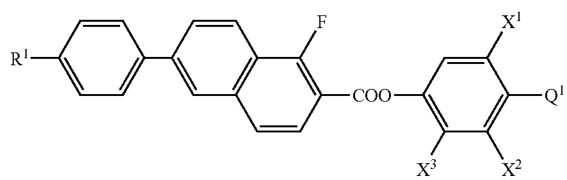
(I-21am)
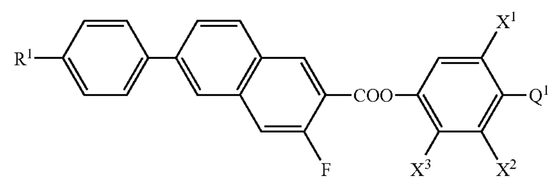
(I-21an)
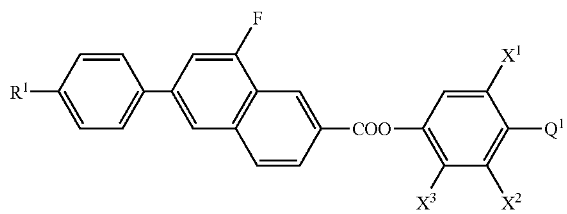
(I-21ao)
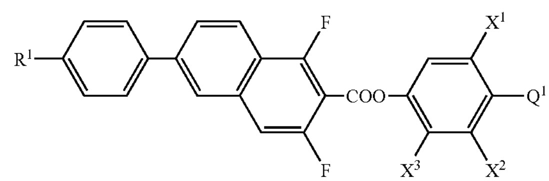
(I-21ap)
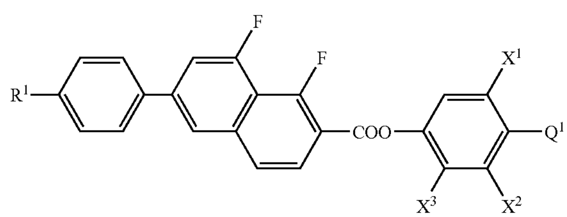
(I-21aq)
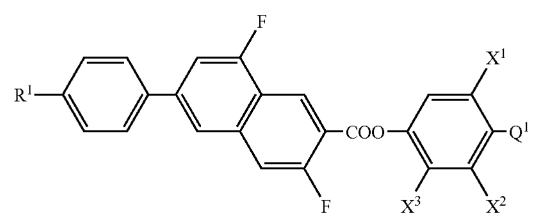
(I-21ar)
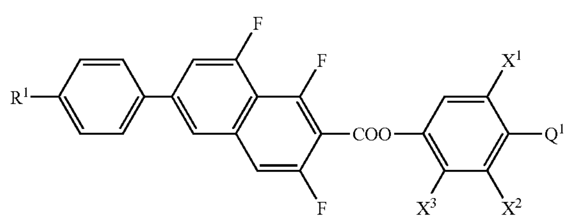
(I-21as)
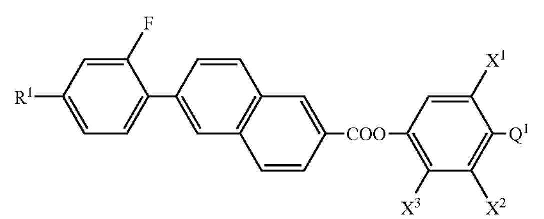
(I-21at)
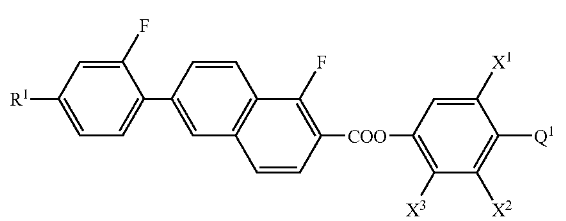
(I-21au)
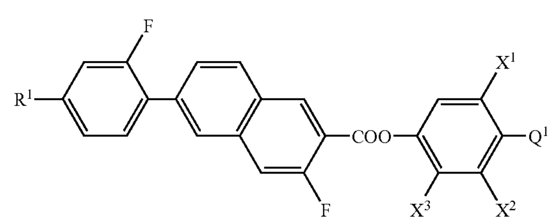
(I-21av)
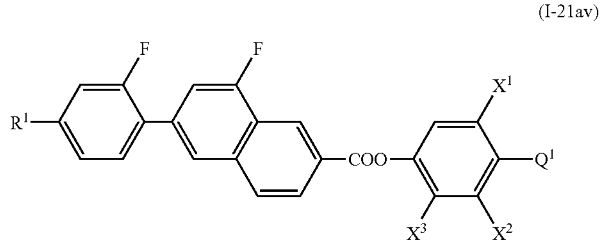
(I-21aw)
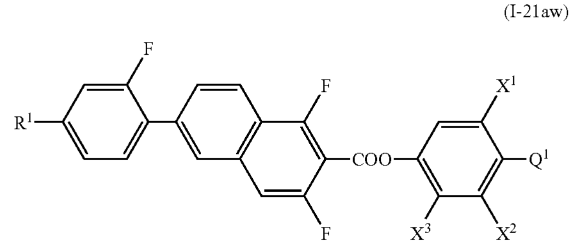
(I-21ax)
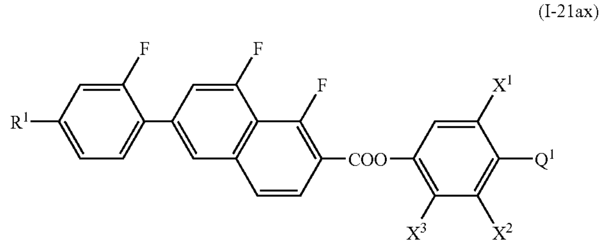
(I-21ay)
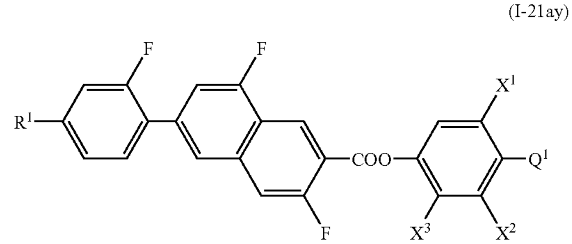

-continued
(I-21az)
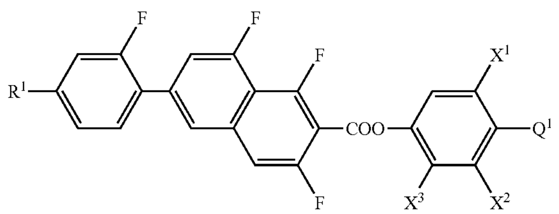
(I-21ba)
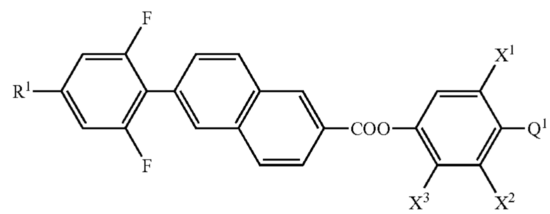
(I-21bb)
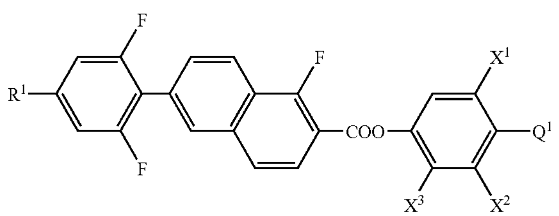
(I-21bc)
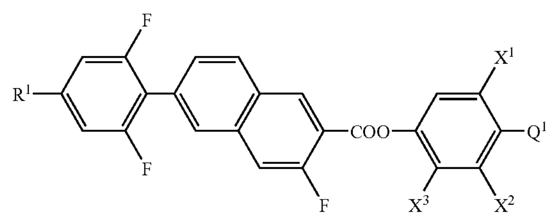
(I-21bd)
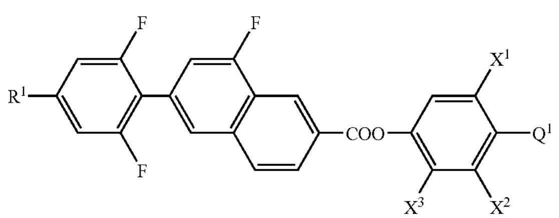
(I-21be)
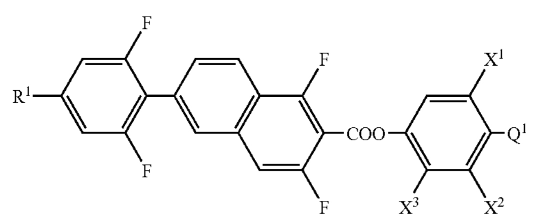
(I-21bf)
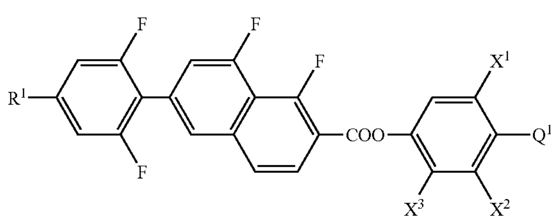
(I-21bg)
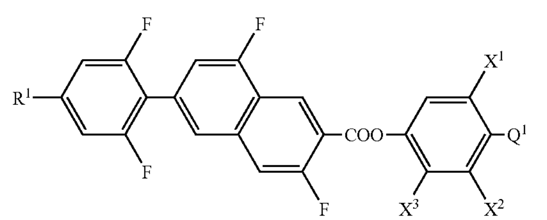
(I-21bh)
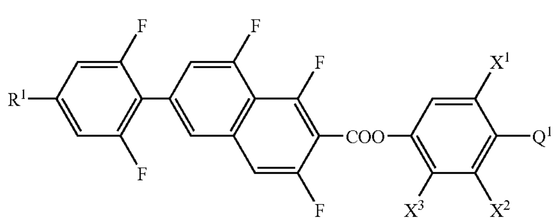
(I-21bi)
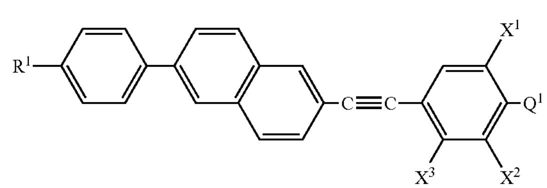
(I-21bj)
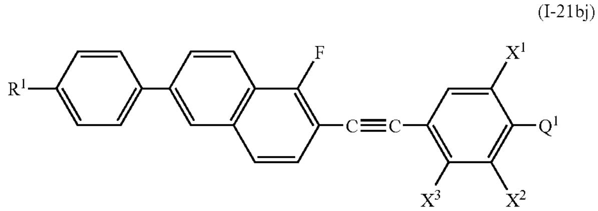
(I-21bk)
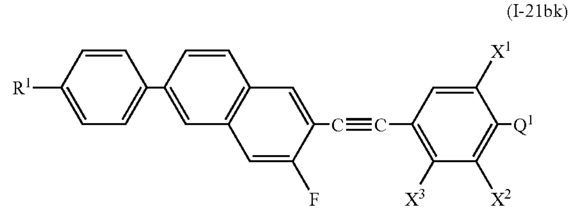
(I-21bl)
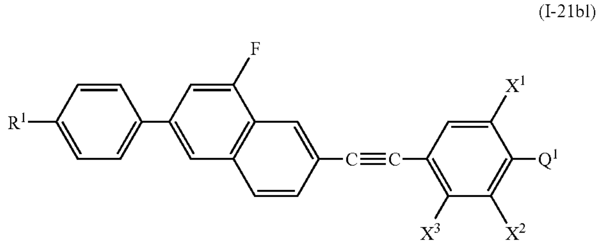
(I-21bm)
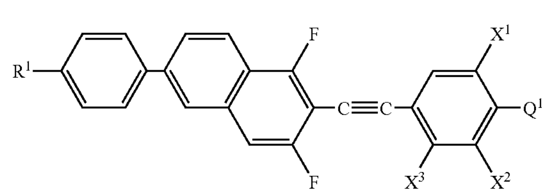

-continued
(I-21bn)
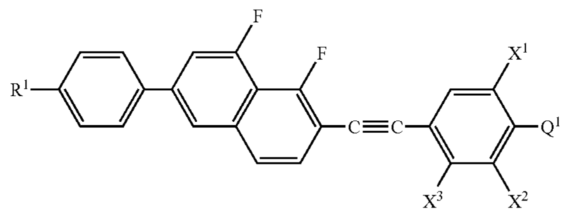
(I-21bo)
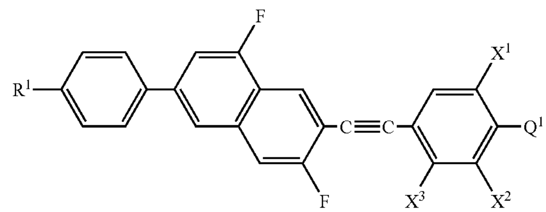
(I-21bp)
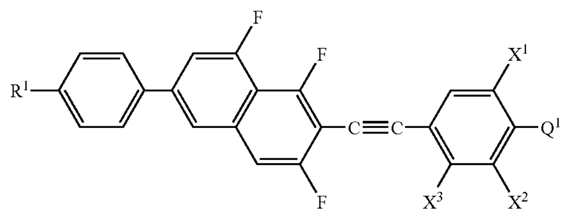
(I-21bq)
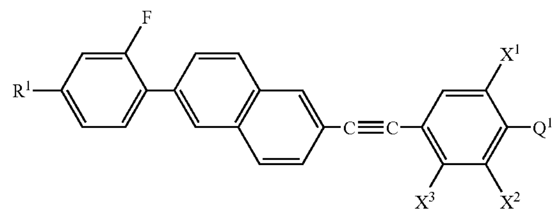
(I-21br)
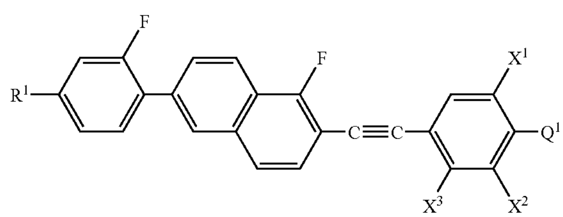
(I-21bs)
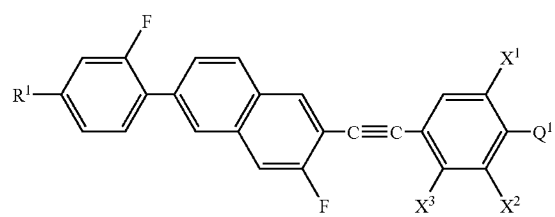
(I-21bt)
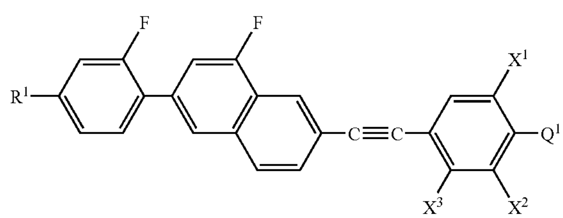
(I-21bu)
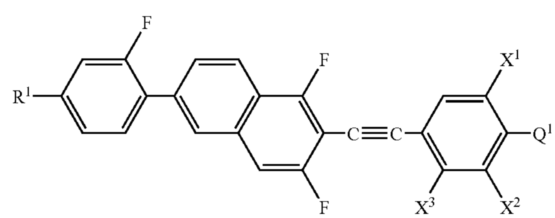
(I-21bv)
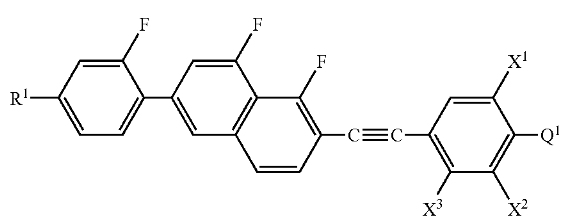
(I-21bw)
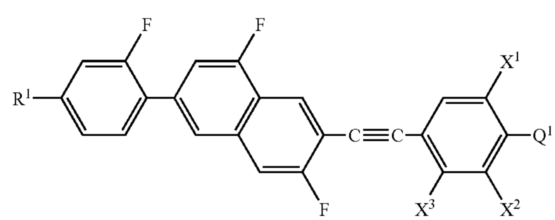
(I-21bx)
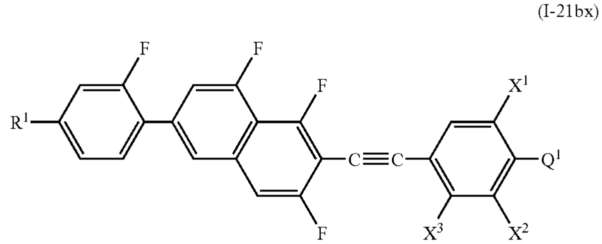
(I-21by)
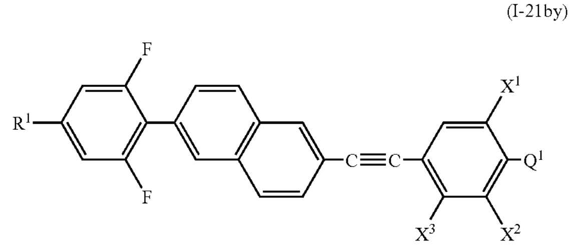

-continued
(I-21bz)
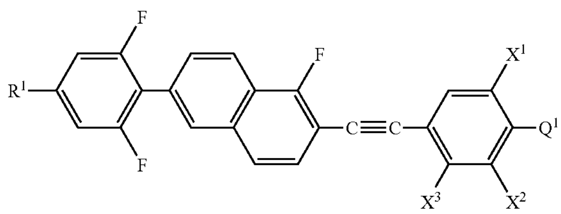
(I-21ca)
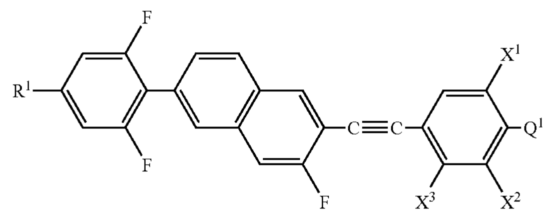
(I-21cb)
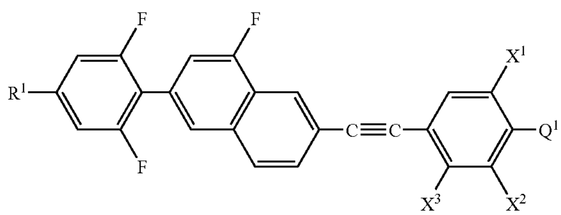
(I-21cc)
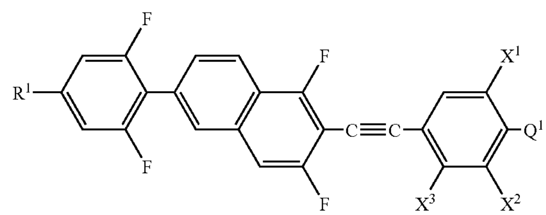
(I-21cd)
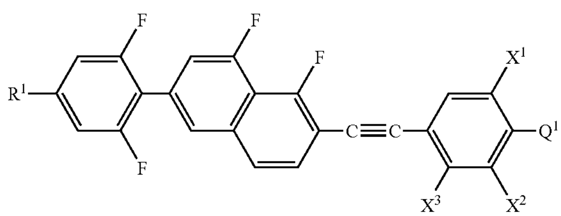
(I-21ce)
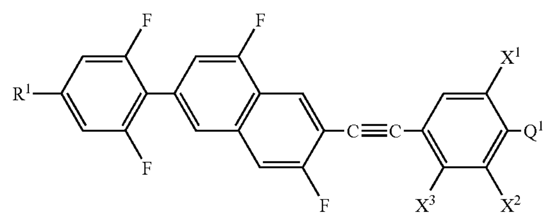
(I-21cf)
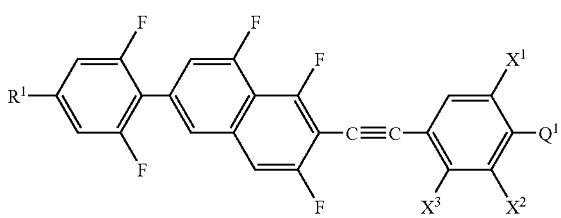
(I-21cg)
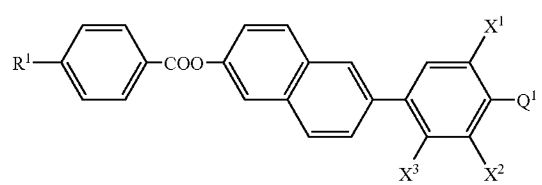
(I-21ch)
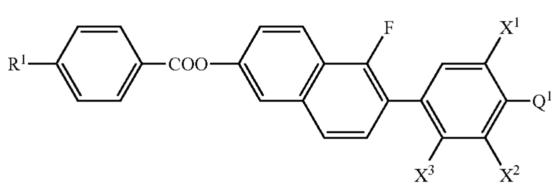
(I-21ci)
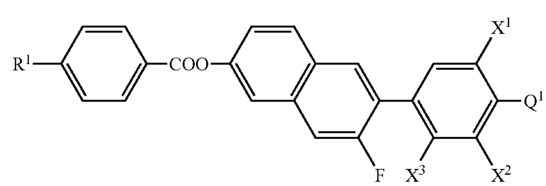
(I-21cj)
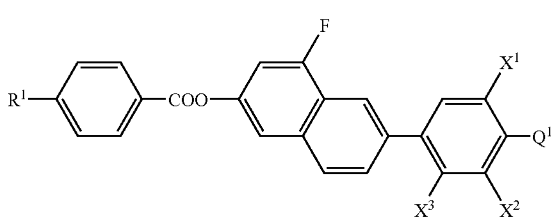
(I-21ck)
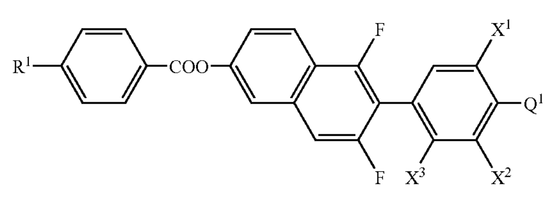
(I-21cl)
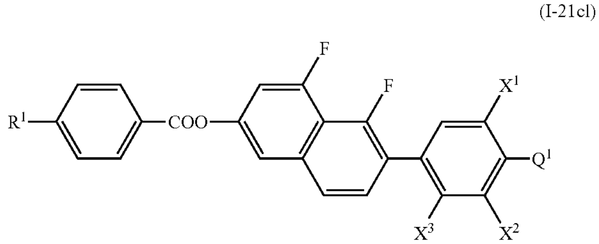
(I-21cm)
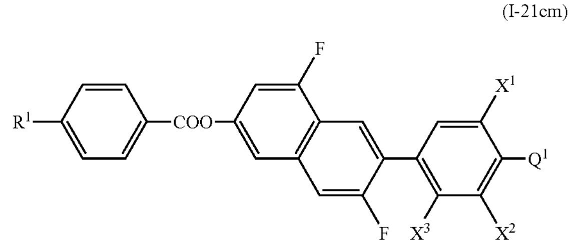

-continued
(I-21cn)
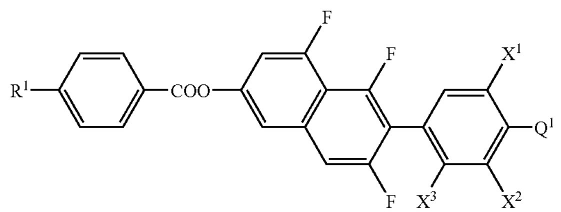
(I-21co)
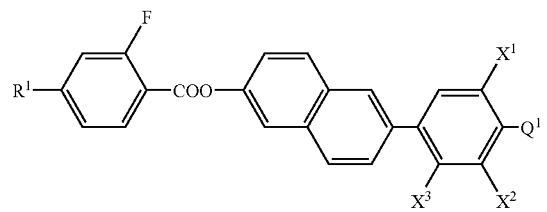
(I-21cp)
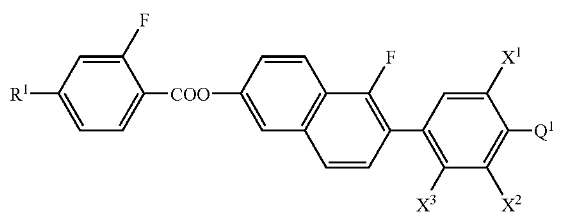
(I-21cq)
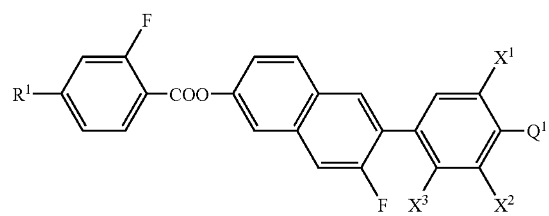
(I-21cr)
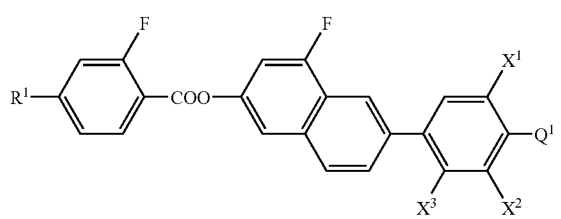
(I-21cs)
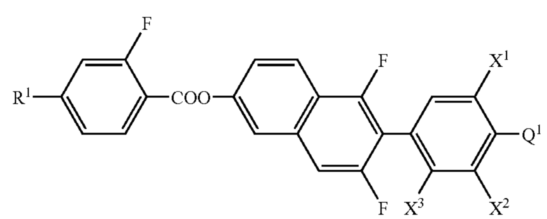
(I-21ct)
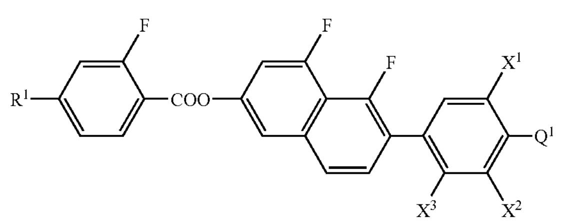
(I-21cu)
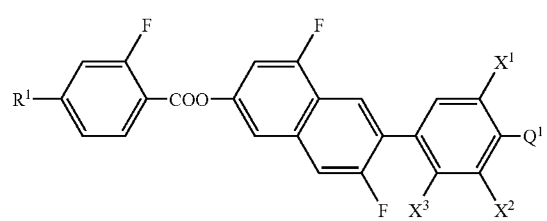
(I-21cv)
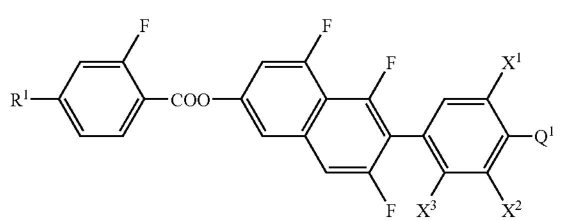
(I-21cw)
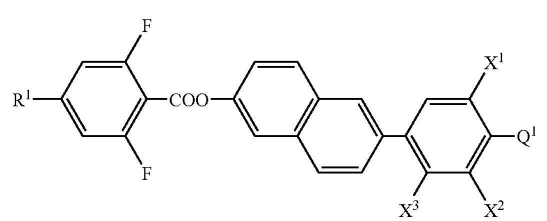
(I-21cx)
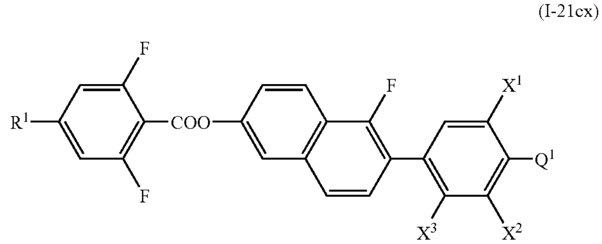
(I-21cy)
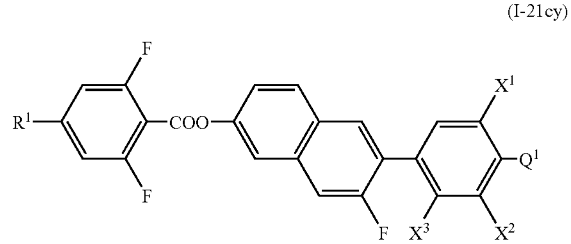

-continued
(I-21cz)
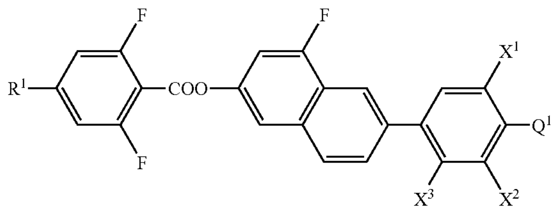
(I-21da)
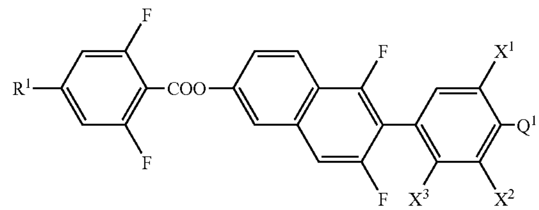
(I-21db)
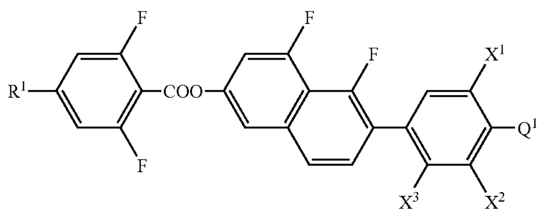
(I-21dc)
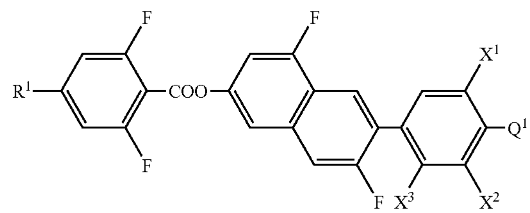
(I-21dd)
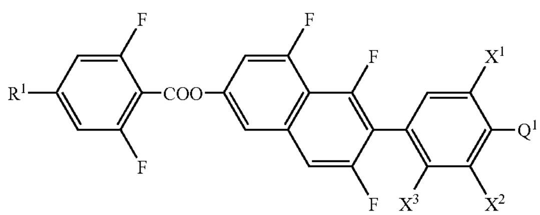
(I-21de)
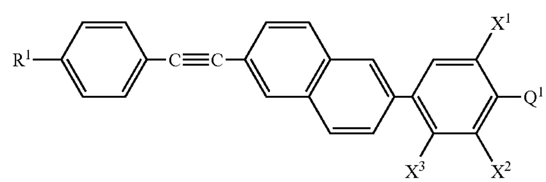
(I-21df)
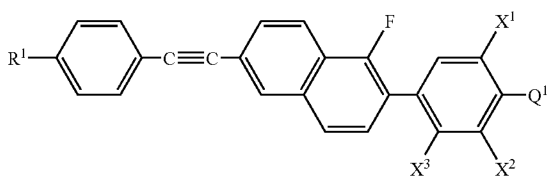
(I-21dg)
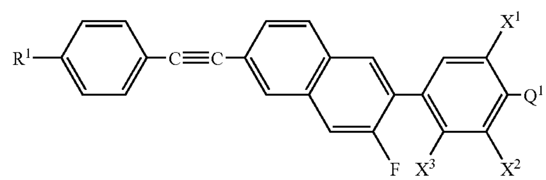
(I-21dh)
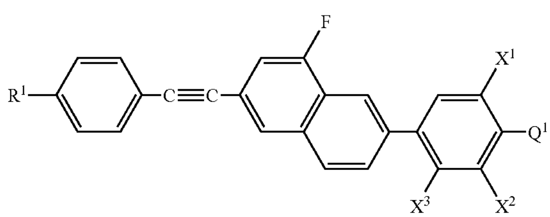
(I-21di)
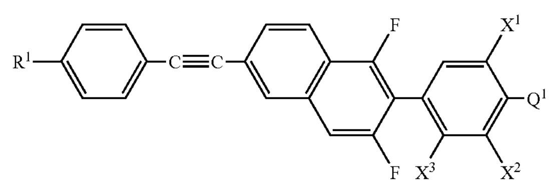
(I-21dj)
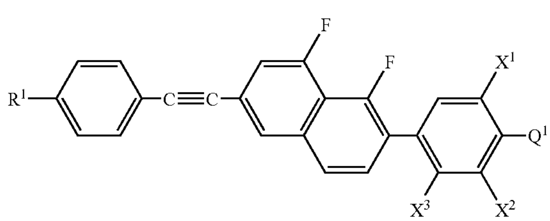
(I-21dk)
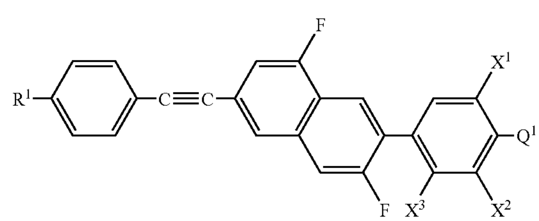
(I-21dl)
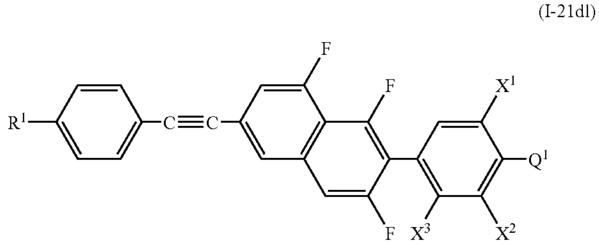
(I-21dm)
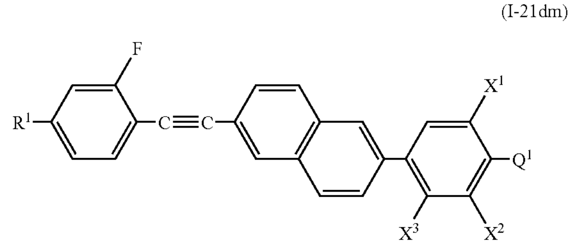

-continued
(I-21dn)
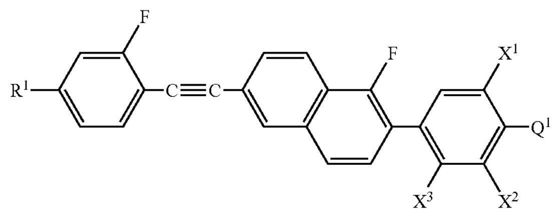
(I-21do)
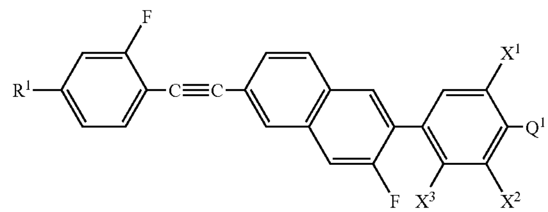
(I-21dp)
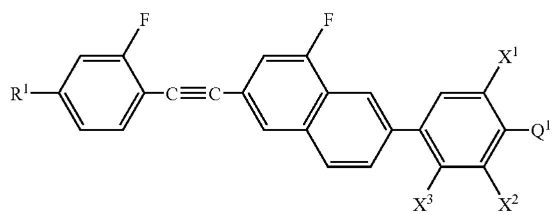
(I-21dq)
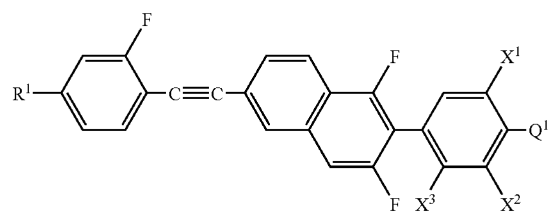
(I-21dr)
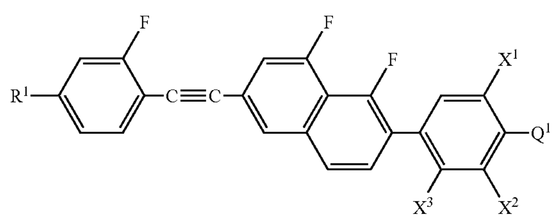
(I-21ds)
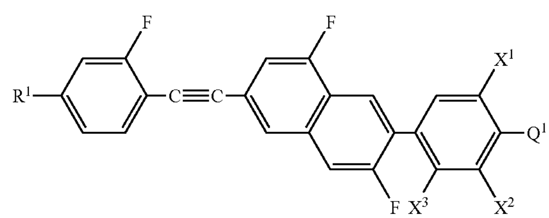
(I-21dt)
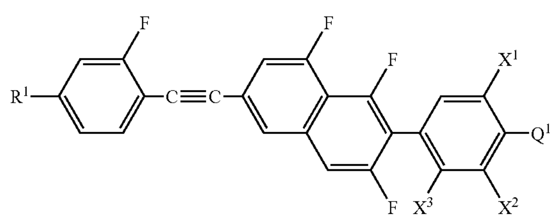
(I-21du)
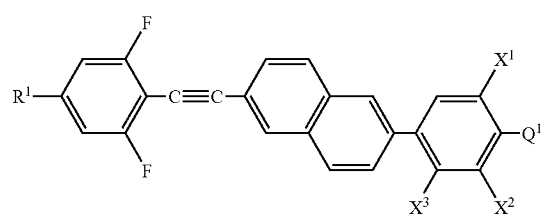
(I-21dv)
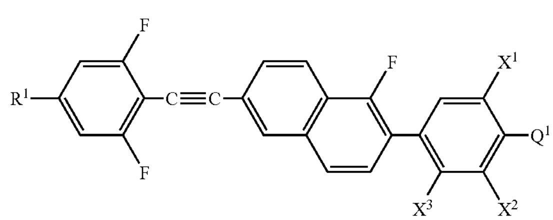
(I-21dw)
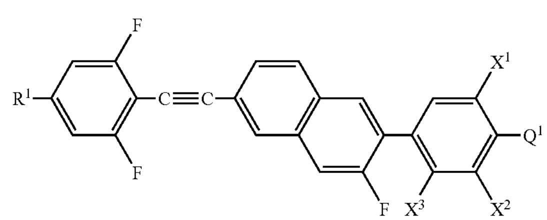
(I-21dx)
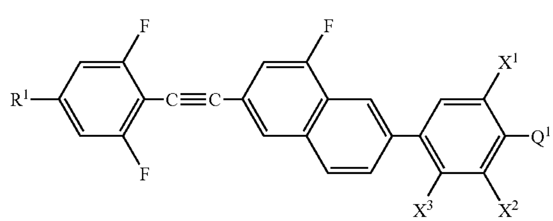
(I-21dy)
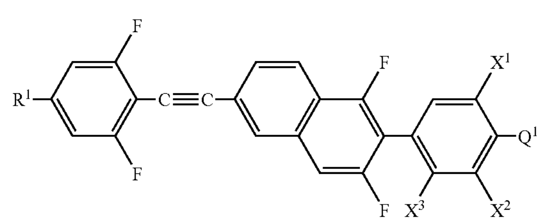

-continued
(I-21dz)
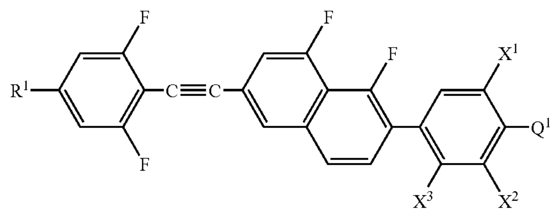
(I-21ea)
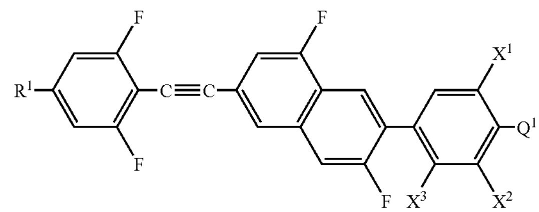
(I-21eb)
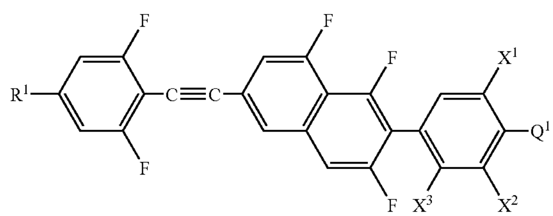
(I-21ec)
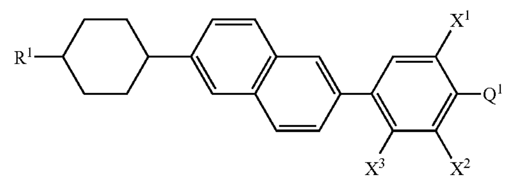
(I-21ed)
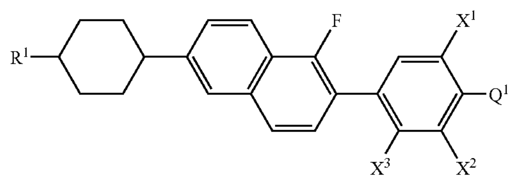
(I-21ee)
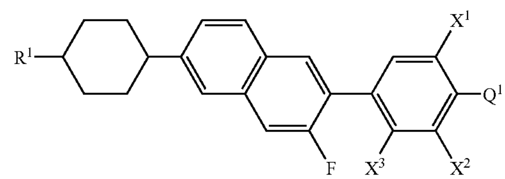
(I-21ef)
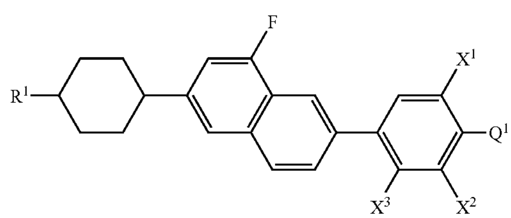
(I-21eg)
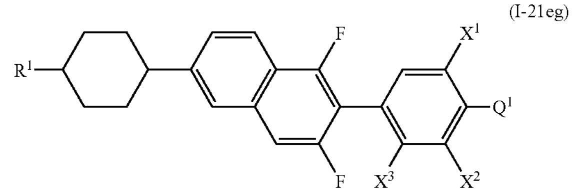
(I-21eh)
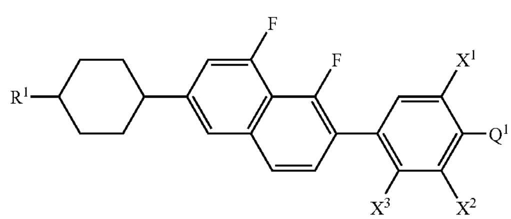
(I-21ei)
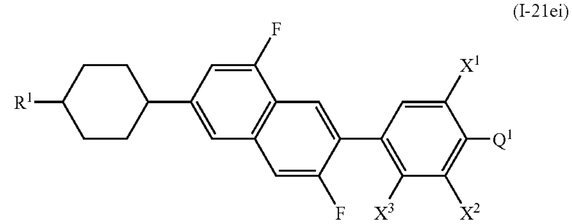
(I-21ej)
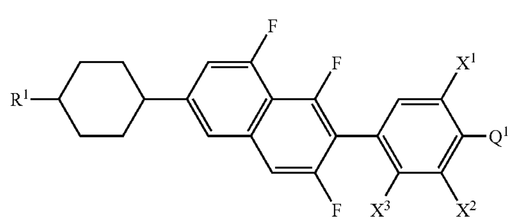
(I-21ek)
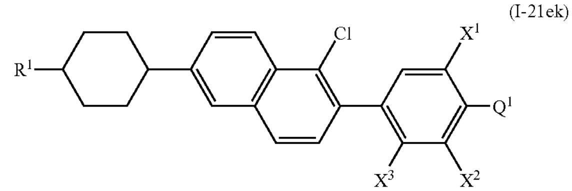
(I-21el)
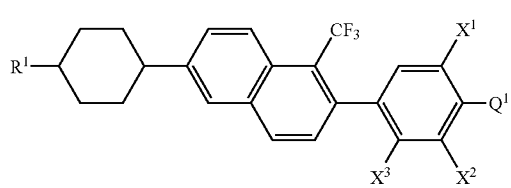
(I-21em)
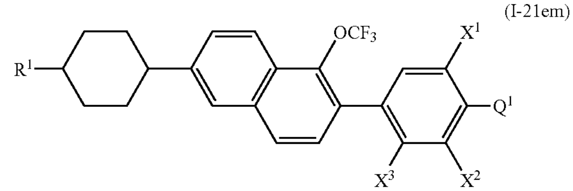

-continued
(I-21en)
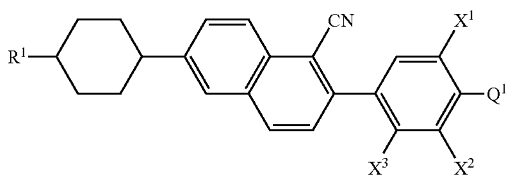
(I-21eo)
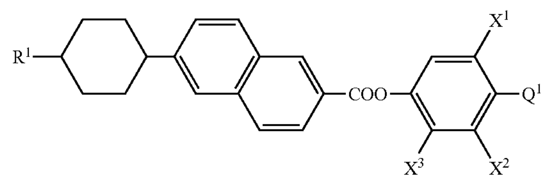
(I-21ep)
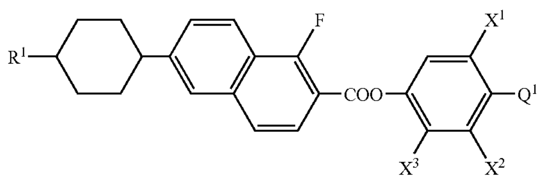
(I-21eq)
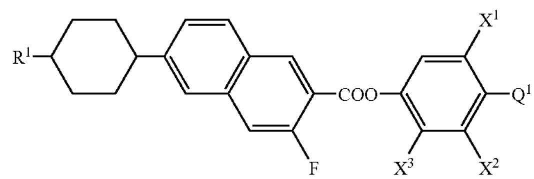
(I-21er)
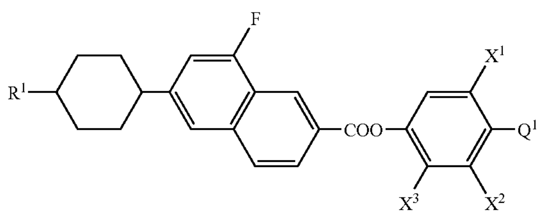
(I-21es)
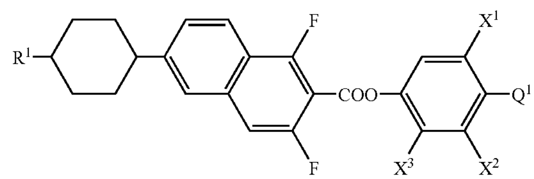
(I-21et)
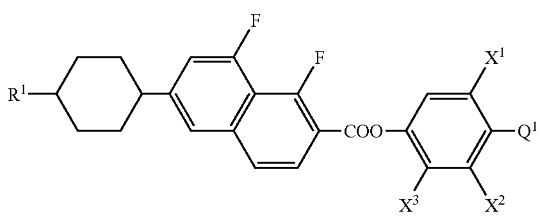
(I-21eu)
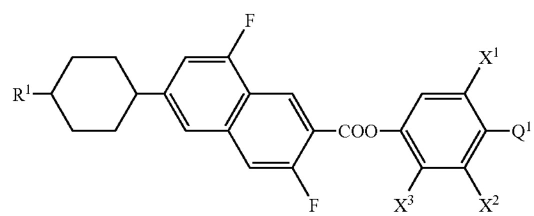
(I-21ev)
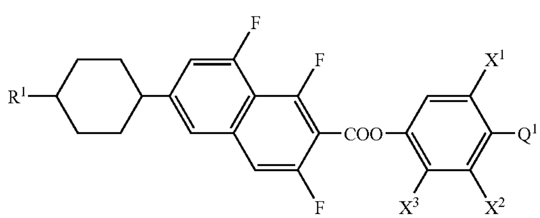
(I-21ew)
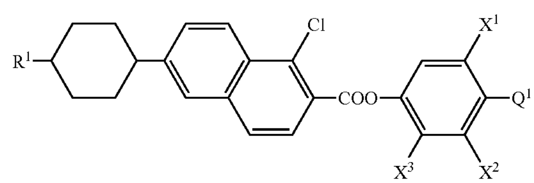
(I-21ex)
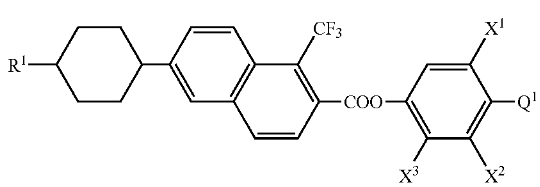
(I-21ey)
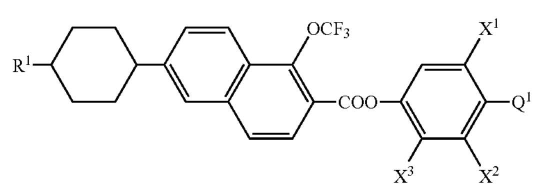
(I-21ez)
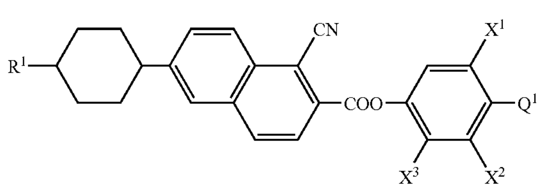
(I-21fa)
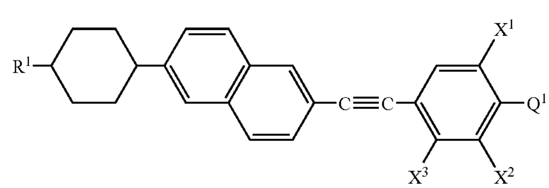

-continued
(I-21fb)
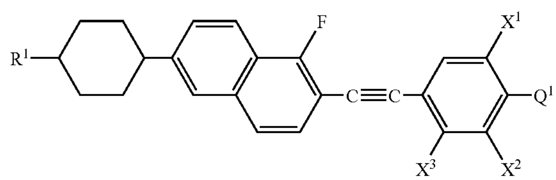
(I-21fc)
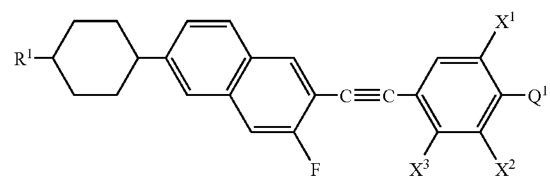
(I-21fd)
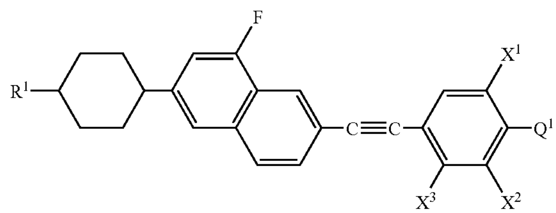
(I-21fe)
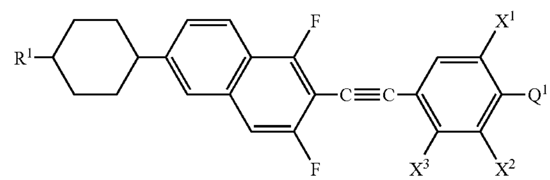
(I-21ff)
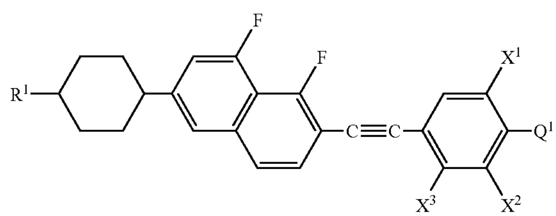
(I-21fg)
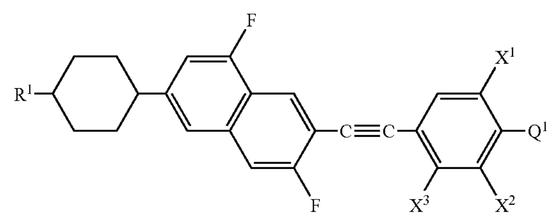
(I-21fh)
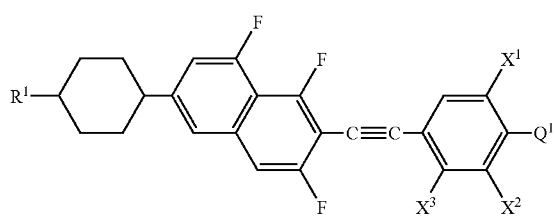
(I-21fi)
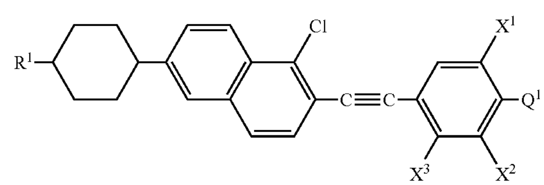
(I-21fj)
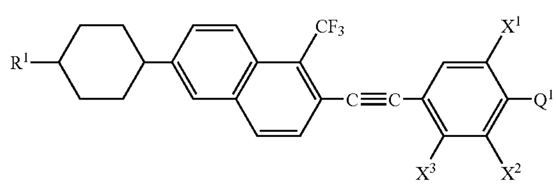
(I-21fk)
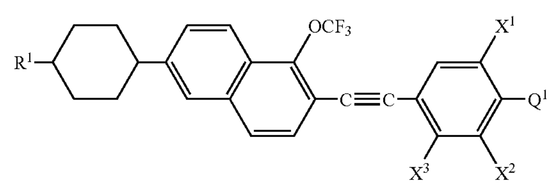
(I-21fl)
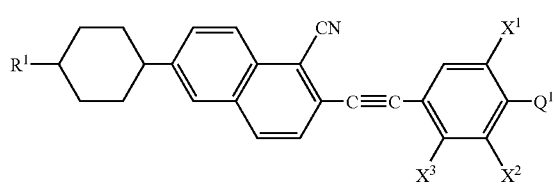
(I-21fm)
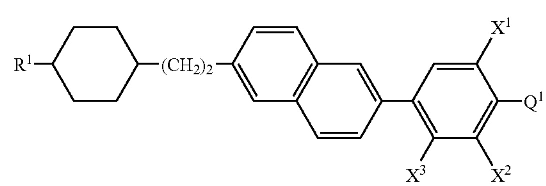
(I-21fn)
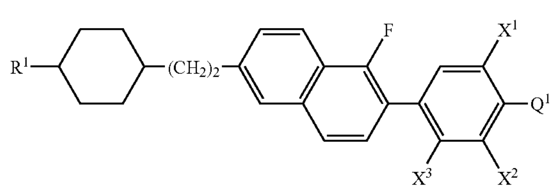
(I-21fo)
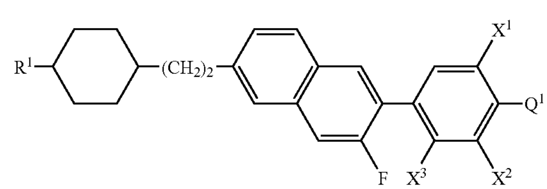

-continued
(I-21fp)
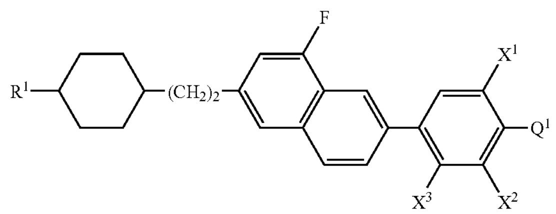
(I-21fq)
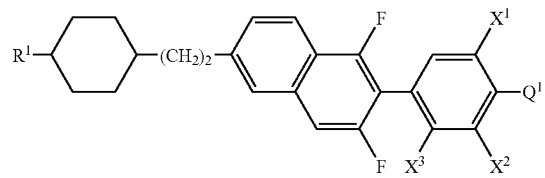
(I-21fr)
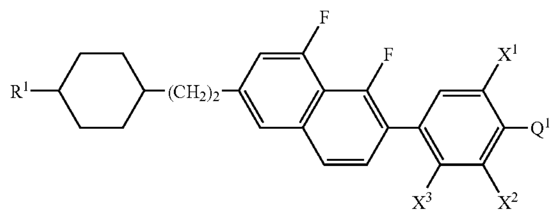
(I-21fs)
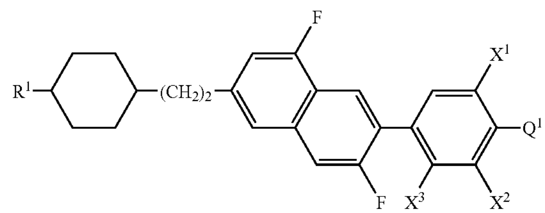
(I-21ft)
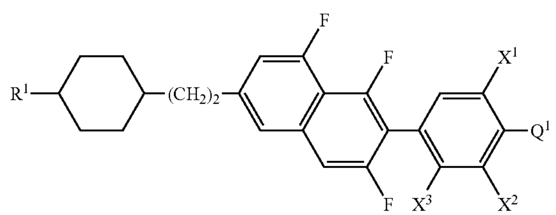
(I-21fu)
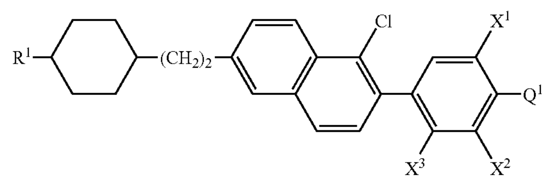
(I-21fv)
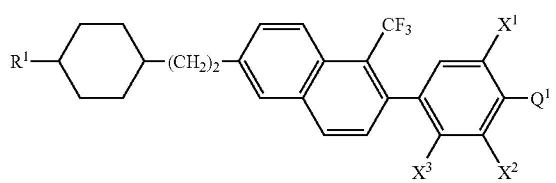
(I-21fw)
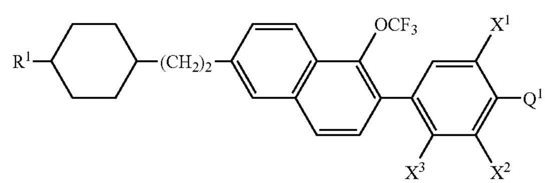
(I-21fx)
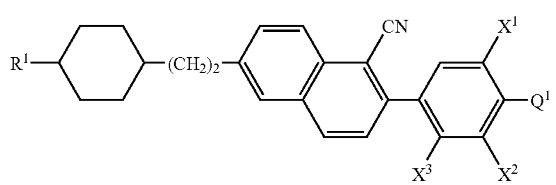
(I-21fy)
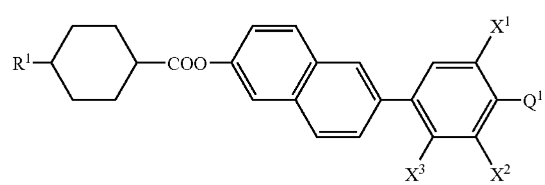
(I-21fz)
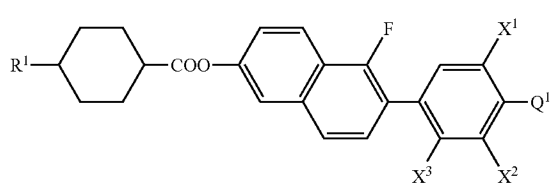
(I-21ga)
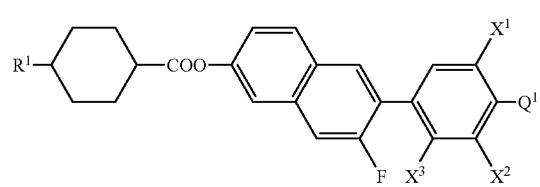
(I-21gb)
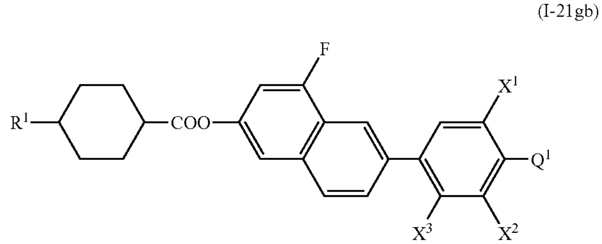
(I-21gc)
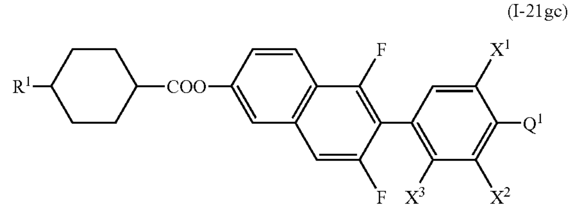

-continued
(I-21gd)
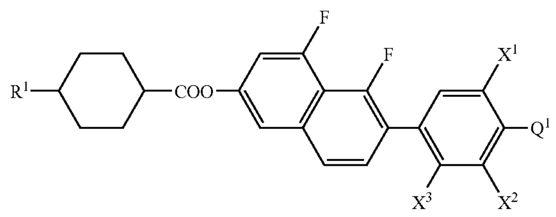
(I-21ge)
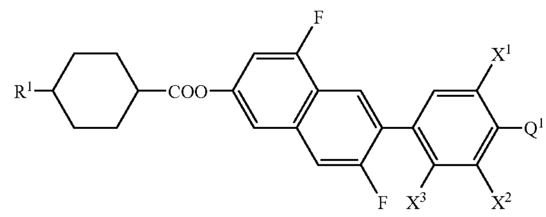
(I-21gf)
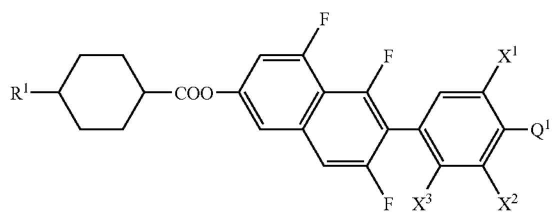
(I-21gg)
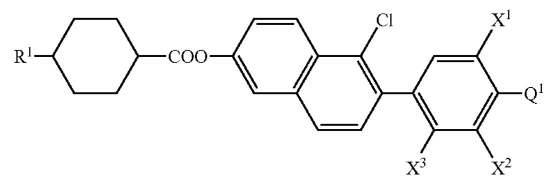
(I-21gh)
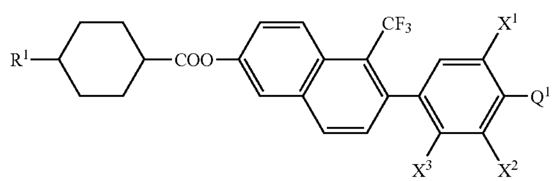
(I-21gi)
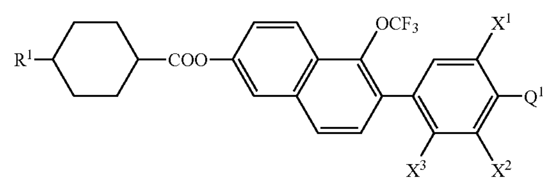
(I-21gj)
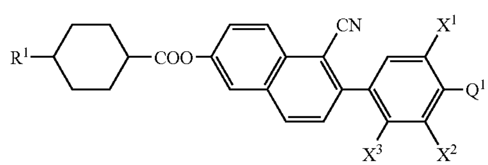
(I-21gk)
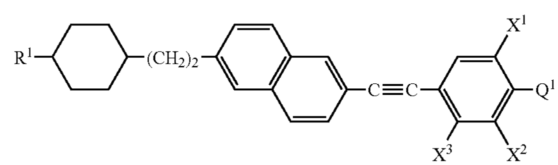
(I-21gl)
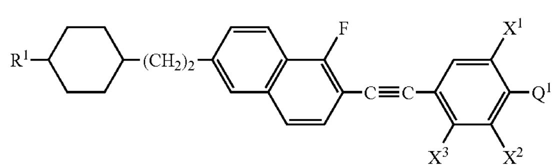
(I-21gm)
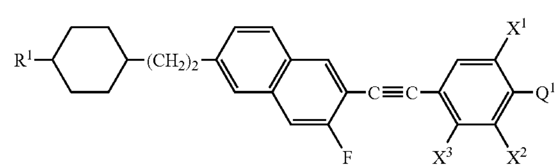
(I-21gn)
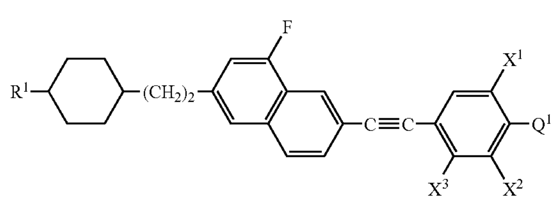
(I-21go)
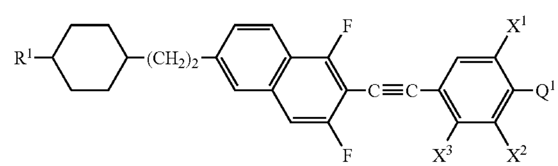
(I-21gp)
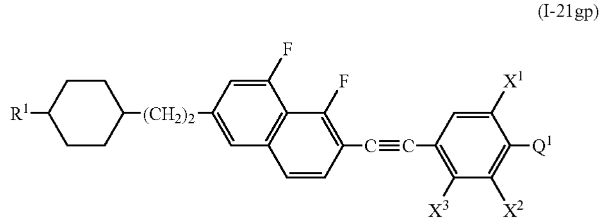
(I-21gq)
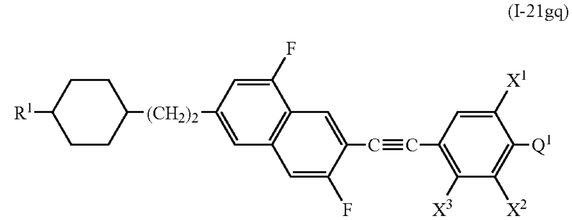

-continued
(I-21gr)
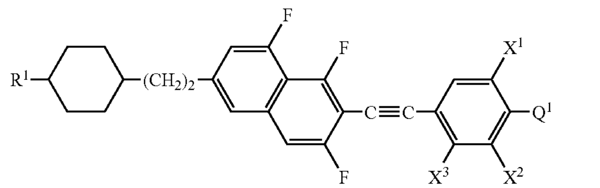
(I-21gs)
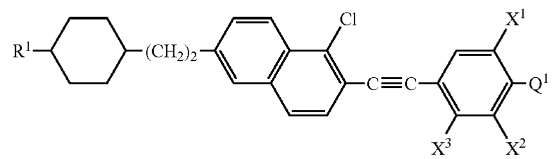
(I-21gt)
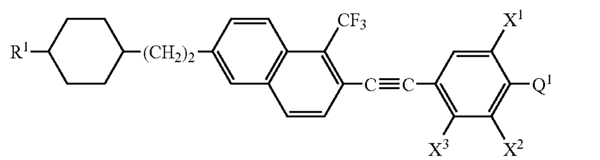
(I-21gu)
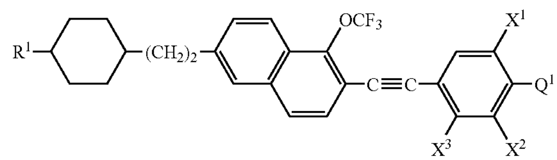
(I-21gv)
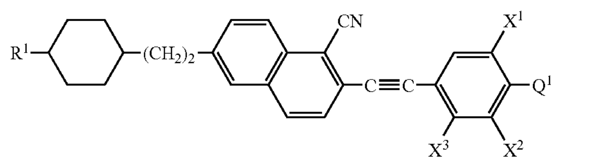
(I-22a)
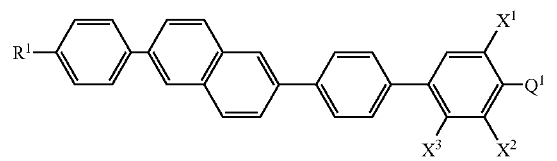
(I-22b)
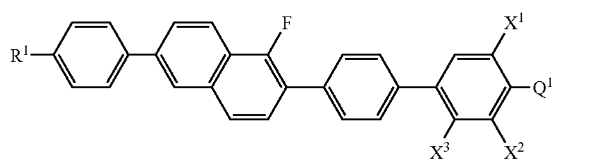
(I-22c)
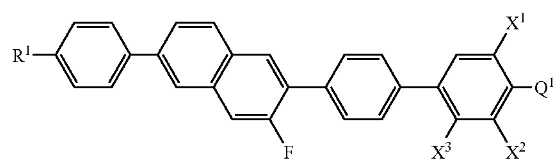
(I-22d)
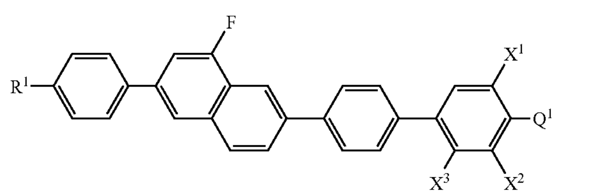
(I-22e)
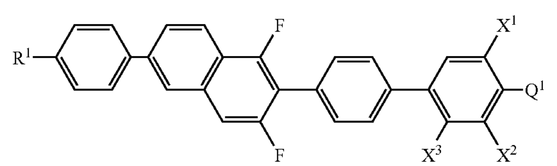
(I-22f)
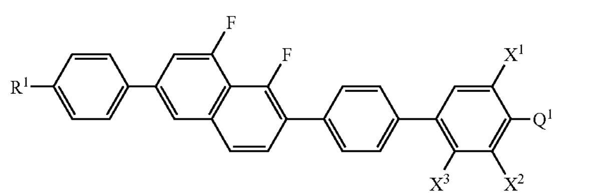
(I-22g)
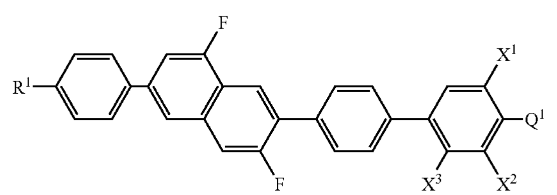
(I-22h)
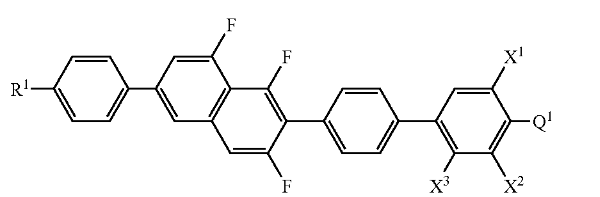
(I-22i)
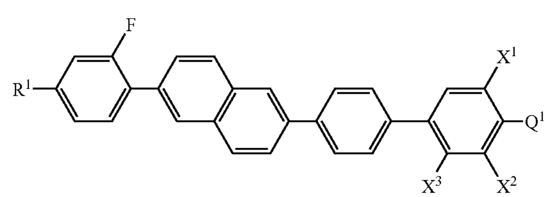
(I-22j)
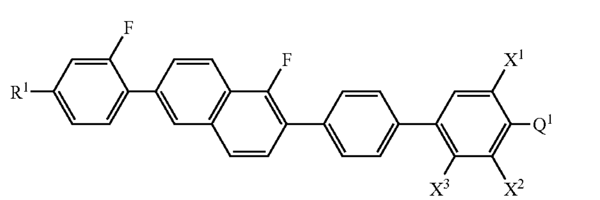
(I-22k)
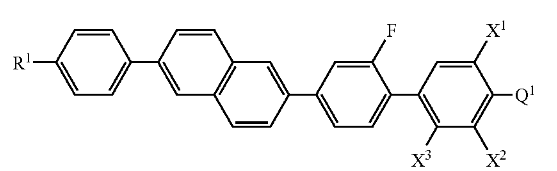

-continued
(I-22l)
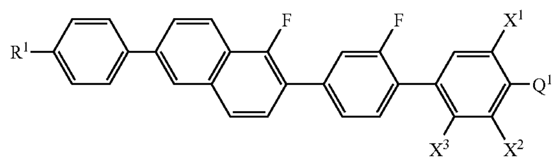
(I-22m)
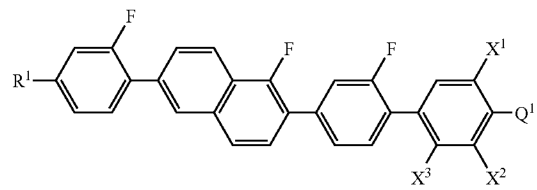
(I-22n)
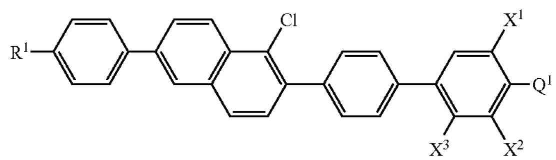
(I-22o)
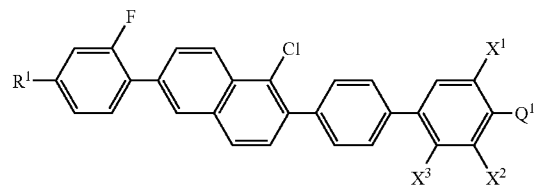
(I-22p)
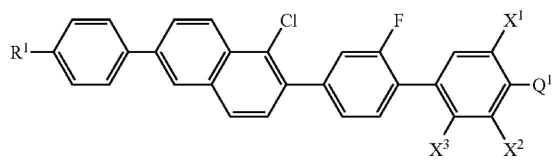
(I-22q)
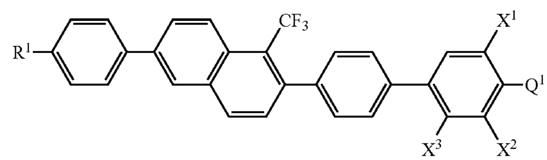
(I-22r)
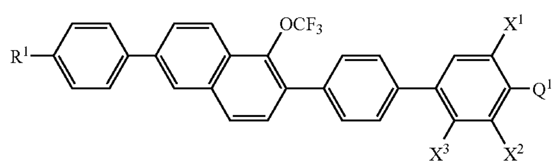
(I-22s)
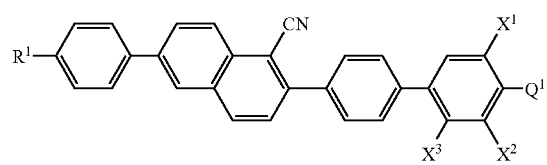
(I-22t)
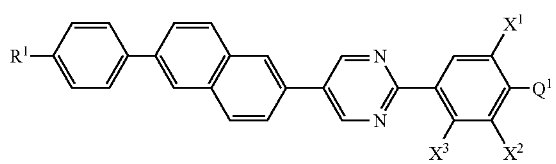
(I-22u)
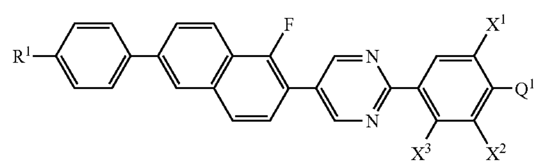
(I-22v)
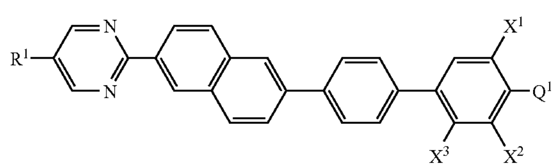
(I-22w)
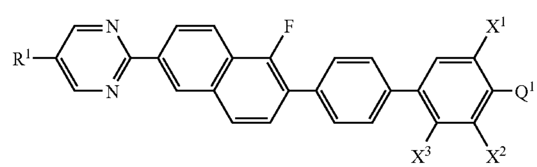
(I-22x)
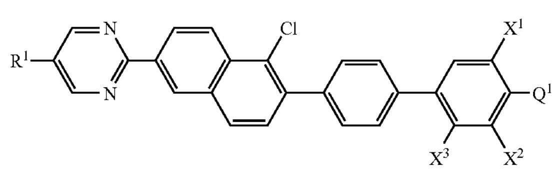
(I-22y)
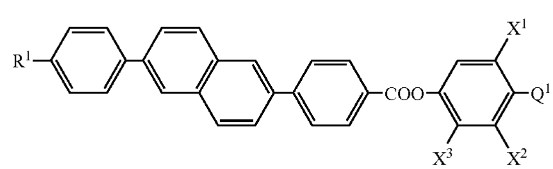
(I-22z)
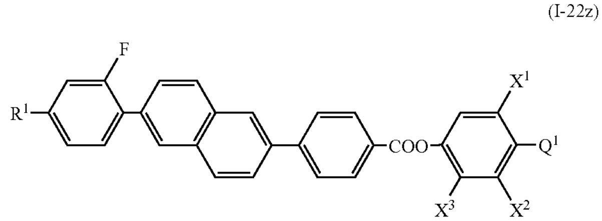
(I-22aa)
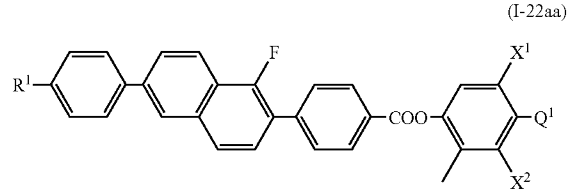

-continued
(I-22ab)
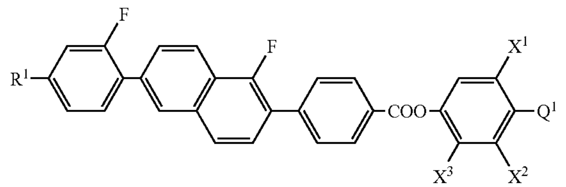
(I-22ac)
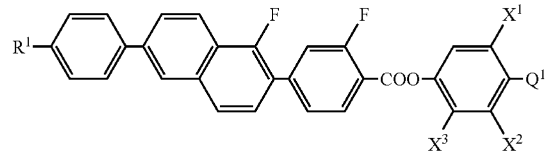
(I-22ad)
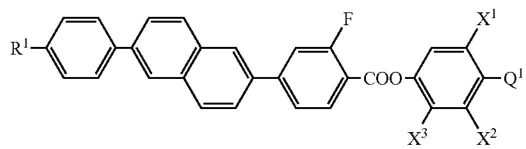
(I-22ae)
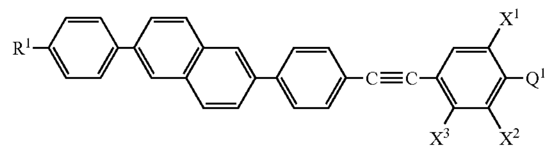
(I-22af)
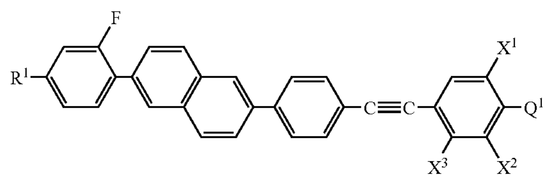
(I-22ag)
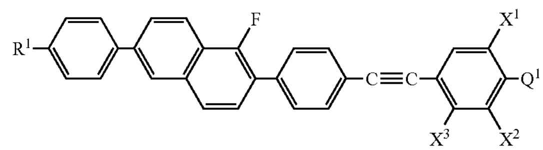
(I-22ah)
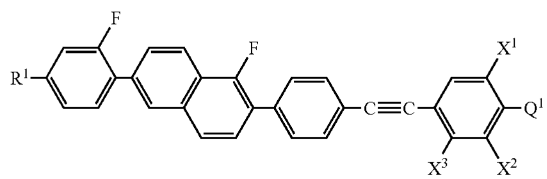
(I-22ai)
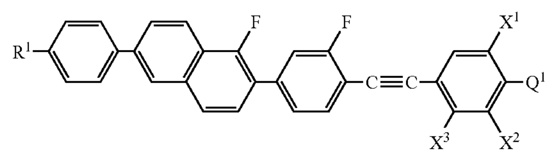
(I-22aj)
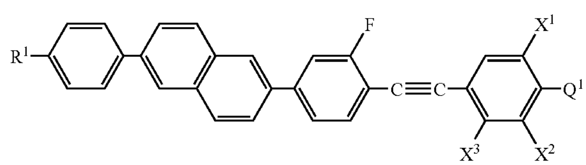
(I-22ak)
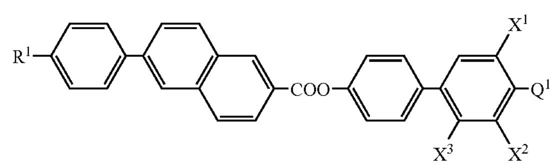
(I-22al)
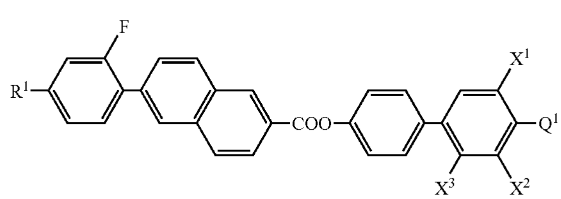
(I-22am)
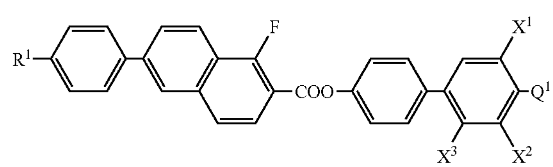
(I-22an)
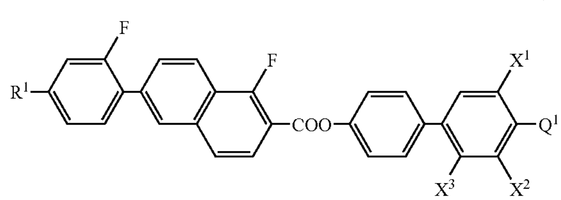
(I-22ao)
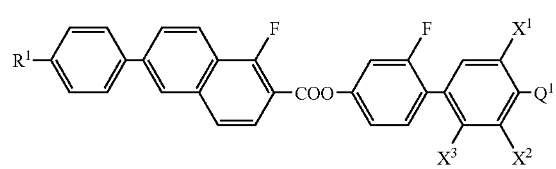
(I-22ap)
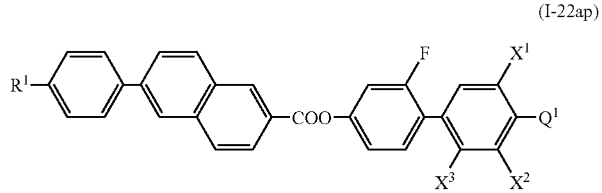
(I-22aq)
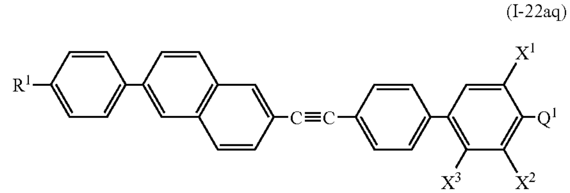

-continued
(I-22ar)
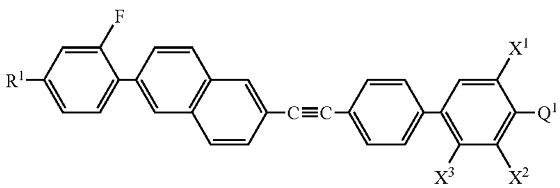
(I-22as)
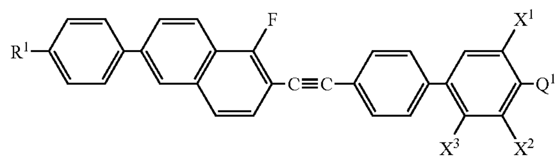
(I-22at)
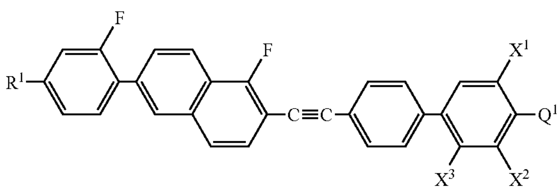
(I-22au)
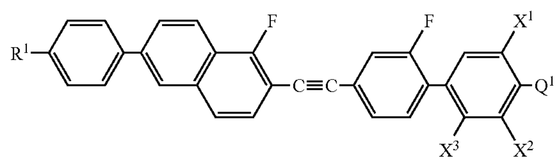
(I-22av)
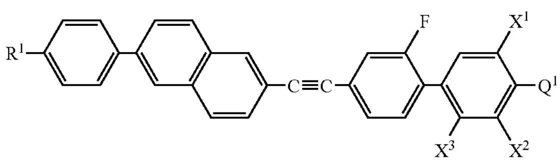
(I-22aw)
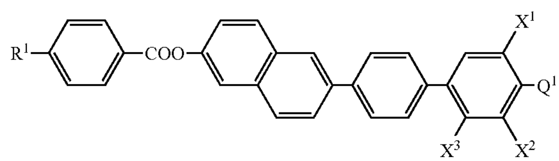
(I-22ax)
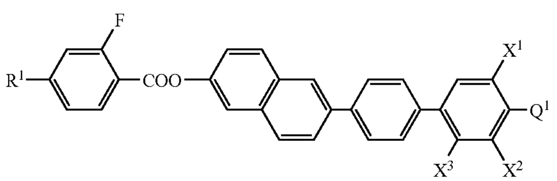
(I-22ay)
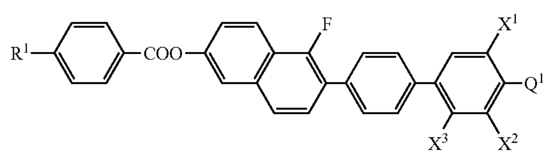
(I-22az)
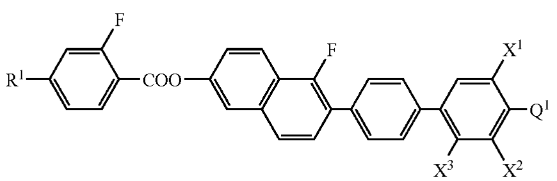
(I-22ba)
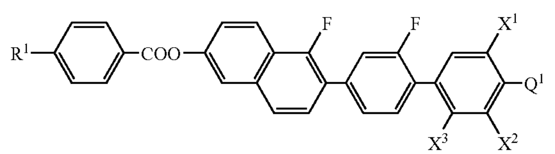
(I-22bb)
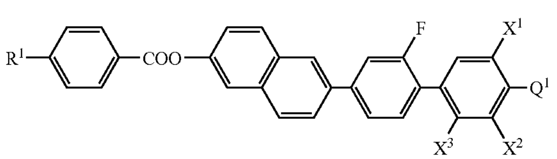
(I-22bc)
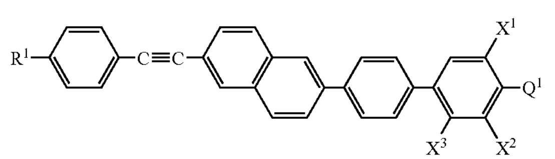
(I-22bd)
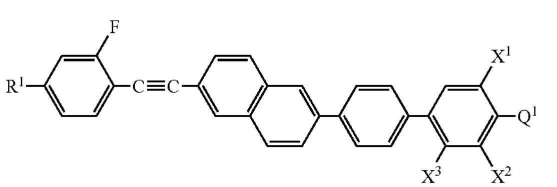
(I-22be)
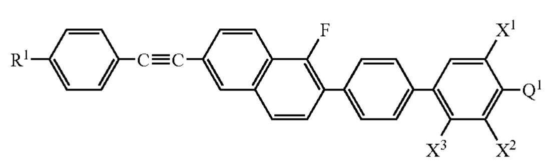
(I-22bf)
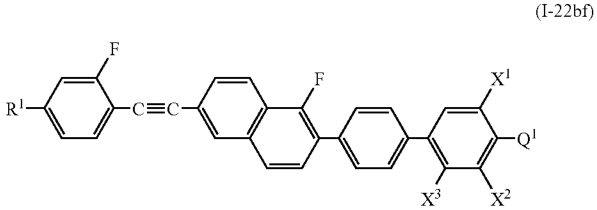
(I-22bg)
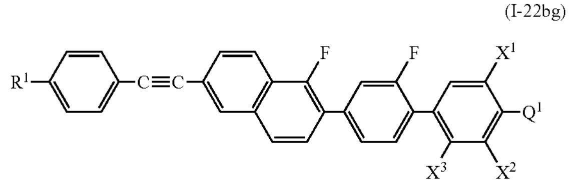

-continued
(I-22bh)
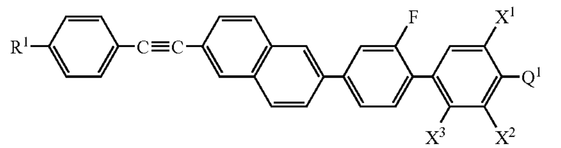
(I-22bi)
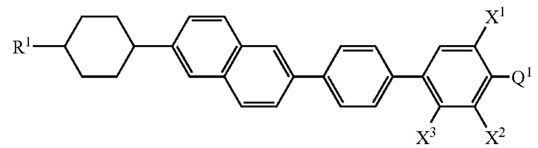
(I-22bj)
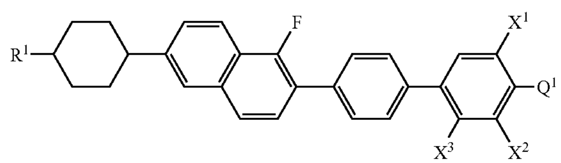
(I-22bk)
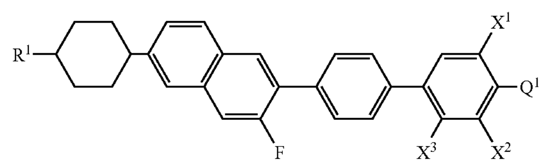
(I-22bl)
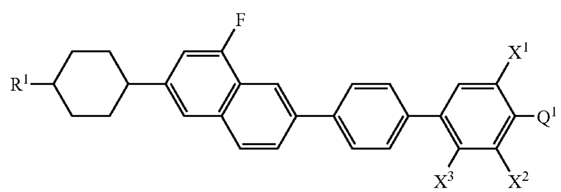
(I-22bm)
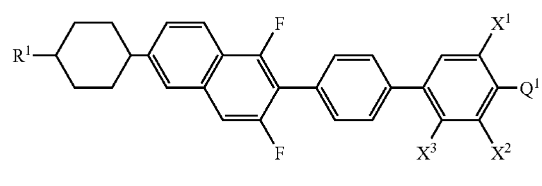
(I-22bn)
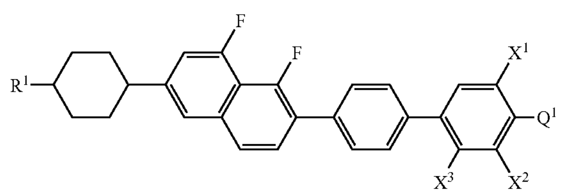
(I-22bo)
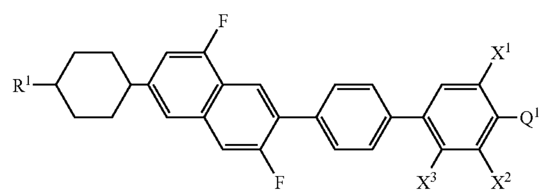
(I-22bp)
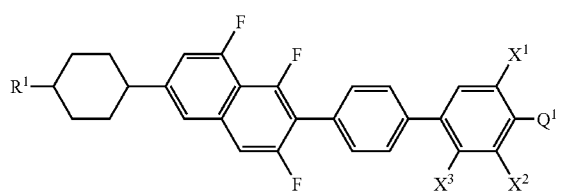
(I-22bq)
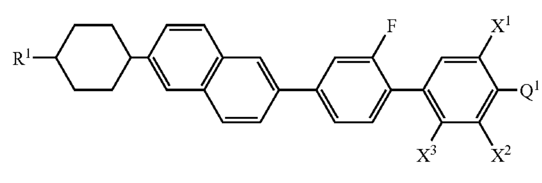
(I-22br)
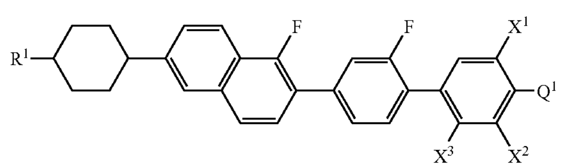
(I-22bs)
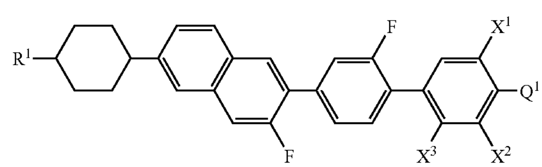
(I-22bt)
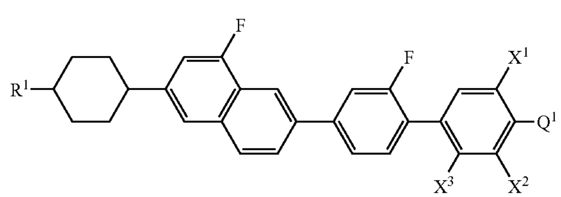
(I-22bu)
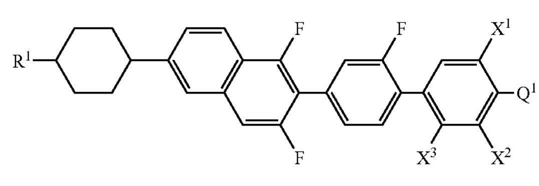
(I-22bv)
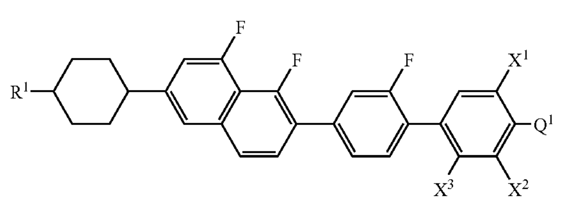
(I-22bw)
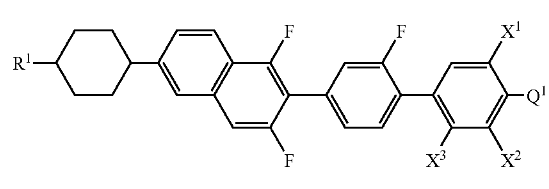

-continued
(I-22bx)
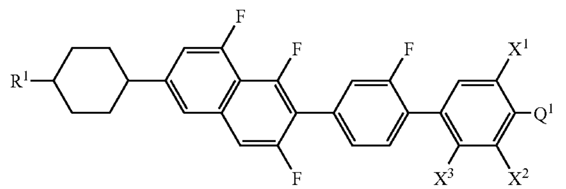
(I-22by)
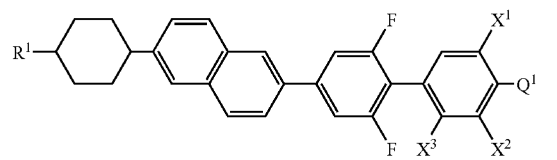
(I-22bz)
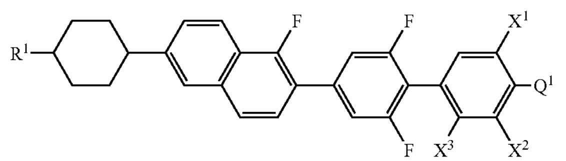
(I-22ca)
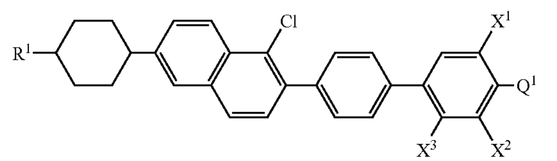
(I-22cb)
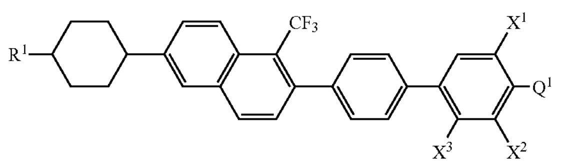
(I-22cc)
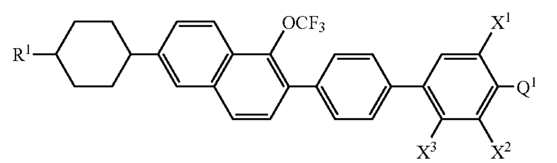
(I-22cd)
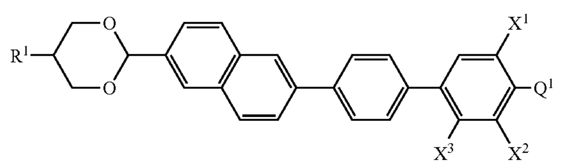
(I-22ce)
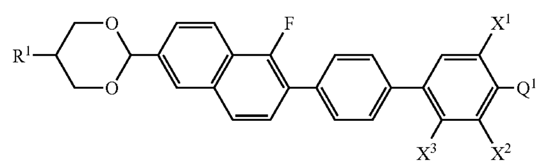
(I-22cf)
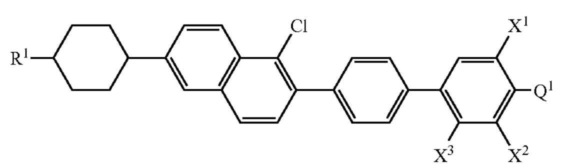
(I-22cg)
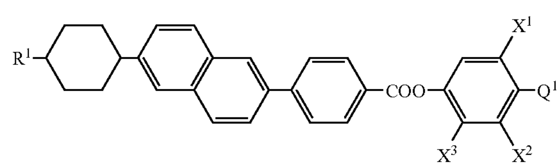
(I-22ch)
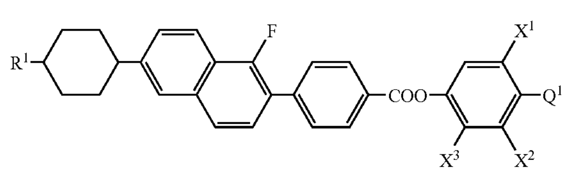
(I-22ci)
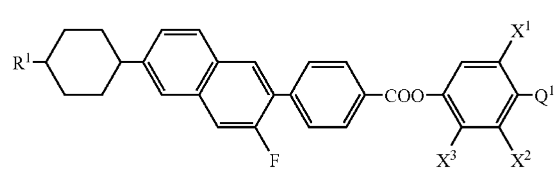
(I-22cj)
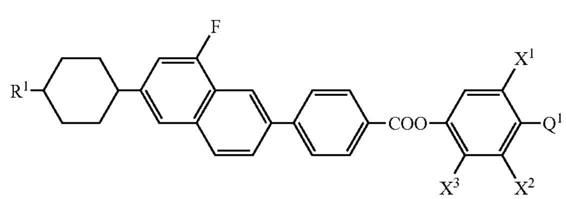
(I-22ck)
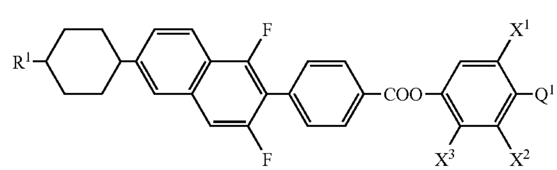
(I-22cl)
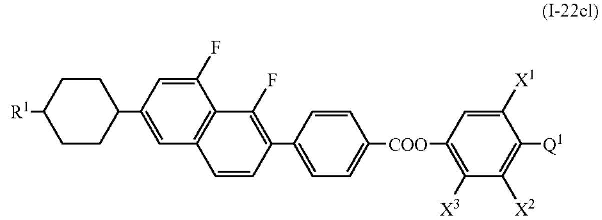
(I-22cm)
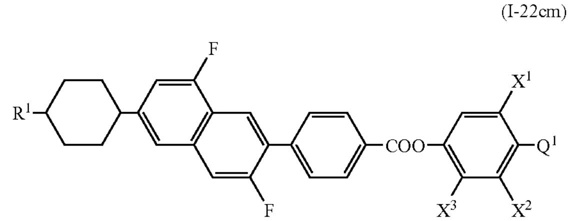

-continued
(I-22cn)
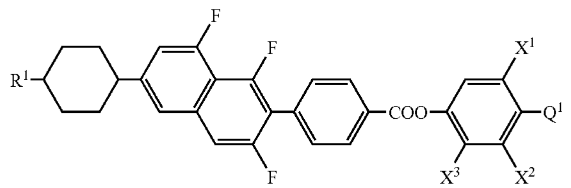
(I-22co)
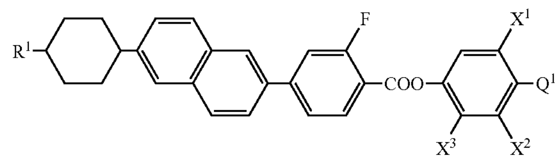
(I-22cp)
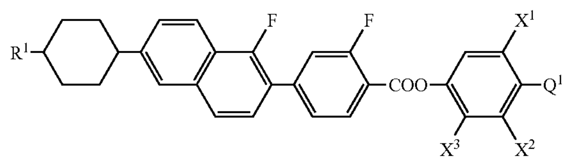
(I-22cq)
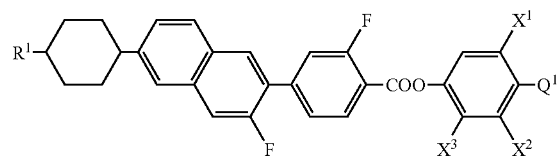
(I-22cr)
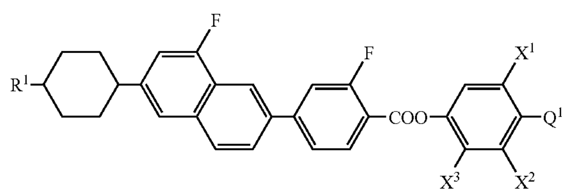
(I-22cs)
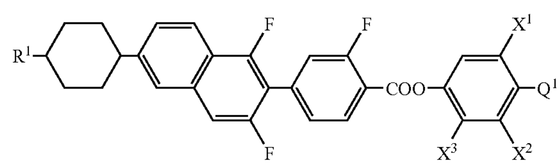
(I-22ct)
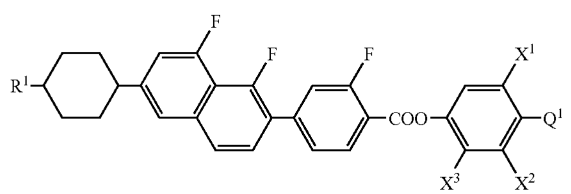
(I-22cu)
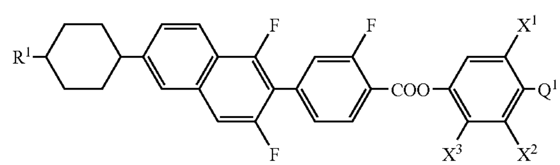
(I-22cv)
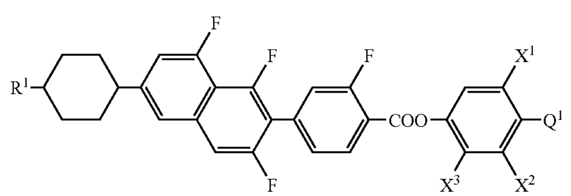
(I-22cw)
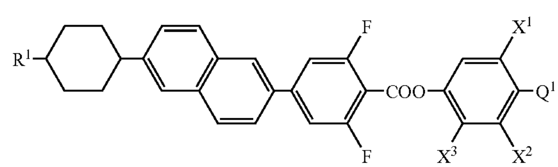
(I-22cx)
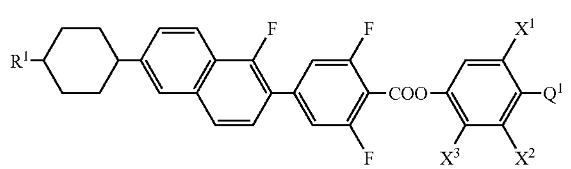
(I-22cy)
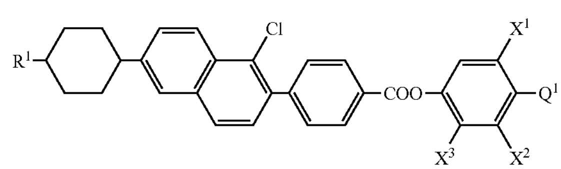
(I-22cz)
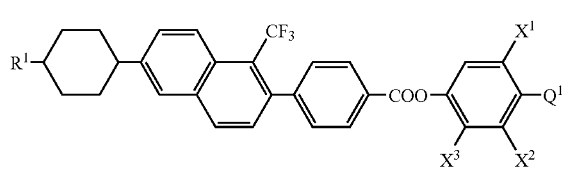
(I-22da)
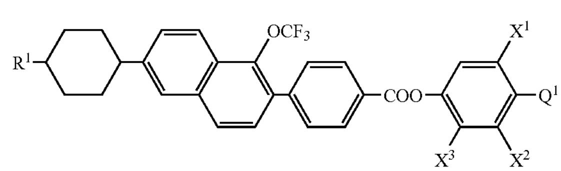
(I-22db)
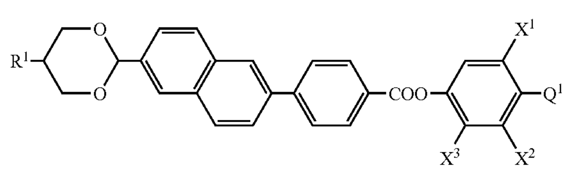
(I-22dc)
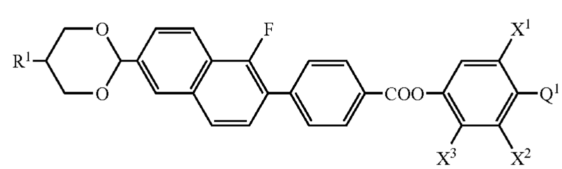

-continued
(I-22dd)
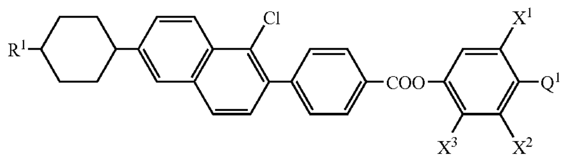
(I-22de)
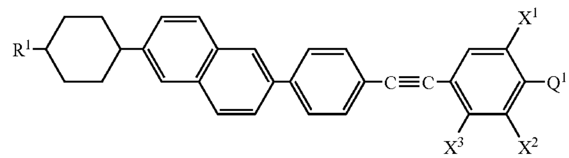
(I-22df)
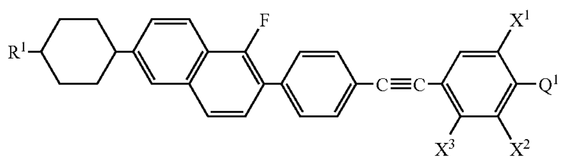
(I-22dg)
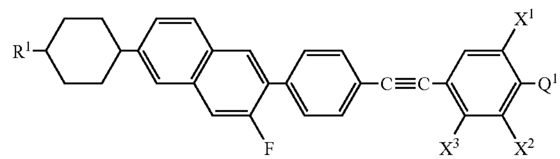
(I-22dh)
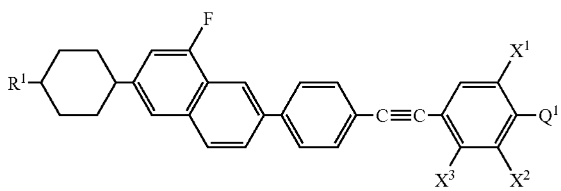
(I-22di)
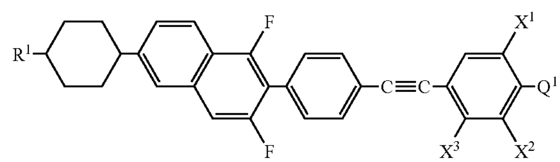
(I-22dj)
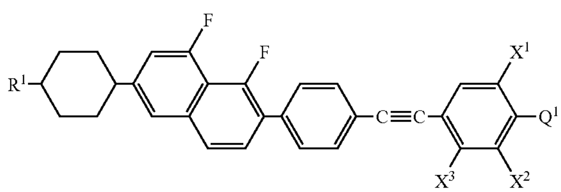
(I-22dk)
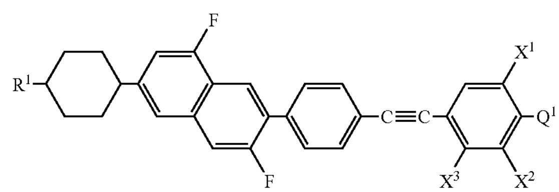
(I-22dl)
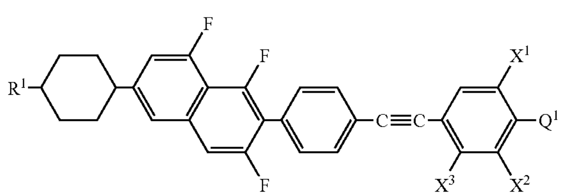
(I-22dm)
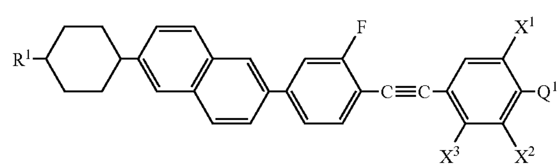
(I-22dn)
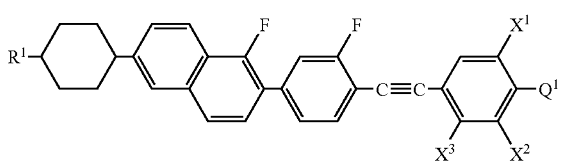
(I-22do)
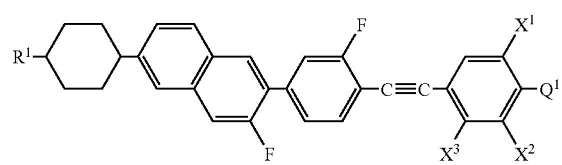
(I-22dp)
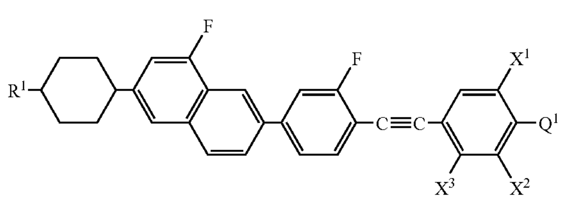
(I-22dq)
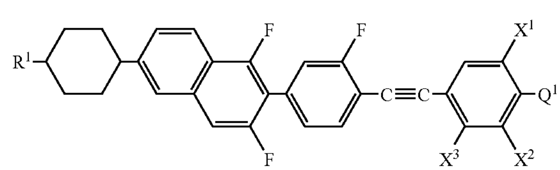
(I-22dr)
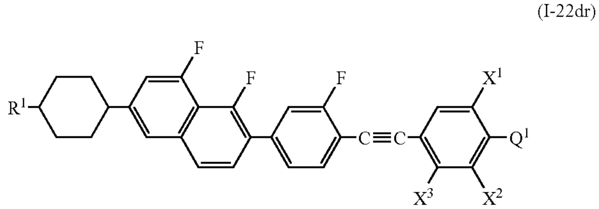
(I-22ds)
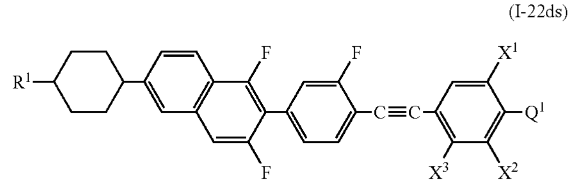

-continued
(I-22dt)
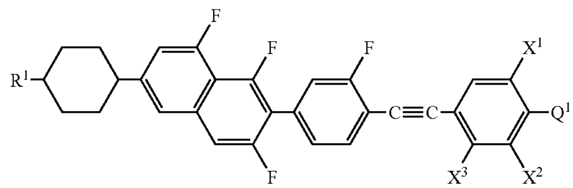
(I-22du)
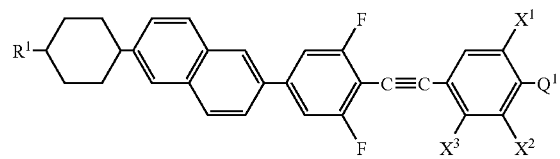
(I-22dv)
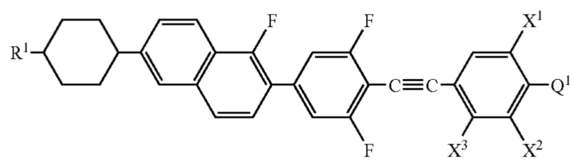
(I-22dw)
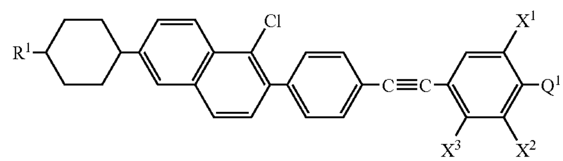
(I-22dx)
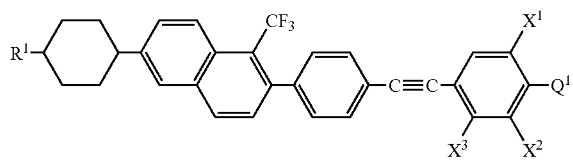
(I-22dy)
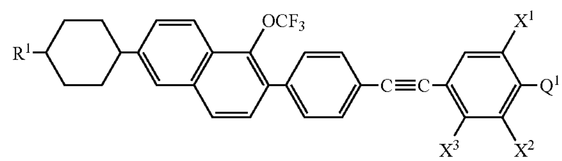
(I-22dz)
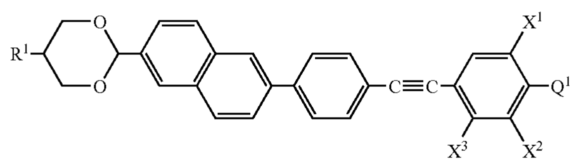
(I-22ea)
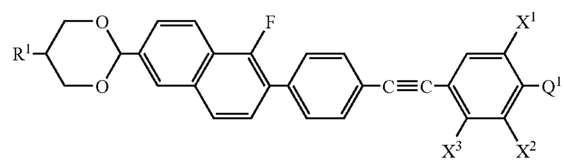
(I-22eb)
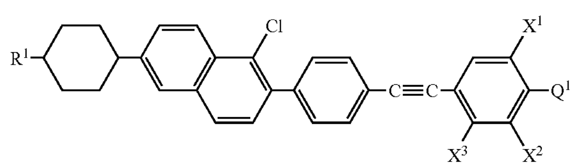
(I-22ec)
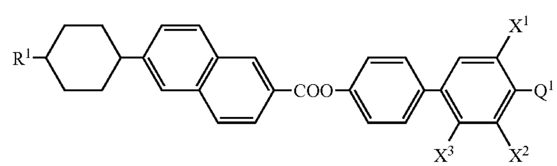
(I-22ed)
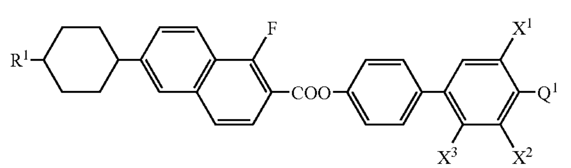
(I-22ee)
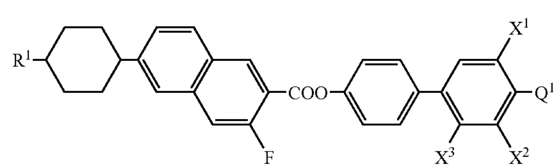
(I-22ef)
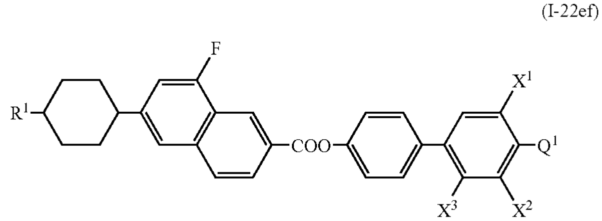
(I-22eg)
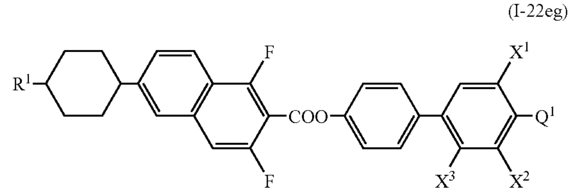
(I-22eh)
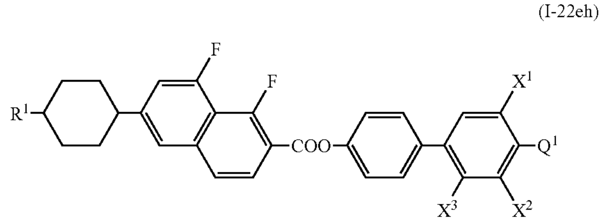
(I-22ei)
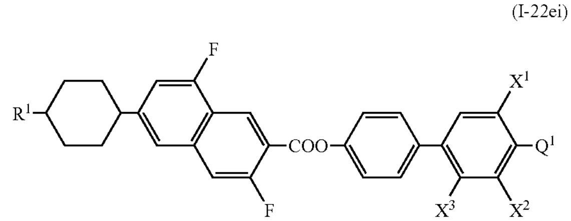

-continued
(I-22ej)
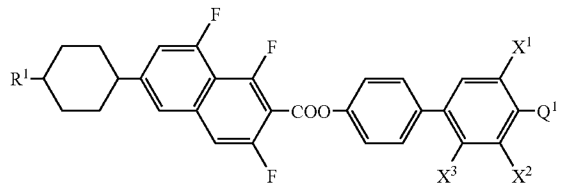
(I-22ek)
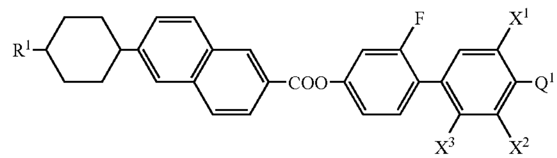
(I-22el)
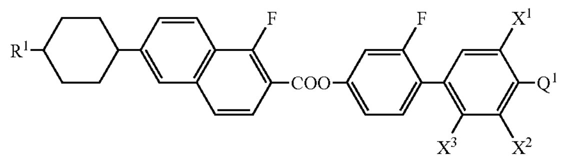
(I-22em)
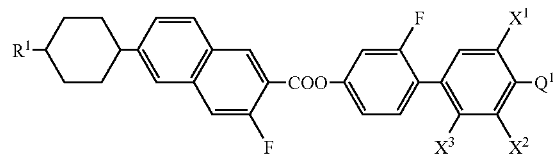
(I-22en)
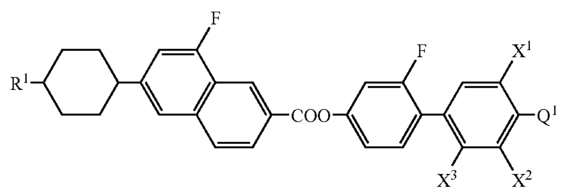
(I-22eo)
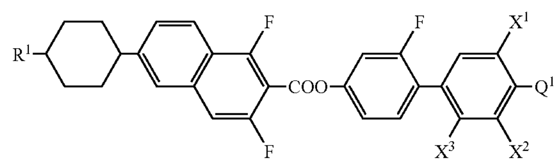
(I-22ep)
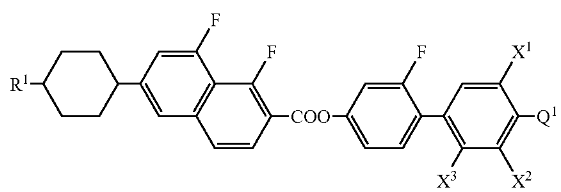
(I-22eq)
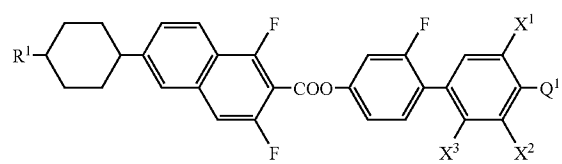
(I-22er)
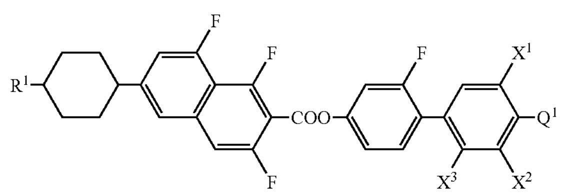
(I-22es)
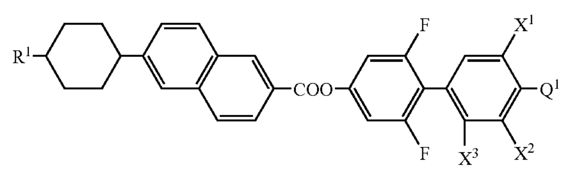
(I-22et)
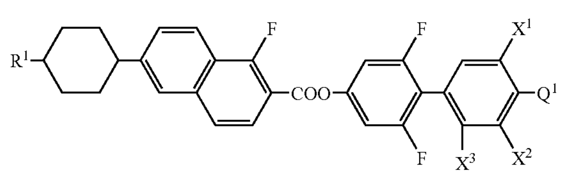
(I-22eu)
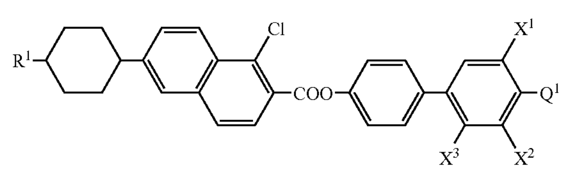
(I-22ev)
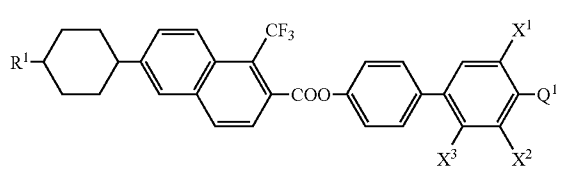
(I-22ew)
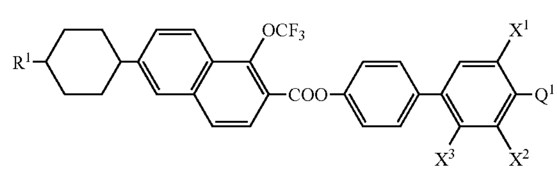
(I-22ex)
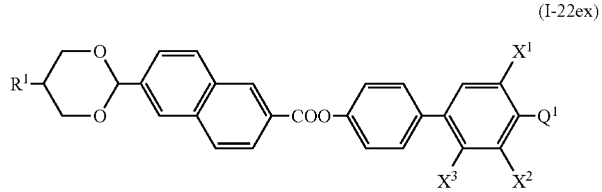
(I-22ey)
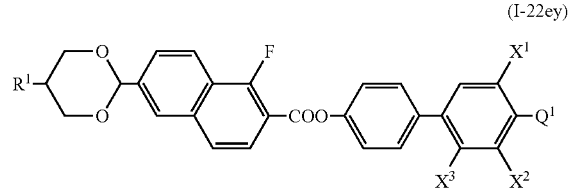

-continued
(I-22ez)
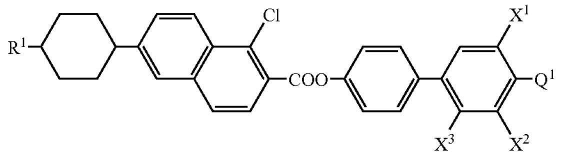
(I-22fa)
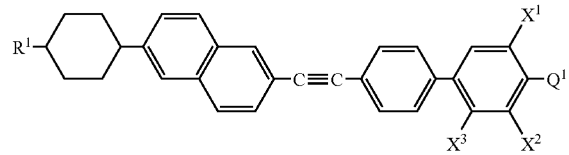
(I-22fb)
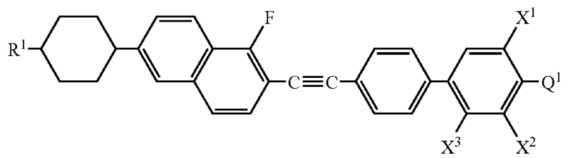
(I-22fc)
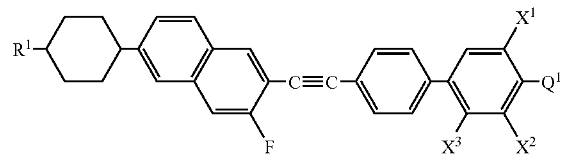
(I-22fd)
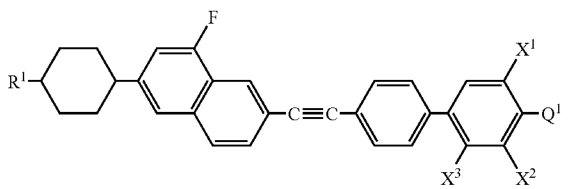
(I-22fe)
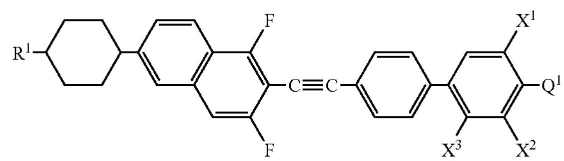
(I-22ff)
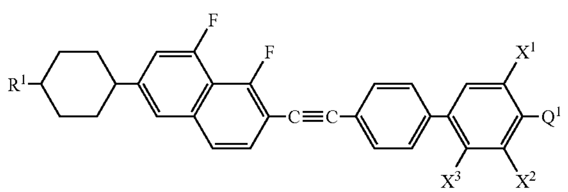
(I-22fg)
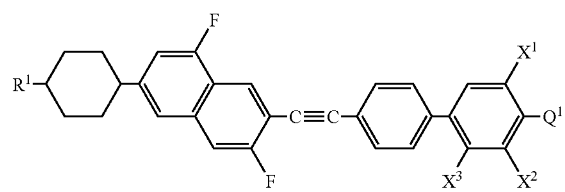
(I-22fh)
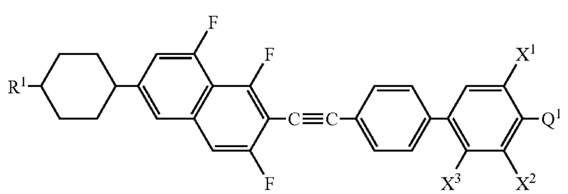
(I-22fi)
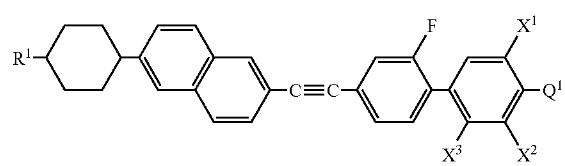
(I-22fj)
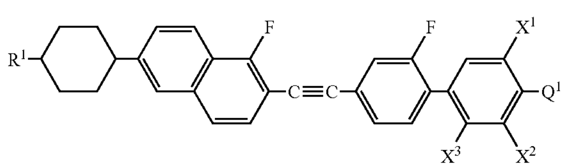
(I-22fk)
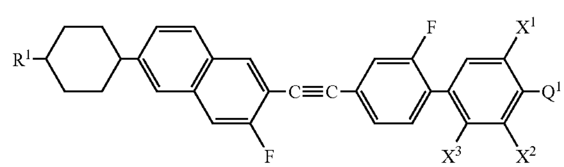
(I-22fl)
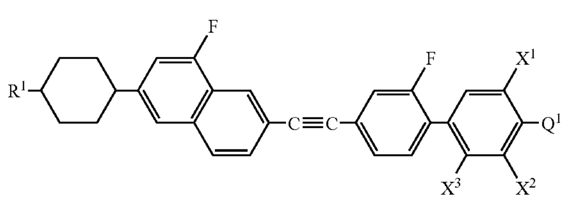
(I-22fm)
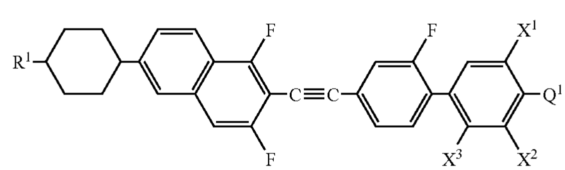
(I-22fn)
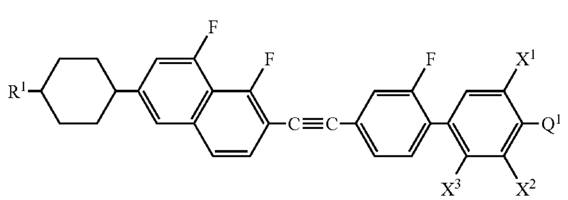
(I-22fo)
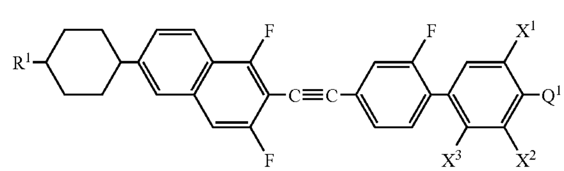

-continued
(I-22fp)
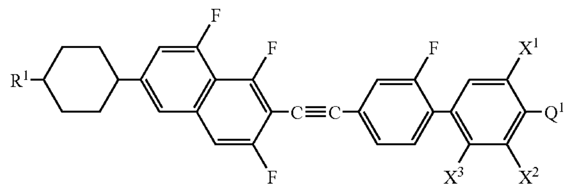
(I-22fq)
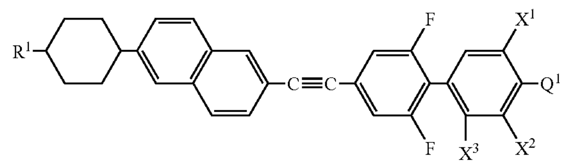
(I-22fr)
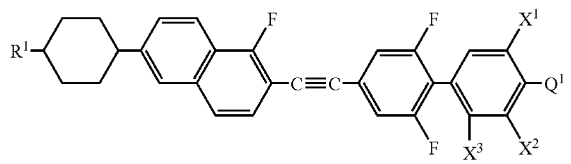
(I-22fs)
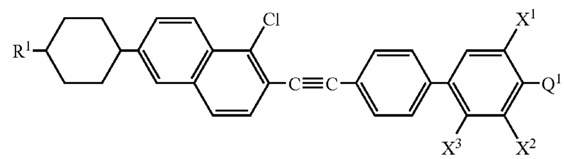
(I-22ft)
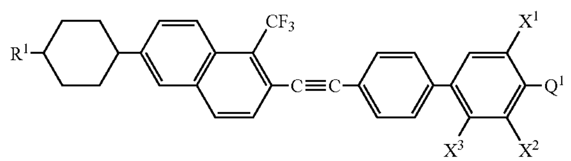
(I-22fu)
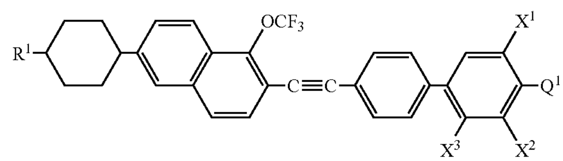
(I-22fv)
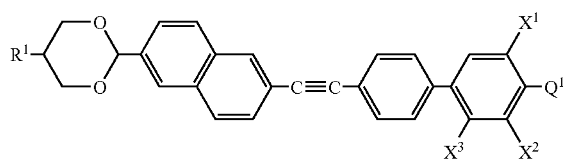
(I-22fw)
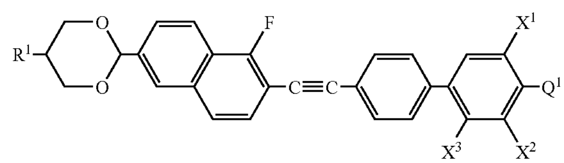
(I-22fx)
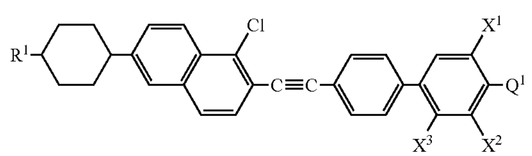
(I-22fy)
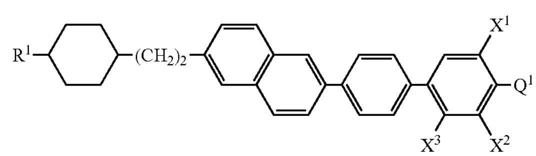
(I-22fz)
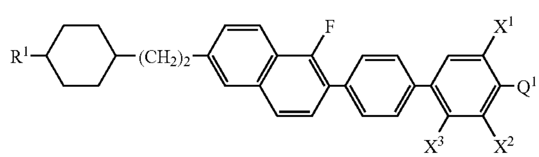
(I-22ga)
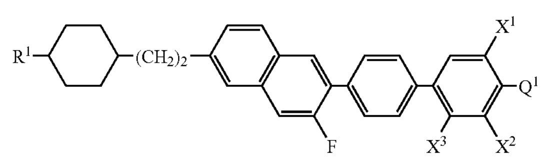
(I-22gb)
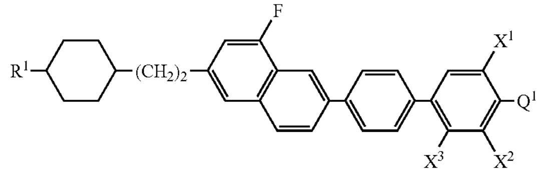
(I-22gc)
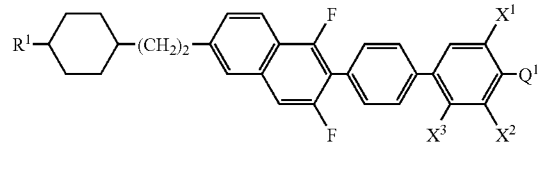
(I-22gd)
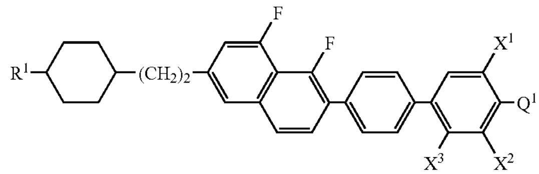
(I-22ge)
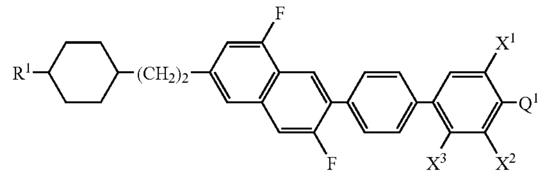

-continued
(I-22gf)
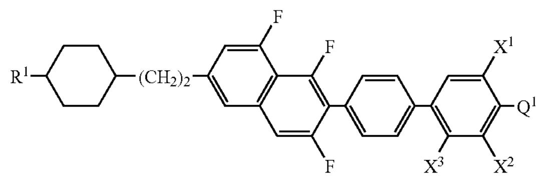
(I-22gg)
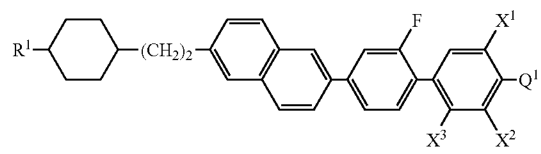
(I-22gh)
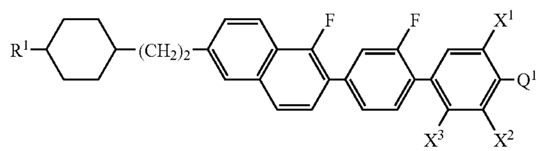
(I-22gi)
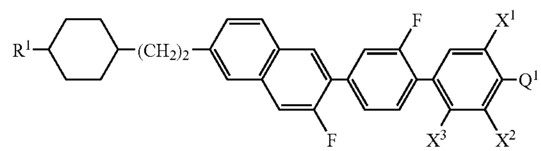
(I-22gj)
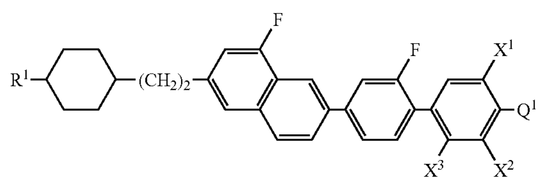
(I-22gk)
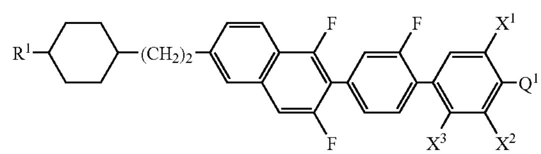
(I-22gl)
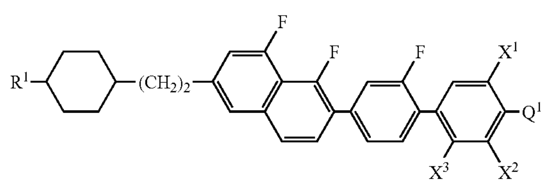
(I-22gm)
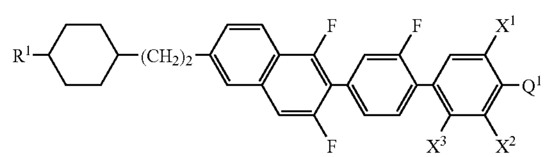
(I-22gn)
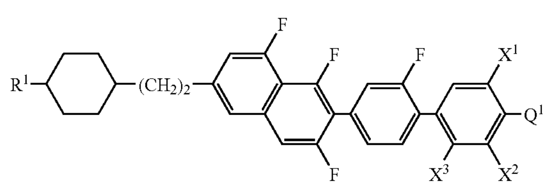
(I-22go)
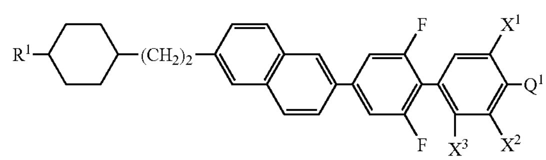
(I-22gp)
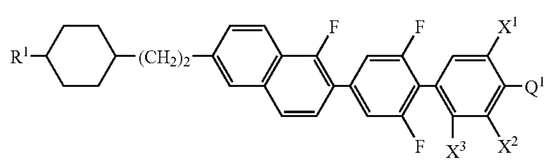
(I-22gq)
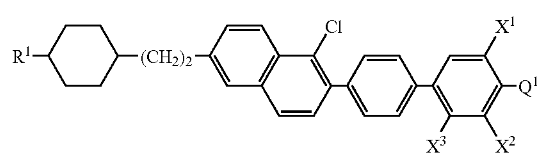
(I-22gr)
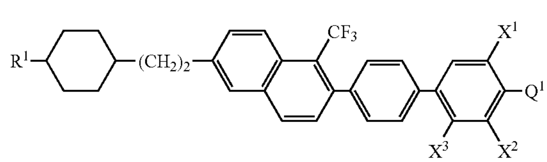
(I-22gs)
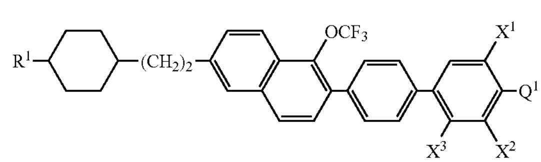
(I-22gt)
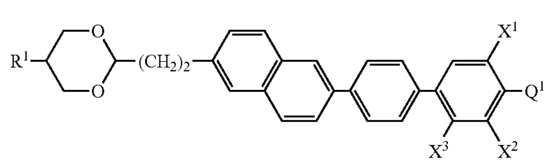
(I-22gu)
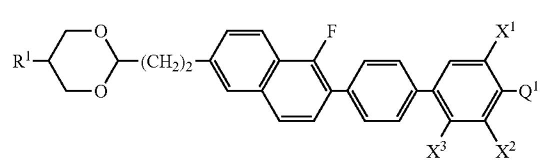

-continued
(I-22gv)
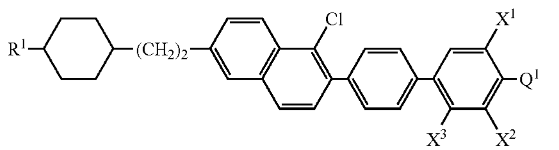
(I-22gw)
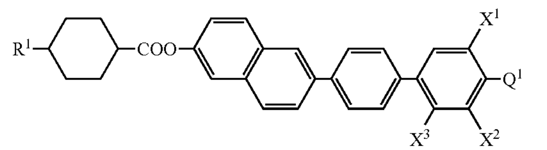
(I-22gx)
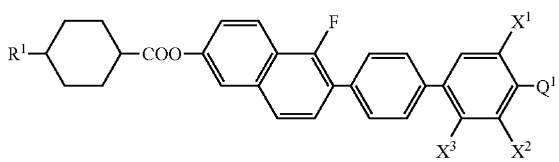
(I-22gy)
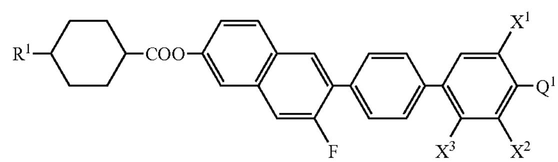
(I-22gz)
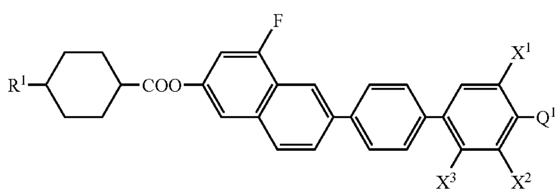
(I-22ha)
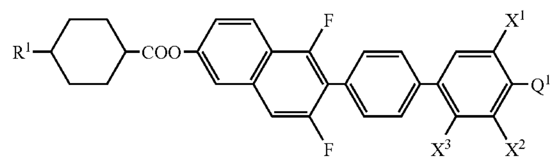
(I-22hb)
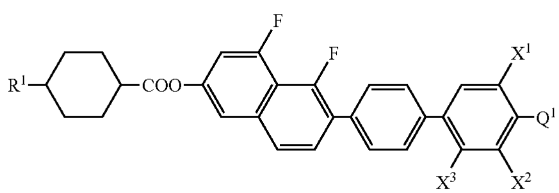
(I-22hc)
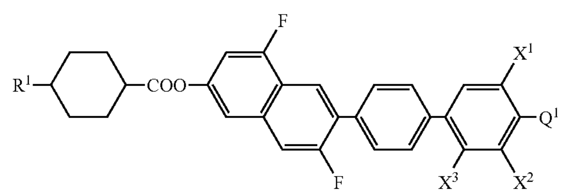
(I-22hd)
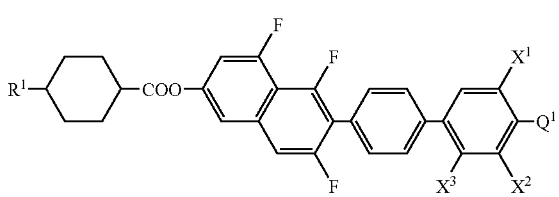
(I-22he)
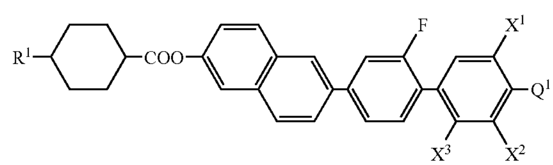
(I-22hf)
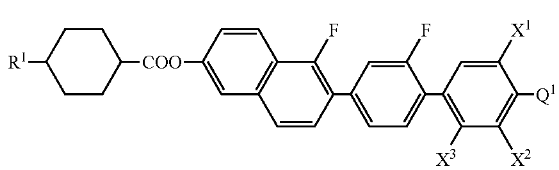
(I-22hg)
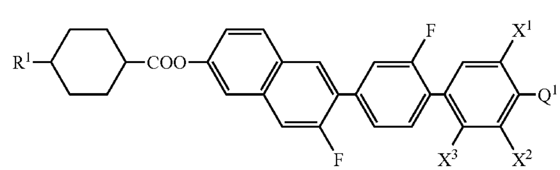
(I-22hh)
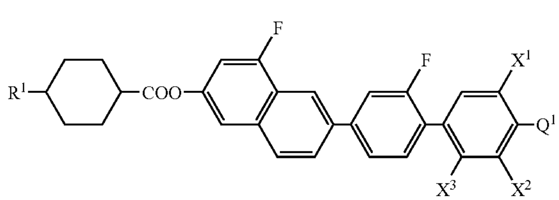
(I-22hi)
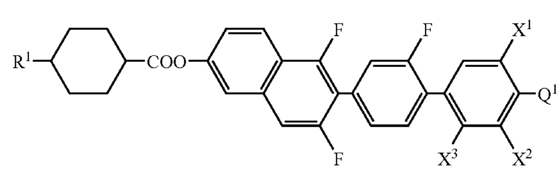
(I-22hj)
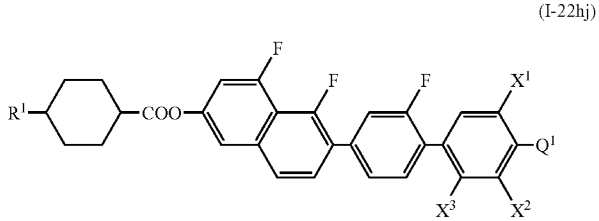
(I-22hk)
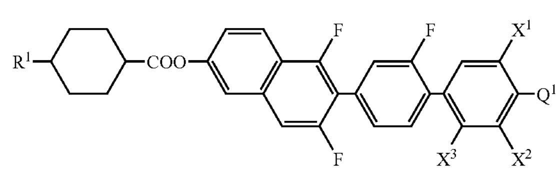

-continued
(I-22hl)
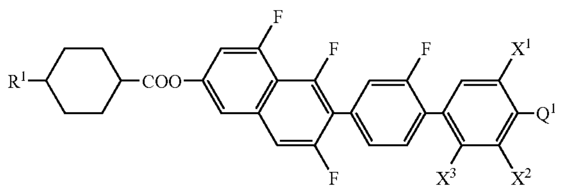
(I-22hm)
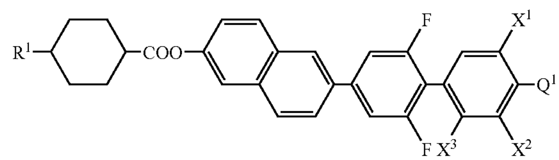
(I-22hn)
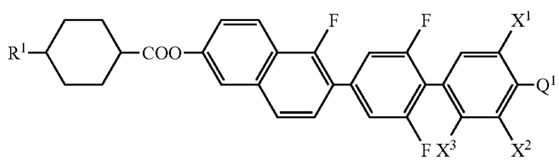
(I-22ho)
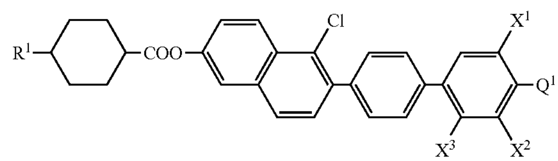
(I-22hp)
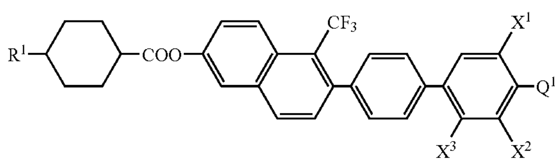
(I-22hq)
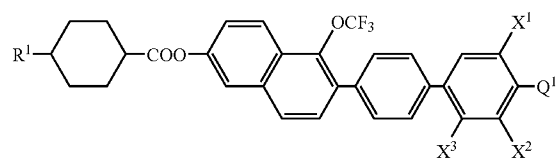
(I-22hr)
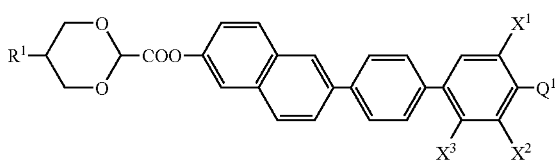
(I-22hs)
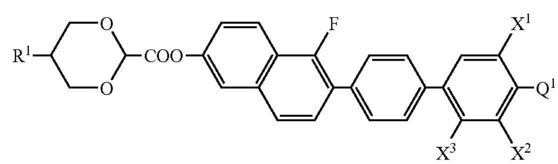
(I-22ht)
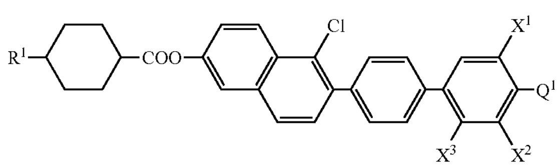
(I-22hu)
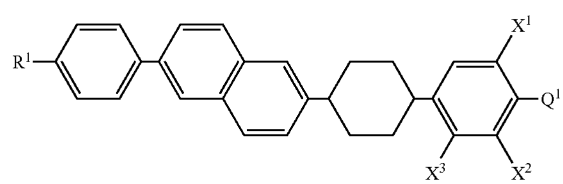
(I-22hv)
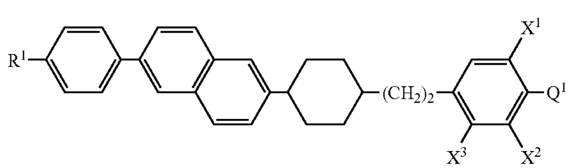
(I-22hw)
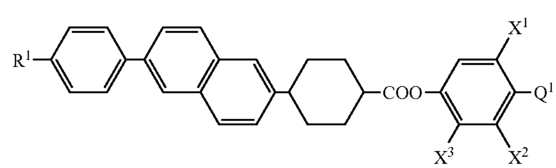
(I-22hx)
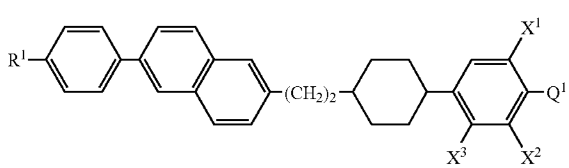
(I-22hy)
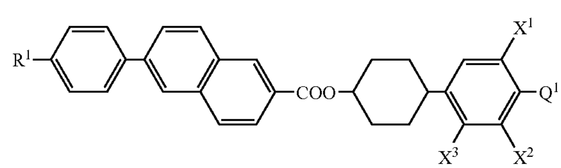
(I-22hz)
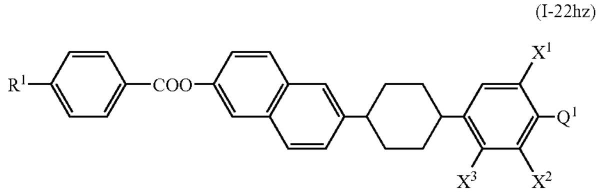
(I-22ia)
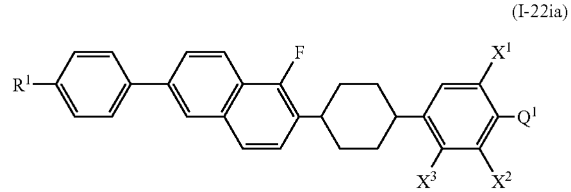

-continued
(I-22ib)
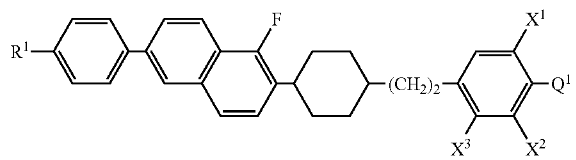
(I-22ic)
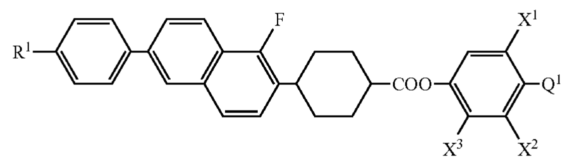
(I-22id)
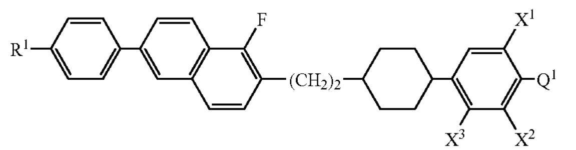
(I-22ie)
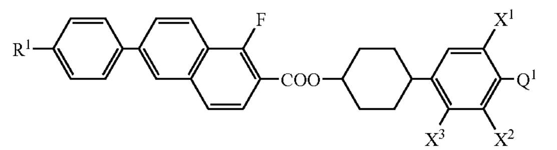
(I-22if)
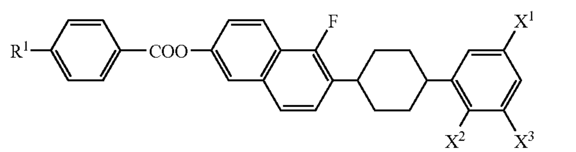
(I-22ig)
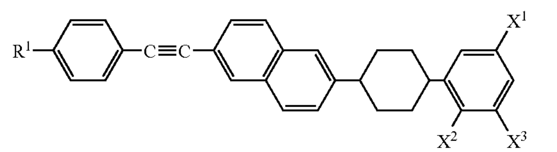
(I-22ih)
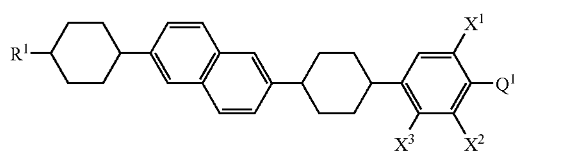
(I-22ii)
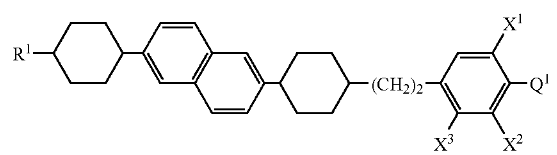
(I-22ij)
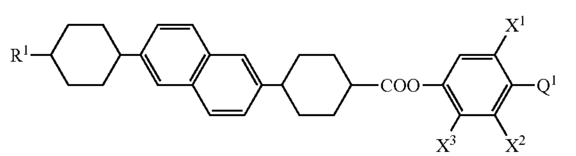
(I-22ik)
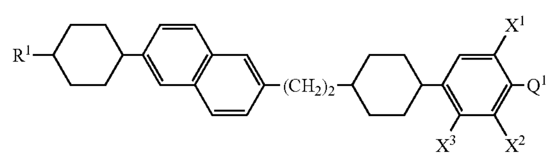
(I-22il)
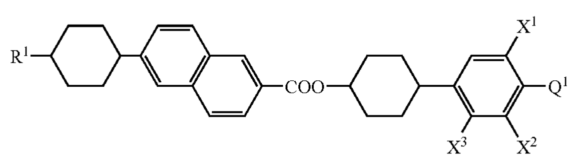
(I-22im)
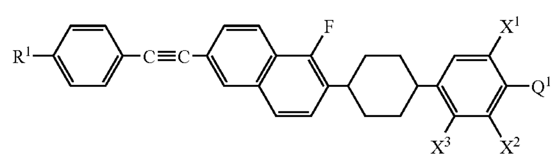
(I-22in)
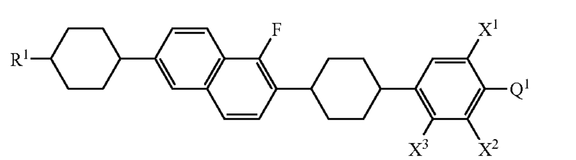
(I-22io)
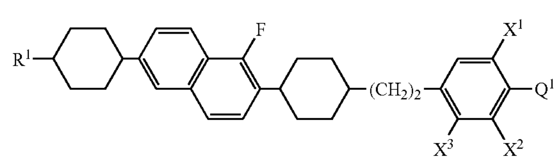
(I-22ip)
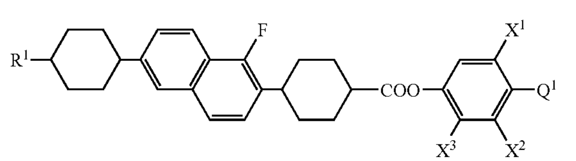
(I-22iq)
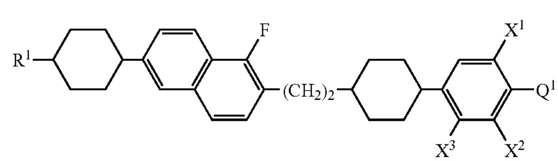
(I-22ir)
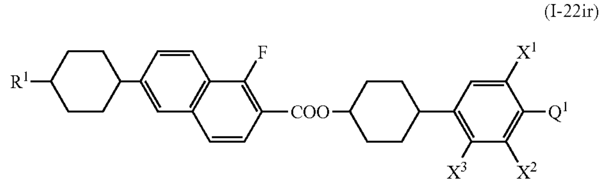
(I-22is)
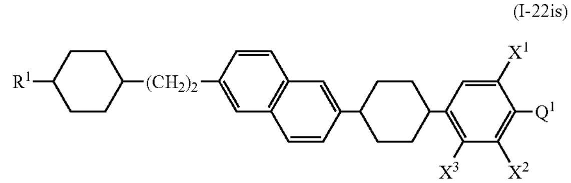

-continued
(I-22it)
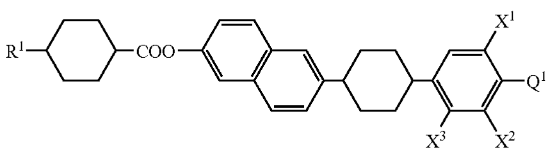
(I-22iu)
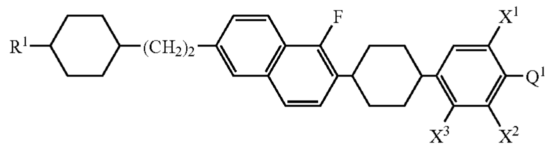
(I-22iv)
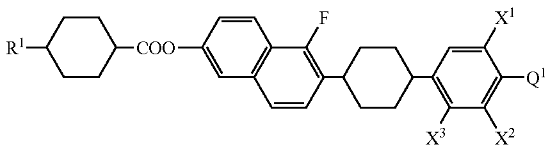
(I-22iw)
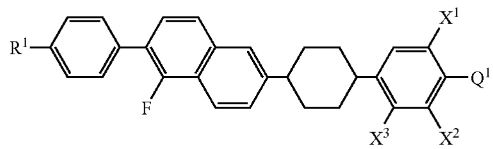
(I-22ix)
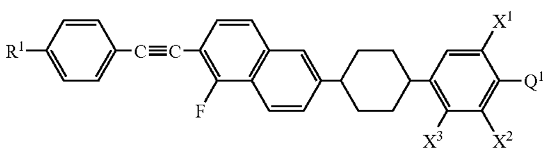
(I-22iy)
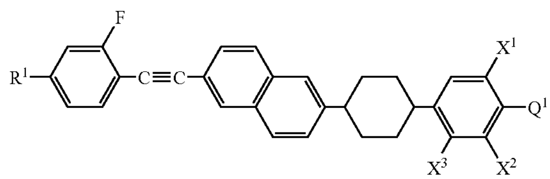
(I-22iz)
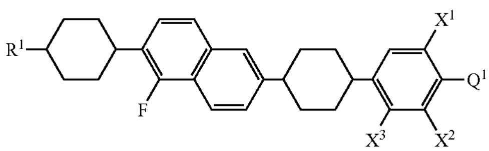
(I-22ja)
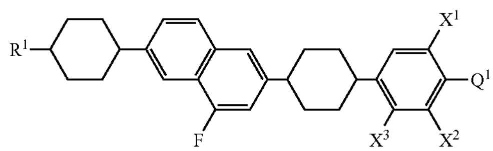
(I-22jb)
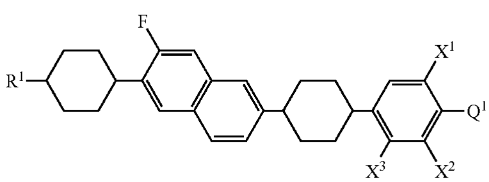
(I-23a)
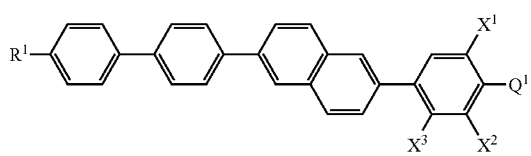
(I-23b)
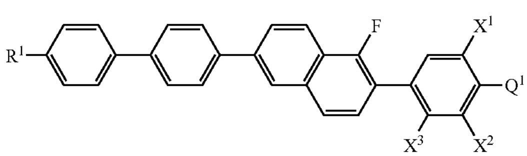
(I-23c)
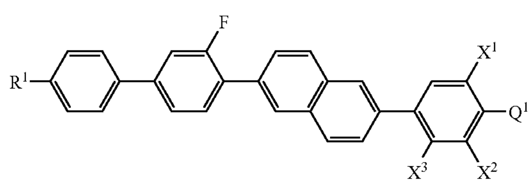
(I-23d)
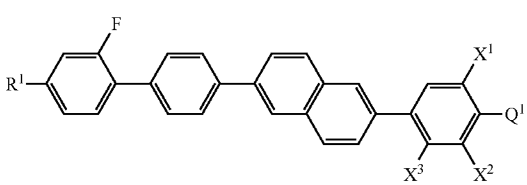
(I-23e)
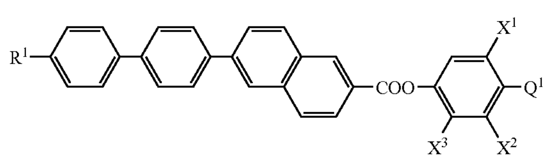
(I-23f)
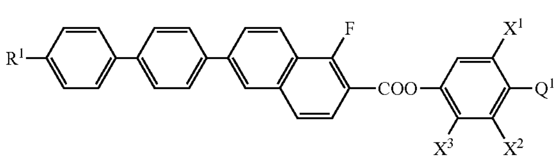
(I-23g)
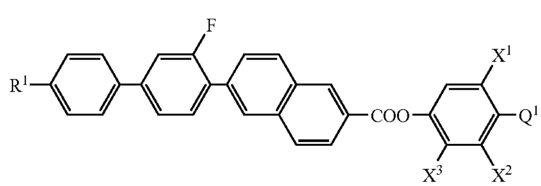

-continued
(I-23h)
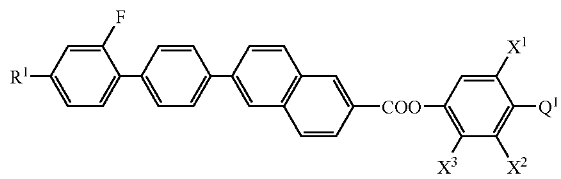
(I-23i)
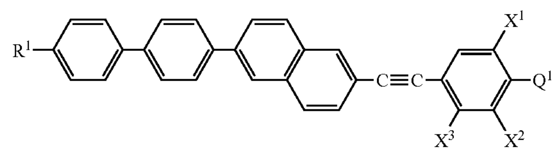
(I-23j)
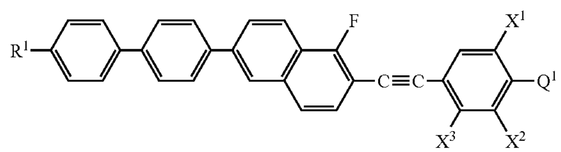
(I-23k)
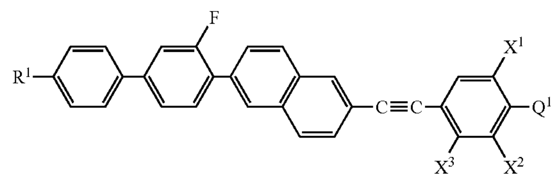
(I-23l)
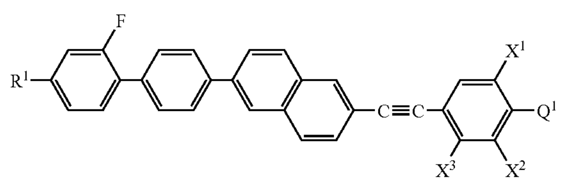
(I-23m)
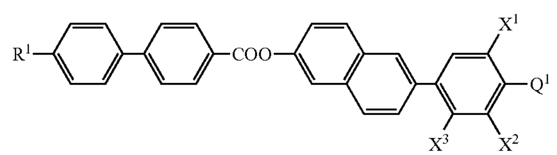
(I-23n)
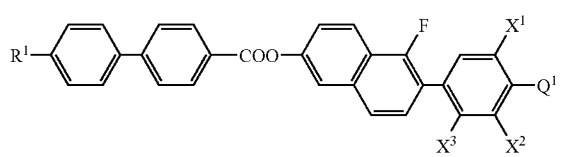
(I-23o)
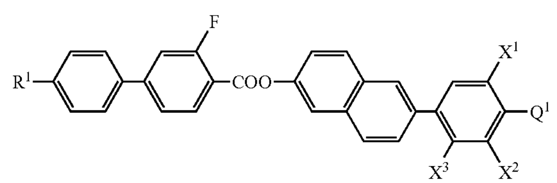
(I-23p)
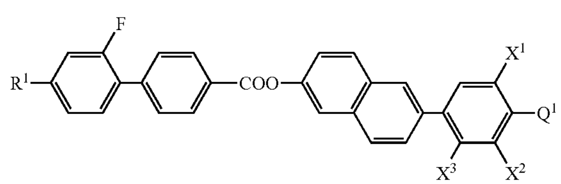
(I-23q)
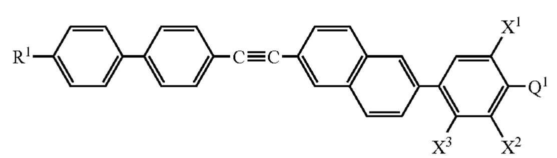
(I-23r)
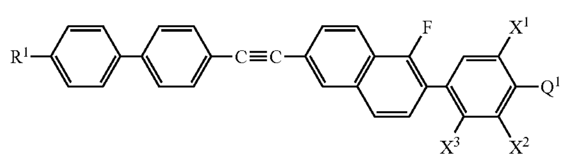
(I-23s)
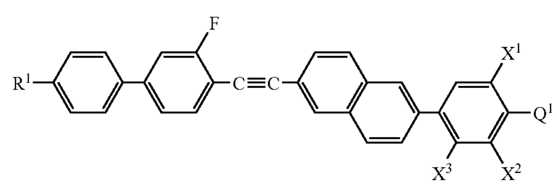
(I-23t)
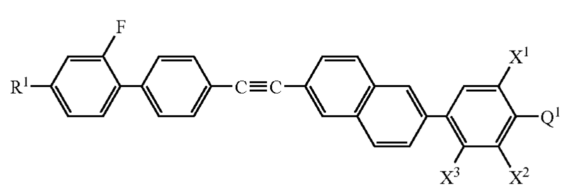
(I-23u)
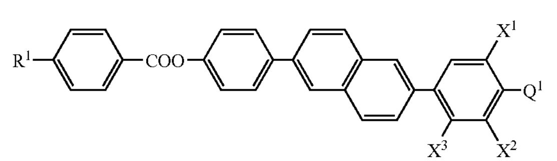
(I-23v)
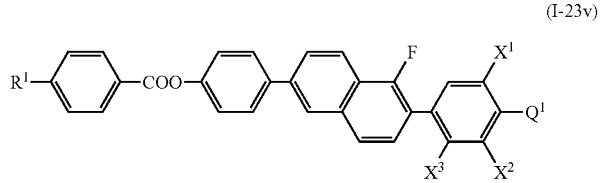
(I-23w)
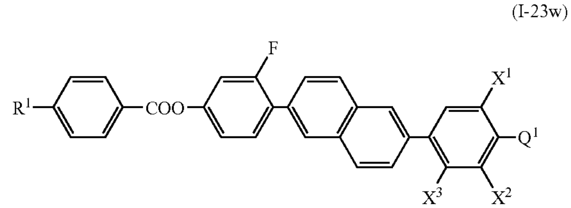

-continued
(I-23x)
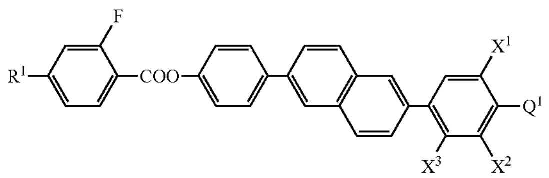
(I-23y)
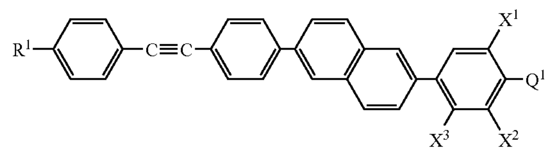
(I-23z)
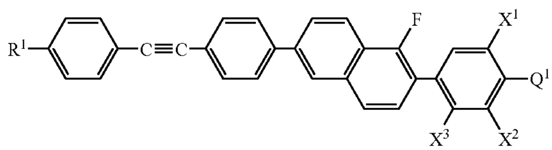
(I-23aa)
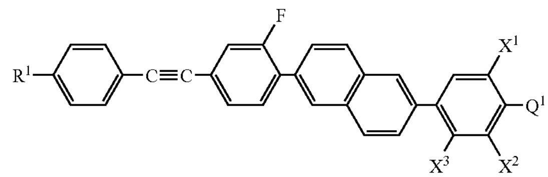
(I-23ab)
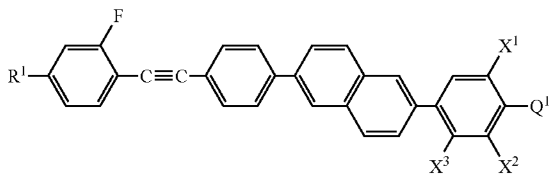
(I-23ac)
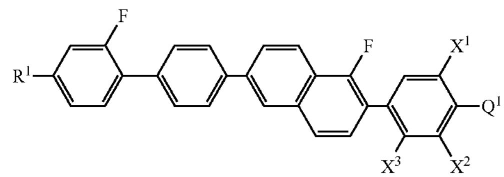
(I-23ad)
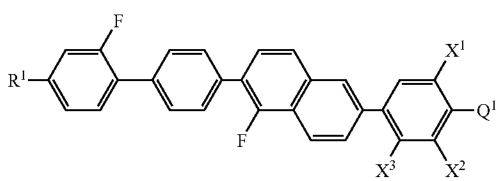
(I-23ae)
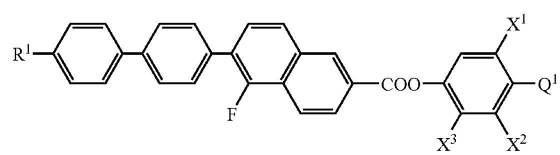
(I-23af)
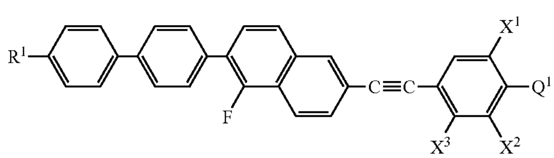
(I-23ag)
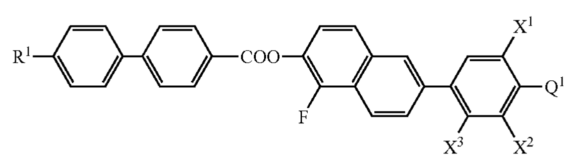
(I-23ah)
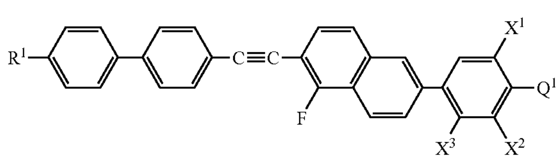
(I-23ai)
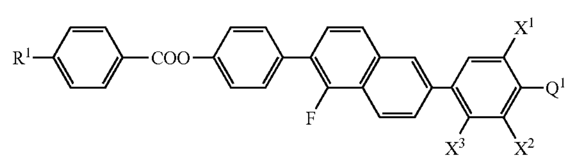
(I-23aj)
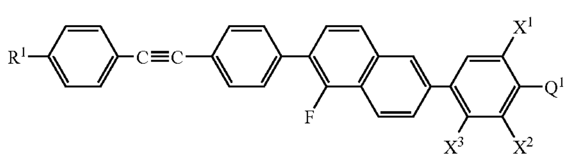
(I-23ak)
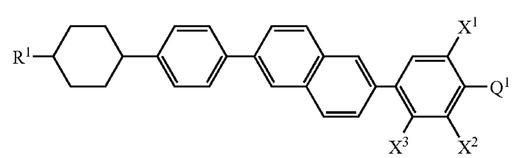
(I-23al)
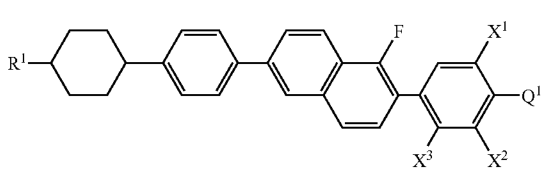
(I-23am)
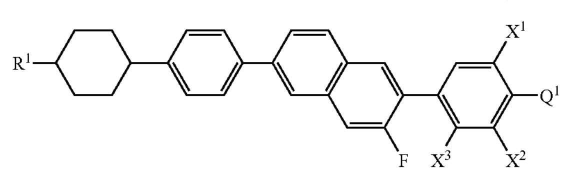

-continued
(I-23an)
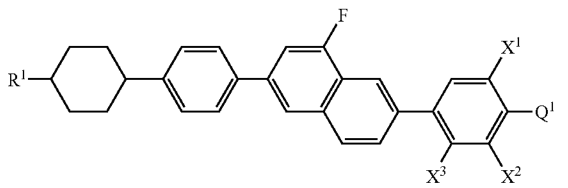
(I-23ao)
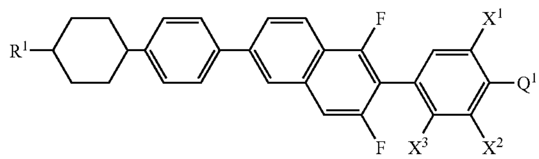
(I-23ap)
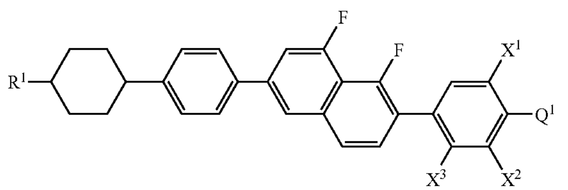
(I-23aq)
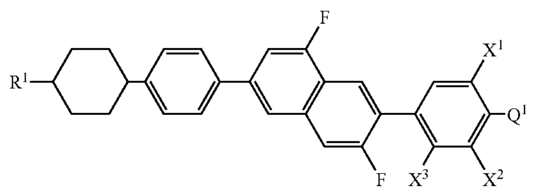
(I-23ar)
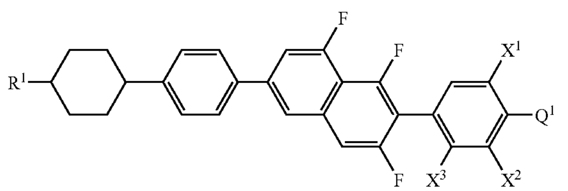
(I-23as)
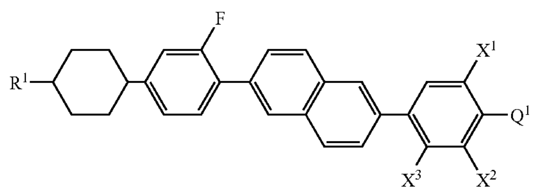
(I-23at)
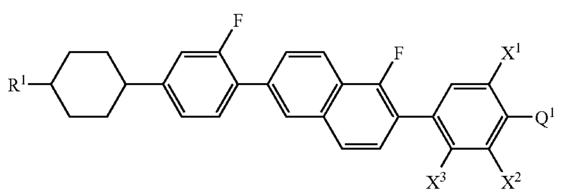
(I-23au)
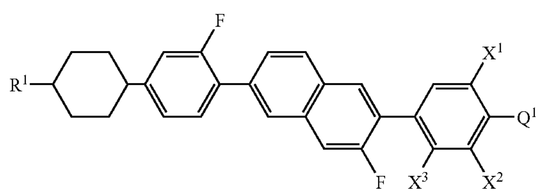
(I-23av)
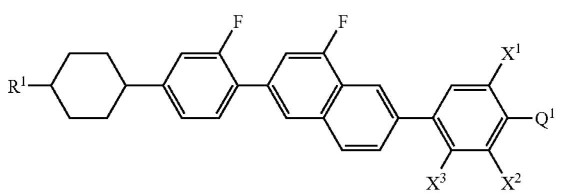
(I-23aw)
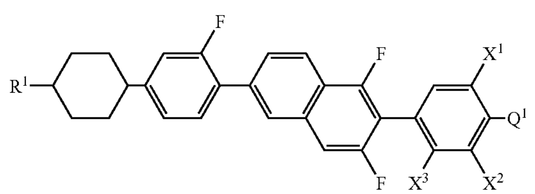
(I-23ax)
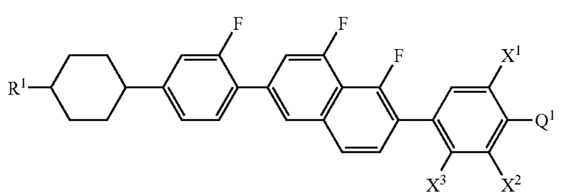
(I-23ay)
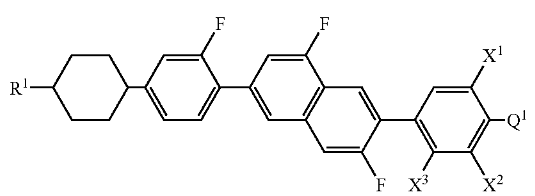
(I-23az)
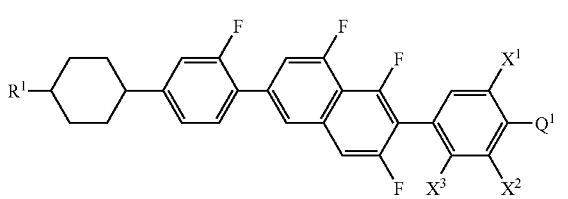
(I-23ba)
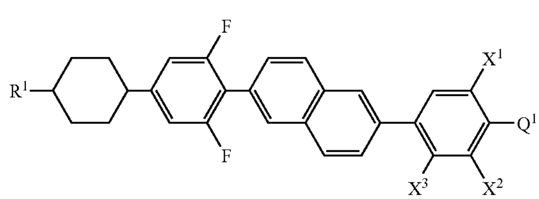

-continued
(I-23bb)
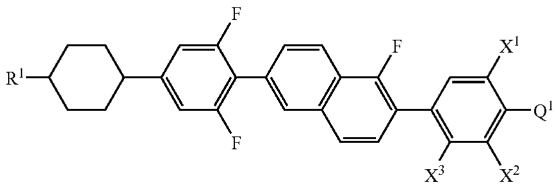
(I-23bc)
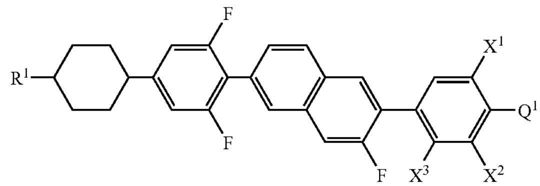
(I-23bd)
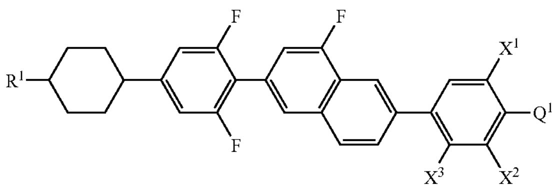
(I-23be)
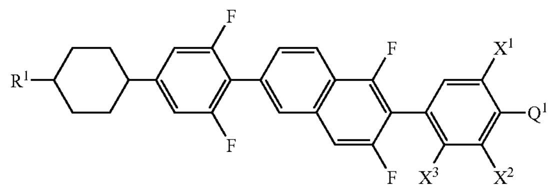
(I-23bf)
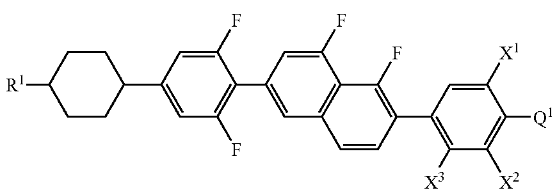
(I-23bg)
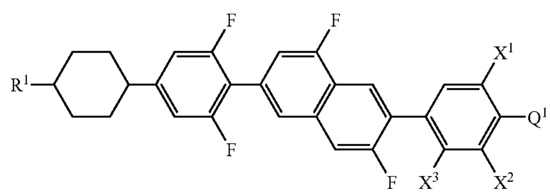
(I-23bh)
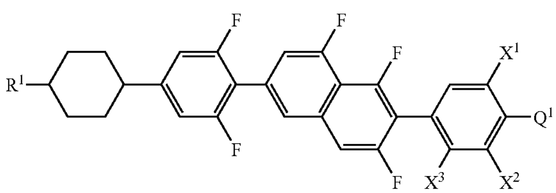
(I-23bi)
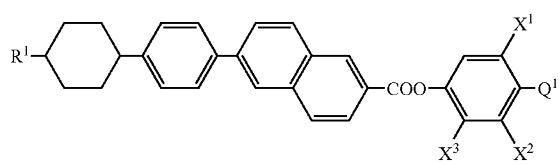
(I-23bj)
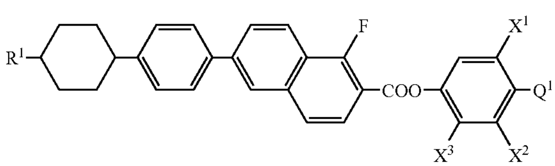
(I-23bk)
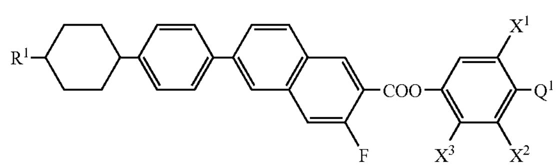
(I-23bl)
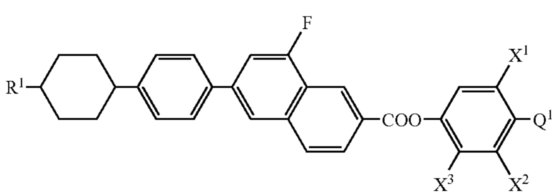
(I-23bm)
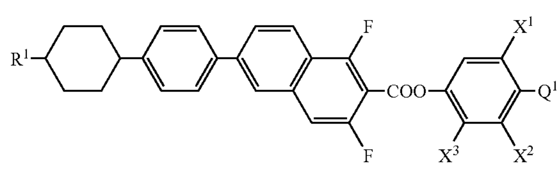
(I-23bn)
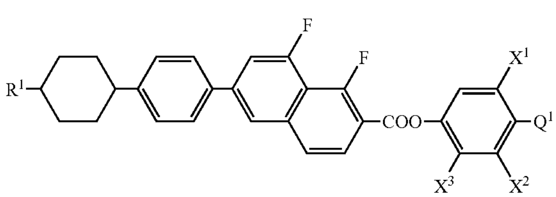
(I-23bo)
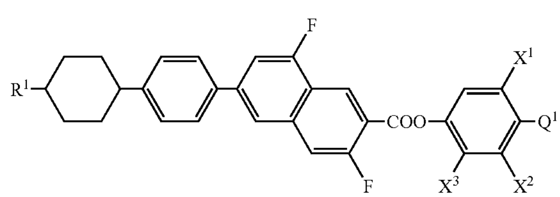

-continued
(I-23bp)
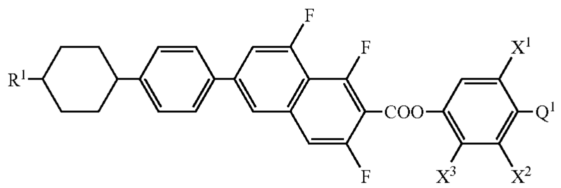
(I-23bq)
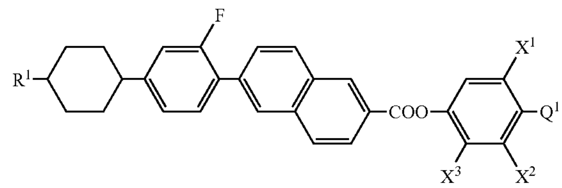
(I-23br)
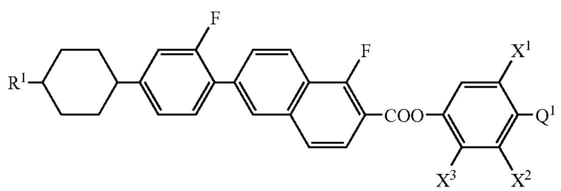
(I-23br)
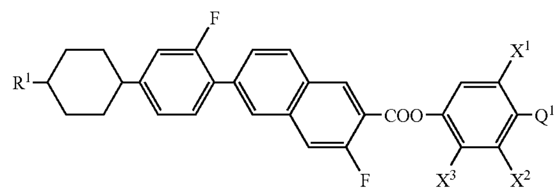
(I-23bt)
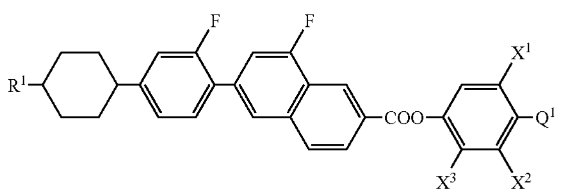
(I-23bu)
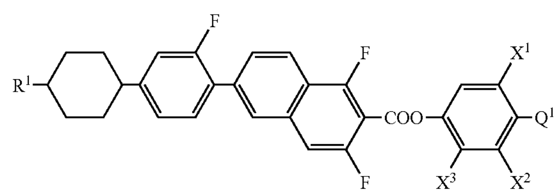
(I-23bv)
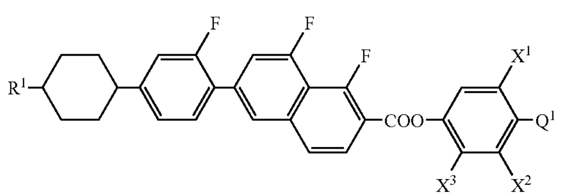
(I-23bw)
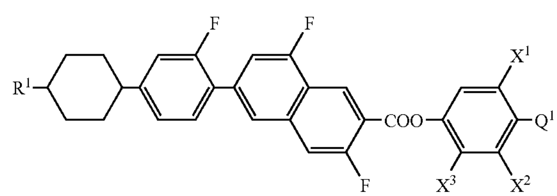
(I-23bx)
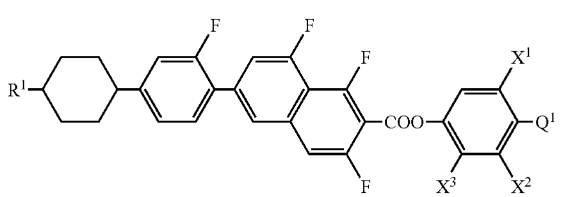
(I-23by)
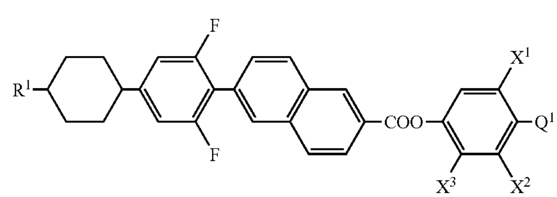
(I-23bz)
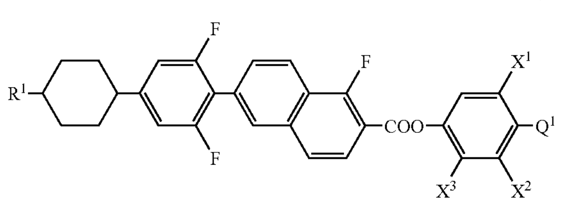
(I-23ca)
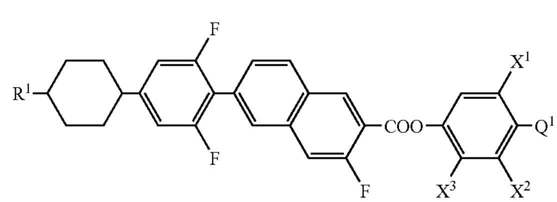
(I-23cb)
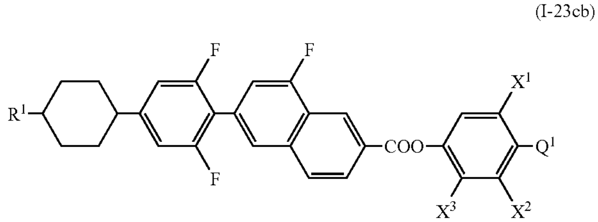
(I-23cc)
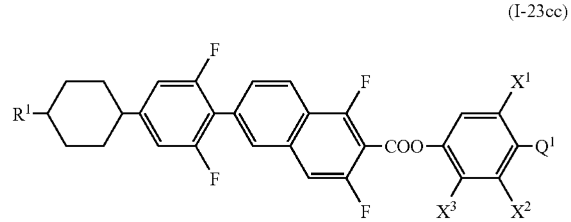

-continued
(I-23cd)
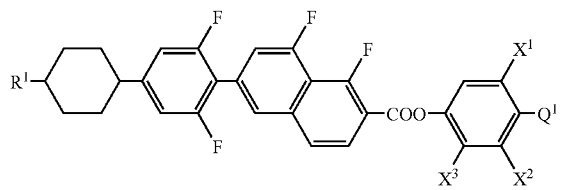
(I-23ce)
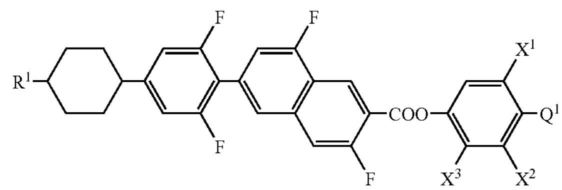
(I-23cf)
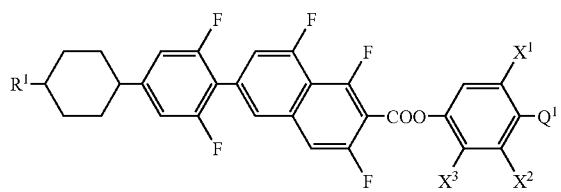
(I-23cg)
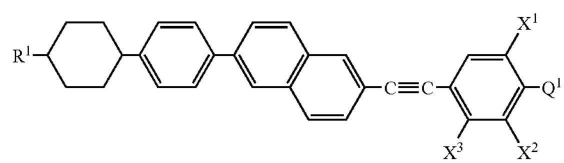
(I-23ch)
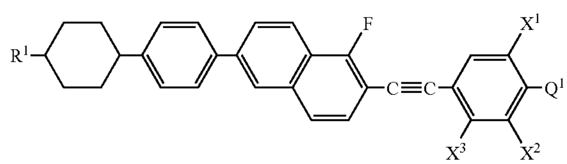
(I-23ci)
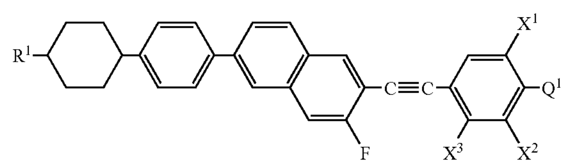
(I-23cj)
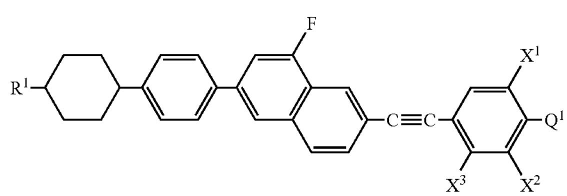
(I-23ck)
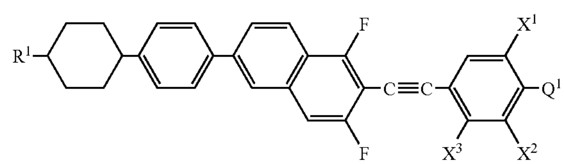
(I-23cl)
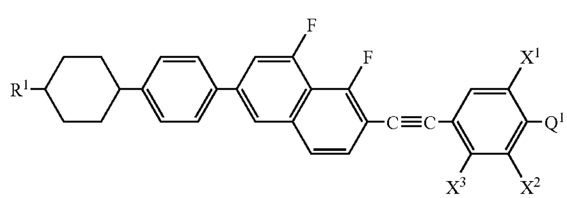
(I-23cm)
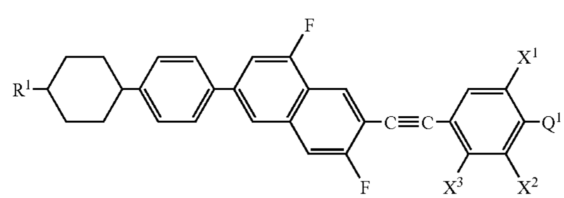
(I-23cn)
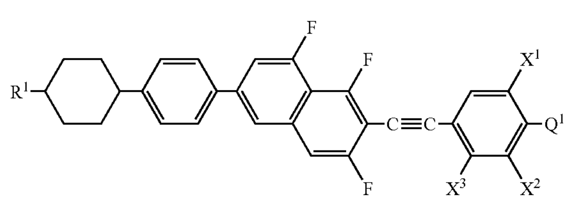
(I-23co)
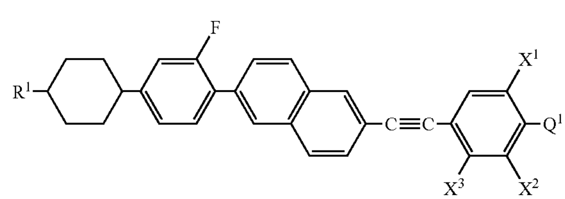
(I-23cp)
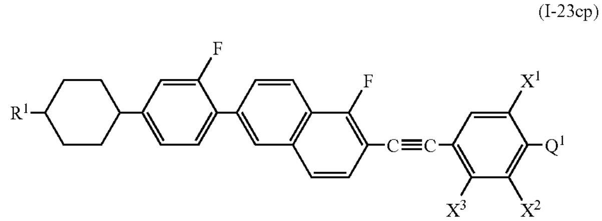
(I-23cq)
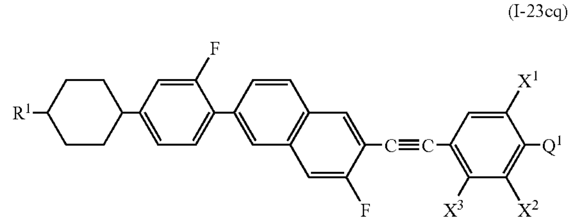

-continued
(I-23cr)
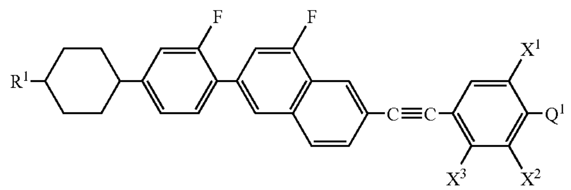
(I-23cs)
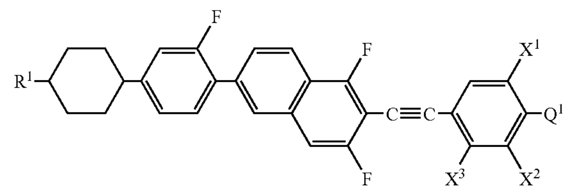
(I-23ct)
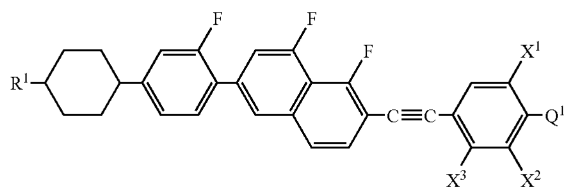
(I-23cu)
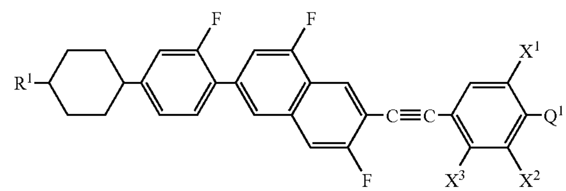
(I-23cv)
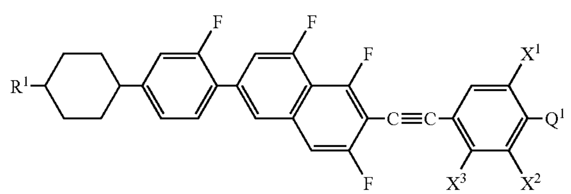
(I-23cw)
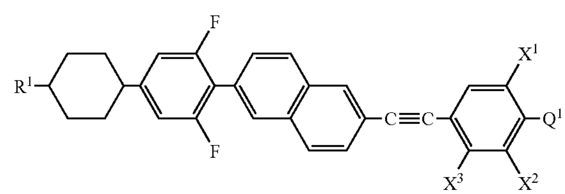
(I-23cx)
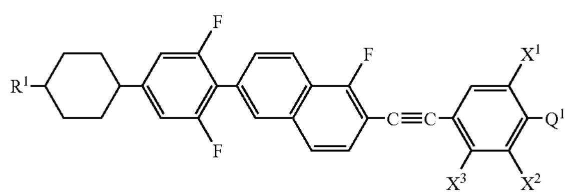
(I-23cy)
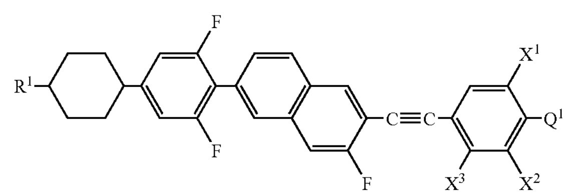
(I-23cz)
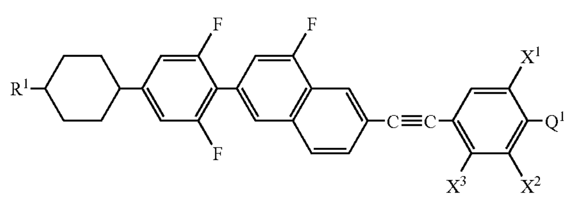
(I-23da)
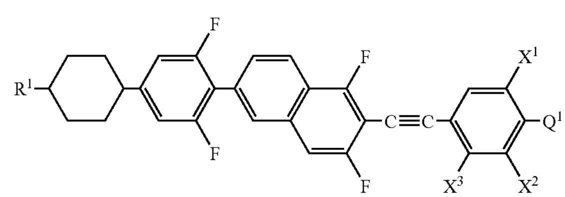
(I-23db)
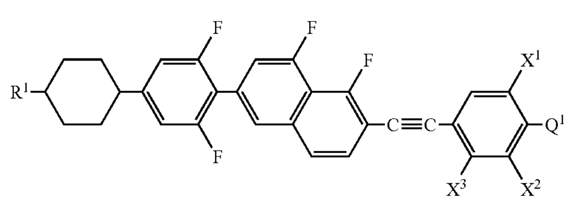
(I-23dc)
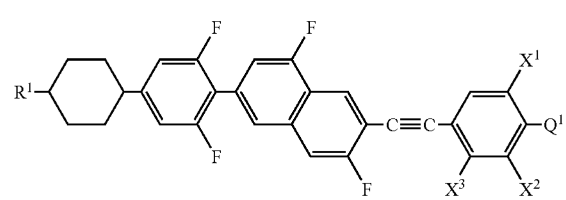
(I-23dd)
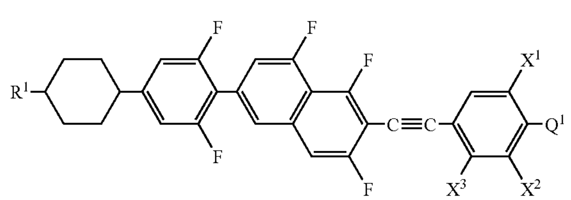
(I-23de)
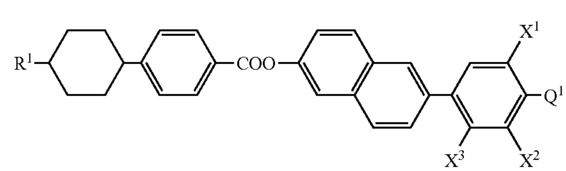

-continued
(I-23df)
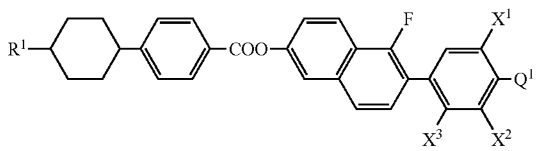
(I-23dg)
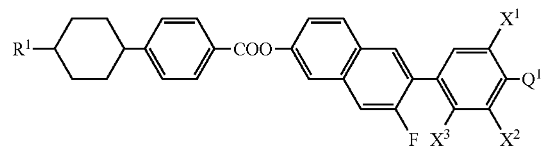
(I-23gh)
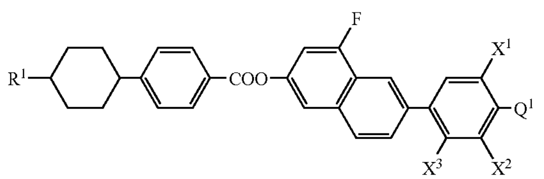
(I-23di)
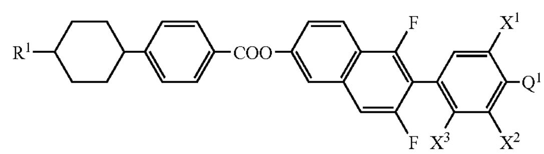
(I-23dj)
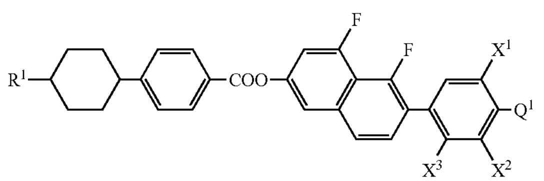
(I-23dk)
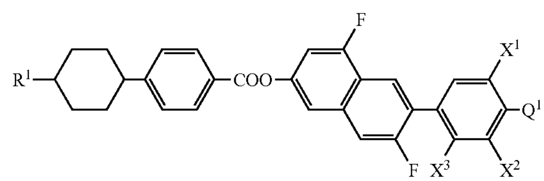
(I-23dl)
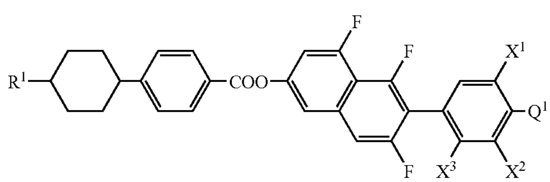
(I-23dm)
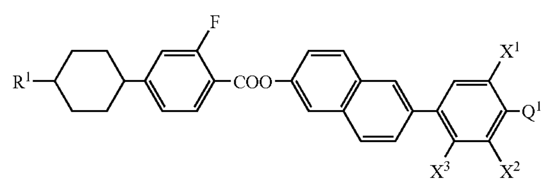
(I-23dn)
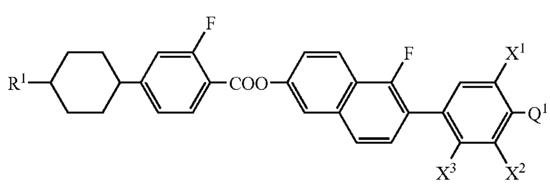
(I-23do)
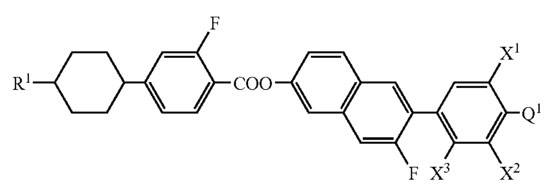
(I-23dp)
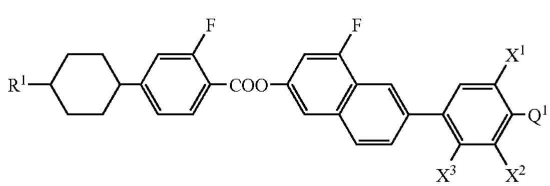
(I-23dq)
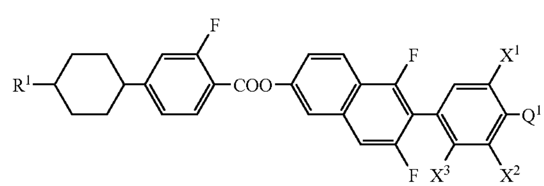
(I-23dr)
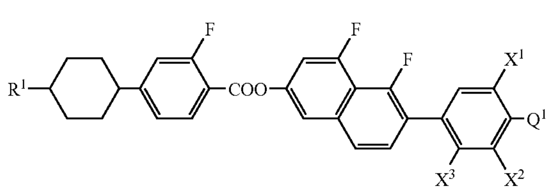
(I-23ds)
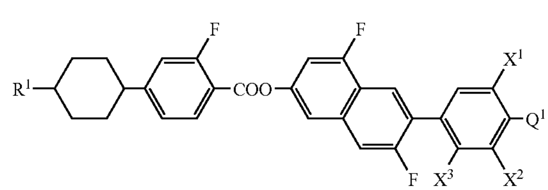
(I-23dt)
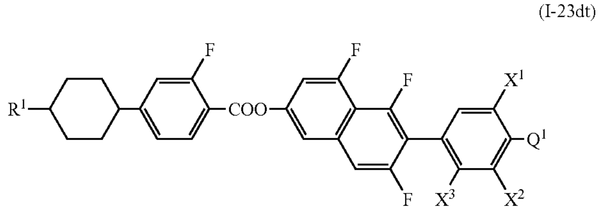
(I-23du)
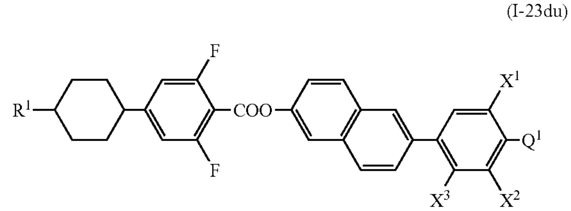

-continued
(I-23dv)
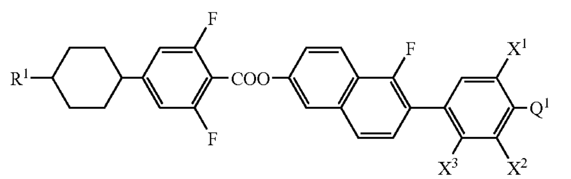
(I-23dw)
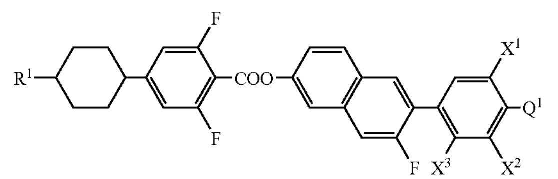
(I-23dx)
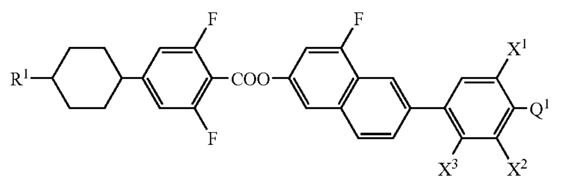
(I-23dy)
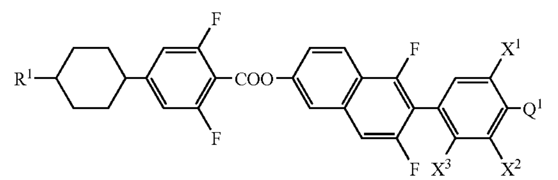
(I-23dz)
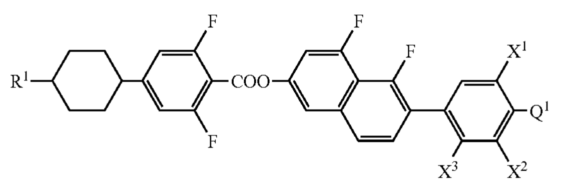
(I-23ea)
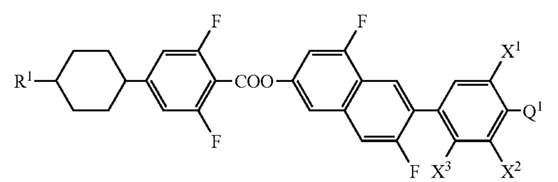
(I-23eb)
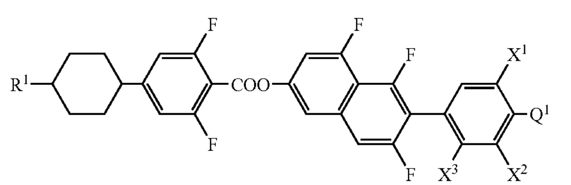
(I-23ec)
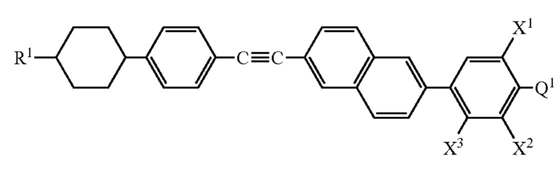
(I-23ed)
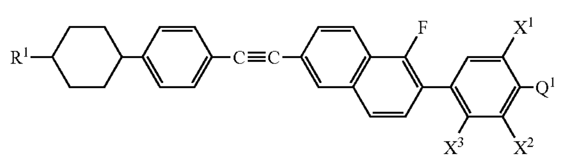
(I-23ee)
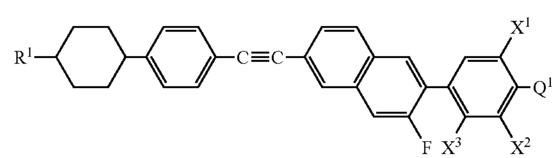
(I-23ef)
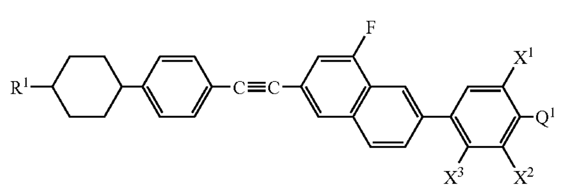
(I-23eg)
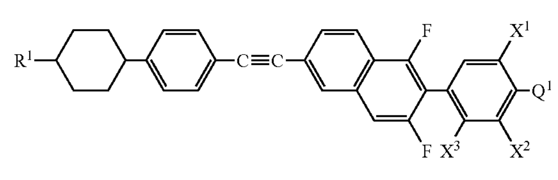
(I-23eh)
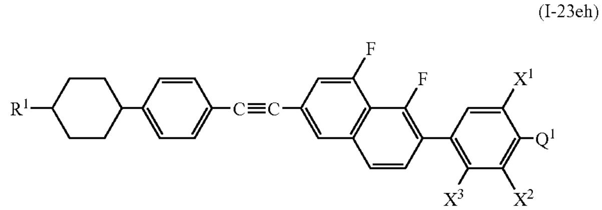
(I-23ei)
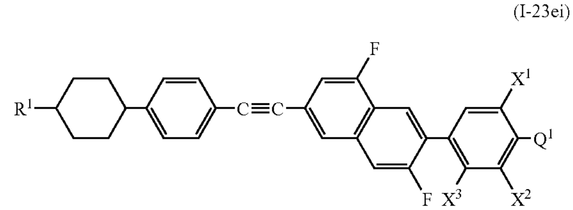
(I-23ej)
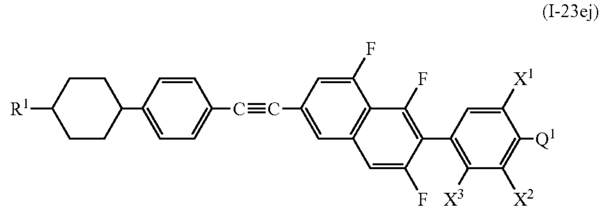
(I-23ek)
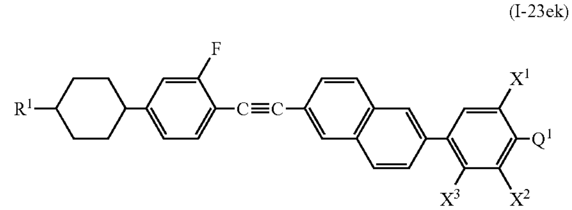

-continued
(I-23el)
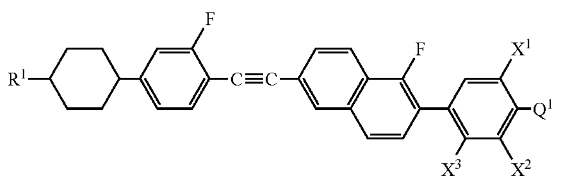
(I-23em)
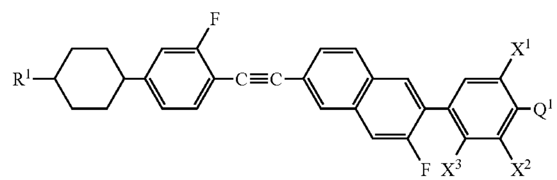
(I-23en)
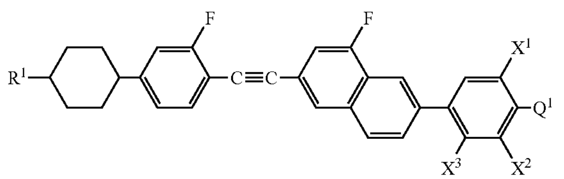
(I-23eo)
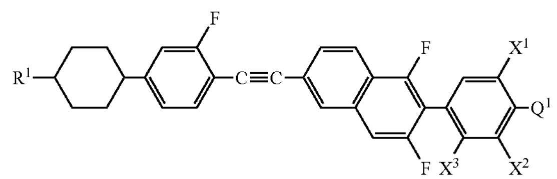
(I-23ep)
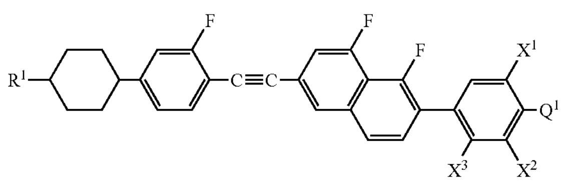
(I-23eq)
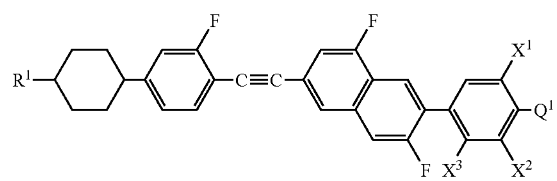
(I-23er)
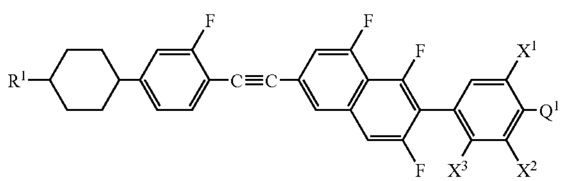
(I-23es)
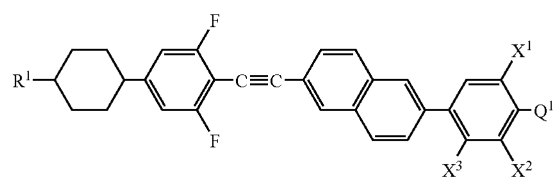
(I-23et)
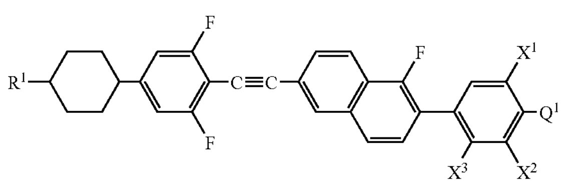
(I-23eu)
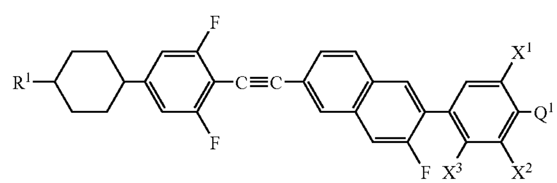
(I-23ev)
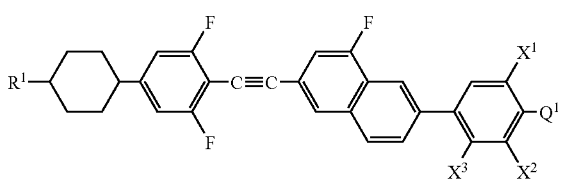
(I-23ew)
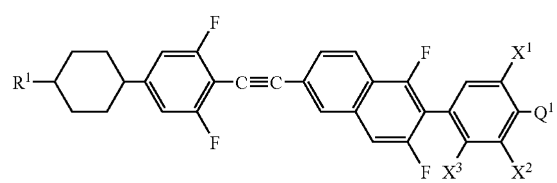
(I-23ex)
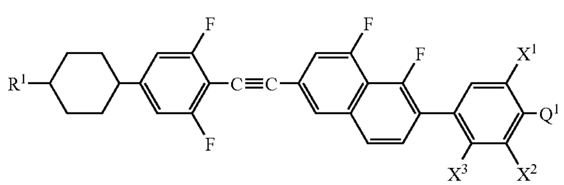
(I-23ey)
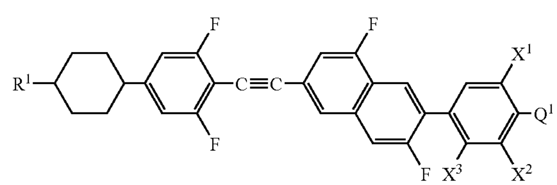
(I-23ez)
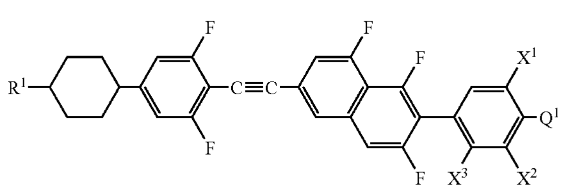
(I-23fa)
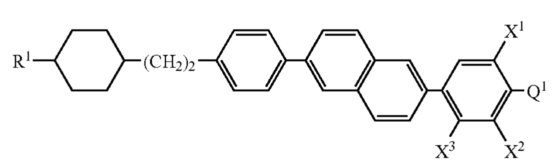

-continued
(I-23fb)
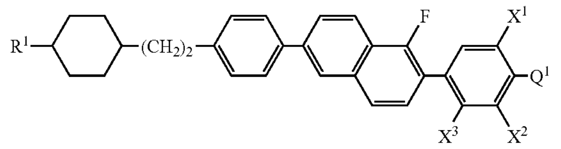
(I-23fc)
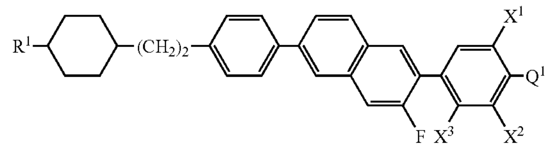
(I-23fd)
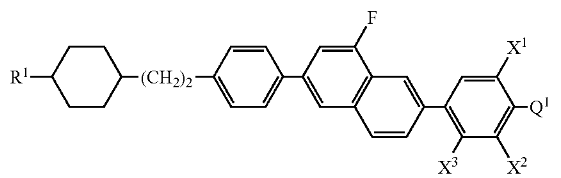
(I-23fe)
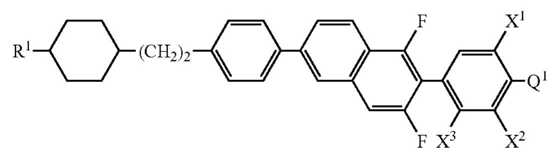
(I-23ff)
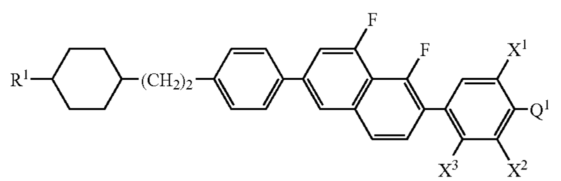
(I-23fg)
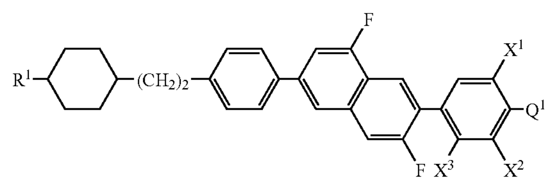
(I-23fh)
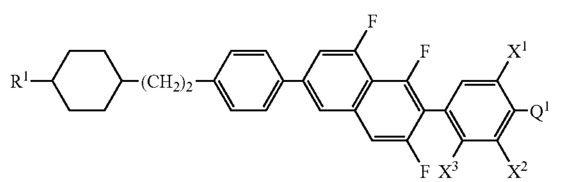
(I-23fi)
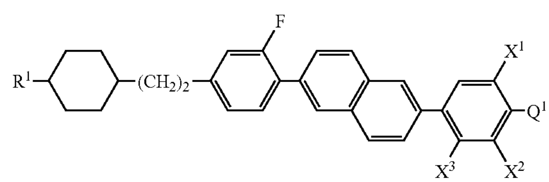
(I-23fj)
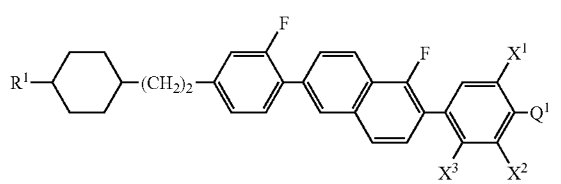
(I-23fk)
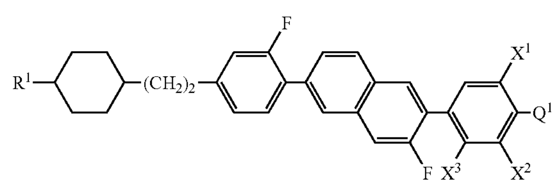
(I-23fl)
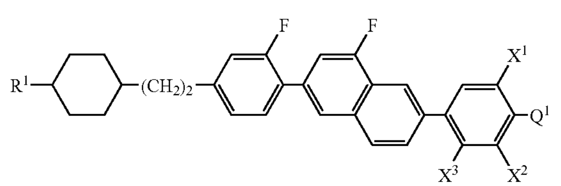
(I-23fm)
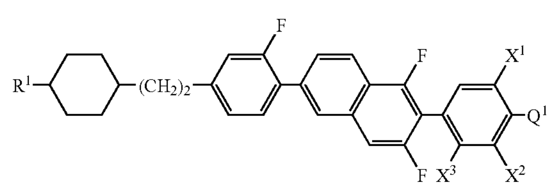
(I-23fn)
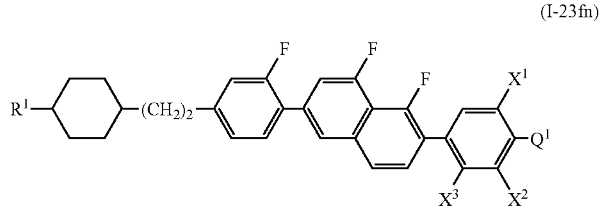
(I-23fo)
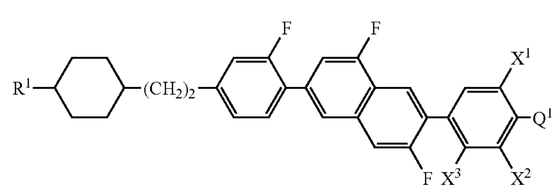
(I-23fp)
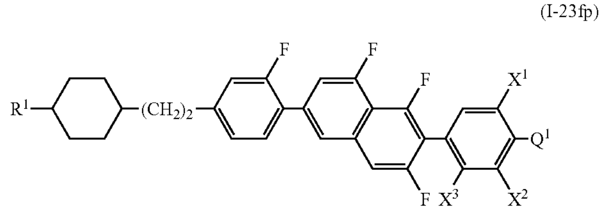
(I-23fq)
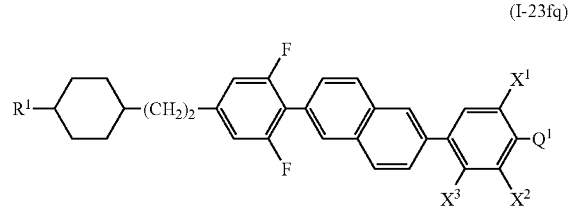

-continued
(I-23fr)
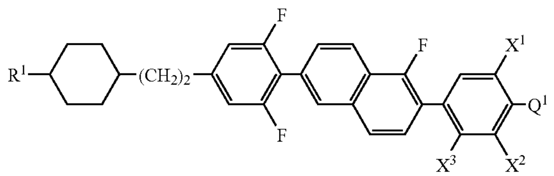
(I-23fs)
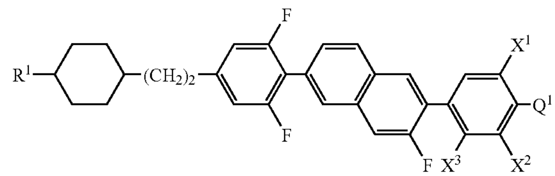
(I-23ft)
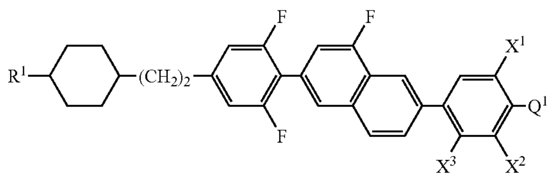
(I-23fu)
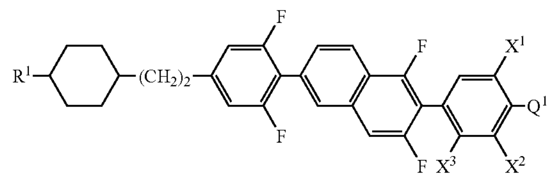
(I-23fv)
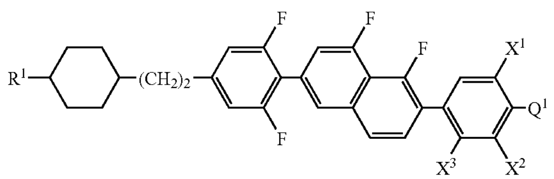
(I-23fw)
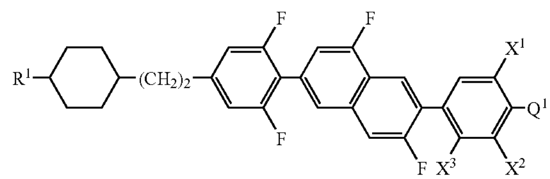
(I-23fx)
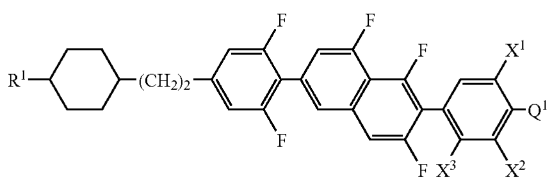
(I-23fy)
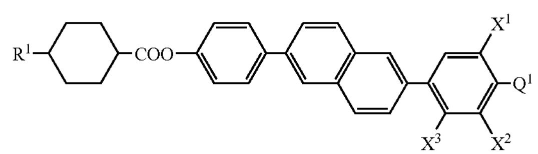
(I-23fz)
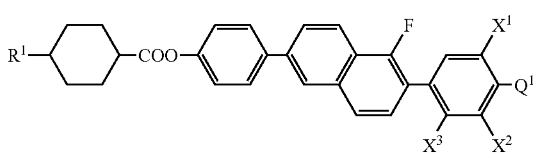
(I-23ga)
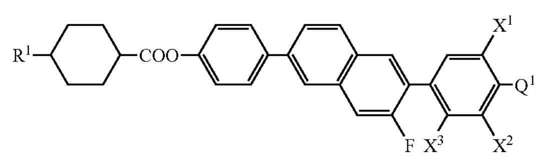
(I-23gb)
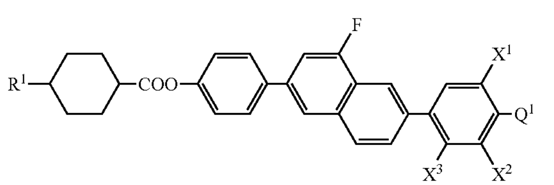
(I-23gc)
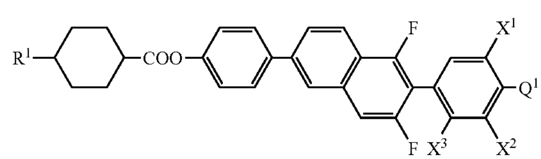
(I-23gd)
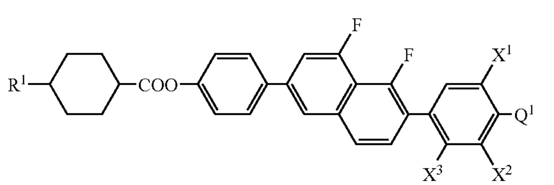
(I-23ge)
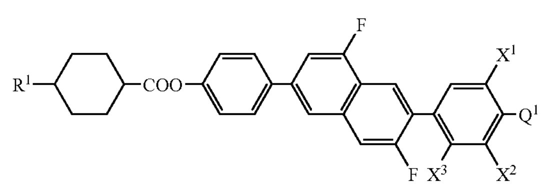
(I-23gf)
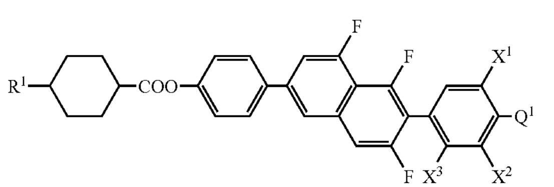
(I-23gg)
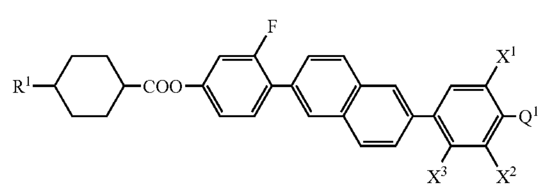

-continued
(I-23gh)
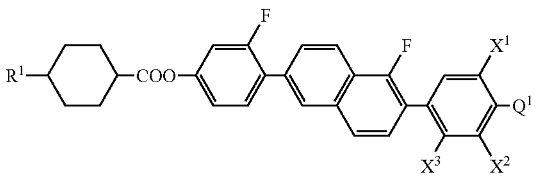
(I-23gi)
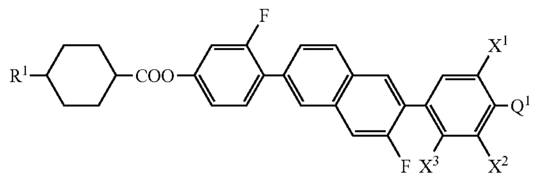
(I-23gj)
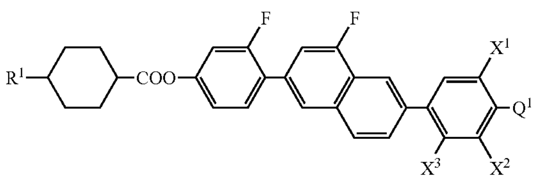
(I-23gk)
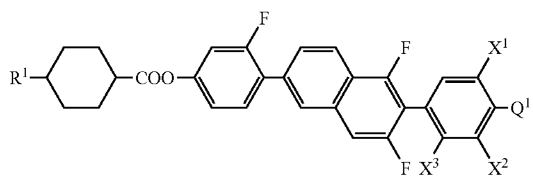
(I-23gl)
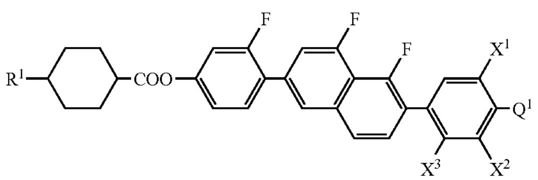
(I-23gm)
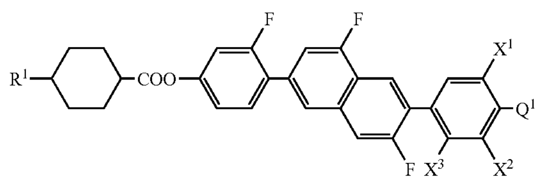
(I-23gn)
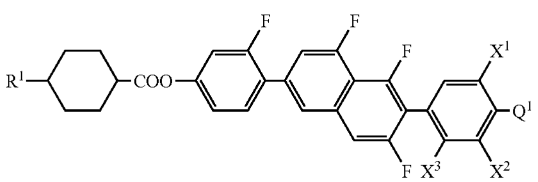
(I-23go)
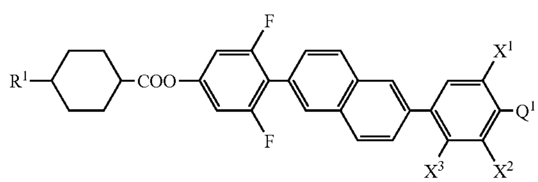
(I-23gp)
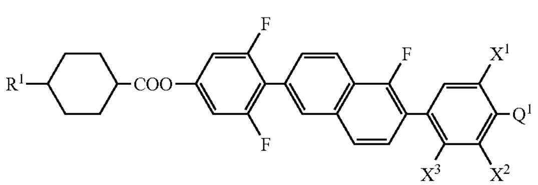
(I-23gq)
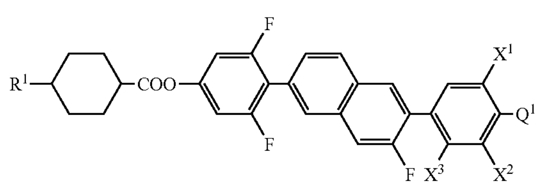
(I-23gr)
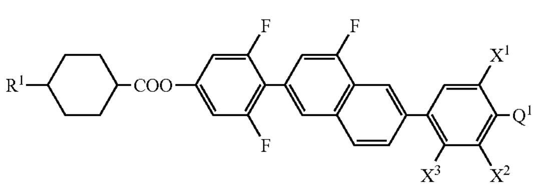
(I-23gs)
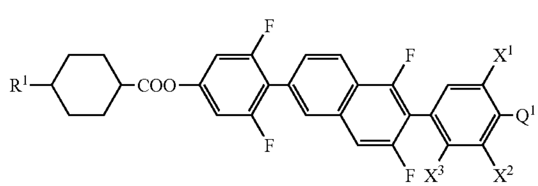
(I-23gt)
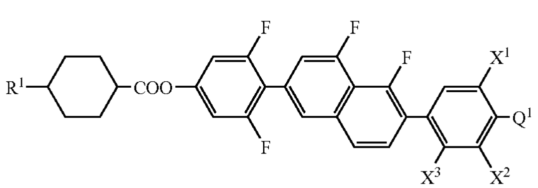
(I-23gu)
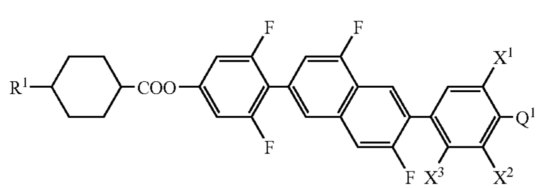
(I-23gv)
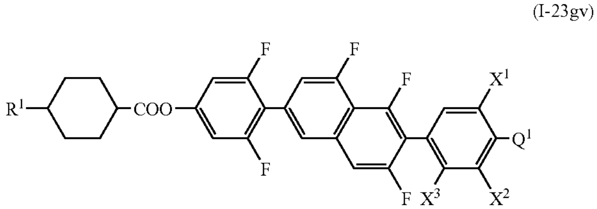
(I-23gw)
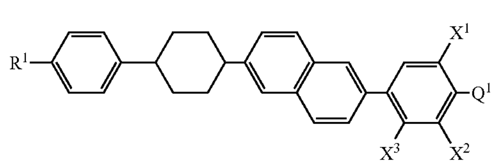

-continued
(I-23gx)
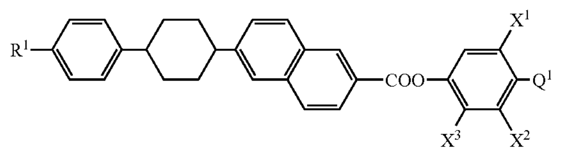
(I-23gy)
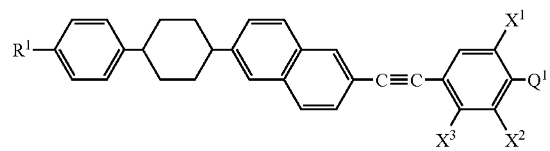
(I-23gz)
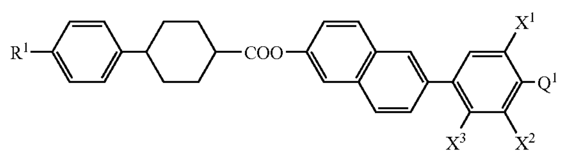
(I-23ha)
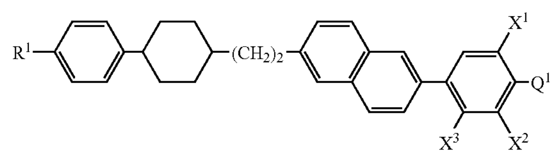
(I-23hb)
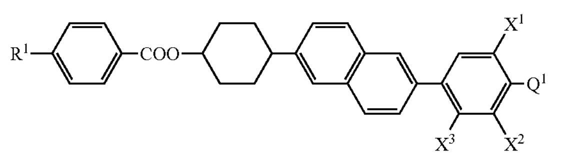
(I-23hc)
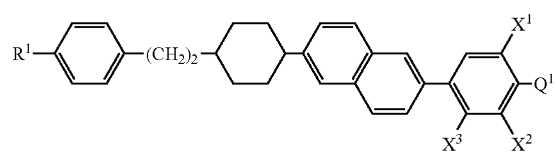
(I-23hd)
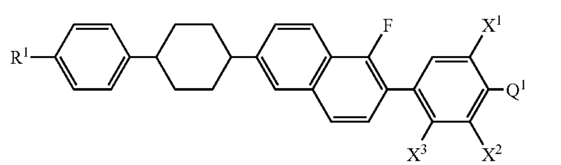
(I-23he)
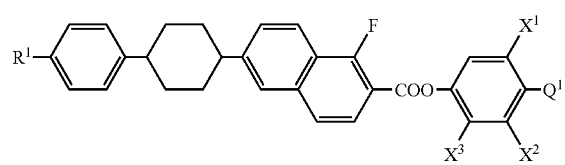
(I-23hf)
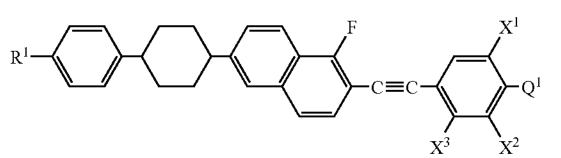
(I-23hg)
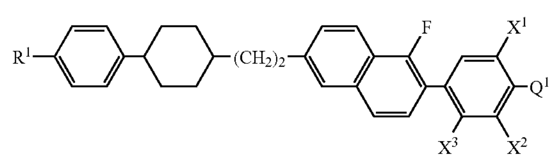
(I-23hh)
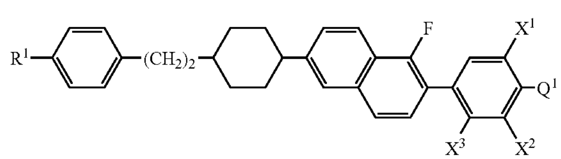
(I-23hi)
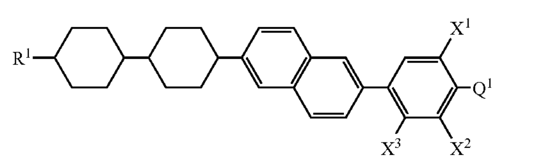
(I-23hj)
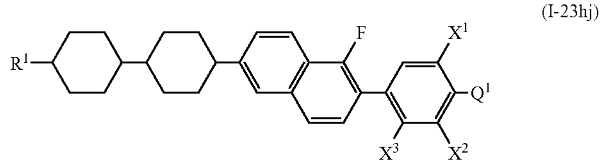
(I-23hk)
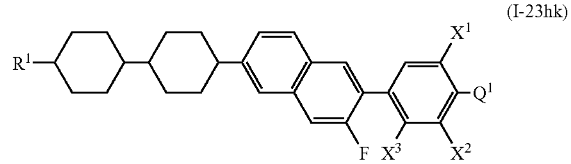
(I-23hl)
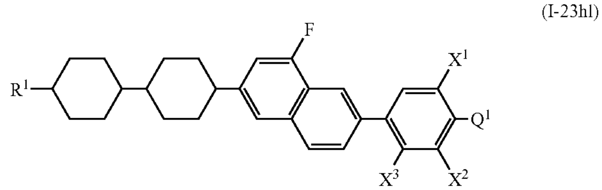
(I-23hm)
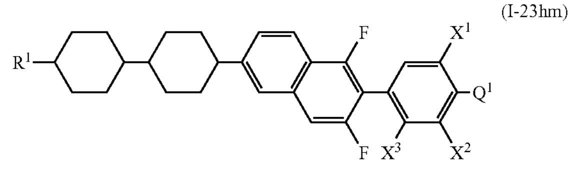
(I-23hn)
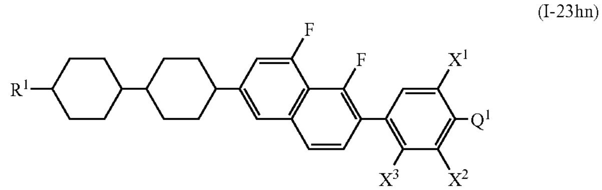
(I-23ho)
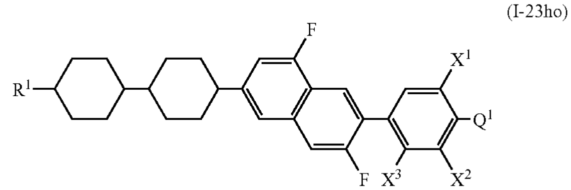

-continued
(I-23hp)
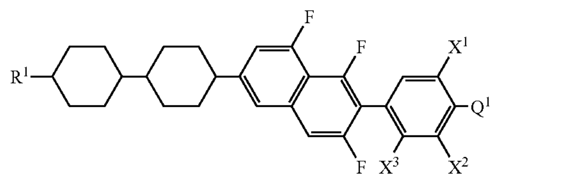
(I-23hq)
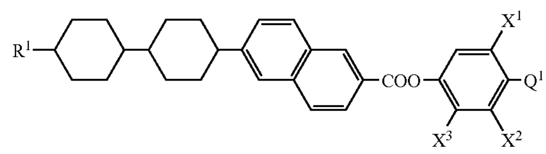
(I-23hr)
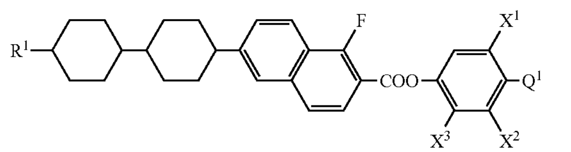
(I-23hs)
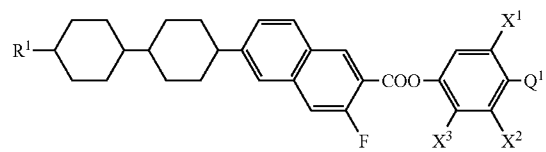
(I-23ht)
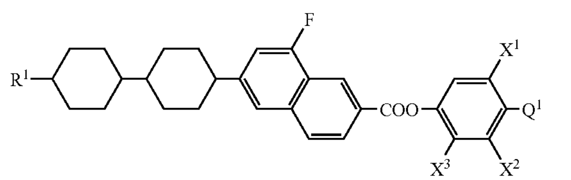
(I-23hu)
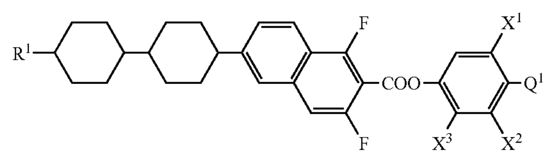
(I-23hv)
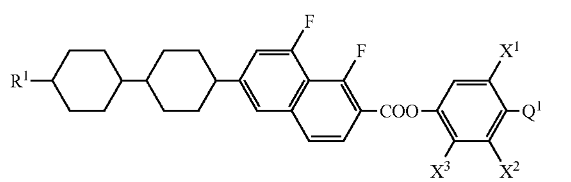
(I-23hw)
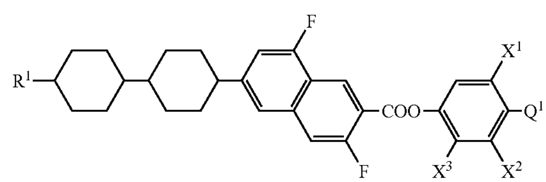
(I-23hx)
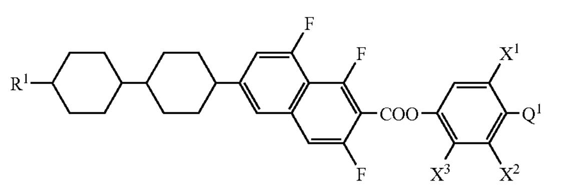
(I-23hy)
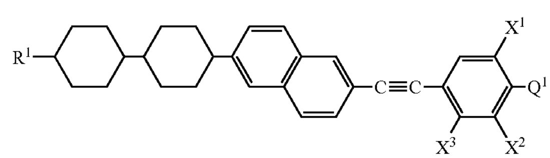
(I-23hz)
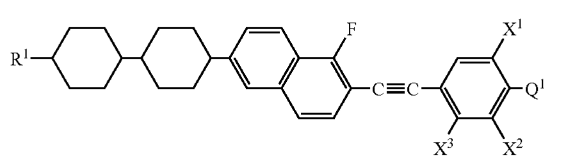
(I-23ia)
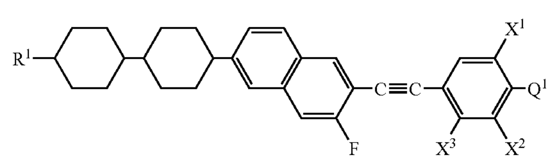
(I-23ib)
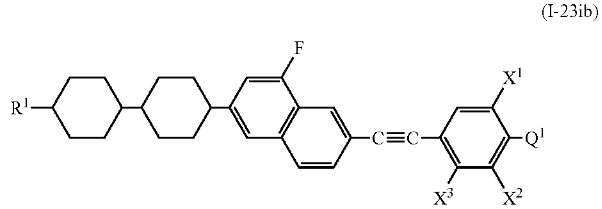
(I-23ic)
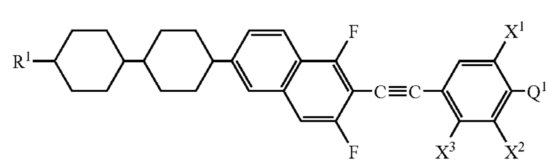
(I-23id)
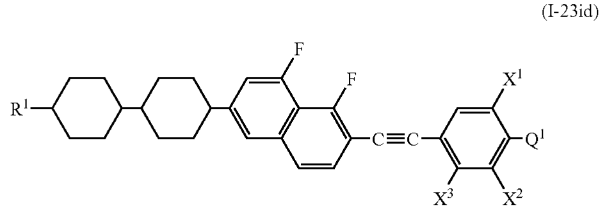
(I-23ie)
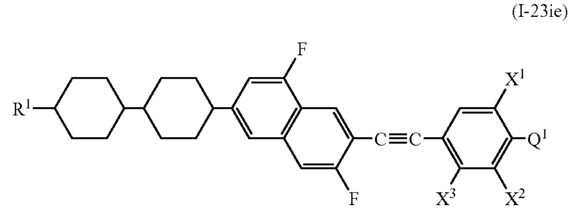

-continued
(I-23if)
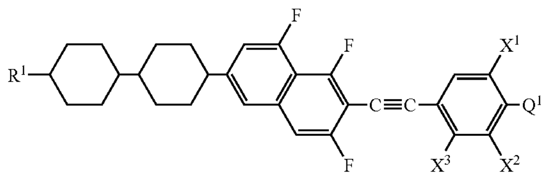
(I-23ig)
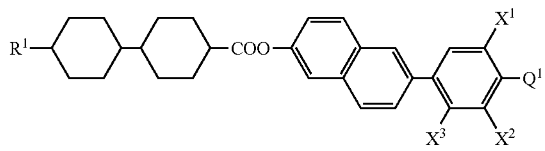
(I-23ih)
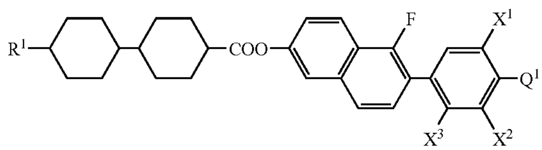
(I-23ii)
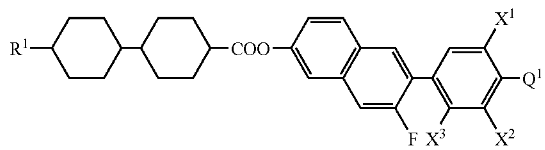
(I-23ij)
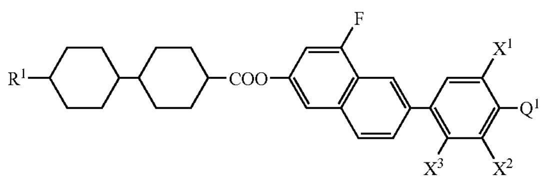
(I-23ik)
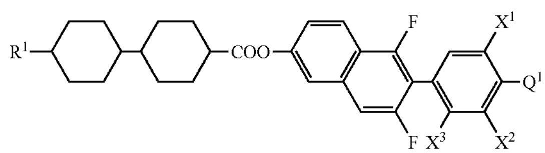
(I-23il)
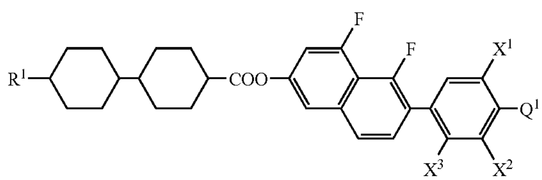
(I-23im)
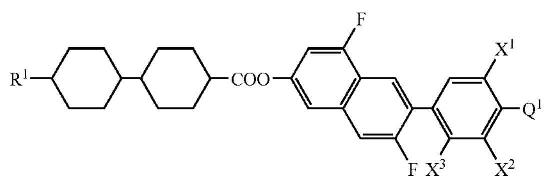
(I-23in)
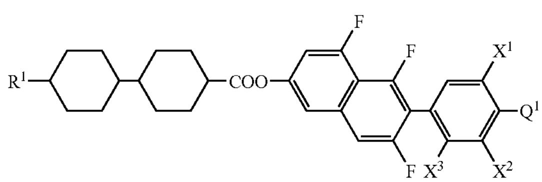
(I-23io)
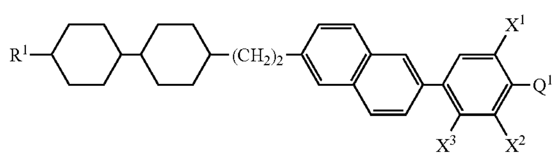
(I-23ip)
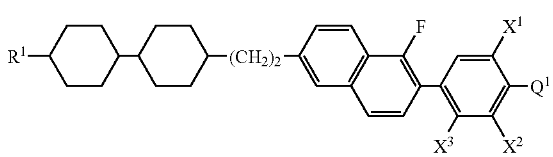
(I-23iq)
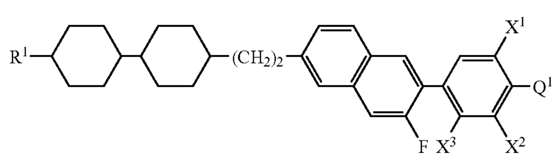
(I-23ir)
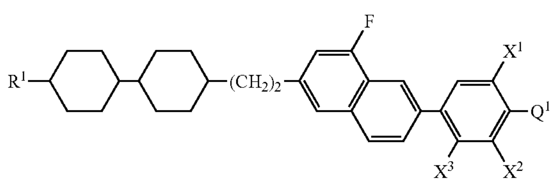
(I-23is)
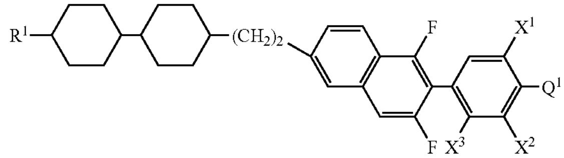
(I-23it)
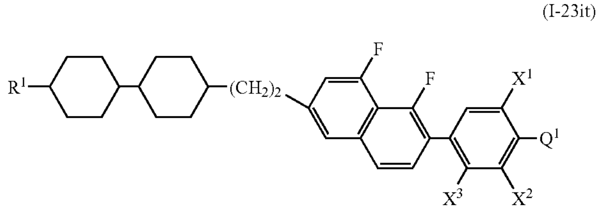
(I-23iu)
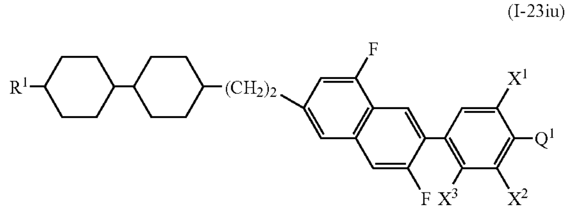

-continued
(I-23iv)
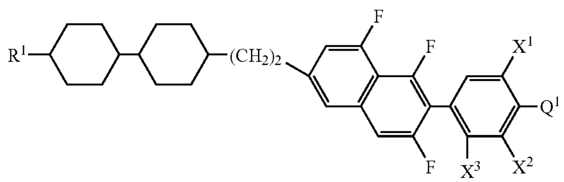
(I-23iw)
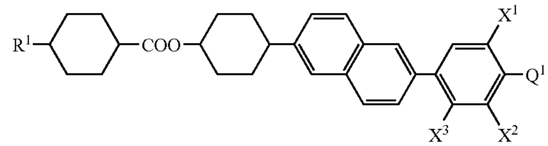
(I-23ix)
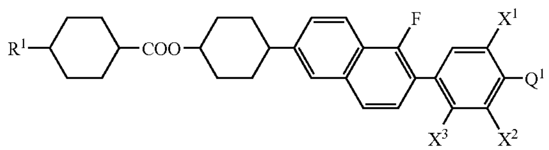
(I-23iy)
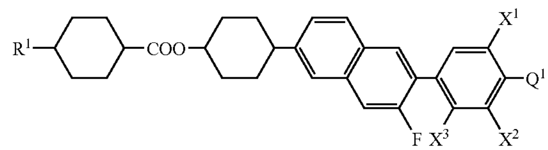
(I-23iz)
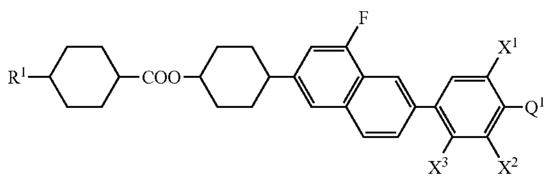
(I-23ja)
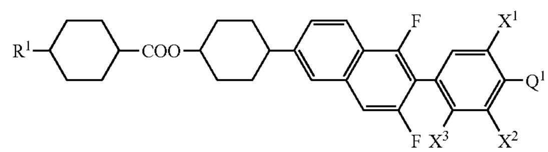
(I-23jb)
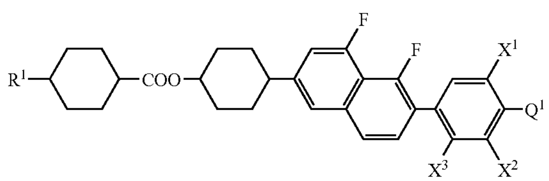
(I-23jc)
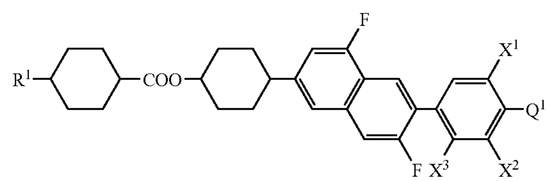
(I-23jd)
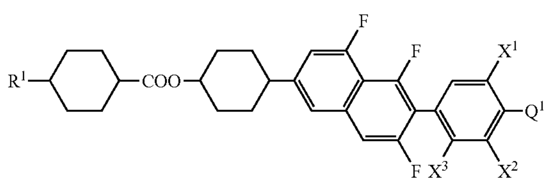
(I-23je)
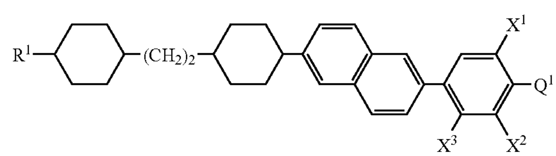
(I-23jf)
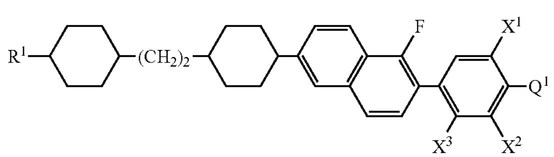
(I-23jg)
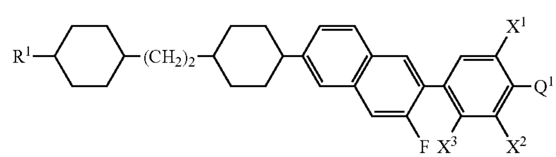
(I-23jh)
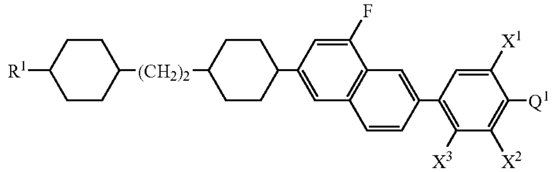
(I-23ji)
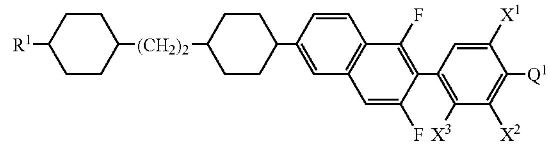
(I-23jj)
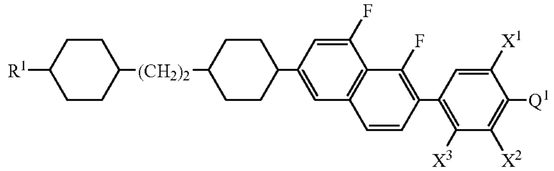
(I-23jk)
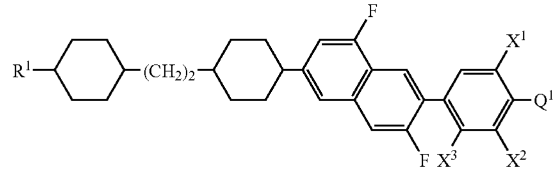

-continued
(I-23jl)
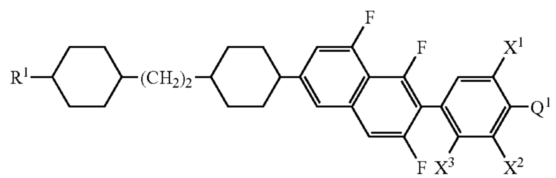
(I-23jm)
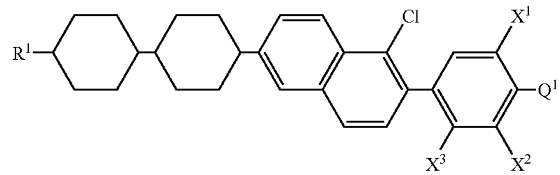
(I-23jn)
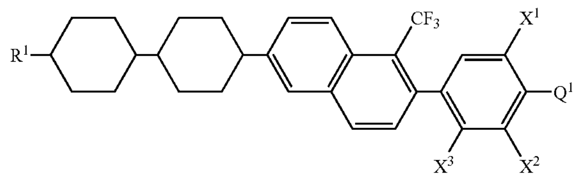
(I-23jo)
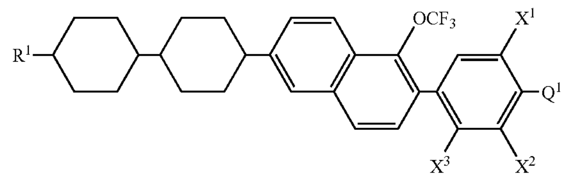
(I-23jp)
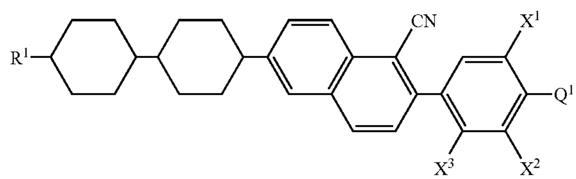
(I-31a)
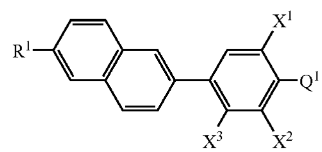
(I-31b)
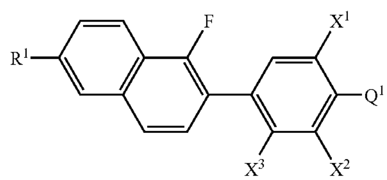
(I-31c)
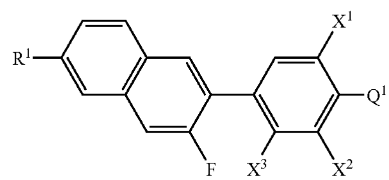
(I-31d)
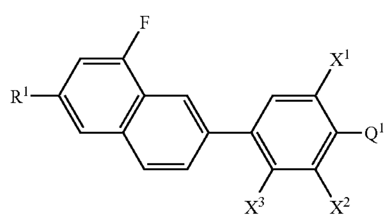
(I-31e)
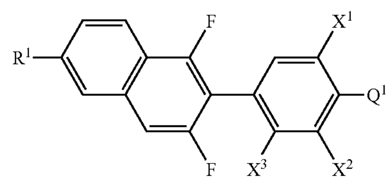
(I-31f)
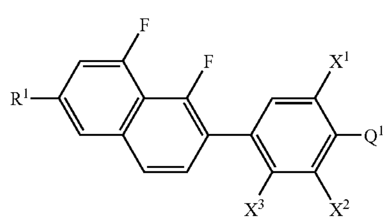
(I-31g)
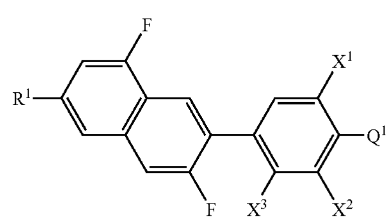
(I-31h)
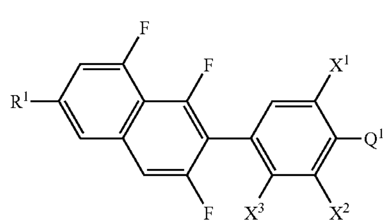
(I-31i)
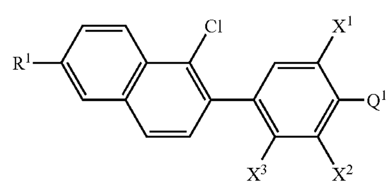

-continued
(I-31j)
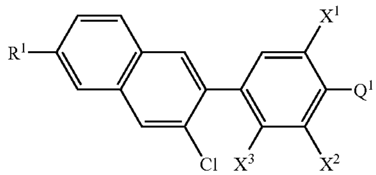
(I-31k)
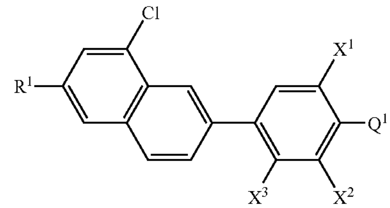
(I-31l)
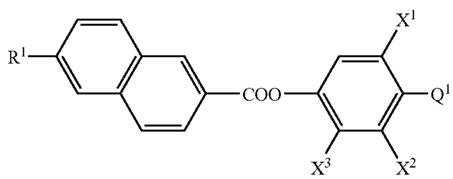
(I-31m)
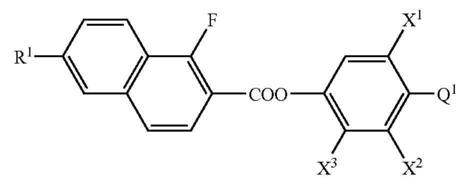
(I-31n)
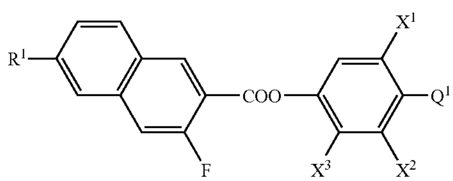
(I-31o)
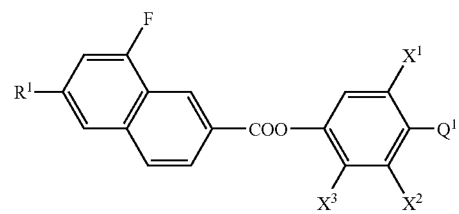
(I-31p)
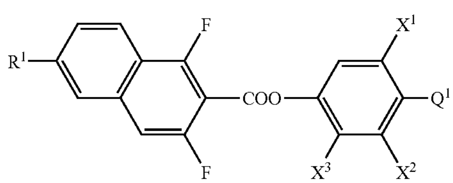
(I-31q)
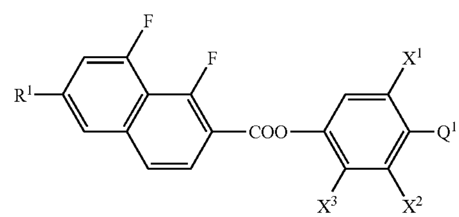
(I-31r)
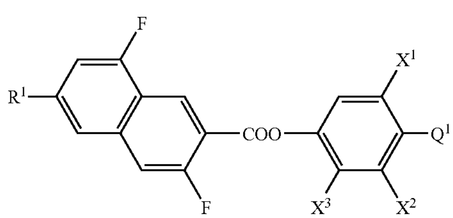
(I-31s)
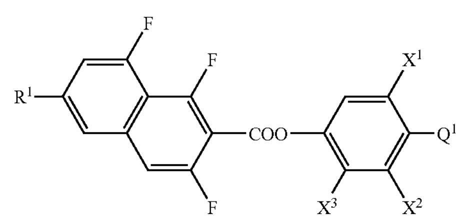
(I-31t)
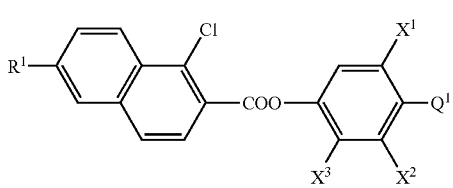
(I-31u)
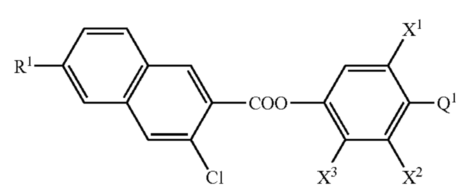
(I-31v)
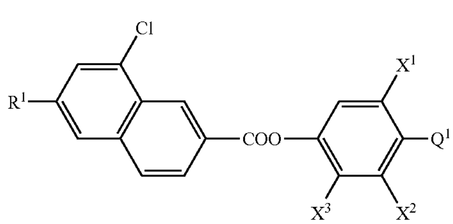
(I-31w)
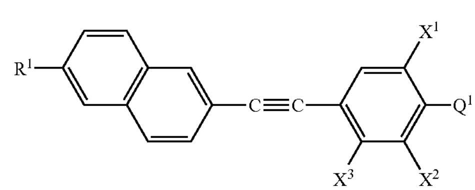

-continued
(I-31x)
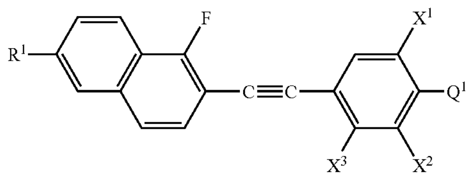
(I-31y)
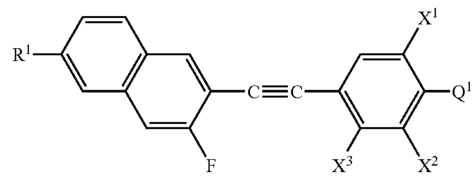
(I-31z)
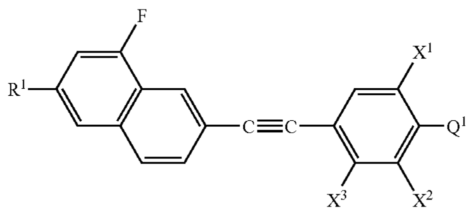
(I-31aa)
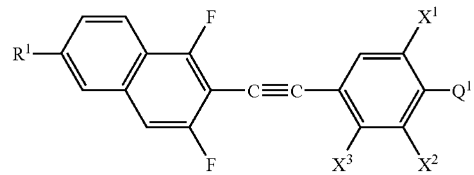
(I-31ab)
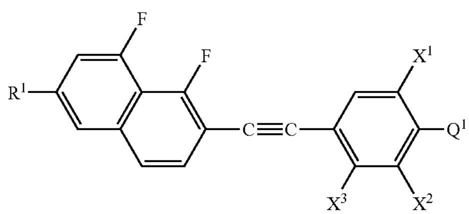
(I-31ac)
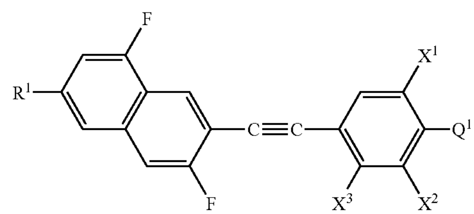
(I-31ad)
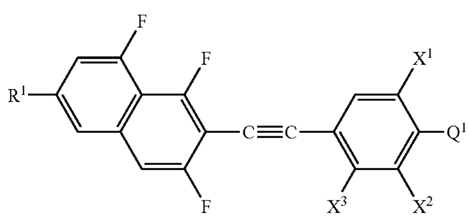
(I-31ae)
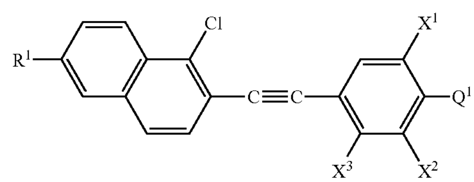
(I-31af)
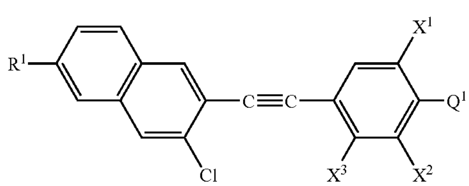
(I-31ag)
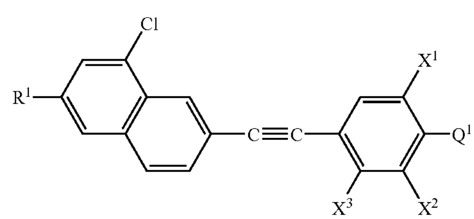
(I-32a)
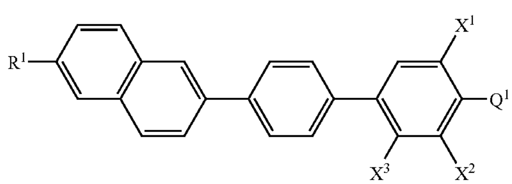
(I-32b)
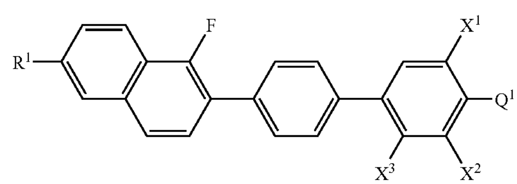
(I-32c)
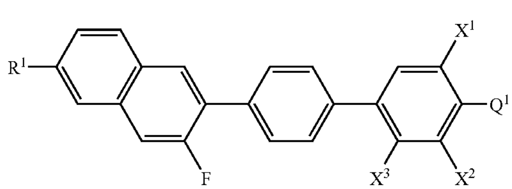
(I-32d)
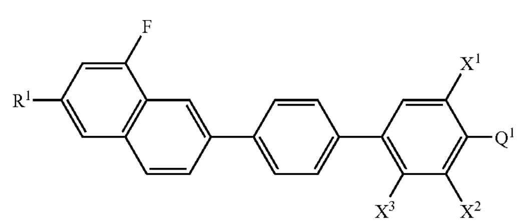

-continued
(I-32e)
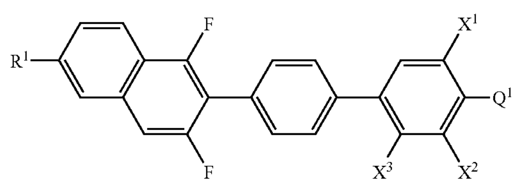
(I-32f)
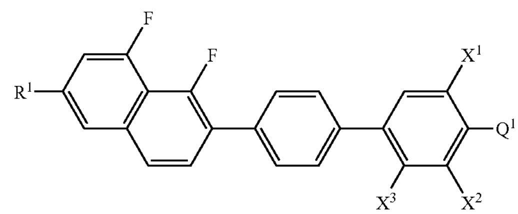
(I-32g)
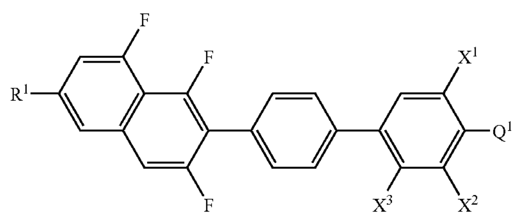
(I-32h)
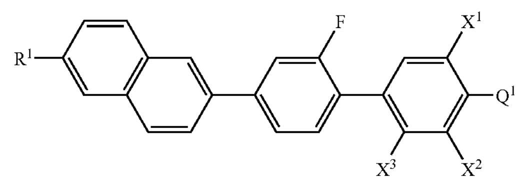
(I-32i)
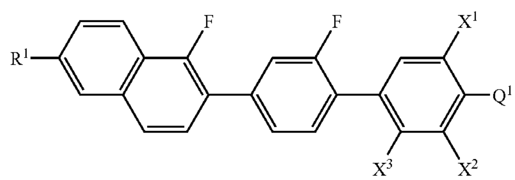
(I-32j)
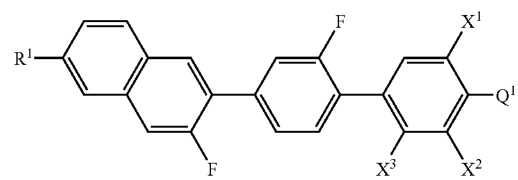
(I-32k)
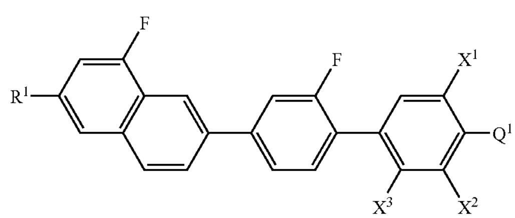
(I-32l)
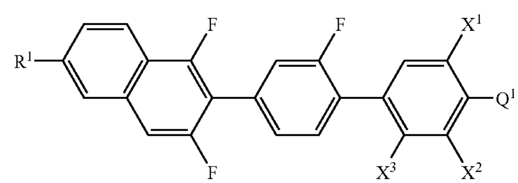
(I-32m)
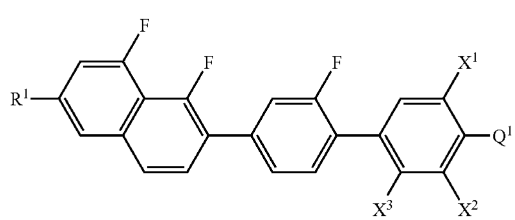
(I-32n)
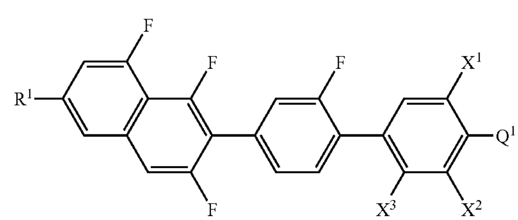
(I-32o)
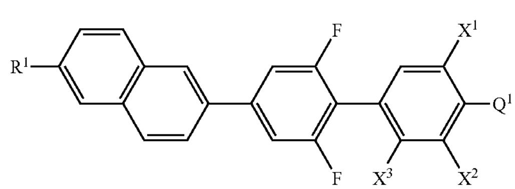
(I-32p)
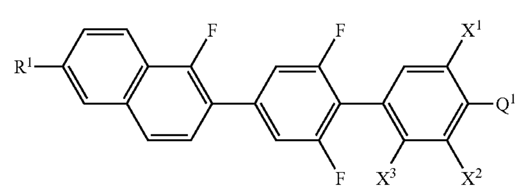
(I-32q)
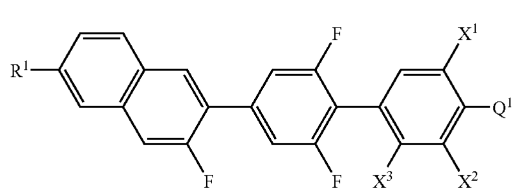
(I-32r)
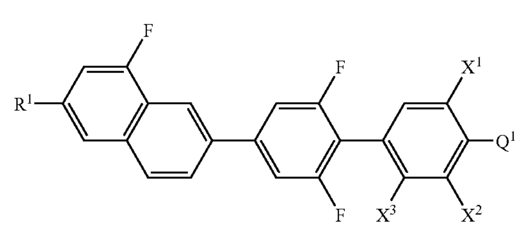

-continued
(I-32s)
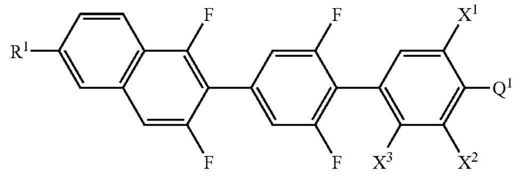
(I-32t)
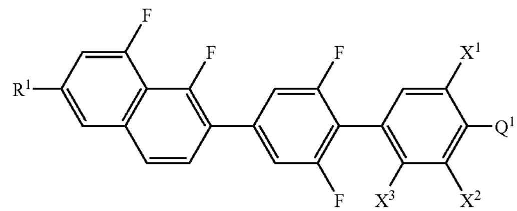
(I-32u)
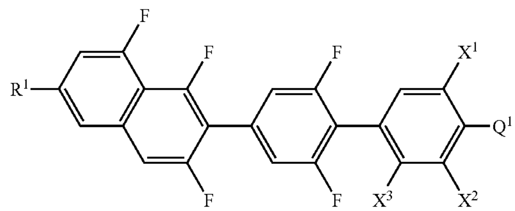
(I-32v)
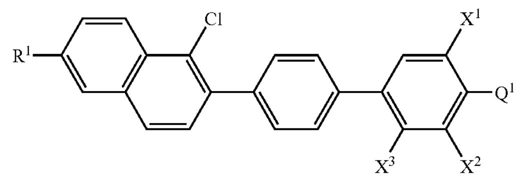
(I-32w)
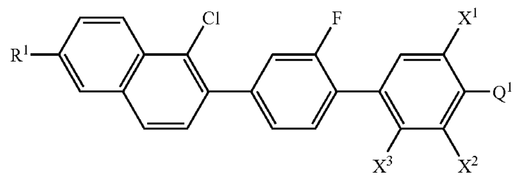
(I-32x)
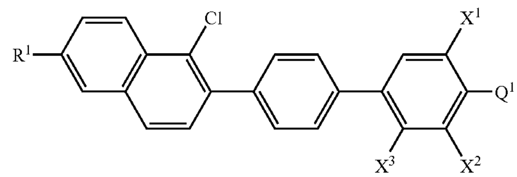
(I-32y)
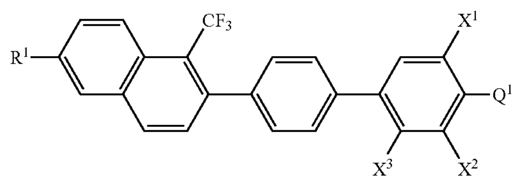
(I-32z)
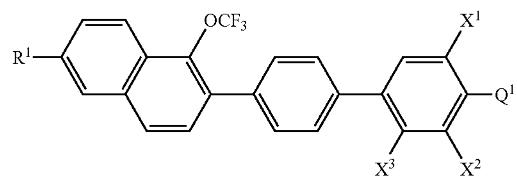
(I-32aa)
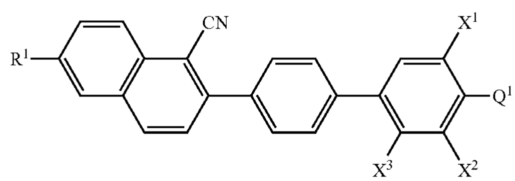
(I-32ab)
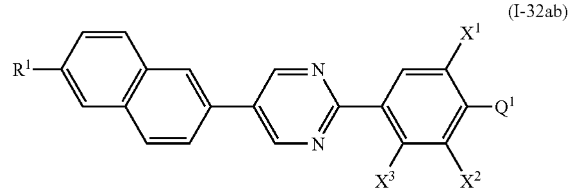
(I-32ac)
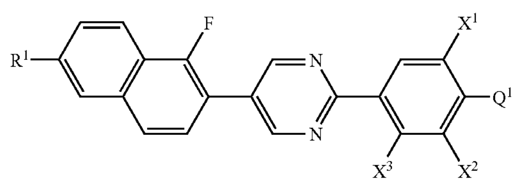
(I-32ad)
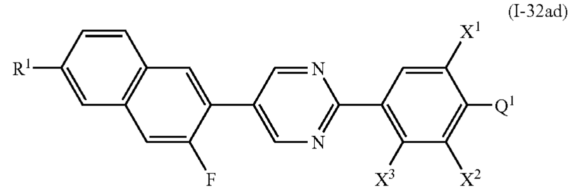
(I-32ae)
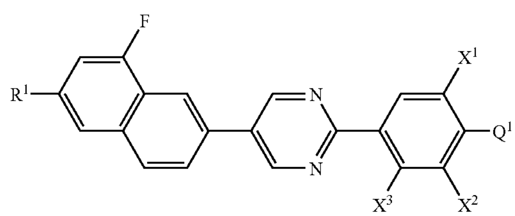
(I-32af)
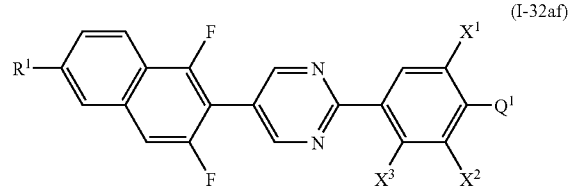
(I-31ag)
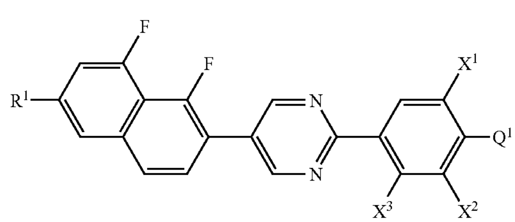
(I-32ah)
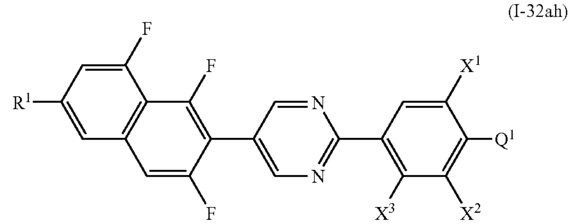

-continued
(I-32ai)
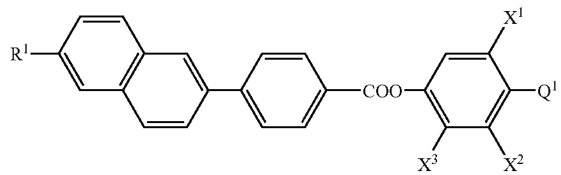
(I-32aj)
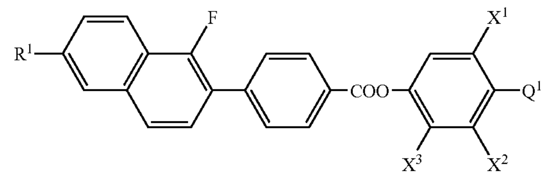
(I-32ak)
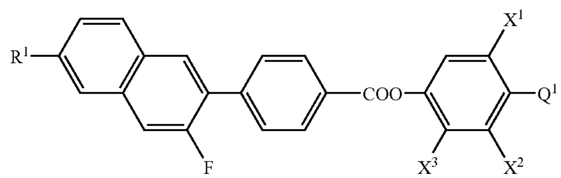
(I-32al)
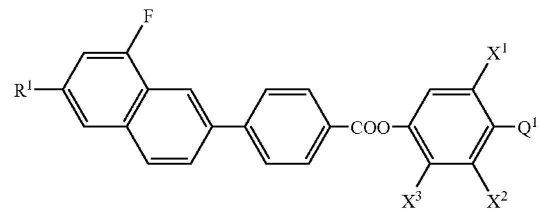
(I-32am)
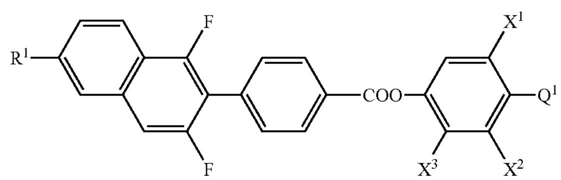
(I-32an)
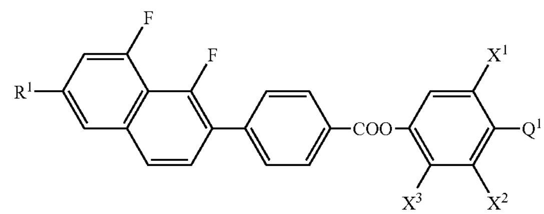
(I-32ao)
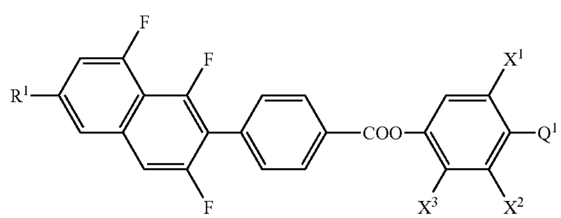
(I-32ap)
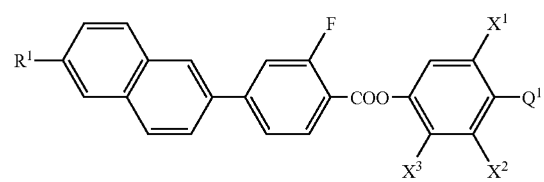
(I-31aq)
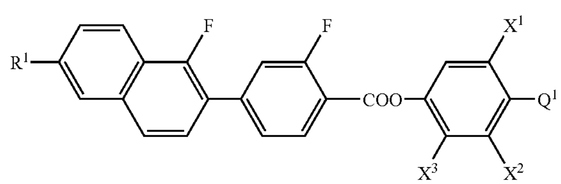
(I-32ar)
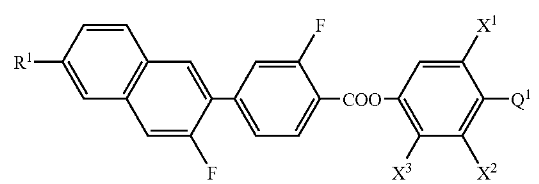
(I-32as)
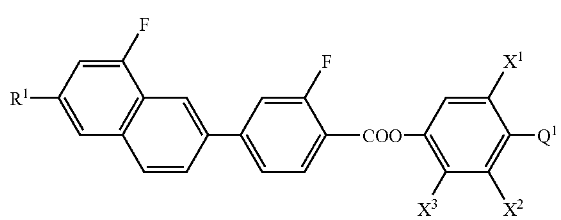
(I-32at)
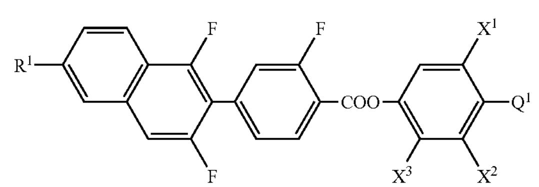
(I-32au)
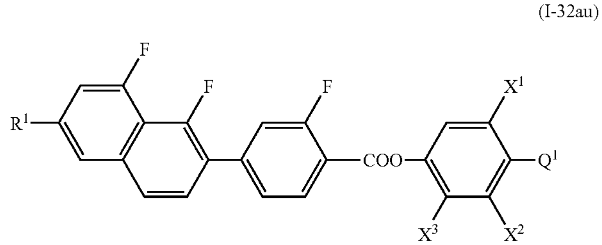
(I-32av)
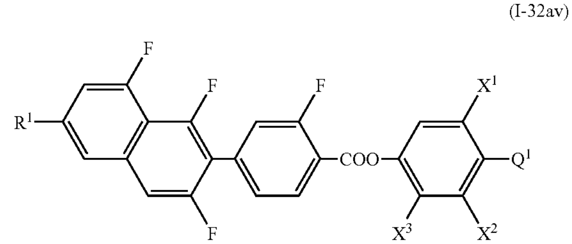

-continued
(I-32aw)
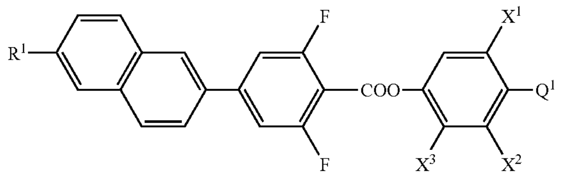
(I-32ax)
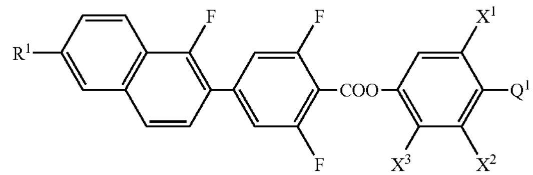
(I-32ay)
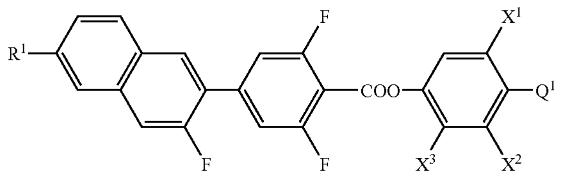
(I-32az)
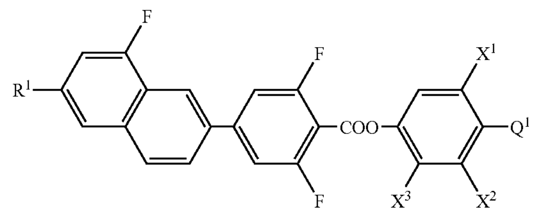
(I-32ba)
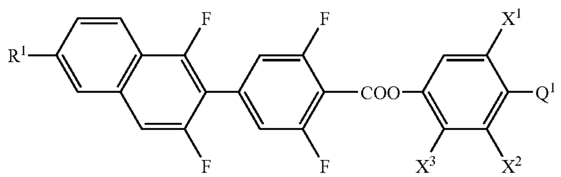
(I-32bb)
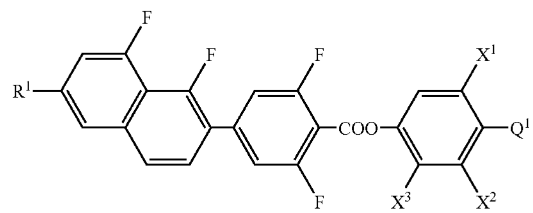
(I-32bc)
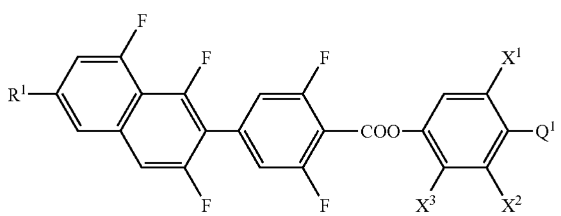
(I-32bd)
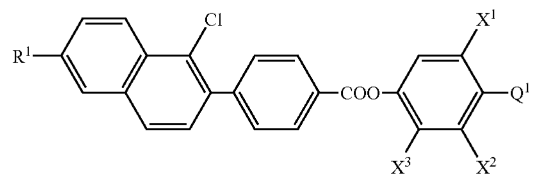
(I-32be)
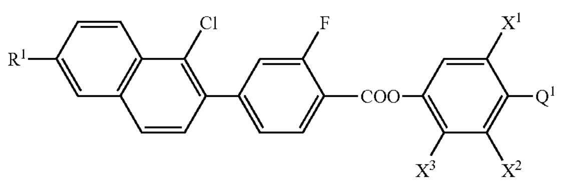
(I-32bf)
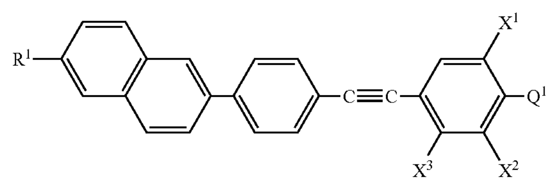
(I-32bg)
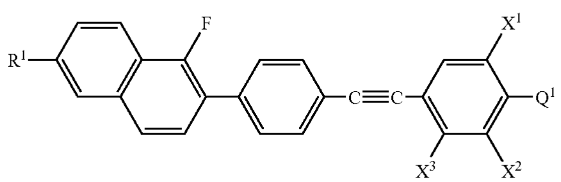
(I-32bh)
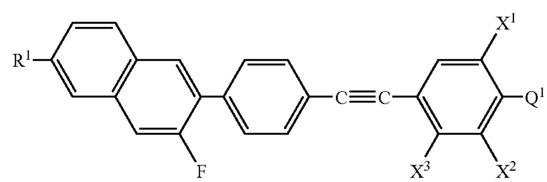
(I-32bi)
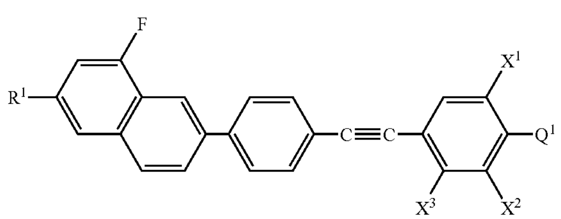
(I-32bj)
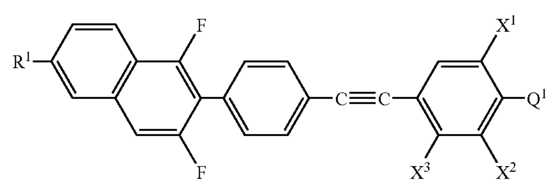

-continued
(I-32bk)
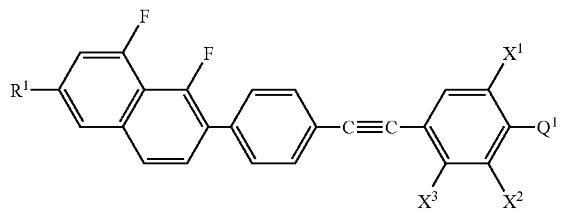
(I-32bl)
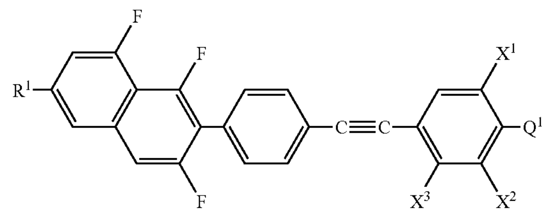
(I-32bm)
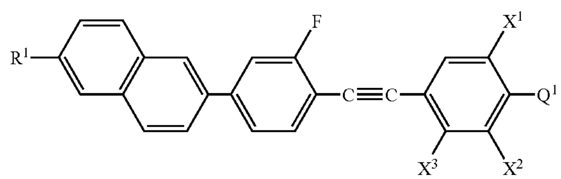
(I-32bn)
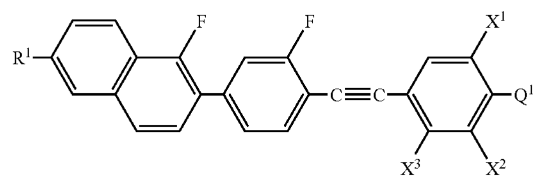
(I-32bo)
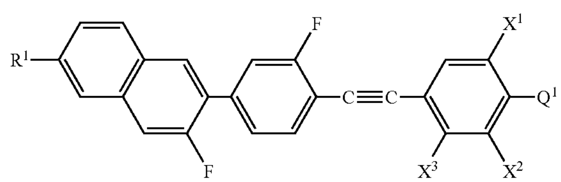
(I-32bp)
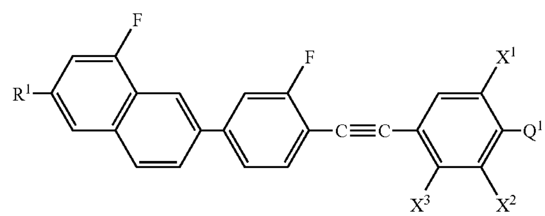
(I-32bq)
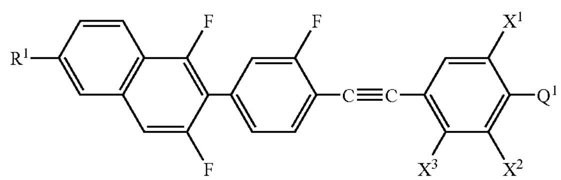
(I-32br)
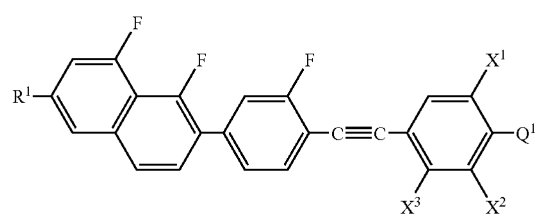
(I-32bs)
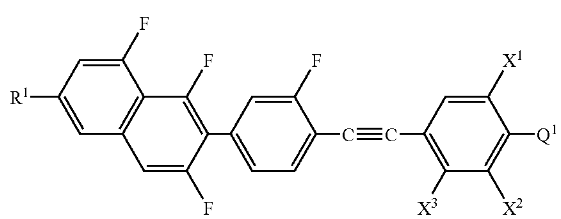
(I-32bt)
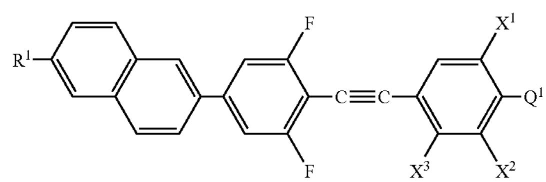
(I-32bu)
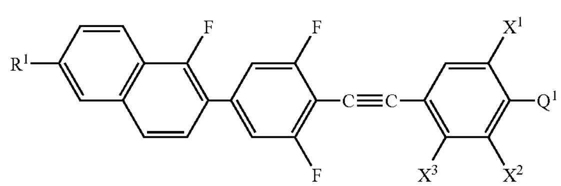
(I-32bv)
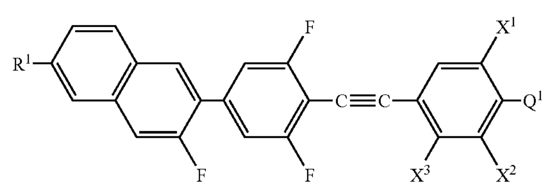
(I-32bw)
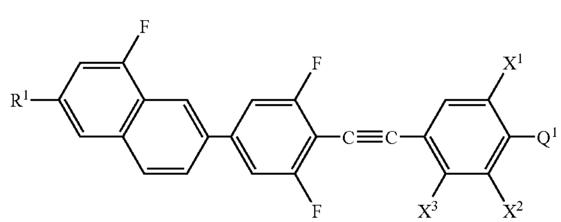
(I-32bx)
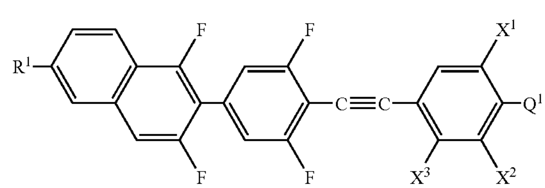

-continued
(I-32by)
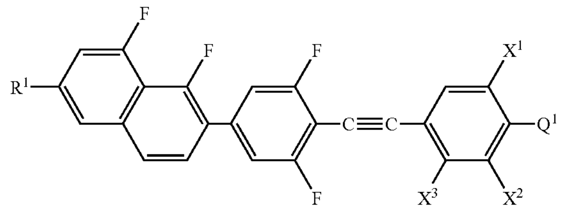
(I-32bz)
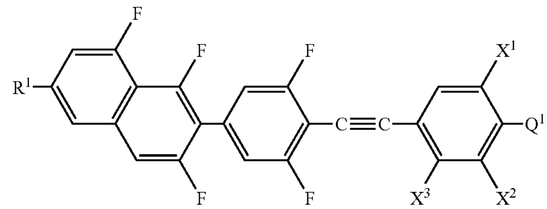
(I-32ca)
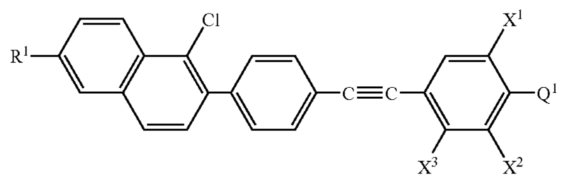
(I-32cb)
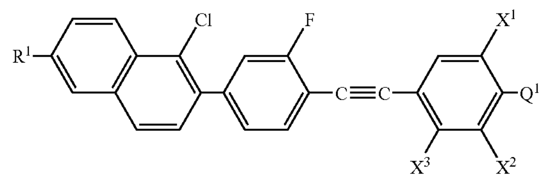
(I-32cc)
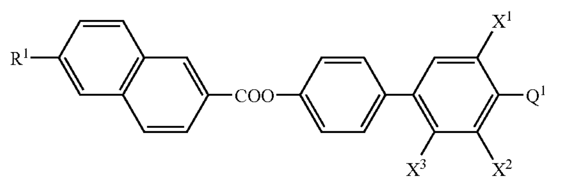
(I-32cd)
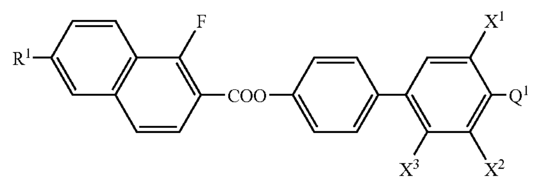
(I-32ce)
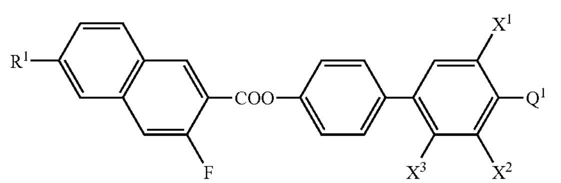
(I-32cf)
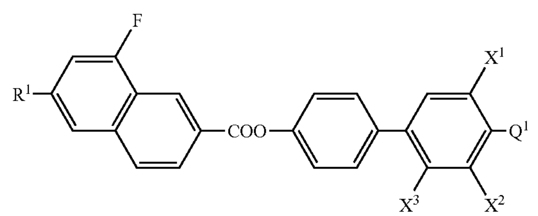
(I-32cg)
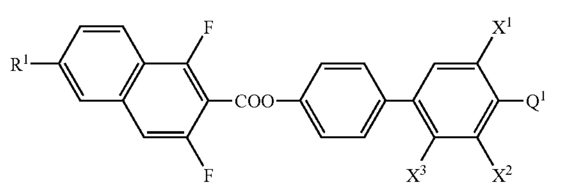
(I-32ch)
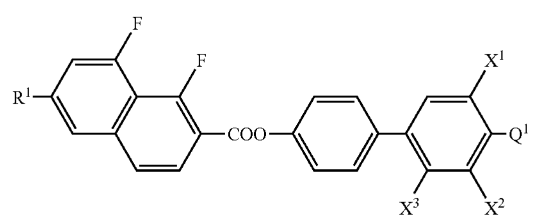
(I-32ci)
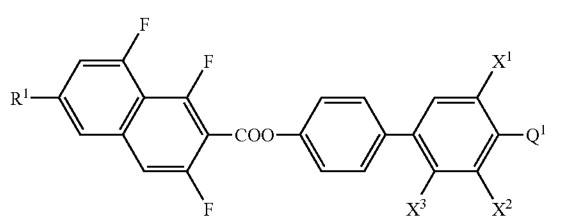
(I-32cj)
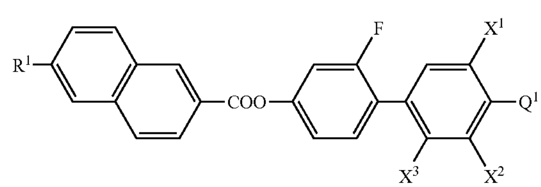
(I-32ck)
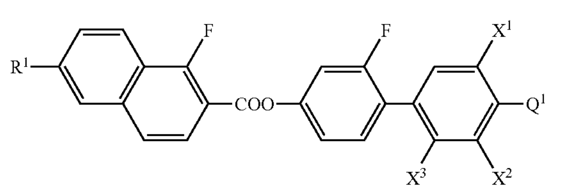
(I-32cl)
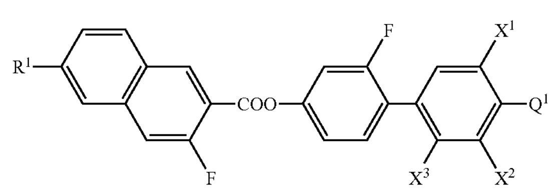

-continued
(I-32cm)
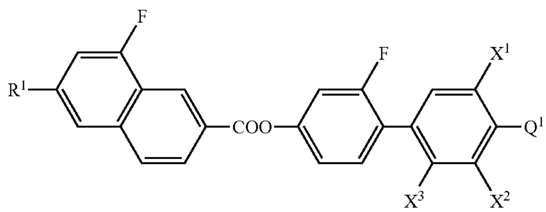
(I-32cn)
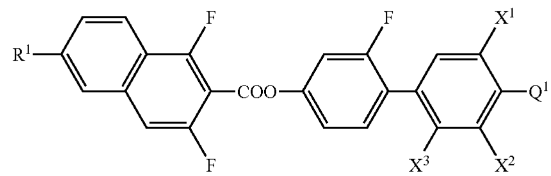
(I-32co)
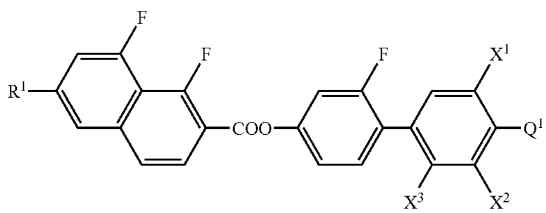
(I-32cp)
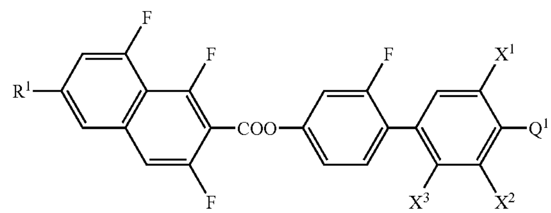
(I-32cq)
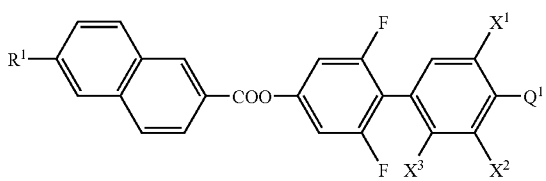
(I-32cr)
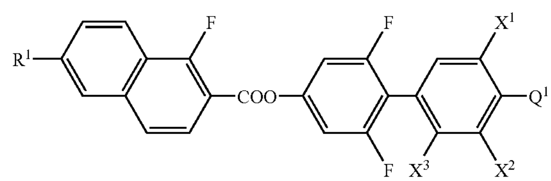
(I-32cs)
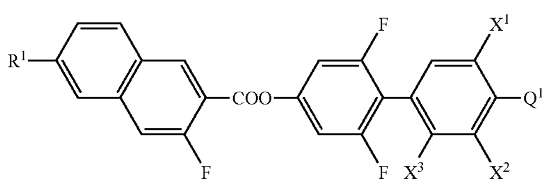
(I-32ct)
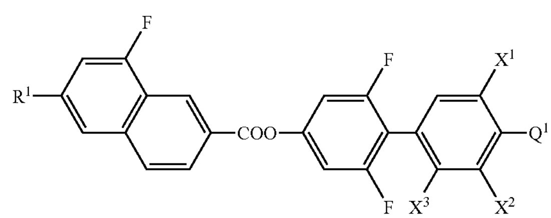
(I-32cu)
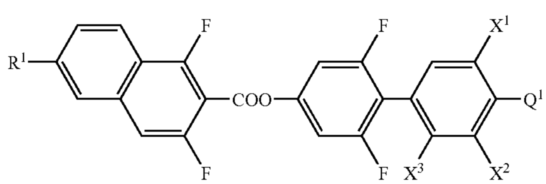
(I-32cv)
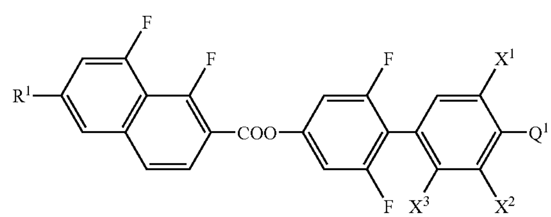
(I-32cw)
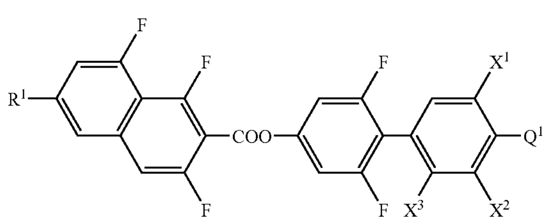
(I-32cx)
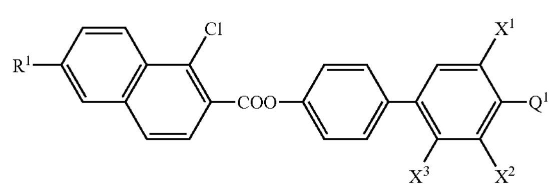
(I-32cy)
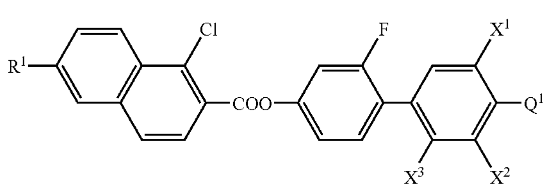
(I-32cz)
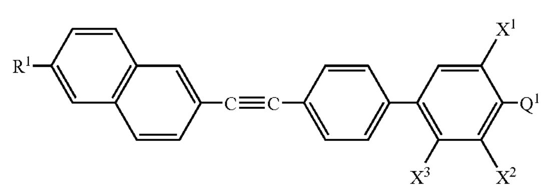

-continued
(I-32da)
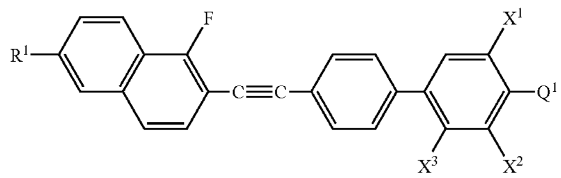
(I-32db)
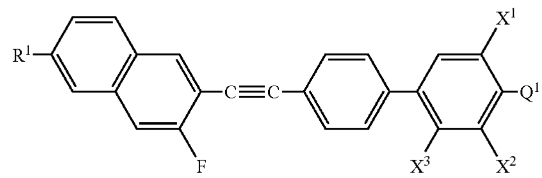
(I-32dc)
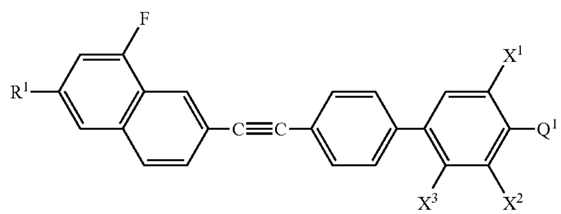
(I-32dd)
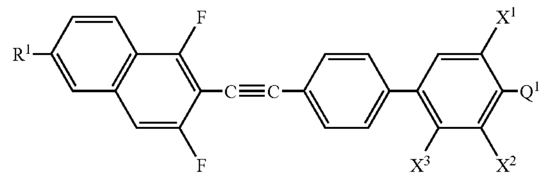
(I-32de)
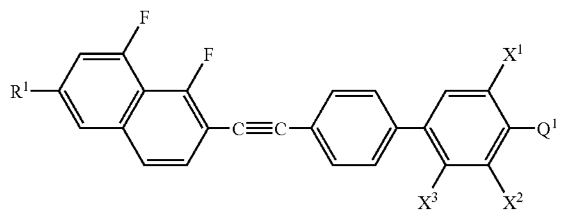
(I-32df)
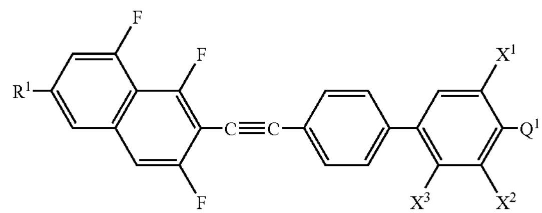
(I-32dg)
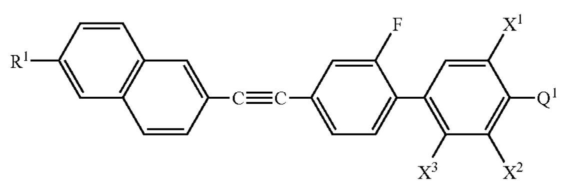
(I-32dh)
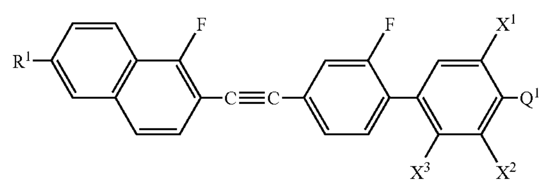
(I-32di)
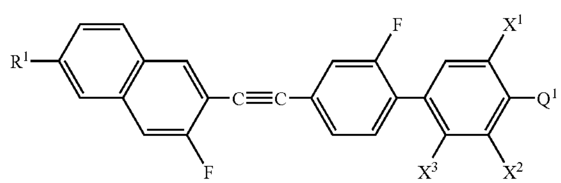
(I-32dj)
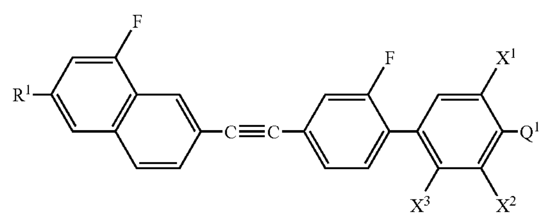
(I-32dk)
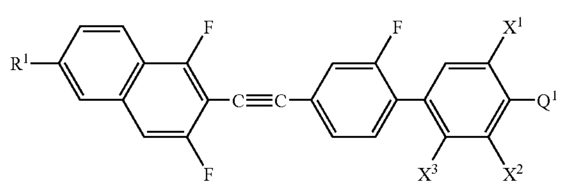
(I-32dl)
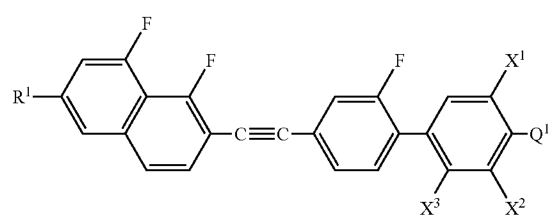
(I-32dm)
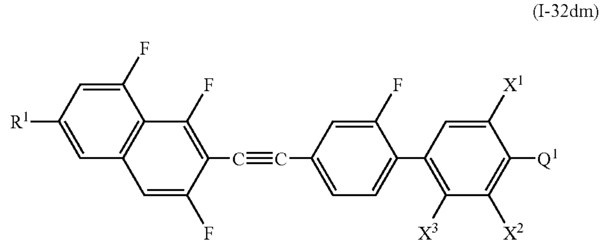
(I-32dn)
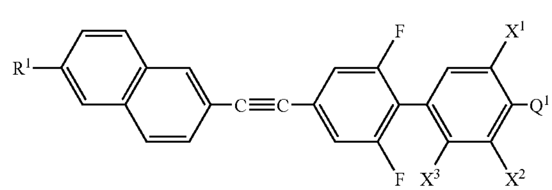

-continued
(I-32do)
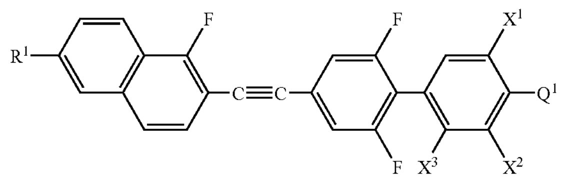
(I-32dp)
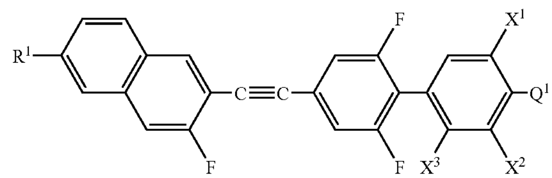
(I-32dq)
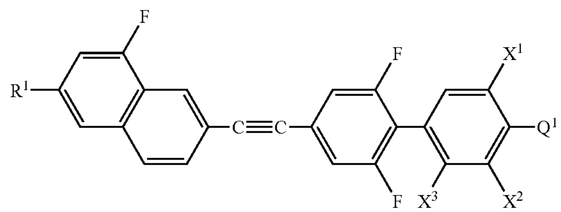
(I-32dr)
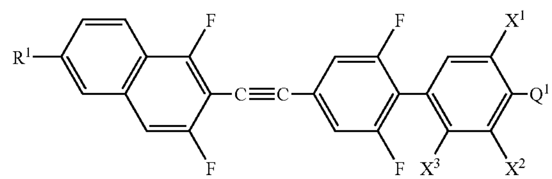
(I-32ds)
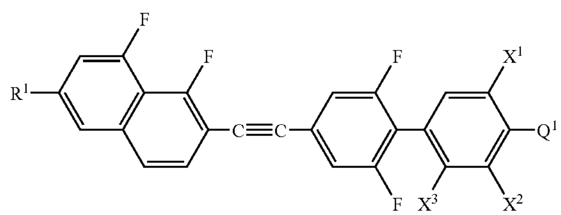
(I-32dt)
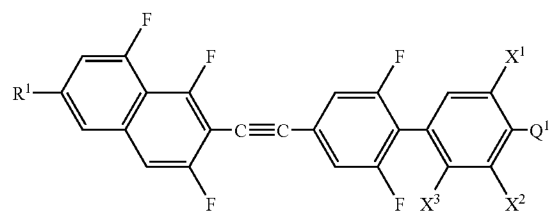
(I-32du)
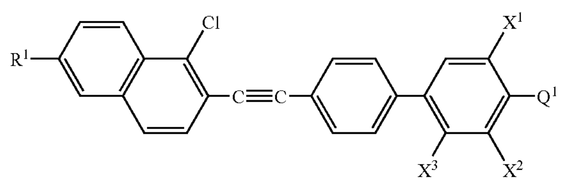
(I-32dv)
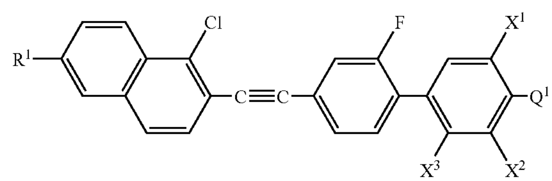
(I-32dw)
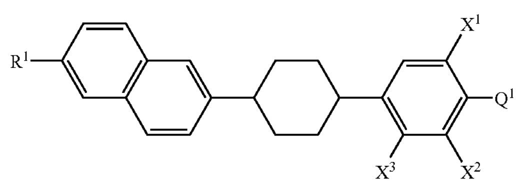
(I-32dx)
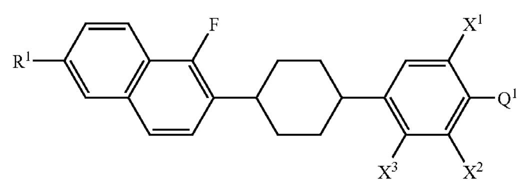
(I-32dy)
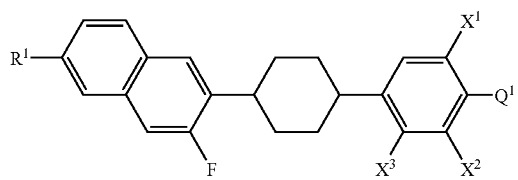
(I-32dz)
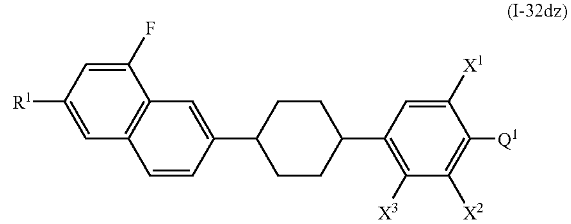
(I-32ea)
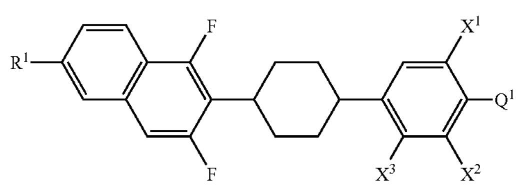
(I-32eb)
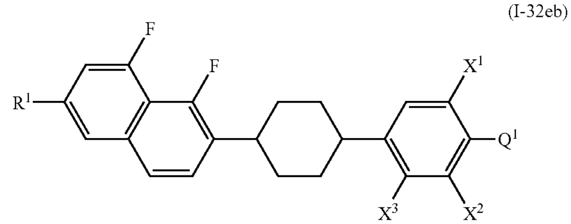

-continued
(I-32ec)
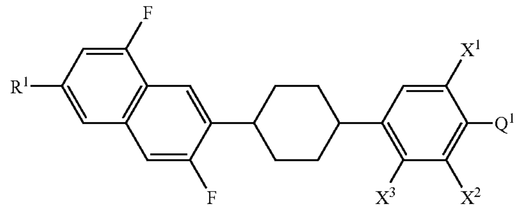
(I-32ed)
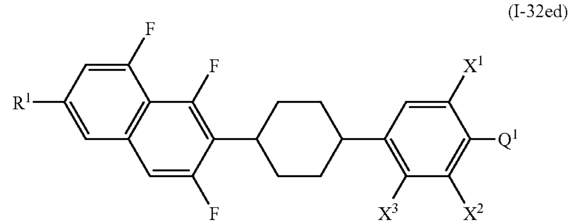
(I-32ee)
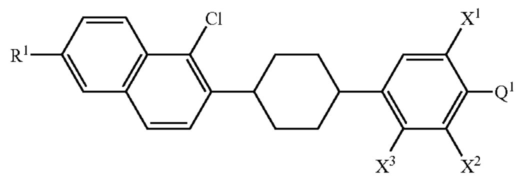
(I-32ef)
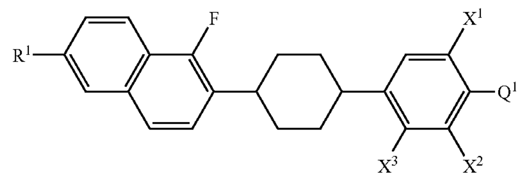
(I-32eg)
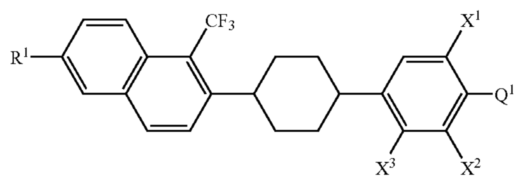
(I-32eh)
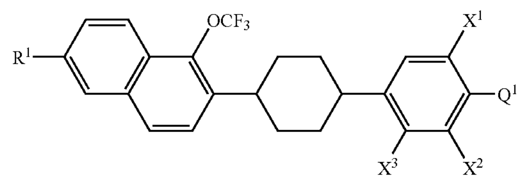
(I-32ei)
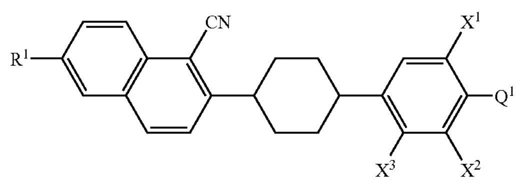
(I-32ej)
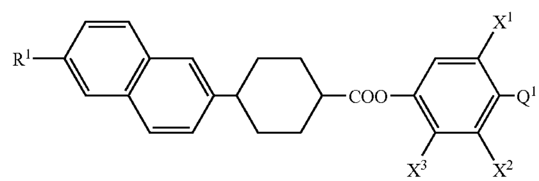
(I-32ek)
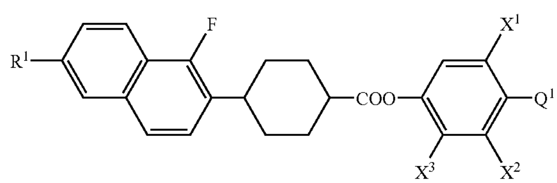
(I-32el)
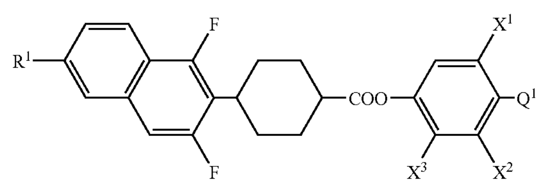
(I-32em)
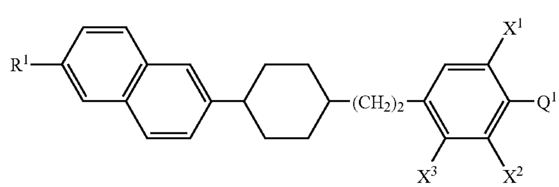
(I-32en)
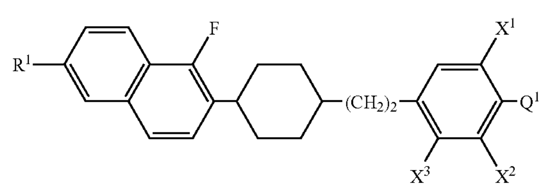
(I-32eo)
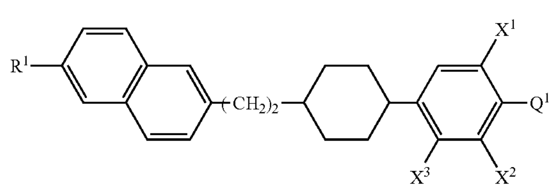
(I-32ep)
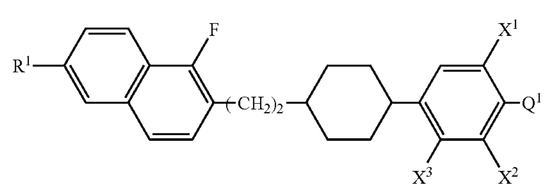
(I-33a)
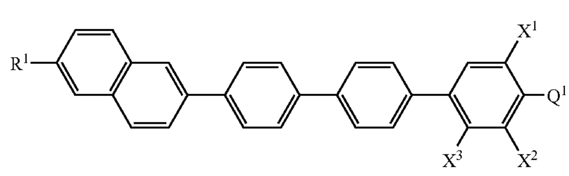
(I-33b)
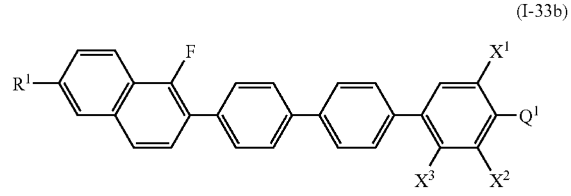

-continued
(I-33c)
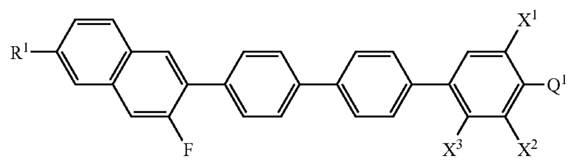
(I-33d)
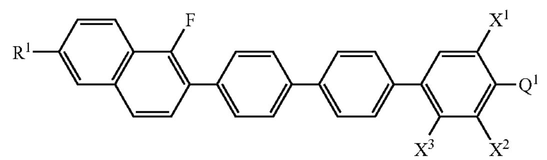
(I-33e)
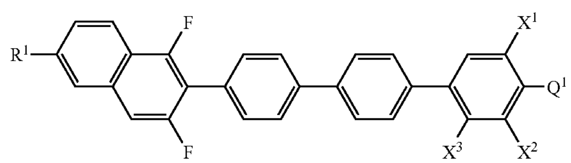
(I-33f)
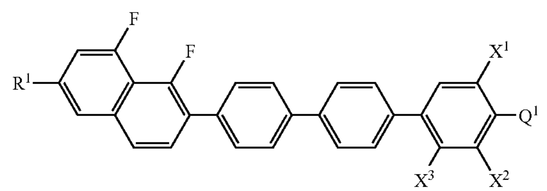
(I-33g)
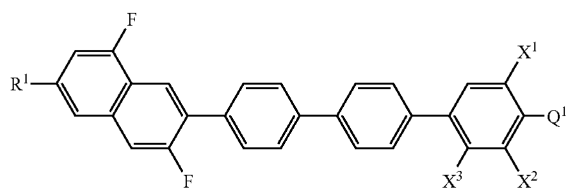
(I-33h)
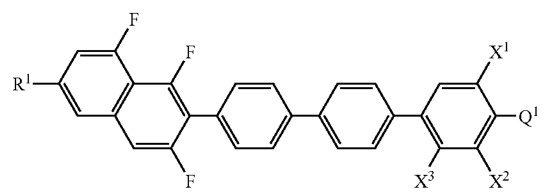
(I-33i)
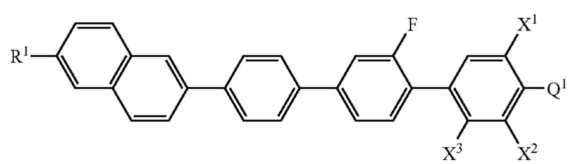
(I-33j)
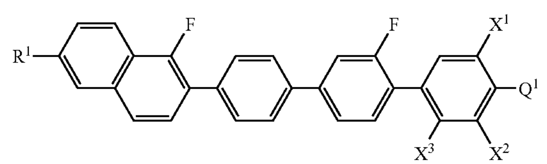
(I-33k)
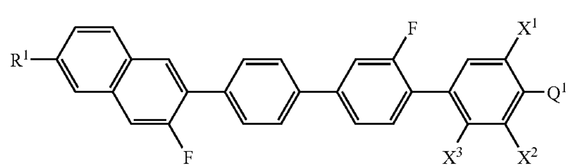
(I-33l)
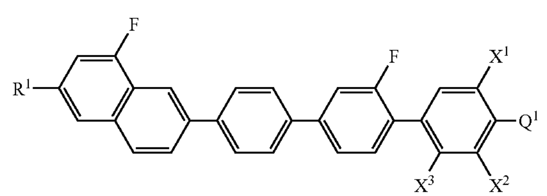
(I-33m)
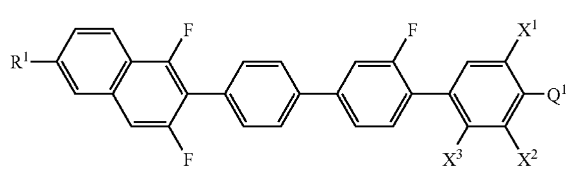
(I-33n)
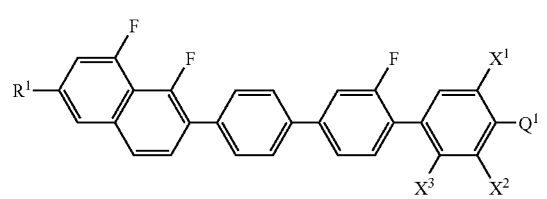
(I-33o)
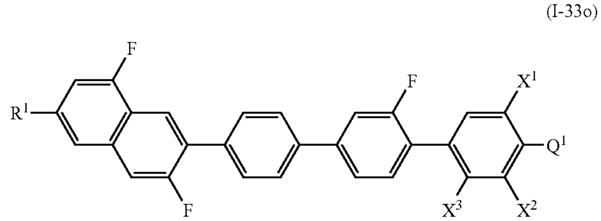
(I-33p)
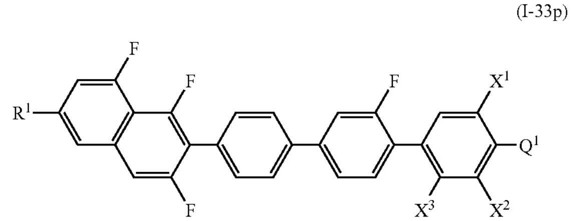
(I-33q)
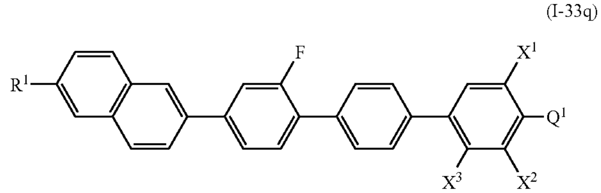
(I-33r)
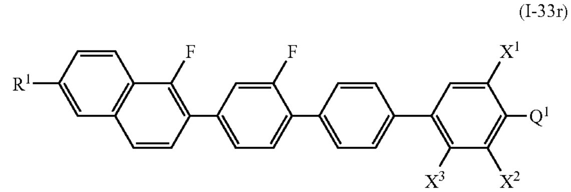

-continued
(I-33s)
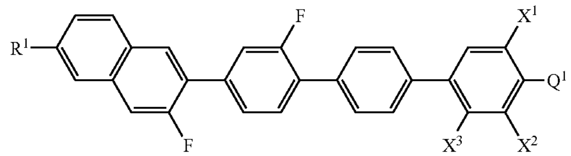
(I-33t)
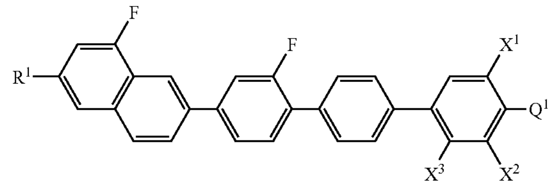
(I-33u)
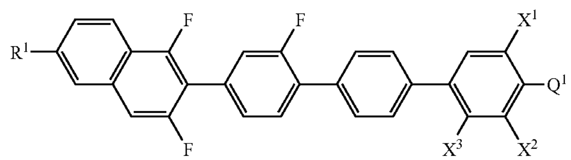
(I-33v)
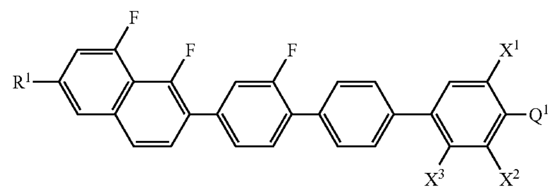
(I-33w)
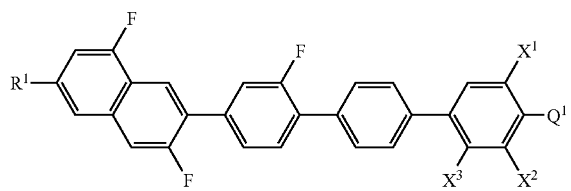
(I-33x)
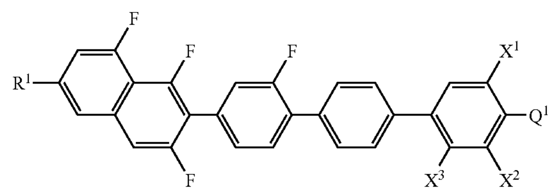
(I-33y)
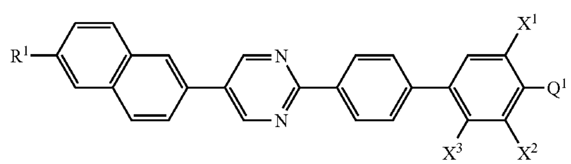
(I-33z)
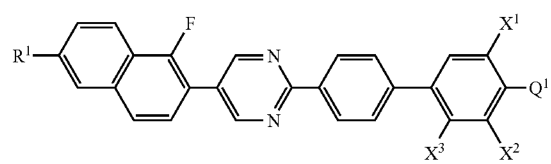
(I-33aa)
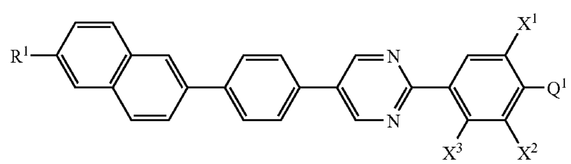
(I-33ab)
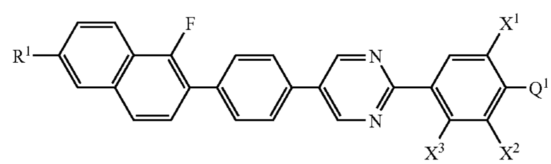
(I-33ac)
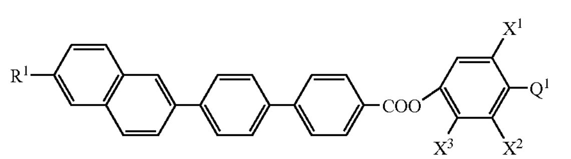
(I-33ad)
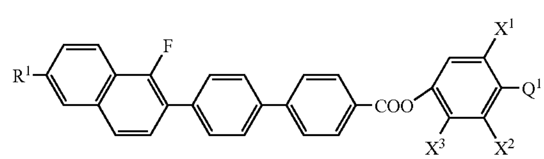
(I-33ae)
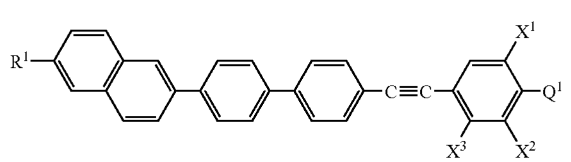
(I-33af)
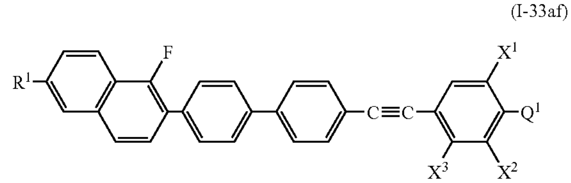
(I-33ag)
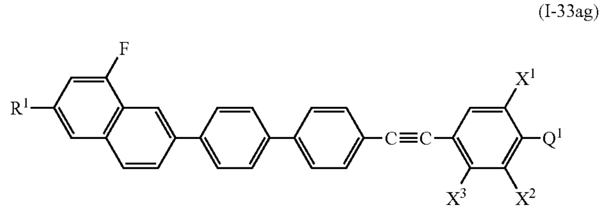
(I-33ah)
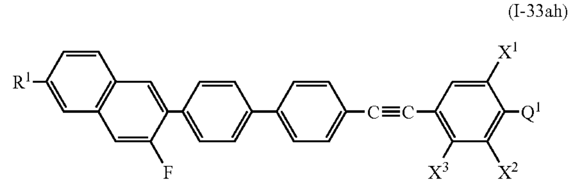

-continued
(I-33ai)
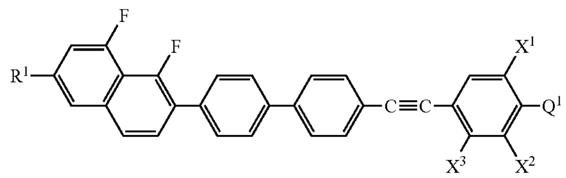
(I-33aj)
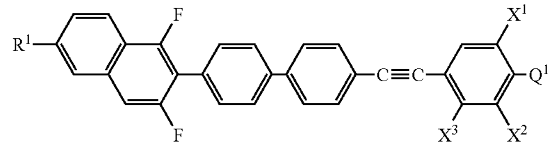
(I-33ak)
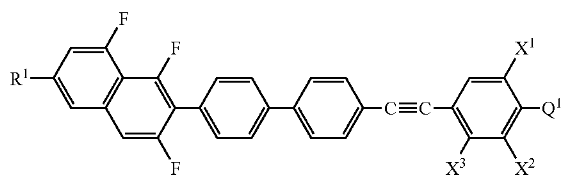
(I-33al)
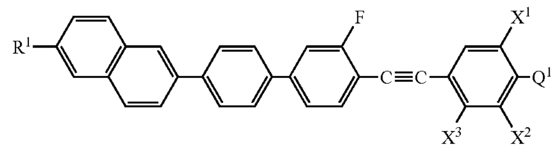
(I-33am)
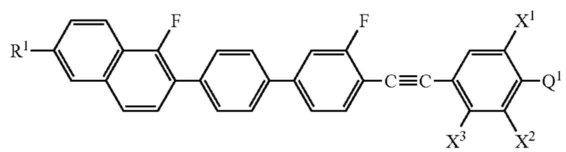
(I-33an)
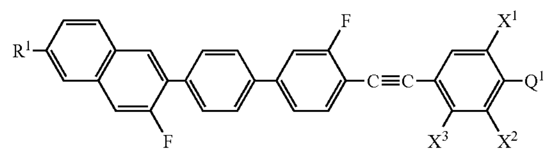
(I-33ao)
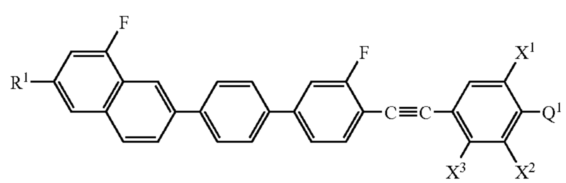
(I-33ap)
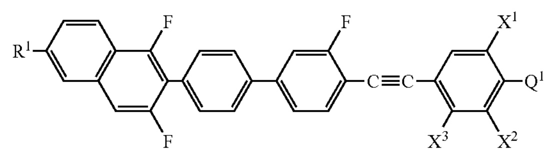
(I-33aq)
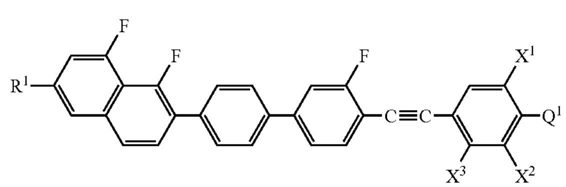
(I-33ar)
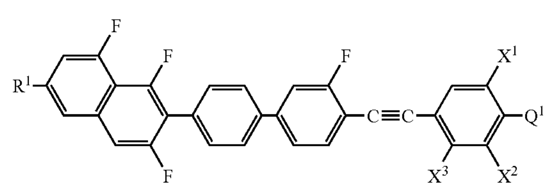
(I-33as)
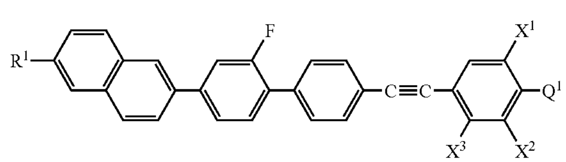
(I-33at)
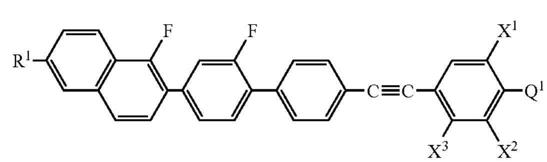
(I-33au)
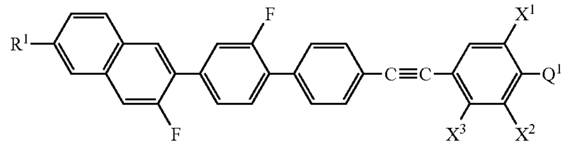
(I-33av)
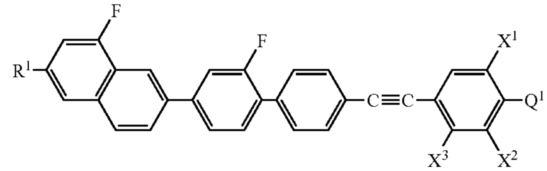
(I-33aw)
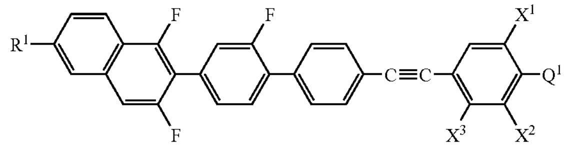
(I-33ax)
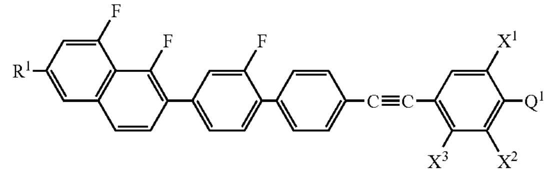

-continued
(I-33ay)
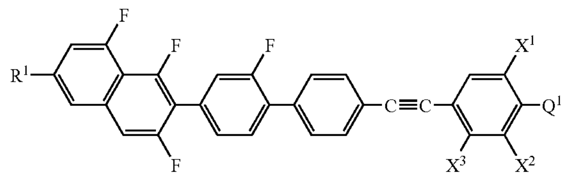
(I-33az)
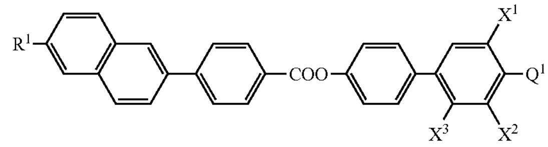
(I-33ba)
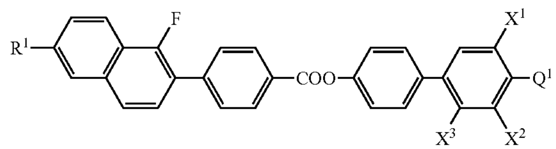
(I-33bb)
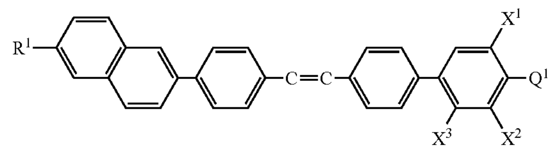
(I-33bc)
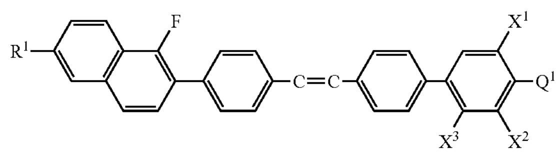
(I-33bd)
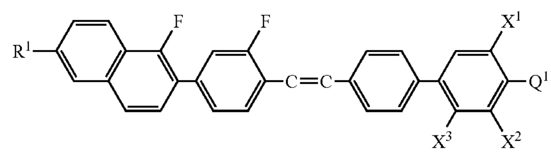
(I-33be)
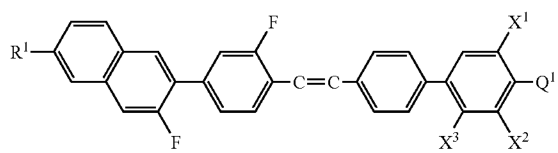
(I-33bf)
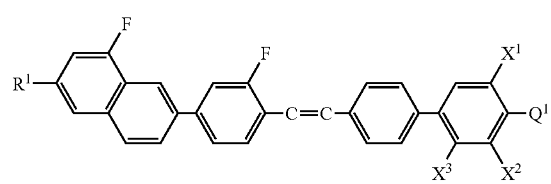
(I-33bg)
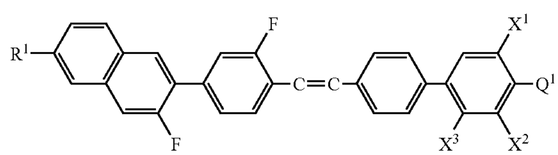
(I-33bh)
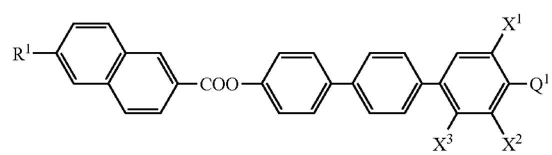
(I-33bi)
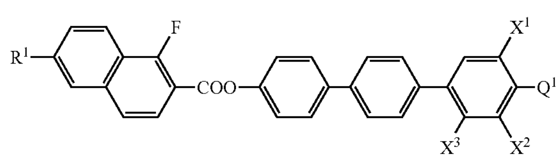
(I-33bj)
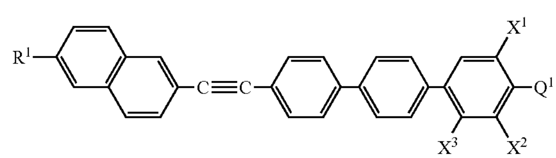
(I-33bk)
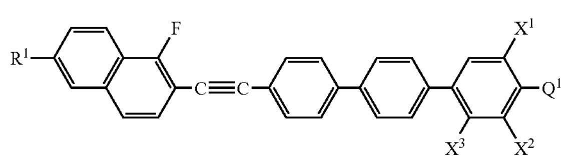
(I-33bl)
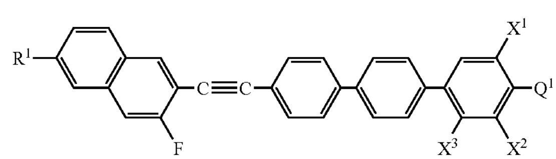
(I-33bm)
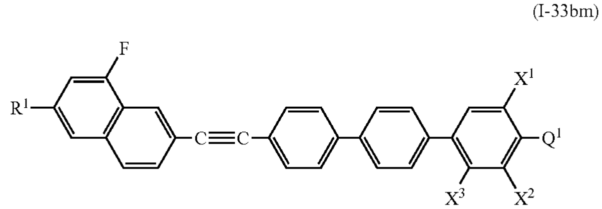
(I-33bn)
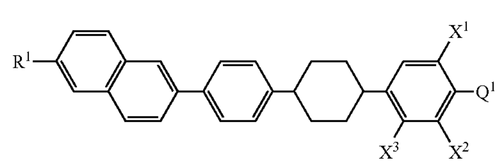

-continued
(I-33bo)
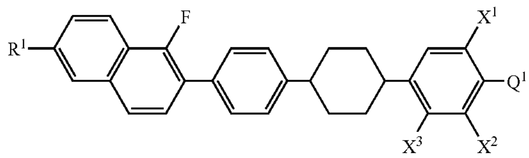
(I-33bp)
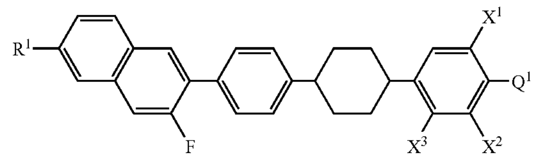
(I-33bq)
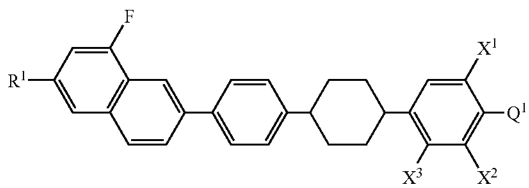
(I-33br)
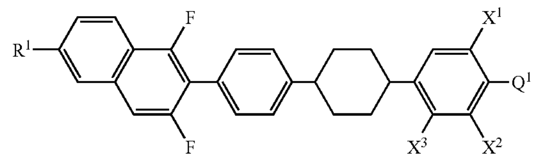
(I-33bs)
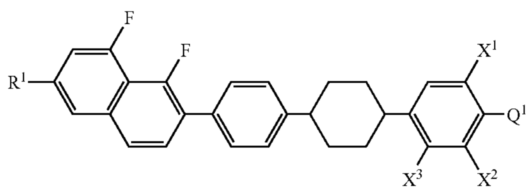
(I-33bt)
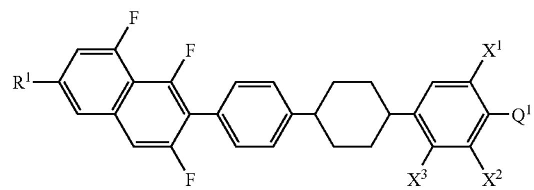
(I-33bu)
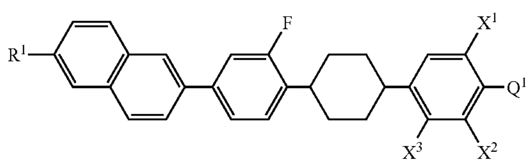
(I-33bv)
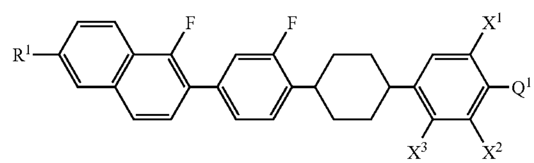
(I-33bw)
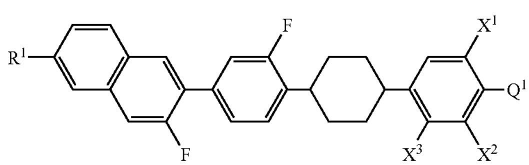
(I-33bx)
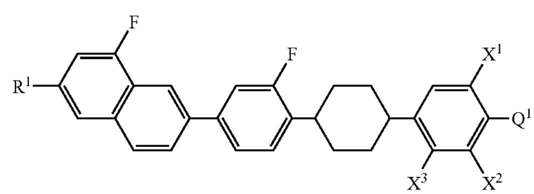
(I-33by)
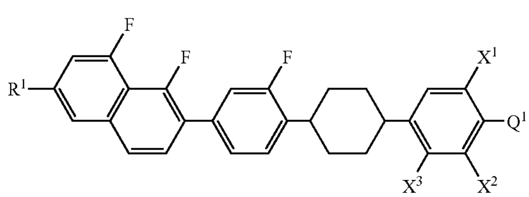
(I-33bz)
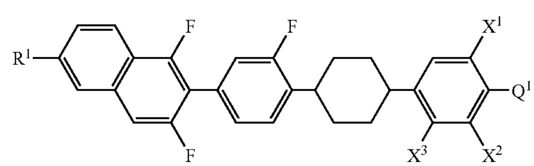
(I-33ca)
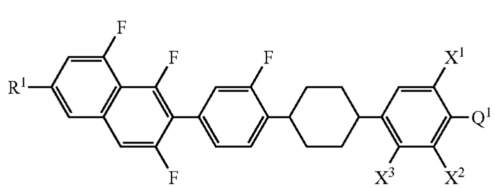
(I-33cb)
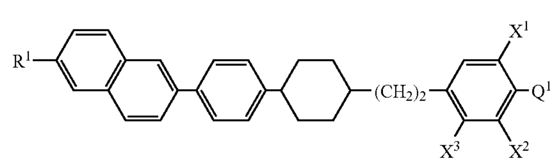
(I-33cc)
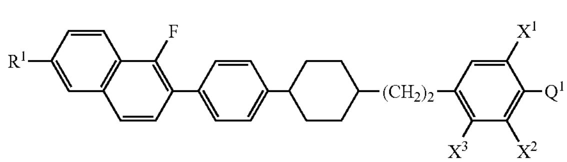
(I-33cd)
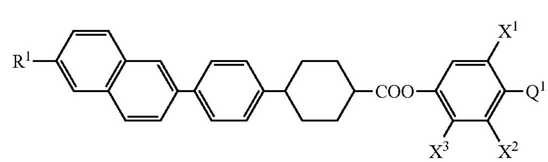

-continued
(I-33ce)
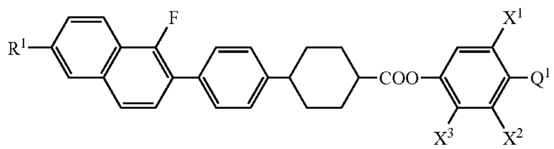
(I-33cf)
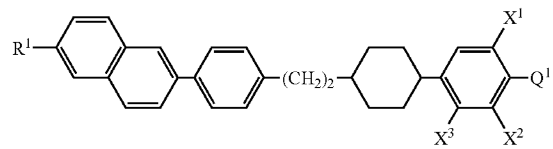
(I-33cg)
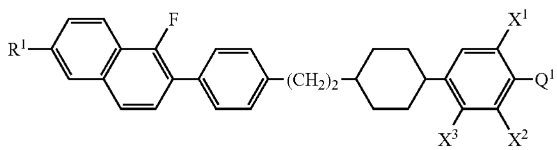
(I-33ch)
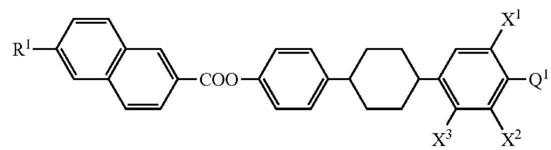
(I-33ci)
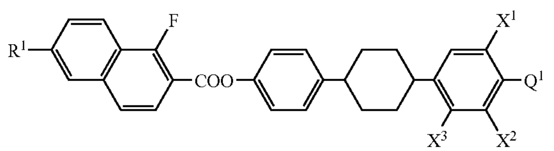
(I-33cj)
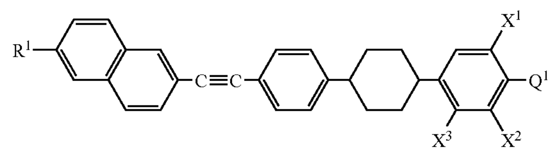
(I-33ck)
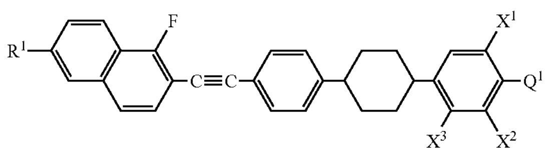
(I-33cl)
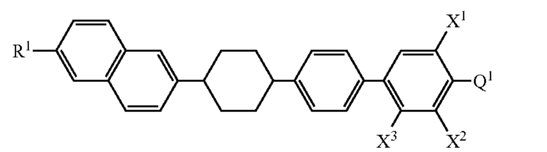
(I-33cm)
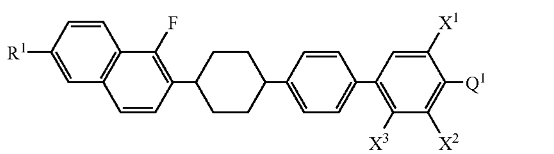
(I-33cn)
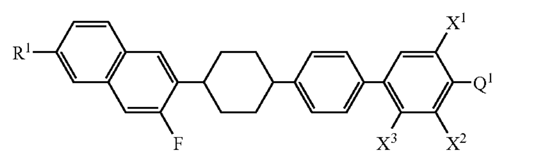
(I-33co)
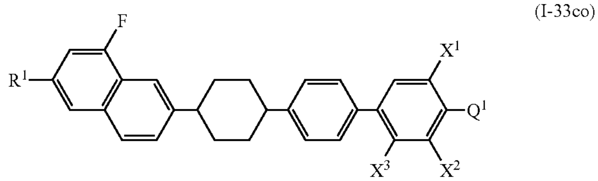
(I-33cp)
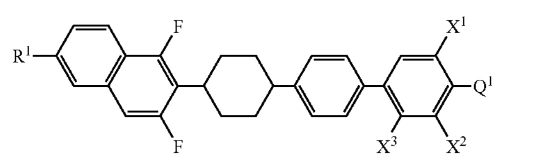
(I-33cq)
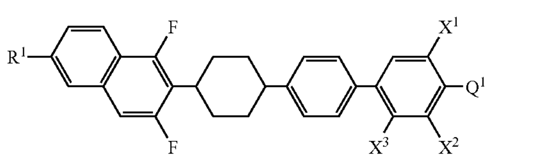
(I-33cr)
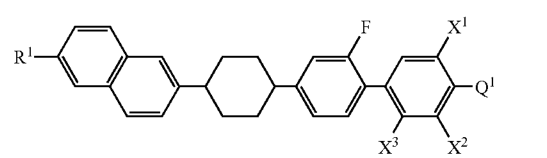
(I-33cs)
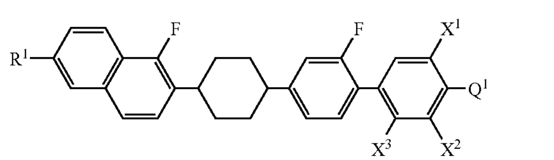
(I-33ct)
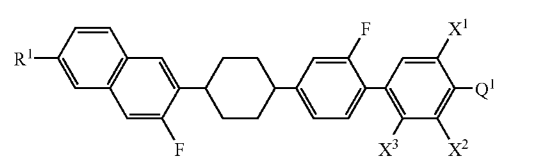
(I-33cu)
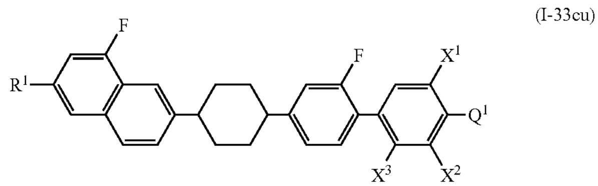
(I-33cv)
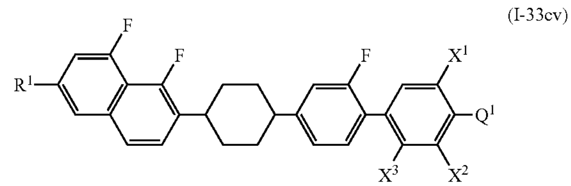

-continued
(I-33cw)
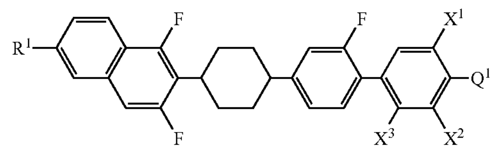
(I-33cx)
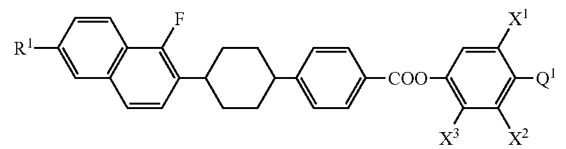
(I-33cy)
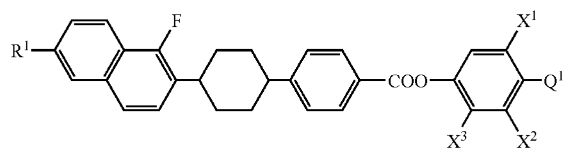
(I-33cz)
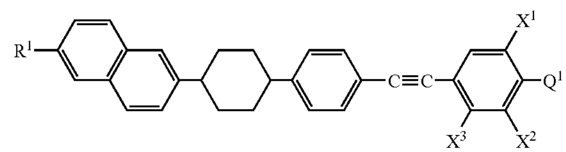
(I-33da)
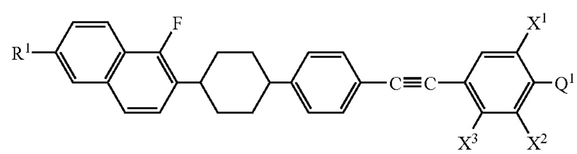
(I-33db)
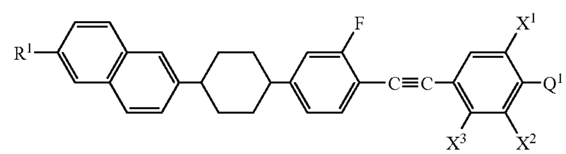
(I-33dc)
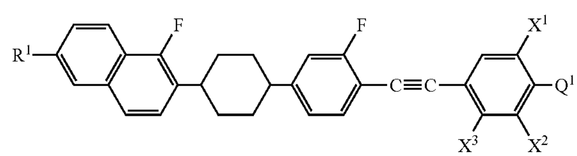
(I-33dd)
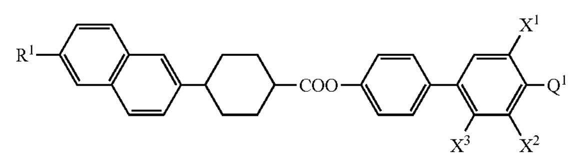
(I-33de)
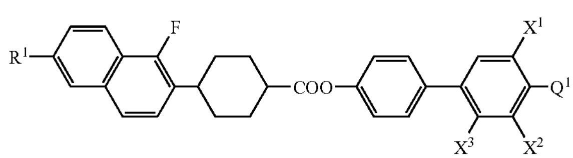
(I-33df)
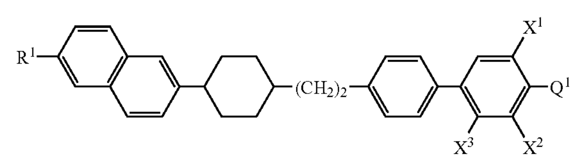
(I-33dg)
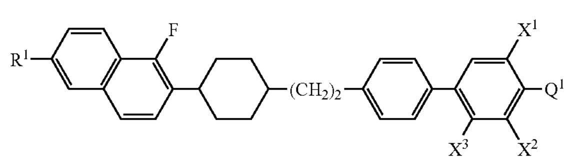
(I-3dh)
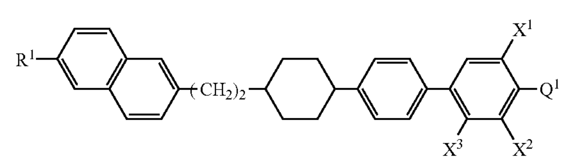
(I-3di)
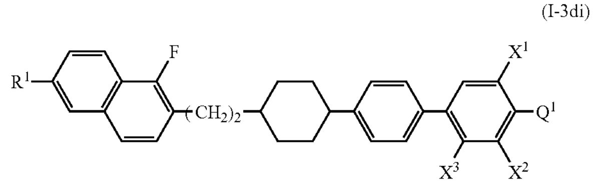
(I-3dj)
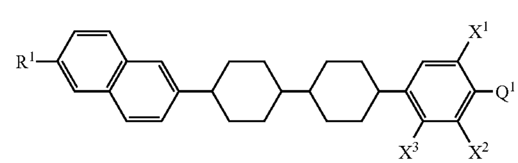
(I-3dk)
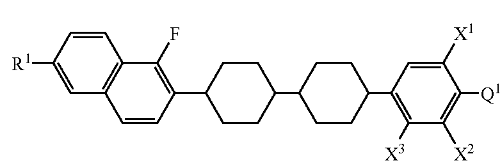
(I-3dl)
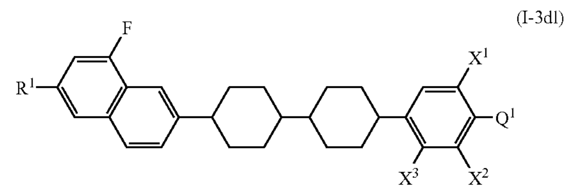
(I-3dm)
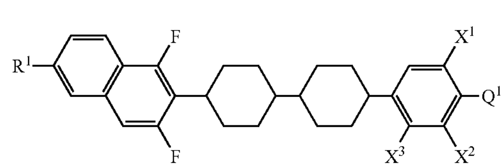
(I-3dn)
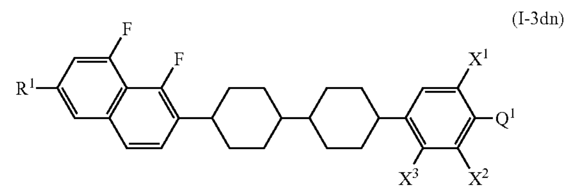

-continued
(I-3do)
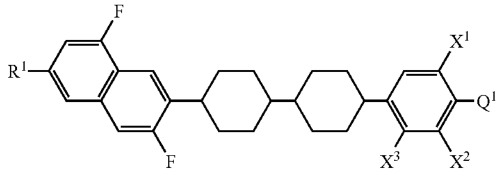
(I-3dp)
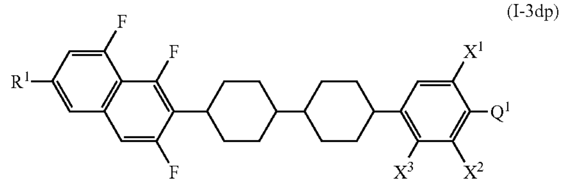
(I-3dq)
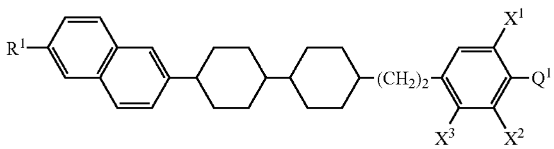
(I-3dr)
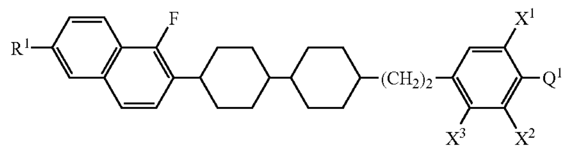
(I-33ds)
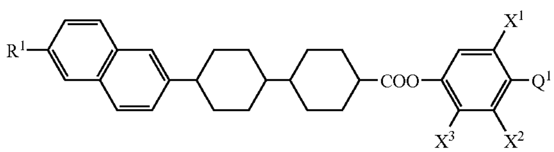
(I-33dt)
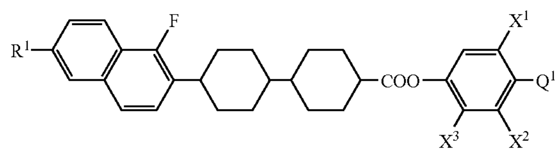
(I-33du)
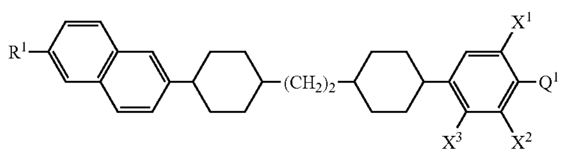
(I-33dv)
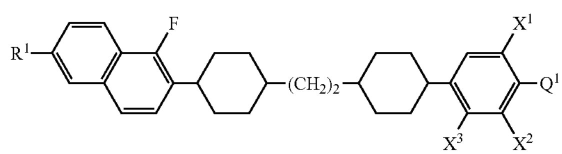
(I-33dw)
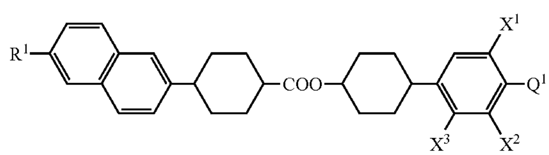
(I-33dx)
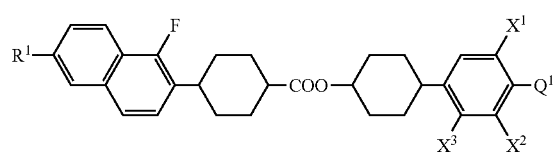
(I-33dy)
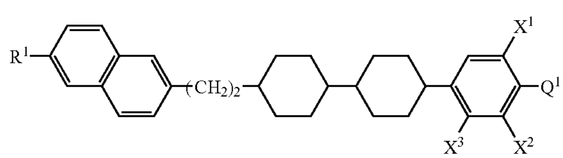
(I-33dz)
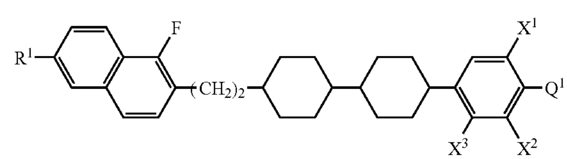
(I-41a)
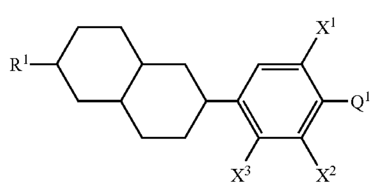
(I-41b)
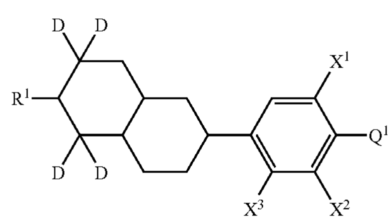
(I-41c)
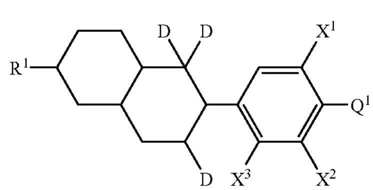
(I-41d)
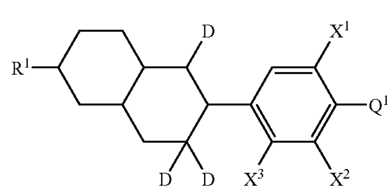

-continued
(I-41e)
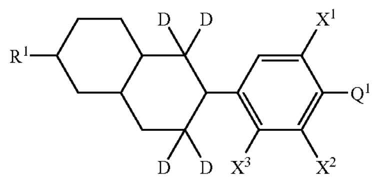
(I-41f)
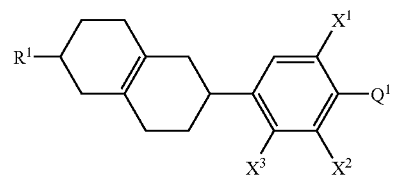
(I-41g)
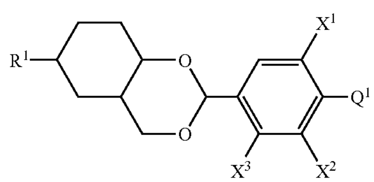
(I-41h)
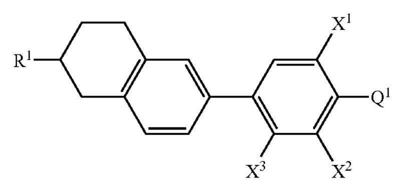
(I-41i)
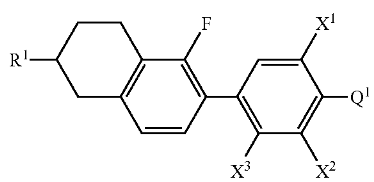
(I-41j)
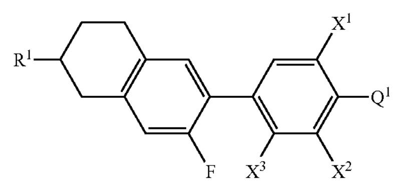
(I-41k)
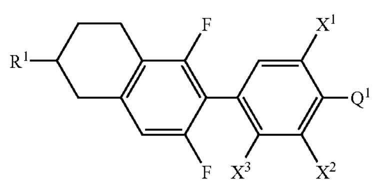
(I-41l)
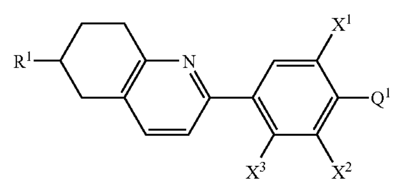
(I-41m)
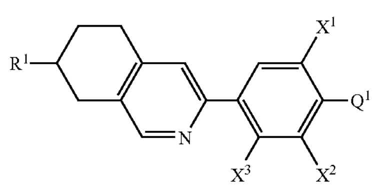
(I-41n)
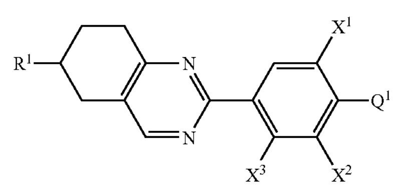
(I-41o)
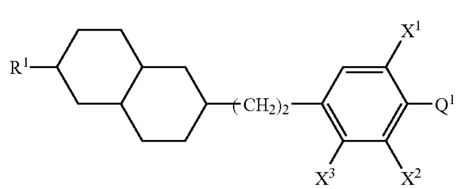
(I-41p)
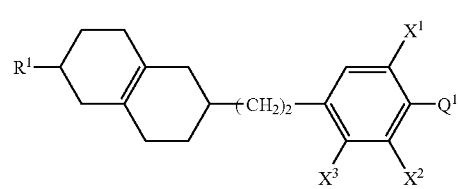
(I-41q)
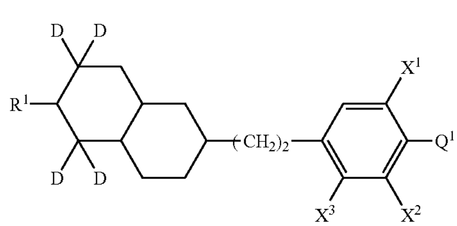
(I-41r)
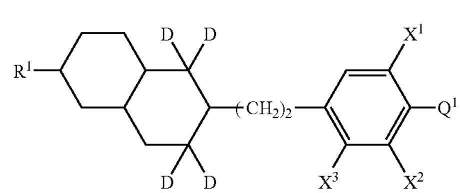

-continued
(I-41s)
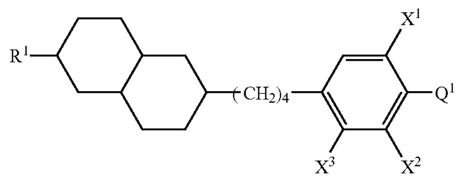
(I-41t)
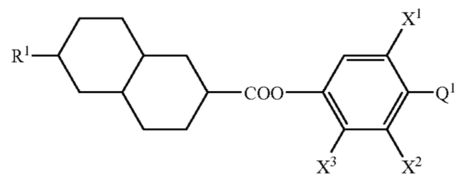
(I-41u)
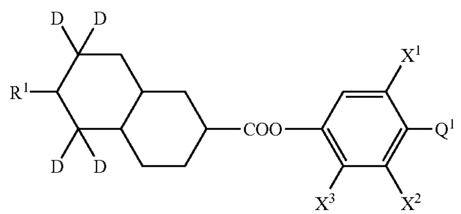
(I-41v)
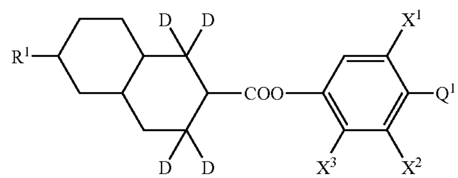
(I-41w)
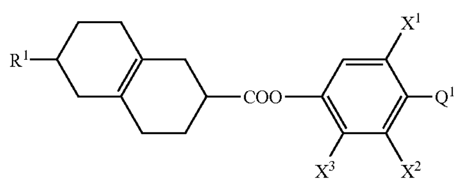
(I-41x)
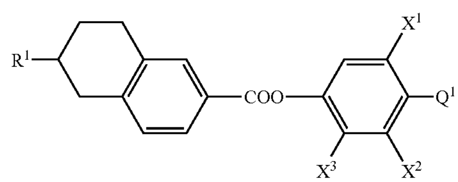
(I-41y)
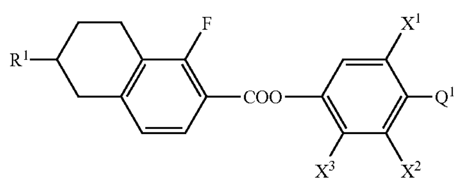
(I-41z)
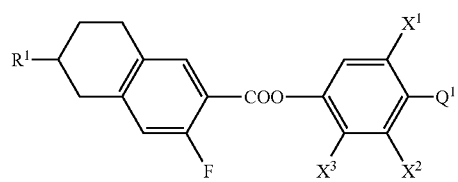
(I-41aa)
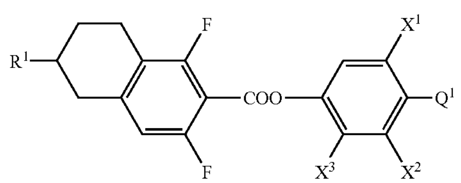
(I-41ab)
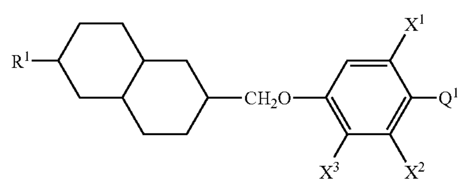
(I-41ac)
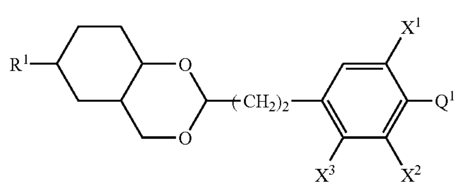
(I-41ad)
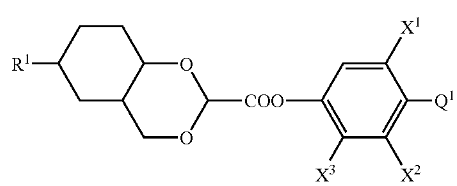
(I-41ae)
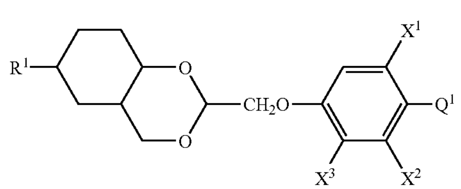
(I-41af)
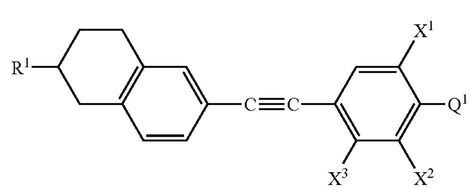

-continued
(I-41ag)
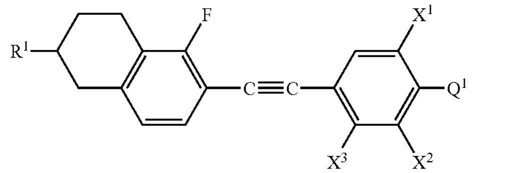
(I-41ah)
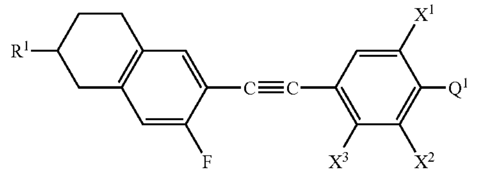
(I-41ai)
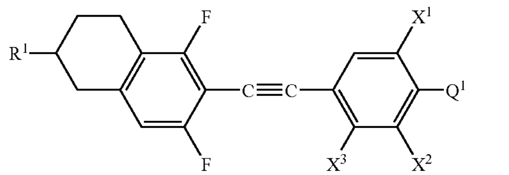
(I-42a)
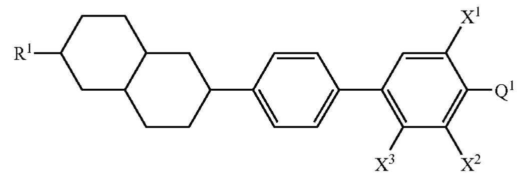
(I-42b)
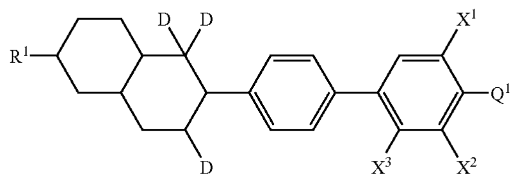
(I-42c)
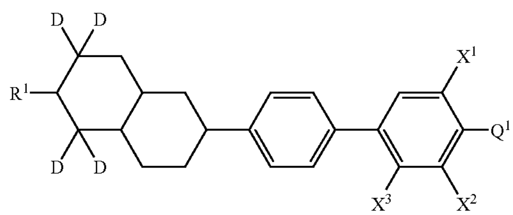
(I-42d)
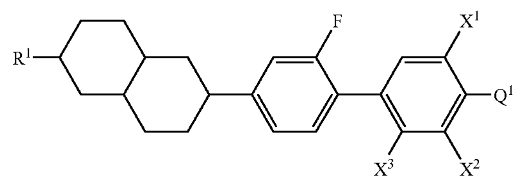
(I-42e)
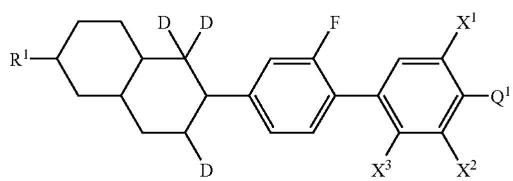
(I-42f)
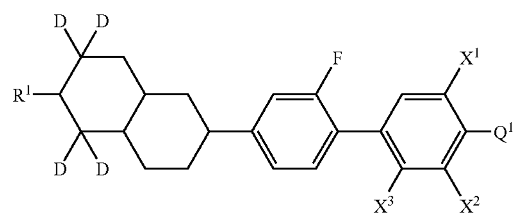
(I-42g)
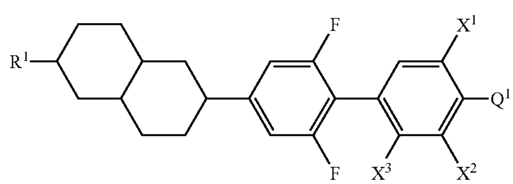
(I-42h)
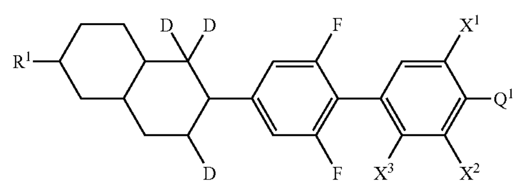
(I-42i)
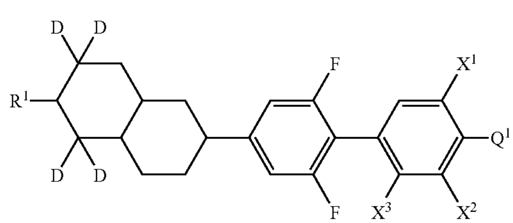
(I-42j)
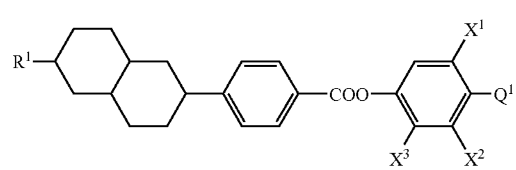

-continued
(I-42k)
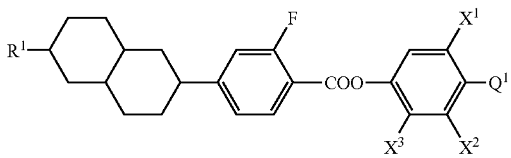
(I-42l)
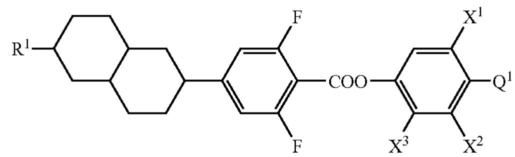
(I-42m)
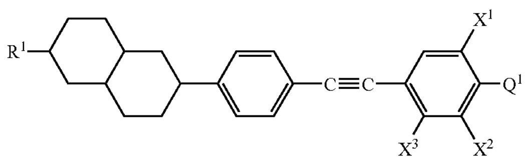
(I-42n)
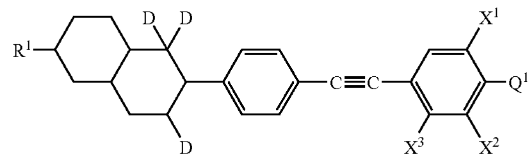
(I-42o)
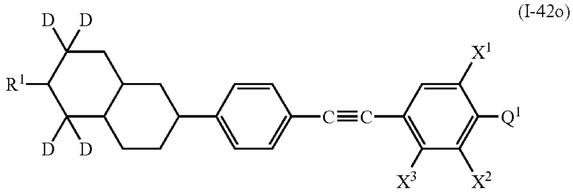
(I-42p)
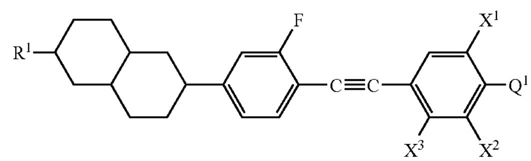
(I-42q)
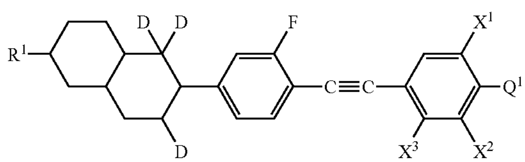
(I-42r)
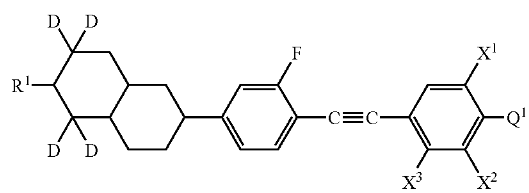
(I-42s)
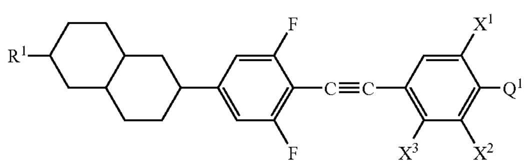
(I-42t)
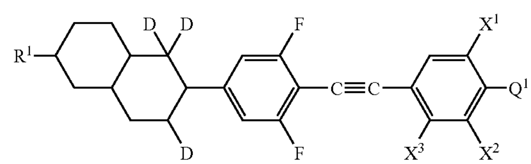
(I-42u)
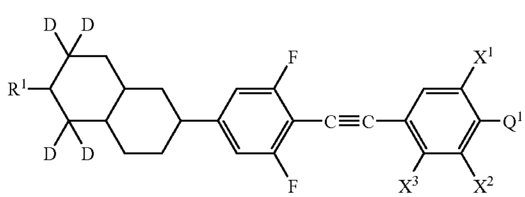
(I-42v)
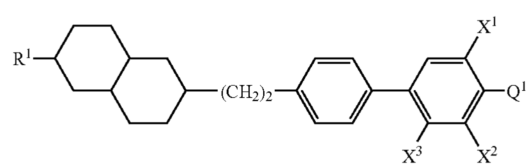
(I-42w)
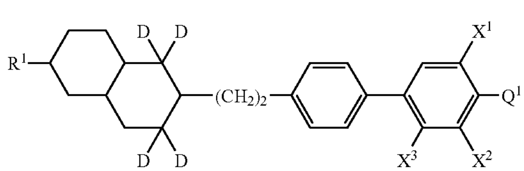
(I-42x)
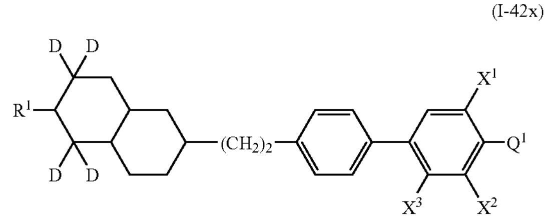
(I-42y)
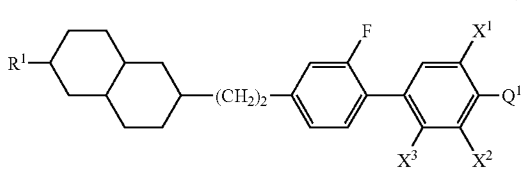
(I-42z)
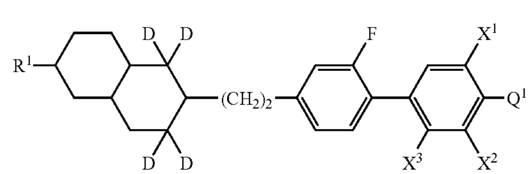

-continued
(I-42aa)
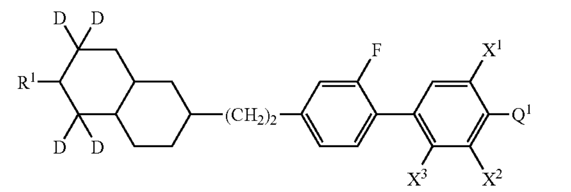
(I-42ab)
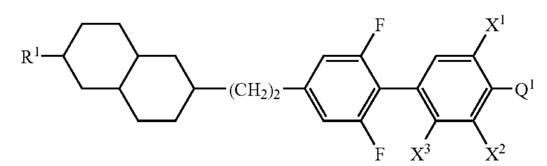
(I-42ac)
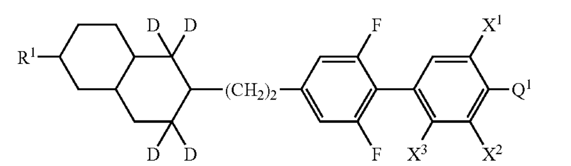
(I-42ad)
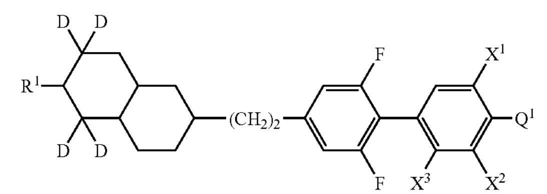
(I-42ae)
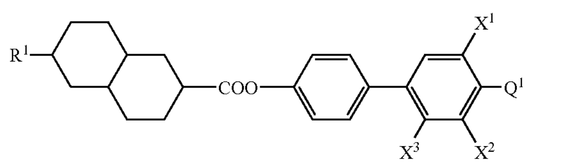
(I-42af)
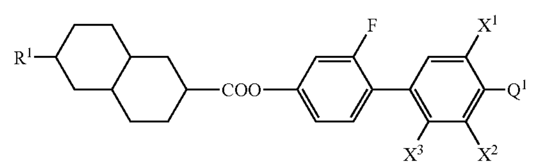
(I-42ag)
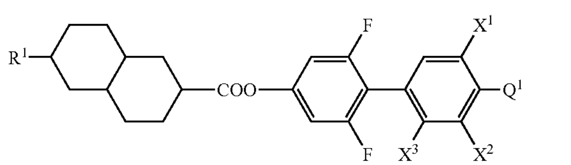
(I-42ah)
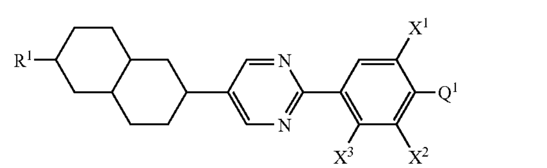
(I-42ai)
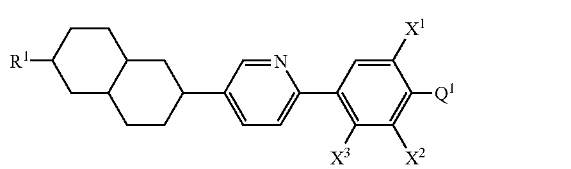
(I-42aj)
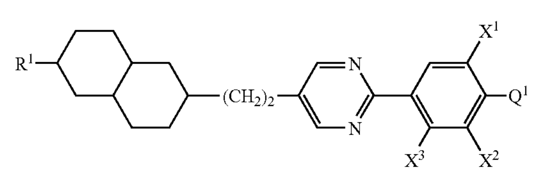
(I-42ak)
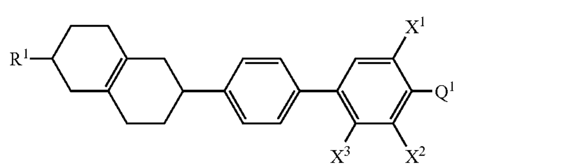
(I-42al)
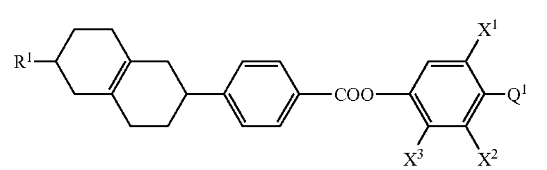
(I-42am)
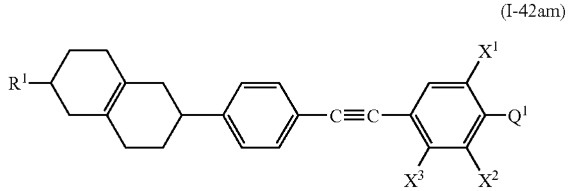
(I-42an)
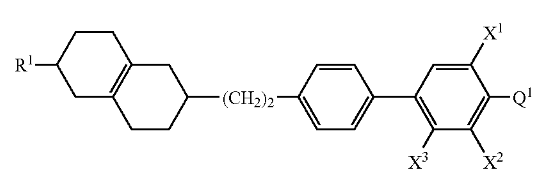
(I-42ao)
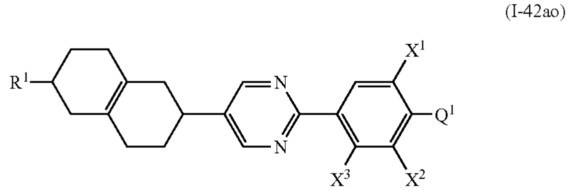
(I-42ap)
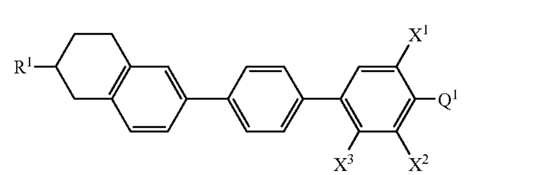

-continued
(I-42aq)
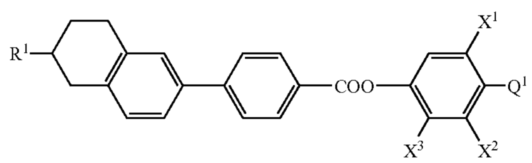
(I-42ar)
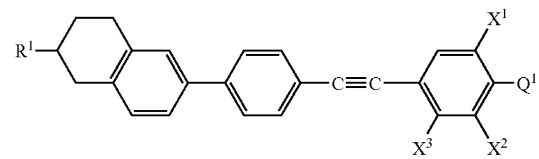
(I-42as)
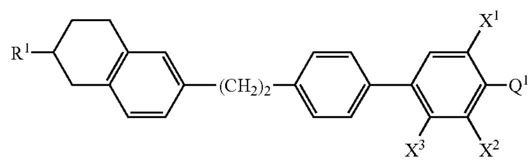
(I-42at)
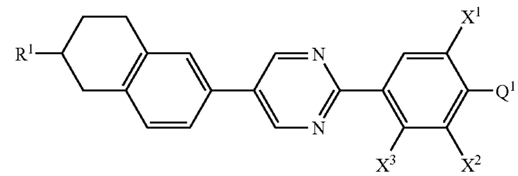
(I-42au)
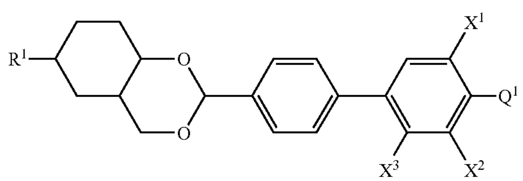
(I-42av)
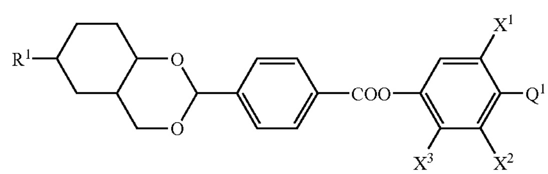
(I-42aw)
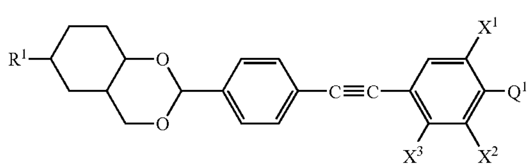
(I-42ax)
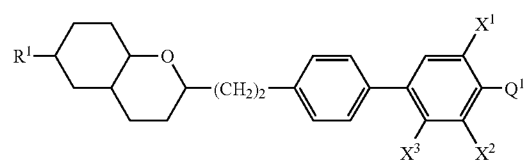
(I-42ay)
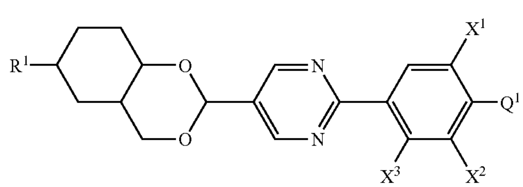
(I-42az)
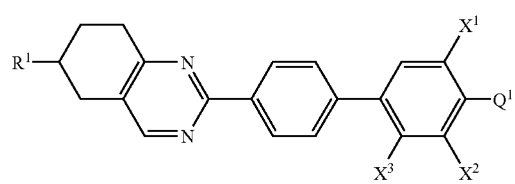
(I-42ba)
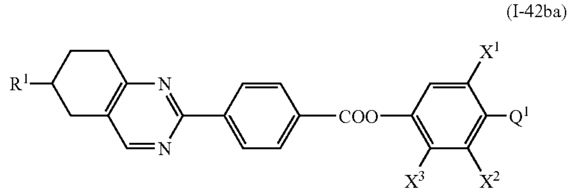
(I-42bb)
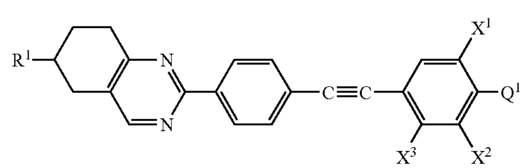
(I-42bc)
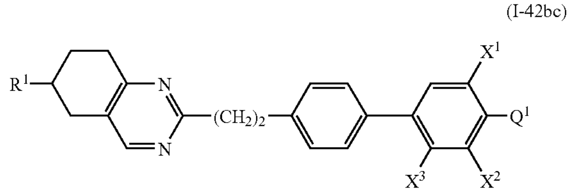
(I-42bd)
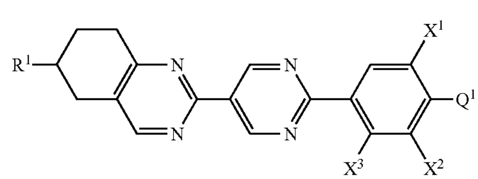

-continued
(I-42be)
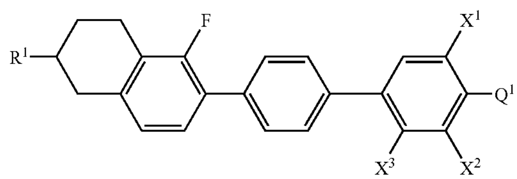
(I-42bf)
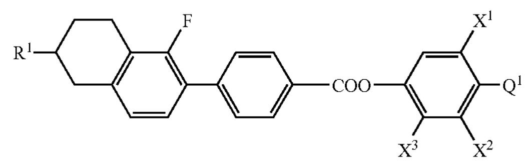
(I-42bg)
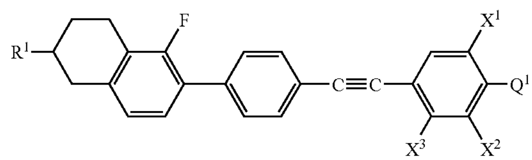
(I-42bh)
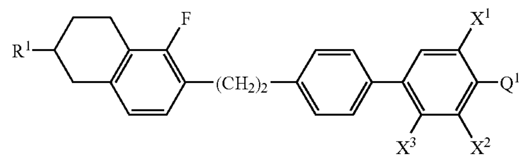
(I-42bi)
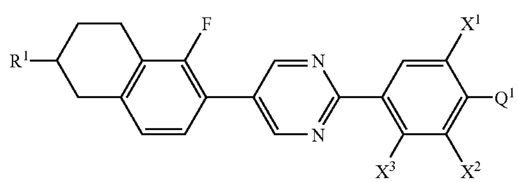
(I-42bj)
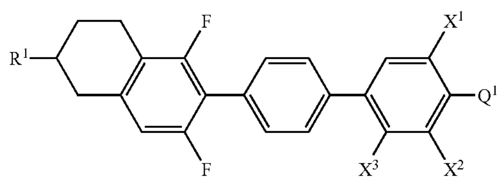
(I-42bk)
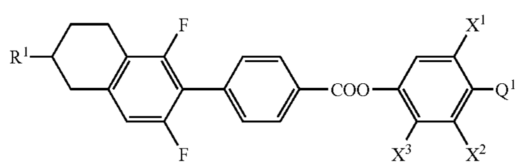
(I-42bl)
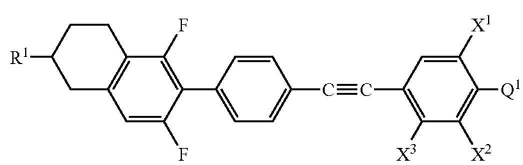
(I-42bm)
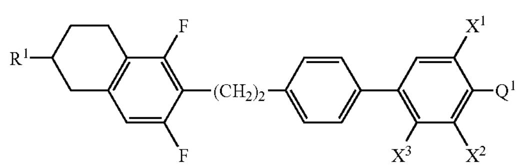
(I-42bn)
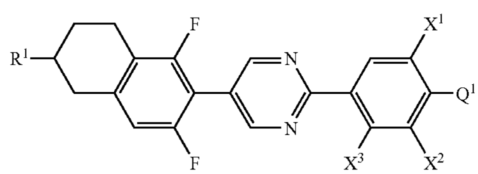
(I-42bo)
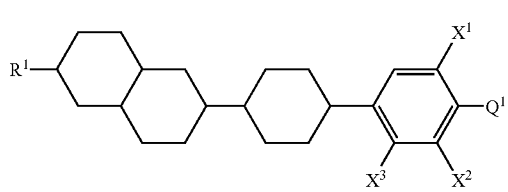
(I-42bp)
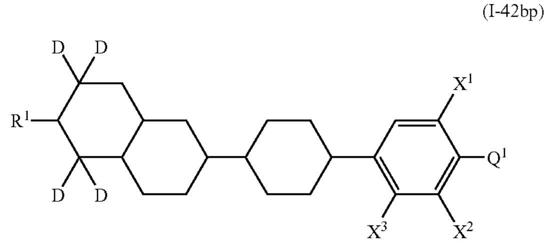
(I-42bq)
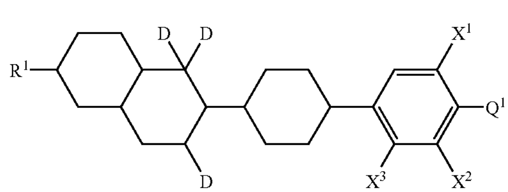
(I-42br)
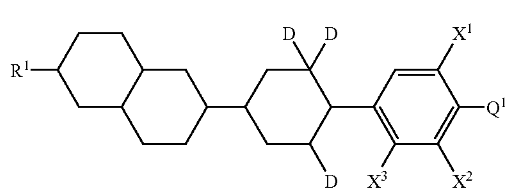

-continued
(I-42bs)
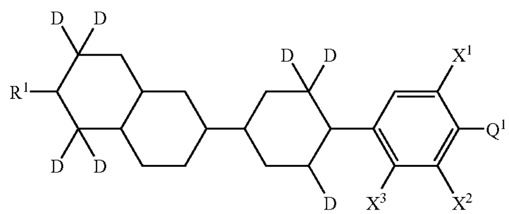
(I-42bt)
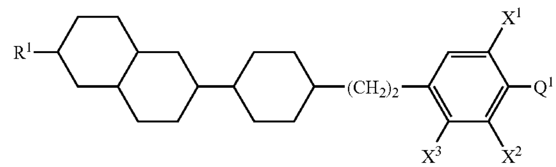
(I-42bu)
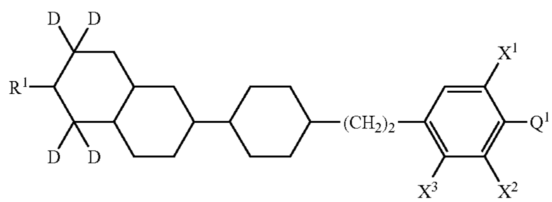
(I-42bw)
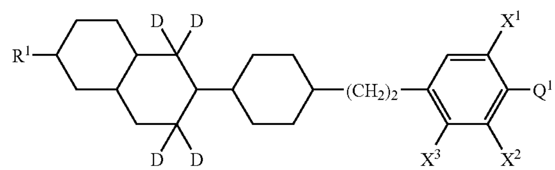
(I-42bw)
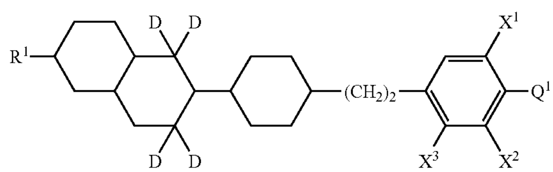
(I-42bx)
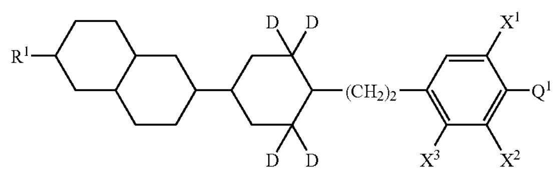
(I-42by)
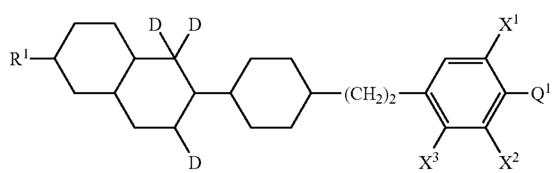
(I-42bz)
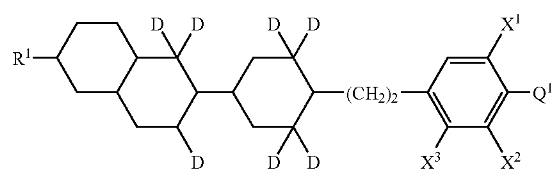
(I-42ca)
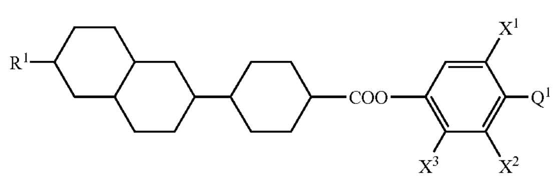
(I-42cb)
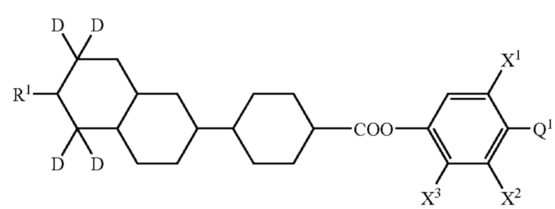
(I-42cc)
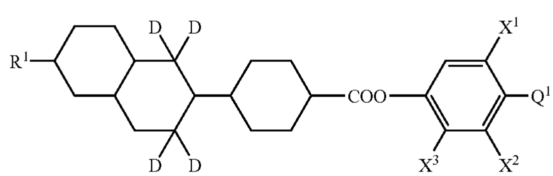
(I-42cd)
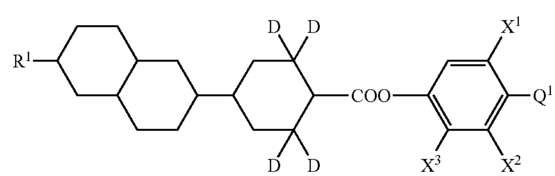
(I-42ce)
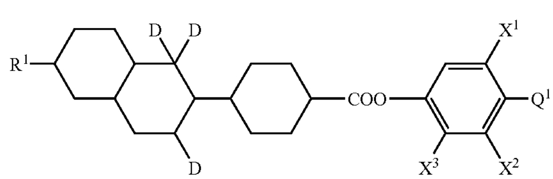
(I-42cf)
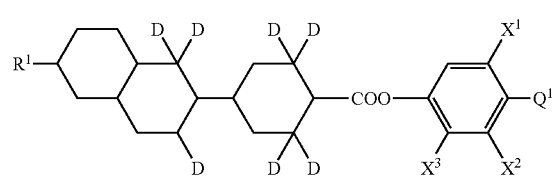

-continued
(I-42cg)
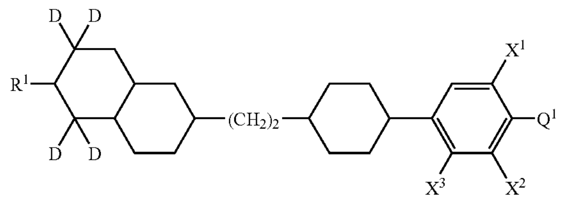
(I-42ch)
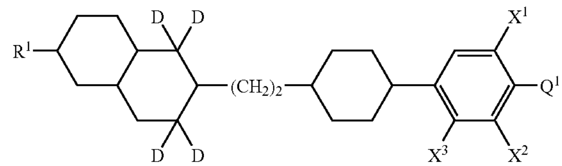
(I-42ci)
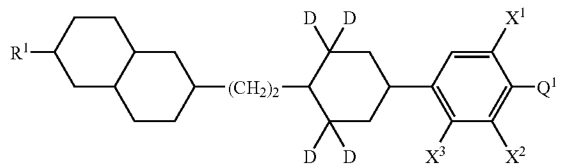
(I-42cj)
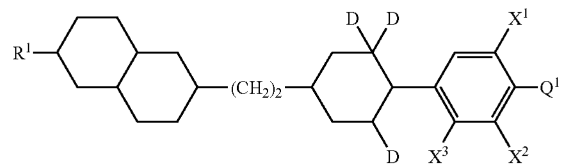
(I-42ck)
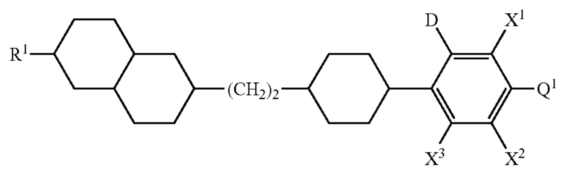
(I-42cl)
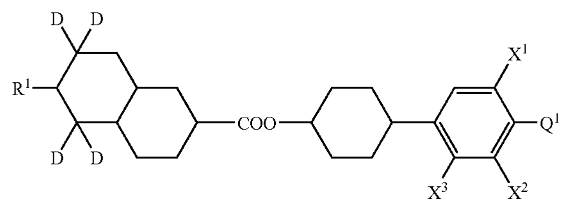
(I-42cm)
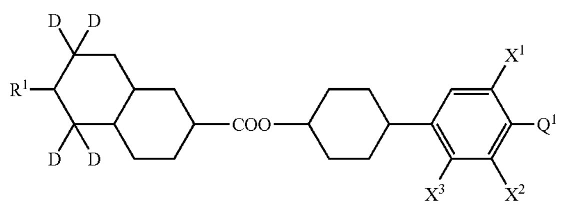
(I-42cn)
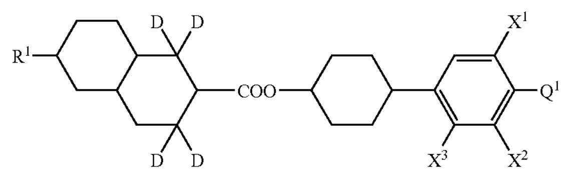
(I-42co)
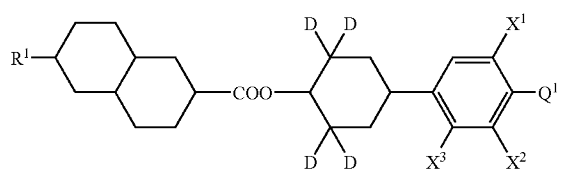
(I-42cp)
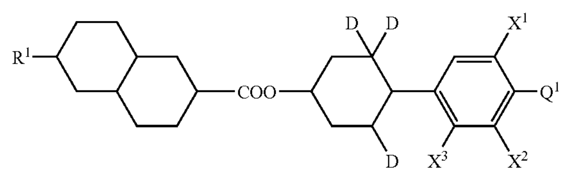
(I-42cq)
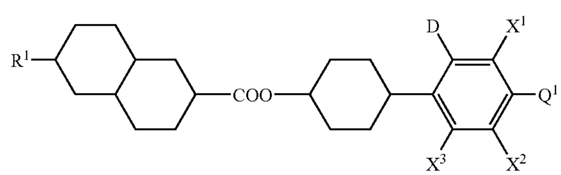
(I-42cr)
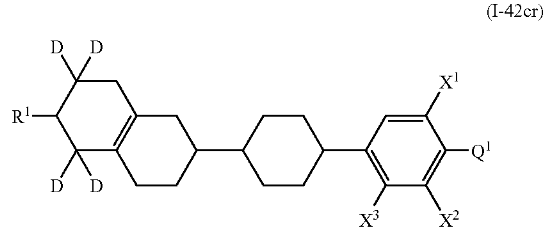
(I-42cs)
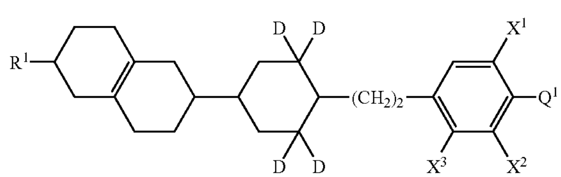
(I-42ct)
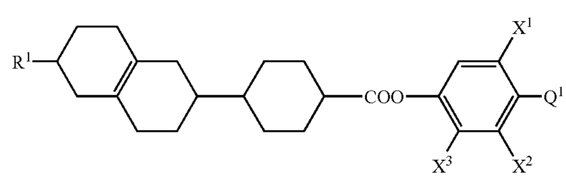

-continued
(I-42cu)
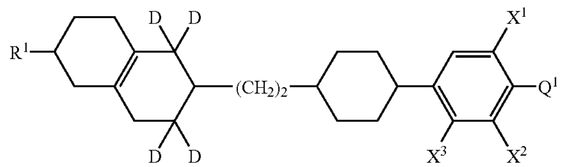
(I-42cw)
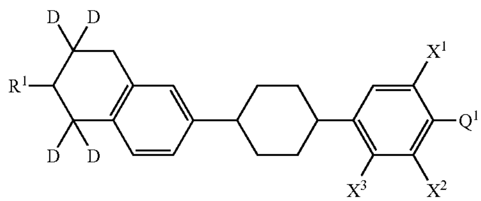
(I-42cy)
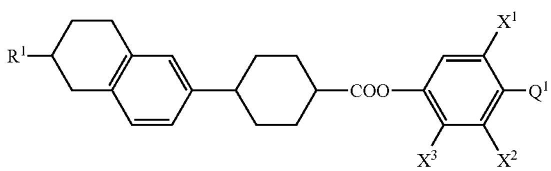
(I-42da)
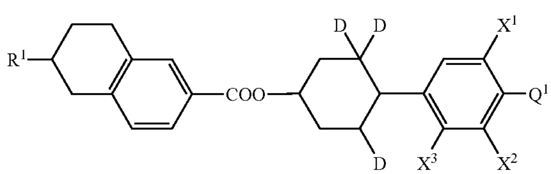
(I-42dc)
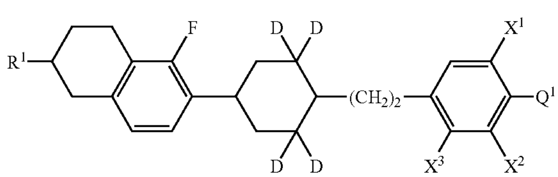
(I-42de)
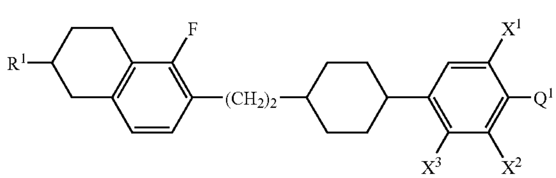
(I-42dg)
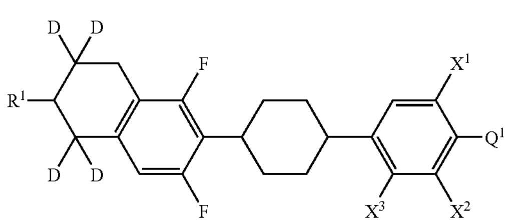
(I-42cv)
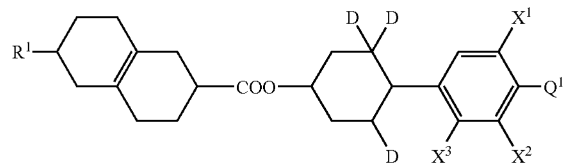
(I-42cx)
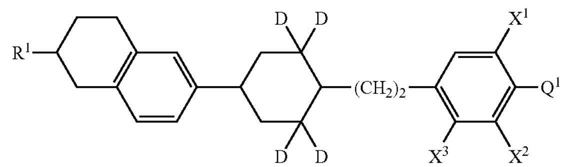
(I-42cz)
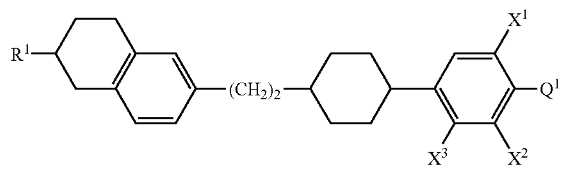
(I-42db)
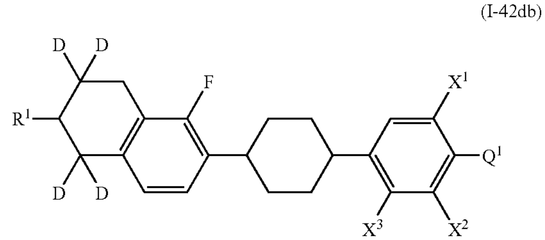
(I-42dd)
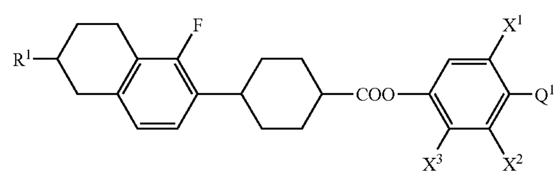
(I-42df)
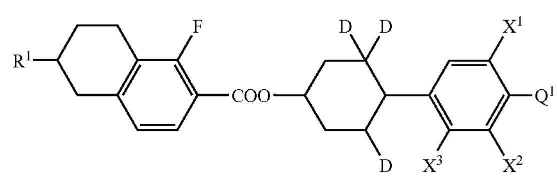
(I-42dh)
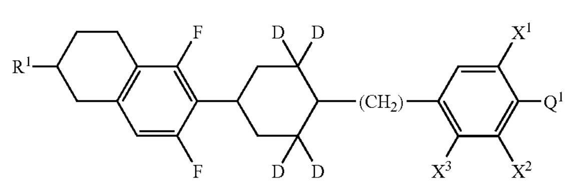

-continued
(I-42di)
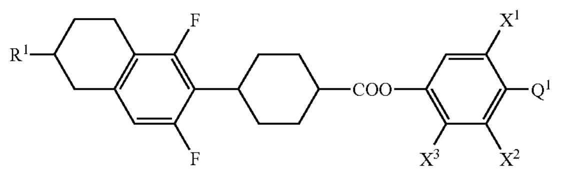
(I-42dj)
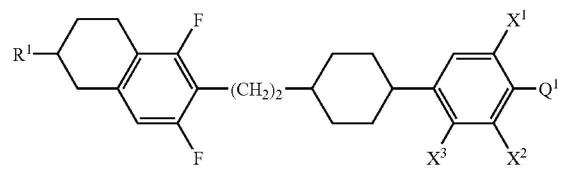
(I-42dk)
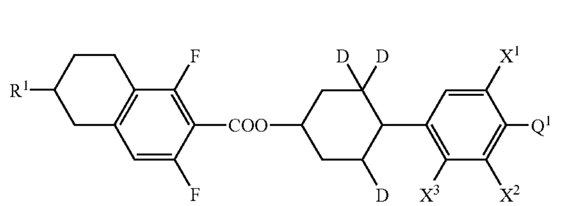
(I-42dl)
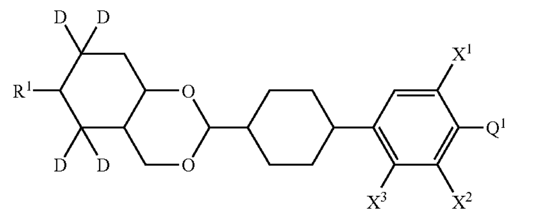
(I-42dm)
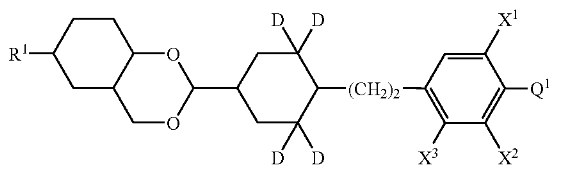
(I-42dn)
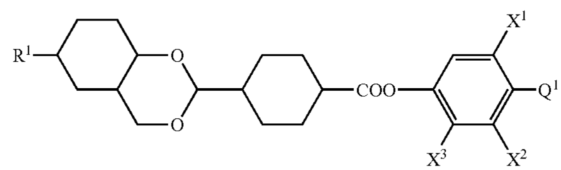
(I-42do)
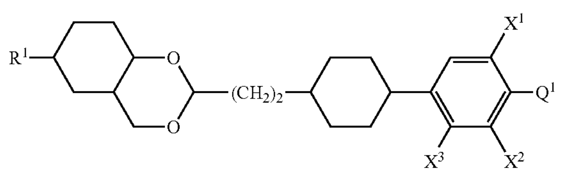
(I-42dp)
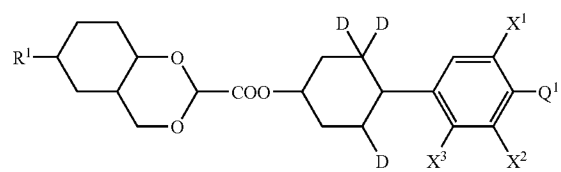
(I-43a)
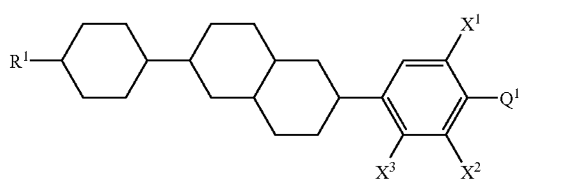
(I-43b)
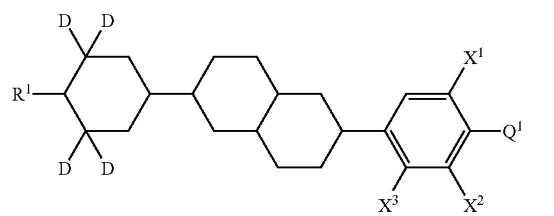
(I-43c)
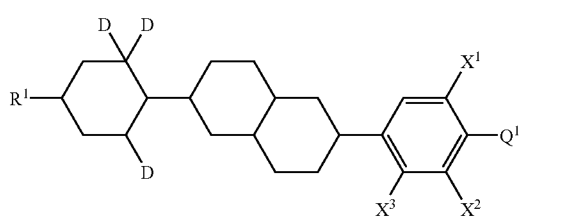
(I-43d)
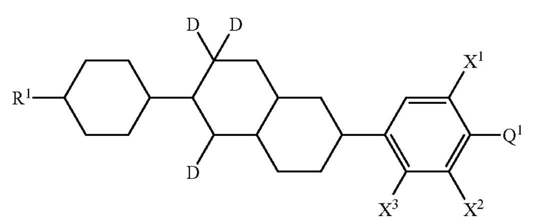
(I-43e)
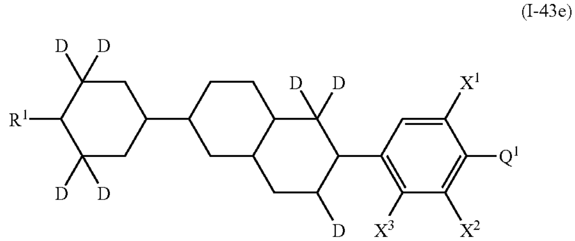
(I-43f)
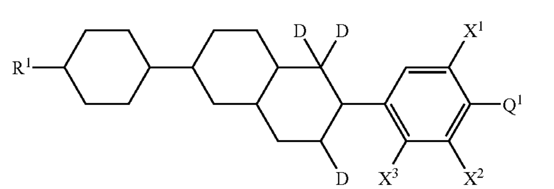

-continued
(I-43g)
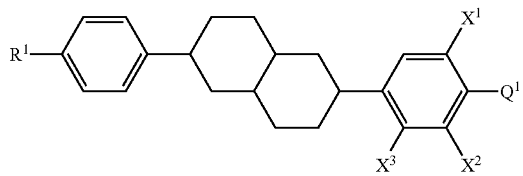
(I-43h)
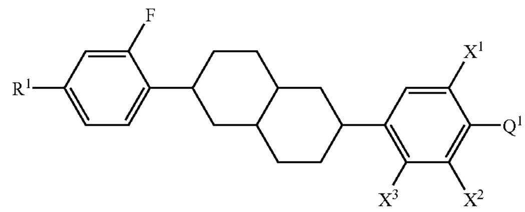
(I-43i)
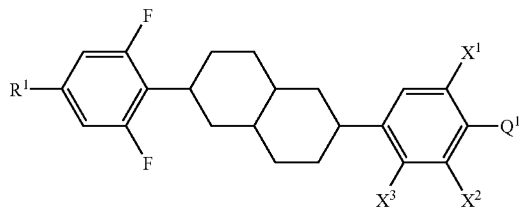
(I-43j)
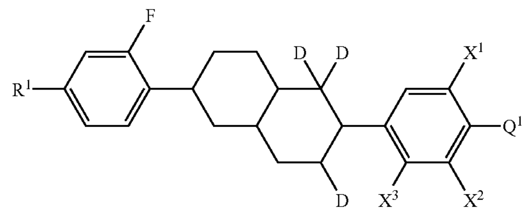
(I-43k)
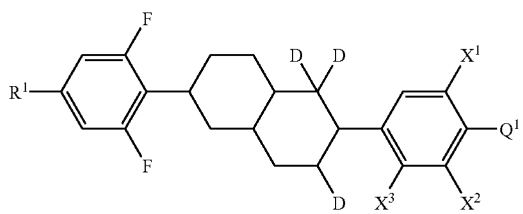
(I-43l)
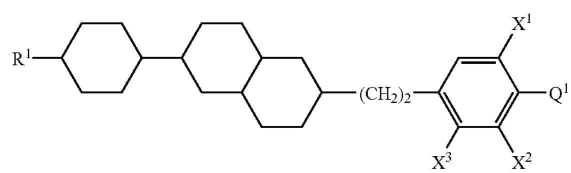
(I-43m)
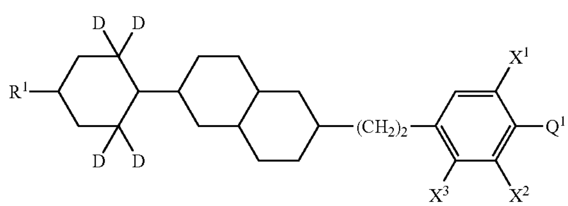
(I-43n)
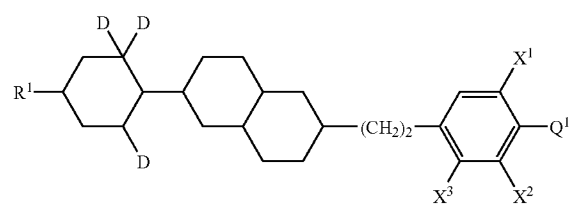
(I-43o)
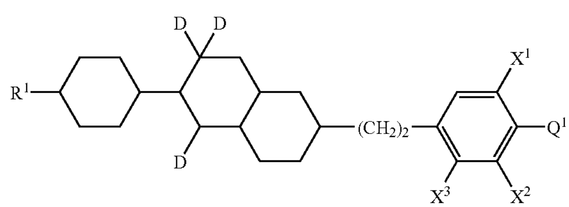
(I-43p)
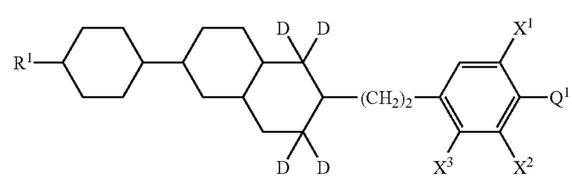
(I-43q)
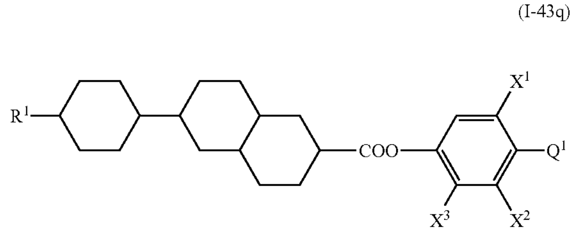
(I-43r)
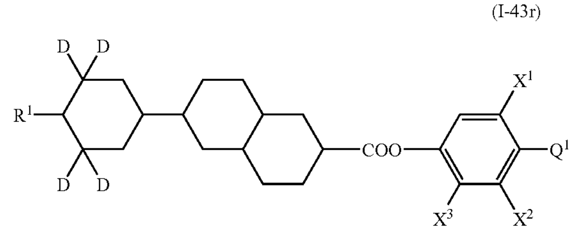
(I-43s)
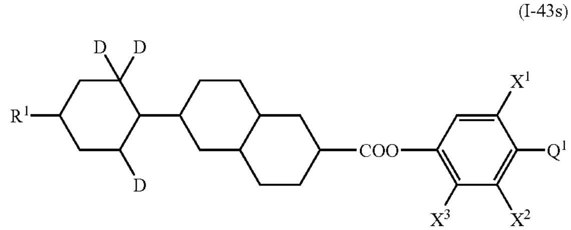
(I-43t)
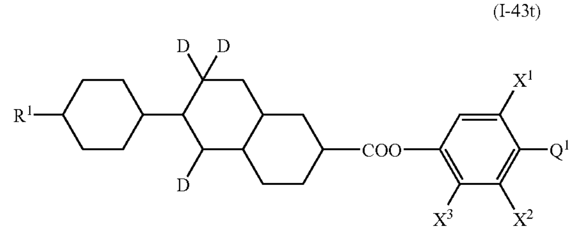

-continued
(I-43u)
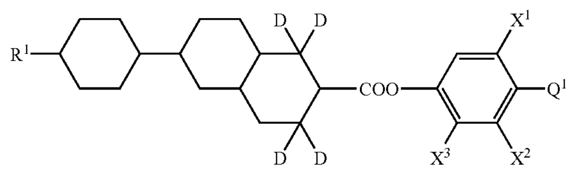
(I-43v)
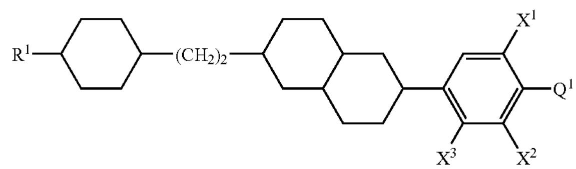
(I-43w)
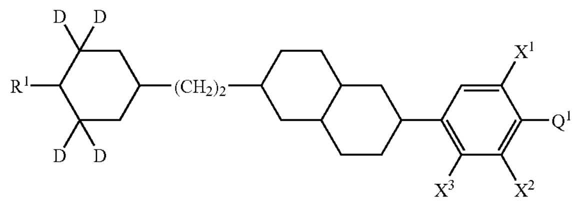
(I-43x)
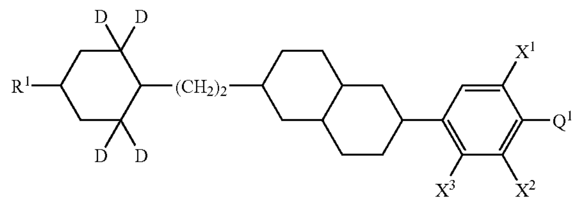
(I-43y)
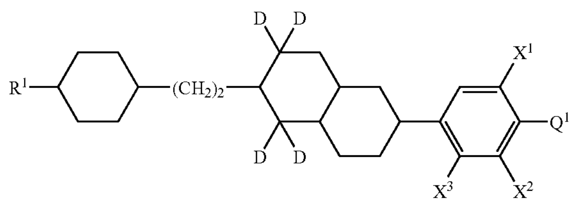
(I-43z)
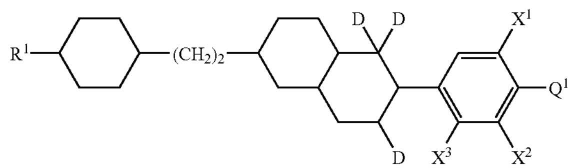
(I-43aa)
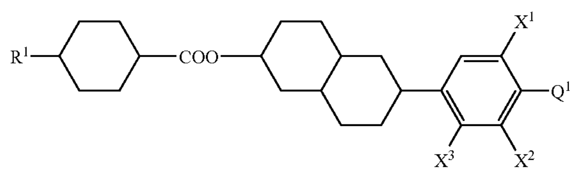
(I-43ab)
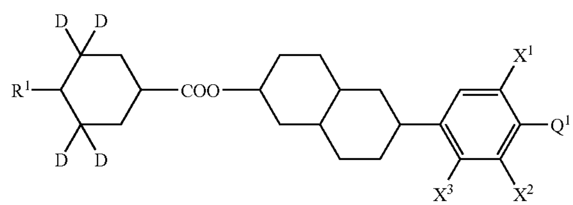
(I-43ac)
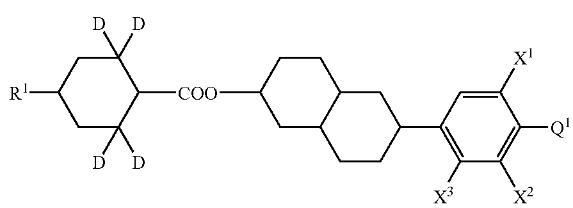
(I-43ad)
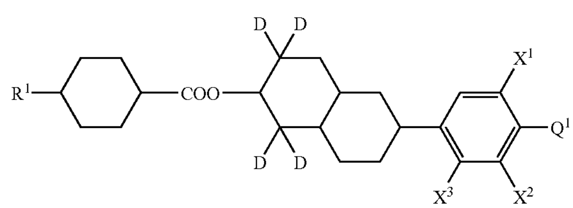
(I-43ae)
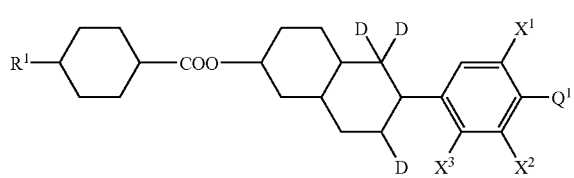
(I-43af)
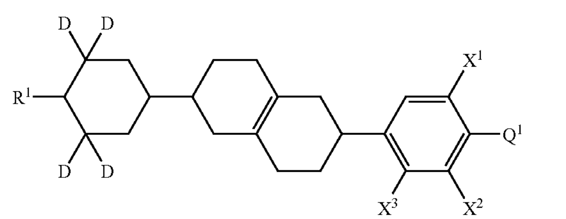
(I-43ag)
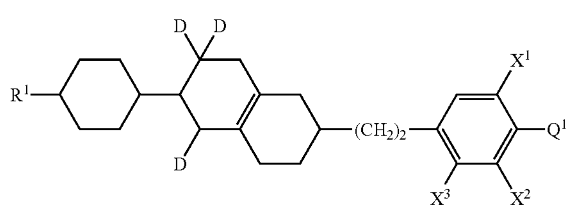
(I-43ah)
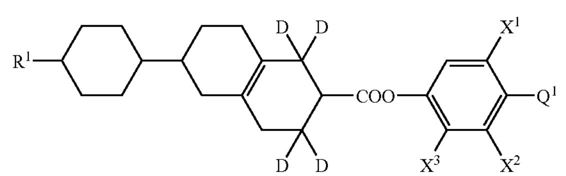

-continued
(I-43ai)
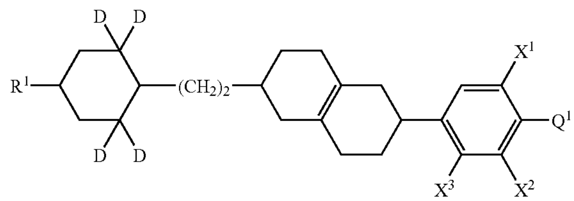
(I-43aj)
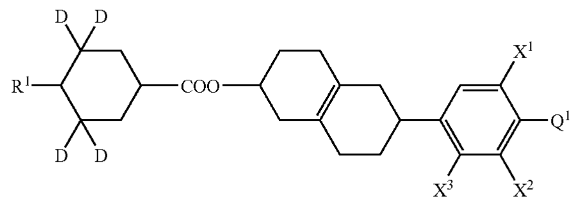
(I-43ak)
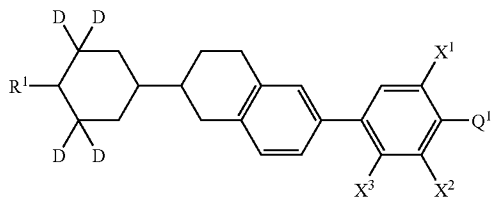
(I-43al)
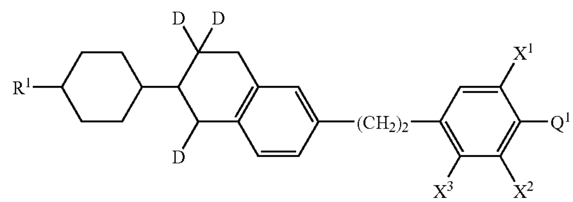
(I-43am)
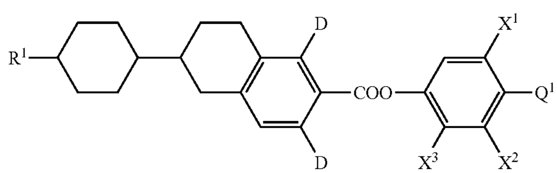
(I-43an)
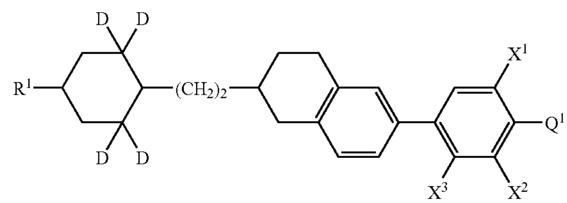
(I-43ao)
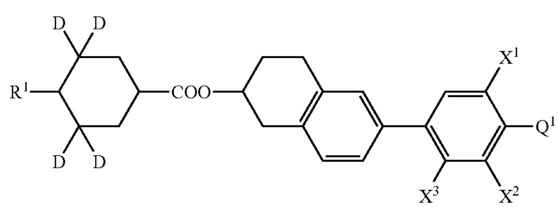
(I-43ap)
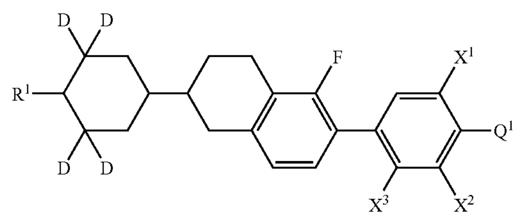
(I-43aq)
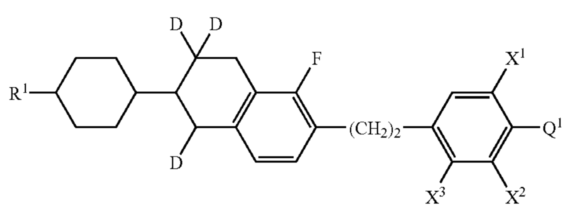
(I-43ar)
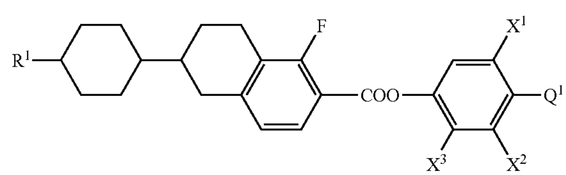
(I-43as)
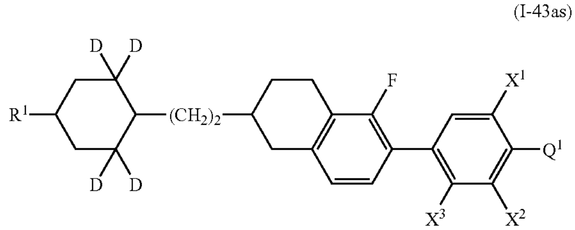
(I-43at)
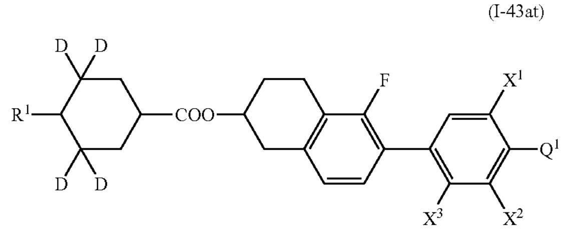
(I-43au)
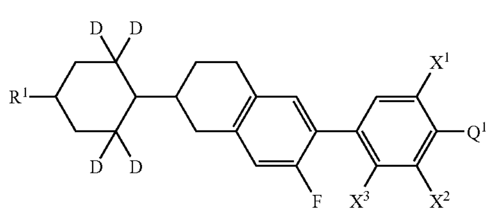
(I-43av)
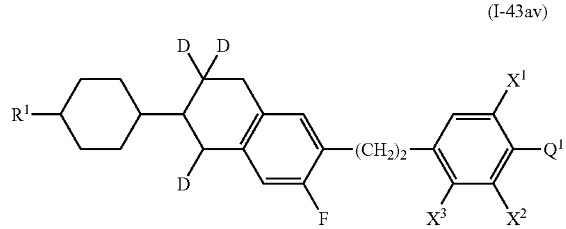

-continued
(I-43aw)
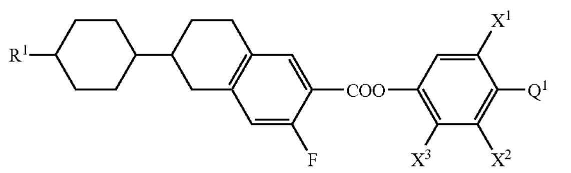
(I-43ax)
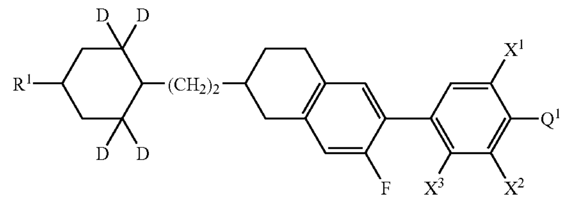
(I-43ay)
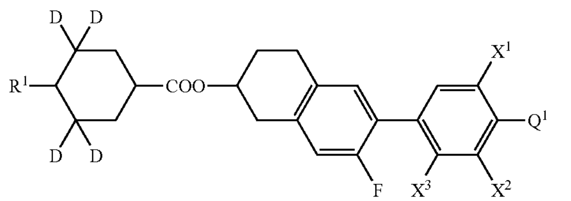
(I-43az)
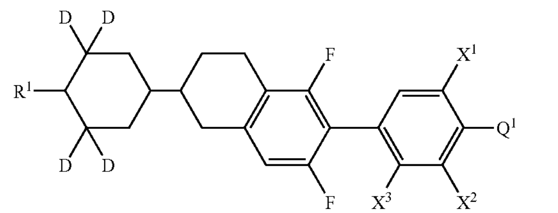
(I-43ba)
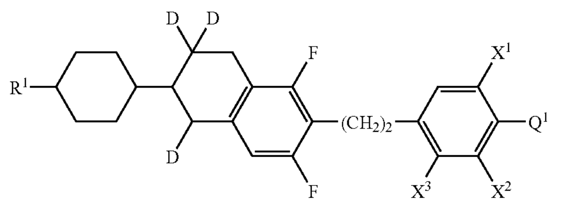
(I-43bb)
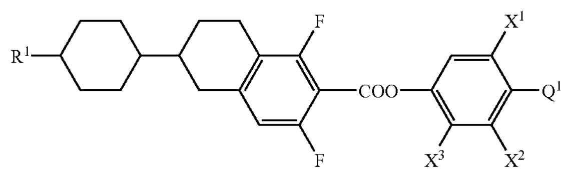
(I-43bc)
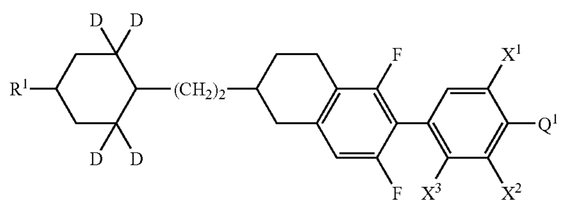
(I-43bd)
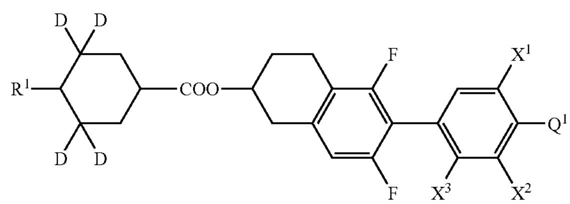
(I-43be)
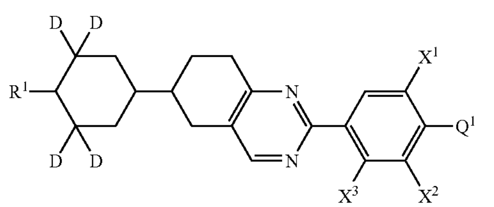
(I-43bf)
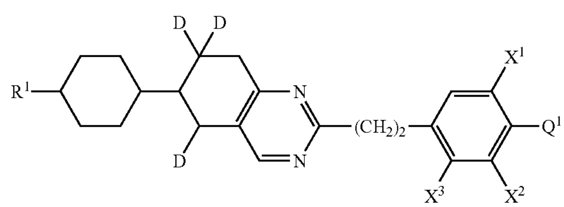
(I-43bg)
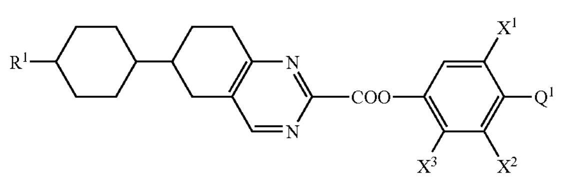
(I-43bh)
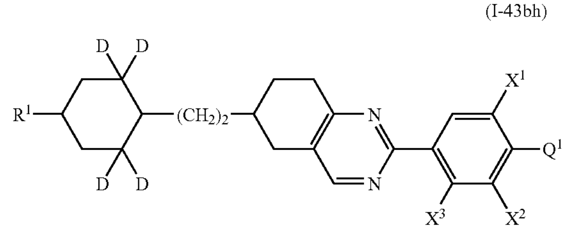
(I-43bi)
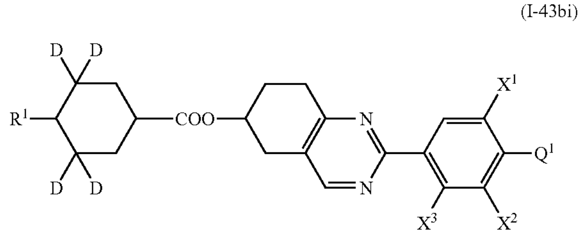
(I-43bj)
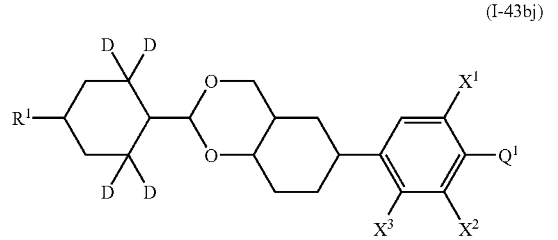

-continued
(I-43bk)
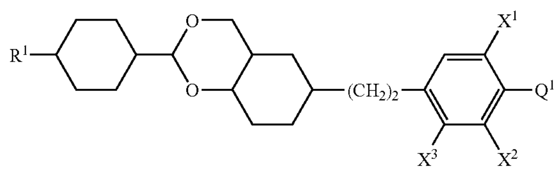
(I-43bl)
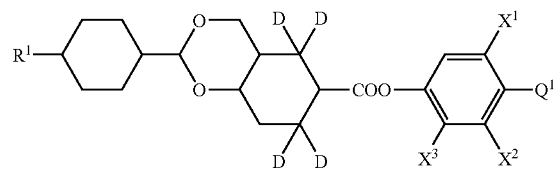
(I-43bm)
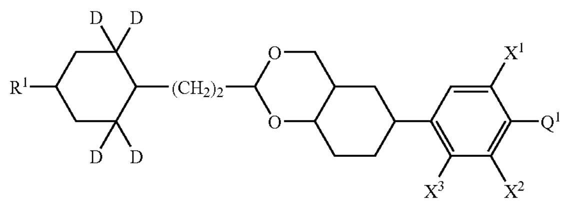
(I-43bn)
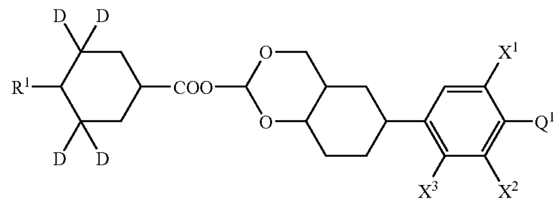
(I-43bo)
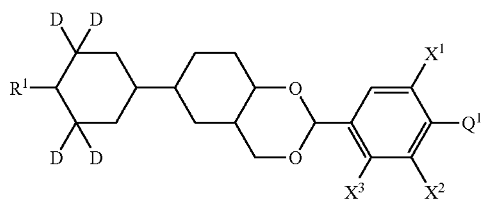
(I-43bp)
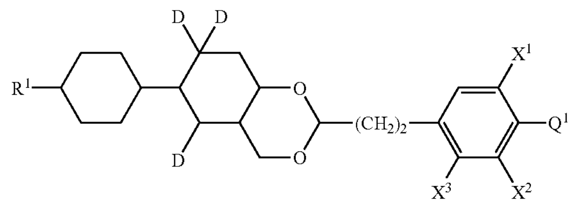
(I-43bq)
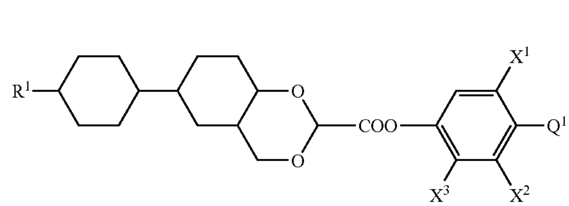
(I-43br)
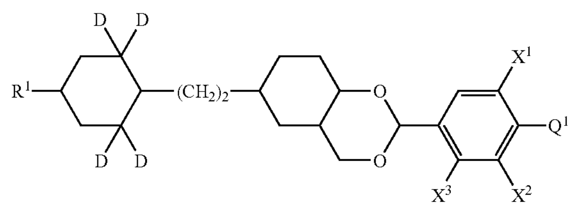
(I-43bs)
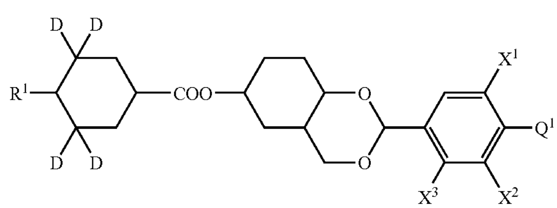
(I-44a)
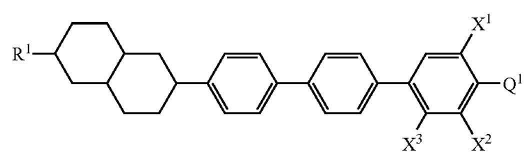
(I-44b)
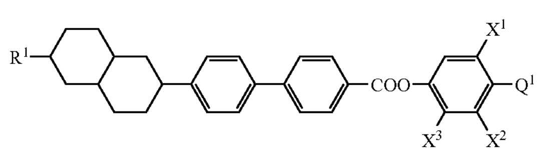
(I-44c)
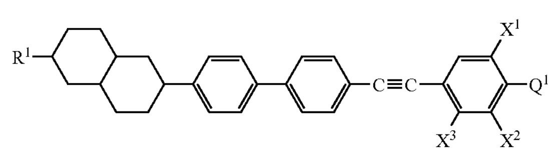
(I-44d)
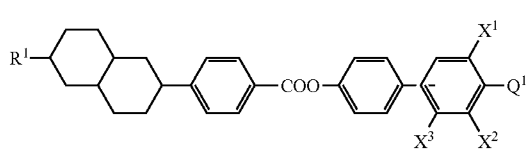
(I-44e)
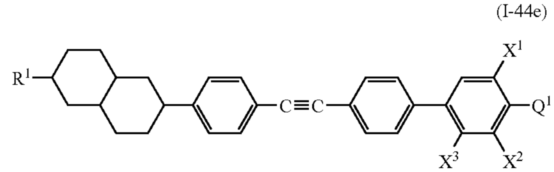
(I-44f)
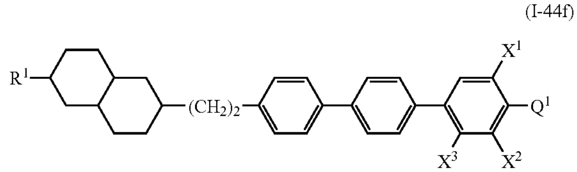
(I-44g)
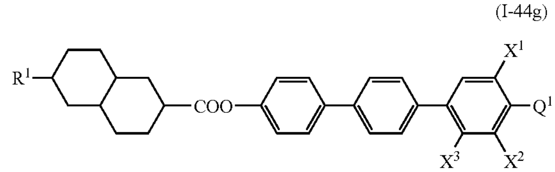

-continued
(I-44h)
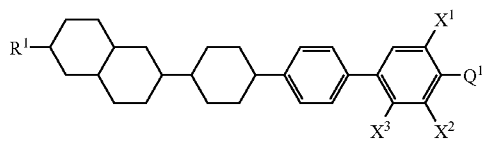
(I-44i)
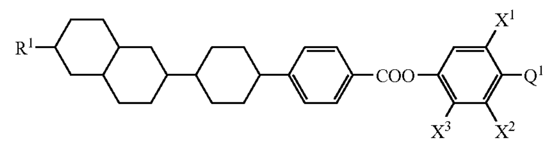
(I-44j)
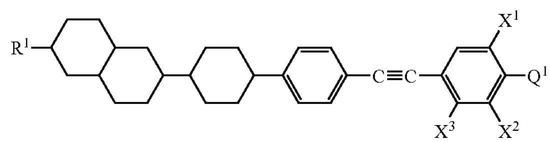
(I-44k)
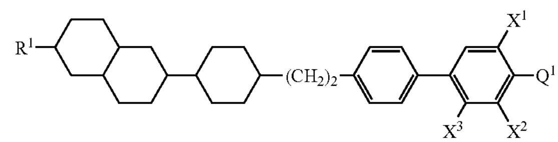
(I-44l)
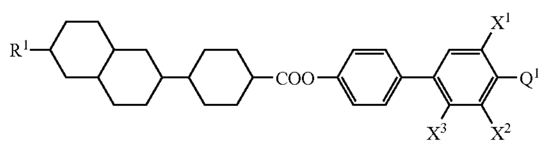
(I-44m)
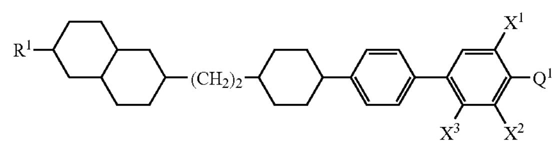
(I-44n)
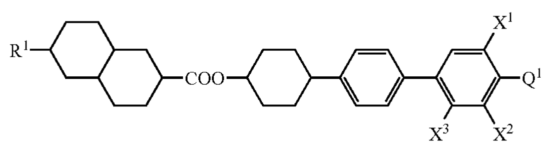
(I-44o)
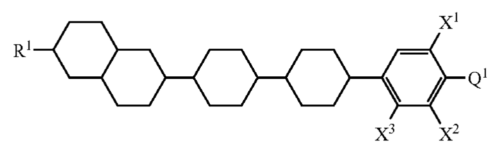
(I-44p)
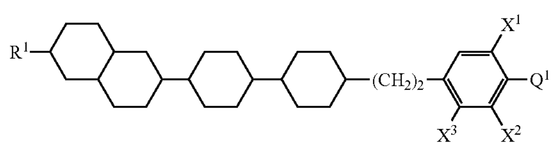
(I-44q)
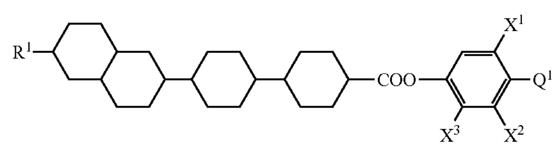
(I-44r)
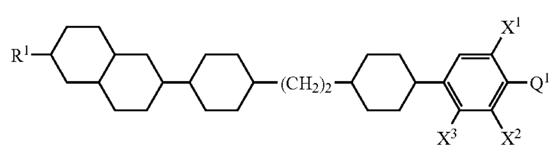
(I-44s)
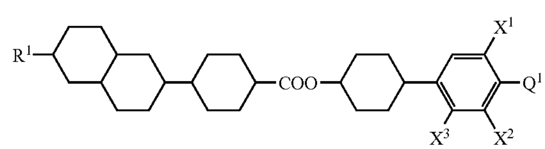
(I-44t)
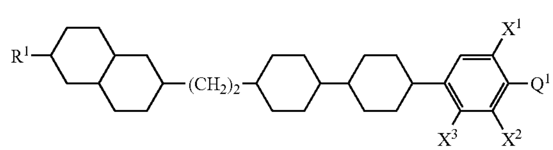
(I-44u)
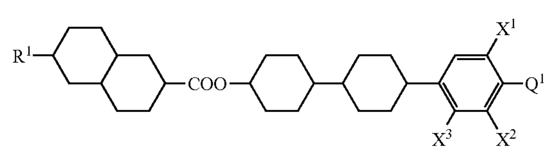
(I-45a)
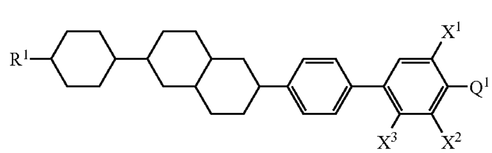
(I-45b)
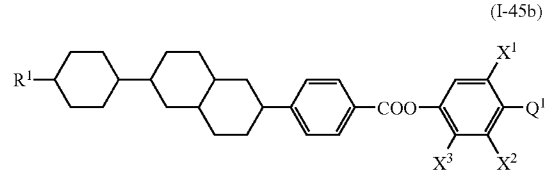
(I-45c)
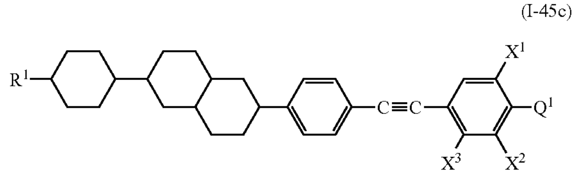
(I-45d)
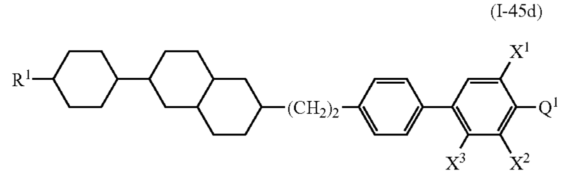

-continued
(I-45e)
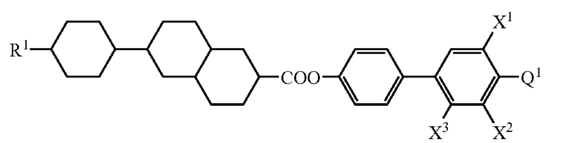
(I-45f)
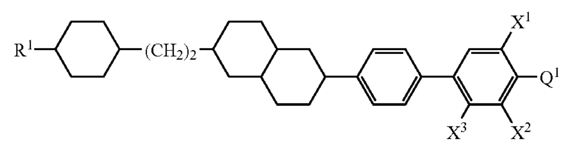
(I-45g)
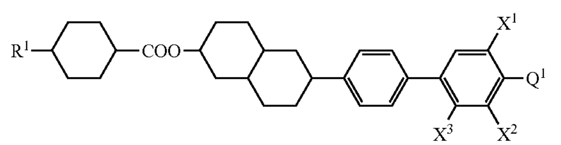
(I-45h)
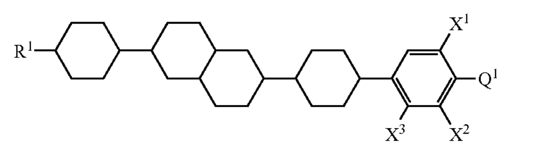
(I-45i)
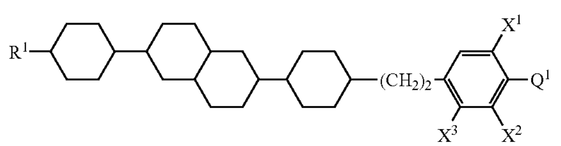
(I-45j)
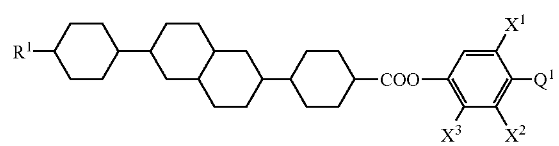
(I-45k)
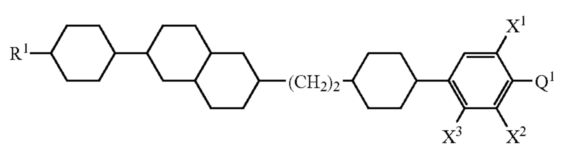
(I-45l)
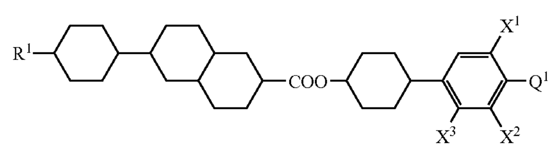
(I-45m)
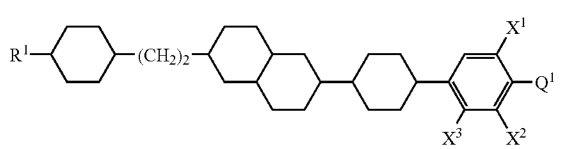
(I-45n)
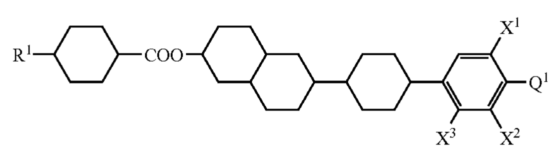
(I-46a)
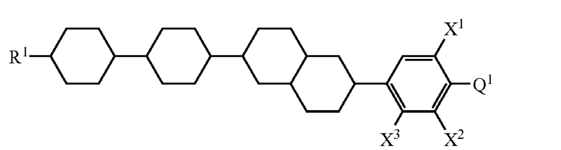
(I-46b)
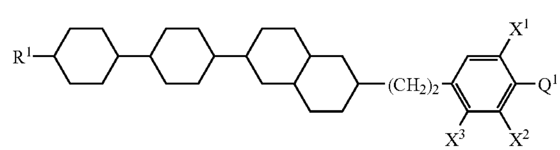
(I-46c)
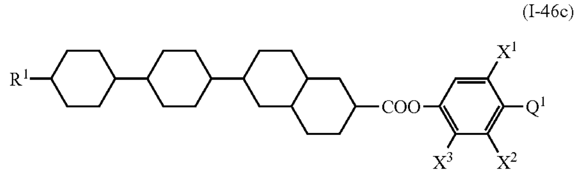
(I-46d)
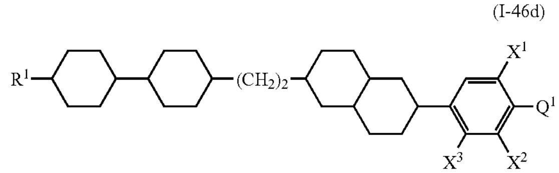
(I-46e)
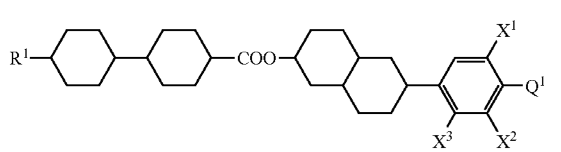
(I-46f)
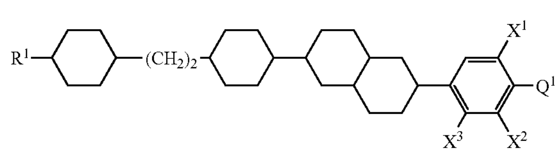
(I-46g)
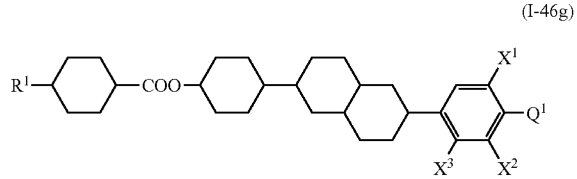
(I-51a)
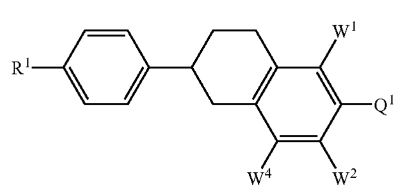

-continued
(I-51b)
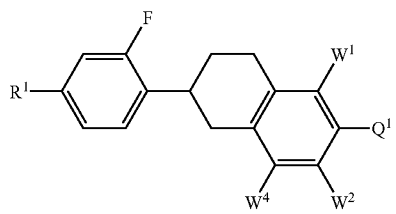
(I-51c)
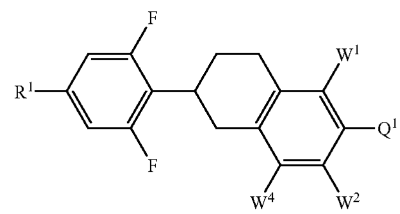
(I-51d)
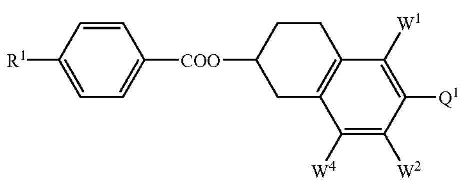
(I-51e)
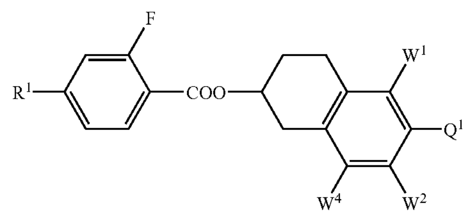
(I-51f)
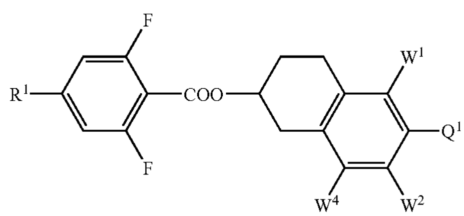
(I-51g)
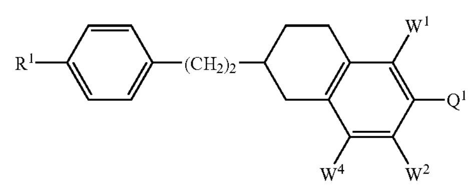
(I-51h)
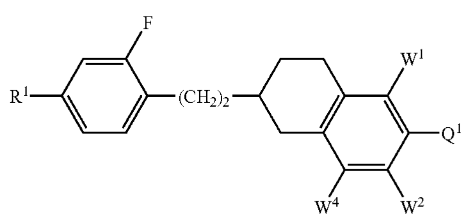
(I-51i)
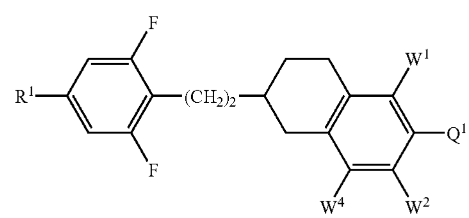
(I-51j)
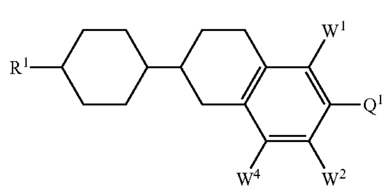
(I-51k)
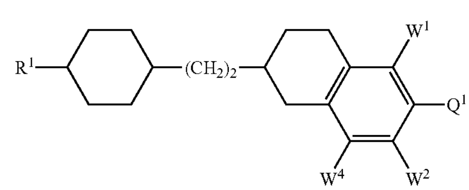
(I-51l)
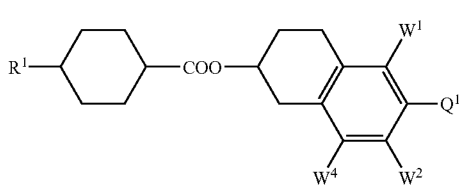
(I-51m)
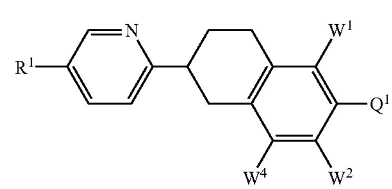
(I-51n)
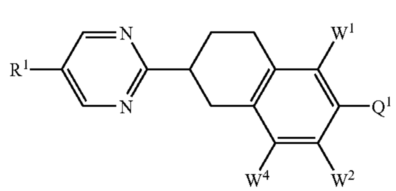
(I-51o)
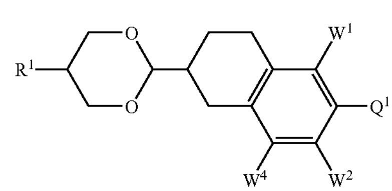

-continued
(I-51p)
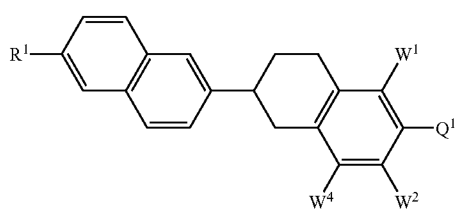
(I-51q)
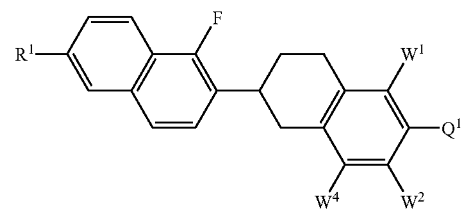
(I-51r)
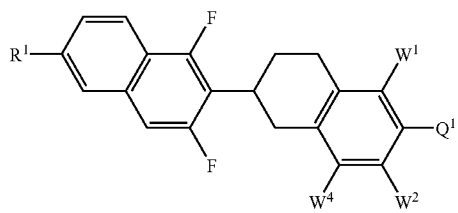
(I-51s)
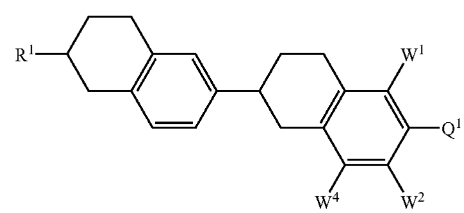
(I-51t)
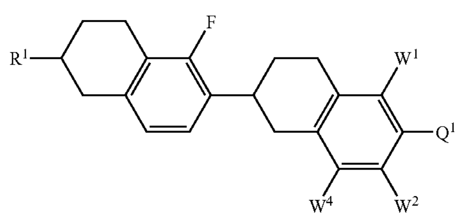
(I-51u)
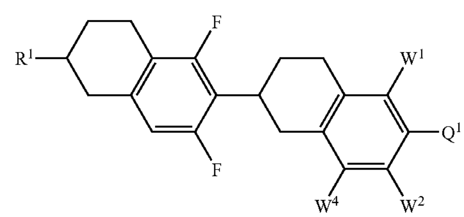
(I-51v)
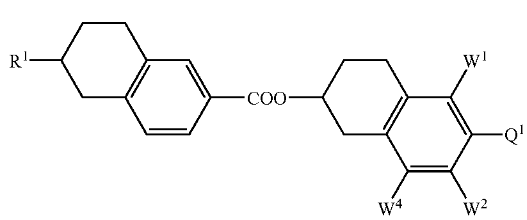
(I-51w)
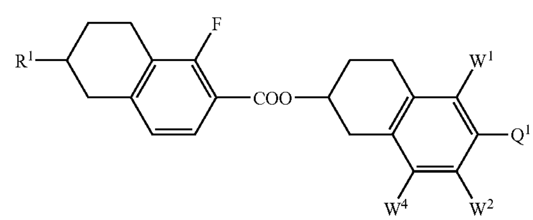
(I-51x)
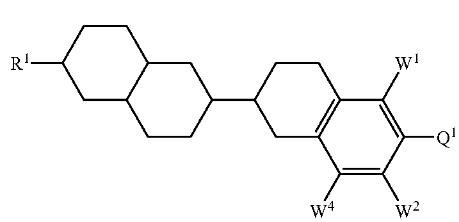
(I-51y)
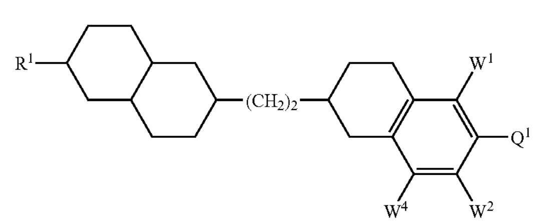
(I-52a)
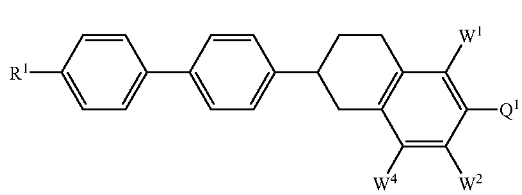
(I-52b)
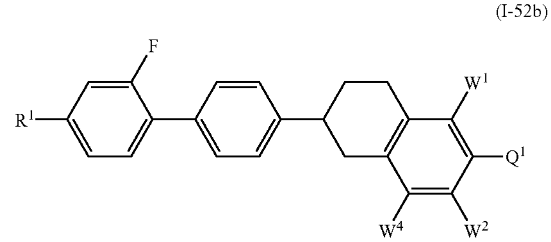

-continued
(I-52c)
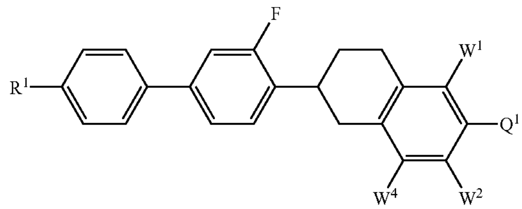
(I-52d)
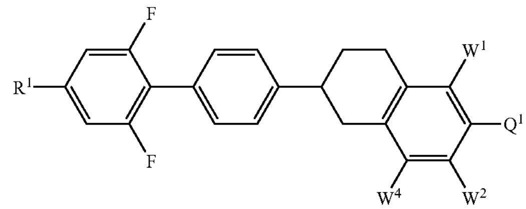
(I-52e)
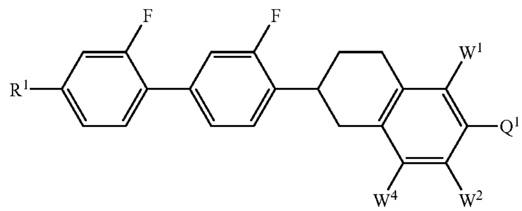
(I-52f)
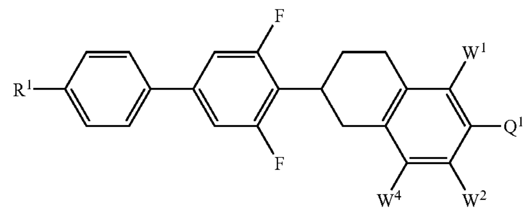
(I-52g)
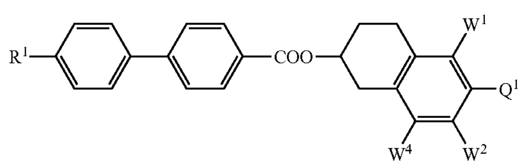
(I-52h)
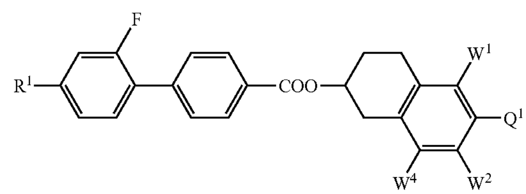
(I-52i)
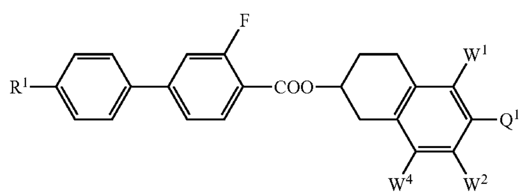
(I-52j)
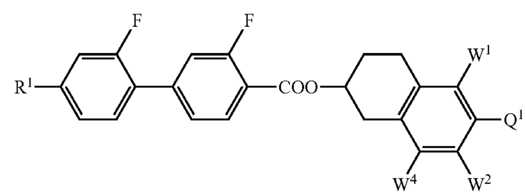
(I-52k)
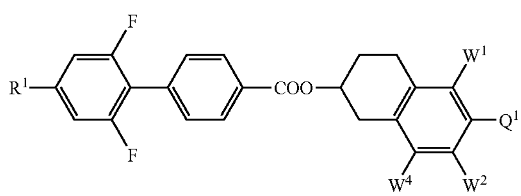
(I-52l)
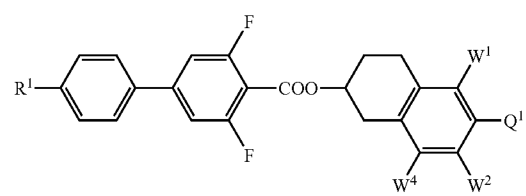
(I-52m)
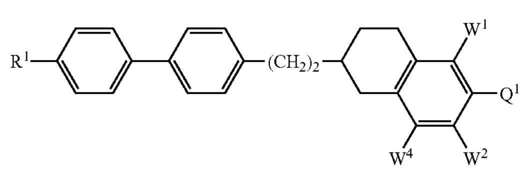
(I-52n)
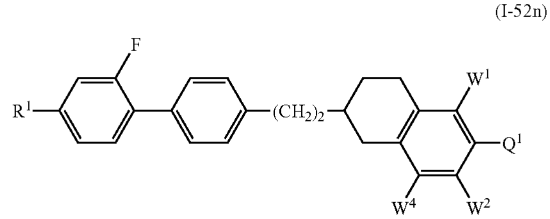
(I-52o)
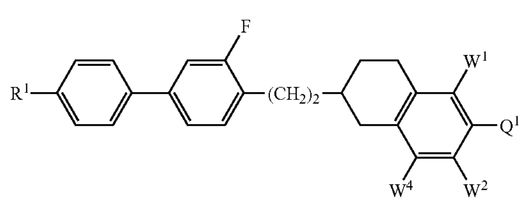
(I-52p)
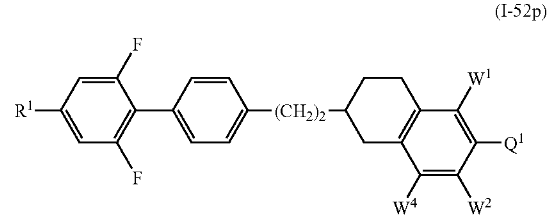

-continued
(I-52q)
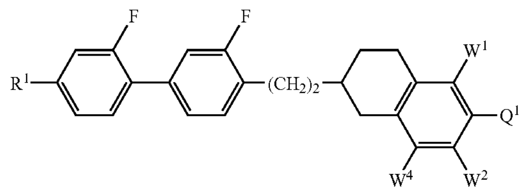
(I-52r)
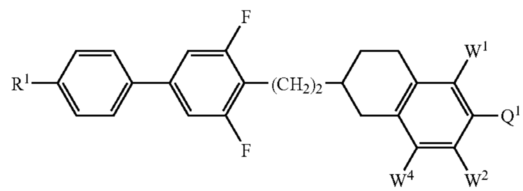
(I-52s)
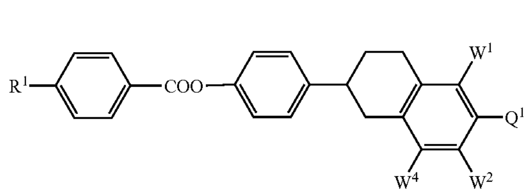
(I-52t)
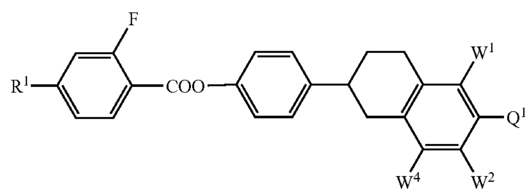
(I-52u)
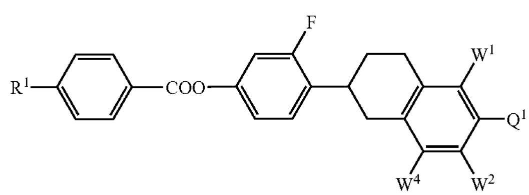
(I-52v)
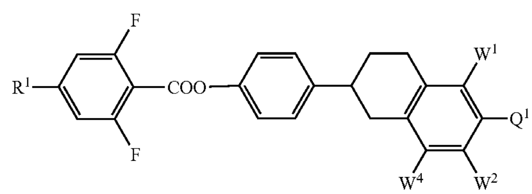
(I-52w)
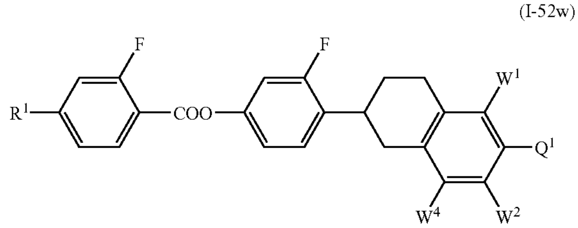
(I-52x)
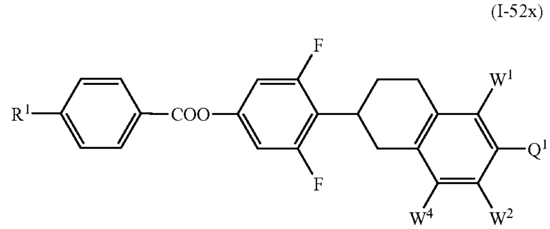
(I-52y)
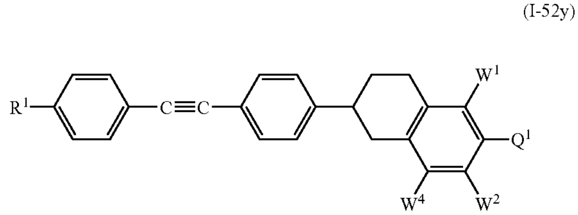
(I-52z)
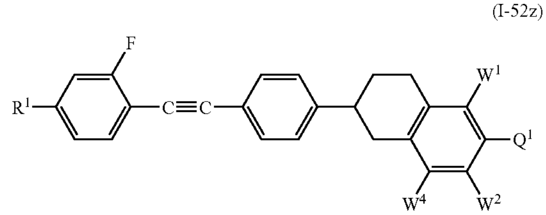
(I-52aa)
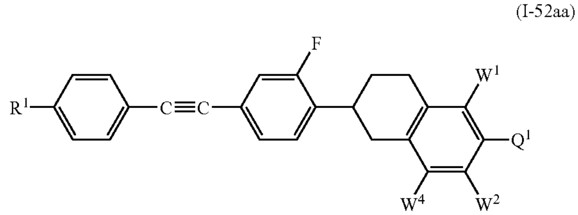
(I-52ab)
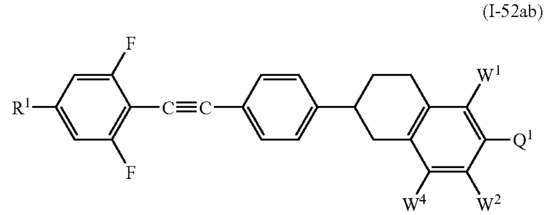
(I-52ac)
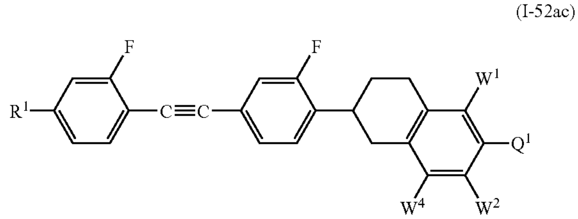
(I-52ad)
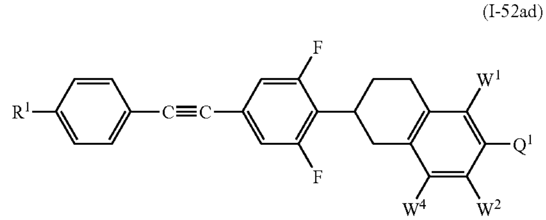

-continued
(I-52ae)
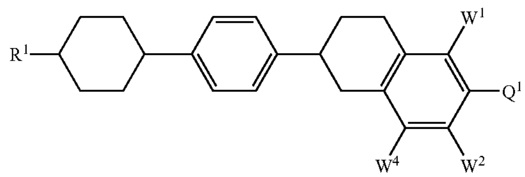
(I-52af)
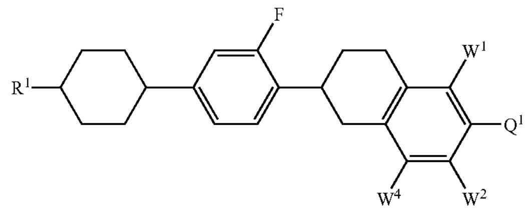
(I-52ag)
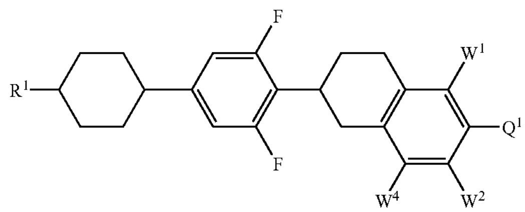
(I-52ah)
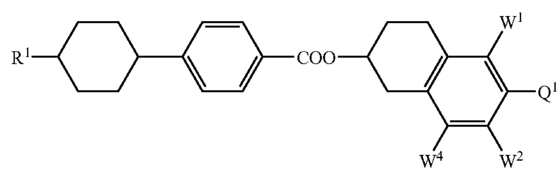
(I-52ai)
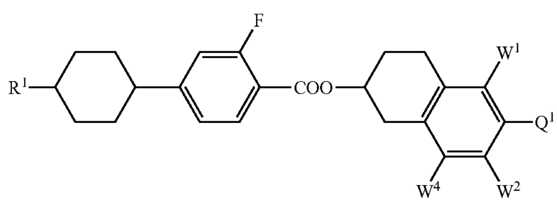
(I-52aj)
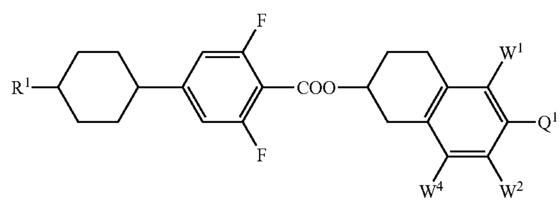
(I-52ak)
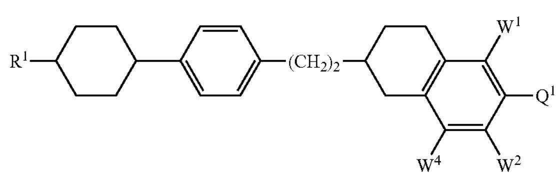
(I-52al)
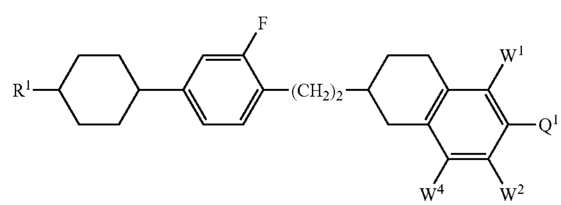
(I-52am)
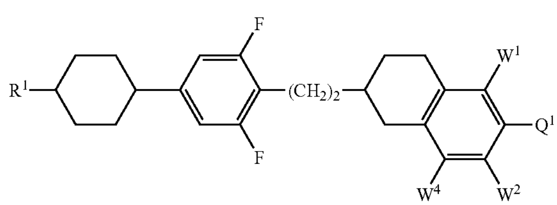
(I-52an)
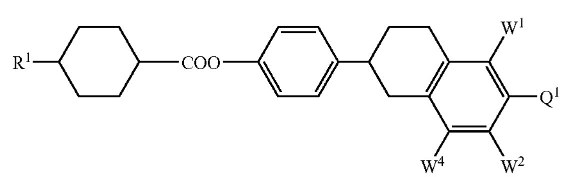
(I-52ao)
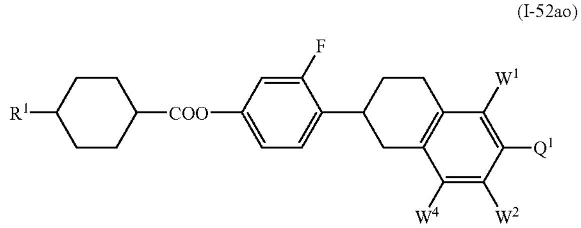
(I-52ap)
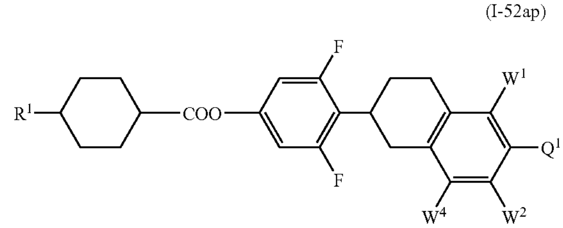
(I-52aq)
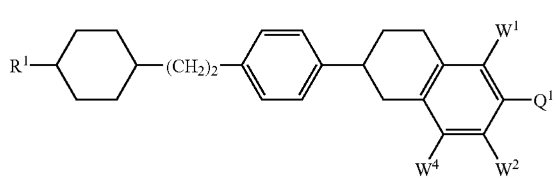
(I-52ar)
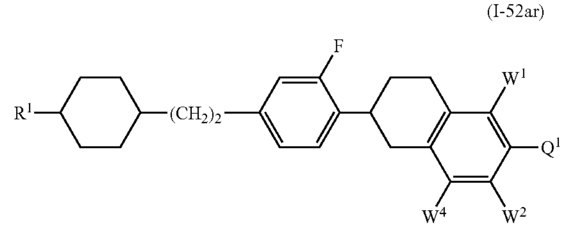

-continued
(I-52as)
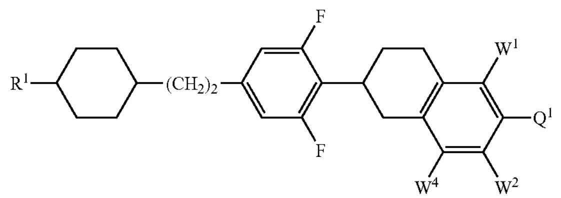
(I-52at)
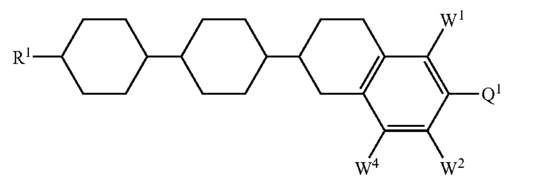
(I-52au)
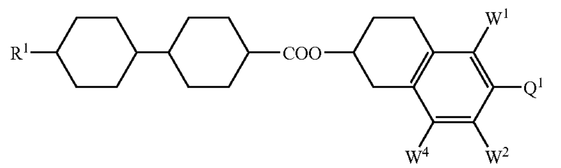
(I-52av)
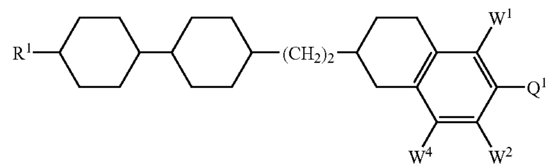
(I-52aw)
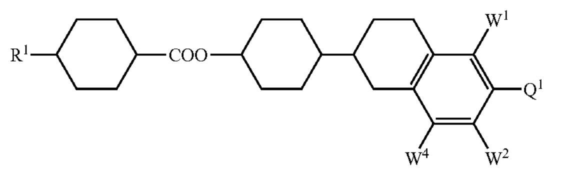
(I-52ax)
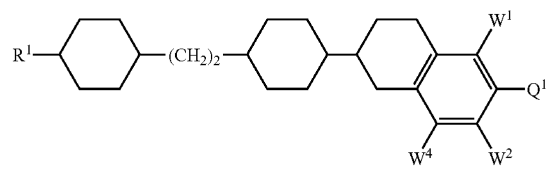
(I-52ay)
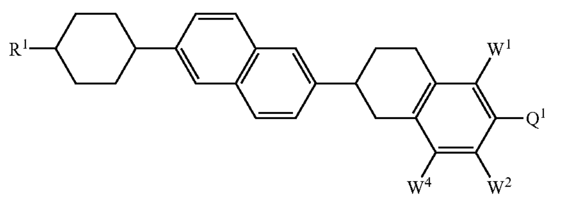
(I-52az)
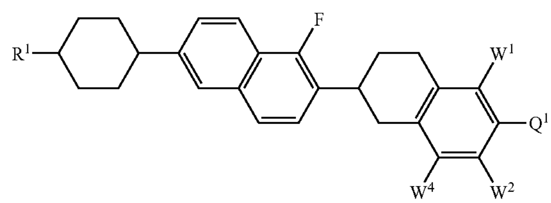
(I-52ba)
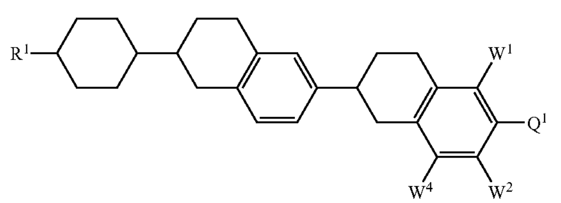
(I-52bb)
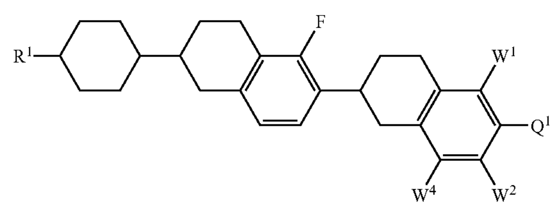
(I-52bc)
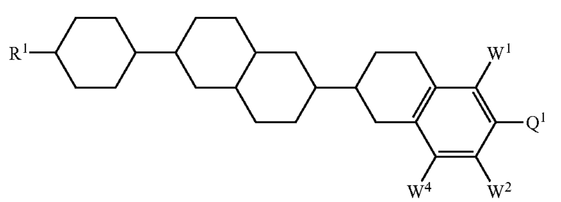
(I-52bd)
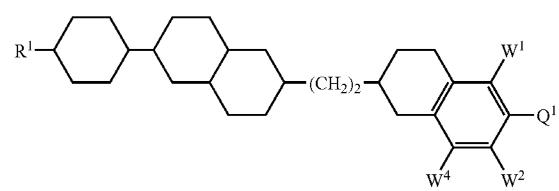
(I-53a)
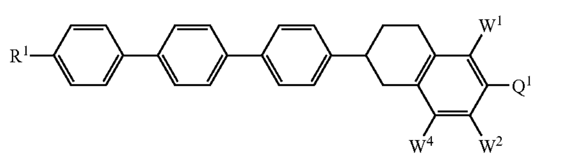
(I-53b)
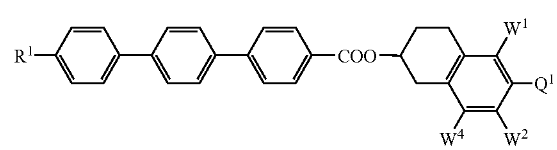
(I-53c)
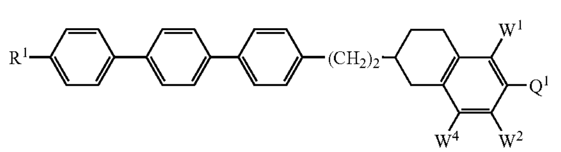
(I-53d)
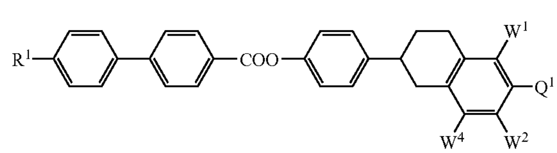

-continued
(I-53e)
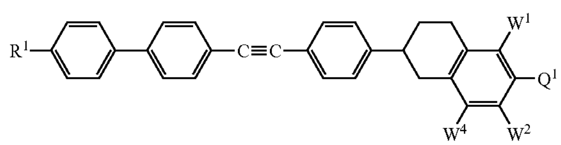
(I-53f)
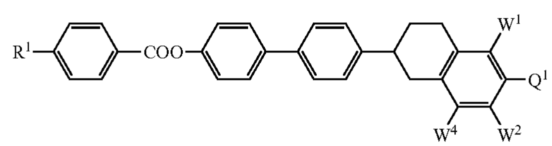
(I-53g)
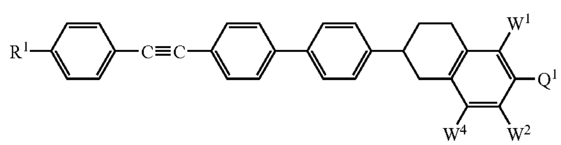
(I-53h)
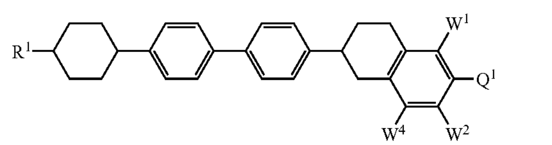
(I-53i)
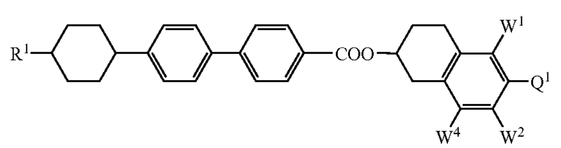
(I-53j)
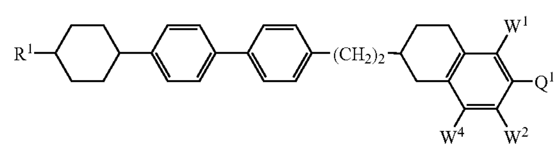
(I-53k)
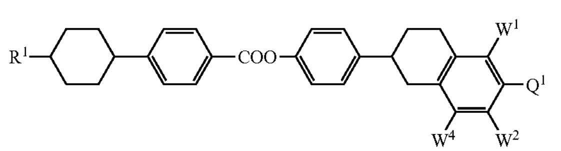
(I-53l)
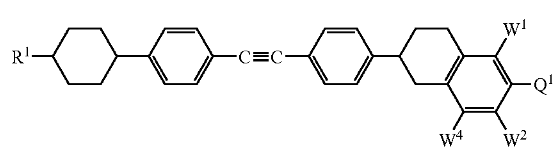
(I-53m)
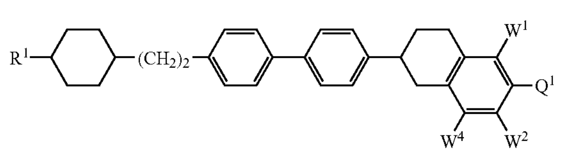
(I-53n)
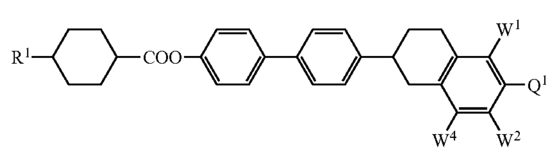
(I-53o)
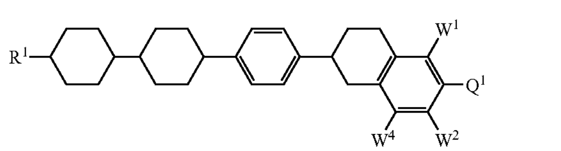
(I-53p)
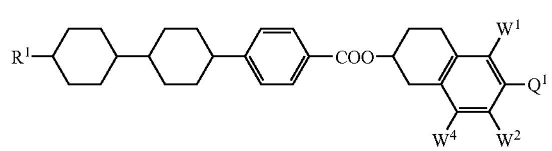
(I-53q)
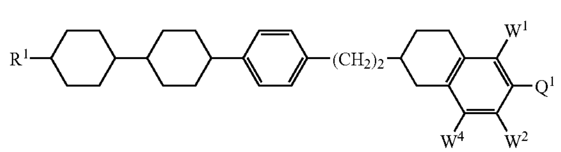
(I-53r)
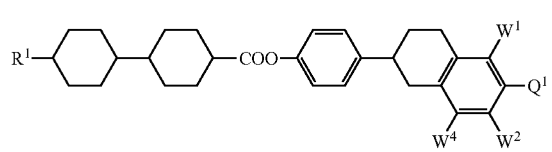
(I-53s)
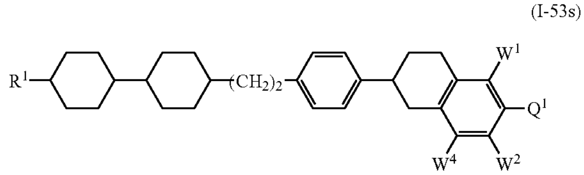
(I-53t)
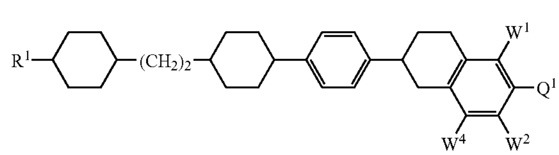
(I-53u)
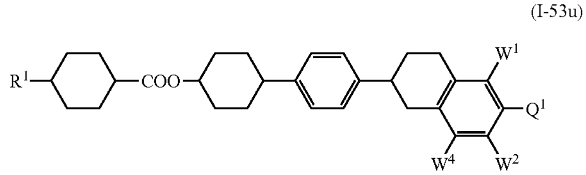
(I-53v)
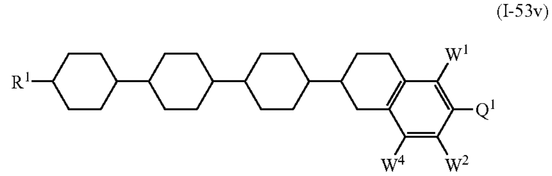

-continued (I-53w)

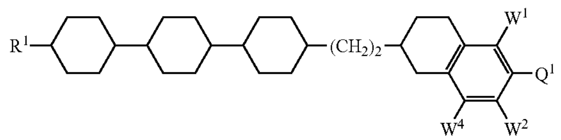

(I-53x)

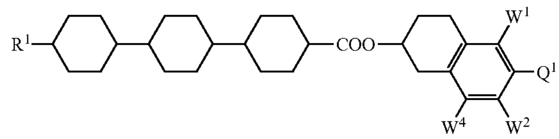

(I-53y)

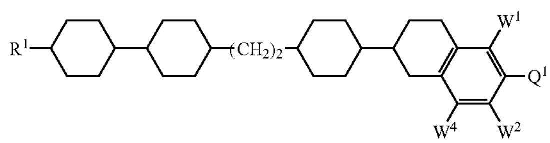

(I-53z)

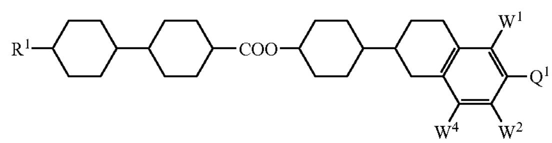

(I-53aa)

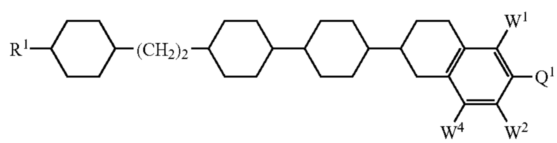

(I-53ab)

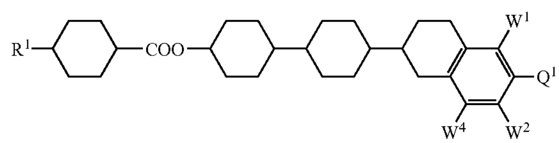

Preferred embodiments of the formula (I-6) include compounds represented by the following general formulas (I-6a) to (I-6bc).

| | |
|---|---|
| (I-6) | $R^1$— |
| (I-6a) | $C_2H_5$— |
| (I-6b) | $C_3H_7$— |
| (I-6c) | $C_4H_9$— |
| (I-6d) | $C_5H_{11}$— |
| (I-6e) | $C_6H_{13}$— |
| (I-6f) | $C_7H_{15}$— |
| (I-6g) | $C_2H_5O$— |
| (I-6h) | $C_3H_7O$— |
| (I-6i) | $C_4H_9O$— |
| (I-6j) | $C_5H_{11}O$— |
| (I-6k) | $C_6H_{13}O$— |
| (I-6l) | $C_7H_{15}O$— |
| (I-6m) | $C_2H_5COO$— |
| (I-6n) | $C_3H_7COO$— |
| (I-6o) | $C_4H_9COO$— |
| (I-6p) | $C_5H_{11}COO$— |
| (I-6q) | $C_6H_{13}COO$— |
| (I-6r) | $C_7H_{15}COO$— |
| (I-6s) | $CH_3OCH_2$— |
| (I-6t) | $CH_3OC_2H_4$— |
| (I-6u) | $CH_3OC_3H_6$— |
| (I-6v) | $CH_3OC_4H_8$— |
| (I-6w) | $CH_3OC_5H_{10}$— |
| (I-6x) | $C_2H_5OCH_2$— |
| (I-6y) | $C_2H_5OC_2H_4$— |
| (I-6z) | $C_2H_5OC_3H_6$— |
| (I-6aa) | $C_2H_5OC_4H_8$— |
| (I-6ab) | $C_2H_5OC_5H_{10}$— |
| (I-6ac) | $C_3H_7OCH_2$— |
| (I-6ad) | $C_3H_7OC_2H_4$— |
| (I-6ae) | $C_3H_7OC_3H_6$— |
| (I-6af) | $C_3H_7OC_4H_8$— |
| (I-6ag) | $C_3H_7OC_5H_{10}$— |
| (I-6ah) | $CH_2{=}CH$— |
| (I-6ai) | $CH_3CH{=}CH$— |
| (I-6aj) | $C_2H_5CH{=}CH$— |
| (I-6ak) | $C_3H_7CH{=}CH$— |
| (I-6al) | $CH_2{=}CHC_2H_4$— |
| (I-6am) | $CH_3CH_2{=}CHC_2H_4$— |
| (I-6an) | $CH_2{=}CHC_2H_5CH{=}CH$— |
| (I-6ao) | $CH_2{=}CHCH_2O$— |
| (I-6ap) | $CH_3CH{=}CHCH_2O$— |
| (I-6aq) | $C_2H_5CH{=}CHCH_2O$— |
| (I-6ar) | $CH_2{=}CHC_3H_6O$— |
| (I-6as) | $CH_2{=}CHC_4H_8O$— |
| (I-6at) | $CH_3CH_2{=}CHC_4H_8O$— |
| (I-6au) | $CH_2{=}CHC_2H_5CH{=}CHCH_2O$— |
| (I-6av) | $CHF{=}CH$— |
| (I-6aw) | $CH_2{=}CF$— |
| (I-6ax) | $CF_2{=}CH$— |
| (I-6ay) | $CHF{=}CF$— |
| (I-6az) | $CHF{=}CHC_2H_4$— |
| (I-6ba) | $CH_2{=}CFC_2H_4$— |
| (I-6bb) | $CF_2{=}CHC_2H_4$— |
| (I-6bc) | $CHF{=}CFC_2H_4$— |

More preferred embodiments of the partial structural formula (I-71) of the naphthalene-2,6-diyl ring having a polar group include compounds represented by the following general formulas (I-71a) to (I-71av).

(I-71)

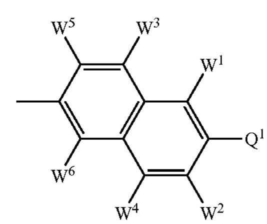

(I-71a)

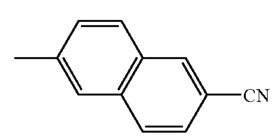

(I-71b)

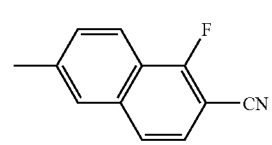

-continued
(I-71c)
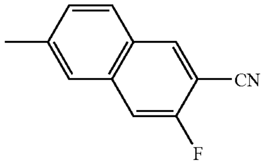
(I-71d)
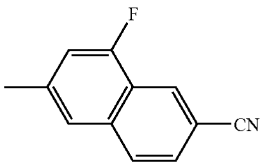
(I-71e)
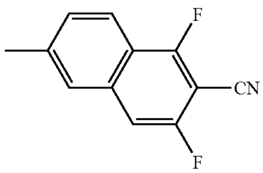
(I-71f)
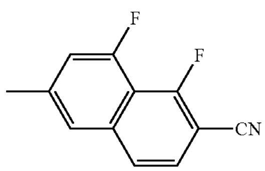
(I-71g)
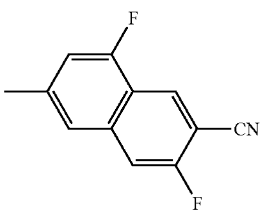
(I-71h)
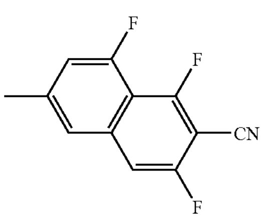
(I-71i)
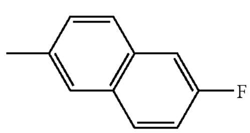
(I-71j)
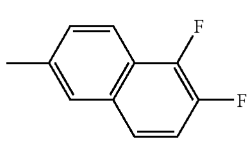
(I-71k)
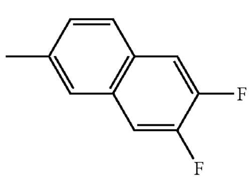
-continued
(I-71l)
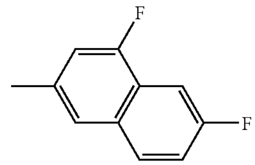
(I-71m)
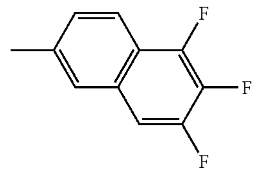
(I-71n)
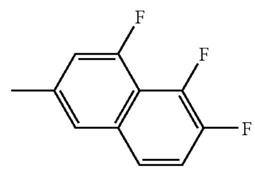
(I-71o)
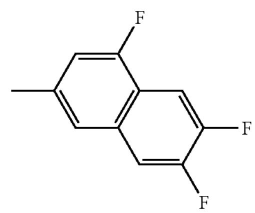
(I-71p)
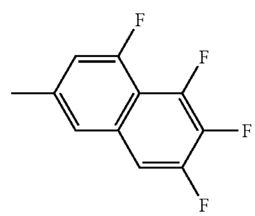
(I-71q)
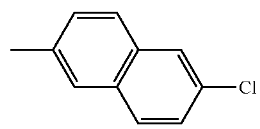
(I-71r)
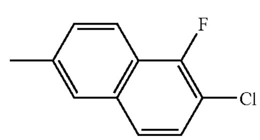
(I-71s)
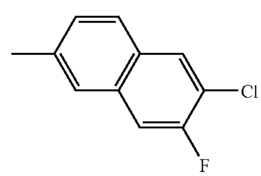
(I-71t)
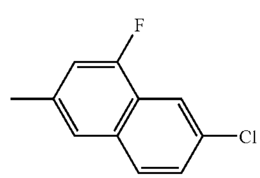

-continued
(I-71u)
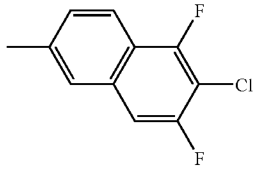
(I-71v)
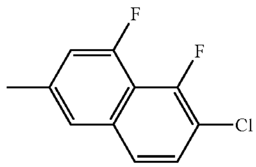
(I-71w)
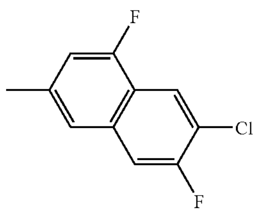
(I-71x)
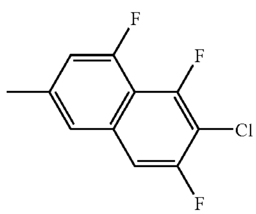
(I-71y)
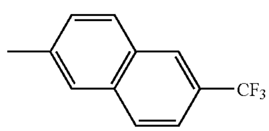
(I-71z)
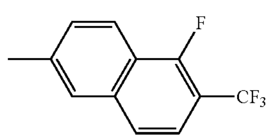
(I-71aa)
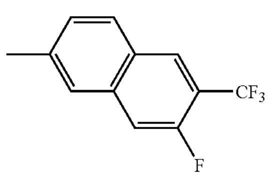
(I-71ab)
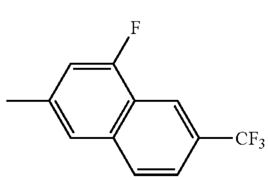
(I-71ac)
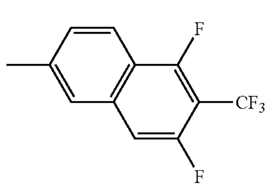
-continued
(I-71ad)
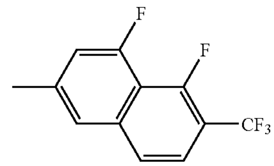
(I-71ae)
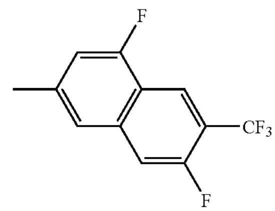
(I-71af)
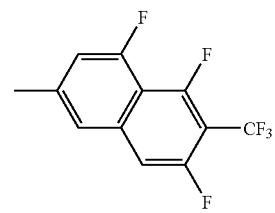
(I-71ag)
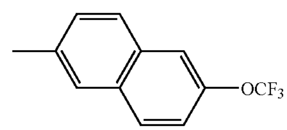
(I-71ah)
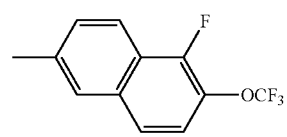
(I-71ai)
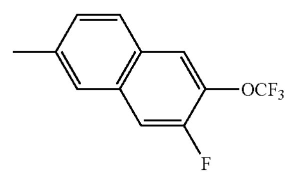
(I-71aj)
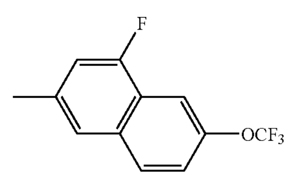
(I-71ak)
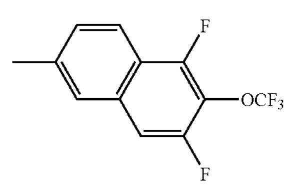
(I-71al)
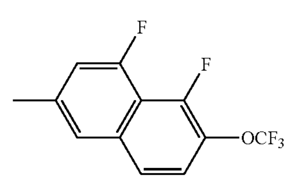

-continued
(I-71am)
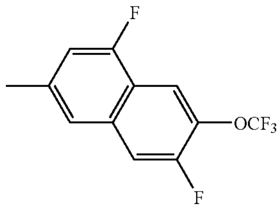
(I-71an)
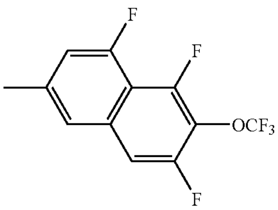
(I-71ao)
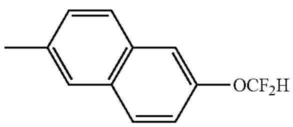
(I-71ap)
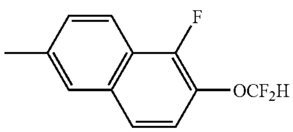
(I-71aq)
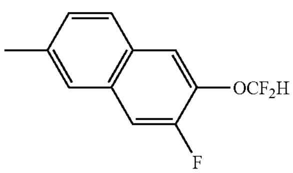
(I-71ar)
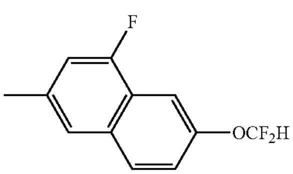
(I-71as)
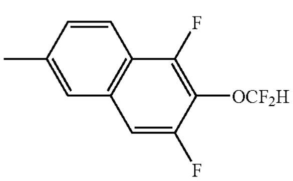
(I-71at)
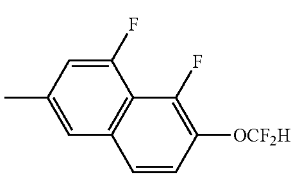
(I-71au)
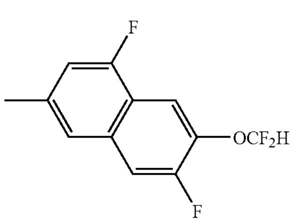
-continued
(I-71av)
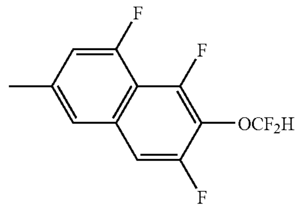
More preferred embodiments of the partial structural formula (I-72) of 1,4-phenylene having a polar group include compounds represented by the following general formulas (I-72a) to (I-72r).
(I-72)
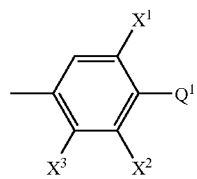
(I-72a)
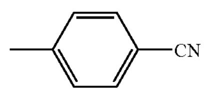
(I-72b)
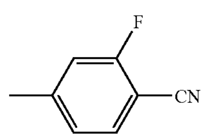
(I-72c)
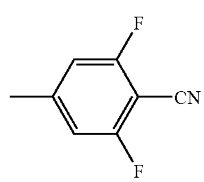
(I-72d)
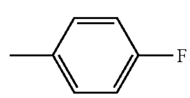
(I-72e)
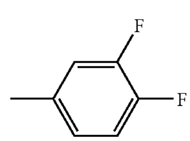
(I-72f)
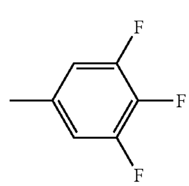
(I-72g)
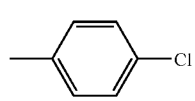

-continued
(I-72h)
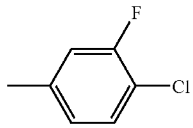
(I-72i)
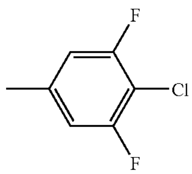
(I-72j)
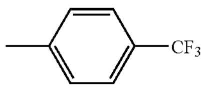
(I-72k)
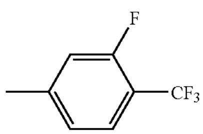
(I-72l)
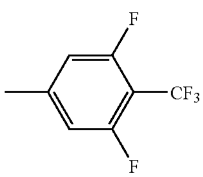
(I72m)
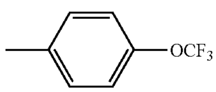
(I-72n)
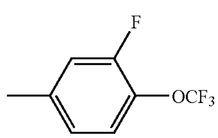
(I-72o)
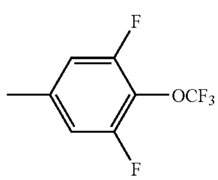
(I-72p)
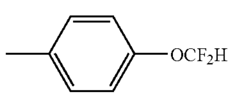
(I-72q)
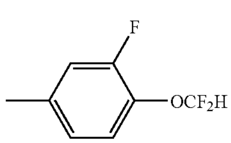
(I-72r)
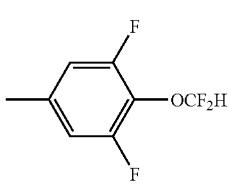
According to the present invention, more preferred embodiments of the partial structural formula (I-73) of the 1,2,3,4-tetrahydronaphthalene-2,6-diyl ring having a polar group are shown in the following general formulas (I-73a) to (I-73bt).
(I-73)
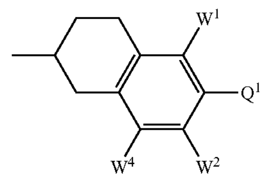
(I-73a)
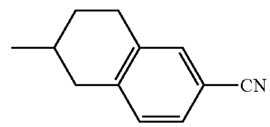
(I-73b)
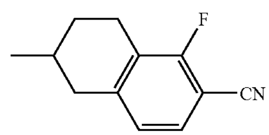
(I-73c)
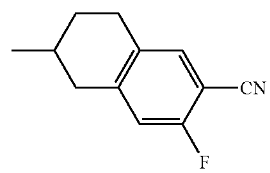
(I-73d)
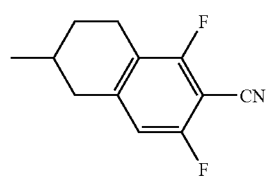
(I-73e)
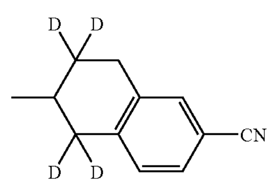
(I-73f)
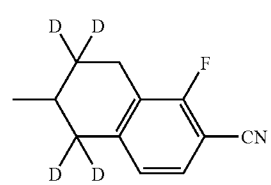
(I-73g)
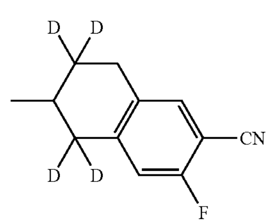

-continued
(I-73h)
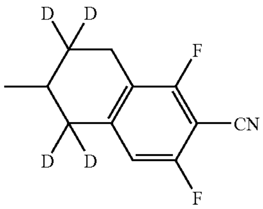
(I-73i)
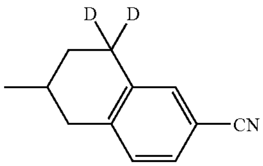
(I-73j)
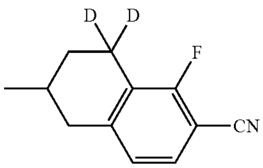
(I-73k)
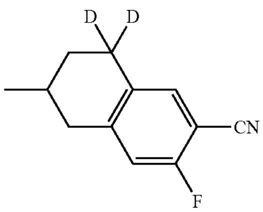
(I-73l)
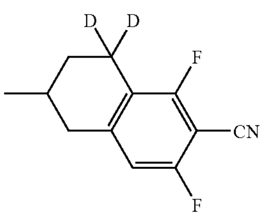
(I-73m)
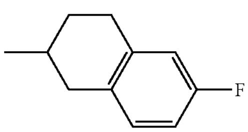
(I-73n)
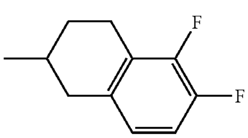
(I-73o)
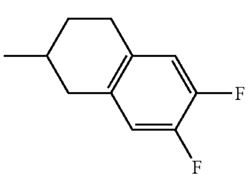
(I-73p)
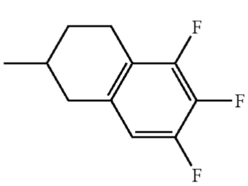
-continued
(I-73q)
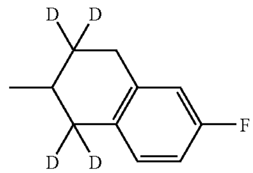
(I-73r)
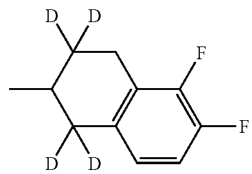
(I-73s)
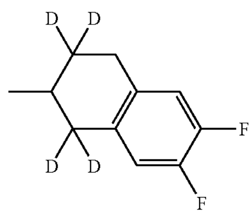
(I-73t)
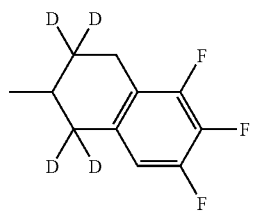
(I-73u)
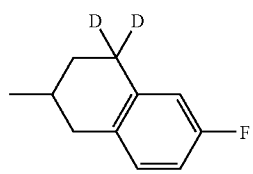
(I-73v)
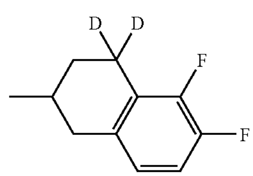
(I-73w)
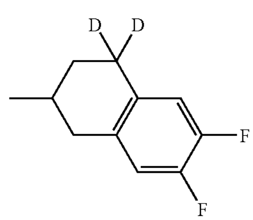
(I-73x)
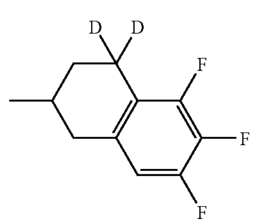

-continued
(I-73y)
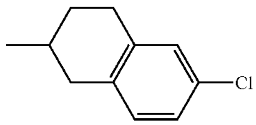
(I-73z)
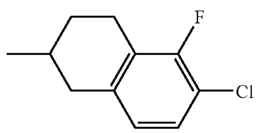
(I-73aa)
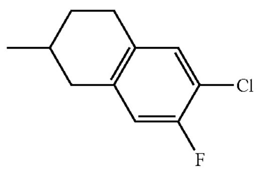
(I-73ab)
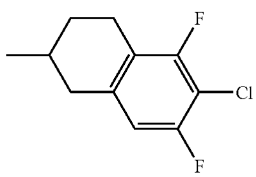
(I-73ac)
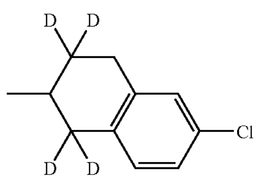
(I-73ad)
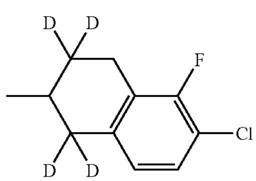
(I-73ae)
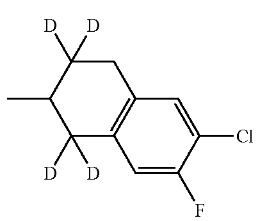
(I-73af)
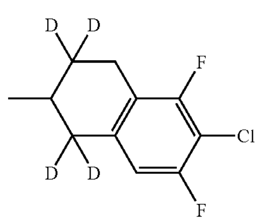
(I-73ag)
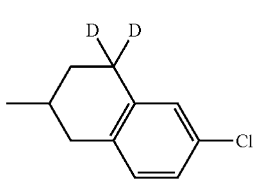
-continued
(I-73ah)
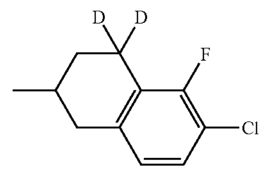
(I-73ai)
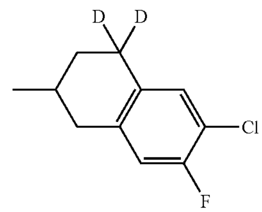
(I-73j)
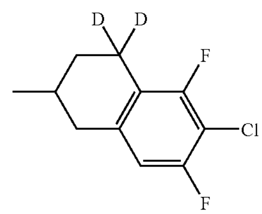
(I-73ak)
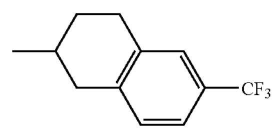
(I-73al)
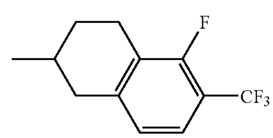
(I-73am)
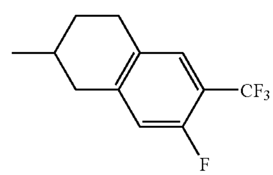
(I-73an)
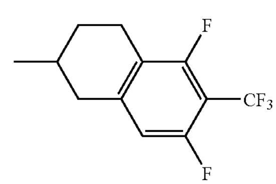
(I-73ao)
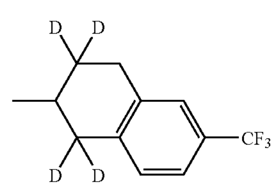
(I-73ap)
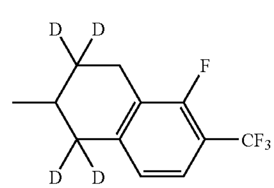

-continued
(I-73aq)
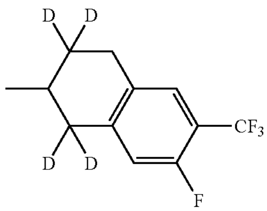
(I-73ar)
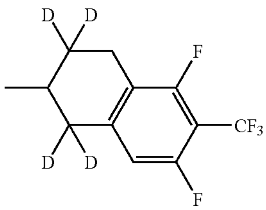
(I-73as)
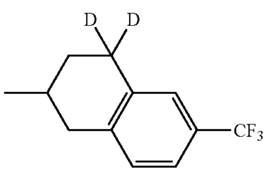
(I-73at)
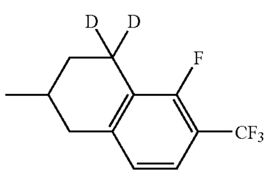
(I-73au)
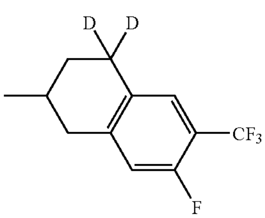
(I-73av)
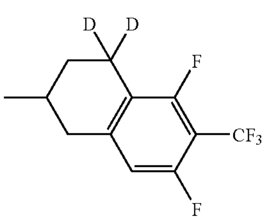
(I-73aw)
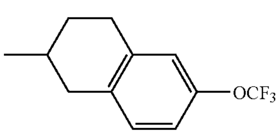
(I-73ax)
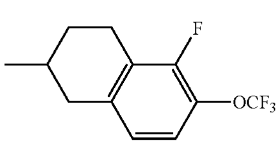
-continued
(I-73ay)
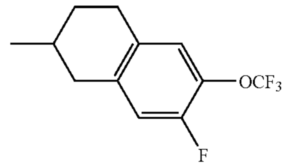
(I-73az)
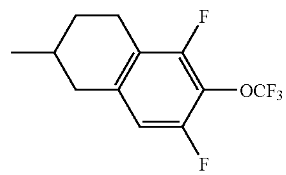
(I-73-ba)
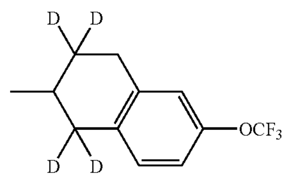
(I-73bb)
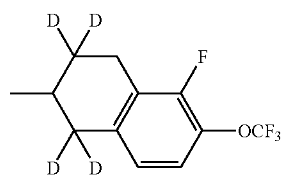
(I-73bc)
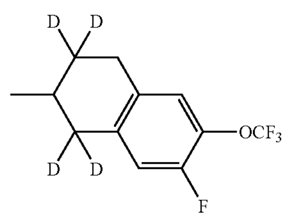
(I-73bd)
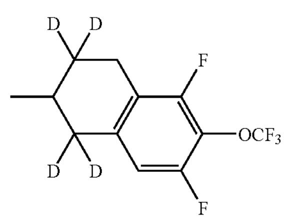
(I-73be)
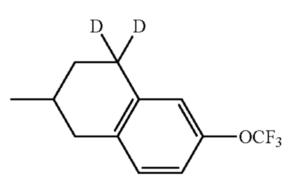
(I-73bf)
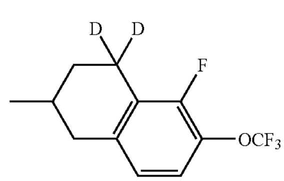

-continued
(I-73bg)
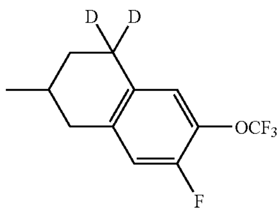
(I-73bh)
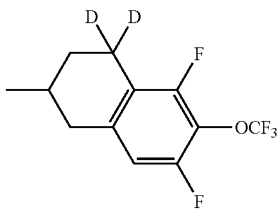
(I-73bi)
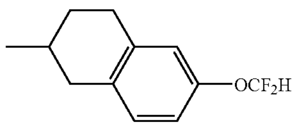
(I-73bj)
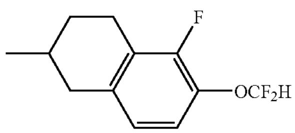
(I-73bk)
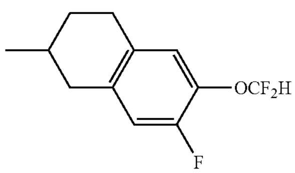
(I-73bl)
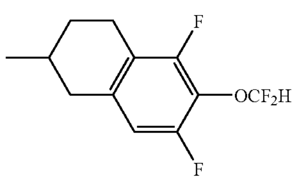
(I-73bm)
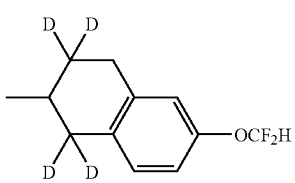
(I-73bn)
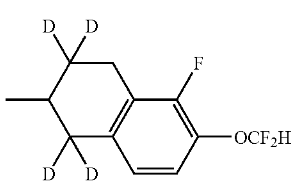
-continued
(I-73bo)
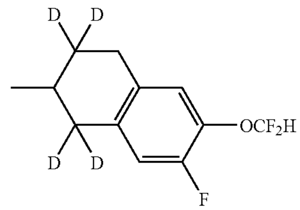
(I-73bp)
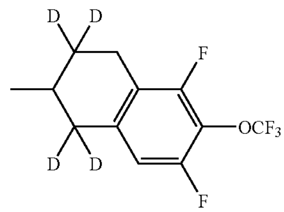
(I-73bq)
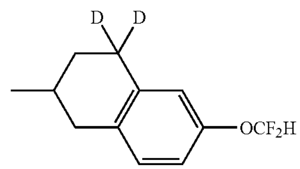
(I-73br)
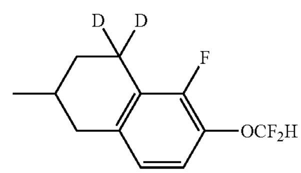
(I-73bs)
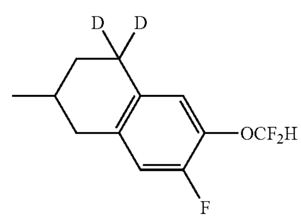
(I-73bt)
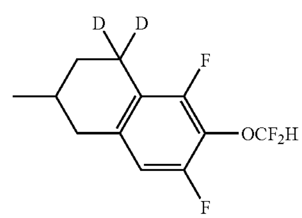
According to the present invention, more preferred embodiments of the non-substituted or substituted decahydronaphthalene-2,6-diyl ring are shown in the following general formulas (I-74a) to (I-74dm).
(I-74a)
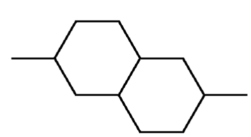

-continued
(I-74b)
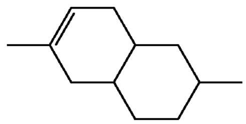
(I-74c)
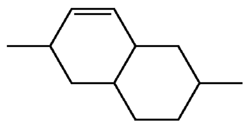
(I-74d)
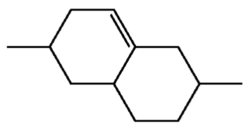
(I-74e)
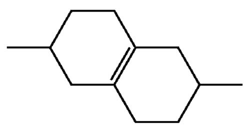
(I-74f)
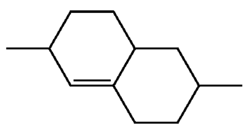
(I-74g)
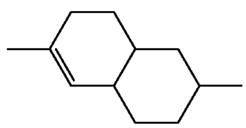
(I-74h)
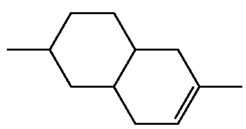
(I-74i)
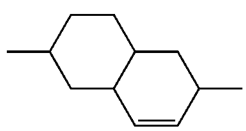
(I-74j)
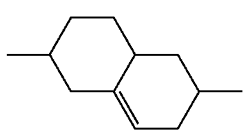
(I-74k)
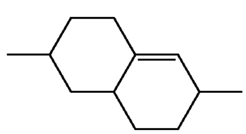
(I-74l)
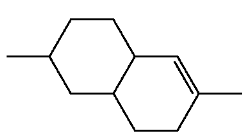
(I-74m)
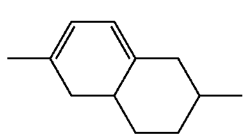
-continued
(I-74n)
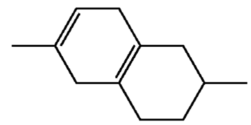
(I-74o)
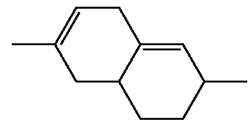
(I-74p)
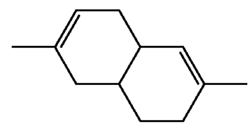
(I-74q)
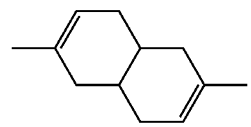
(I-74r)
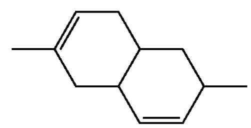
(I-74s)
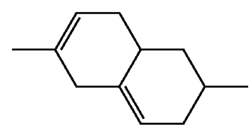
(I-74t)
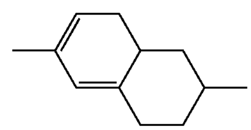
(I-74u)
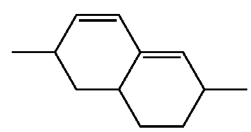
(I-74v)
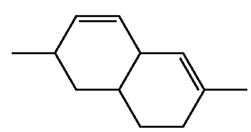
(I-74w)
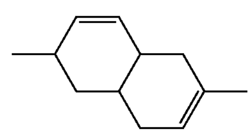
(I-74x)
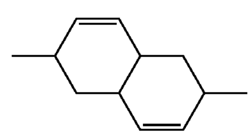
(I-74y)
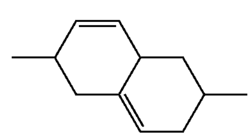

-continued
(I-74z)
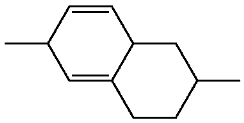
(I-74aa)
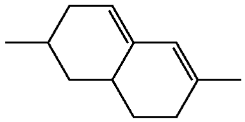
(I-74ab)
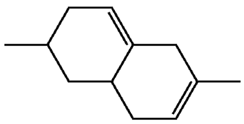
(I-74ac)
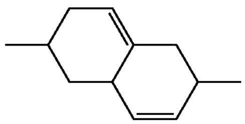
(I-74ad)
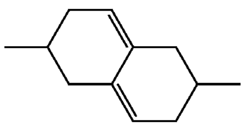
(I-74ae)
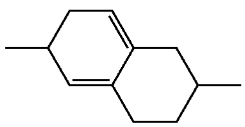
(I-74af)
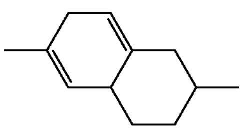
(I-74ag)
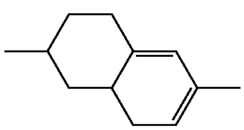
(I-74ah)
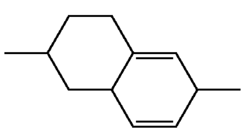
(I-74ai)
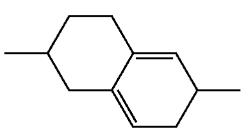
(I-74aj)
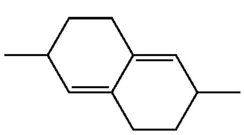
(I-74ak)
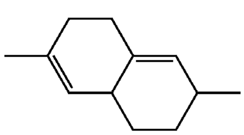
-continued
(I-74al)
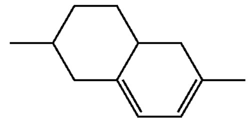
(I-74am)
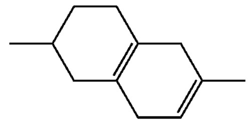
(I-74an)
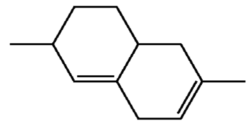
(I-74ao)
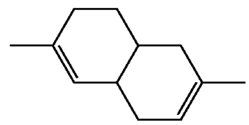
(I-74ap)
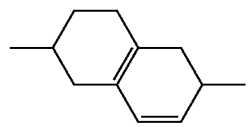
(I-74aq)
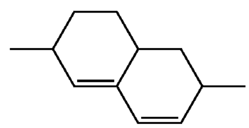
(I-74ar)
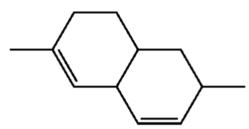
(I-74as)
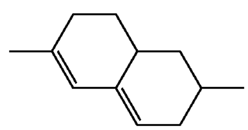
(I-74at)
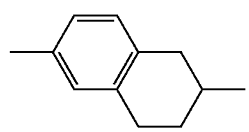
(I-74au)
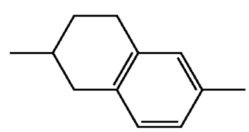
(I-74av)
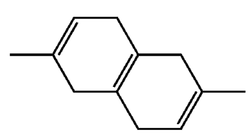
(I-74aw)
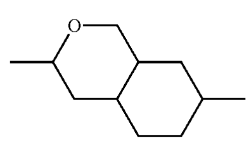

-continued
(I-74ax)
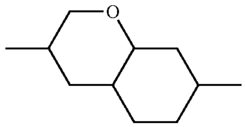
(I-74ay)
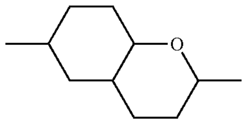
(I-74ax)
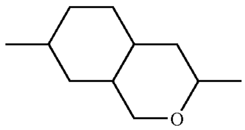
(I-74ba)
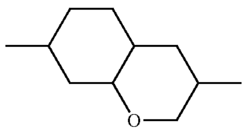
(I-74bb)
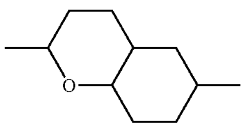
(I-74bc)
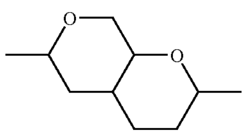
(I-74bd)
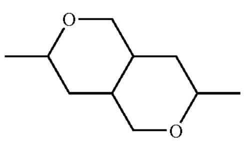
(I-74be)
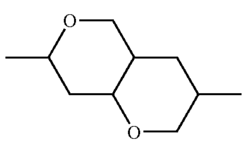
(I-74bf)
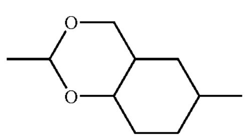
(I-74bg)
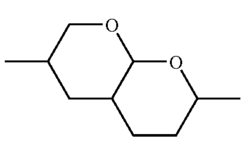
(I-74bh)
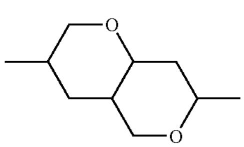
-continued
(I-74bi)
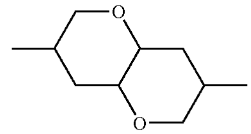
(I-74bj)
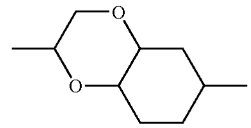
(I-74bk)
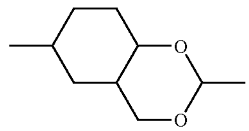
(I-74bl)
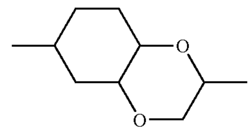
(I-74bm)
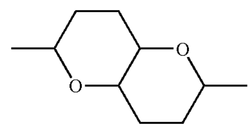
(I-74bn)
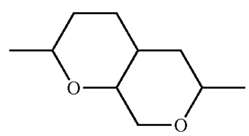
(I-74bo)
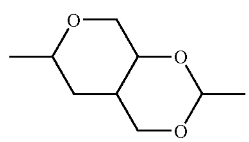
(I-74bp)
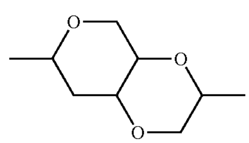
(I-74bq)
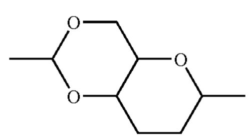
(I-74br)
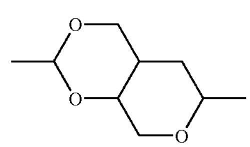
(I-74bs)
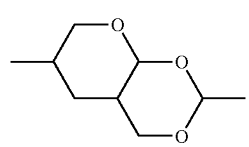

-continued
(I-74bt)
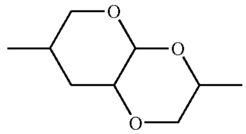
(I-74bu)
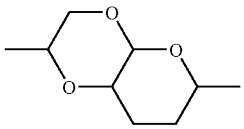
(I-74bv)
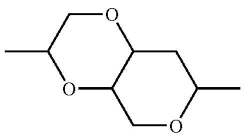
(I-74bw)
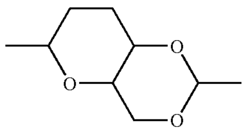
(I-74bx)
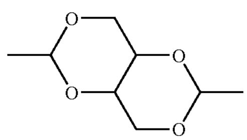
(I-74by)
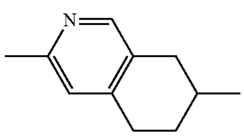
(I-74bz)
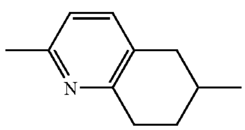
(I-74ca)
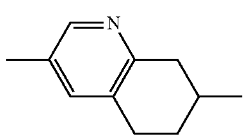
(I-74cb)
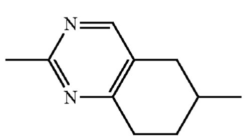
(I-74cc)
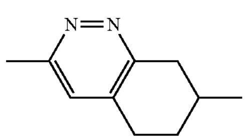
(I-74cd)
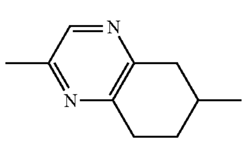
-continued
(I-74ce)
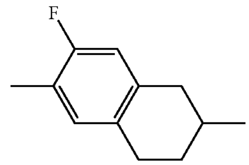
(I-74cf)
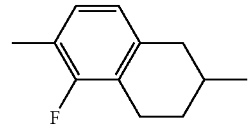
(I-74cg)
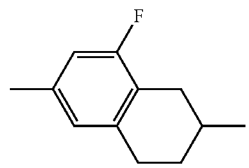
(I-74ch)
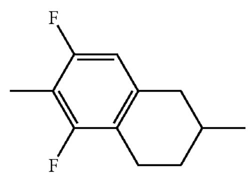
(I-74ci)
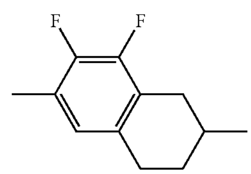
(I-74cj)
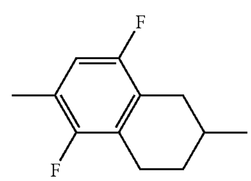
(I-74ck)
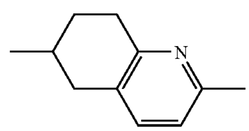
(I-74cl)
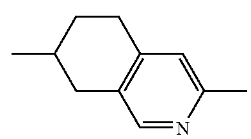
(I-74cm)
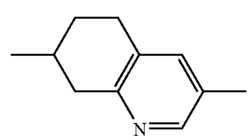
(I-74cn)
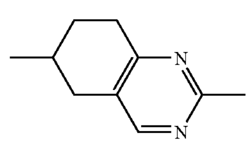

-continued
(I-74co)
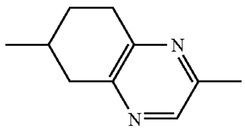
(I-74cp)
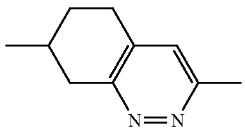
(I-74cq)
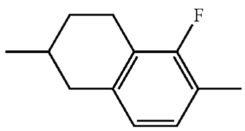
(I-74cr)
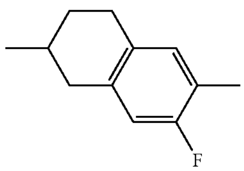
(I-74cs)
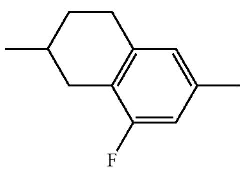
(I-74ct)
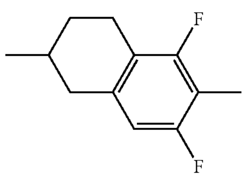
(I-74cu)
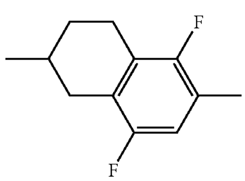
(I-74cv)
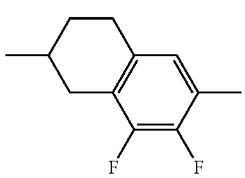
(I-74cw)
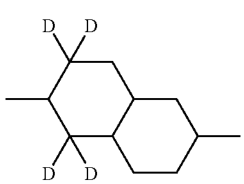
-continued
(I-74cx)
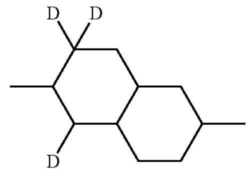
(I-74cy)
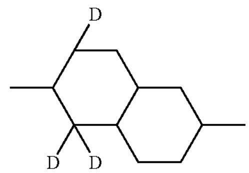
(I-74cz)
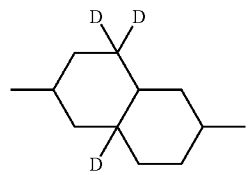
(I-74da)
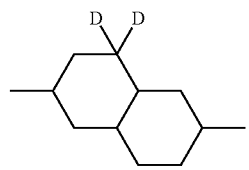
(I-74db)
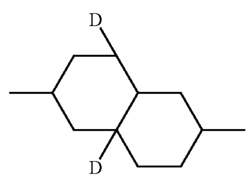
(I-74dc)
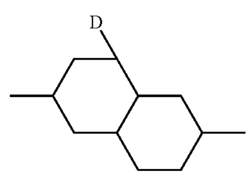
(I-74dd)
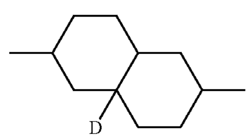
(I-74de)
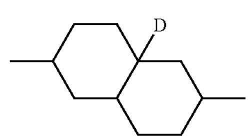
(I-74df)
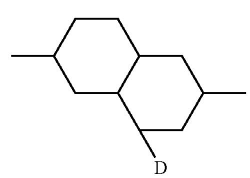

-continued

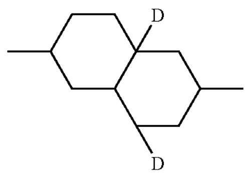

(I-74dg)

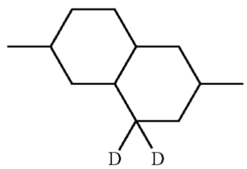

(I-74dh)

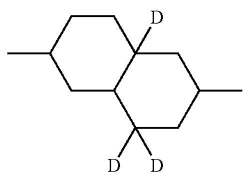

(I-74di)

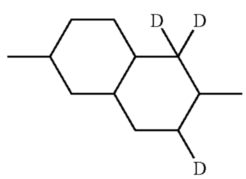

(I-74dj)

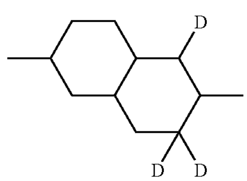

(I-74dk)

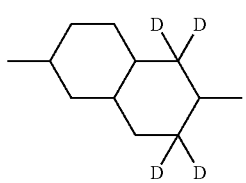

(I-74dl)

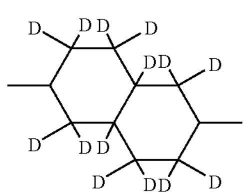

(I-74dm)

The respective compounds are used after sufficient purification by removing impurities using a method such as distillation, column purification, recrystallization or the like.

In more detail, if a general liquid crystal composition is prepared, the following compounds are preferably used as the liquid crystal component A, thereby making it possible to obtain the effects of the present invention.

(I-ai): Compounds in which $R^1$ is an alkyl or alkenyl group having 2 to 7 carbon atoms, in the general formulas (I-1) to (I-5).

(I-ai-1): Specific compounds of the general formula (I-1) are compounds having the basic structures of the general formulas (I-11a) to (I-13ab) in which the side chain groups are (I-6a) to (I-6f), (I-6ah) to (I-6an) and (I-6av) to (I-6bc) and the partial structures of the polar group are represented by the general formulas (I-71a) to (I-71av), and preferably compounds having the basic structures of the general formulas (I-11a) to (I-12c), (I-12g) to (I-12i), (I-12m) to (I-12o), (I-12s) to (I-12u), (I-12y) to (I-12ax), (I-13h) and (I-13o) to (I-13aa). (I-ai-2): Specific compounds of the general formula (I-2) are compounds having the basic structures of the general formulas (I-21a) to (I-23jp) in which the side chain groups are (I-6a) to (I-6f), (I-6ah) to (I-6an) and (I-6av) to (I-6bc) and the partial structures of the polar group are represented by the general formulas (I-72a) to (I-72r), and preferably compounds having the basic structures of the general formulas (I-21a) to (I-21fx), (I-21gk) to (I-21gv), (I-22bi) to (I-22gv), (I-22hu), (I-22hv), (I-22hx), (I-22ia), (I-22ib), (I-22id), (I-22ih), (I-22ii), (I-22ik), (I-22 in), (I-22io), (I-22iq), (I-22 is), (I-22iu), (I-23ak) to (I-23fx), (I-23hi) to (I-23iv) and (I-23je) to (I-23jp).

(I-ai-3): Specific compounds of the general formula (I-3) are compounds having the basic structures of the general formulas (I-31a) to (I-33dz) in which the side chain groups are (I-6a) to (I-6f), (I-6ah) to (I-6an) and (I-6av) to (I-6bc) and basic structure of the polar group are represented by the general formulas (I-72a) to (I-72r), and preferably compounds having the basic structures of the general formulas (I-31a) to (I-31ag), (I-32a) to (I-32ae), (I-32ai) to (I-32be), (I-32bg) to (I-32cb), (I-32cd) to (I-32cy), (I-32da) to (I-32eh), (I-33bn) to (I-33cg) and (I-33cl) to (I-33dz).

(I-ai-4): Specific compounds of the general formula (I-4) are compounds having the basic structures of the general formulas (I-41a) to (I-46g) in which the side chain groups are (I-6a) to (I-6f), (I-6ah) to (I-6an) and (I-6av) to (I-6bc) and the partial structures of the polar group are represented by the general formulas (I-72a) to (I-72r), preferably compounds having the basic structures of the general formulas (I-41a) to (I-41aa), (I-41af) to (I-41ai), (I-42a) to (I-42ad), (I-42ah), (I-42ak) to (I-42bl), (I-42bn) to (I-42bt), (I-42ca), (I-42cg), (I-42cl), (I-42cr), (I-43a) to (I-43q), (I-43v), (I-43aa), (I-43af), (I-43ak), (I-43am), (I-43ap), (I-43ar), (I-43au), (I-43aw), (I-43az), (I-43bb), (I-43be) and (I-44a) to (I-46g), and more preferably compounds having the basic structures of the general formulas (I-41a) to (I-41k), (I-41x) to (I-41aa), (I-41af) to (I-41ai), (I-42a) to (I-42u), (I-42ah), (I-42ak) to (I-42am), (I-42ao) to (I-42ar), (I-42 at), (I-42az), (I-42be) to (I-42bg), (I-42bj) to (I-42bl), (I-42bo), (I-42bt), (I-42ca), (I-42cg), (I-42cl), (I-42cr), (I-43a) to (I-43g), (I-431), (I-43q), (I-43v), (I-43aa), (I-43af), (I-43ak), (I-43am), (I-43ap), (I-43ar), (I-43au), (I-43aw), (I-43az), (I-43bb), (I-43be) and (I-45a) to (I-46g).

(I-ai-5): Specific compounds of the general formula (I-2) are compounds having the basic structures of the general formulas (I-51a) to (I-53ab) in which the side chain groups are (I-6a) to (I-6f), (I-6ah) to (I-6an) and (I-6av) to (I-6bc) and the partial structure of the polar group are represented by the general formulas (I-73a) to (I-73bt), and preferably compounds having the basic structures of the general formulas (I-51a) to (I-51c), (I-51g) to (I-51n), (I-51p) to (I-51u), (I-51x), (I-51y), (I-52a) to (I-52f), (I-52s) to (I-52ag), (I-52an) to (I-52bd), (I-53a), (I-53d) to (I-53h), (I-53k) to (I-53o) and (I-53r) to (I-53ab).

Using the compounds of sub-groups (I-ai-1) to (I-ai-5), the operating temperature range can be broadened and the elastic constant and its ratio $K_{33}/K_{11}$ and $K_{33}/K_{22}$ can be adjusted by an improvement in co-solubility of the liquid crystal composition and an improvement in the holding ratio at low temperatures, thus obtaining more improved electro-optical characteristics of STN-LCDs, TFT-LCDs, PDLCs, PN-LCDs or the like.

(I-aii): Compounds in which $Q^1$ is F, Cl, $CF_3$, $OCF_3$, $OCF_2H$, or CN, in the general formulas (I-1) to (I-5).

(I-aii-1): Specific compounds of the general formula (I-1) are compounds having the basic structures of the general formulas (I-11a) to (I-13ab) in which the side chain groups are (I-6a) to (I-6bc) and the the partial structures of the polar group are represented by the general formulas (I-71a) to (I-71av), and preferably compounds having the basic structures of the general formulas (I-11a) to (I-12c), (I-12g) to (I-12i), (I-12m) to (I-12o), (I-12s) to (I-12u), (I-12y) to (I-12ax), (I-13h) and (I-13o) to (I-13aa).

(I-aii-2): Specific compounds of the general formula (I-2) are compounds having the basic structures of the general formulas (I-21a) to (I-23jp) in which the side chain groups are (I-6a) to (I-6bc) and the partial structures of the polar group are represented by the general formulas (I-72a) to (I-72r), and preferably compounds having the basic structures of the general formulas (I-21a) to (I-21fx), (I-21gk) to (I-21gv), (I-22bi) to (I-22gv), (I-22hu), (I-22hv), (I-22hx), (I-22ia), (I-22ib), (I-22id), (I-22ih), (I-22ii), (I-22ik), (I-22 in), (I-22io), (I-22iq), (I-22 is), (I-22iu), (I-23ak) to (I-23fx), (I-23hi) to (I-23iv) and (I-23je) to (I-23jp).

(I-aii-3): Specific compounds of the general formula (I-3) are compounds having the basic structures of the general formulas (I-31a) to (I-33dz) in which the side chain groups are (I-6a) to (I-6bc) and the partial structure of the polar group are represented by the general formulas (I-72a) to (I-72r), and preferably compounds having the basic structures of the general formulas (I-31a) to (I-31ag), (I-32a) to (I-32ae), (I-32ai) to (I-32be), (I-32bg) to (I-32cb), (I-32cd) to (I-32cy), (I-32da) to (I-32eh), (I-33bn) to (I-33cg) and (I-33cl) to (I-33dz).

(I-aii-4): Specific compounds of the general formula (I-4) are compounds having the basic structures of the general formulas (I-41a) to (I-46g) in which the side chain groups are (I-6a) to (I-6bc) and partial structures of the polar group are represented by the general formulas (I-72a) to (I-72r), and preferably compounds having the basic structures of the general formulas (I-41a) to (I-41aa), (I-41af) to (I-41ai), (I-42a) to (I-42ad), (I-42ah), (I-42ak) to (I-42bl), (I-42bn) to (I-42bt), (I-42ca), (I-42cg), (I-42cl), (I-42cr), (I-43a) to (I-43q), (I-43v), (I-43aa), (I-43af), (I-43ak), (I-43am), (I-43ap), (I-43ar), (I-43au), (I-43aw), (I-43az), (I-43bb), (I-43be) and (I-44a) to (I-46g), and more preferably compounds having the basic structures of the general formulas (I-41a) to (I-41k), (I-41x) to (I-41aa), (I-41af) to (I-41ai), (I-42a) to (I-42u), (I-42ah), (I-42ak) to (I-42am), (I-42ao) to (I-42ar), (I-42 at), (I-42az), (I-42be) to (I-42bg), (I-42bj) to (I-42bl), (I-42bo), (I-42bt), (I-42ca), (I-42cg), (I-42cl), (I-42cr), (I-43a) to (I-43g), (I-431), (I-43q), (I-43v), (I-43aa), (I-43af), (I-43ak), (I-43am), (I-43ap), (I-43ar), (I-43au), (I-43aw), (I-43az), (I-43bb), (I-43be) and (I-45a) to (I-46g).

(I-aii-5): Specific compounds of the general formula (I-5) are compounds having the basic structures of the general formulas (I-51a) to (I-53ab) in which the side chain groups are (I-6a) to (I-6bc) and the partial structures of the polar group are represented by the general formulas (I-73a) to (I-73bt), and preferably compounds having the basic structures of the general formulas (I-51a) to (I-51c), (I-51g) to (I-51n), (I-51p) to (I-51u), (I-51x), (I-51y), (I-52a) to (I-52f), (I-52s) to (I-52ag), (I-52an) to (I-52bd), (I-53a), (I-53d) to (I-53h), (I-53k) to (I-53o) and (I-53r) to (I-53ab).

The specific applications of compounds of sub-group (I-aii-1) to (I-aii-5) are as follows. If compounds having polar groups of (I-71i) to (I-71av), (I-72d) to (I-72r) and (I-73m) to (I-73bt) in which $Q^1$ is F, Cl, $CF_3$, $OCF_3$, or $OCF_2H$ are used practically as a principal component, the resulting liquid crystal is suited for use as a high-reliability STN-LCD as well as an active TFT-LCD, STN-LCD, PDLC and PN-LCD, and is superior in reduction in driving voltage and high voltage holding ratio. When compounds having a polar group in which $Q^1$ is F, Cl, or CN are used practically as a principal component, it becomes possible to obtain excellent electro-optical characteristics such as driving voltage, sharpness, response characteristics and temperature characteristics of TN-LCDs, STN-LCDs, PDLCs, PN-LCDs or the like.

(I-aiii): Compounds in which $K^1$ to $K^5$ represent a single bond, —$(CH_2)_2$—, —COO—, or —C≡C—, in the general formulas (I-1) to (I-5).

(I-aiii-1): Specific compounds of the general formula (I-1) are compounds having the basic structures of the general formulas (I-11a) to (I-13ab) in which the side chain groups are (I-6a) to (I-6bc) and the partial structures of the polar group are represented by the general formulas (I-71a) to (I-71av), and preferably compounds having the basic structures of the general formulas (I-11a) to (I-12c), (I-12g) to (I-12i), (I-12m) to (I-12o), (I-12s) to (I-12u), (I-12y) to (I-12ax), (I-13h) and (I-13o) to (I-13aa).

(I-aiii-2): Specific compounds of the general formula (I-2) are compounds having the structures of the general formulas (I-21a) to (I-23jp) in which the side chain groups are (I-6a) to (I-6bc) and the partial structures of the polar group are represented by the general formulas (I-72a) to (I-72r), and preferably compounds having the structures of the general formulas (I-21a) to (I-21fx), (I-21gk) to (I-21gv), (I-22bi) to (I-22gv), (I-22hu), (I-22hv), (I-22hx), (I-22ia), (I-22ib), (I-22id), (I-22ih), (I-22ii), (I-22ik), (I-22 in), (I-22io), (I-22iq), (I-22 is), (I-22iu), (I-23ak) to (I-23fx), (I-23hi) to (I-23iv) and (I-23je) to (I-23jp).

(I-aiii-3): Specific compounds of the general formula (I-3) are compounds having the structures of the general formulas (I-31a) to (I-33dz) in which the side chain groups are (I-6a) to (I-6bc) and the partial structures of the polar group are represented by the general formulas (I-72a) to (I-72r), and preferably compounds having the structures of the general formulas (I-31a) to (I-31ag), (I-32a) to (I-32ae), (I-32ai) to (I-32be), (I-32bg) to (I-32cb), (I-32cd) to (I-32cy), (I-32da) to (I-32eh), (I-33bn) to (I-33cg) and (I-33cl) to (I-33dz).

(I-aiii-4): Specific compounds of the general formula (I-4) are compounds having the structures of the general formulas (I-41a) to (I-41aa), (I-41ac), (I-41ad), (I-41af) to (I-46g) in which the side chain groups are (I-6a) to (I-6bc) and the partial structures of the polar group are represented by the general formulas (I-72a) to (I-72r), preferably compounds having the structure of the general formulas (I-41a) to (I-41aa), (I-41af) to (I-41ai), (I-42a) to (I-42ad), (I-42ah), (I-42ak) to (I-42bl), (I-42bn) to (I-42bt), (I-42ca), (I-42cg), (I-42cl), (I-42cr), (I-43a) to (I-43q), (I-43v), (I-43aa), (I-43af), (I-43ak), (I-43am), (I-43ap), (I-43ar), (I-43au), (I-43aw), (I-43az), (I-43bb), (I-43be) and (I-44a) to (I-46g), and more preferably compounds having the structures of the general formulas (I-41a) to (I-41k), (I-41x) to (I-41aa), (I-41af) to (I-41ai), (I-42a) to (I-42u), (I-42ah), (I-42ak) to (I-42am), (I-42ao) to (I-42ar), (I-42 at), (I-42az), (I-42be) to (I-42bg), (I-42bj) to (I-42bl), (I-42bo), (I-42bt), (I-42ca), (I-42cg), (I-42cl), (I-42cr), (I-43a) to (I-43g), (I-431), (I-43q), (I-43v), (I-43aa), (I-43af), (I-43ak), (I-43am), (I-43ap), (I-43ar), (I-43au), (I-43aw), (I-43az), (I-43bb), (I-43be) and (I-45a) to (I-46g).

(I-aiii-5): Specific compounds of the general formula (I-5) are compounds having the structures of the general formulas (I-51a) to (I-53ab) in which the side chain groups are (I-6a) to (I-6bc) and the partial structures of the polar group are represented by the general formulas (I-73a) to (I-73bt), and preferably compounds having the structures of the general formulas (I-51a) to (I-51c), (I-51g) to (I-51n), (I-51p) to (I-51u), (I-51x), (I-51y), (I-52a) to (I-52f), (I-52s) to (I-52ag), (I-52an) to (I-52bd), (I-53a), (I-53d) to (I-53h), (I-53k) to (I-53o) and (I-53r) to (I-53ab).

Compounds of sub-group of the general formulas (I-aiii-1) to (I-aiii-5) in which $K^1$ to $K^5$ represent a single bond broaden the operating temperature range by an improvement in co-solubility of the liquid crystal composition and an improvement in storage at low temperature, thereby attaining comparatively fast response characteristics for a predetermined driving voltage. Compounds in which $K^1$ to $K^5$ represent —$(CH_2)_2$— can broaden the operating temperature range by an improvement in co-solubility of the liquid crystal composition and an improvement in storage at low temperature, thereby attaining comparatively fast response characteristics for a predetermined driving voltage. Compounds in which $K^1$ to $K^5$ represent —COO— broaden the operating temperature range by an improvement in co-solubility of the liquid crystal composition and an improvement in storage at low temperature, thereby making it possible to reduce the driving voltage and to improve a change in temperature. Compound in which $K^1$ to $K^5$ represent —C≡C— adjust the birefringent index within a wide range, thereby making it possible to reduce the driving voltage and to improve a change in temperature. Thus, improved electro-optical characteristics of STN-LCDs, TFT-LCDs PDLCs, PN-LCDs or the like can be obtained.

(I-aiv): Compounds in which rings $A^1$ to $A^4$ represent trans-1,4-cyclohexylene, 1,4-phenylene, 3-fluoro-1,4-phenylene, or 3,5-difluoro-1,4-phenylene, in the general formulas (I-1) to (I-5).

(I-aiv-1): In the case of the general formula (I-1), the ring $A^1$ of the general formula (I-11), the ring $A^2$ of the general formula (I-12) and the ring $A^3$ of the general formula (I-13) are preferably trans-1,4-cyclohexylene, 1,4-phenylene, 3-fluoro-1,4-phenylene, or 3,5-difluoro-1,4-phenylene, and specific compounds are compounds having the structures of the general formulas (I-11a) to (I-11l), (I-12a) to (I-12ax) and (I-13a) to (I-13ab) in which the side chain groups are (I-6a) to (I-6bc) and the partial structures of the polar group are represented by the general formulas (I-71a) to (I-71av), and preferably compounds having the structures of the general formulas (I-11a) to (I-11l), (I-12a) to (I-12c), (I-12g) to (I-12i), (I-12m) to (I-12o), (I-12s) to (I-12u), (I-12y) to (I-12ax), (I-13h) and (I-13o) to (I-13aa), thus obtaining more improved electro-optical characteristics.

Particularly, compounds having both structural features of (I-aiii) and (I-aiv) exhibit further differentiated characteristics and therefore used in the liquid crystal composition more widely.

(I-aiv-1a): Compounds in which $K^1$ in the general formula (I-11), $K^2$ in the general formula (I-12) and $K^3$ in the general formula (I-13) represent a single bond, and the ring $A^1$ in the general formula (I-11), the ring $A^2$ in the general formula (I-12) and the ring $A^3$ in the general formula (I-13) represent 1,4-phenylene, 3-fluoro-1,4-phenylene, or 3,5-difluoro-1,4-phenylene have medium or high birefringent index and comparatively large dielectric constant anisotropy;

(I-aiv-1b): compounds in which $K^1$ in the general formula (I-11), $K^2$ in the general formula (I-12) and $K^3$ in the general formula (I-13) represent a single bond, and the ring $A^1$ in the general formula (I-11), the ring $A^2$ in the general formula (I-12) and the ring $A^3$ in the general formula (I-13) represent trans-1,4-cyclohexylene have comparatively fat response characteristics because of broadened nematic phase;

(I-aiv-1c): compounds in which $K^1$ in the general formula (I-11), K in the general formula (I-12) and $K^3$ in the general formula (I-13) represent —$(CH_2)_2$—, and the ring $A^1$ in the general formula (I-11), the ring $A^2$ in the general formula (I-112) and the ring $A^3$ in the general formula (I-13) represent trans-1,4-cyclohexylene have good co-solubility;

(I-aiv-1d): compounds in which $K^1$ in the general formula (I-11), $K^2$ in the general formula (I-12) and $K^3$ in the general formula (I-13) represent —COO—, and the ring $A^1$ in the general formula (I-11), the ring $A^2$ in the general formula (I-12) and the ring $A^3$ in the general formula (I-13) represent 1,4-phenylene, 3-fluoro-1,4-phenylene, or 3,5-difluoro-1,4-phenylene have reduced driving voltage because of broadened nematic phase; and (I-aiv-1e): compounds in which $K^1$ in the general formula (I-11), $K^2$ in the general formula (I-12) and $K^3$ in the general formula (I-13) represent —C≡C—, and the ring $A^1$ in the general formula (I-11), the ring $A^2$ in the general formula (I-12) and the ring $A^3$ in the general formula (I-13) represent 1,4-phenylene, 3-fluoro-1,4-phenylene, or 3,5-difluoro-1,4-phenylene have very high or comparatively high birefringent index.

(I-aiv-2): In the case of the general formula (I-2), rings $A^1$ to $A^3$ each preferably represents trans-1,4-cyclohexylene, 1,4-phenylene, 3-fluoro-1,4-phenylene, or 3,5-difluoro-1,4-phenylene, and specific compounds are compounds having the structures of the general formulas (I-21a) to (I-21ab), (I-21ak) to (I-22s), (I-22y) to (I-22 cc), (I-22cf) to (I-22da), (I-22dd) to (I-22dy), (I-22eb) to (I-22ew), (I-22ez) to (I-22fu), (I-22fx) to (I-22gs), (I-22gv) to (I-22hq) and (I-22ht) to (I-23jp) in which the side chain groups are (I-6a) to (I-6bc) and the partial structures of the polar group are represented by the general formulas (I-72a) to (I-72r), and preferably compounds having the structures of the general formulas (I-21a) to (I-21y), (I-21ak) to (I-22p), (I-22bi) to (I-22 cc), (I-22cf) to (I-22cy), (I-22dd) to (I-22dw), (I-22eb) to (I-22eu), (I-22ez) to (I-22fs), (I-22fx) to (I-22gq) and (I-23ak) to (I-23fx), (I-23hi) to (I-23jm), thus obtaining more improved electro-optical characteristics.

Particularly, compounds of the general formulas (I-21) to (I-23) having both structural features of (I-aiii) and (I-aiv) exhibit further differentiated characteristics and therefore used in the liquid crystal composition more widely.

(I-aiv-2a): Compounds in which any one of $K^1$ to $K^4$ is a single bond and any one of rings $A^1$ to $A^3$ is 1,4-phenylene, 3-fluoro-1,4-phenylene, or 3,5-difluoro-1,4-phenylene have medium or high birefringent index and comparatively large dielectric constant anisotropy;

(I-aiv-2b): compounds in which in which any one of $K^1$ to $K^4$ is a single bond and any one of rings $A^1$ to $A^3$ is trans-1,4-cyclohexylene have comparatively fast response characteristics because of broadened nematic phase;

(I-aiv-2c): compounds in which in which any one of $K^1$ to $K^4$ is —$(CH_2)_2$— and any one of rings $A^1$ to $A^3$ is trans-1,4-cyclohexylene have good co-solubility;

(I-aiv-2d): compounds in which any one of $K^1$ to $K^4$ is —COO— and any one of rings $A^1$ to $A^3$ is 1,4-phenylene, 3-fluoro-1,4-phenylene, or 3,5-difluoro-1,4-phenylene have reduced driving voltage because of broadened nematic phase; and (I-aiv-2e): compounds in which any one of $K^1$ to $K^4$ is —C≡C— and any one of rings $A^1$ to $A^3$ is 1,4-phenylene, 3-fluoro-1,4-phenylene, or 3,5-difluoro-1,4-phenylene have very high or comparatively high birefringent index.

(I-aiv-3): In the case of the general formula (I-3), rings $A^1$ and $A^2$ each preferably represents trans-1,4-cyclohexylene, 1,4-phenylene, 3-fluoro-1,4-phenylene, or 3,5-difluoro-1,4-phenylene, and specific compounds are compounds having the structures of the general formulas (I-32a) to (I-32aa), (I-32ai) to (I-33x) and (I-33ac) to (I-33dz) in which the side chain groups are (I-6a) to (I-6bc) and the partial structures of the polar group are represented by the general formulas (I-72a) to (I-72r), and preferably compounds having the structure of the general formulas (I-31a) to (I-31ag), (I-32a) to (I-32ae), (I-32ai) to (I-32be), (I-32bg) to (I-32cb), (I-32cd) to (I-32cy), (I-32da) to (I-32eh), (I-33bn) to (I-33cg) and (I-33cl) to (I-33dz), thus obtaining more improved electro-optical characteristics.

Particularly, compounds of the general formulas (I-31) to (I-33) having both structural features of (I-aiii) and (I-aiv) exhibit further differentiated characteristics and therefore used in the liquid crystal composition more widely.

(I-aiv-3a): Compounds in which any one of $K^1$ to $K^4$ is a single bond and any one of rings $A^1$ and $A^2$ is 1,4-phenylene, 3-fluoro-1,4-phenylene, or 3,5-difluoro-1,4-phenylene have medium or high birefringent index and comparatively large dielectric constant anisotropy;

(I-aiv-3b): compounds in which in which any one of $K^1$ to $K^3$ is a single bond and any one of rings $A^1$ and $A^2$ is trans-1,4-cyclohexylene have comparatively fast response characteristics because of broadened nematic phase;

(I-aiv-3c): compounds in which in which any one of $K^1$ to $K^3$ is —$(CH_2)_2$— and any one of rings $A^1$ and $A^2$ is trans-1,4-cyclohexylene have good co-solubility;

(I-aiv-3d): compounds in which in which any one of $K^1$ to $K^3$ is —COO— and any one of rings $A^1$ and $A^2$ is 1,4-phenylene, 3-fluoro-1,4-phenylene, or 3,5-difluoro-1,4-phenylene have reduced driving voltage because of broadened nematic phase; and (I-aiv-3e): compounds in which any one of $K^1$ to $K^3$ is —C≡C— and any one of rings $A^1$ and $A_2$ is 1,4-phenylene, 3-fluoro-1,4-phenylene, or 3,5-difluoro-1,4-phenylene have very high or comparatively high birefringent index.

(I-aiv-4): In the case of the general formula (I-4), rings $A^1$ to $A^4$ each preferably represents trans-1,4-cyclohexylene, 1,4-phenylene, 3-fluoro-1,4-phenylene, or 3,5-difluoro-1,4-phenylene, and specific compounds are compounds having the structures of the general formulas (I-42a) to (I-42ag), (I-42ak) to (I-42an), (I-42ap) to (I-42 as), (I-42au) to (I-42ax), (I-42az) to (I-42bc), (I-42be) to (I-42bh), (I-42bj) to (I-42bm) and (I-42bo) to (I-46g) in which the side chain groups are (I-6a) to (I-6bc) and partial structures of the polar group are represented by the general formulas (I-72a) to (I-72r), preferably compounds having the structures of the general formulas (I-42a) to (I-42ad), (I-42ak) to (I-42an), (I-42ap) to (I-42 as), (I-42au) to (I-42ax), (I-42az) to (I-42bc), (I-42be) to (I-42bh), (I-42bj) to (I-42bl), (I-42bo) to (I-42bt), (I-42ca), (I-42cg), (I-42cl), (I-42cr), (I-43a) to (I-43q), (I-43v), (I-43aa), (I-43af), (I-43ak), (I-43am), (I-43ap), (I-43ar), (I-43au), (I-43aw), (I-43az), (I-43bb), (I-43be) and (I-44a) to (I-46g), and more preferably compounds having the structures of the general formulas (I-42a) to (I-42u), (I-42ak) to (I-42am), (I-42ap) to (I-42ar), (I-42az), (I-42be) to (I-42bg), (I-42bj) to (I-42bl), (I-42bo), (I-42bt), (I-42ca), (I-42cg), (I-42cl), (I-42cr), (I-43a) to (I-43g), (I-43l), (I-43q), (I-43v), (I-43aa), (I-43af), (I-43ak), (I-43am), (I-43ap), (I-43ar), (I-43au), (I-43aw), (I-43az), (I-43bb), (I-43be) and (I-45a) to (I-46g), thus obtaining more improved electro-optical characteristics.

Particularly, compounds of the general formulas (I-42) to (I-46) having both structural features of (I-aiii) and (I-aiv) exhibit further differentiated characteristics and therefore used in the liquid crystal composition more widely.

(I-aiv-4a): Compounds in which any one of $K^1$ to $K^5$ is a single bond and any one of rings $A^1$ to $A^4$ is 1,4-phenylene, 3-fluoro-1,4-phenylene, or 3,5-difluoro-1,4-phenylene have medium or high birefringent index and comparatively large dielectric constant anisotropy;

(I-aiv-4b): compounds in which in which any one of $K^1$ to $K^5$ is a single bond and any one of rings $A^1$ to $A^4$ is trans-1,4-cyclohexylene have comparatively fast response characteristics because of broadened nematic phase;

(I-aiv-4c): compounds in which in which any one of $K^1$ to $K^5$ is —$(CH_2)_2$— and any one of rings $A^1$ to $A^4$ is trans-1,4-cyclohexylene have good co-solubility;

(I-aiv-4d): compounds in which any one of $K^1$ to $K^5$ is —COO— and any one of rings $A^1$ to $A^4$ is 1,4-phenylene, 3-fluoro-1,4-phenylene, or 3,5-difluoro-1,4-phenylene have reduced driving voltage because of broadened nematic phase; and (I-aiv-4e): compounds in which any one of $K^1$ to $K^5$ is —C≡C— and any one of rings $A^1$ to $A^4$ is 1,4-phenylene, 3-fluoro-1,4-phenylene, or 3,5-difluoro-1,4-phenylene have very high or comparatively high birefringent index.

(I-aiv-5): In the case of the general formula (I-5), rings $A^1$ to $A^3$ each preferably represents trans-1,4-cyclohexylene, 1,4-phenylene, 3-fluoro-1,4-phenylene, or 3,5-difluoro-1,4-phenylene, and specific compounds are compounds having the structures of the general formulas (I-51a) to (I-511), (I-52a) to (I-52ax) and (I-53a) to (I-53ab) in which the side chain groups are (I-6a) to (I-6bc) and partial structures of the polar group are represented by the general formulas (I-73a) to (I-73bt), and preferably compounds having the structures of the general formulas (I-51a) to (I-511), (I-52a) to (I-52f), (I-52s) to (I-52ag), (I-52ak), (I-52an) to (I-52ax), (I-53o) and (I-53r) to (I-53ab), thus obtaining more improved electro-optical characteristics.

Particularly, compounds of the general formulas (I-51) to (I-53) having both structural features of (I-aiii) and (I-aiv) exhibit further differentiated characteristics and therefore used in the liquid crystal composition more widely.

(I-aiv-5a): Compounds in which any one of $K^1$ to $K^3$ is a single bond and any one of rings $A^1$ to $A^3$ is 1,4-phenylene, 3-fluoro-1,4-phenylene, or 3,5-difluoro-1,4-phenylene have medium or high birefringent index and comparatively large dielectric constant anisotropy;

(I-aiv-5b): compounds in which in which any one of $K^1$ to $K^3$ is a single bond and any one of rings $A^1$ to $A^3$ is trans-1,4-cyclohexylene have comparatively fast response characteristics because of broadened nematic phase;

(I-aiv-5c): compounds in which in which any one of $K^1$ to $K^3$ is —$(CH_2)_2$— and any one of rings $A^1$ to $A^3$ is trans-1,4-cyclohexylene have good co-solubility;

(I-aiv-5d): compounds in which any one of $K^1$ to $K^3$ is —COO— and any one of rings $A^1$ to $A^3$ is 1,4-phenylene, 3-fluoro-1,4-phenylene, or 3,5-difluoro-1,4-phenylene have reduced driving voltage because of broadened nematic phase; and (I-aiv-5e): compounds in which $K^1$ is —C≡C— and rings $A^1$ and $A^2$ represent 1,4-phenylene, 3-fluoro-1,4-phenylene, or 3,5-difluoro-1,4-phenylene or compounds in which $K^2$ is —C≡C— and rings $A^2$ and $A^3$ represent 1,4-phenylene, 3-fluoro-1,4-phenylene, or 3,5-difluoro-1,4-phenylene have very high or comparatively high birefringent index.

(I-av): Compounds in which one, or two or more hydrogen atoms, which are present in the naphthalene-2,6-diyl ring, 1,2,3,4-tetrahydronaphthalene-2,6-diyl ring, decahydronaphthalene-2,6-diyl ring, side chain group $R^1$, polar group $Q^1$, linking groups $K^1$ to $K^5$ and rings $A^1$ to $A^4$, are substituted with a deuterium atom, in the general formulas (I-1) to (I-5). These compounds are useful to adjust the elastic constant of the liquid crystal composition and to adjust the pre-tilt angle corresponding to the alignment film and therefore contain preferably at least one compound substituted with a deuterium atom.

(I-avi): Compounds in which $W^1$ to $W^3$ represent H, F, Cl, $CF_3$, or $OCF_3$, in the general formulas (I-1) to (I-3) and (I-5).

(I-aiv-1): In the case of the general formula (I-1), specific compounds are compounds having the structures of the general formulas (I-11a) to (I-13ab) in which the side chain groups are (I-6a) to (I-6bc) and the partial structures of the polar group are represented by the general formulas (I-71a) to (I-71av), preferably compounds having the structures of the general formulas (I-71b) to (I-71h), (I-71j) to (I-71p), (I-71r) to (I-71x), (I-71z) to (I-71af), (I-71ah) to (I-71an) and (I-71ap) to (I-71av), and more preferably compounds in which at least one of $W^1$ and $W^3$ is substituted with a polar group, particularly with F. If compounds in which at least one of $W^1$ to $W^4$ is F or Cl and $Q^1$ is F, Cl, $CF_3$, $OCF_3$, or $OCF_2H$ are contained practically as a principal component, the resulting liquid crystal is superior in reduction in driving voltage and high voltage holding ratio of active TFT-LCDs, STN-LCDs, PDLCs and PN-LCDs. If compounds in which $Q^1$ is F, Cl, or CN are used practically as a principal component, it becomes possible to obtain excellent electro-optical characteristics such as driving voltage, sharpness, response characteristics and temperature characteristics of TN-LCDs, STN-LCDs, PDLCs, PN-LCDs or the like.

(I-avi-2): In the case of the general formula (I-2), specific compounds are compounds in which the side chain groups are (I-6a) to (I-6bc) and basic structures of the polar group are represented by the general formulas (I-72a) to (I-72r), for example, compounds having the structures of the general formulas (I-21a) to (I-23jp), compounds having the structures of the general formulas (I-21b) to (I-21h), (I-21j) to (I-21p), (I-21r) to (I-21aa), (I-21ad) to (I-21aj), (I-21al) to (I-21ar), (I-21 at) to (I-21az), (I-21bb) to (I-21bh), (I-21bj) to (I-21 bp), (I-21br) to (I-21bx), (I-21bz) to (I-21cf), (I-21ch) to (I-21cn), (I-21 cp) to (I-21cv), (I-21cx) to (I-21dd), (I-21df) to (I-21dl), (I-21dn) to (I-21dt), (I-21dv) to (I-21eb), (I-21ed) to (I-21em), (I-21ep) to (I-21ey), (I-21fb) to (I-21fk), (I-21fn) to (I-21fw), (I-21fz) to (I-21gi), (I-21gl) to (I-21gu), (I-22b) to (I-22h), (I-22j), (I-221) to (I-22r), (I-22u), (I-22w), (I-22x), (I-22aa) to (I-22ac), (I-22ag) to (I-22ai), (I-22am) to (I-22ao), (I-22 as) to (I-22au), (I-22ay) to (I-22ba), (I-22be) to (I-22bg), (I-22bj) to (I-22 bp), (I-22br) to (I-22bx), (I-22bz) to (I-22 cc), (I-22ce), (I-22cf), (I-22ch) to (I-22cn), (I-22 cp) to (I-22cv), (I-22cx) to (I-22da), (I-22dc), (I-22dd), (I-22df) to (I-22dl), (I-22dn) to (I-22dt), (I-22dv) to (I-22dy), (I-22ea), (I-22eb), (I-22ed) to (I-22ej), (I-22el) to (I-22er), (I-22et) to (I-22ew), (I-22ey), (I-22ez), (I-22fb) to (I-22fh), (I-22fj) to (I-22fp), (I-22fr) to (I-22fu), (I-22fw), (I-22fx), (I-22fz) to (I-22gf), (I-22gh) to (I-22gn), (I-22gp) to (I-22gs), (I-22gu), (I-22gv), (I-22gx) to (I-22hd), (I-22hf) to (I-22hl), (I-22hn) to (I-22hq), (I-22hs), (I-22ht), (I-22ia) to (I-22 if), (I-22im) to (I-22ir), (I-22iu), (I-22iv), (I-23b), (I-23f), (I-23j), (I-23n), (I-23r), (I-23v), (I-23z), (I-23ac), (I-23al) to (I-23ar), (I-23 at) to (I-23az), (I-23bb) to (I-23bh), (I-23bj) to (I-23 bp), (I-23br) to (I-23bx), (I-23bz) to (I-23cf), (I-23ch) to (I-23cn), (I-23 cp) to (I-23cv), (I-23cx) to (I-23dd), (I-23df) to (I-23dl), (I-23dn) to (I-23dt), (I-23dv) to (I-23eb), (I-23ed) to (I-23ej), (I-23el) to (I-23er), (I-23et) to (I-23ez), (I-23fb) to (I-23fh), (I-23fj) to (I-23fp), (I-23fr) to (I-23fx), (I-23fz) to (I-23gf), (I-23gh) to (I-23gn), (I-23gp) to (I-23gv), (I-23hd) to (I-23hh), (I-23hj) to (I-23hp), (I-23 hr) to (I-23hx), (I-23 hz) to (I-23 if), (I-23ih) to (I-23 in), (I-23ip) to (I-23iv), (I-23ix) to (I-23jd) and (I-23jf) to (I-23jo), and more preferably compounds in which at least $W^1$ is substituted with a polar group, particularly with F.

(I-avi-3): In the case of the general formula (I-3), specific compounds are compounds in which the side chain groups are (I-6a) to (I-6bc) and the partial structures of the polar group are represented by the general formulas (I-72a) to (I-72r), for example, compounds having the structures of the general formulas (I-31a) to (I-33dz), preferably, compounds having the structures of the general formulas (I-31b) to (I-31k), (I-31m) to (I-31v), (I-31x) to (I-31ag), (I-32b) to (I-32g), (I-32i) to (I-32n), (I-32p) to (I-32z), (I-32ac) to (I-32ah), (I-32aj) to (I-32ao), (I-32aq) to (I-32av), (I-32ax) to (I-32be), (I-32bg) to (I-32bl), (I-32bn) to (I-32bs), (I-32bu) to (I-32cb), (I-32cd) to (I-32ci), (I-32ck) to (I-32 cp), (I-32cr) to (I-32cy), (I-32da) to (I-32df), (I-32dh) to (I-32dm), (I-32do) to (I-32dv), (I-32dx) to (I-32eh), (I-32ek), (I-32el), (I-32en), (I-32ep), (I-33b) to (I-33h), (I-33j) to (I-33p), (I-33r) to (I-33x), (I-33z), (I-33ab), (I-33ad), (I-33af) to (I-33ak), (I-33am) to (I-33ar), (I-33 at) to (I-33ay), (I-33ba), (I-33bc) to (I-33bg), (I-33bi), (I-33bk) to (I-33bm), (I-33bo) to (I-33bt), (I-33by) to (I-33ca), (I-33 cc), (I-33ce), (I-33cg), (I-33ci), (I-33ck), (I-33 cm) to (I-33cq), (I-33cs) to (I-33cy), (I-33da), (I-33dc), (I-33de), (I-33dg), (I-33di), (I-33dk) to (I-33dp), (I-33dr), (I-33dt), (I-33dv), (I-33dx) and (I-33dz), more preferably compounds in which at least $W^1$ is substituted with a polar group, particularly with F.

(I-avi-4): In the case of the general formula (I-5), specific compounds are compounds having the structures of the general formulas (I-51a) to (I-153ab) in which the side chain groups are (I-6a) to (I-6bc) and the partial structures of the polar group are represented by the general formulas (I-73a) to (I-73bi), preferably compounds in which the partial structures of the polar group are represented by the general formulas (I-73b) to (I-73l), (I-73n) to (I-73x), (I-73z) to (I-73aj), (I-73al) to (I-73av), (I-73ax) to (I-73bh) and (I-73bj) to (I-73bt), and more preferably compounds in which at least one of $W^1$ and $W^2$ is substituted with a polar group, particularly with F. If compounds in which at least one or both of $W^1$ and $W^2$ represent F or Cl and $Q^1$ is F, Cl, $CF_3$, $OCF_3$, or $OCF_2H$ are contained practically as a principal component, the resulting liquid crystal is superior in reduction in driving voltage and high voltage holding ratio of active TFT-LCD, STN-LCD, PDLC and PN-LCD. If compounds in which $Q^1$ is F, Cl, or CN are used practically as a principal component, it becomes possible to obtain excellent electro-optical characteristics such as driving voltage, sharpness, response characteristics and temperature characteristics of TN-LCDs, STN-LCDs, PDLCs, PN-LCDs or the like.

Compounds of sub-groups (I-avi-1) to (I-avi-4) broaden the operating temperature range by an improvement in co-solubility of the liquid crystal composition and an improvement in storage at low temperature, thereby to attain comparatively fast response characteristics for a predetermined driving voltage and to obtain more improved electro-optical characteristics of STN-LCDs, TFT-LCDs, PDLCs, PN-LCDs or the like.

(I-avii) Compounds in which $X^1$ and X2 represent H, F, Cl, $CF_3$, or $OCF_3$, in the general formulas (I-2) to (I-4).

(I-avii-1): In the case of the general formula (I-2), specific compounds are compounds having the structures of the general formulas (I-21a) to (I-23jp) in which the side chain groups are (I-6a) to (I-6bc) and the partial structures of the polar group (I-72a) to (I-72r), and preferably compounds having the structures (I-21a) to (I-21fx), (I-21gk) to (I-21gv), (I-22bi) to (I-22gv), (I-22hu), (I-22hv), (I-22hx), (I-22ia), (I-22ib), (I-22id), (I-22ih), (I-22ii), (I-22ik), (I-22 in), (I-22io), (I-22iq), (I-22 is), (I-22iu), (I-23ak) to (I-23fx), (I-23hi) to (I-23iv) and (I-23je) to (I-23jp).

(I-avii-2): In the case the general formula (I-3), specific compounds are compounds having the structures of the general formulas (I-31a) to (I-33dz) in which the side chain groups are (I-6a) to (I-6bc) and the partial structures of the polar group are represented by the general formulas (I-72a) to (I-72r), and preferably compounds having the structures of the general formulas (I-31a) to (I-31ag), (I-32a) to (I-32ae), (I-32ai) to (I-32be), (I-32bg) to (I-32cb), (I-32cd) to (I-32cy), (I-32da) to (I-32eh), (I-33bn) to (I-33cg) and (I-33cl) to (I-33dz).

(I-avii-3): In the case of the general formula (I-4), specific compounds are compounds having the structures of the general formulas (I-41a) to (I-46g) in which the side chain groups are (I-6a) to (I-6bc) and the partial structures of the polar group are represented by the general formulas (I-72a) to (I-72r), preferably compounds having the structures of the general formulas (I-41a) to (I-41aa), (I-41af) to (I-41ai), (I-42a) to (I-42ad), (I-42ah), (I-42ak) to (I-42bl), (I-42bn) to (I-42bt), (I-42ca), (I-42cg), (I-42cl), (I-42cr), (I-43a) to (I-43q), (I-43v), (I-43aa), (I-43af), (I-43ak), (I-43am), (I-43ap), (I-43ar), (I-43au), (I-43aw), (I-43az), (I-43bb), (I-43be) and (I-44a) to (I-46g), and more preferably compounds having the structures of the general formulas (I-41a) to (I-41k), (I-41x) to (I-41aa), (I-41af) to (I-41ai), (I-42a) to (I-42u), (I-42ah), (I-42ak) to (I-42am), (I-42ao) to (I-42ar), (I-42 at), (I-42az), (I-42be) to (I-42bg), (I-42bj) to (I-42bl), (I-42bo), (I-42bt), (I-42ca), (I-42cg), (I-42cl), (I-42cr), (I-43a) to (I-43g), (I-431), (I-43q), (I-43v), (I-43aa), (I-43af), (I-43ak), (I-43am), (I-43ap), (I-43ar), (I-43au), (I-43aw), (I-43az), (I-43bb), (I-43be) and (I-45a) to (I-46g).

In compound of sub-groups (I-avii-1) to (I-avii-3), more preferred compounds of the general formulas (I-2) to (I-4) are as follows. If compounds (I-72e), (I-72f), (I-72h), (I-72i), (I-72k), (I-721), (I-72n), (I-72o), (I-72q) and (I-72r) in which at least one or both of $X^1$ and $X^2$ represent F or Cl and $Q^1$ is F, Cl, $CF_3$, $OCF_3$, or $OCF_2H$ are contained practically as a principal component, the resulting liquid crystal is superior in reduction in driving voltage and high voltage holding ratio of active TFT-LCD, STN-LCD, PDLC and PN-LCD. If compounds (I-72b), (I-72c), (I-72e), (I-72f), (I-72h) and (I-72i) in which $Q^1$ is F, Cl, or CN are used practically as a principal component, it becomes possible to obtain excellent electro-optical characteristics such as driving voltage, sharpness, response characteristics and temperature characteristics of TN-LCDs, STN-LCDs, PDLCs, PN-LCDs or the like.

(I-aviii): $X^3$ in compounds of the general formulas (I-2) to (I-4) can be a $CH_3$ group. These compounds are inferior in response characteristics but are superior in co-solubility, and therefore used to obtain various characteristics other than the response characteristics. In this case, the compounds are used in the amount of 15% or less based on the total amount of the liquid crystal composition of the present invention.

Although the liquid crystal component A of the present invention can contain one, or two or more kinds of compounds selected from one, two, or three or more compounds among the sub-groups (I-ai) to (I-aviii), the effects can be obtained even when composed of only one compound from one sub-group. Compounds having two or more structural features of the compounds shown in the sub-groups (I-ai) to (I-aviii) are more preferred. The liquid crystal component A can be composed of the compounds shown in the sub-groups (I-ai) to (I-aviii) according to the desired purposes. The liquid crystal composition containing such a liquid crystal composition of the present invention broadens the operating temperature range of liquid crystal display characteristics due to an improvement in co-solubility and storage at low temperature, thereby making it possible to improve a reduction in driving voltage and a change in temperature and to attain comparatively fast response characteristics for a predetermined driving voltage, thus obtaining more improved electro-optical characteristics of TN-LCDs, STN-LCDs, TFT-LCDs, PDLCs, PN-LCDs or the like using the liquid crystal composition as a constituent material.

For the purpose of obtaining a liquid crystal composition suited for use as TN-LCD, STN-LCD, PDLC, PN-LCD or the like, or for the purpose of obtaining a liquid crystal composition suited for use as STN-LCD to which high reliability is required, or active STN-LCD, TFT-LCD, PDLC, PN-LCD or the like, the liquid crystal composition can further contain 1 to 20 optimum compounds after selecting from compounds of the general formulas (I-1) to (I-5). From such a point of view, preferred is a liquid crystal component A containing one to twenty kinds of one, two, or three or more compounds among the sub-groups (I-bi) to (I-bxi), the content of the compounds being within a range from 5 to 100% by weight.

If $R^1$ is an alkyl or alkenyl group having 2 to 7 carbon atoms, $Q^1$ is F, Cl, $CF_3$, $OCF_3$, or CN, and $W^1$ to $W^3$ represent H, F, Cl, $CF_3$, or $OCF_3$, in the general formula (I-1), compounds of the following sub-groups (I-bi) and (I-bii) are more preferred.

(I-bi): Compounds in which $k^1$=$k^2$=0, the ring $A^1$ is trans-1,4-cyclohexylene, 1,4-phenylene, 3-fluoro-1,4-phenylene, 3,5-difluoro-1,4-phenylene, naphthalene-2,6-diyl, 1,2,3,4-tetrahydronaphthalene-2,6-diyl, or decahydronaphthalene-2,6-diyl, and $K^1$ is a single bond, —$(CH_2)_2$—, —COO—, or —C≡C—, specifically compounds of the general formula (I-11), and more preferably compounds having the structures of the general formulas (I-11a) to (I-111) and (I-11p) to (I-11y). If the ring $A^1$ is a decahydronaphthalene-2,6-diyl ring, specifically in the case of compounds of the general formulas (I-11x) and (I-11y), compounds substituted with (I-74b) to (I-74cv) are also preferred. As a matter of course, compounds in which at least one of hydrogen atom, which are present in these rings, is substituted with a deuterium atom are also included.

(I-bii): Compounds in which $k^1=k^2=0$, rings $A^1$ and $A^2$ represent trans-1,4-cyclohexylene, 1,4-phenylene, 3-fluoro-1,4-phenylene, 3,5-difluoro-1,4-phenylene, naphthalene-2,6-diyl, 1,2,3,4-tetrahydronaphthalene-2,6-diyl, or decahydronaphthalene-2,6-diyl, and $K^1$ and $K^2$ represent a single bond, —$(CH_2)_2$—, —COO—, or —C≡C—, specifically compounds of the general formula (I-12), and more preferably compounds having the structures of the general formulas (I-12a) to (I-12bd). If the ring $A^2$ is a decahydronaphthalene-2,6-diyl ring, specifically in the case of compounds of the general formulas (I-12bc) and (I-12bd), compounds substituted with (I-74b) to (I-74cv) are also preferred. As a matter of course, compounds in which at least one of hydrogen atom, which are present in these rings, is substituted with a deuterium atom are also included.

If $R^1$ is an alkyl or alkenyl group having 2 to 7 carbon atoms, $Q^1$ represents F, Cl, $CF_3$, $OCF_3$, or CN, $X^1$ and $X^2$ represent H, F, Cl, $CF_3$, or $OCF_3$, and $W^1$ to $W^3$ represent H, F, Cl, $CF_3$, or $OCF_3$, in the general formula (I-2), the following compounds are more preferred.

(I-biii): Compounds in which $k^3=k^4=0$, the ring $A^1$ is trans-1,4-cyclohexylene, 1,4-phenylene, 3-fluoro-1,4-phenylene, or 3,5-difluoro-1,4-phenylene, and $K^1$ and $K^4$ represent a single bond, —$(CH_2)_2$—, —COO—, or —C≡C—, specifically compounds of the general formula (I-21), and more preferably compounds having the structures of the general formulas (I-21a) to (I-21aa), (I-21ak) to (I-21em), (I-20eo) to (I-21ey), (I-21fa) to (I-21fk), (I-21fm) to (I-21fw) and (I-21fy) to (I-21gi).

If $R^1$ is an alkyl or alkenyl group having 2 to 7 carbon atoms, $Q^1$ represents F, Cl, $CF_3$, $OCF_3$, or CN, $X^1$ and $X^2$ represent H, F, Cl, $CF_3$, or $OCF_3$, and $W^1$ to $W^3$ represent H, F, Cl, $CF_3$, or $OCF_3$, in the general formula (I-3), compounds of the following sub-groups (I-biv) and (I-bv) are more preferred.

(I-biv): Compounds in which $k^1=k^2=0$ and $K^3$ is a single bond, —$(CH_2)_2$—, —COO—, or —C≡C—, specifically compounds of the general formula (I-31), and more preferably compounds having the structures of the general formulas (I-31a) to (I-31ag).

(I-bv): Compounds in which $k^1=0$, $k^2=0$, the ring $A^1$ is 1,4-phenylene, 3-fluoro-1,4-phenylene, or 3,5-difluoro-1,4-phenylene, and $K^1$ and $K^3$ represent a single bond, —$(CH_2)_2$—, —COO—, or —C≡C—, specifically compounds of the general formula (I-32), and more preferably compounds having the structures of the general formulas (I-32a) to (I-32z) and (I-32ai) to (I-32dv).

If $R^1$ is an alkyl or alkenyl group having 2 to 7 carbon atoms, $Q^1$ represents F, Cl, $CF_3$, $OCF_3$, or CN, and $X^1$ and $X^2$ represent H, F, Cl, $CF_3$, or $OCF_3$, in the general formula (I-4), compounds of the following sub-groups (I-bvi) and (I-bix) are more preferred.

(I-bvi): Compounds in which $k^5=k^6=k^7=k^8=0$ and $K^5$ is a single bond, —$(CH_2)_2$—, —$(CH_2)_4$—, or —COO—, specifically compounds of the general formula (I-41), and more preferably compounds having the structures of the general formulas (I-41a) to (I-41ai).

(I-bvii): Compounds in which $k^5=1$, $k^6=k^7=k^8=0$, the ring $A^1$ is trans-1,4-cyclohexylene, 1,4-phenylene, 3-fluoro-1,4-phenylene, or 3,5-difluoro-1,4-phenylene, and $K^1$ and $K^3$ represent a single bond, —$(CH_2)_2$—, or —COO—, specifically compounds of the general formula (I-42), and more preferably compounds having the structures of the general formulas (I-42a) to (I-42ag), (I-42ak) to (I-42an), (I-42ap) to (I-42 as), (I-42au) to (I-42ax), (I-42az) to (I-42bc), (I-42be) to (I-42bh), (I-42be) to (I-42bh), (I-42bj) to (I-42bm) and (I-42bo) to (I-42dp).

(I-bviii): Compounds in which $k^7=1$, $k^5=k^6=k^8=0$, the ring $A^3$ is trans-1,4-cyclohexylene, 1,4-phenylene, 3-fluoro-1,4-phenylene, or 3,5-difluoro-1,4-phenylene, and $K^3$ and $K^5$ represent a single bond, —$(CH_2)_2$—, or —COO—, specifically compounds of the general formula (I-43), and more preferably compounds having the structures of the general formulas (I-43a) to (I-43bs) and (I-42bo) to (I-42dp).

(I-bix): Compounds in which the decahydronaphthalene-2,6-diyl ring has at least substituent among substituents of —$CF_2$—, —$CH_2$—O—, —CH═CH—, —CH═CF—, —CF═CF—, —CH═N—, —CF═N—, >CH—O—, >C═CH—, >C═CF—, >C═N—, >N—$CH_2$—, >CH—CF<, >CF—CF<, >C═C< and Si, and more preferably compounds having the structures of the general (I-41a), (I-41o), (I-41s), (I-41t), (I-41ab), (I-42a), (I-42d), (I-42g), (I-42j) to (I-42m), (I-42p), (I-42s), (I-42v), (I-42y), (I-42ab), (I-42ae) to (I-42aj), (I-42bo), (I-42br), (I-42bt), (I-42bx), (I-42ca), (I-42cd), (I-42ci) to (I-42ck), (I-42co) to (I-4cq), (I-43a) to (I-43c), (I-43g) to (I-43i), (I-431) to (I-43n), (I-43q) to (I-43s), (I-43v) to (I-43x), (I-43aa) to (I-43ac) and (I-44a) to (I-46g) in which the decahydronaphthalene-2,6-diyl ring is substituted with (I-74b) to (I-74cv). As a matter of course, compounds in which at least one of hydrogen atom, which are present in these rings, is substituted with a deuterium atom are also included.

If $R^1$ is an alkyl or alkenyl group having 2 to 7 carbon atoms, $Q^1$ is F, Cl, $CF_3$, $OCF_3$, or CN, and $W^1$ to $W^3$ represent H, F, Cl, $CF_3$, or $OCF_3$, in the general formula (I-5), compounds of the following sub-groups (I-bx) and (I-bxi) are more preferred.

(I-bx): Compounds in which $k^1=k^2=0$, the ring $A^1$ is trans-1,4-cyclohexylene, 1,4-phenylene, 3-fluoro-1,4-phenylene, 3,5-difluoro-1,4-phenylene, naphthalene-2,6-diyl, 1,2,3,4-tetrahydronaphthalene-2,6-diyl, or decahydronaphthalene-2,6-diyl, and $K^1$ is a single bond, —$(CH_2)_2$—, —$(CH_2)_4$—, or —COO—, specifically compounds of the general formula (I-51), and more preferably compounds having the structures of the general formulas I-51a) to (I-51l) and (I-51p) to (1-Sly). If the ring $A^1$ is a decahydronaphthalene-2,6-diyl ring, specifically in the case of compounds of the general formulas (I-51x) and (I-51y), compounds substituted with (I-74b) to (I-74cv) are also preferred. As a matter of course, compounds in which at least one of hydrogen atom, which are present in these rings, is substituted with a deuterium atom are also included.

(I-bxi): Compounds in which $k^1=0$, $k^2=0$, rings $A^1$ and $A_2$ represent trans-1,4-cyclohexylene, 1,4-phenylene, 3-fluoro-1,4-phenylene, 3,5-difluoro-1,4-phenylene, naphthalene-2,6-diyl, 1,2,3,4-tetrahydronaphthalene-2,6-diyl, or decahydronaphthalene-2,6-diyl, and $K^1$ and $K^2$ represent a single bond, —$(CH_2)_2$—, —$(CH_2)_4$—, or —COO—, specifically compounds of the general formula (I-52), and more preferably compounds having the structures of the general formulas (I-52a) to (I-52bd). If the ring $A^2$ is a decahydronaphthalene-2,6-diyl ring, specifically in the case of compounds of the general formulas (I-52bc) to (I-52bd), compounds substituted with (I-74b) to (I-74cv) are also preferred. As a matter of course, compounds in which at least one of hydrogen atom, which are present in these rings, is substituted with a deuterium atom are also included. (I-bxii): If the ring rings $A^1$ to $A^4$ represent a non-substituted or substituted decahydronaphthalene-2,6-diyl ring in the general formulas (I-1) to (I-5), compounds having partially structured selected from (I-74a) to (I-74dm) are preferred. More preferred are (I-74a) to (I-741), (I-74 at), (I-74au), (I-74bk) and (I-74by) to (I-74dm), and particularly preferred are (I-74a), (I-74e), (I-74au), (I-74bk), (I-74ck), (I-74cl), (I-74cn), (I-74cq), (I-74cr), (I-74ct) and (I-74cw) to (I-74dm). Particularly, compounds having (I-74cq) had excellent response characteristics and high nematic phase-isotropic liquid phase transition temperature compared to compounds having (I-74au), and also had noticeable properties which are not recognized in the prior art. As a matter of course, compounds in which at least one of hydrogen atom, which are present in the rings of (I-74a) to (I-74cv), is substituted with a deuterium atom are also included.

Although the liquid crystal component A of the present invention can contain one, or two or more kinds of compounds selected from one, two, or three or more compounds among the sub-groups (I-bi) to (I-bxii), the effects can be obtained even when composed of only one compound from one sub-group. Compounds having two or more structural features of the compounds shown in the sub-groups (I-bi) to (I-bxii) are more preferred. The liquid crystal component A can be composed of the compounds shown in the sub-groups (I-bi) to (I-bxii) according to the desired purposes. The liquid crystal composition containing such a liquid crystal composition of the present invention broadens the operating temperature range of liquid crystal display characteristics due to an improvement in co-solubility and storage at low temperature, thereby making it possible to improve a reduction in driving voltage and a change in temperature and to attain comparatively fast response characteristics for a predetermined driving voltage, thus obtaining more improved electro-optical characteristics of TN-LCDs, STN-LCDs, TFT-LCDs, PDLCs, PN-LCDs or the like using the liquid crystal composition as a constituent material.

The liquid crystal component A composed of compounds of the general formulas (I-1) to (I-5) related to the liquid crystal composition of the present invention, or the liquid crystal component A containing compounds of the above-described sub-groups (I-ai) to (I-bxii), or the liquid crystal component A containing compounds capable of having two or more structural features of the sub-groups (I-ai) to (I-bxii) is characterized by a molecular structure having, as a partial structure, non-substituted or substituted naphthalene-2,6-diyl, decahydronaphthalene-2,6-diyl and 1,2,3,4-tetrahydronaphthalene-2,6-diyl rings. This feature has a plate-like structure compared to conventional compounds. Furthermore, these rings can a lot of substituents such as F and Cl compared to 1,4-phenylene. Therefore, the resulting liquid crystal composition has excellent co-solubility, comparatively high phase transition temperature in spite of its molecular length, comparatively small birefringent index in spite of high phase transition temperature, and lower driving voltage in spite of large dielectric constant anisotropy, thereby exerting the effect of inhibiting the dependence of the frequency on the driving voltage at high frequency range and to reduce the dependence of the temperature on the driving voltage, and is also superior in adjustment of the size of $K_{11}$ and $K_{22}$. From such a point of view, the liquid crystal composition is also useful to improve the response characteristics, particularly response characteristics of IPS mode.

The liquid crystal composition of the present invention contains a liquid crystal component B, which contains one, or two or more kinds of compounds having a dielectric constant anisotropy of +2 or more, in addition to the liquid crystal component A. The liquid crystal compound having a dielectric constant anisotropy of +2 or more in the present invention is used in the following meaning.

The liquid crystal compound is a compound which has a bar-like chemical structure, the center portion having a core structure with one to four six-membered rings, the six-membered ring positioned at both terminals in the major axis direction of the center portion having a terminal group substituted at the position corresponding to the direction of the major axis of the liquid crystal, at least one of terminal groups, which are present at both terminals, being a polar group, for example, —F, —Cl, —$NO_2$, —$CF_3$, —$OCF_3$, —$OCHF_2$, —CN, —OCN, —NCS or the like. Consequently, it becomes possible to adjust the optical anisotropy of the liquid crystal layer to a predetermined value, thereby making it possible to electrically drive and widen the operating temperature range.

As the liquid crystal component B, one, or two or more kinds, preferably three to forty kinds, and more preferably three to fifteen kinds of compound having a dielectric constant anisotropy of +2 or more can be used. The liquid crystal composition preferably contains the compound after appropriately selecting from compound having a dielectric constant anisotropy within a range from +2 to +8, compound having a dielectric constant anisotropy within a range from +8 to +13, compound having a dielectric constant anisotropy within a range from +14 to +18 and compound having a dielectric constant anisotropy of +18 or more. In this case, thirty kinds or less, preferably fifteen kinds or less of compounds having a dielectric constant anisotropy within a range from +2 to +13 are mixed, twenty kinds or less, preferably eight kinds or less of compounds having a dielectric constant anisotropy within a range from +14 to +18 are mixed, and fifteen kinds or less, preferably ten kinds or less of compounds having a dielectric constant anisotropy of +18 or more are mixed. Use of the liquid crystal component in the above manner exerts more preferred effects due to temperature characteristics of display characteristics. More specifically, it improves the dependence of the temperature on the driving voltage, contrast related to sharpness, response characteristics or the like.

From such a point of view, more preferred mode of a basic structure in compounds represented by the general formulas (II-1) to (II-4) includes compounds represented by the general formulas (II-1a) to (II-4n).

(II-1a)

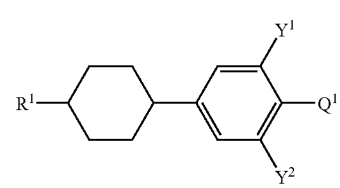

-continued
(II-1b)
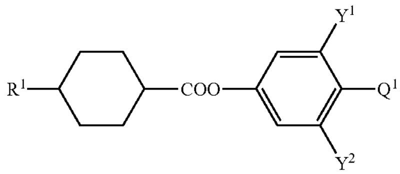
(II-1c)
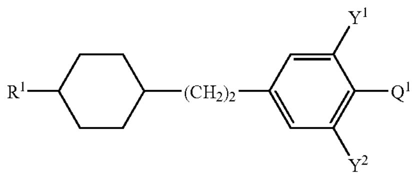
(II-1d)
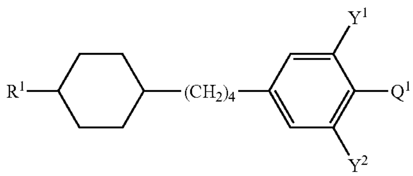
(II-1e)
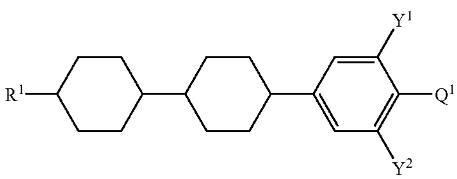
(II-1f)
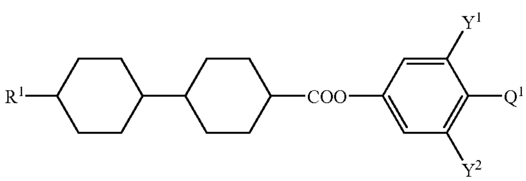
(II-1g)
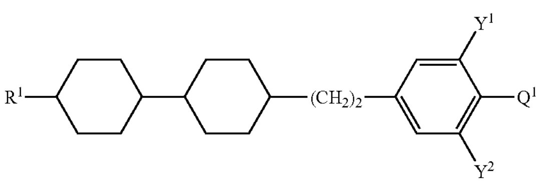
(II-1h)
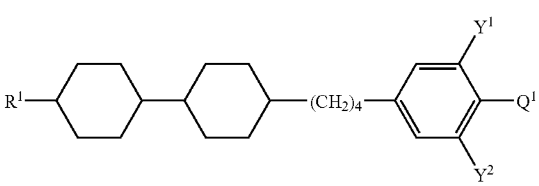
(II-1i)
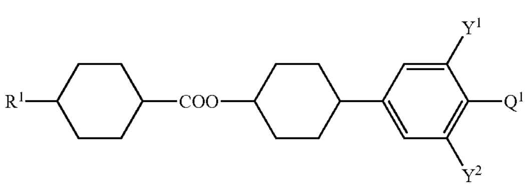
-continued
(II-1j)
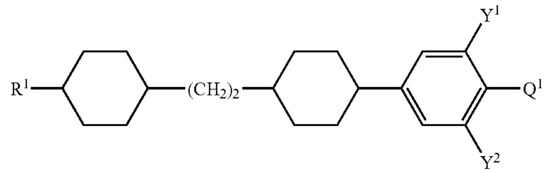
(II-1k)
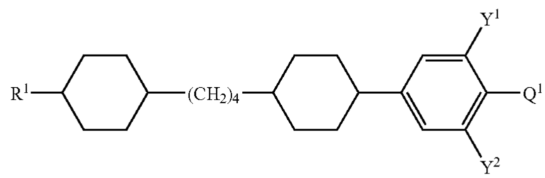
(II-1l)
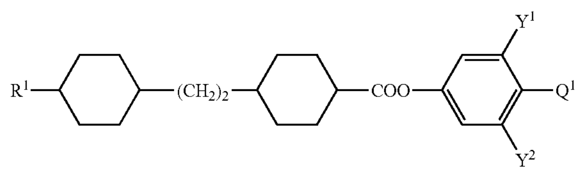
(II-2a)
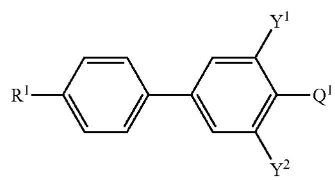
(II-2b)
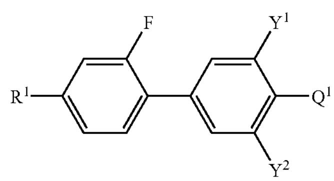
(II-2c)
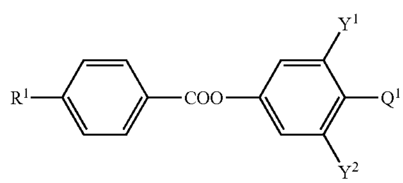
(II-2d)
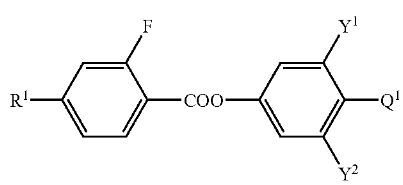
(II-2e)
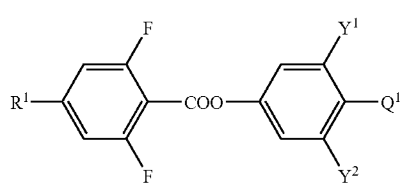

-continued
(II-2f)
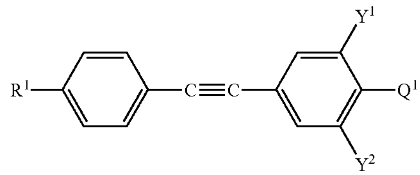
(II-2g)
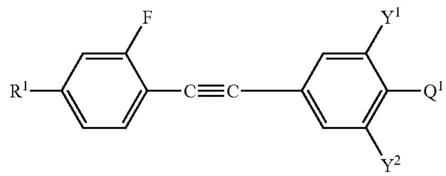
(II-2h)
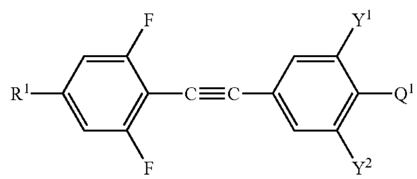
(II-2i)
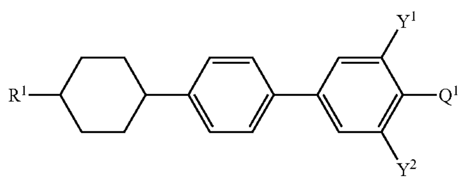
(II-2j)
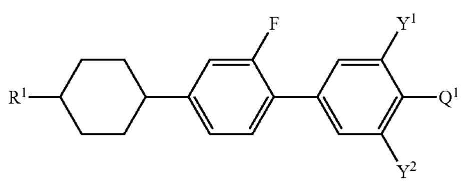
(II-2k)
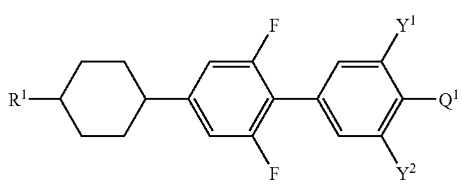
(II-2l)
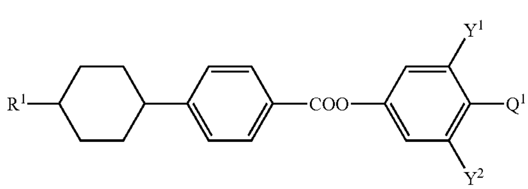
(II-2m)
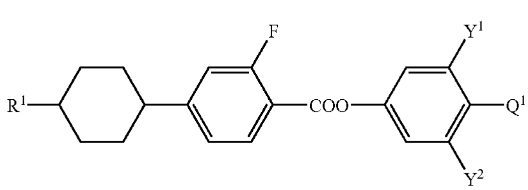
-continued
(II-2n)
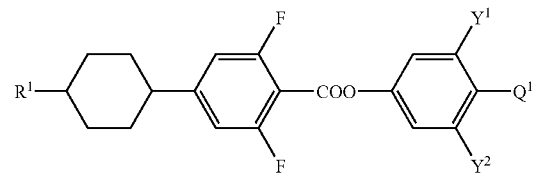
(II-2o)
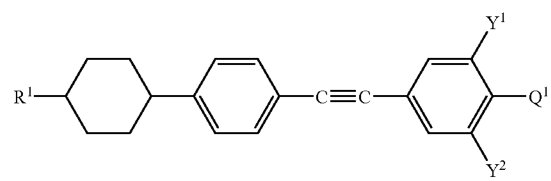
(II-2p)
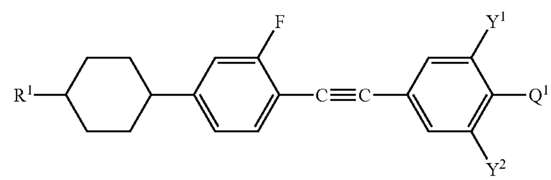
(II-2q)
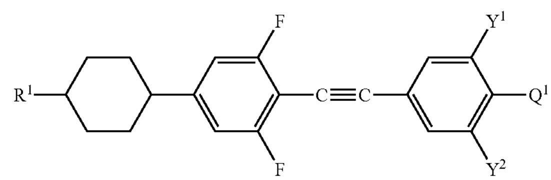
(II-2r)
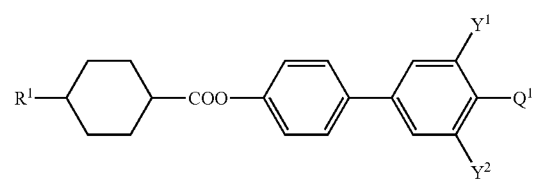
(II-2s)
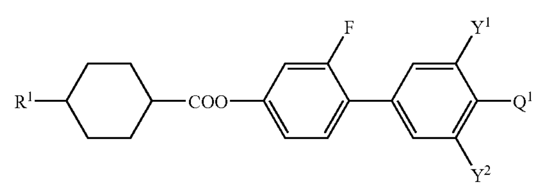
(II-2t)
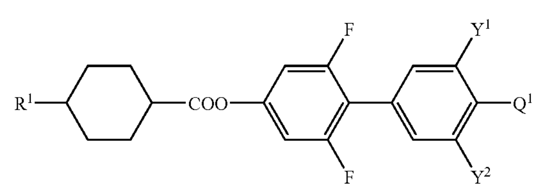
(II-2u)
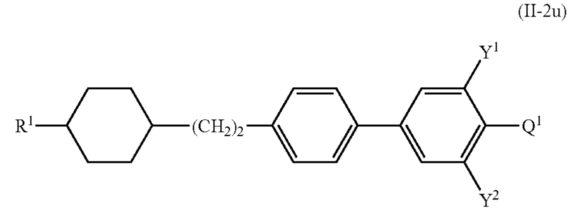

-continued
(II-2v)
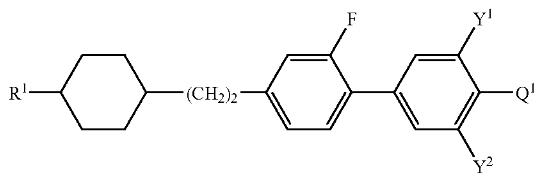
(II-2w)
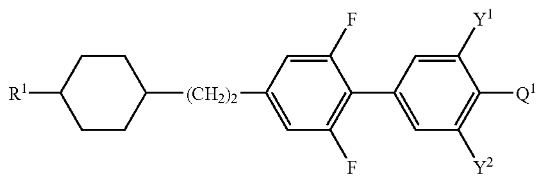
(II-2x)
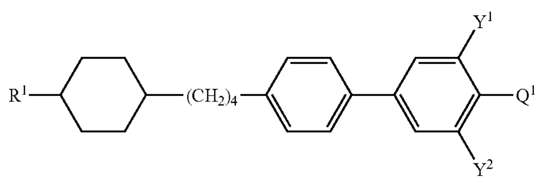
(II-2y)
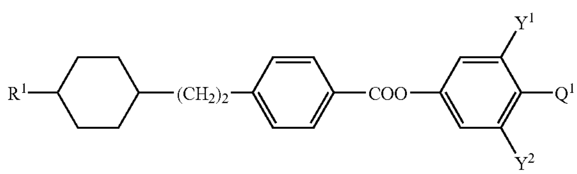
(II-2z)
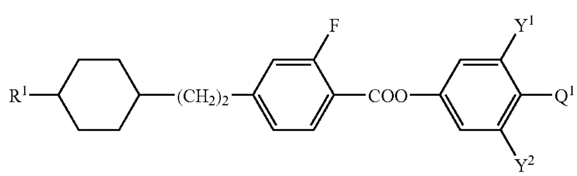
(II-2aa)
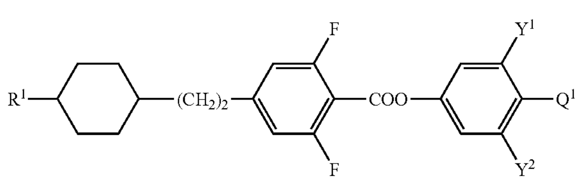
(II-2ab)
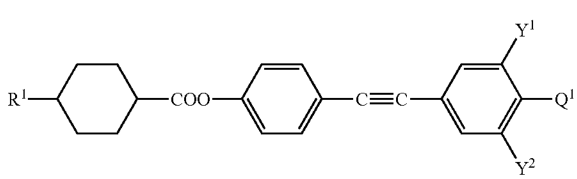
(II-2ac)
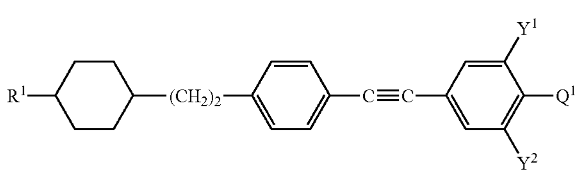
-continued
(II-2ad)
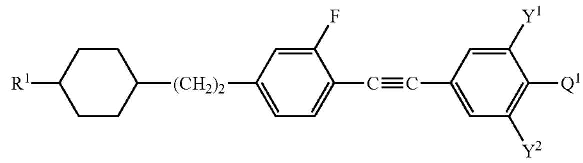
(II-2ae)
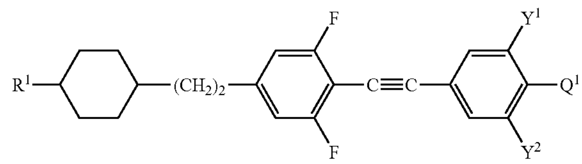
(II-3a)
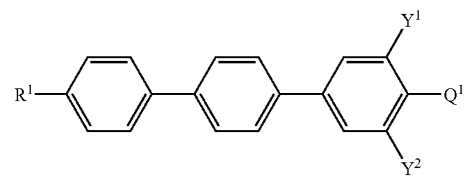
(II-3b)
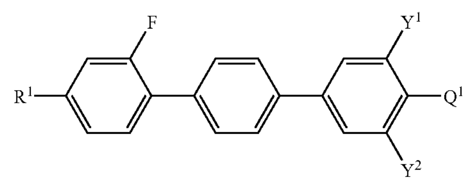
(II-3c)
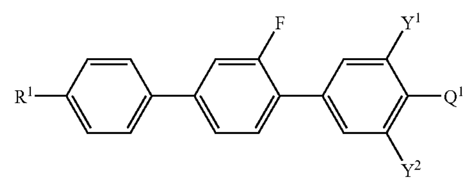
(II-3d)
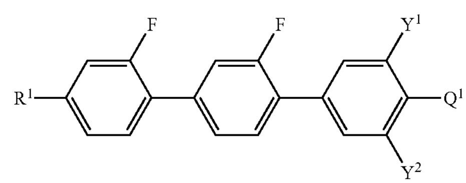
(II-3e)
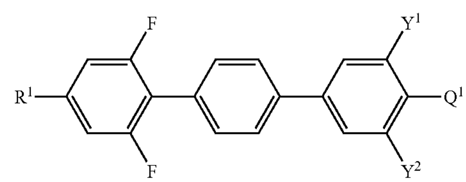
(II-3f)
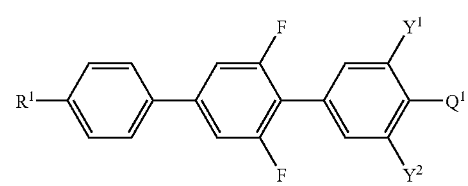

-continued
(II-3g)
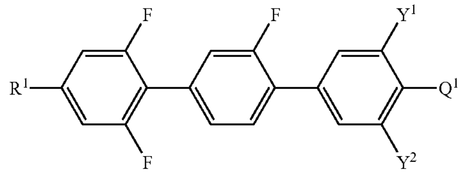
(II-3ih)
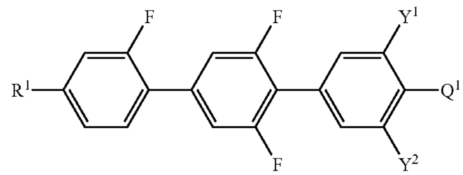
(II-3i)
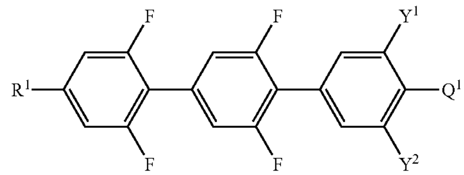
(II-3j)
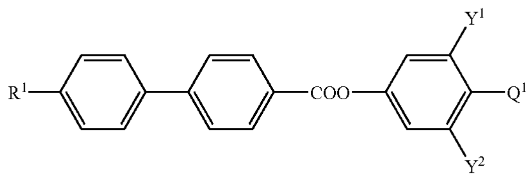
(II-3k)
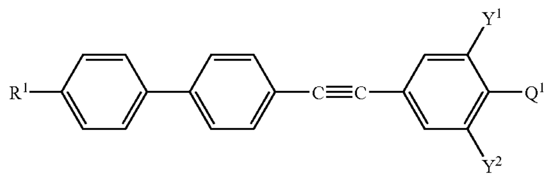
(II-3l)
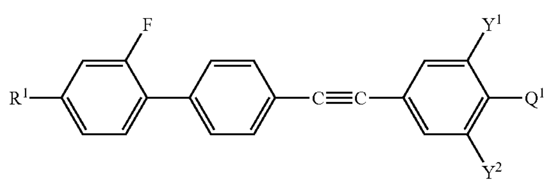
(II-3m)
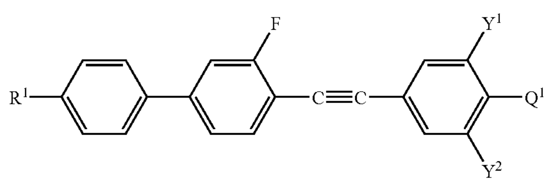
(II-3n)
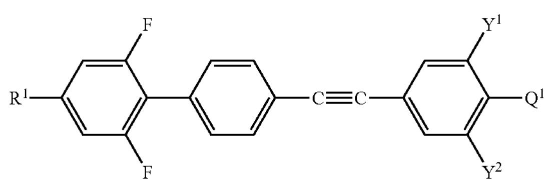
-continued
(II-3o)
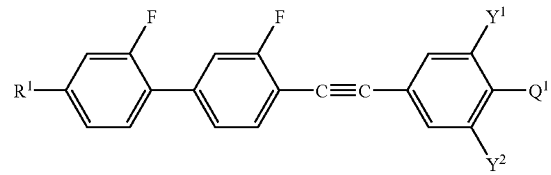
(II-3p)
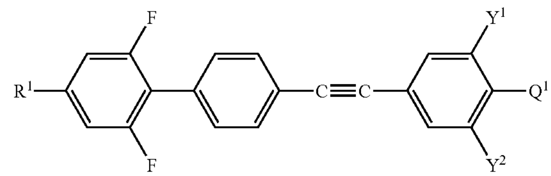
(II-3q)
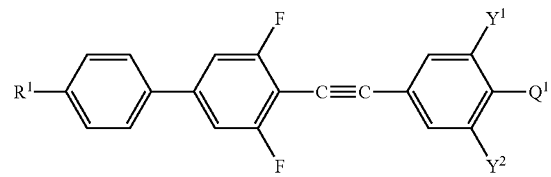
(II-3r)
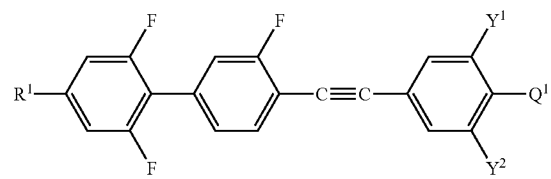
(II-3s)
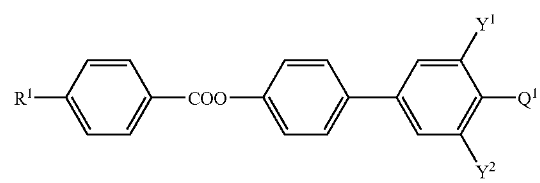
(II-3t)
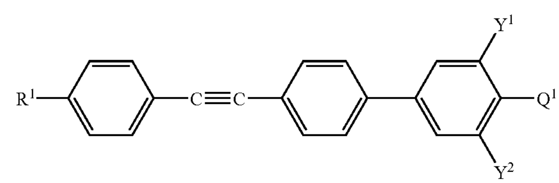
(II-3u)
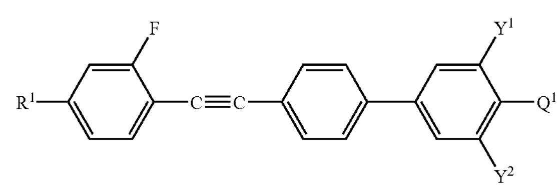
(II-3v)
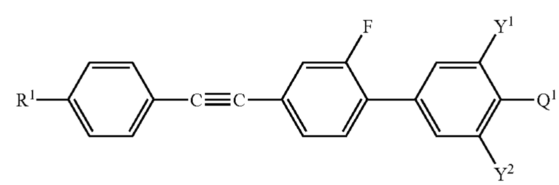

-continued
(II-3w)
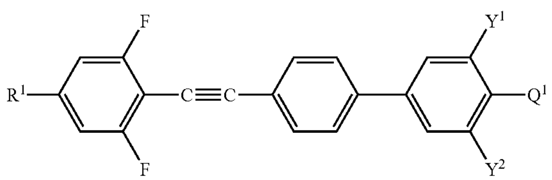
(II-3x)
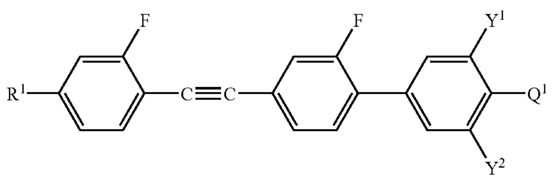
(II-3t)
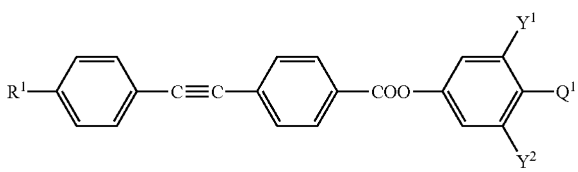
(II-4a)
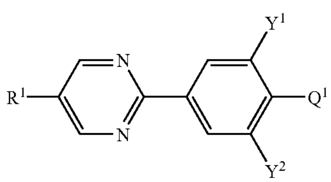
(II-4b)
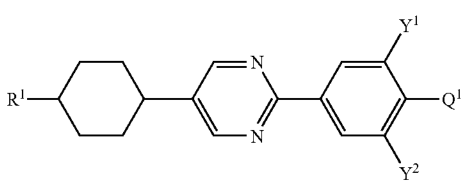
(II-4c)
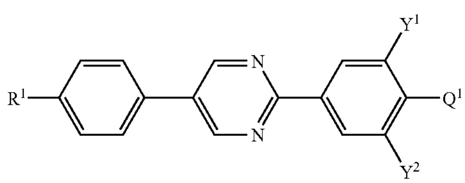
(II-4d)
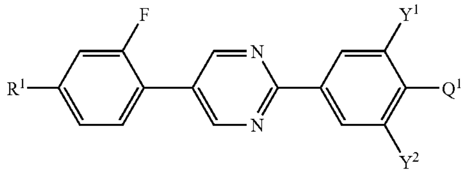
(II-4e)
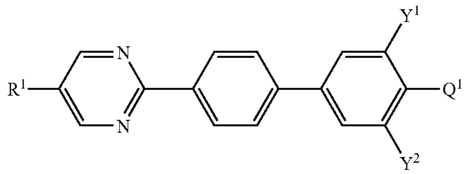
-continued
(II-4f)
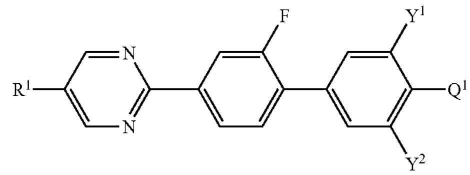
(II-4g)
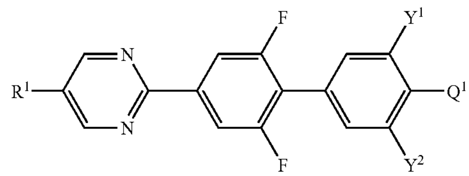
(II-4h)
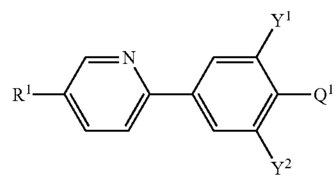
(II-4i)
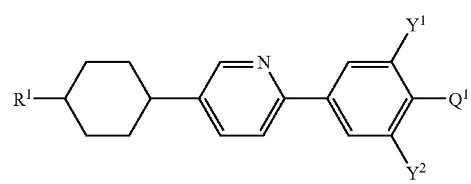
(II-4j)
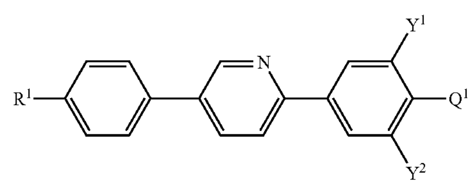
(II-4k)
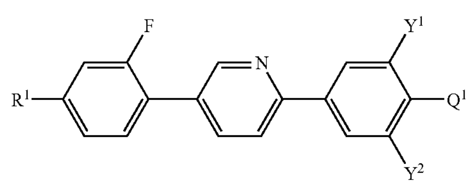
(II-4l)
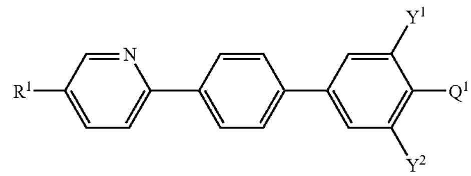
(II-4m)
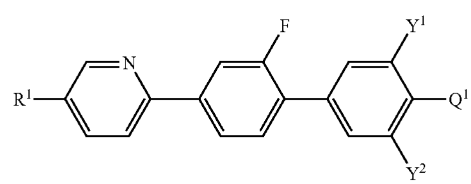

-continued (II-4n)

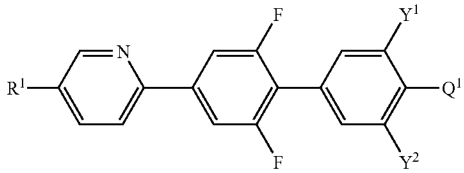

More preferred mode of the side chain group $R^1$ in the general formulas (II-1) to (II-4) includes compounds of the above-described general formulas (I-6a) to (I-6bc).

More preferred mode of the partial structural formula (II-5) of 1,4-phenylene having a polar group includes compounds represented by the following general formulas (II-5a) to (II-5r).

(II-5)

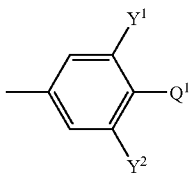

(II-5a)

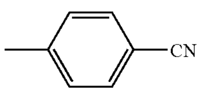

(II-5b)

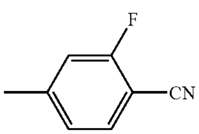

(II-5c)

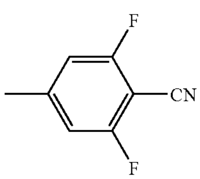

(II-5d)

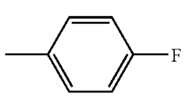

(II-5e)

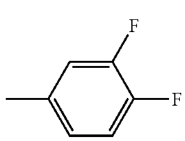

(II-5f)

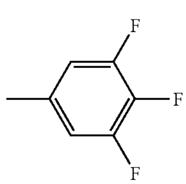

(II-5g)

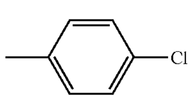

-continued (II-5h)

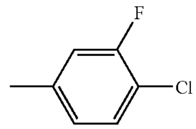

(II-5i)

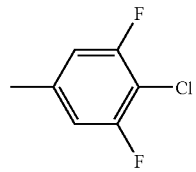

(II-5j)

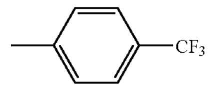

(II-5k)

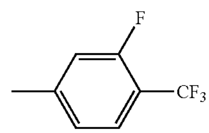

(II-5l)

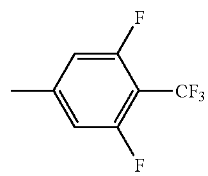

(II-5m)

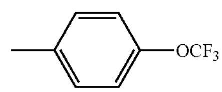

(II-5n)

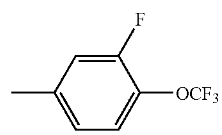

(II-5o)

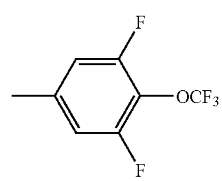

(II-5p)

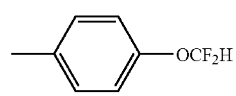

(II-5q)

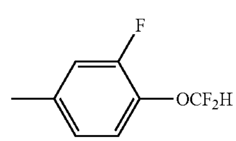

(II-5r)

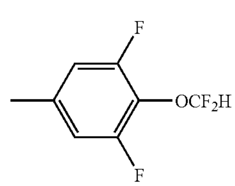

The respective compounds are used after sufficient purification by removing impurities using a means such as distillation, column purification, recrystallization or the like.

In more detail, if a general liquid crystal composition is prepared, the following compounds are preferably used as the liquid crystal component B and the effects of the present invention can be obtained by using the liquid crystal component B with the liquid crystal component A.

(II-ai): Compounds in which $R^1$ is an alkyl or alkenyl group having 2 to 5 carbon atoms, in the general formulas (II-1) to (II-4). Specific compounds are compounds having the structures of the general formulas (II-1a) to (II-4n) in which the side chain groups are (I-6ah) to (I-6bc) and the partial structures of the polar group are represented by the general formulas (II-5a) to (II-5r), and preferably compounds having the structures of the general formulas (II-1a) to (II-1l) and (II-2i) to (II-2ae), thus obtaining more improved electro-optical characteristics of STN-LCDs, TFT-LCDs, PDLCs, PN-LCDs or the like.

(II-aii): Compounds in which $Q^1$ is F, Cl, or —$OCF_3$, in the general formulas (II-1) to (II-4). Specific compounds are compounds having the structures of the general formulas (II-1a) to (II-4n) in which the side chain groups are (I-6a) to (I-6bc) and the partial structures of the polar group are represented by the general formulas (II-5d) to (II-5i) and (II-5m) to (II-5o), and preferably compounds having the structures of the general formulas (II-1a) to (II-1l), (II-2f) to (II-2q), (II-2u) to (II-2w) and (II-2ab) to (II-4f). If these compounds are used practically as a principal component, the resulting liquid crystal is superior in reduction in driving voltage and high voltage holding ratio of active TFT-LCD, STN-LCD, PDLC and PN-LCD. If these compounds are used in combination with compounds in which $Q^1$ is CN and the both are used practically as a principal component, it becomes possible to obtain excellent electro-optical characteristics such as driving voltage, sharpness, response characteristics and temperature characteristics of TN-LCDs, STN-LCDs, PDLCs, PN-LCDs or the like.

(II-aiii): Compounds in which $P^2$ is —$(CH_2)_2$— or —$(CH_2)_4$—, in the general formula (II-1). Specific compounds are compounds having the structures of the general formulas (II-1c), (II-1d), (II-1g) and (II-1 h) in which the side chain groups are (I-6a) to (I-6bc) and the partial structures of the polar group are represented by the general formulas (II-5a) to (II-5r).

(II-aiv): Compounds in which $p^1$ is 1, in the general formula (II-1). Specific compounds are compounds having the structures of the general formulas (II-1e) to (II-1l) in which the side chain groups are (I-6a) to (I-6bc) and the partial structures of the polar group are represented by the general formulas (II-5a) to (II-5r). These compounds are suited for applications requiring low driving voltage and comparatively small birefringent index.

(II-av): Compounds in which at least one of $Y^1$, $Y^2$, $W^1$, and $W^2$ is F, in the general formula (II-2). Specific compounds are compounds having the structures of the general formulas (II-2a), (II-2c), (II-2f), (II-2i), (II-2l), (II-2o), (II-2r), (II-2u), (II-2x), (II-2y), (II-2ab) and (II-2ac) in which the side chain groups are (I-6a) to (I-6bc) and the partial structure of the polar group are represented by the general formulas (II-5b), (II-5c), (II-5e), (II-5f), (II-5h), (II-5i), (II-5k), (II-5l), (II-5n), (II-5o), (II-5q) and (II-5r), or compounds having the structure of the general formulas (II-2b), (II-2d), (II-2e), (II-2g), (II-2h), (II-2j), (II-2k), (II-2m), (II-2n), (II-2p), (II-2q), (II-2s), (II-2t), (II-2v), (II-2w), (II-2z), (II-2aa), (II-2ad) and (II-2ae) in which the side chain groups are (I-6a) to (I-6bc) and the partial structures of the polar group are represented by the general formulas (II-5a) to (II-5r), which are suited for applications to reduce the driving voltage.

(II-avi): Compounds in which $p^1$ is 1 and $P^1$ is —C≡C—, in the general formula (II-2). Specific compounds are compounds having the structures of the general formulas (II-2o) to (II-2q) and (II-2ab) to (II-2ae) in which the side chain groups are (I-6a) to (I-6bc) and the partial structures of the polar group are represented by the general formulas (II-5a) to (II-5r), which are suited for applications requiring low driving voltage and comparatively small birefringent index.

(II-avii): Compounds in which $P^2$ is a single bond or —$(CH_2)_2$— and $P^1$ —COO—, in the general formula (II-2). Specific compounds are compounds having the structures of the general formulas (II-2l) to (II-2n), (II-2r) to (II-2t) and (II-2y) to (II-2aa) in which the side chain groups are (I-6a) to (I-6bc) and the partial structure of the polar group are represented by the general formulas (II-5a) to (II-5r), which are suited for applications with low driving voltage.

(II-aviii): Compounds in which at least one of $Y^1$, $Y^2$, and $W^1$ to $W^4$ is F, in the general formula (II-3). Specific compounds are compounds having the structures of the general formulas (II-3a), (II-3j), (II-3k), (II-3s), (II-3t) in which the side chain groups are (I-6a) to (I-6bc) and the partial structures of the polar group are represented by the general formulas (II-5b), (II-5c), (II-5e), (II-5f), (II-5h), (II-5i), (II-5k), (II-51), (II-5n), (II-5o), (II-5q) and (II-5r), or compounds having the structures of the general formulas (II-3b) to (II-3i), (II-31) to (II-3r) and (II-3u) to (II-3x) in which the side chain groups are (I-6a) to (I-6bc) and the partial structures of the polar group are represented by the general formulas (II-5a) to (II-5r), which are suited for applications to reduce the driving voltage.

(II-aix): Compounds in which $P^3$ is —C≡C—, in the general formula (II-3). Specific compounds are compounds having the structures of the general formulas (II-3k) to (II-3r) in which the side chain groups are (I-6a) to (I-6bc) and the partial structure of the polar group are represented by the general formulas (II-5a) to (II-5r), which are suited for applications requiring low driving voltage and comparatively small birefringent index.

(II-ax): Compounds in which $P^1$ is a single bond or —C≡C— and $P^3$ is —COO—, in the general formula (II-3). Specific compounds are compounds having the structures of the general formulas (II-3j) and (II-3y) in which the side chain groups are (I-6a) to (I-6bc) and the partial structures of the polar group are represented by the general formulas (II-5a) to (II-5r).

(II-axi): Compounds represented by the general formula (II-4). Specific compounds are compounds having the structures of the general formulas (II-4a) to (II-4n) in which the side chain groups are (I-6a) to (I-6bc) and the partial structures of the polar group are represented by the general formulas (II-5a) to (II-5r).

(II-axii): Compounds in which rings $B^1$ to $B^3$ represent trans-1,4-cyclohexylene and at least one of hydrogen atoms of this ring is substituted with a deuterium atom, in the general formulas (II-1), (II-2) and (II-4). Specific compounds are compounds having the structures of the general formulas (II-1a) to (II-1l), (II-2i) to (II-2ae), (II-4b) and (II-4i) in which the side chain groups are (I-6a) to (I-6bc)

and the partial structures of the polar group are represented by the general formulas (II-5a) to (II-5r).

A nematic liquid crystal composition containing one, or two or more kinds of compounds selected from compounds shown in these sub-groups (II-ai) to (II-axii) is preferred.

For the purpose of obtaining a liquid crystal composition suited for use as TN-LC, STN-LCD or the like, the following compounds are preferably used as the liquid crystal component B. The effects of the present invention can be obtained by using such a liquid crystal component M in combination with the liquid crystal component A.

(II-bi): Compounds in which $R^1$ is an alkyl or alkenyl group having 2 to 5 carbon atoms, $p^1$ is 0, and $Q^1$ is —CN, in the general formula (II-1). Specific compounds are compounds having the structures of the general formulas (II-1a) to (II-1d) in which the side chain groups are (I-6a) to (I-6d), (I-6ah) to (I-6am) and (I-6av) to (I-6bc) the partial structures of the polar group are represented by the general formulas (II-5a) to (II-5c).

(II-bii): Compounds in which $R^1$ is an alkyl or alkenyl group having 2 to 5 carbon atoms, $p^1$ is 0, $Q^1$ is F or —CN, and $Y^1$ and $Y^2$ represent H or F, in the general formula (II-1). Specific compounds are compounds having the structures of the general formulas (II-1e) to (II-1l) in which the side chain groups are (I-6a) to (I-6d), (I-6ah) to (I-6am) and (I-6av) to (I-6bc) and the partial structures of the polar group are represented by the general formulas (II-5a) to (II-5f).

(II-biii): Compounds in which $R^1$ is an alkyl or alkenyl group having 2 to 5 carbon atoms, $p^1$ is 0, $Q^1$ is —CN, and $Y^1$, $Y^2$, $W^1$, and $W^2$ represent H or F, in the general formula (II-2). Specific compounds are compounds having the structures of the general formulas (II-2a) to (II-2h) in which the side chain groups are (I-6a) to (I-6d), (I-6ah) to (I-6am) and (I-6av) to (I-6bc) and the partial structure of the polar group are represented by the general formulas (II-5a) to (II-5c).

(II-biv): Compounds in which $R^1$ is an alkyl or alkenyl group having 2 to 5 carbon atoms, $p^1$ is 1, $P^2$ is a single bond, —$(CH_2)_2$—, or —COO—, $P^1$ is a single bond, —COO—, or —C≡C—, $Q^1$ is F or —CN, and $Y^1$, $Y^2$, $W^1$, and $W^2$ represent H or F, in the general formula (II-2). Specific compounds are compounds having the structures of the general formulas (II-2i) to (II-2ae) in which the side chain groups are (I-6a) to (I-6d), (I-6ah) to (I-6am) and (I-6av) to (I-6bc) and the partial structure of the polar group are represented by the general formulas (II-5a) to (II-5f).

(II-bv): Compounds in $R^1$ is an alkyl or alkenyl group having 2 to 5 carbon atoms, and one of $P^1$ and $P^3$ is a single bond and other one is a single bond, —COO—, or —C≡C—, in the general formula (II-3). Specific compounds are compounds having the structures of the general formulas (II-3a) to (II-3x) in which the side chain groups are (I-6a) to (I-6d), (I-6ah) to (I-6am) and (I-6av) to (I-6bc) and the partial structures of the polar group are represented by the general formulas (II-5a) to (II-5r).

(II-bvi): Compounds in which $R^1$ is an alkyl or alkenyl group having 2 to 5 carbon atoms and $Y^1$, $Y^2$, and $W^1$ to $W^4$ represent H or F, in the general formula (II-3). Specific compounds are compounds having the structures of the general formulas (II-3a) to (II-3t) in which the side chain groups are (I-6a) to (I-6d), (I-6ah) to (I-6am) and (I-6av) to (I-6bc) and the partial structures of the polar group are represented by the general formulas (II-5a) to (II-5r).

(II-bvii): Compounds in which $R^1$ is an alkyl or alkenyl group having 2 to 7 carbon atoms and $p^2+p^{3=0}$, in the general formula (II-4). Specific compounds are compounds having the structures of the general formulas (II-4a) and (II-4h) in which the side chain groups are (I-6a) to (I-6f), (I-6ah) to (I-6am) and (I-6av) to (I-6bc) and the partial structures of the polar group are (II-5a) to (II-5r).

(II-bviii): Compounds in which rings $B^1$ to $B^3$ represent trans-1,4-cyclohexylene and at least one hydrogen atom of this ring is substituted with a deuterium atom, in the general formulas (II-1) and (II-2). Specific compounds are compounds having the structures of the general formulas (II-1a) to (II-1l) and (II-2i) to (II-2ae) in which the side chain groups are (I-6a) to (I-6bc) and the partial structures of the polar group are represented by the general formulas (II-5a) to (II-5r).

Preferred is a nematic liquid crystal composition containing one, or two or more kinds of compounds selected from compounds shown in these sub-groups (II-bi) to (II-bviii), the content of the compounds as the liquid crystal component M being within a range from 10 to 100% by weight.

For the purpose of obtaining a liquid crystal composition suited for use as STN-LCD requiring high reliability as well as active TFT-LCD, IPS, STN-LCD, PDLC, PN-LCD or the like, the following compounds are preferably used as the liquid crystal component B. The effects of the present invention can be obtained by using such a liquid crystal component M in combination with the liquid crystal component A.

(II-ci): Compounds in which $R^1$ is an alkyl or alkenyl group having 2 to 5 carbon atoms, $p^1$ is 0, one of $P^1$ and $P^2$ is a single bond and other one is a single bond, —COO—, —$(CH_2)_2$—, or —$(CH_2)_4$, $Q^1$ is F, Cl, $CF_3$, $OCF_3$, or $OCF_2H$, and one or two of $Y^1$ $Y^2$ represent F, in the general formula (II-1). Specific compounds are compounds having the structures of the general formulas (II-1e) to (II-1k) in which the side chain groups are (I-6a) to (I-6d), (I-6ah) to (I-6am) and (I-6av) to (I-6bc) and the partial structures of the polar group are represented by the general formulas (II-5e), (II-5f), (II-5h), (II-5i), (II-5k), (II-5l), (II-5n), (II-5o), (II-5q) and (II-5r).

(II-cii): Compounds in which $R^1$ is an alkyl or alkenyl group having 2 to 5 carbon atoms, $p^1$ is 1, $P^2$ is a single bond, —$(CH_2)_2$—, or —COO—, $P^1$ is a single bond, —COO—, or —C≡C—, $Q^1$ is F, Cl, $CF_3$, $OCF_3$, or $OCF_2H$, one or two of $Y^1$ and $Y^2$ represent F, and $W^1$ and $W^2$ represent H or F, in the general formula (II-2). Specific compounds are compounds having the structures of the general formulas (II-2i) to (II-2ae) in which the side chain groups are (I-6a) to (I-6d), (I-6ah) to (I-6am) and (I-6av) to (I-6bc) and the partial structures of the polar group are represented by the general formulas (II-5e), (II-5f), (II-5h), (II-5i), (II-5k), (II-51), (II-5n), (II-5o), (II-5q) and (II-5r).

(II-ciii) Compounds in which $R^1$ is an alkyl or alkenyl group having 2 to 5 carbon atoms, one of $P^1$ and $P^3$ is a single bond and other one is a single bond, —COO—, or —C≡C—, $Q^1$ is F, Cl, $CF_3$, $OCF_3$, or $OCF_2H$, one or two of $Y^1$ and $Y^2$ represent F, and $W^1$ to $W^4$ represent H and one or more of $W^1$ to $W^4$ represent F, in the general formula (II-3). Specific compounds are compounds having the structures of the general formulas (II-3a) to (II-3x) in which the side chain groups are (I-6a) to (I-6d), (I-6ah) to (I-6am) and (I-6av) to (I-6bc) and the partial structured of the polar group are represented by the general formulas (II-5e), (II-5f), (II-5h), (II-5i), (II-5k), (II-5l), (II-5n), (II-5o), (II-5q) and (II-5r).

(II-civ): Compounds in which rings $B^1$ to $B^3$ represent trans-1,4-cyclohexylene and at least three hydrogen atoms of this ring are substituted with a deuterium atom, in the general formulas (II-1) and (II-2). Specific compounds are compounds having the structures of the general formulas (II-1a) to (II-11) and (II-2i) to (II-2ae) in which the side chain groups are (I-6a) to (I-6bc) and the partial structures of the polar group are represented by the general formulas (II-5a) to (II-5r).

Preferred is a nematic liquid crystal composition containing one, or two or more kinds of compounds selected from compounds shown in these sub-groups (II-ci) to (II-cviv), the content of the compounds as the liquid crystal component B being within a range from 10 to 100% by weight.

Particularly preferred mode in compounds represented by the general formulas (II-1) to (II-4) includes the liquid crystal component B containing the following compounds.

(II-di): Compounds in which $R^1$ is an alkyl group having 2 to 7 carbon atoms, in the general formulas. Compounds in which $R^1$ is an alkenyl group of $C_pH_{2p+1}$—CH═CH—$(CH_2)_q$ (p is 0, 1, 2, or 3, q is 0 or 2), in the general formulas (II-1) and (II-2). Specifically, compounds having the structures of the general formulas (II-1a), (II-1e), (II-2a), (II-2c), (II-2d), (II-2i), (II-2l), (II-2o), (II-3a), (II-3l), (II-4a) to (II-4c) and (II-4e) having preferably these groups, and the viscosity and viscoelasticity can be reduced when the liquid crystal component B contains at least one compound having an alkyl or alkenyl group.

(II-dii): It is preferred that the liquid crystal component B contains at least one compound in which $Q^1$ is F, Cl, —$OCF_3$, or —CN in the general formulas (II-1) to (II-4) after selection.

(II-diii): If high-speed response is considered to be important, compounds of the general formulas (II-1a), (II-1e), (II-2a), (II-2c), (II-2d), (II-2i), (II-2l), (II-2o), (II-3a), (II-3l) and (II-4a) in which $Q^1$ is F, Cl, —$OCF_3$, or —CN in the general formulas (II-1) to (II-4) are preferably used in a large amount based on the crystal liquid component B.

(II-div): If larger birefringent index is required, compounds of the general formulas (II-2a) to (II-4d) in which $Q^1$ is Cl, —$OCF_3$, or —CN in the general formulas (II-2) to (II-4) and compounds of the general formulas (II-2f) to (II-2h), (II-2o) to (II-2q), (II-2ab) to (II-2ae) and (II-3k) to (II-3x) in which $P^1$ and $P^3$ represent —C≡C— in the general formulas (II-2) and (II-3) are preferably used in a large amount based on the crystal liquid component B.

(II-dv): If lower driving voltage is required, compounds of the general formulas (II-2a) to (II-4g) in which $Q^1$ is F, Cl, or —CN and one of a pair of $Y^1$ and $Y^2$ is necessarily F in the general formulas (II-1) to (II-4) are preferably used in a large amount based on the crystal liquid component B.

(II-dvi): Although compounds in which hydrogen atoms in the cyclohexane ring of the general formulas (II-1) and (II-2) are substituted with a deuterium atom, these compounds are useful to adjust the elastic constant of the liquid crystal composition and to adjust the pre-tilt angle corresponding to the alignment film. Therefore, the liquid crystal component B preferably contains at least one compound substituted with a deuterium atom.

(II-dvii): A mixing ratio of the component "dicyclized compound in which $p^1$ to $p^3$ represent 0 in the general formulas (II-1), (II-2) and (II-4)" to the component "compound in which $p^1$ is 1 in the general formulas (II-1) and (II-2), compound in which $p^2$+$p^3$=1 in the general formula (II-4) and/or tricyclized compound of the general formula (II-3)" can be appropriately selected within a range from 0 to 100 (10 to 0). If higher nematic phase-isotropic liquid phase transition temperature is required, "compound in which $p^1$ is 1 in the general formulas (II-1) and (II-2), compound in which $p^2$+$p^3$=1 in the general formula (II-4) and/or tricyclized compound of the general formula (II-3)" are preferably used in a large amount based on the crystal liquid component B.

Preferred is a nematic liquid crystal composition containing one, or two or more kinds of compounds selected from compounds shown in these sub-groups (II-di) to (II-dvii), the content of the compounds as the liquid crystal component B being within a range from 10 to 100% by weight.

The liquid crystal component B containing these compounds (II-ai) to (II-dvii) has a feature that it can be well mixed with the liquid crystal component A as an essential component, and is particularly useful for preparation according to the purpose of the driving voltage, improvement in temperature dependency and improvement in response characteristics. Particularly, compounds of the general formulas (II-1a) to (II-1g), (II-2a) to (II-2q), (II-2u) to (II-2x), (II-2ab) to (II-2ae), (II-3a) to (II-3d), (II-3l) to (II-3r) and (II-4a) to (II-4e) are superior in at least one of individual effects and this effect can be obtained even in the case of small content within a range from 0.1 to 25% by weight based on the total amount of the nematic liquid crystal composition of the present invention.

Although the liquid crystal component B of the present invention can contain at least one compound selected from one, two, or three or more sub-groups among these sub-groups (II-ai) to (II-dvii), the effect can be obtained by composing of only one compound from one sub-group. Compounds capable of having two or more structural features of compounds shown in the sub-groups (II-ai) to (II-dvii) are more preferred. The liquid crystal component B can be composed of compounds shown in the above sub-groups (II-ai) to (II-dvii) according to the desired purposes.

The liquid crystal composition of the present invention, which is obtained by using a liquid crystal component B containing, as a principal component, compounds of the general formulas (II-1) to (II-4) related to the liquid crystal composition of the present invention, or a liquid crystal component B containing compounds of the above-described sub-groups (II-ai) to (II-dvii), or a liquid crystal component B capable of having two or more structural features of the same groups (II-ai) to (II-dvii) in combination with a liquid crystal component A broadens the operating temperature range of liquid crystal display characteristics due to an improvement in co-solubility and storage at low temperature, thereby making it possible to improve a reduction in driving voltage and a change in temperature and to attain comparatively fast response characteristics for a predetermined driving voltage, thus obtaining more improved electro-optical characteristics of TN-LCDs, STN-LCDs, TFT-LCDs, PDLCs, PN-LCDs or the like using the liquid crystal composition as a constituent material.

The effect of the liquid crystal component A and liquid crystal component B can also be obtained even if the content of a liquid crystal component C described below is very small. For the purpose of particularly reducing the driving voltage, the content of a liquid crystal component C can be adjusted to 10% by weight or less. In this case, the viscosity of the liquid crystal component C is preferably reduced as small as possible so that the driving voltage is less likely to increase, thereby efficiently improving the response time.

For example, the content of the liquid crystal component C is small, the method of attaining this effect by the liquid crystal component B is that the liquid crystal component B preferably contains any of compounds in which $Q^1$ is F, Cl, —$OCF_3$, or —CN in the general formulas (II-1) to (II-4), compounds in which $Y^1$ and $Y^2$ represent F in the general formulas (II-1) to (II-4), compounds in which $P^1$ is a single bond, —COO—, or —C≡C— in the general formulas (II-2) and (II-3) and compounds in which $p^1$ is 0 in the general formula (II-1). Particularly, compounds in which $Q^1$ is F or —CN in the general formulas (II-1) to (II-4) and/or compounds in which $Y^1$ and $Y^2$ represent F in the general formulas (II-1) to (II-4) are preferred.

The liquid crystal composition of the present invention preferably contains 85% by weight or less of the liquid crystal component C having a dielectric constant anisotropy within a range from −10 to 2, in addition to the liquid crystal component A as an essential component. Preferred examples of the liquid crystal component having a dielectric constant anisotropy within a range from −10 to 2 are as follows. That is, it is a compound which has a bar-like chemical structure, the center portion having a core structure with one to four six-membered rings, the six-membered ring positioned at both terminals in the major axis direction of the center portion having a terminal group substituted at the position corresponding to the direction of the major axis of the liquid crystal, the both of terminal groups, which are present at both terminals, being a non-polar group, for example, alkyl group, alkoxy group, alkoxyalkyl group, alkenyl group, alkenyloxy group, alkanoyloxy group or the like. The liquid crystal composition of the present invention is preferably composed of one to forty kinds, and more preferably two to twenty kinds of the liquid crystal component.

From such a point of view, more preferred mode of the basic structure in compounds represented by the general formulas (III-1) to (III-4) includes compounds represented by the general formulas (III-1a) to (III-4ac). The liquid crystal composition preferably contains 10 to 100% by weight of compounds selected from compounds represented by the general formulas (III-1) to (III-4) as the liquid crystal component C of the present invention. The liquid crystal component C containing these compounds has a feature that it can be well mixed with the liquid crystal component A containing compounds of the general formulas (I-1) to (I-4), and is particularly useful to improve the nematic phase at low temperature, and also can adjust the desired birefringent index and improve the sharpness, response characteristics and temperature characteristics thereof of TN-LCDs, STN-LCDs, TFT-LCDs, PDLCs, PN-LCDs or the like.

From such a point of view, more preferred mode of the basic structure in compounds represented by the general formulas (III-1) to (III-4) includes compounds represented by the general formulas (III-1a) to (III-4ac).

(III-1a)

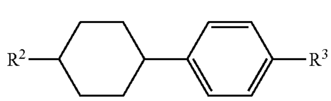

(III-1b)

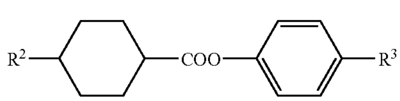

-continued (III-1c)

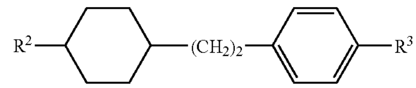

(III-1d)

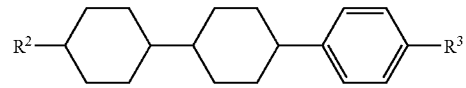

(III-1e)

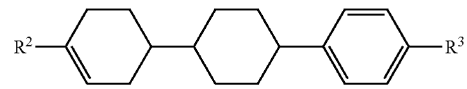

(III-1f)

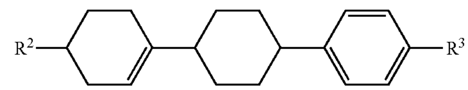

(III-1g)

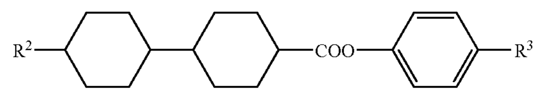

(III-1h)

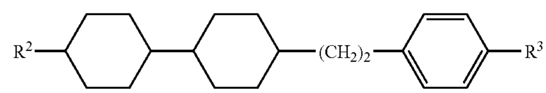

(III-1i)

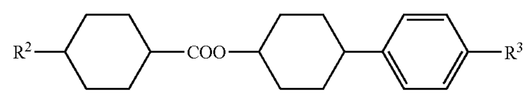

(III-1j)

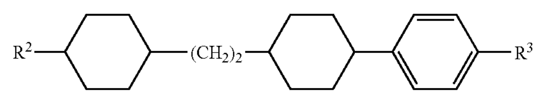

(III-1k)

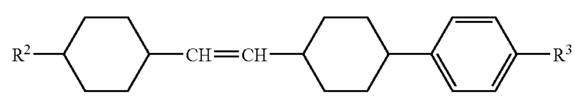

(III-1l)

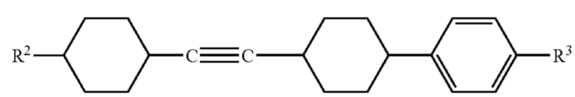

(III-1m)

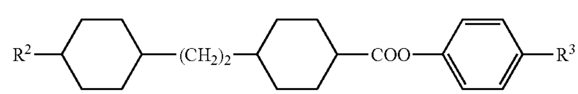

(III-1n)

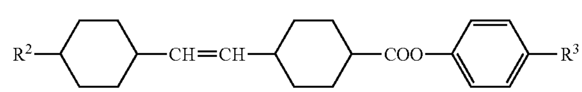

(III-1o)

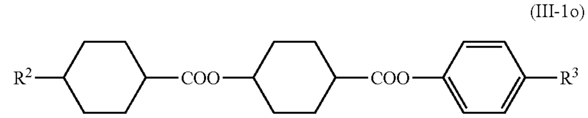

(III-1p)

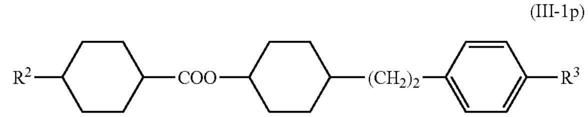

-continued
(III-1q)
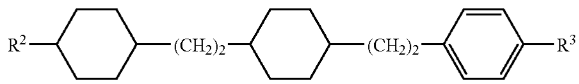
(III-1r)
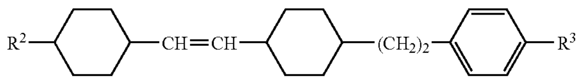
(III-2a)
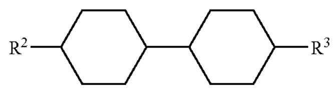
(III-2b)
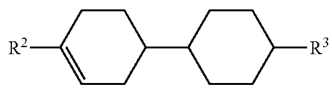
(III-2c)
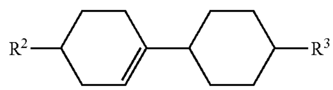
(III-2d)
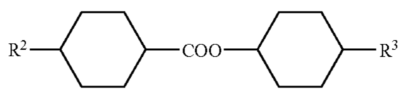
(III-2e)
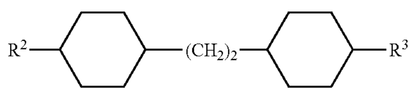
(III-2f)
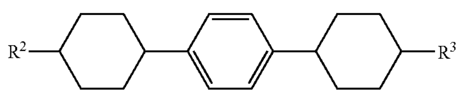
(III-2g)
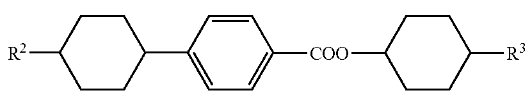
(III-2h)
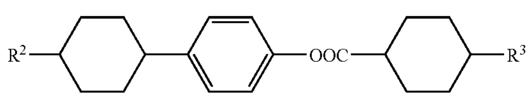
(III-2i)
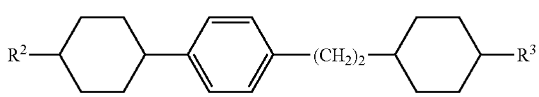
(III-2j)
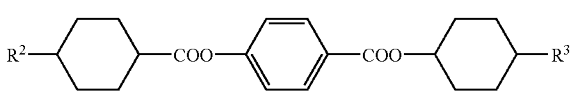
(III-2k)
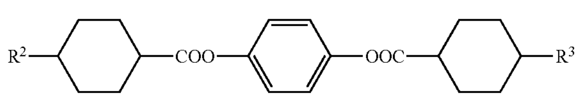
(III-2l)
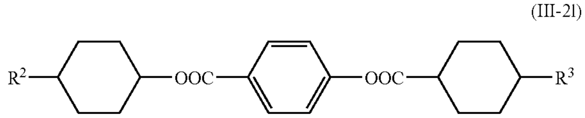
(III-2m)
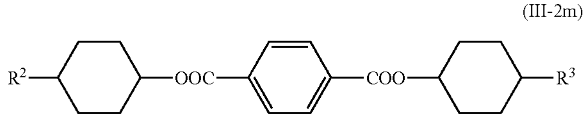
-continued
(III-2n)
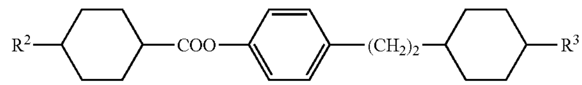
(III-2o)
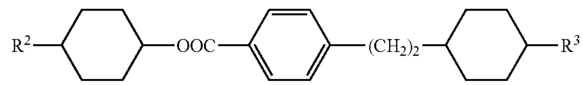
(III-3a)
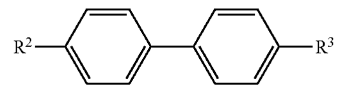
(III-3b)
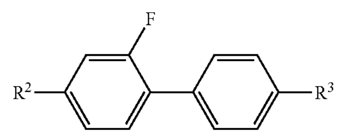
(III-3c)
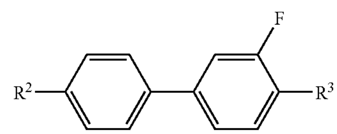
(III-3d)
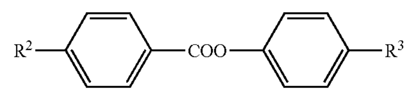
(III-3e)
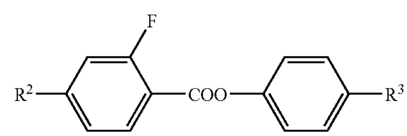
(III-3f)
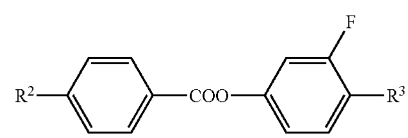
(III-3g)
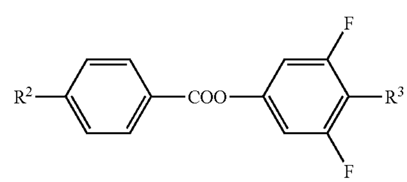
(III-3h)
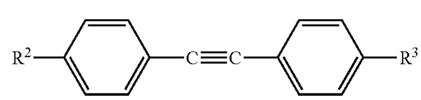
(III-3i)
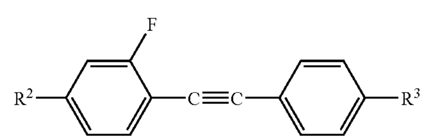
(III-3j)
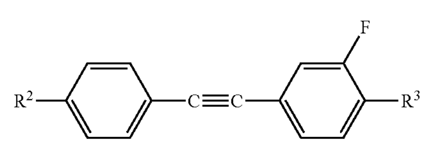

-continued
(III-3k)
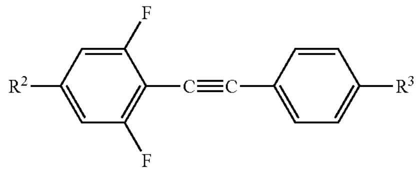
(III-3l)
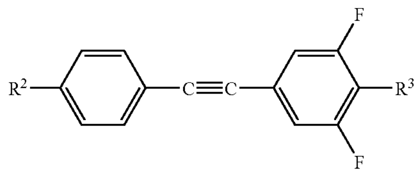
(III-3m)
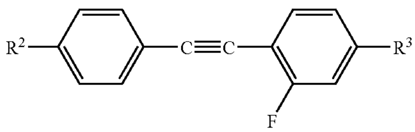
(III-3n)
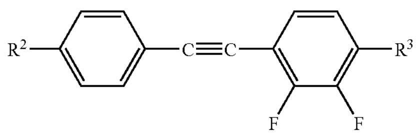
(III-3o)
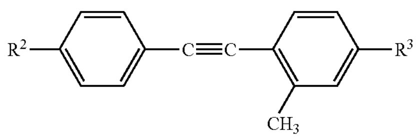
(III-3p)
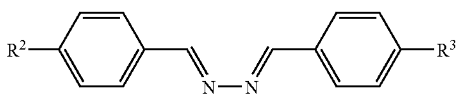
(III-3q)
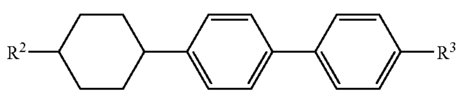
(III-3r)
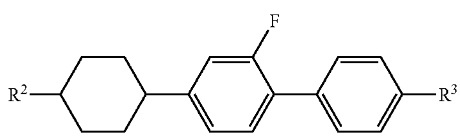
(III-3s)
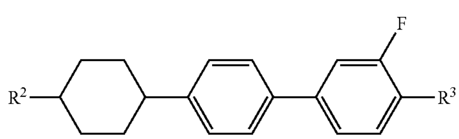
(III-3t)
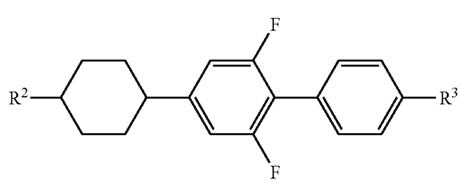
(III-3u)
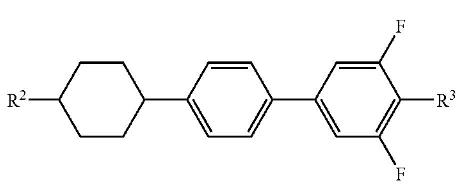
-continued
(III-3v)
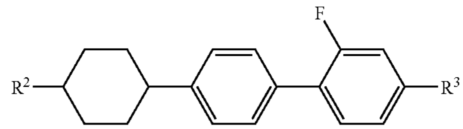
(III-3w)
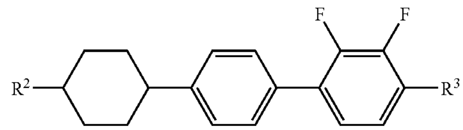
(III-3x)
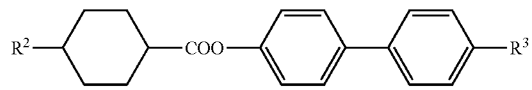
(III-3y)
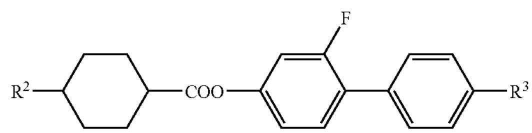
(III-3z)
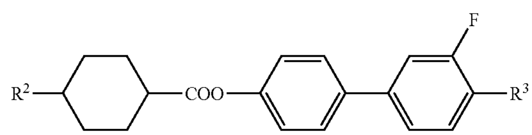
(III-3aa)
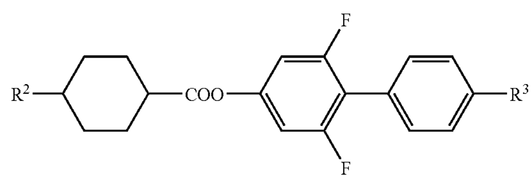
(III-3ab)
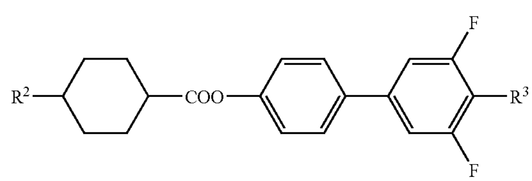
(III-3ac)
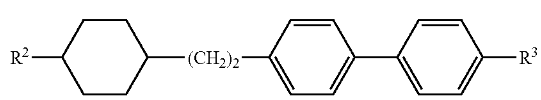
(III-3ad)
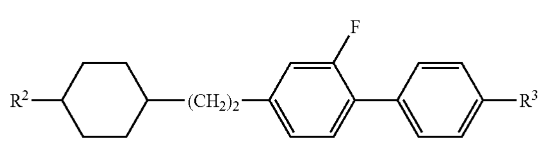
(III-3ae)
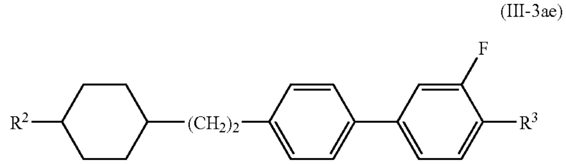

-continued
(III-3af)
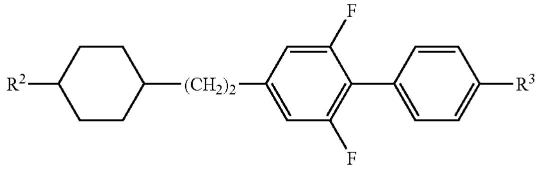
(III-3ag)
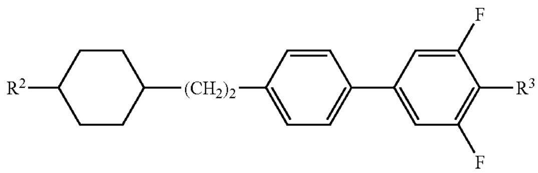
(III-3ah)
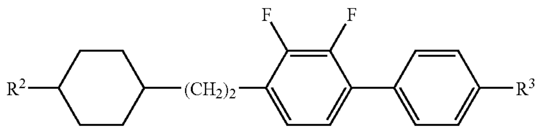
(III-3ai)
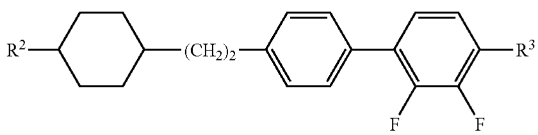
(III-3aj)
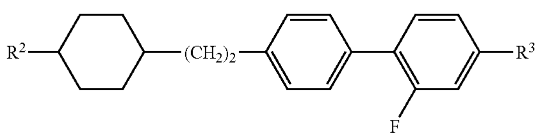
(III-3ak)
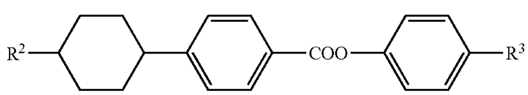
(III-3al)
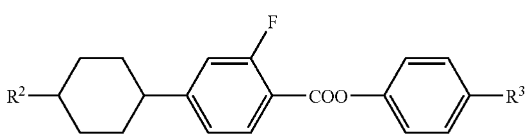
(III-3am)
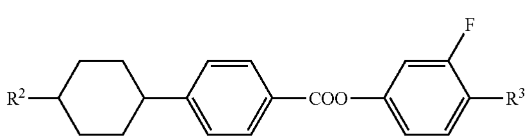
(III-3an)
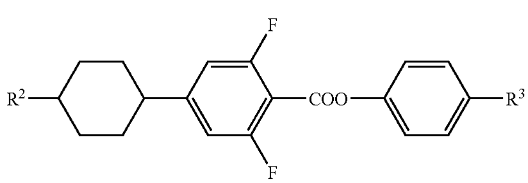
-continued
(III-3ao)
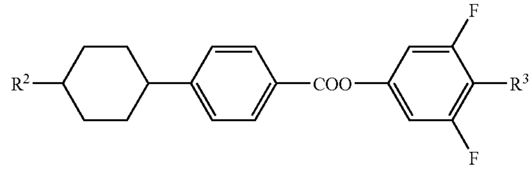
(III-3ap)
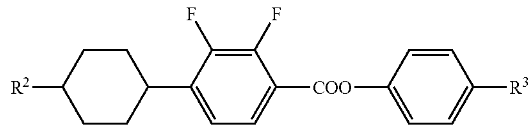
(III-3aq)
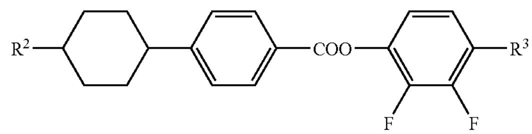
(III-3ar)
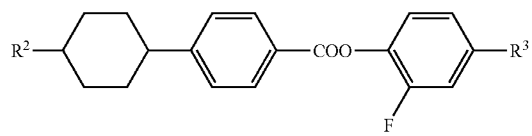
(III-3as)
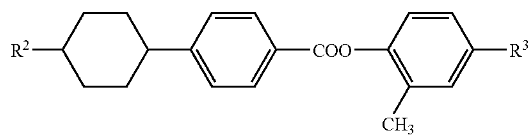
(III-3at)
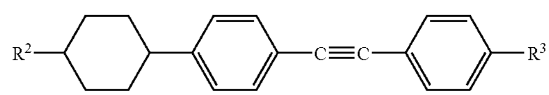
(III-3au)
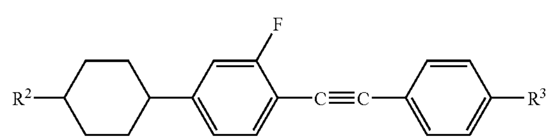
(III-3av)
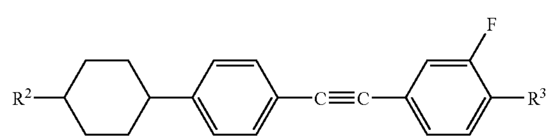
(III-3aw)
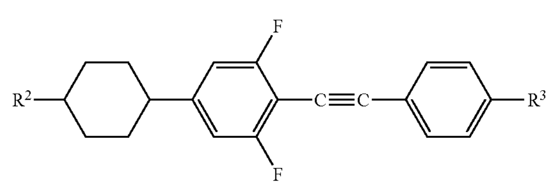

-continued
(III-3ax)
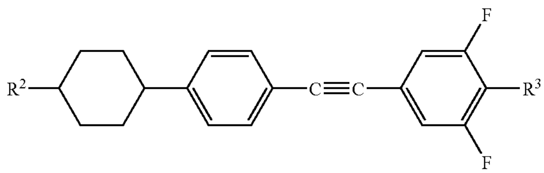
(III-3ay)
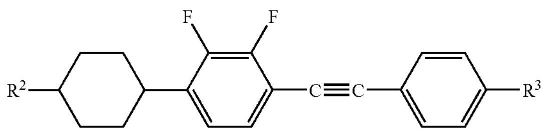
(III-3az)
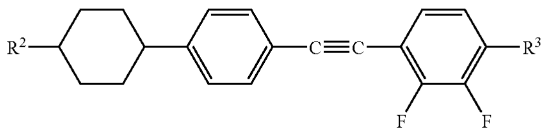
(III-3ba)
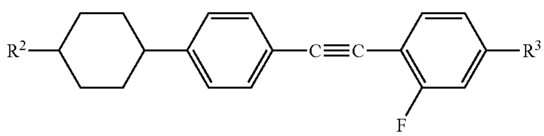
(III-3bb)
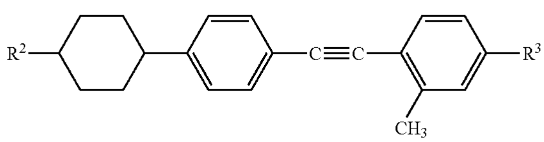
(III-3bc)
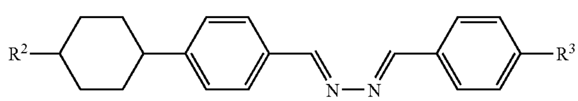
(III-3bd)
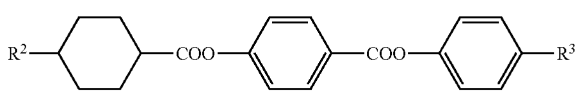
(III-3be)
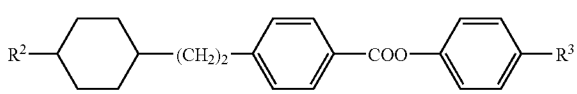
(III-3bf)
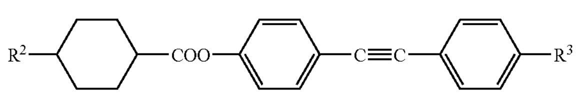
(III-3bg)
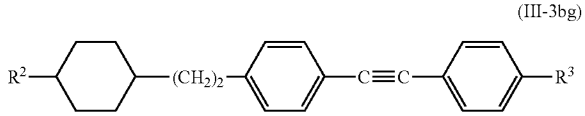
(III-3bh)
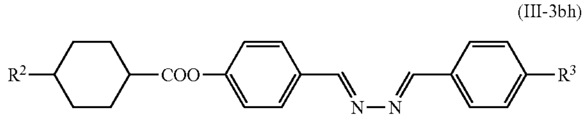
-continued
(III-3bi)
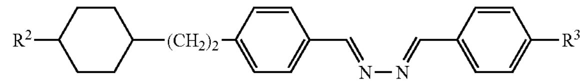
(III-3bj)
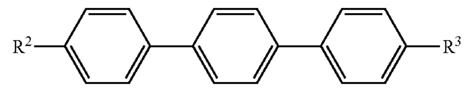
(III-3bk)
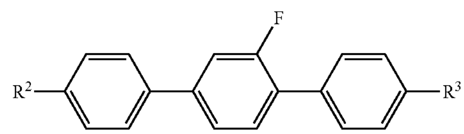
(III-3bl)
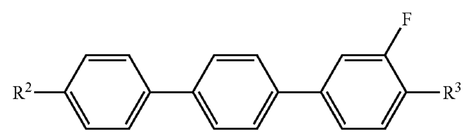
(III-3bm)
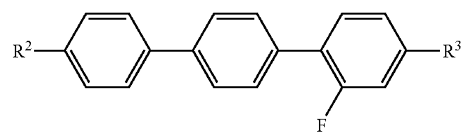
(III-3bn)
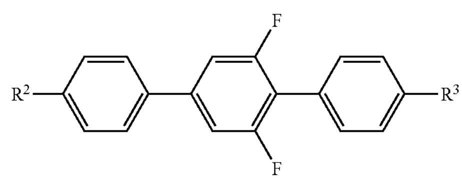
(III-3bo)
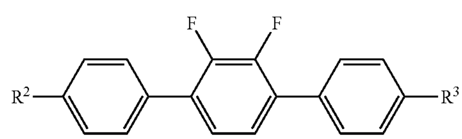
(III-3bp)
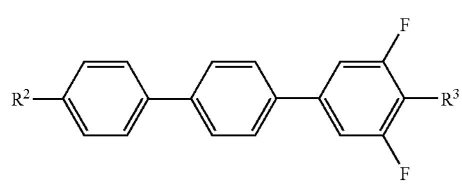
(III-3bq)
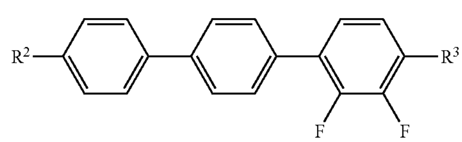
(III-3br)
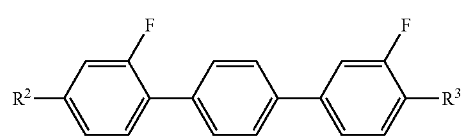
(III-3bs)
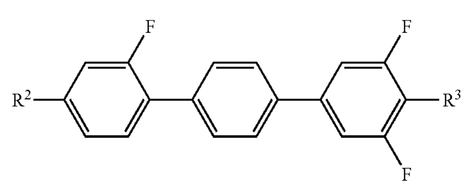

-continued
(III-3bt)
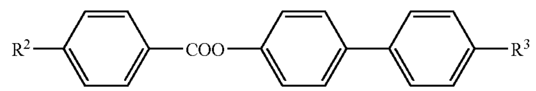
(III-3bu)
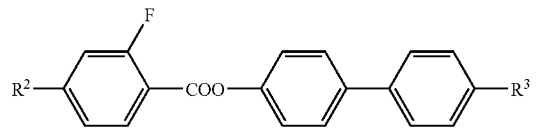
(III-3bv)
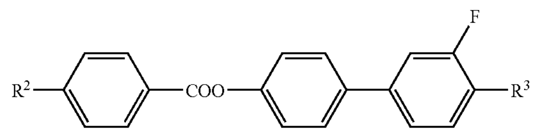
(III-3bw)
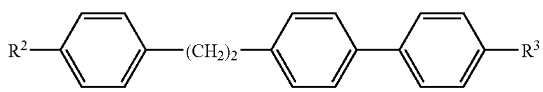
(III-3bx)
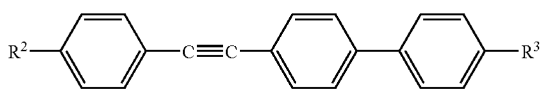
(III-3by)
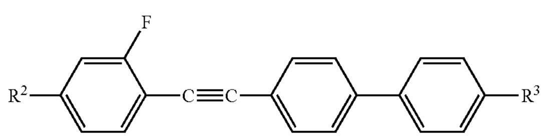
(III-3bz)
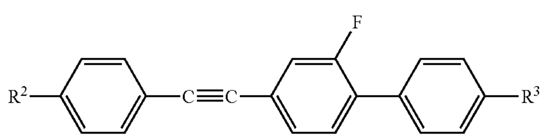
(III-3ca)
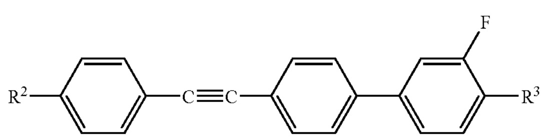
(III-3cb)
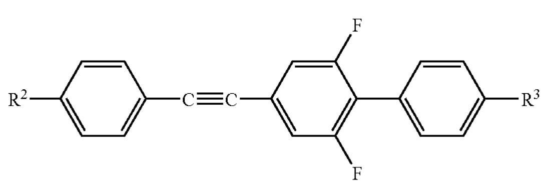
(III-3cc)
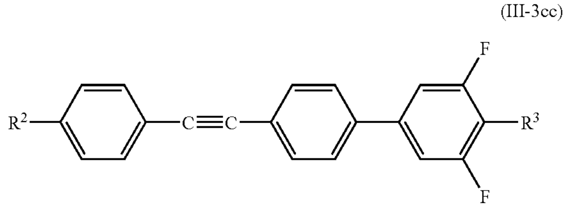
-continued
(III-3cd)
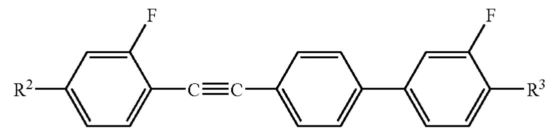
(III-3ce)
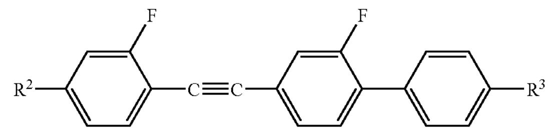
(III-3cf)
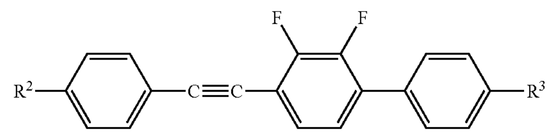
(III-3cg)
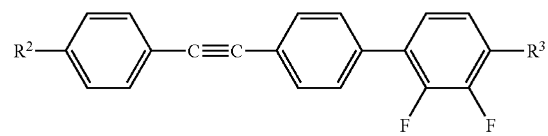
(III-3ch)
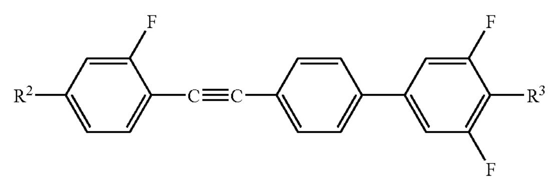
(III-3ci)
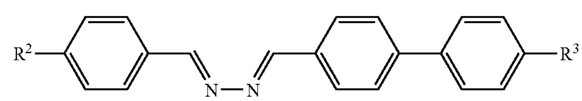
(III-3ck)
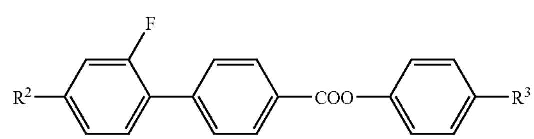
(III-3cj)
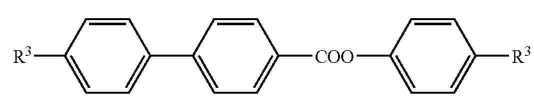
(III-3cl)
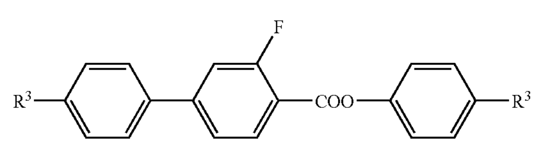
(III-3cm)
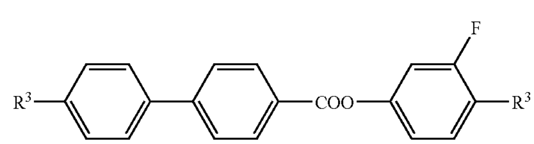

-continued
(III-3cn)
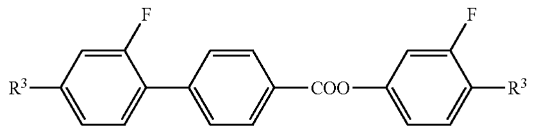
(III-3co)
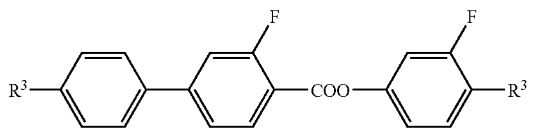
(III-3cp)
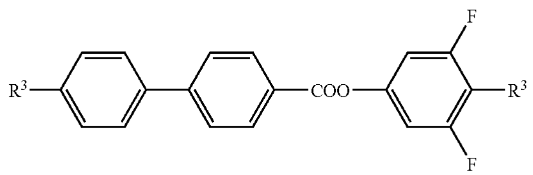
(III-3cq)
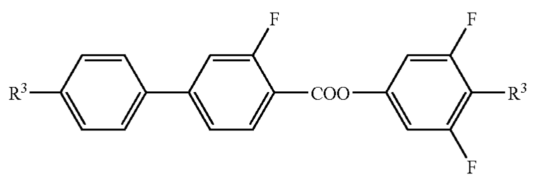
(III-3cr)
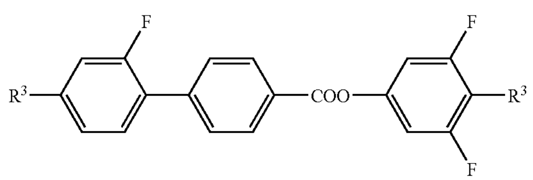
(III-3cs)
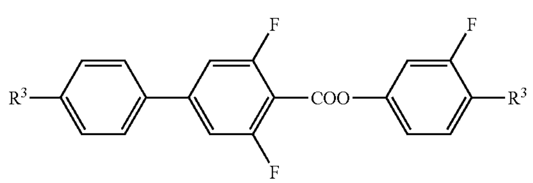
(III-3ct)
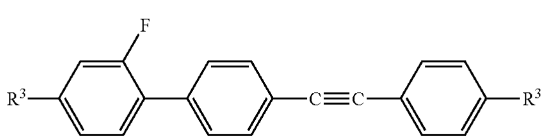
(III-3cu)
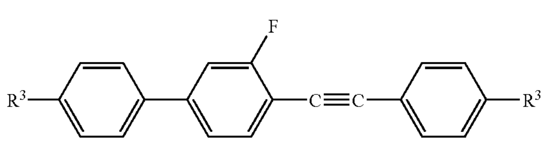
(III-3cv)
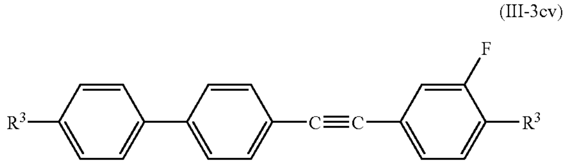
-continued
(III-3cw)
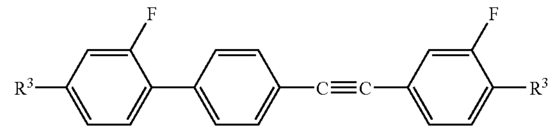
(III-3cx)
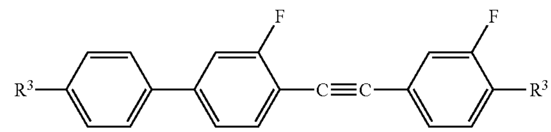
(III-3cy)
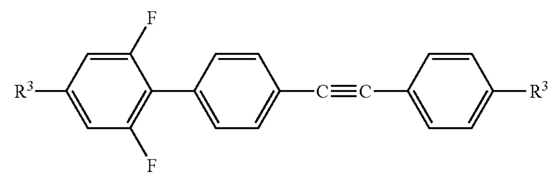
(III-3cz)
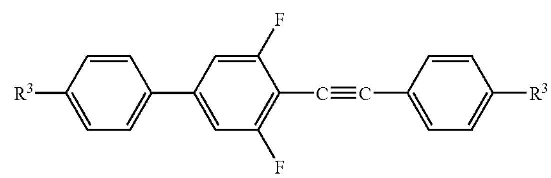
(III-3da)
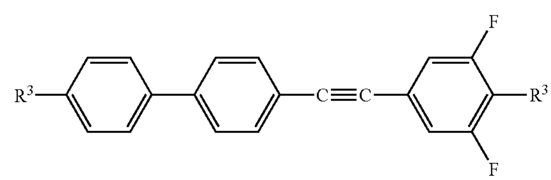
(III-3db)
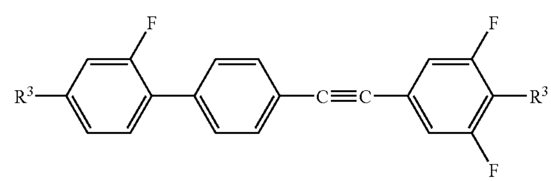
(III-3dc)
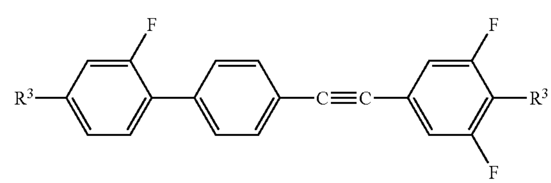
(III-3dd)
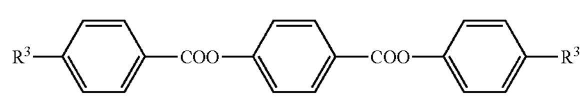
(III-3de)
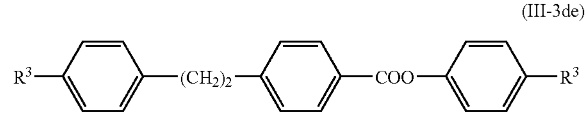

-continued
(III-3df)
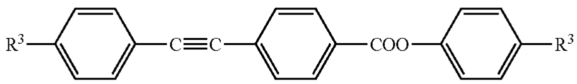
(III-3dg)
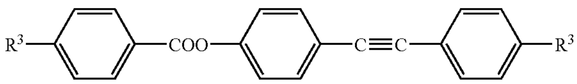
(III-3dh)
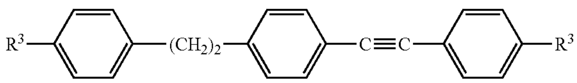
(III-3di)
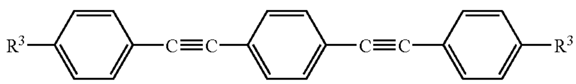
(III-4a)
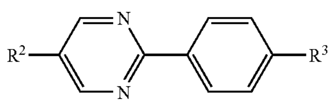
(III-4b)
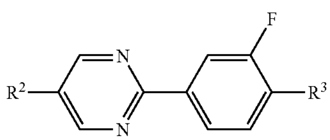
(III-4c)
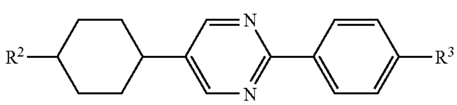
(III-4d)
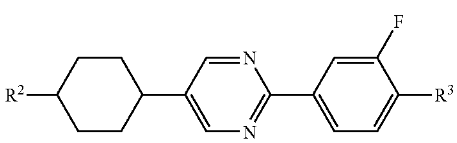
(III-4e)
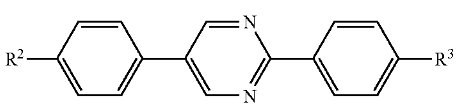
(III-4f)
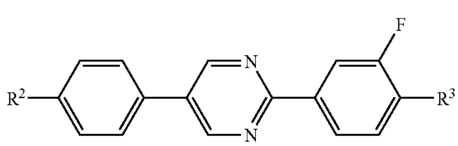
(III-4g)
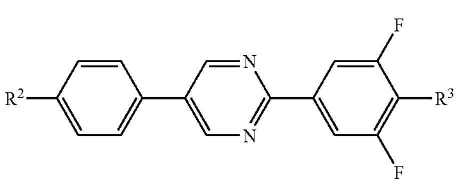
(III-4h)
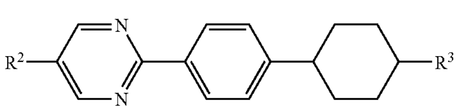
(III-4i)
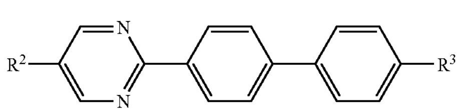
-continued
(III-4j)
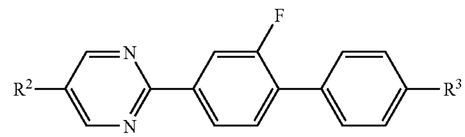
(III-4k)
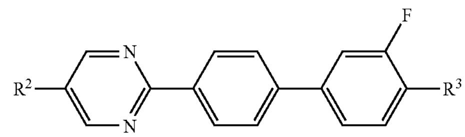
(III-4l)
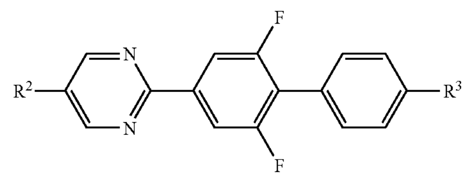
(III-4m)
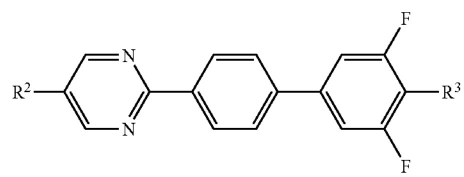
(III-4n)
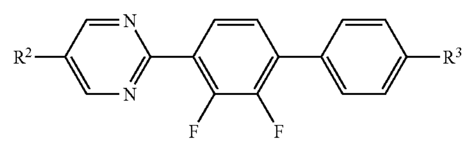
(III-4o)
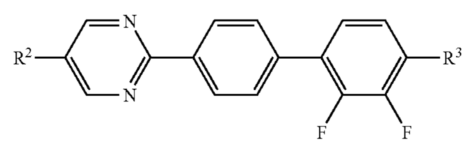
(III-4p)
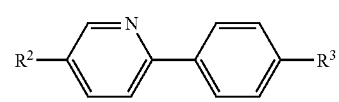
(III-4q)
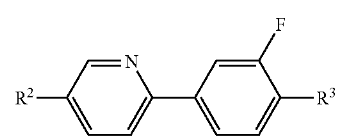
(III-4r)
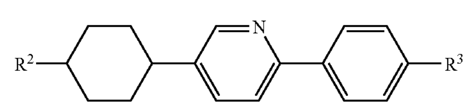
(III-4s)
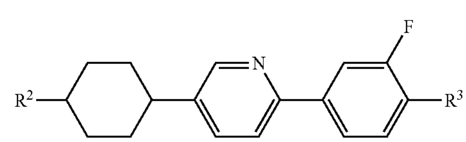
(III-4t)
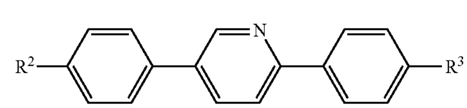

-continued (III-4u)

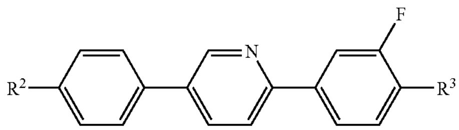

(III-4v)

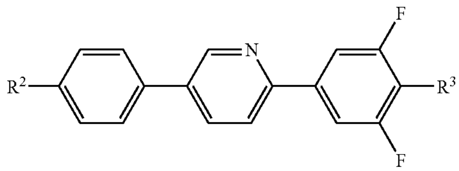

(III-4w)

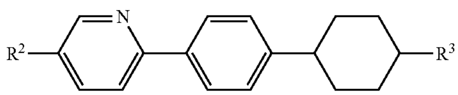

(III-4x)

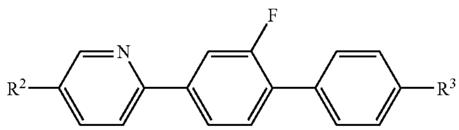

(III-4y)

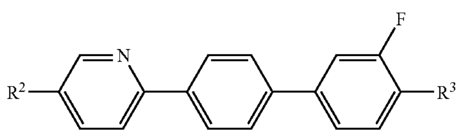

(III-4z)

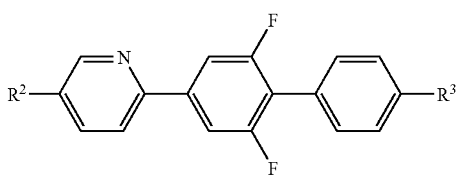

(III-4aa)

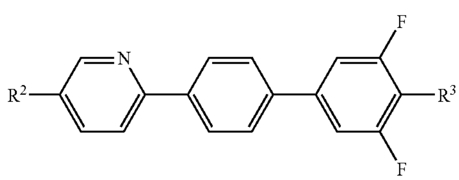

(III-4ab)

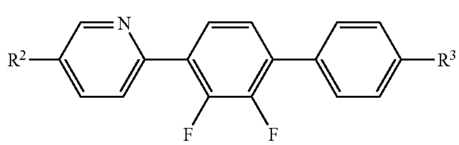

(III-4ac)

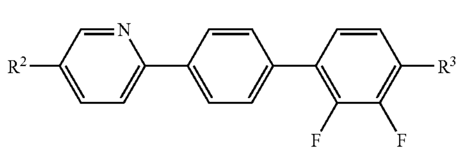

More preferred mode of the formulas (III-51) and (II-52) in side chain groups $R^2$ and $R^3$ are compounds represented by the general formulas (III-5a) to (III-5bf) described below.

| | |
|---|---|
| (III-51) | $R^2$— |
| (III-52) | $R^3$— |
| (III-5a) | $CH_3$— |
| (III-5b) | $C_2H_5$— |

-continued

| | |
|---|---|
| (III-5c) | $C_3H_7$— |
| (III-5d) | $C_4H_9$— |
| (III-5e) | $C_5H_{11}$— |
| (III-5f) | $C_6H_{13}$— |
| (III-5g) | $C_7H_{15}$— |
| (III-5h) | $CH_3O$— |
| (III-5i) | $C_2H_5O$— |
| (III-5j) | $C_3H_7O$— |
| (III-5k) | $C_4H_9O$— |
| (III-5l) | $C_5H_{11}O$— |
| (III-5m) | $C_6H_{13}O$— |
| (III-5n) | $C_7H_{15}O$— |
| (III-5o) | $CH_3COO$— |
| (III-5p) | $C_2H_5COO$— |
| (III-5q) | $C_3H_7COO$— |
| (III-5r) | $C_4H_9COO$— |
| (III-5s) | $C_5H_{11}COO$— |
| (III-5t) | $C_6H_{13}COO$— |
| (III-5u) | $C_7H_{15}COO$— |
| (III-5v) | $CH_3OCH_2$— |
| (III-5w) | $CH_3OC_2H_4$— |
| (III-5x) | $CH_3OC_3H_6$— |
| (III-5y) | $CH_3OC_4H_8$— |
| (III-5z) | $CH_3OC_5H_{10}$— |
| (III-5aa) | $C_2H_5OCH_2$— |
| (III-5ab) | $C_2H_5OC_2H_4$— |
| (III-5ac) | $C_2H_5OC_3H_6$— |
| (III-5ad) | $C_2H_5OC_4H_8$— |
| (III-5ae) | $C_2H_5OC_5H_{10}$— |
| (III-5af) | $C_3H_7OCH_2$— |
| (III-5ag) | $C_3H_7OC_2H_4$— |
| (III-5ah) | $C_3H_7OC_3H_6$— |
| (III-5ai) | $C_3H_7OC_4H_8$— |
| (III-5aj) | $C_3H_7OC_5H_{10}$— |
| (III-5ak) | $CH_2{=}CH$— |
| (III-5al) | $CH_3CH{=}CH$— |
| (III-5am) | $C_2H_5CH{=}CH$— |
| (III-5an) | $C_3H_7CH{=}CH$— |
| (III-5ao) | $CH_2{=}CHC_2H_4$— |
| (III-5ap) | $CH_3CH_2{=}CHC_2H_4$— |
| (III-5aq) | $CH_2{=}CHC_2H_5CH{=}CH$— |
| (III-5ar) | $CH_2{=}CHCH_2O$— |
| (III-5as) | $CH_3CH{=}CHCH_2O$— |
| (III-5at) | $C_2H_5CH{=}CHCH_2O$— |
| (III-5au) | $CH_2{=}CHC_3H_6O$— |
| (III-5av) | $CH_2{=}CHC_4H_8O$— |
| (III-5aw) | $CH_3CH_2{=}CHC_4H_8O$— |
| (III-5ax) | $CH_2{=}CHC_2H_5CH{=}CHCH_2O$— |
| (III-5ay) | $CHF{=}CH$— |
| (III-5az) | $CH_2{=}CF$— |
| (III-5ba) | $CF_2{=}CH$— |
| (III-5bb) | $CHF{=}CF$— |
| (III-5bc) | $CHF{=}CHC_2H_4$— |
| (III-5bd) | $CH_2{=}CFC_2H_4$— |
| (III-5be) | $CF_2{=}CHC_2H_4$— |
| (III-5bf) | $CHF{=}CFC_2H_4$— |

The respective compounds are used after sufficient purification by removing impurities using a means such as distillation, column purification, recrystallization or the like.

The liquid crystal component C can contain compounds represented by the general formulas (III-1) to (III-4), but may be composed of compounds represented by the general formula (III-1), compounds represented by the general formula (III-2), compounds represented by the general formula (III-3), compounds represented by the general formula (III-4), or a combination thereof. More preferably, the nematic liquid crystal composition contains the liquid crystal component C containing one, or two or more kinds of compounds selected from compounds represented by the general formulas (III-1) to (III-3), the content of the compounds being within a range from 5 to 100% by weight.

In more detail, if a general liquid crystal composition is prepared, the following compounds are preferably used as the liquid crystal component C, thereby making it possible to obtain the effects of the present invention.

(III-ai): Compounds in which $R^2$ is an alkenyl group having 2 to 5 carbon atoms, in the general formulas (III-1) to (III-4), and specifically compounds having the structures of the general formulas (III-1a) to (III-4ac) in which side chain group $R^3$ represents (III-5a) to (II-5bf) and side chain group $R^2$ represents (III-5ak) to (II-5ap), (III-5ar) to (III-5aw) and (III-5ay) to (III-5bf), which improve the response characteristics by a reduction in viscosity and viscoelasticity and improve the nematic phase-isotropic liquid phase transition temperature, thus obtaining more improved electro-optical characteristics of TN-LCDS, STN-LCDs, TFT-LCDs, PDLCs, PN-LCDs or the like.

(III-aii): Compounds in which $R^3$ is a straight-chain alkenyl or alkenyloxy group having 2 to 7 carbon atoms, in the general formulas (III-1) to (III-4), and specifically compounds having the structures of the general formulas (III-1a) to (III-4ac) in which the side chain group $R^2$ represents (III-5a) to (II-5bf) and the side chain group $R^3$ represents (III-5ak) to (III-5bf), which improve the response characteristics by a reduction in viscosity and viscoelasticity and improve the nematic phase-isotropic liquid phase transition temperature, thus obtaining more improved electro-optical characteristics of TN-LCDs, STN-LCDs, TFT-LCDs, PDLCs, PN-LCDs or the like.

(III-aiii): Compounds in which $m^1$ is 0 and $M^2$ is a single bond or —$(CH_2)_2$—, in the general formula (III-1), and specifically compounds having the structures of the general formulas (III-1a) and (III-1c) in which side chain groups $R^2$ and $R^3$ are (III-5a) to (III-5bf).

(III-aiv): Compounds in which $m^1$ is 1, in the general formula (III-1), and specifically compounds having the structures of the general formulas (III-1d) to (III-1r) in which side chain groups $R^2$ and $R^3$ are (III-5a) to (III-5bf).

(III-av): Compounds represented by the general formula (III-2), and specifically compounds having the structures of the general formulas (III-2a) to (III-2o) in which $R^2$ and $R^3$ are (III-5a) to (III-5bf).

(III-avi): Compounds in which at least one of $Z^1$, $Z^2$, and $W^1$ to $W^3$ is F, in the general formula (III-3), and specifically compounds having the structures of the general formulas (III-3b), (III-3c), (III-3e), (III-3g), (III-3i) to (III-31), (III-3n), (III-3r) to (III-3u), (III-3w), (III-3y) to (III-3ab), (III-3ad) to (III-3ai), (III-3al) to (III-3aq), (III-3au) to (III-3az), (III-3bk), (III-3bl), (III-3bn) to (III-3bs), (III-3bu), (III-3bu), (III-3by) to (III-3ch) and (III-3ck) to (III-3dc) in which side chain groups $R^2$ and $R^3$ are (III-5a) to (III-5bf).

(III-avii): Compounds in which $Z^3$ is F or —$CH_3$, in the general formula (III-3), and specifically compounds having the structures of the general formulas (III-3m) to (III-3o), (III-3v), (III-3w), (III-3ai), (III-3aj), (III-3aq) to (III-3 as), (III-3az) to (III-3bb), (III-3bm), (III-3bq) and (III-3cg) in which side chain groups $R^2$ and $R^3$ (III-5a) to (III-5bf)

(III-aviii): Compounds in which $m^1$ is 0 and $M^3$ is a single bond, in the general formula (III-3), and specifically compounds having the structures of the general formulas (III-3a) to (III-3c) in which side chain groups $R^2$ and $R^3$ are (III-5a) to (III-5bf).

(III-aix): Compounds in which $m^1$ is 1 and $M^1$ is a single bond, —OCO—, —$CH_2O$—, —$OCH_2$—, —$(CH_2)_2$—, —$(CH_2)_4$—, —CH═CH—$(CH_2)_2$—, —$(CH_2)_2$—CH═CH—, —CH═N—, —CH═N—N═CH—, —N(O)═N—, —CH═CH—, or —CF═CF—, in the general formula (III-3), and specifically compounds having the structures of the general formulas (III-3q) to (III-3w), (III-3ac) to (III-3bc), (III-3be), (III-3bg), (III-3bi) to (III-3bs), (III-3bw), (III-3ci) to (III-3dc), (III-3de) and (III-3dh) in which side chain groups $R^2$ and $R^3$ are (III-5a) to (III-5bf).

(III-ax): Compounds in which $M^1$ is —COO— or —C≡C— and $M^3$ is —OCO—, —$CH_2O$—, —$OCH_2$—, —$(CH_2)_2$—, —$(CH_2)_4$—, —CH═CH—$(CH_2)_2$—, —$(CH_2)_2$—CH═CH—, —CH═N—, —CH═N—N═CH—, —N(O)═N—, —CH═CH—, —CF═CF—, or —C≡C—, in the general formula (III-3), and specifically compounds having the structures of the general formulas (III-3bf), (III-3bh), (III-3df) and (III-3dg) in which side chain groups $R^2$ and $R^3$ are (III-5a) to (III-5bf).

(III-axi): Compounds represented by the general formula (III-4), and specifically compounds having the structures of the general formulas (III-4a) to (III-4ac) in which side chain groups $R^2$ and $R^3$ are (III-5a) to (III-5bf)

(III-axii): Compounds selected from compounds in which rings $C^1$ to $C^3$ represent trans-1,4-cyclohexylene and at least one of hydrogen atoms of these rings is substituted with a deuterium atom, in the general formulas (III-1) to (III-4), and specifically compounds having the structures of the general formulas (III-1a) to (III-2o), (III-3q) to (III-3bi), (III-4c), (III-4d), (III-4h), (III-4r), (III-4s) and (III-4w) in which side chain groups $R^2$ and $R^3$ are (III-5a) to (III-5bf).

A nematic liquid crystal composition containing one, or two or more kinds of compounds selected from compounds shown in these sub-groups (III-ai) to (III-axii) is preferred.

Preferred mode in compounds represented by the general formulas (III-1) to (III-4) is a liquid crystal component C containing the following compounds.

(III-bi): Compounds in which $R^2$ is an alkyl group having 1 to 5 carbon atoms or an alkenyl group having 2 to 5 carbon atoms, $R^3$ is an alkyl or alkoxy group having 1 to 5 carbon atoms, or alkenyl or alkenyloxy group having 2 to 5 carbon atoms, $m^1$ is 0, and $M^2$ is a single bond, —COO—, or —$(CH_2)_2$—, in the general formula (III-1), and specifically compounds having the structures of the general formulas (III-1a) to (III-1c) in which the side chain group $R^2$ represents (III-5a) to (III-5e) and (III-5ak) to (III-5ap) and the side chain group $R^3$ represents (III-5a) to (III-5e), (III-5g) to (III-51), (III-5ak) to (III-5ap), (III-5ar) to (III-5aw), (III-5ay) to (III-5bf).

(III-bii): Compounds in which $R^2$ is an alkyl group having 1 to 5 carbon atoms or an alkenyl group having 2 to 5 carbon atoms, $R^3$ is an alkyl or alkoxy group having 1 to 5 carbon atoms, or alkenyl or alkenyloxy group having 2 to 5 carbon atoms, $m^1$ is 1, the ring $C^1$ is trans-1,4-cyclohexylene, and one of $M^1$ and $M^2$ is a single bond and other one is a single bond, —COO, or —$(CH_2)_2$—, in the general formula (III-1), and specifically compounds having the structures of the general formulas (III-1d), (III-1 g) to (III-1j) in which the side chain group $R^2$ represents (III-5a) to (III-5e) and (III-5ak) to (III-5ap) and the side chain group $R^3$ represents (III-5a) to (III-5e), (III-5g) to (III-51), (III-5ak) to (III-5ap), (III-5ar) to (III-5aw) and (III-5ay) to (III-5bf).

(III-biii): Compounds in which $R^2$ is an alkyl group having 1 to 5 carbon atoms or an alkenyl group having 2 to 5 carbon atoms, $R^3$ is an alkyl or alkoxy group having 1 to 5 carbon atoms, or alkenyl or alkenyloxy group having 2 to 5 carbon atoms, the ring $C^2$ is trans-1,4-cyclohexylene or trans-1,4- cyclohexenylene, $m^1$ is 0, and $M^2$ is a single bond, —COO, or —$(CH_2)_2$—, in the general formula (III-2), and specifically compounds having the structures of the general formulas (III-2a) to (III-2e) in which the side chain group $R^2$ represents (III-5a) to (III-5e) and (III-5ak) to (III-5ap) and the side chain group $R^3$ represents (III-5a) to (III-5e), (III-5g) to (III-5l), (III-5ak) to (III-5ap), (III-5ar) to (III-5aw) and (III-5ay) to (III-5bf).

(III-biv): Compounds in which $R^2$ is an alkyl group having 1 to 5 carbon atoms or an alkenyl group having 2 to 5 carbon atoms, $R^3$ is an alkyl or alkoxy group having 1 to 5 carbon atoms, or alkenyl or alkenyloxy group having 2 to 5 carbon atoms, the ring $C^2$ is trans-1,4-cyclohexylene or trans-1,4-cyclohexenylene, $m^1$ is 1, and one of $M^1$ and $M^2$ is a single bond, in the general formula (III-2), and specifically compounds having the structures of the general formulas (III-2f) to (III-2i) in which the side chain group $R^2$ represents (III-5a) to (III-5e) and (III-5ak) to (III-5ap) and the side chain group $R^3$ represents (III-5a) to (III-5e), (III-5g) to (III-5l), (III-5ak) to (III-5ap), (III-5ar) to (III-5aw) and (III-5ay) to (III-5bf).

(III-bv): Compounds in which $R^2$ is an alkyl group having 1 to 5 carbon atoms or an alkenyl group having 2 to 5 carbon atoms, $R^3$ is an alkyl or alkoxy group having 1 to 5 carbon atoms, or alkenyl or alkenyloxy group having 2 to 5 carbon atoms, $m^1$ is 0, and $M^3$ is a single bond, —C≡C—, or —CH═N—N═CH, in the general formula (III-3), and specifically compounds having the structures of the general formulas (III-3a) to (III-3c) and (III-3h) to (III-3p) in which the side chain group $R^2$ represents (III-5a) to (III-5e) and (III-5ak) to (III-5ap) and the side chain group $R^3$ represents (III-5a) to (III-5e), (III-5g) to (III-5l), (III-5ak) to (III-5ap), (III-5ar) to (III-5aw) and (III-5ay) to (III-5bf).

(III-bvi): Compounds in which $R^2$ is an alkyl group having 1 to 5 carbon atoms or an alkenyl group having 2 to 5 carbon atoms, $R^3$ is an alkyl or alkoxy group having 1 to 5 carbon atoms, or alkenyl or alkenyloxy group having 2 to 5 carbon atoms, $m^1$ is 1, $M^1$ is a single bond, —$(CH_2)_2$—, —COO—, or —C≡C—, and M is a single bond, —COO—, or —C≡C—, in the general formula (III-3), and specifically compounds having the structures of the general formulas (III-3q) to (III-3bb), (III-3bd) to (III-3bg), (III-3bj) to (III-3ch) and (III-3cj) to (III-3di) in which the side chain group $R^2$ represents (III-5a) to (III-5e) and (III-5ak) to (III-5ap) and the side chain group $R^3$ represents (III-5a) to (III-5e), (III-5g) to (III-51), (III-5ak) to (III-5ap), (III-5ar) to (III-5aw) and (III-5ay) to (III-5bf).

(III-bvii): Compounds in which $R^2$ is an alkyl group having 1 to 5 carbon atoms or an alkenyl group having 2 to 5 carbon atoms, $R^3$ is an alkyl or alkoxy group having 1 to 5 carbon atoms, or alkenyl or alkenyloxy group having 2 to 5 carbon atoms, $m^1$ is 1, one of $M^1$ and $M^3$ is a single bond and other one is a single bond or —C≡C—, and at least one of $W^1$ and $W^2$ is F, in the general formula (III-3), and specifically compounds having the structures of the general formulas (III-3r), (III-3t), (III-3au), (III-3aw), (III-3ay), (III-3bk), (III-3bn), (III-3bo), (III-3bz), (III-3cb), (III-3ce), (III-3cf), (III-3cu), (III-3cx) and (III-3cz) in which the side chain group $R^2$ represents (III-5a) to (III-5e) and (III-5ak) to (III-5ap) and the side chain group $R^3$ represents (III-5a) to (III-5e), (III-5g) to (III-5l), (III-5ak) to (III-5ap), (III-5ar) to (III-5aw) and (III-5ay) to (III-5bf).

(III-bviii): Compounds in which $R^2$ is an alkyl group having 1 to 5 carbon atoms or an alkenyl group having 2 to 5 carbon atoms, $R^3$ is an alkyl or alkoxy group having 1 to 5 carbon atoms, or alkenyl or alkenyloxy group having 2 to 5 carbon atoms, and any one of $Z^2$ and $Z^3$ is substituted with F or $CH_3$, in the general formula (III-3), and specifically compounds having the structures of the general formulas (III-3c), (III-3f), (III-3g), (III-3j), (III-3l) to (III-3o), (III-3s), (III-3u) to (III-3w), (III-3z), (III-3ab), (III-3ae), (III-3ag), (III-3ai), (III-3aj), (III-3am), (III-3ao), (III-3aq) to (III-3 as), (III-3av), (III-3ax), (III-3az) to (III-3bb), (III-3bl), (III-3bm), (III-3 bp) to (III-3bs), (III-3by), (III-3ca), (III-3 cc), (III-3cd), (III-3cg), (III-3ch), (III-3 cm) to (III-3cs), (III-3cv) to (III-3cx) and (III-3da) to (III-3dc) in which the side chain group $R^2$ represents (III-5a) to (III-5e), (III-5ak) to (III-5ap) and the side chain group $R^3$ represents (III-5a) to (III-5e), (III-5g) to (III-5l), (III-5ak) to (III-5ap), (III-5ar) to (III-5aw) and (III-5ay) to (III-5bf).

(III-bix): Compounds in which $R^2$ is an alkyl group having 1 to 5 carbon atoms or an alkenyl group having 2 to 5 carbon atoms, $R^3$ is an alkyl or alkoxy group having 1 to 5 carbon atoms, or alkenyl or alkenyloxy group having 2 to 5 carbon atoms, and $m^2+m^3=0$, in the general formula (III-4), and specifically compounds having the structures of the general formulas (III-4a) and (III-4b) in which the side chain group $R^2$ represents (III-5a) to (III-5e) and (III-5ak) to (III-5ap) and the side chain group $R^3$ represents (III-5a) to (III-5e), (III-5g) to (III-51), (III-5ak) to (III-5ap), (III-5ar) to (III-5aw) and (III-Say) to (III-5bf).

Preferred is a nematic liquid crystal composition containing one, or two or more kinds of compounds selected from compounds shown in these sub-groups (III-bi) to (III-bix), the content of the compounds as the liquid crystal component C being within a range from 10 to 100% by weight.

Preferred mode in compounds represented by the general formulas (III-1) to (III-4) is a liquid crystal component C containing the following compounds.

The liquid crystal composition containing compounds of the general formulas (III-1) to (III-4) as the liquid crystal component C has a feature that it can reduce the viscosity and viscoelasticity, thus leading to comparatively high holding ratio of the resistivity and voltage. The viscosity of the liquid crystal component C is preferably small as possible. In the present invention, the viscosity is preferably 45 cp or less, more preferably 30 cp or less, still more preferably 20 cp or less, and particularly preferably 15 cp or less. From such a point of view, preferred compounds are compounds (III-ci) having the structures represented by the general formulas (III-1a) to (III-1f), (III-1k), (III-2a) to (III-2f), (III-3a), (III-3h) to (III-3j), (III-3o), (III-3p), (III-3q), (III-3ac), (III-3 at) to (III-3ax), (III-3ba), (III-3bb), (III-3bf), (III-3bg), (III-3bx) to (III-3cb) and (III-3ct) to (III-3cx), preferably compounds (III-ci) in which $R^2$ is a straight-chain alkyl group having 2 to 5 carbon atoms or an alkenyl group of $C_pH_{2p+1}$—CH═CH—$(CH_2)_q$ (p=0, 1, 2, or 3 and q=0 or 2) and $R^3$ is a straight-chain alkyl group having 1 to 5 carbon atoms or an alkenyl group of $C_pH_{2p+1}$—CH═CH—$(CH_2)_q$ (p=0, 1, 2, or 3 and q=0 or 2) among the compounds (III-ci), and more preferably compounds (III-ciii) having the structure represented by the general formulas (III-1a), (III-1d), (III-2a), (III-2f), (III-3a), (III-3h), (III-3p) and (III-3q) in which both side chain groups are alkenyl groups.

Although the liquid crystal component C of the present invention can be composed of each of the compounds represented by the general formulas (III-1), (III-2), (III-3) and (III-4) alone, the birefringent index of the liquid crystal composition can be easily optimized according to applications by using (III-civ): "compounds represented by the general formulas (III-1) and/or (III-2), and particularly compounds of the general formulas (III-1a), (III-1d), (III-2a) to (III-2c) and (III-c)" in combination with (III-cv): "compounds represented by the general formulas (III-3) and/or (III-4), particularly compounds in which $M^1$ is a single bond, —C≡C—, or —CH═N—N═CH— in the general formula (III-3), and specifically compounds of the general formulas (III-3a), (III-3h), (III-3p), (III-3q), (III-3 at), (III-4a) and (III-4h)" (III-cv). Generally, the birefringent index can be reduced by Using the compounds of the general formulas (III-1) and (III-2), for example, compounds of the general formulas (III-1a) to (III-2f) in a large amount, thereby making it possible to easily attain an reduction in color irregularity of the liquid crystal display device, an improvement in viewing angle characteristics and an increase in contrast ratio. The birefringent index can be enhanced by Using the compounds of the general formulas (III-3), for example, compounds of the general formulas (III-3a) to (III-3j), or compounds of the general formulas (III-4), for example, compounds of the general formulas (III-4a) to (III-4e) in a large amount, thereby making it possible to produce a thin liquid crystal display element having a liquid crystal layer having a thickness within a range from 1 to 5 μm.

Preferred is a nematic liquid crystal composition containing one, or two or more kinds of compounds selected from compounds shown in these sub-groups (III-ci) to (III-cv), the content of the compounds as the liquid crystal component M being within a range from 10 to 100% by weight.

Although the liquid crystal component C of the present invention can contain at least one compound selected from one, two, or three or more sub-groups among these sub-groups (III-ai) to (III-cv), the effect can be obtained by composing of only one compound from one sub-group. Compounds capable of having two or more structural features of compounds shown in the sub-groups (III-ai) to (III-cv) are more preferred. The liquid crystal component C can be composed of compounds shown in the above sub-groups (III-ai) to (III-cv) according to the desired purposes.

The present invention includes a liquid crystal composition containing a combination of the liquid crystal component A and liquid crystal component C. The present inventors have found that the liquid crystal composition of the present invention has a noticeable effect in response characteristics compared to a liquid crystal composition comprising conventionally known liquid crystal component A and liquid crystal component C. In a liquid crystal composition using in combination with the liquid crystal component C, particularly liquid crystal component C containing sub-groups (III-bi) to (III-cv), and more particularly liquid crystal component C containing sub-groups (III-ci) to (III-cv), a fast improvement in response characteristics was obtained compared to the liquid crystal composition comprising the liquid crystal component B and liquid crystal component C. It is considered that this is caused by a compound characterized by a molecular structure having, as a partial structure, non-substituted or substituted naphthalene-2,6-diyl, decahydronaphthalene-2,6-diyl and 1,2,3,4-tetrahydronaphthalene-2,6-diyl rings, and particularly a plate-like structure thereof.

The liquid crystal component C containing these compounds (III-ai) to (III-cv) has a feature that it can be well mixed with the liquid crystal component A as an essential component, and is particularly useful for preparation according to the purpose of the driving voltage, improvement in temperature dependency and improvement in response characteristics. These compounds are superior in at least one of individual effects and this effect can be obtained even in the case of small content within a range from 0.1 to 30% by weight based on the total amount of the nematic liquid crystal composition of the present invention.

The liquid crystal composition of the present invention, which is obtained by using a liquid crystal component C containing, as a principal component, compounds of the general formulas (III-1) to (III-4) related to the liquid crystal composition of the present invention, or a liquid crystal component C containing compounds of the above-described sub-groups (III-ai) to (III-cv), or a liquid crystal component C capable of having two or more structural features of the same groups (III-ai) to (III-cv) in combination with a liquid crystal component A broadens the operating temperature range of liquid crystal display characteristics due to an improvement in co-solubility and storage at low temperature, thereby making it possible to improve a reduction in driving voltage and a change in temperature and to attain comparatively fast response characteristics for a predetermined driving voltage, thus obtaining more improved electro-optical characteristics of TN-LCDs, STN-LCDs, TFT-LCDs, PDLCs, PN-LCDs or the like using the liquid crystal composition as a constituent material.

The compounds related to the present invention are capable of consciously substituting constituent atoms with isotope atoms thereof. In this case, compounds in which hydrogen atoms are substituted with deuterium atoms are particularly preferred and exhibit preferable effect due to co-solubility, elastic constant, pre-tilt angle and voltage holding ratio. Preferred mode includes compounds in which hydrogen atoms, which are present in the above linking groups or rings, are substituted with deuterium atoms. More preferably, the side chain group is a substituted or non-substituted alkyl or alkenyl group; the ring is substituted or non-substituted 1,4-phenylene, pyrimidine-2,5-diyl, trans-1,4-cyclohexene, trans-1,4-cyclohexenylene, or trans-1,4-dioxane-2,5-diyl; and the linking group is —$CH_2O$—, —$OCH_2$—, —$(CH_2)_2$—, —$(CH_2)_4$—, —CH═CH—$(CH_2)_2$—, —$(CH_2)_2$—CH═CH—, —CH═N—, or —CH═N—N═CH—. Particularly preferred are alkyl group, alkenyl group, 1,4-phenylene, trans-1,4-cyclohexene, —$(CH_2)_2$— and —$(CH_2)_4$—.

The alignment film used in TN-LCDs, STN-LCDs or TFT-LCDs is exclusively a polyimide film and examples thereof include LX1400, SE150, SE610, AL1051, AL3408 and the like. Liquid crystal display characteristics, display quality, reliability and productivity have a close relation with the specification of the alignment film and, for example, pre-tilt angle characteristics are important to the liquid crystal material. The pre-tilt angle must be appropriately adjusted to obtain desired liquid crystal display characteristics and uniform alignment properties. In the case of a large pre-tilt angle, unstable oriented state is liable to occur. In the case of a small pre-tilt angle, it becomes impossible to satisfy sufficient display characteristics.

The present inventors have found that liquid crystal materials are classified into a liquid crystal material having a larger pre-tilt angle and a liquid crystal material having a smaller pre-tilt angle, and also found that the desired liquid crystal display characteristics and uniform alignment properties are attained by applying this classifying technique. This technique can also be applied to the present invention. If the liquid crystal component B contains compounds of the general formulas (II-1) to (II-4), the pre-tilt angle is controlled in the following manner. Larger pre-tilt angle can be obtained by increasing the content of compounds in which $R^1$ is an alkenyl group, $Q^1$ is F, Cl, or —CN, and $Y^1$ and $Y^2$ represent F in the general formula (II-1) and/or compounds in which $R^1$ is an alkenyl group, $Q^1$ is F, Cl, or —CN, and $M^2$ is —$C_2H_4$— or —$C_4H_8$— in the general formula (II-1), while smaller pre-tilt angle can be obtained by increasing the content of compounds in which $R^1$ is an alkenyl group or $C_sH_{2s+1}$—O—$C_tH_{2t}$, $Q^1$ is F, $Y^1$ is F, and $Y^2$ is H in the general formula (II-1) and/or compounds in which $M^2$ is —COO—. Specifically, in the case of compounds in which naphthalene-2,6-diyl ring, decahydronaphthalene-2,6-diyl ring and 1,2,3,4-tetrahydronaphthalene-2,6-diyl ring in the general formulas (I-1) to (I-5) or rings $A^1$ to $A^4$ in the general formulas (I-1) to (I-5) are cyclohexane rings, or rings $B^1$ to $B^4$ in the general formulas (II-1), (II-2) and (II-4) are cyclohexane rings, or rings $C^1$ to $C^4$ in the general formulas (III-1) to (III-4) are cyclohexane ring, naphthalene-2,6-diyl ring, decahydronaphthalene-2,6-diyl ring and 1,2,3,4-tetrahydronaphthalene-2,6-diyl ring, and hydrogen atoms of the rings are substituted with deuterium atoms, it makes possible to adjust the pre-tilt angle within a wide range, though it varies depending on the substitution position.

Use of a large amount of compounds in which hydrogen atoms are substituted with deuterium atoms exerts a noticeable effect of maintaining higher voltage holding ratio, and is suited for display characteristics and production yield of active TFT-LCDs, PDLCs, PN-LCDs or the like. It is considered that such an effect is obtained by providing the liquid crystal compound with properties of heavy water, for example, difference in equilibrium constant and velocity constant of the reaction, low ionic mobility, low solubility of inorganic matter and oxygen and the like. Higher voltage holding ratio can be nearly obtained by incorporating the above-described compounds in the amount within a range from 10 to 40% by weight based on the total amount of the liquid crystal composition.

Generally, the content of each liquid crystal component in the nematic liquid crystal composition of the present invention is as follows. The content of the liquid crystal component A is within a range from 0.1 to 100% by weight, preferably from 0.5 to 90% by weight, and more preferably from 5 to 85% by weight. The content of the liquid crystal component B is within a range from 0 to 99.9% by weight, preferably from 3 to 80% by weight, and more preferably from 5 to 60% by weight. The content of the liquid crystal component C is 85% by weight or less, preferably within a range from 3 to 70% by weight, more preferably from 5 to 70% by weight.

When Using the compounds represented by the general formula (I-1), the content is preferably 15% by weight or less in terms of single substance. If the content is 15% or more, the compounds are preferably composed of two or more kinds of compounds and the content of compounds represented by the general formulas (I-11a) to (I-13ab) is preferably within a range from 5 to 100% by weight based on the liquid crystal component A. Furthermore, when Using the compounds represented by the general formulas (I-11) and (I-12), the content is preferably selected within a rage of 5 to 30% by weight, range of 30 to 50% by weight, range of 50 to 70% by weight, and range of 70 to 100% by weight, based on the liquid crystal component A.

When Using the compounds represented by the general formula (I-2), the content is preferably 15% by weight or less in terms of single substance. If the content is 15% or more, the compounds are preferably composed of two or more kinds of compounds and the content of compounds represented by the general formulas (I-21a) to (I-23jp) is preferably within a range from 5 to 100% by weight based on the liquid crystal component A. Furthermore, when Using the compounds represented by the general formulas (I-21), the content is preferably selected within a rage of 5 to 20% by weight, range of 20 to 60% by weight, and range of 60 to 100% by weight, based on the liquid crystal component A.

When Using the compounds represented by the general formula (I-3), the content is preferably 15% by weight or less in terms of single substance. If the content is 15% or more, the compounds are preferably composed of two or more kinds of compounds and the content of compounds represented by the general formulas (I-31a) to (I-33dz) is preferably within a range from 5 to 100% by weight based on the liquid crystal component A. Furthermore, when Using the compounds represented by the general formulas (I-31) and (I-32), the content is preferably selected within a rage of 5 to 10% by weight, range of 10 to 30% by weight, range of 30 to 50% by weight, and range of 50 to 100% by weight, based on the liquid crystal component A.

When Using the compounds represented by the general formula (I-4), the content is preferably 15% by weight or less in terms of single substance. If the content is 15% or more, the compounds are preferably composed of two or more kinds of compounds and the content of compounds represented by the general formulas (I-41a) to (I-46g) is preferably within a range from 5 to 100% by weight based on the liquid crystal component A. Furthermore, when Using the compounds represented by the general formula (I-41), the content is preferably selected within a rage of 5 to 30% by weight, range of 30 to 50% by weight, range of 50 to 70% by weight, and range of 70 to 100% by weight, based on the liquid crystal component A. Furthermore, when Using the compounds represented by the general formulas (I-42) and (I-43), the content is preferably selected within a rage of 5 to 10% by weight, range of 10 to 25% by weight, range of 25 to 50% by weight, and range of 50 to 100% by weight, based on the liquid crystal component A.

When Using the compounds represented by the general formula (I-5), the content is preferably 15% by weight or less in terms of single substance. If the content is 15% or more, the compounds are preferably composed of two or more kinds of compounds and the content of compounds represented by the general formulas (I-51a) to (I-53ab) is preferably within a range from 5 to 100% by weight based on the liquid crystal component A. Furthermore, when Using the compounds represented by the general formulas (I-51) and (I-52), the content is preferably selected within a rage of 5 to 30% by weight, range of 30 to 50% by weight, range of 50 to 70% by weight, and range of 70 to 100% by weight, based on the liquid crystal component A.

The content of compounds represented by the general formulas (II-1) to (II-4), and specifically compounds represented by the general formulas (II-1a) to (II-4n) is preferably 30% by weight or less, and more preferably 25% by weight or less, in terms of single substance. If the content is 30% or more, the compounds are preferably composed of two or more kinds of compounds and the content is within a rage from 10 to 100% by weight, preferably from 50 to 100% by weight, and more preferably from 75 to 100% by weight, based on the liquid crystal component B. The content of compounds represented by the general formulas (III-1) to (III-4), and specifically compounds represented by the general formulas (III-1a) to (III-4ac) is preferably 30% by weight or less, and more preferably 25% by weight or less, in terms of single substance. If the content is 30% or more, the compounds are preferably composed of two or more kinds of compounds and the content is within a rage from 10 to 100% by weight, preferably from 50 to 100% by weight, and more preferably from 75 to 100% by weight, based on the liquid crystal component C.

High-reliability STN-LCD as well as active STN-LCD, TFT-LCD, PDLC and PN-LCD are preferably composed of compounds free from nitrogen and oxygen atoms. From such a point of view, it is preferred to contain, as the liquid crystal component A, 50 to 100% by weight of compounds in which $Q^1$ is F, Cl, $CF_3$, $OCF_3$, or $OCF_2H$, $X^1$ and $X^2$ represent H, F, Cl, $CF_3$, or $OCF_3$, and $K^1$ to $K^5$ represent a single bond, —CH═CH—, —C≡C—, —$(CH_2)_2$—, —$(CH_2)_4$—, —CH═CH—$(CH_2)_2$—, or —$(CH_2)_2$—CH═CH— in the general formulas (I-1) to (I-5). When using in combination with the liquid crystal component B, it is preferred to contain, as the liquid crystal component B, 50 to 100% by weight of compounds in which $Q^1$ is F, Cl, $CF_3$, $OCF_3$, or $OCF_2H$, $Y^1$ and $Y^2$ represent H, F, Cl, $CF_3$, or $OCF_3$, and $P^1$ to $P^3$ represent a single bond, —CH═CH—, —C≡C—, —$(CH_2)_2$—, —$(CH_2)_4$—, —CH═CH—$(CH_2)_2$—, or —$(CH_2)_2$—CH═CH— in the general formulas (II-1) to (II-4). It is particularly preferred to contain 50 to 100% by weight of compounds selected from the above-described sub-groups (II-ci) to (II-civ).

When Using the compounds of the general formulas (I-2) to (I-4), another preferred mode of the liquid crystal component A includes the following compounds.

(i): Compounds in which $Q^1$ is F, Cl, $CF_3$, $OCF_3$, or $OCF_2H$, $X^1$ is H, Cl, $CF_3$, $OCF_3$, or $OCF_2H$, and $X^2$ is H, Cl, $CF_3$, $OCF_3$, or $OCF_2H$, when Using the compounds of the general formulas (I-2) to (I-4).

(ii): Compounds in which $Q^1$ is F, Cl, $CF_3$, $OCF_3$, or $OCF_2H$, $X^1$ is F, and $X^2$ is Cl, $CF_3$, $OCF_3$, or $OCF_2H$, when Using the compounds of the general formulas (I-2) to (I-4).

(iii): Compounds in which $Q^1$ is F, Cl, $CF_3$, $OCF_3$, or $OCF_2H$, $X^1$ is F, $X^2$ is H or F, and one of $W^1$ to $W^3$ is F, Cl, $CF_3$, $OCF_3$, or $OCF_2H$, when Using the compounds of the general formulas (I-2) to (I-3).

(iv): Compounds in which $Q^1$ is F, Cl, $CF_3$, $OCF_3$, or $OCF_2H$, $X^1$ is F, $X^2$ is H or F, and the decahydronaphthalene-2,6-diyl ring is represented by the formulas (I-74b) to (I-74av), (I-74ce) to (I-74cj) and (I-74cq) to (I-74dm), and more preferably (I-74cg), (I-74cq), (I-74cr) and (I-74ct), when Using the compounds of the general formula (I-4).

(v): When Using the compounds in which $Q^1$ is F, Cl, $CF_3$, $OCF_3$, or $OCF_2H$, $X^1$ is F, and $X^2$ is H or F in the general formulas (I-2) to (I-4), they are used in combination with compounds (i) to (iv) and/or compounds of the general formulas (I-1) and (I-5).

When Using the compounds of the general formulas (II-1) to (II-4), another preferred mode of the liquid crystal component B includes the following compounds.

(vi): Compounds in which $Q^1$ is F, Cl, $CF_3$, $OCF_3$, or $OCF_2H$, $Y^1$ is H, Cl, $CF_3$, $OCF_3$, or $OCF_2H$, and $Y^2$ is H, Cl, $CF_3$, $OCF_3$, or $OCF_2H$, when Using the compounds of the general formulas (II-1) to (II-4).

(vii): Compounds in which $Q^1$ is F, Cl, $CF_3$, $OCF_3$, $OCF_2H$, $Y^1$ is F, and $Y^2$ is Cl, $CF_3$, $OCF_3$, or $OCF_2H$, when Using the compounds of the general formulas (II-1) to (II-4).

(viii): Compounds in which $Q^1$ is F, Cl, $CF_3$, $OCF_3$, or $OCF_2H$, $Y^1$ is F, $Y^2$ is H, and at least one of $W^1$ to $W^4$ is H, F, Cl, $CF_3$, $OCF_3$, or $OCF_2H$, when Using the compounds of the general formulas (II-1) to (II-4).

(ix): Compounds in which $Q^1$ is F, Cl, $CF_3$, $OCF_3$, or $OCF_2H$, $Y^1$ and $Y^2$ represent F, and at least one of $W^1$ to $W^4$ is Cl, $CF_3$, $OCF_3$, or $OCF_2H$, when Using the compounds of the general formulas (II-1) to (II-4).

(x): When Using the compounds in which $Q^1$ is F, Cl, $CF_3$, $OCF_3$, or $OCF_2H$, and $Y^2$ and $Y^2$ represent F in compounds of the general formulas (II-1) to (II-4), they are used in combination with compounds (i) to (ix) and/or compounds of the general formulas (I-1) and (I-5).

Furthermore, another preferred mode of the liquid crystal component A or liquid crystal component B will be described below.

(xi): Combination with compounds in which $Q^1$ is F, Cl, $CF_3$, $OCF_3$, or $OCF_2H$, $X^1$ is F, Cl, $CF_3$, $OCF_3$, or $OCF_2H$, and $X^2$ is H, F, Cl, $CF_3$, $OCF_3$, or $OCF_2H$ in the general formulas (I-2) to (I-4) when Using the compounds in which $Q^1$ is F, Cl, $CF_3$, $OCF_3$, or $OCF_2H$, and $X^1$ and $X^2$ represent H in the general formulas (I-2) to (I-4).

(xii): Combination with compounds in which $Q^1$ is F, Cl, $CF_3$, $OCF_3$, or $OCF_2H$, $Y^1$ is H, F, Cl, $CF_3$, $OCF_3$, or $OCF_2H$, and $Y^2$ is H, F, Cl, $CF_3$, $OCF_3$, or $OCF_2H$ in the general formulas (II-1) to (II-4) when Using the compounds in which $Q^1$ is F, Cl, $CF_3$, $OCF_3$, or $OCF_2H$, and $X^1$ and $X^2$ represent H in the general formulas (I-2) to (I-4).

(xiii): Combination with compounds in which $Q^1$ is F, Cl, $CF_3$, $OCF_3$, or $OCF_2H$, $X^1$ is F, and $X^2$ is F, Cl, $CF_3$, $OCF_3$, or $OCF_2H$ in the general formulas (I-2) to (I-4) when Using the compounds in which $Q^1$ is F, Cl, $CF_3$, $OCF_3$, or $OCF_2H$, $X^1$ is F, and $X^2$ is H, Cl, $CF_3$, $OCF_3$, or $OCF_2H$ in the general formulas (I-2) to (I-4). In this case, it is preferable to contain two to twenty kinds of compounds of the general formulas (I-2) to (I-4).

(xiv): Combination with compounds in which $Q^1$ is F, Cl, $CF_3$, $OCF_3$, or $OCF_2H$, $X^1$ is F, and $X^2$ is H, Cl, $CF_3$, $OCF_3$, or $OCF_2H$ in the general formulas (II-1) to (II-4) when Using the compounds in which $Q^1$ is F, Cl, $CF_3$, $OCF_3$, or $OCF_2H$, $X^1$ is F, and $X^2$ is H, Cl, $CF_3$, $OCF_3$, or $OCF_2H$ in the general formulas (I-2) to (I-4).

(xv): Combination with compounds in which $Q^1$ is F, Cl, $CF_3$, $OCF_3$, or $OCF_2H$, $Y^1$ is F, and $Y^2$ is F, Cl, $CF_3$, $OCF_3$, or $OCF_2H$ in the general formulas (II-1) to (II-4) when Using the compounds in which $Q^1$ is F, Cl, $CF_3$, $OCF_3$, or $OCF_2H$, $X^1$ is F, and $X^2$ is H, Cl, $CF_3$, $OCF_3$, or $OCF_2H$ in the general formulas (I-2) to (I-4).

(xvi): Combination with compounds in which $Q^1$ is F, Cl, $CF_3$, $OCF_3$, or $OCF_2H$, $Y^1$ is H, Cl, $CF_3$, $OCF_3$, or $OCF_2H$, and $Y^2$ is H, F, Cl, $CF_3$, $OCF_3$, or $OCF_2H$ in the general formulas (II-1) to (II-4) when Using the compounds in which $Q^1$ is F, Cl, $CF_3$, $OCF_3$, or $OCF_2H$, $X^1$ is F, and $X^2$ is H, Cl, $CF_3$, $OCF_3$, or $OCF_2H$ in the general formulas (I-2) to (I-4). In this case, it is preferable to contain two to twenty kinds of compounds of the general formulas (I-2) to (I-4).

(xvii): Combination with compounds in which $Q^1$ is F, Cl, $CF_3$, $OCF_3$, or $OCF_2H$, $Y^1$ is F, and $Y^2$ is F, Cl, $CF_3$, $OCF_3$, or $OCF_2H$ in the general formulas (II-1) to (II-4) when Using the compounds in which $Q^1$ is F, Cl, $CF_3$, $OCF_3$, or $OCF_2H$, $X^1$ is F, and $X^2$ is F, Cl, $CF_3$, $OCF_3$, or $OCF_2H$ in the general formulas (I-2) to (I-4). In this case, it is preferable to contain two to twenty kinds of compounds of the general formulas (I-2) to (I-4).

The liquid crystal component A and/or liquid crystal component B of the present invention make it possible to obtain a nematic liquid crystal composition characterized by satisfying one, two, or three or more conditions among (i) to (xvii) according to the desired purposes. Such a liquid crystal composition containing such a liquid crystal composition of the present invention broadens the operating temperature range of liquid crystal display characteristics due to an improvement in co-solubility and storage at low temperature, thereby making it possible to improve a reduction in driving voltage and a change in temperature and to attain comparatively fast response characteristics for a predetermined driving voltage, thus obtaining more improved electro-optical characteristics of high-reliability TN-LCD as well as active STN-LCD, TFT-LCD, PDLC and PN-LCD using the liquid crystal composition as a constituent material.

In the case of high-reliability TN-LCD, the sum total of the liquid crystal component A (compounds in which $Q^1$ is F, Cl, $CF_3$, $OCF_3$, or $OCF_2H$) and the liquid crystal component B (compounds in which $Q^1$ is F, Cl, $CF_3$, $OCF_3$, or $OCF_2H$) is preferably within a range from 10 to 100% by weight, more preferably from 30 to 100% by weight, and still more preferably from 60 to 100% by weight. In this case, a relative mixing ratio of the liquid crystal component A to the liquid crystal component B can be selected from a range of 100:0 to 0.1:99.9, and preferably from a range of 100:0 to 5:95, and more preferably selected from a range of 100:0 to 10:90. In the case of active STN-LCD, TFT-LCD, PDLC and PN-LCD, the sum total of the liquid crystal component A (compounds in which $Q^1$ is F, Cl, $CF_3$, $OCF_3$, or $OCF_2H$) and the liquid crystal component B (compounds in which $Q^1$ is F, Cl, $CF_3$, $OCF_3$, or $OCF_2H$) is preferably within a range from 20 to 100% by weight, more preferably from 40 to 100% by weight, and still more preferably from 60 to 100% by weight. In this case, a relative mixing ratio of the liquid crystal component A to the liquid crystal component B can be selected from a range of 100:0 to 5:95, and is more preferably selected from a range of 100:0 to 90:10, range of 90:1° to 70:30, range of 70:3° to 40:60, range of 40:60 to 20:80 and range of 20:80 to 5:95, according to the purposes.

Active STN-LCD is developed to obtain higher contrast at a wide viewing angle and to improve the response time of last transition, and enables STN-LCD to perform active driving using the technique of TFT and MIM.

The liquid crystal composition of the present invention may contain conventional nematic liquid crystals, smectic liquid crystals and chloresteric crystals recognized as liquid crystal compounds, in addition to compounds represented by the general formulas (I-1) to (III-4), in order to improve characteristics of the liquid crystal composition. For example, the liquid crystal composition contain one, or two more kinds of core-structure compounds having four six-membered rings, the liquid crystal phase-isotropic liquid phase transition temperature of said compounds being 100° C. or higher. However, since characteristics of the nematic liquid crystal composition are deteriorated by using a large amount of these compounds, the amount is limited according to required characteristics of the resulting nematic liquid crystal composition.

Preferred compounds are compounds in which $p^1$ in the general formulas (II-1) and (II-2) is 2, compounds in which $p^2+p^3$ in the general formula (III-4) is 2, compounds in which $m^1$ in the general formulas (III-1) and (III-3) is 2, and compounds in which $m^2+m^3$ in the general formula (III-4) is 2. In this case, rings $B^1$ and $B^3$, rings $C^1$ and $C^3$, and linking groups $P^1$, $P^2$, and $M^1$ may be independently the same or different.

Crystal phase or smectic phase-nematic phase transition temperature should be 0° C. or lower, preferably −10° C. or lower, more preferably −20° C. or lower and most preferably −30° C. or lower. The nematic phase-isotropic liquid phase transition temperature should be 50° C. or higher, preferably 60° C. or higher, more preferably 70° C. or higher and most preferably within a range from 80° C. to 180° C. The dielectric constant anisotropy of the liquid crystal composition according to the present invention may have a value not less than 1, but is preferably within a range from 2 to 40, while it is preferably within a range from 2 to 8 when high speed response is required and preferably within a range from 7 to 3° when a lower driving voltage is required. Lower or medium birefringent index is preferably within a range from 0.02 to 0.18, and higher birefringent index is preferably within a range from 0.18 to 0.40. Such characteristics of the nematic liquid crystal composition are useful for active matrix, twisted nematic or super twisted nematic liquid crystal display device.

Distance d between the substrates in TN-LCD, STN-LCD and TFT-LCD is preferably from 1 to 12 μm, more preferably from 1 to 10 μm and most preferably from 1.5 to 7 μm. Product of the distance d and the birefringent index Δn is preferably from 0.2 to 5 μm, more preferably from 0.3 to 1.6 μm, and most preferably about 0.5 μm, from 0.7 to 1.0 μm or about 1.2 μm.

In the case of PDLC or PN-LCD, the product described above is preferably from 1 to 100 μm, more preferably from 3 to 50 μm, and most preferably from 4 to 14 μm.

When faster response characteristic for the magnitude of the driving voltage is desired, the liquid crystal composition of the present invention may be constituted as follows. For a medium driving voltage, the dielectric constant anisotropy of the liquid crystal composition according to the present invention is from 3 to 15, and viscosity at 20° C. is preferably within a range from 8 to 2° cp. In this case, viscosity of only the liquid crystal component C is preferably 25 cp or lower, more preferably 15 cp or lower, and most preferably 10 cp or lower. For a particularly low driving voltage, the dielectric constant anisotropy of the liquid crystal composition according to the present invention is preferably within a range from 15 to 30, and more preferably within a range from 18 to 28.

The nematic liquid crystal composition described above is useful for the use in TN-LCD, STN-LCD and TFT-LCD that have high-speed response characteristic, useful for a liquid crystal display element that is capable of providing color display by means of the birefringent property of a liquid crystal and a retardation plate without using color filters, and can be used in a liquid crystal display element of transmissive type or reflective type. This liquid crystal display element has substrates that have transparent electrode layer, with at least one thereof being transparent, wherein molecules of the nematic liquid crystal composition are disposed in a twisted orientation between the substrates. The twist angle may be selected within a range from 30 to 360° in accordance to the purpose, preferably selected within a range from 90 to 270°, and most preferably selected within a range from 45 to 135° or from 18° to 260°. For this purpose, the liquid crystal composition of the present invention may include a compound that has an optically active group which causes the induced helical pitch p to fall within a range from 0.5 to 1000 μm. Such compounds include cholesteric derivative, chiral nematic and ferroelectric liquid crystals. More specifically, compounds in which $R^1$ in general formulas (I-1) to (I-5), $R^1$ in general formulas (II-1) to (II-4), and $R^2$ and $R^3$ in general formulas (III-1) to (III-4) have optically active groups are preferably used.

More preferred mode of the general formulas (I-6), (III-51) and (III-52) as the side chain group includes, for example, compounds represented by the general formulas (IV-1a) to (IV-1bt) described below.

$R^1-$ (1-6)

$R^2-$ (III-51)

$R^3-$ (III-52)

$-\underset{CH_3}{\overset{*}{C}H}CH_3$ (IV-1a)

$-\underset{CH_3}{\overset{*}{C}H}C_2H_5$ (IV-1b)

$-\underset{CH_3}{\overset{*}{C}H}C_3H_7$ (IV-1c)

$-\underset{CH_3}{\overset{*}{C}H}C_4H_9$ (IV-1d)

$-\underset{CH_3}{\overset{*}{C}H}C_5H_{11}$ (IV-1e)

$-\underset{CH_3}{\overset{*}{C}H}C_6H_{13}$ (IV-1f)

$-CH_2\underset{CH_3}{\overset{*}{C}H}CH_3$ (IV-1g)

$-CH_2\underset{CH_3}{\overset{*}{C}H}C_2H_5$ (IV-1h)

$-CH_2\underset{CH_3}{\overset{*}{C}H}C_3H_7$ (IV-1i)

$-CH_2\underset{CH_3}{\overset{*}{C}H}C_4H_9$ (IV-1j)

$-CH_2\underset{CH_3}{\overset{*}{C}H}C_5H_{11}$ (IV-1k)

$-CH_2\underset{CH_3}{\overset{*}{C}H}C_6H_{13}$ (IV-1l)

$-C_2H_4\underset{CH_3}{\overset{*}{C}H}CH_3$ (IV-1m)

$-C_2H_4\underset{CH_3}{\overset{*}{C}H}C_2H_5$ (IV-1n)

-continued $-C_2H_4\underset{CH_3}{\overset{*}{C}H}C_3H_7$ (IV-1o)

$-C_2H_4\underset{CH_3}{\overset{*}{C}H}C_4H_9$ (IV-1p)

$-C_2H_4\underset{CH_3}{\overset{*}{C}H}C_5H_{11}$ (IV-1q)

$-C_2H_4\underset{CH_3}{\overset{*}{C}H}C_6H_{13}$ (IV-1r)

$-O\underset{CH_3}{\overset{*}{C}H}CH_3$ (IV-1s)

$-O\underset{CH_3}{\overset{*}{C}H}C_2H_5$ (IV-1t)

$-O\underset{CH_3}{\overset{*}{C}H}C_3H_7$ (IV-1u)

$-O\underset{CH_3}{\overset{*}{C}H}C_4H_9$ (IV-1v)

$-O\underset{CH_3}{\overset{*}{C}H}C_5H_{11}$ (IV-1w)

$-O\underset{CH_3}{\overset{*}{C}H}C_6H_{13}$ (IV-1x)

$-OCH_2\underset{CH_3}{\overset{*}{C}H}CH_3$ (IV-1y)

$-OCH_2\underset{CH_3}{\overset{*}{C}H}C_2H_5$ (IV-1z)

$-OCH_2\underset{CH_3}{\overset{*}{C}H}C_3H_7$ (IV-1aa)

$-OCH_2\underset{CH_3}{\overset{*}{C}H}C_4H_9$ (IV-1ab)

$-OCH_2\underset{CH_3}{\overset{*}{C}H}C_5H_{11}$ (IV-1ac)

$-OCH_2\underset{CH_3}{\overset{*}{C}H}C_6H_{13}$ (IV-1ad)

$-OC_2H_4\underset{CH_3}{\overset{*}{C}H}CH_3$ (IV-1ae)

-continued (IV-1af) $-OC_2H_4\overset{*}{C}H(CH_3)C_2H_5$ (IV-1ag) $-OC_2H_4\overset{*}{C}H(CH_3)C_3H_7$ (IV-1ah) $-OC_2H_4\overset{*}{C}H(CH_3)C_4H_9$ (IV-1ai) $-OC_2H_4\overset{*}{C}H(CH_3)C_5H_{11}$ (IV-1aj) $-OC_2H_4\overset{*}{C}H(CH_3)C_6H_{13}$ (IV-1ak) $-COO\overset{*}{C}H(CH_3)CH_3$ (IV-1al) $-COO\overset{*}{C}H(CH_3)C_2H_5$ (IV-1am) $-COO\overset{*}{C}H(CH_3)C_3H_7$ (IV-1an) $-COO\overset{*}{C}H(CH_3)C_4H_9$ (IV-1ao) $-COO\overset{*}{C}H(CH_3)C_5H_{11}$ (IV-1ap) $-COO\overset{*}{C}H(CH_3)C_6H_{13}$ (IV-1aq) $-COOCH_2\overset{*}{C}H(CH_3)CH_3$ (IV-1ar) $-COOCH_2\overset{*}{C}H(CH_3)C_2H_5$ (IV-1as) $-COOCH_2\overset{*}{C}H(CH_3)C_3H_7$ (IV-1at) $-COOCH_2\overset{*}{C}H(CH_3)C_4H_9$ (IV-1au) $-COOCH_2\overset{*}{C}H(CH_3)C_5H_{11}$ (IV-1av) $-COOCH_2\overset{*}{C}H(CH_3)C_6H_{13}$ -continued (IV-1aw) $-COOC_2H_4\overset{*}{C}H(CH_3)CH_3$ (IV-1ax) $-COOC_2H_4\overset{*}{C}H(CH_3)C_2H_5$ (IV-1ay) $-COOC_2H_4\overset{*}{C}H(CH_3)C_3H_7$ (IV-1az) $-COOC_2H_4\overset{*}{C}H(CH_3)C_4H_9$ (IV-1ba) $-COOC_2H_4\overset{*}{C}H(CH_3)C_5H_{11}$ (IV-1bb) $-COOC_2H_4\overset{*}{C}H(CH_3)C_6H_{13}$ (IV-1bc) $-OCOO\overset{*}{C}H(CH_3)CH_3$ (IV-1bd) $-OCOO\overset{*}{C}H(CH_3)C_2H_5$ (IV-1be) $-OCOO\overset{*}{C}H(CH_3)C_3H_7$ (IV-1bf) $-OCOO\overset{*}{C}H(CH_3)C_4H_9$ (IV-1bg) $-OCOO\overset{*}{C}H(CH_3)C_5H_{11}$ (IV-1bh) $-OCOO\overset{*}{C}H(CH_3)C_6H_{13}$ (IV-1bi) $-OCOOCH_2\overset{*}{C}H(CH_3)CH_3$ (IV-1bj) $-OCOOCH_2\overset{*}{C}H(CH_3)C_2H_5$ (IV-1bk) $-OCOOCH_2\overset{*}{C}H(CH_3)C_3H_7$ (IV-1bl) $-OCOOCH_2\overset{*}{C}H(CH_3)C_4H_9$ (IV-1bm) $-OCOOCH_2\overset{*}{C}H(CH_3)C_5H_{11}$ -continued (IV-1bn)

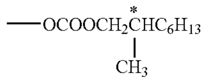

(IV-1bo)

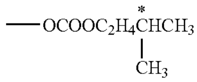

(IV-1bp)

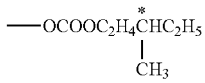

(IV-1bq)

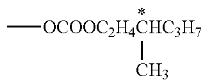

(IV-1br)

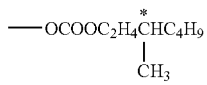

(IV-1bs)

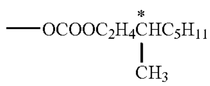

(IV-1bt)

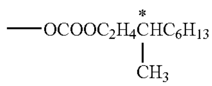

Compounds in which $K^1$ to $K^5$ in general formulas (I-1) to (I-5), $P^l$ to $P^3$ in general formulas (II-1) to (II-4), and $M^1$ to $M^3$ in general formulas (III-1) to (III-4) have optically active groups are preferred. More preferred mode as the linking group includes, for example, compounds represented by the general formulas (IV-2a) to (IV-2j) described below.

(IV-2a)

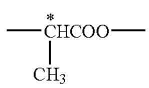

(IV-2b)

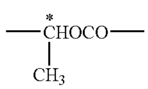

(IV-2d)

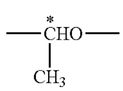

(IV-2e)

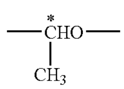

(IV-2f)

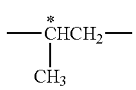

(IV-2g)

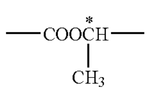

(IV-2h)

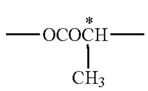

-continued (IV-2h)

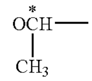

(IV-2i)

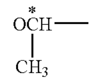

(IV-2j)

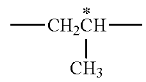

Typically, cholesteryl nonanate, C-15, CB-15 and S-811 are preferably used. More specifically, compounds represented by the general formulas (IV-3a) to (IV-3ab) are used.

(IV-3a)

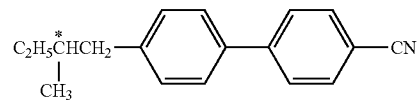

(IV-3b)

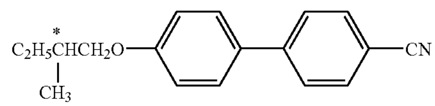

(IV-3c)

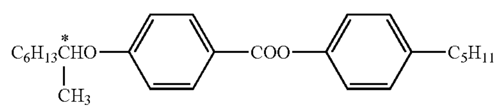

(IV-3d)

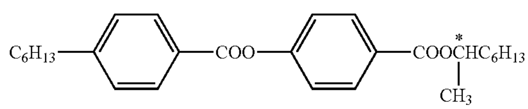

(IV-3e)

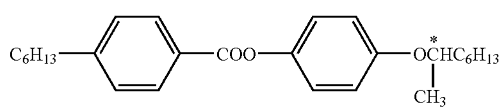

(IV-3f)

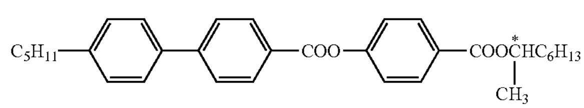

(IV-3g)

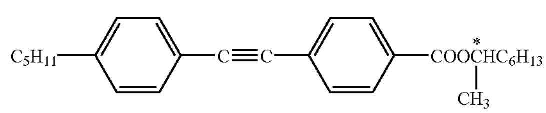

(IV-3h)

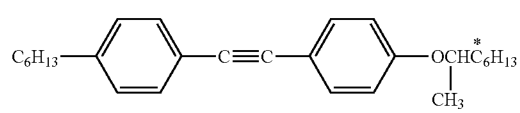

(IV-3i)

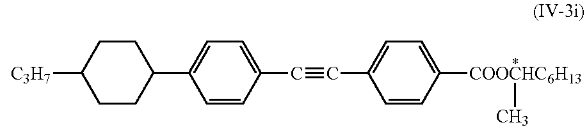

-continued (IV-3j)

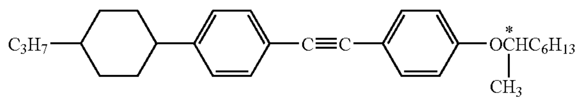

(IV-3k)

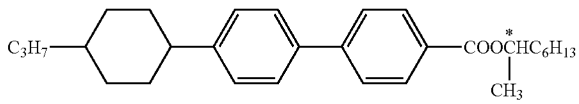

(IV-3l)

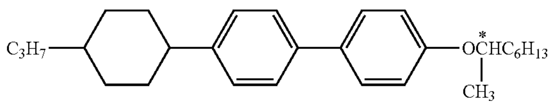

(IV-3m)

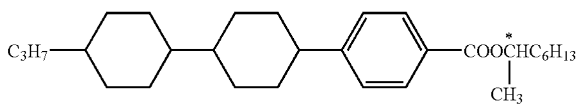

(IV-3n)

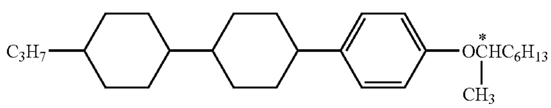

(IV-3o)

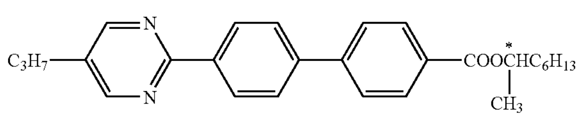

(IV-3p)

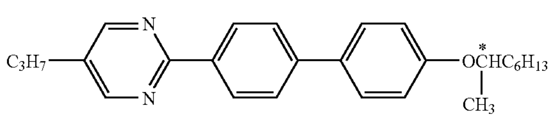

(IV-3q)

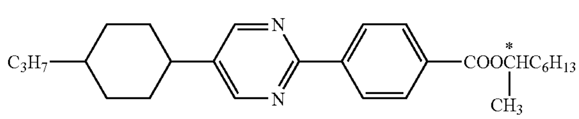

(IV-3r)

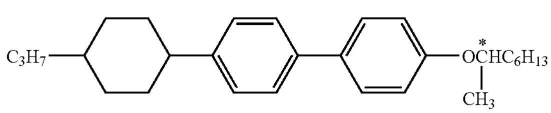

(IV-3s)

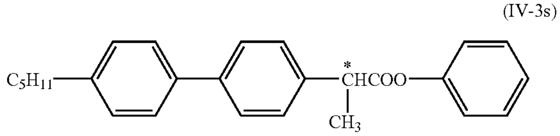

(IV-3t)

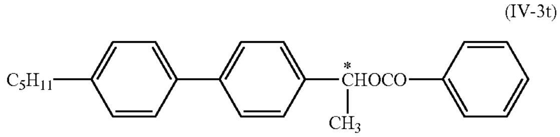

(IV-3u)

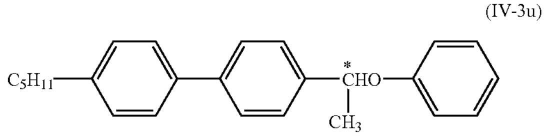

-continued (IV-3v)

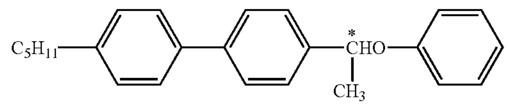

(IV-3w)

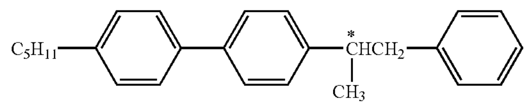

(IV-3x)

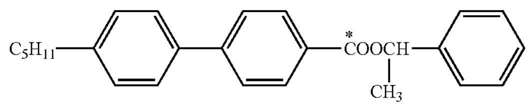

(IV-3y)

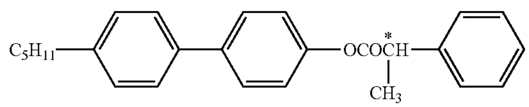

(IV-3z)

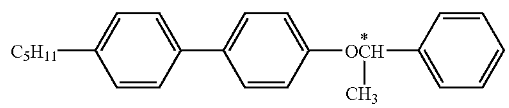

(IV-3aa)

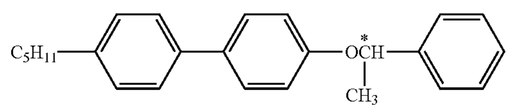

(IV-3ab)

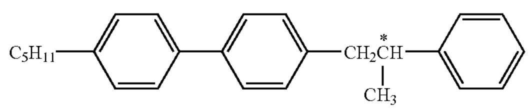

Specific mode of use will now be described below. While materials of which induced helical pitch increases and those of which induced helical pitch decreases as the temperature rises are known, one, or two or more kinds of materials of either of these kinds may be used, or one, or two or more kinds of materials of each of these kinds may be used in combination. The amount is preferably within a range from 0.001 to 10% by weight, more preferably within a range from 0.05 to 3% by weight and most preferably within a range from 0.1 to 3% by weight. It needs not to say that the amount is determined to obtain a predetermined induced helical pitch with the twist angle θ and the distance d between the substrates. In the TN-LCD, STN-LCD and TFT-LCD, for example, ratio d/p of the distance d between the substrates to the induced helical pitch p can be set within a range from 0.001 to 24, while the ratio is preferably within a range from 0.01 to 12, more preferably within a range from 0.1 to 2, even more preferably within a range from 0.1 to 1.5, further more preferably within a range from 0.1 to 1, and most more preferably within a range from 0.1 to 0.8.

Pre-tilt angle obtained from an oriented film that is provided on the transparent electrode substrate is preferably from 1° to 20°. When the twist angle is within a range from 30° to 100°, the pre-tile angle is preferably from 1° to 4°. When the twist angle is within a range from 100° to 180°, the pre-tile angle is preferably from 2° to 6°. When the twist angle is within a range from 180° to 260°, the pre-tile angle is preferably from 3° to 12°. When the twist angle is within a range from 260° to 360°, the pre-tile angle is preferably from 6° to 20°.

For specific applications, the pre-tile angle within a range from 1° to 6° is preferable for the TN-LCD, the pre-tile angle within a range from 2° to 12° is preferable for the STN-LCD, the pre-tile angle within a range from 2° to 12° is preferable for the TFT-LCD, and the pre-tile angle within a range from 0° to 3° is preferable for the TFT-LCD of IPS mode.

The present inventors have found out that favorable display characteristics can be achieved also with a light scattering type liquid crystal display wherein the liquid crystal composition has a light modulation layer held between two transparent substrates, with at least one of which being transparent, having transparent electrode layers, and the light modulation layer includes a liquid crystal material and a transparent solid substance. The present inventors showed, on Japanese Unexamined Patent Application, First Publication No. Hei 6-222320, that the physical properties of a liquid crystal material and the display characteristics of the liquid crystal can be related by the following equation (V).

$$Vth \propto \frac{d}{\langle r\rangle + {}^{1}Kii/A}\left(\frac{{}^{2}Kii}{\Delta\varepsilon}\right)^{1/2} \qquad \text{(V)}$$

where Vth is the threshold voltage, $^{1}Kii$ and $^{2}Kii$ are elastic constants with ii being 11, 22 or 33, $\Delta\in$ is the dielectric constant anisotropy, <r> is the mean void distance in the interface of the transparent solid substance, A is the anchoring energy of the transparent solid substance and d is the distance between the substrates having the transparent electrodes.

This equation means that the restricting force of the interface of the transparent solid substance exerted on the liquid crystal molecules varies according to the ratio of the elastic constant $^{1}Kii$ and the anchoring energy A, and particularly shows that the effect thereof is to effectively expand the distance by the amount of $^{1}Kii/A$ over the actual mean void distance <r>, namely to effectively decrease the driving voltage. This relation can also be utilized in the present invention. Specifically, when the transparent solid substance is formed from a polymerizable compound that includes difunctional monomer and monofunctional monomer which serve as polymer-forming compounds, the transparent solid substance takes a more uniform structure thereby making it possible to manipulate the property of the interface with the liquid crystal material, in the process of forming the transparent solid substance from the polymer-forming compounds. In the liquid crystal composition according to the present invention, one or plural characteristics among clouding characteristics, response characteristics, hysteresis, sharpness and driving voltage, or the temperature dependency of these characteristics can be improved by the liquid crystal component A that consists of a compound characterized by such a molecular structure having non-substituted or substituted naphthalene-2,6-diyl ring, decahydronaphthalene-2,6-diyl ring, 1,2,3,4-tetrahydronaphthalene-2,6-diyl ring as a partial structure thereof.

The liquid crystal material used in the present invention is expected to be useful also for a display apparatus wherein a transparent solid substance interposed between the two substrates that have transparent electrode layers includes liquid crystal droplets, which comprise a liquid crystal material and is contained in microcapsules, being scattered therein. The transparent solid substance interposed between the two substrates may be fibers or particles scattered or a film containing droplets of the liquid material dispersed therein, but more preferably has a three-dimensional network structure. While it is preferable that the liquid crystal material forms a continuous layer, it is important to form random state of the liquid crystal material in order to form an optical interface and achieve scattering of light. When the average size of the three-dimensional network structure formed from the transparent solid substance is too greater or smaller than the wavelength of light, scattering of light tends to be weaker. Thus the average size is preferably from 0.2 to 2 μm. Thickness of the light modulation layer is preferably from 2 to 30 μm, and more preferably from 5 to 20 μm depending on the application.

The light scattering type liquid crystal display of the present invention that is made as described above achieves less temperature-dependent drive characteristics and thereby satisfies the requirements for the active matrix display. The liquid crystal display of the present invention can also be used, for example, in a projection display apparatus and personal digital assistance of direct view type.

The present invention has been described by way of liquid crystal materials which are useful for light scattering type liquid crystal display, but also provides compounds and nematic liquid crystal compositions described below as another liquid crystal materials. That is, they are compounds $R^1$ in the general formulas (I-1) to (I-5), $R^1$ in the general formulas (II-1) to (II-4), and $R^2$ and $R^3$ in the general formulas (III-1) to (III-4) are photocurable a-substituted acryloyl groups, and liquid crystal compositions containing the same. More preferred embodiment of the general formulas (I-6), (III-51) and (III-52) as the photocurable side chain group includes, for example, compounds represented by the general formulas (IV-4a) to (IV-4av) described below.

$CH_2{=}CH_2COO—$ (IV-4a)

$CH_2{=}CH_2COOCH_2—$ (IV-4b)

$CH_2{=}CH_2COOC_2H_4—$ (IV-4c)

$CH_2{=}CH_2COOC_3H_6—$ (IV-4d)

$CH_2{=}CH_2COOC_4H_8—$ (IV-4e)

$CH_2{=}CH_2COOC_5H_{10}—$ (IV-4f)

$CH_2{=}CH_2COOC_6H_{12}—$ (IV-4g)

$CH_2{=}CH_2COOC_7H_{14}—$ (IV-4h)

$CH_2{=}CH_2OCO—$ (IV-4i)

$CH_2{=}CH_2OCOCH_2—$ (IV-4j)

$CH_2{=}CH_2OCOC_2H_4—$ (IV-4k)

$CH_2{=}CH_2OCOC_3H_6—$ (IV-4l)

$CH_2{=}CH_2OCOC_4H_8—$ (IV-4m)

$CH_2{=}CH_2OCOC_5H_{10}—$ (IV-4n)

$CH_2{=}CH_2OCOC_6H_{12}—$ (IV-4o)

$CH_2{=}CH_2OCOC_7H_{14}—$ (IV-4p)

-continued (IV-4q) $CH_2{=}CH_2O-$ (IV-4r) $CH_2{=}CH_2OCH_2-$ (IV-4s) $CH_2{=}CH_2OC_2H_4-$ (IV-4t) $CH_2{=}CH_2OC_3H_6-$ (IV-4u) $CH_2{=}CH_2OC_4H_8-$ (IV-4v) $CH_2{=}CH_2OC_5H_{10}-$ (IV-4w) $CH_2{=}CH_2OC_6H_{12}-$ (IV-4x) $CH_2{=}CH_2OC_7H_{14}-$ (IV-4y) $CH_2{=}\overset{CH_3}{C}HCOO-$ (IV-4z) $CH_2{=}\overset{CH_3}{C}HCOOCH_2-$ (IV-4aa) $CH_2{=}\overset{CH_3}{C}HCOOC_2H_4-$ (IV-4ab) $CH_2{=}\overset{CH_3}{C}HCOOC_3H_6-$ (IV-4ac) $CH_2{=}\overset{CH_3}{C}HCOOC_4H_8-$ (IV-4ad) $CH_2{=}\overset{CH_3}{C}HCOOC_5H_{10}-$ (IV-4ae) $CH_2{=}\overset{CH_3}{C}HCOOC_6H_{12}-$ (IV-4af) $CH_2{=}\overset{CH_3}{C}HCOOC_7H_{14}-$ (IV-4ag) $CH_2{=}\overset{CH_3}{C}HOCO-$ (IV-4ah) $CH_2{=}\overset{CH_3}{C}HOCOCH_2-$ (IV-4ai) $CH_2{=}\overset{CH_3}{C}HOCOC_2H_4-$ (IV-4aj) $CH_2{=}\overset{CH_3}{C}HOCOC_3H_6-$ (IV-4ak) $CH_2{=}\overset{CH_3}{C}HOCOC_4H_8-$ (IV-4al) $CH_2{=}\overset{CH_3}{C}HOCOC_5H_{10}-$ (IV-4am) $CH_2{=}\overset{CH_3}{C}HOCOC_6H_{12}-$ (IV-4an) $CH_2{=}\overset{CH_3}{C}HOCOC_7H_{14}-$ -continued (IV-4ao) $CH_2{=}\overset{CH_3}{C}HO-$ (IV-4ap) $CH_2{=}\overset{CH_3}{C}HOCH_2-$ (IV-4aq) $CH_2{=}\overset{CH_3}{C}HOC_2H_4-$ (IV-4ar) $CH_2{=}\overset{CH_3}{C}HOC_3H_6-$ (IV-4as) $CH_2{=}\overset{CH_3}{C}HOC_4H_8-$ (IV-4at) $CH_2{=}\overset{CH_3}{C}HOC_5H_{10}-$ (IV-4au) $CH_2{=}\overset{CH_3}{C}HOC_6H_{12}-$ (IV-4av) $CH_2{=}\overset{CH_3}{C}HOC_7H_{14}-$ Preferable interface of the transparent solid substance can be obtained by incorporating the compounds described above. The content of compounds having side chain groups of the general formulas (IV-4a) to (IV-4av) can be selected from a range from 0.01 to 100%.

The liquid crystal composition of the present invention can also be used as a gest host (GH) liquid crystal composition by the addition of two-color pigments such as anthraquinone pigment, azo pigment, azoxy pigment, azomethine pigment, mellocyanine pigment, quinophthalane pigment, tetrazine pigment and the like, in addition to the polymer diffusion type liquid crystal. It can also be used as a liquid crystal composition of a phase transition type display and white tailor type display. Furthermore, it can be used as a liquid crystal composition of a birefringent index control type display (ECB) and dynamic scattering type display (DS).

Alternatively, the liquid crystal composition of the present invention can be added for the purpose of adjusting phase series of a ferroelectric liquid crystal. The liquid crystal composition can also be used as a liquid crystal composition for polymer stabilization type liquid crystal display. In this case, the above compounds or compositions having the side chain groups can be used.

Alternatively, it is possible to use as optical members such as phase difference film, optical lens and the like, using the above compounds or compositions having the side chain groups as a UV curable liquid crystal. It is also possible to apply to liquid crystal display related members such as deflecting plate, alignment film and the like. The liquid crystal composition of the present invention can be obtained by incorporating the liquid crystal components A, B and C described I detail above. Preferred examples are nematic liquid crystals (1-01) to (1-23) described below, but the present invention is not limited by these examples. Among these, for example, nematic liquid crystal compositions (1-01), (1-03) to (1-07), (1-20), (1-21), (1-22) and (1-23) can be used for TN-LCD, nematic liquid crystal compositions (1-01), (1-02), (1-08), (1-10) to (1-15), (1-17), (1-18), (1-22)

and (1-23) can be used for STN-LCD, nematic liquid crystal compositions (1-06), (1-09), (1-16) and (1-20) to (1-22) can be used for TFT-LCD, and nematic liquid crystal compositions (1-09), (1-10) and (1-23) can be used for PDLC and PN-LCD. One or plural kinds of these compounds (1-0101) to (1-2311) can be used in place of compounds represented by the general formulas (I-1) to (III-4), more specifically compounds having the structures of the general formulas (I-11a) to (I-53ab) in which the side chain groups are (I-6a) to (I-6bc) and the partial structures of the polar group are represented by the general formulas (I-71a) to (I-73bt), compounds having the structures of the general formulas (II-1a) to (II-4n) in which the side chain groups are (I-6a) to (I-6bc) and the partial structures of the polar group are represented by the general formulas (II-5a) to (II-5r), and compounds having the structures of the general formulas (III-1a) to (III-4ac) in which the side chain groups are (III-5a) to (III-5bf), according to the desired purposes and applications.

Examples of preferred composition: nematic liquid crystal composition (1-01)

(1-0101) 10 wt %

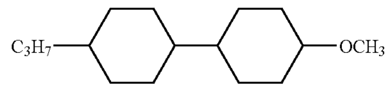

(1-0102) 10 wt %

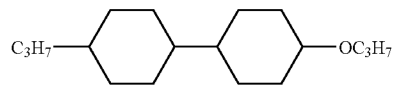

(1-0103) 5 wt %

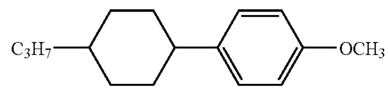

(1-0104) 5 wt %

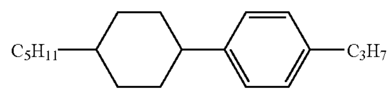

(1-0105) 5 wt %

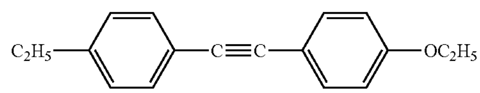

(1-0106) 5 wt %

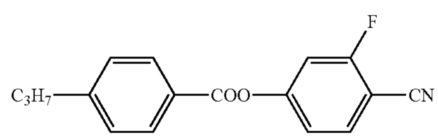

(1-0107) 12 wt %

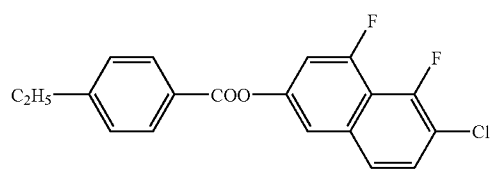

(1-0108) 10 wt %

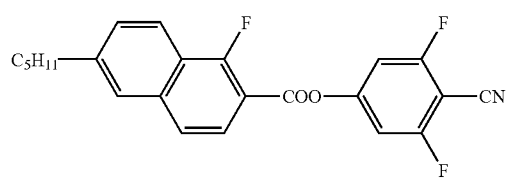

(1-0109) 8 wt %

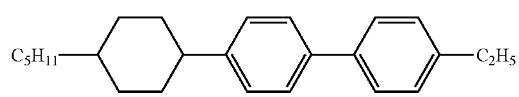

(1-0110) 10 wt %

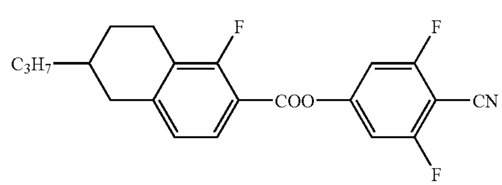

-continued
| | | |
|---|---|---|
| (1-0111) | 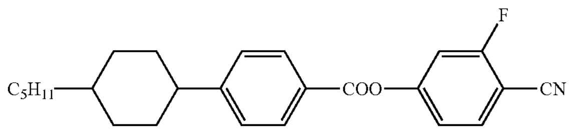 | 5 wt % |
| (1-0112) | 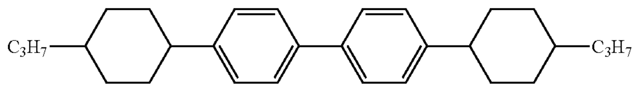 | 5 wt % |
| (1-0113) | 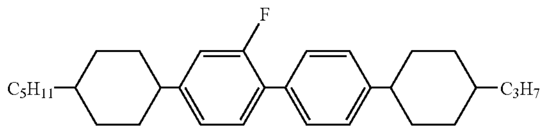 | 5 wt % |
| (1-0114) | 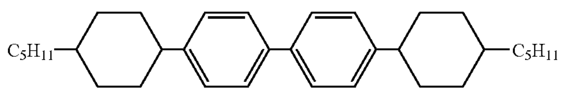 | 5 wt % |
Examples of preferred composition: nematic liquid crystal composition (1-02)
| | | |
|---|---|---|
| (1-0201) | 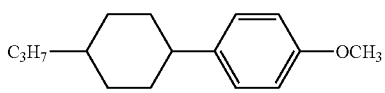 | 10 wt % |
| (1-0202) | 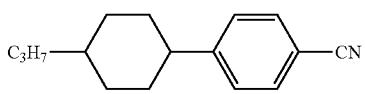 | 8 wt % |
| (1-0203) | 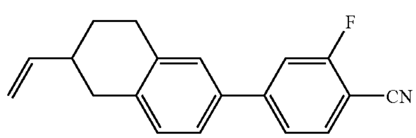 | 5 wt % |
| (1-0204) | 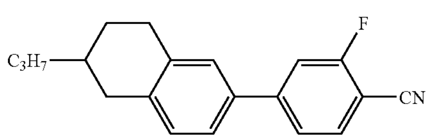 | 10 wt % |
| (1-0205) | 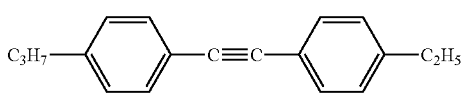 | 9 wt % |
| (1-0206) | 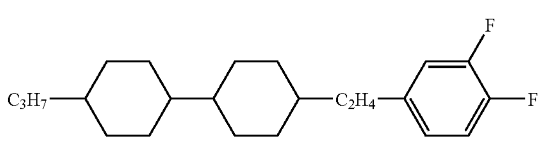 | 6 wt % |
| (1-0207) | 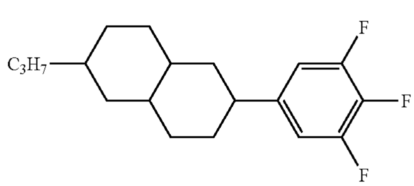 | 6 wt % |

-continued
| | | |
|---|---|---|
| (1-0208) | 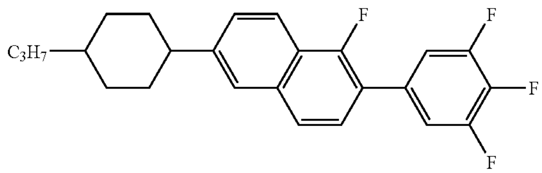 | 6 wt % |
| (1-0209) | 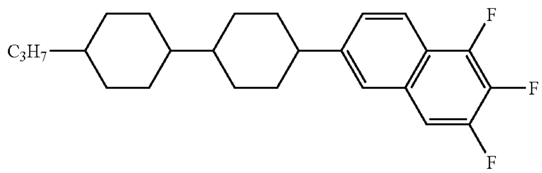 | 6 wt % |
| (1-0210) | 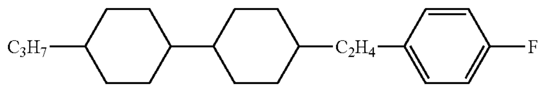 | 12 wt % |
| (1-0211) | 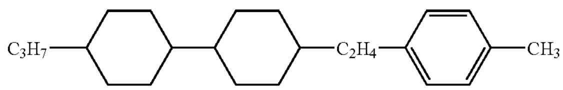 | 7 wt % |
| (1-0212) | 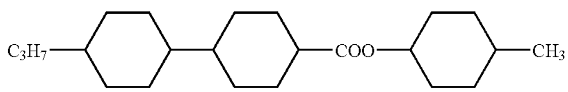 | 7 wt % |
| (1-0213) | 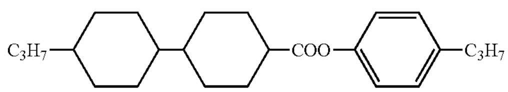 | 8 wt % |
Examples of preferred composition: nematic liquid crystal composition (1-03)
| | | |
|---|---|---|
| (1-0301) | 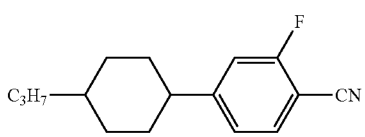 | 5 wt % |
| (1-0302) | 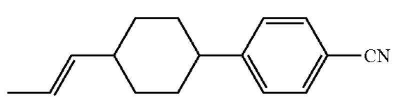 | 5 wt % |
| (1-0303) | 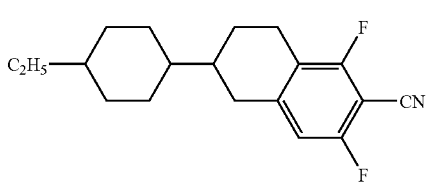 | 5 wt % |
| (1-0304) | 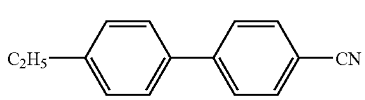 | 7 wt % |
| (1-0305) | 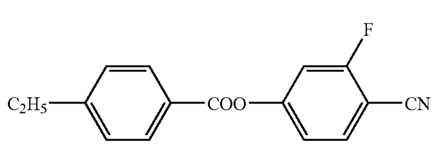 | 8 wt % |

-continued
| | | |
|---|---|---|
| (1-0306) | 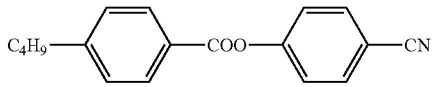 | 9 wt % |
| (1-0307) | 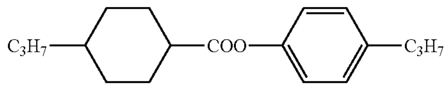 | 12 wt % |
| (1-0308) | 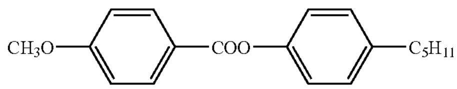 | 15 wt % |
| (1-0309) | 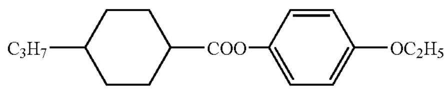 | 13 wt % |
| (1-0310) | 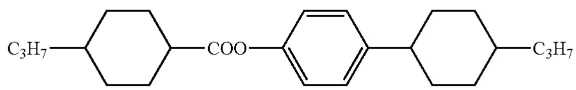 | 3 wt % |
| (1-0311) | 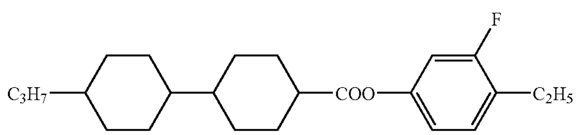 | 3 wt % |
| (1-0312) | 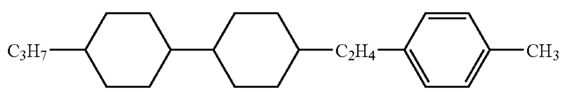 | 3 wt % |
| (1-0313) | 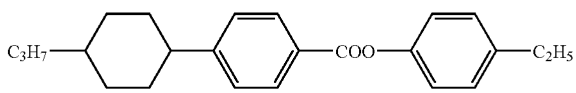 | 3 wt % |
| (1-0314) | 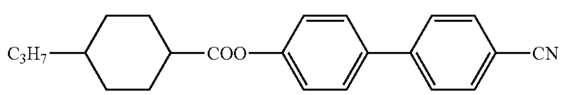 | 3 wt % |
| (1-0315) | 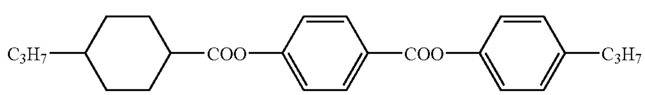 | 3 wt % |
| (1-0316) | 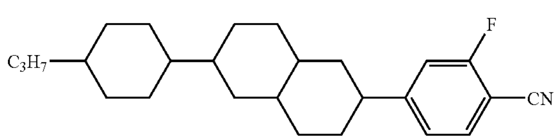 | 3 wt % |
Examples of preferred composition: nematic liquid crystal composition (1-04)
| | | |
|---|---|---|
| (1-0401) | 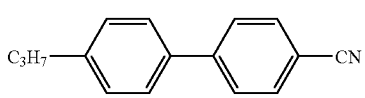 | 10 wt % |
| (1-0402) | 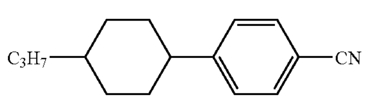 | 16 wt % |

-continued
| | | |
|---|---|---|
| (1-0403) | 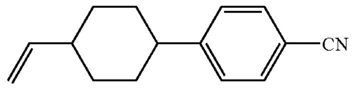 | 16 wt % |
| (1-0404) | 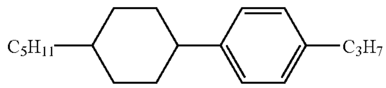 | 16 wt % |
| (1-0405) | 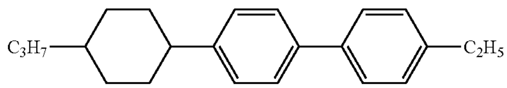 | 10 wt % |
| (1-0406) | 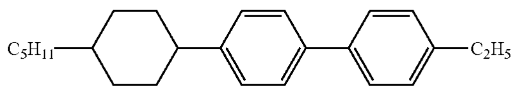 | 10 wt % |
| (1-0407) | 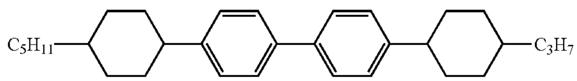 | 6 wt % |
| (1-0408) | 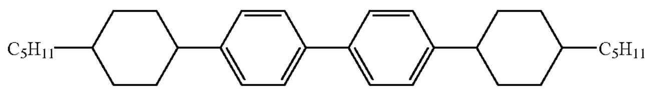 | 5 wt % |
| (1-0409) | 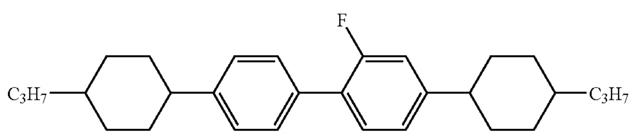 | 5 wt % |
| (1-0410) | 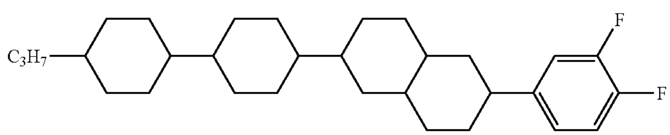 | 1 wt % |
| (1-0411) | 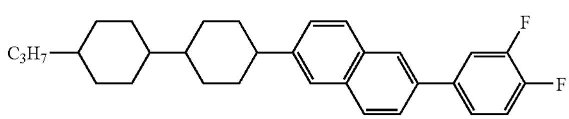 | 1 wt % |
| (1-0412) | 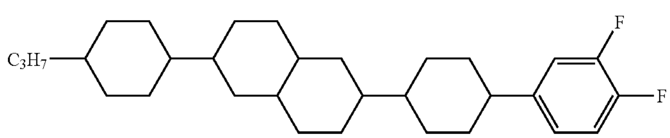 | 1 wt % |
| (1-0413) | 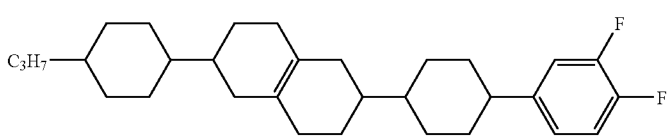 | 1 wt % |
| (1-0414) | 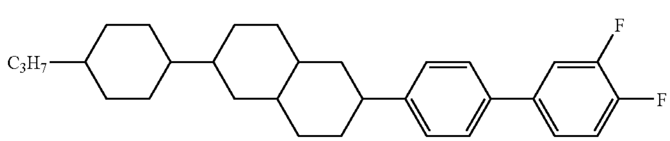 | 1 wt % |
| (1-0415) | 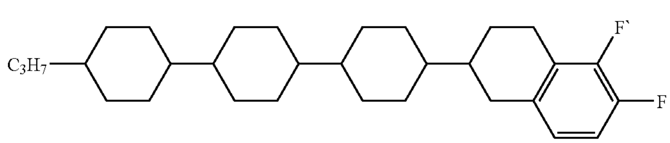 | 1 wt % |

Examples of preferred composition: nematic liquid crystal composition (1-05)
(1-0501) 8 wt %
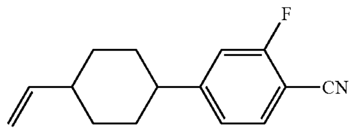
(1-0502) 10 wt %
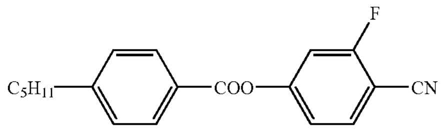
(1-0503) 7 wt %
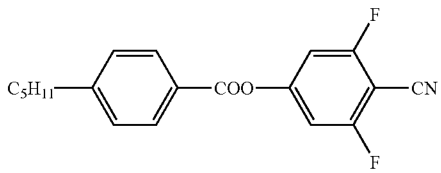
(1-0504) 12 wt %
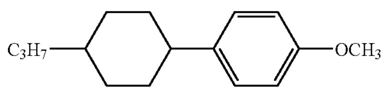
(1-0505) 8 wt %
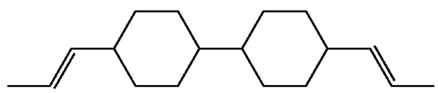
(1-0506) 10 wt %
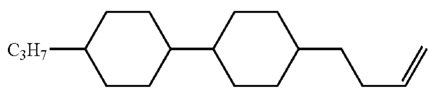
(1-0507) 10 wt %
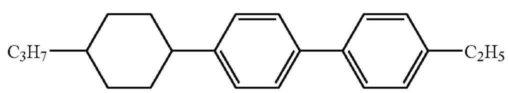
(1-0508) 5 wt %
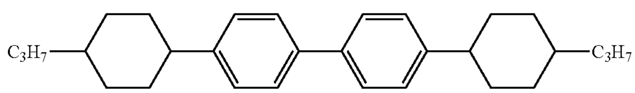
(1-0509) 5 wt %
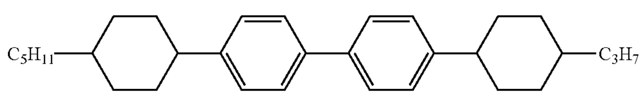
(1-0510) 5 wt %
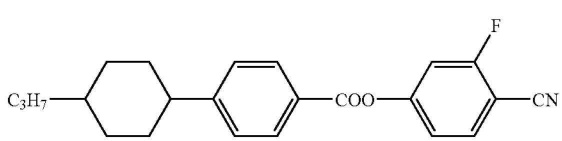
(1-0511) 5 wt %
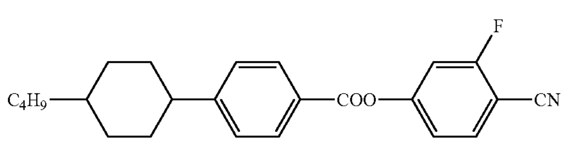
(1-0512) 5 wt %
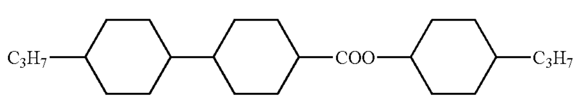

-continued
| | | |
|---|---|---|
| (1-0513) | 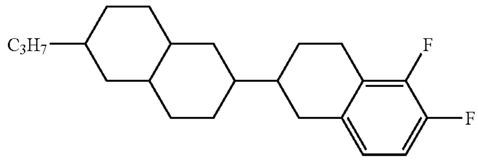 | 2 wt % |
| (1-0514) | 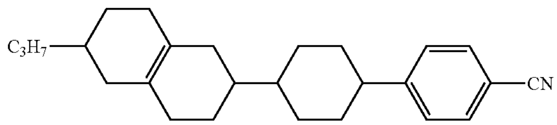 | 2 wt % |
| (1-0515) | 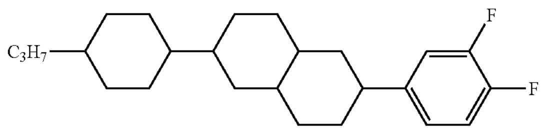 | 2 wt % |
| (1-0516) | 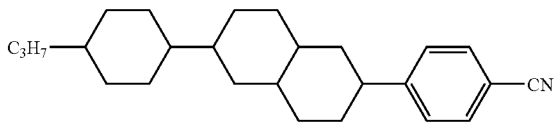 | 2 wt % |
| (1-0517) | 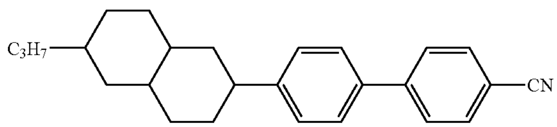 | 2 wt % |
Examples of preferred composition: nematic liquid crystal composition (1-06)
| | | |
|---|---|---|
| (1-0601) | 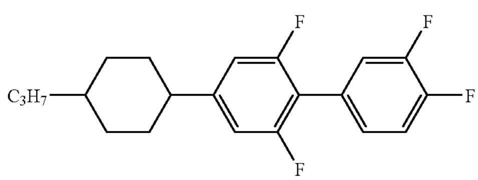 | 5 wt % |
| (1-0602) | 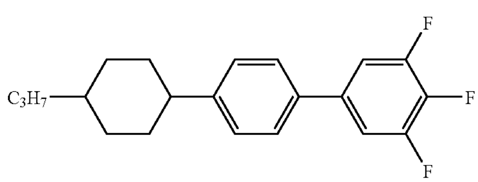 | 5 wt % |
| (1-0603) | 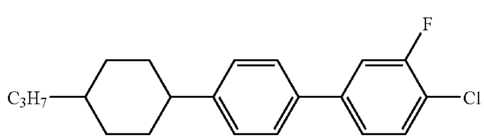 | 5 wt % |
| (1-0604) | 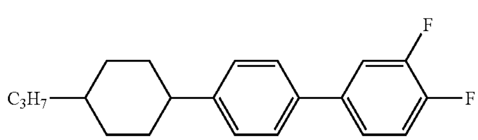 | 5 wt % |

-continued
(1-0605) 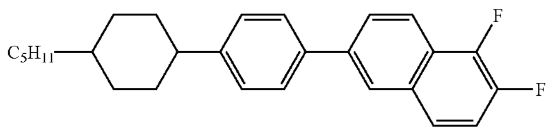 10 wt %
(1-0606) 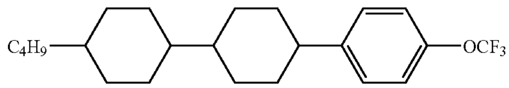 5 wt %
(1-0607) 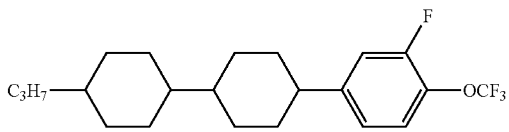 10 wt %
(1-0608) 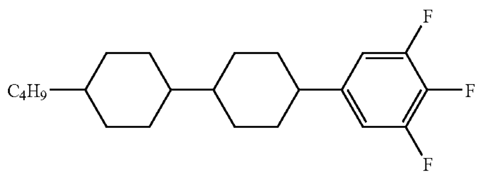 10 wt %
(1-0609) 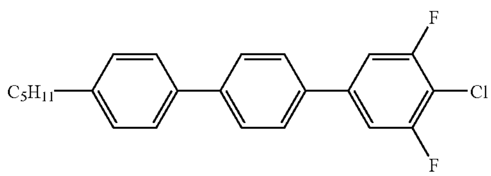 10 wt %
(1-0610) 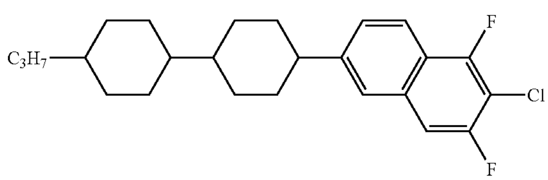 5 wt %
(1-0611) 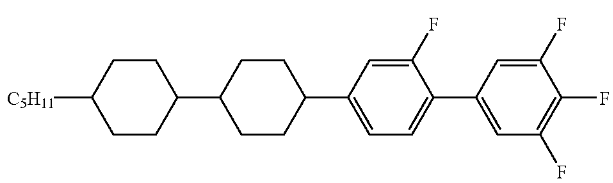 5 wt %
(1-0612) 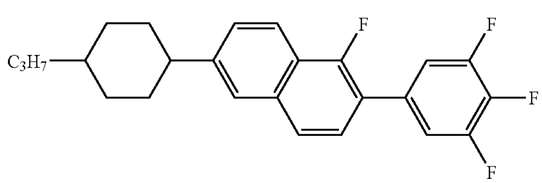 5 wt %
(1-0613) 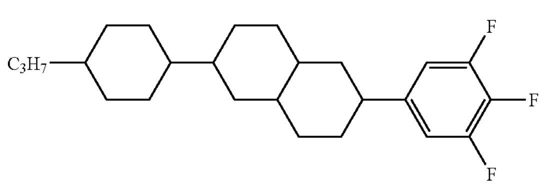 5 wt %

-continued
| | | |
|---|---|---|
| (1-0614) | 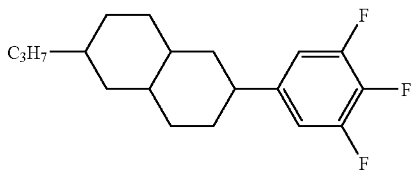 | 5 wt % |
| (1-0615) | 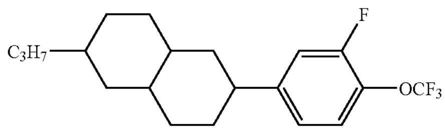 | 5 wt % |
| (1-0616) | 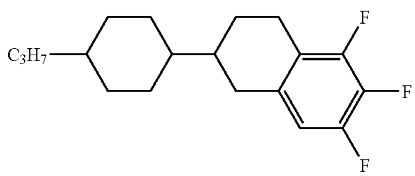 | 5 wt % |
Examples of preferred composition: nematic liquid crystal composition (1-07)
| | | |
|---|---|---|
| (1-0700) | 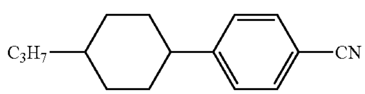 | 4 wt % |
| (1-0701) | 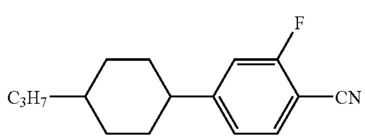 | 4 wt % |
| (1-0702) | 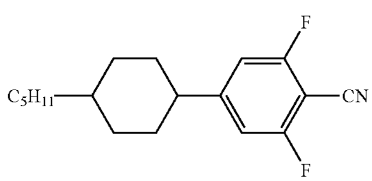 | 3 wt % |
| (1-0703) | 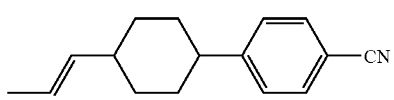 | 3 wt % |
| (1-0704) | 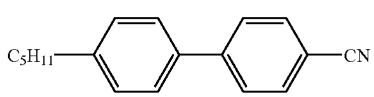 | 3 wt % |
| (1-0705) | 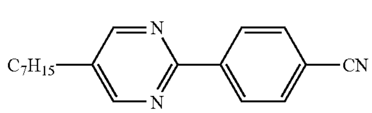 | 4 wt % |
| (1-0706) | 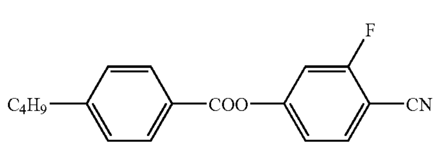 | 3 wt % |

-continued
(1-0707) 6 wt %
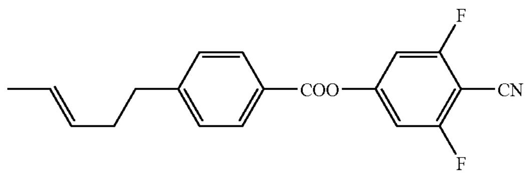
(1-7708) 10 wt %
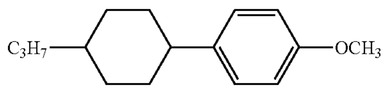
(1-0709) 10 wt %
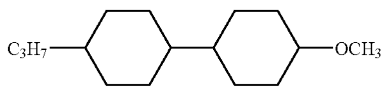
(1-0710) 10 wt %
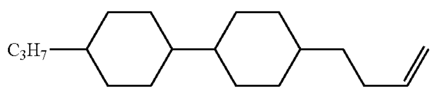
(1-0711) 10 wt %
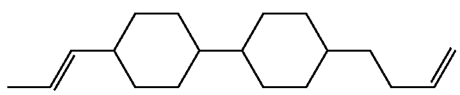
(1-0712) 3 wt %
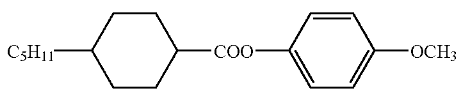
(1-0713) 3 wt %
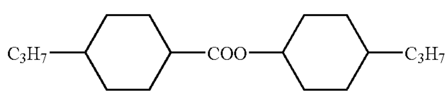
(1-0714) 3 wt %
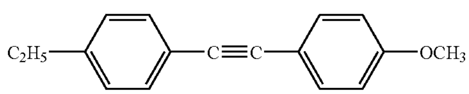
(1-0715) 3 wt %
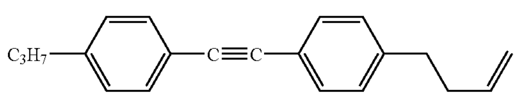
(1-0716) 3 wt %
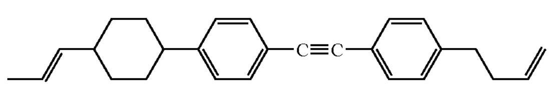
(1-0717) 3 wt %
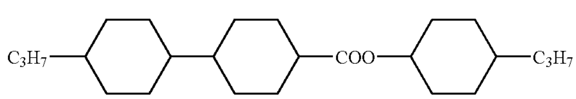
(1-0718) 3 wt %
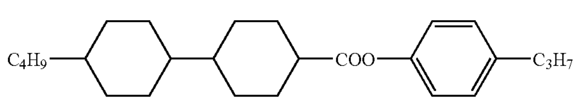
(1-0719) 3 wt %
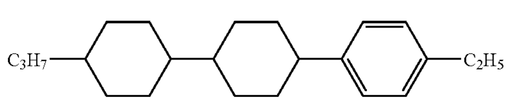
(1-0720) 3 wt %
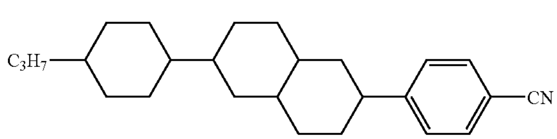

-continued
| | | |
|---|---|---|
| (1-0721) | 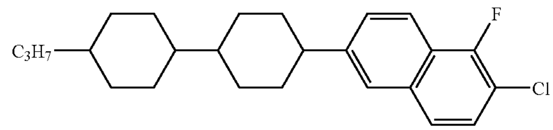 | 3 wt % |
Examples of preferred composition: nematic liquid crystal composition (1-08)
| | | |
|---|---|---|
| (1-0801) | 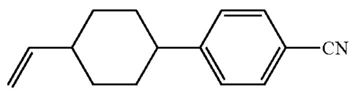 | 5 wt % |
| (1-0802) | 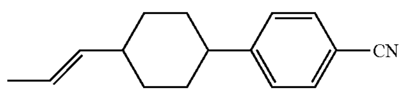 | 10 wt % |
| (1-0803) | 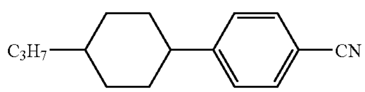 | 10 wt % |
| (1-0804) | 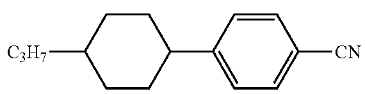 | 10 wt % |
| (1-0805) | 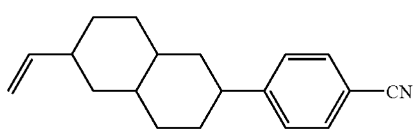 | 5 wt % |
| (1-0806) | 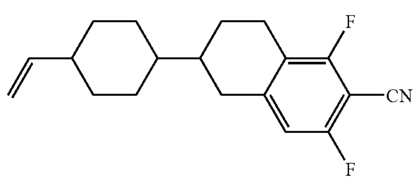 | 5 wt % |
| (1-0807) | 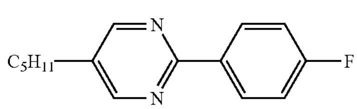 | 5 wt % |
| (1-0808) | 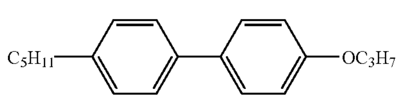 | 5 wt % |
| (1-0809) | 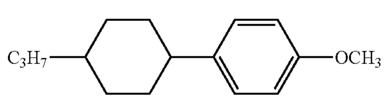 | 3 wt % |
| (1-0810) | 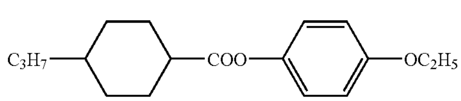 | 3 wt % |
| (1-0811) | 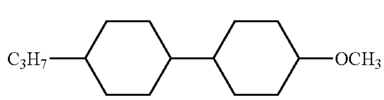 | 3 wt % |

-continued
| | | |
|---|---|---|
| (1-0812) | 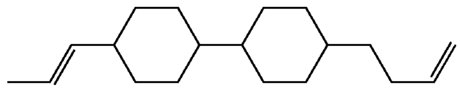 | 3 wt % |
| (1-0813) | 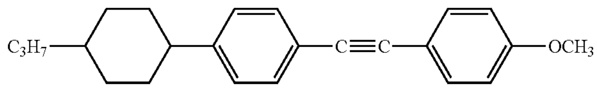 | 7 wt % |
| (1-0814) | 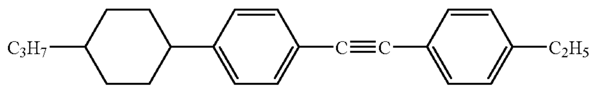 | 7 wt % |
| (1-0815) | 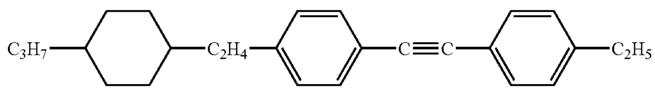 | 7 wt % |
| (1-0816) | 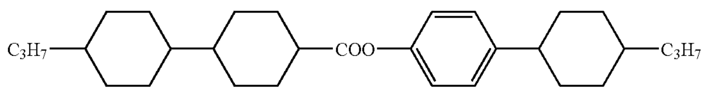 | 7 wt % |
| (1-0817) | 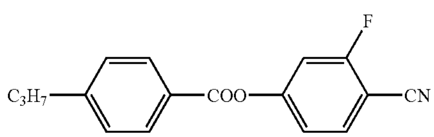 | 5 wt % |
Examples of preferred composition: nematic liquid crystal composition (1-09)
| | | |
|---|---|---|
| (1-0901) | 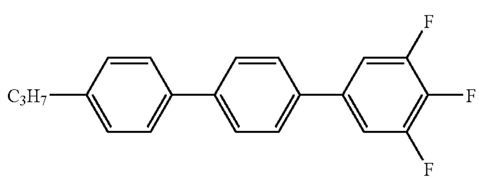 | 8 wt % |
| (1-0902) | 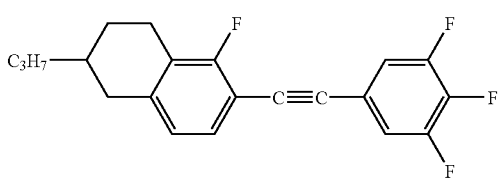 | 12 wt % |
| (1-0903) | 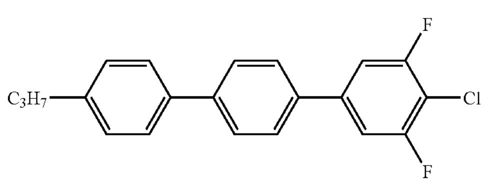 | 11 wt % |
| (1-0904) | 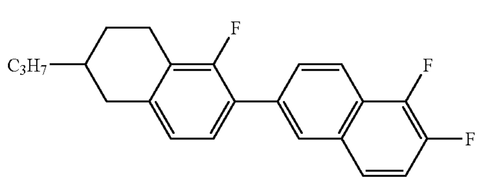 | 9 wt % |

-continued
| | | |
|---|---|---|
| (1-0905) | 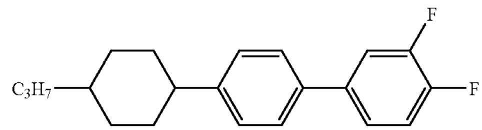 | 9 wt % |
| (1-0906) | 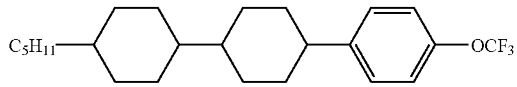 | 9 wt % |
| (1-0907) | 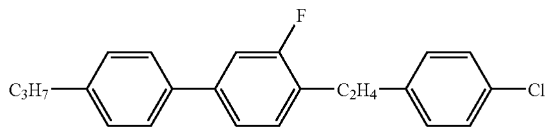 | 11 wt % |
| (1-0908) | 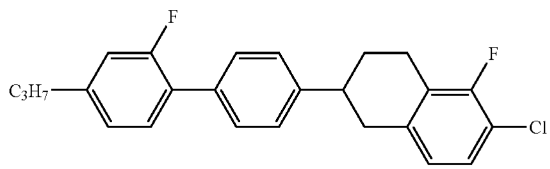 | 11 wt % |
| (1-0909) | 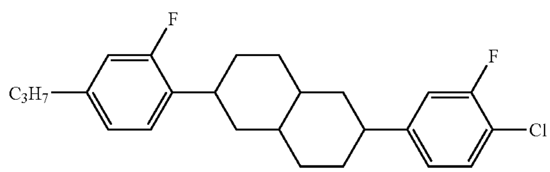 | 10 wt % |
| (1-0910) | 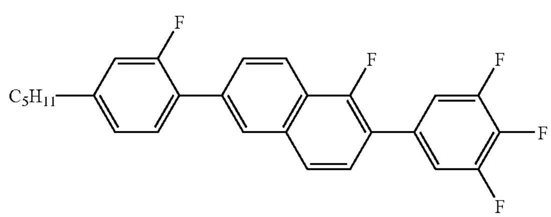 | 8 wt % |
| (1-0911) | 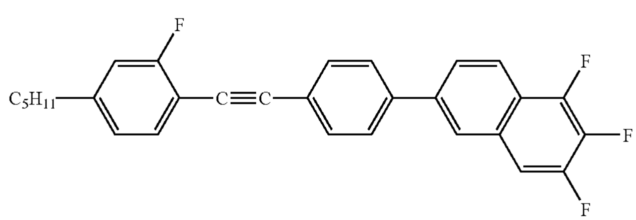 | 2 wt % |
Examples of preferred composition: nematic liquid crystal composition (1-10)
| | | |
|---|---|---|
| (1-1001) | 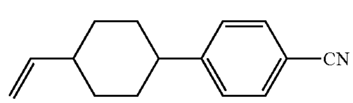 | 10 wt % |
| (1-1002) | 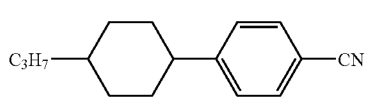 | 16 wt % |

-continued
| | | |
|---|---|---|
| (1-1003) | 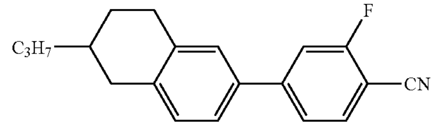 | 5 wt % |
| (1-1004) | 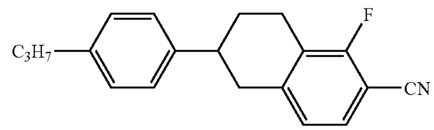 | 5 wt % |
| (1-1005) | 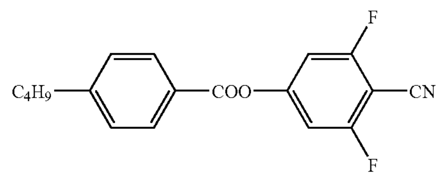 | 4 wt % |
| (1-1006) | 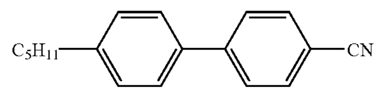 | 8 wt % |
| (1-1007) | 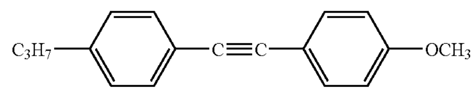 | 5 wt % |
| (1-1008) | 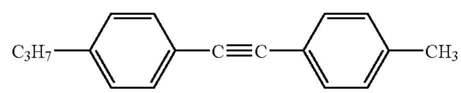 | 3 wt % |
| (1-1009) | 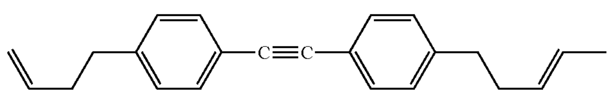 | 5 wt % |
| (1-1010) | 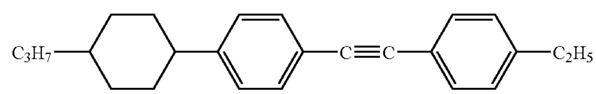 | 8 wt % |
| (1-1011) | 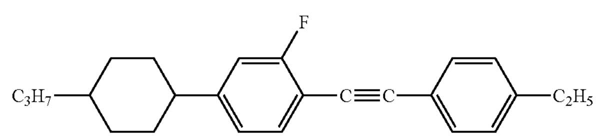 | 8 wt % |
| (1-1012) | 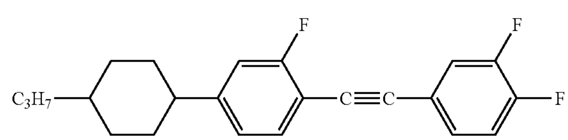 | 8 wt % |
| (1-1013) | 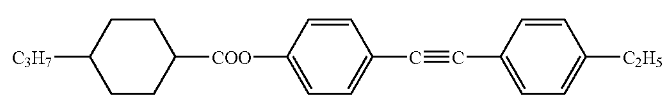 | 5 wt % |
| (1-1014) | 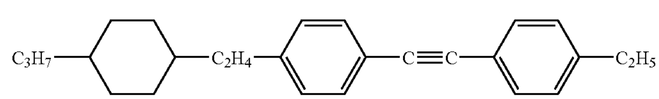 | 5 wt % |
| (1-1015) | 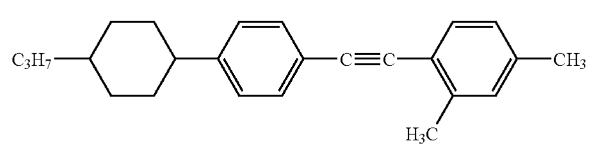 | 5 wt % |

Examples of preferred composition: nematic liquid crystal composition (1-11)
(1-1101)
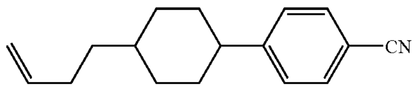
12 wt %
(1-1102)
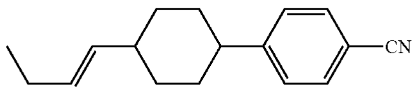
11 wt %
(1-1103)
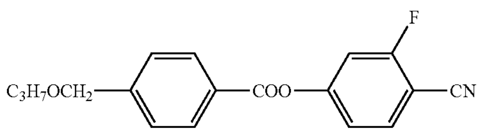
14 wt %
(1-1104)
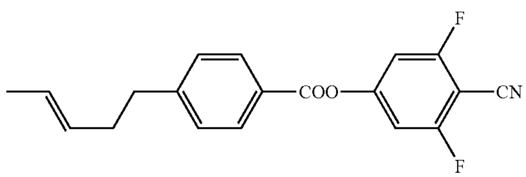
11 wt %
(1-1105)
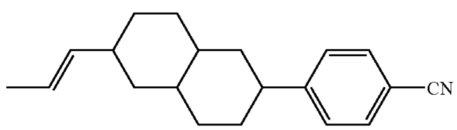
3 wt %
(1-1106)
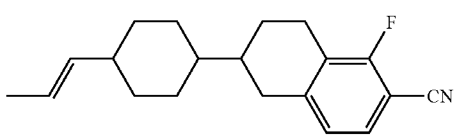
3 wt %
(1-1107)
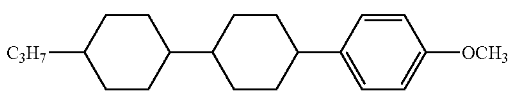
5 wt %
(1-1108)
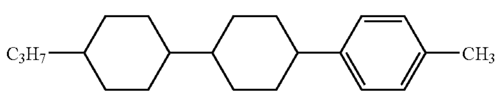
5 wt %
(1-1109)
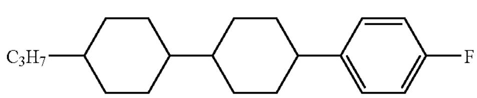
5 wt %
(1-1110)
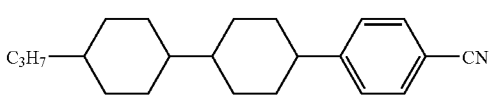
5 wt %
(1-1111)
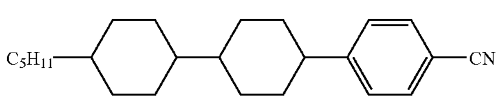
5 wt %
(1-1112)
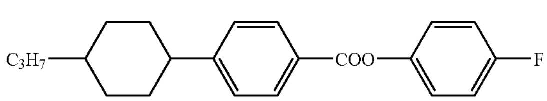
5 wt %
(1-1113)
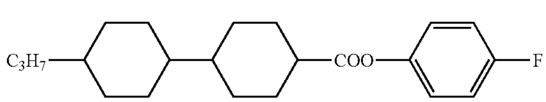
5 wt %

-continued
| | | |
|---|---|---|
| (1-1114) | 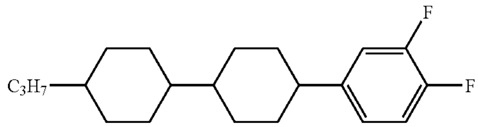 | 5 wt % |
| (1-1115) | 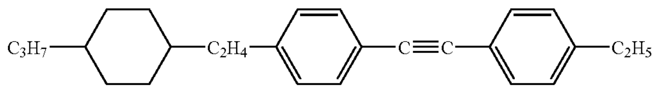 | 6 wt % |
Examples of preferred composition: nematic liquid crystal composition (1-12)
| | | |
|---|---|---|
| (1-1201) | 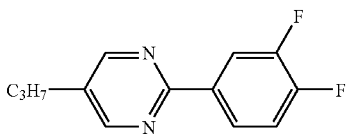 | 13 wt % |
| (1-1202) | 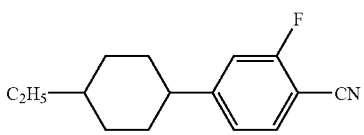 | 16 wt % |
| (1-1203) | 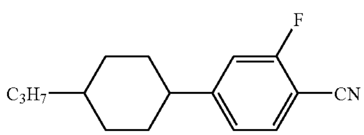 | 4 wt % |
| (1-1204) | 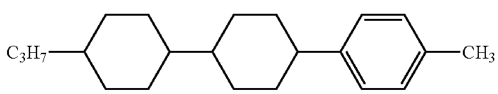 | 7 wt % |
| (1-1205) | 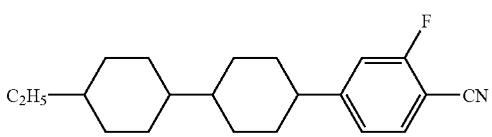 | 12 wt % |
| (1-1206) | 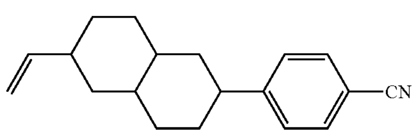 | 12 wt % |
| (1-1207) | 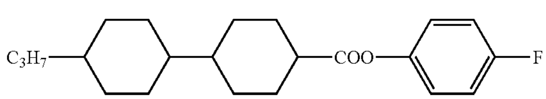 | 5 wt % |
| (1-1208) | 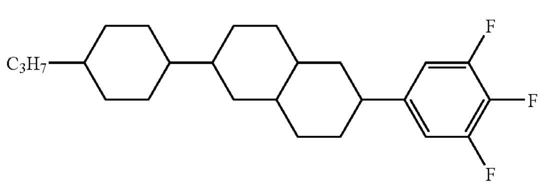 | 5 wt % |
| (1-1209) | 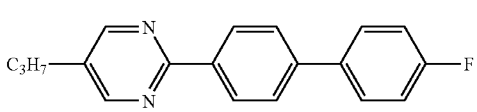 | 7 wt % |

-continued
| | | |
|---|---|---|
| (1-1210) | 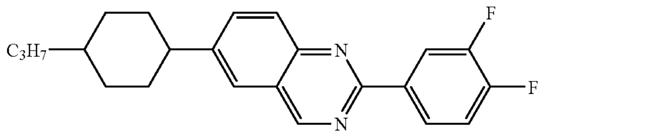 | 7 wt % |
| (1-1211) | 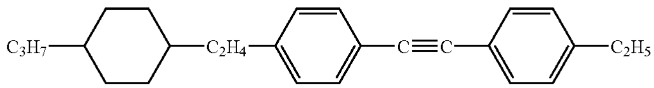 | 4 wt % |
| (1-1212) | 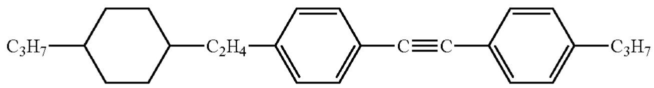 | 4 wt % |
| (1-1213) | 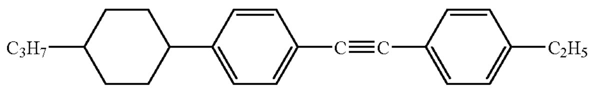 | 4 wt % |
Examples of preferred composition: nematic liquid crystal composition (1-13)
| | | |
|---|---|---|
| (1-1301) | 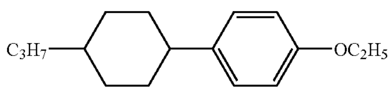 | 9 wt % |
| (1-1302) | 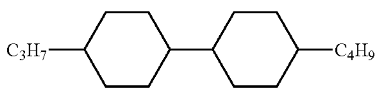 | 4 wt % |
| (1-1303) | 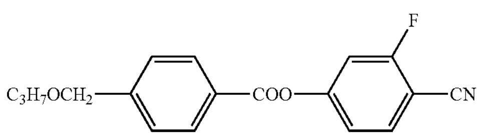 | 4 wt % |
| (1-1304) | 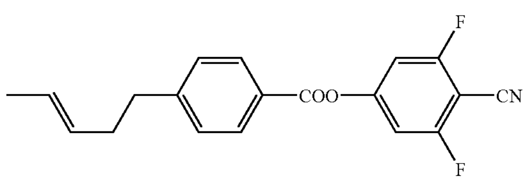 | 5 wt % |
| (1-1305) | 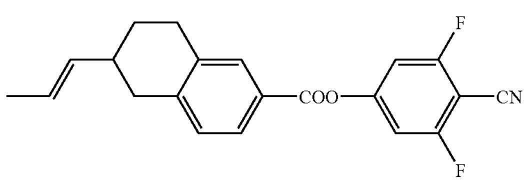 | 4 wt % |
| (1-1306) | 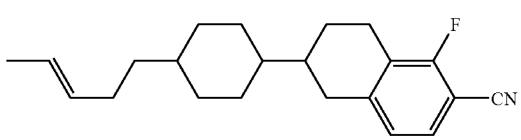 | 4 wt % |
| (1-1307) | 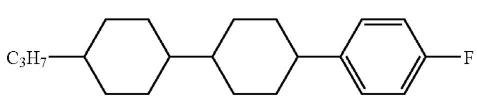 | 5 wt % |

-continued
| | | |
|---|---|---|
| (1-1308) | 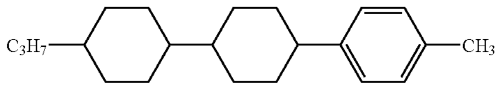 | 18 wt % |
| (1-1309) | 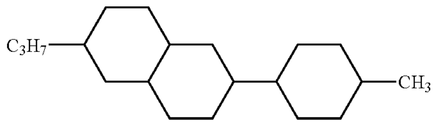 | 3 wt % |
| (1-1310) | 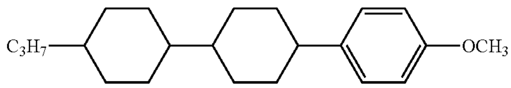 | 2 wt % |
| (1-1311) | 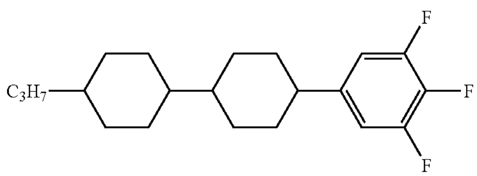 | 6 wt % |
| (1-1312) | 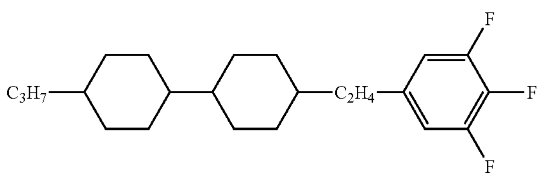 | 5 wt % |
| (1-1313) | 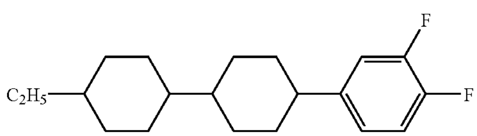 | 5 wt % |
| (1-1314) | 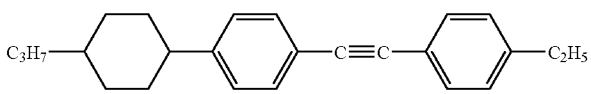 | 5 wt % |
| (1-1315) | 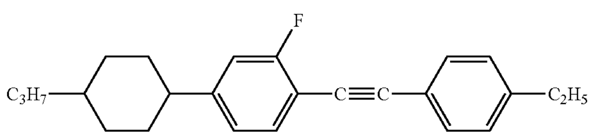 | 6 wt % |
| (1-1316) | 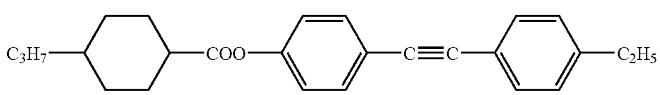 | 8 wt % |
| (1-1317) | 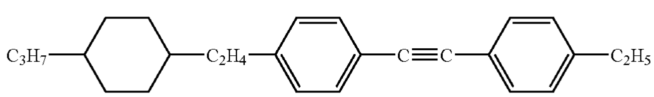 | 7 wt % |
Examples of preferred composition: nematic liquid crystal composition (1-14)
| | | |
|---|---|---|
| (1-1401) | 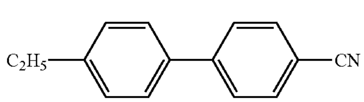 | 10 wt % |

-continued
(1-1402) 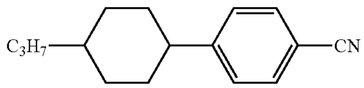 10 wt %
(1-1403) 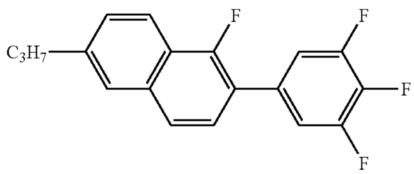 4 wt %
(1-1404) 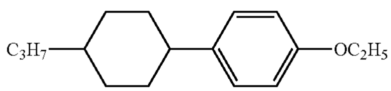 9 wt %
(1-1405) 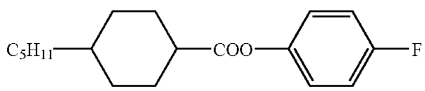 8 wt %
(1-1406) 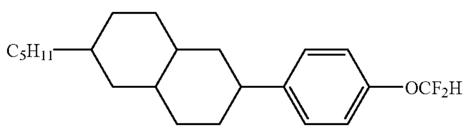 9 wt %
(1-1407) 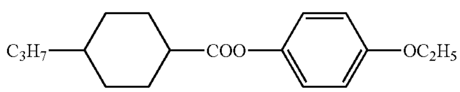 5 wt %
(1-1408) 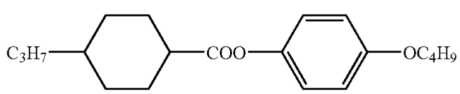 5 wt %
(1-1409) 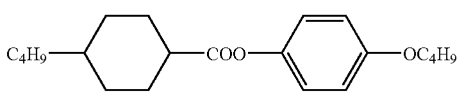 5 wt %
(1-1410) 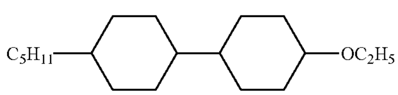 5 wt %
(1-1411) 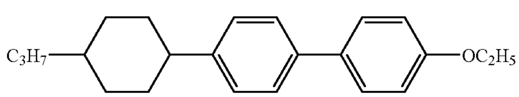 6 wt %
(1-1412) 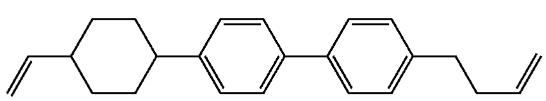 5 wt %
(1-1413) 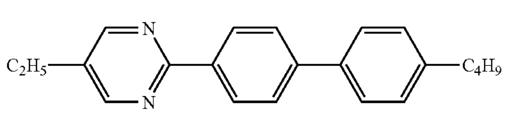 4 wt %
(1-1414) 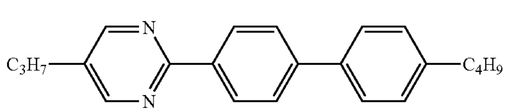 5 wt %
(1-1415) 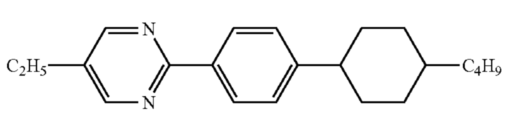 5 wt %

-continued
| | | |
|---|---|---|
| (1-1416) | 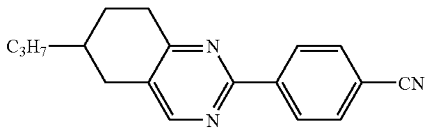 | 5 wt % |
Examples of preferred composition: nematic liquid crystal composition (1-15)
| | | |
|---|---|---|
| (1-1501) | 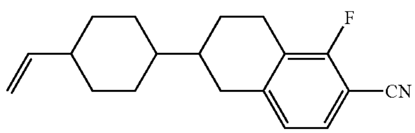 | 15 wt % |
| (1-1502) | 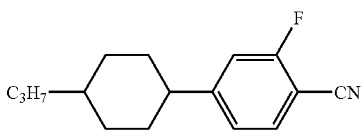 | 10 wt % |
| (1-1503) | 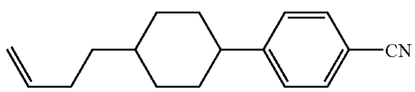 | 10 wt % |
| (1-1504) | 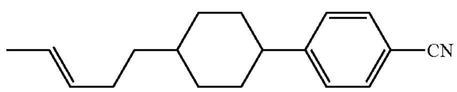 | 10 wt % |
| (1-1505) | 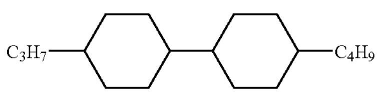 | 7 wt % |
| (1-1506) | 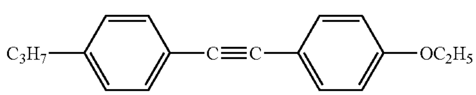 | 5 wt % |
| (1-1507) | 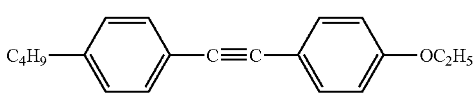 | 13 wt % |
| (1-1508) | 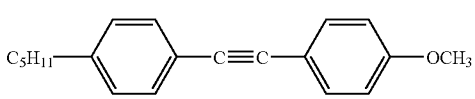 | 14 wt % |
| (1-1509) | 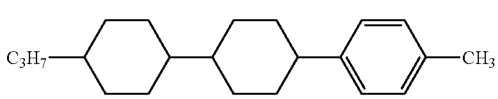 | 4 wt % |
| (1-1510) | 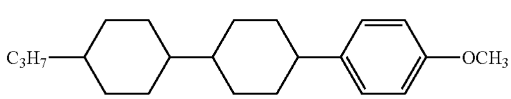 | 4 wt % |
| (1-1511) | 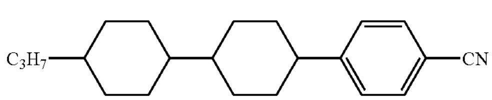 | 4 wt % |

-continued
| | | |
|---|---|---|
| (1-1512) | 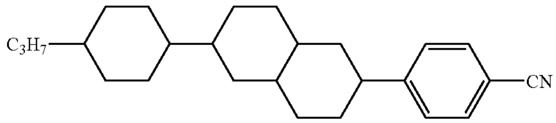 | 4 wt % |
Examples of preferred composition: nematic liquid crystal composition (1-16)
| | | |
|---|---|---|
| (1-1601) | 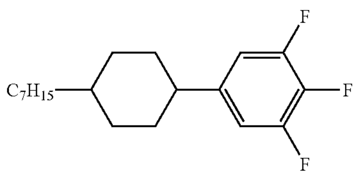 | 5 wt % |
| (1-1602) | 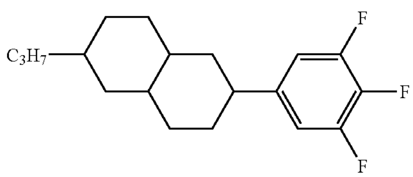 | 5 wt % |
| (1-1603) | 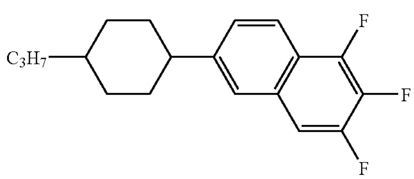 | 5 wt % |
| (1-1604) | 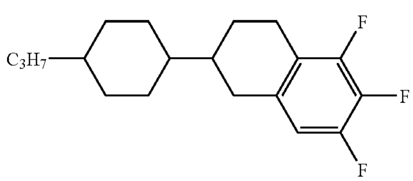 | 5 wt % |
| (1-1605) | 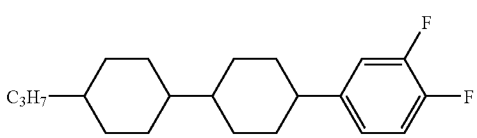 | 10 wt % |
| (1-1606) | 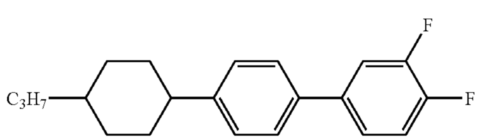 | 10 wt % |
| (1-1607) | 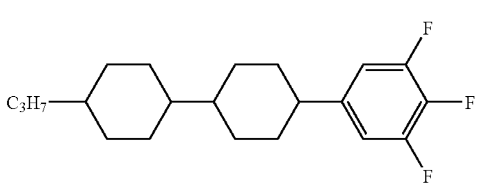 | 5 wt % |

-continued
| | | |
|---|---|---|
| (1-1608) | 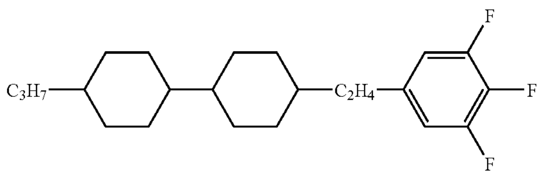 | 10 wt % |
| (1-1609) | 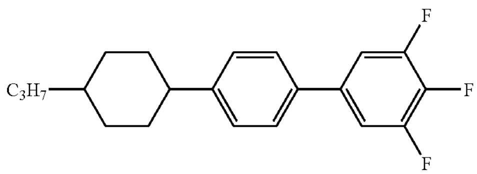 | 10 wt % |
| (1-1610) | 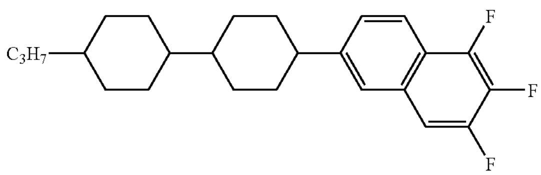 | 10 wt % |
| (1-1611) | 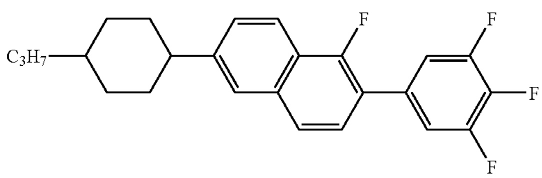 | 10 wt % |
| (1-1612) | 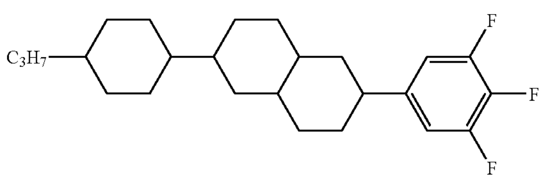 | 5 wt % |
| (1-1613) | 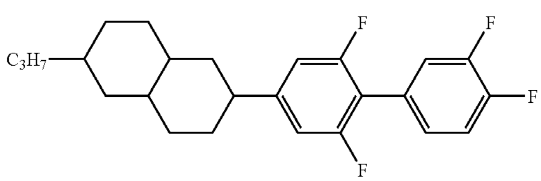 | 5 wt % |
| (1-1614) | 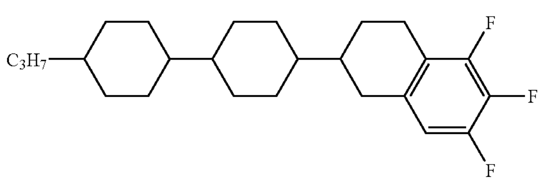 | 5 wt % |
Examples of preferred composition: nematic liquid crystal composition (1-17)
| | | |
|---|---|---|
| (1-1701) | 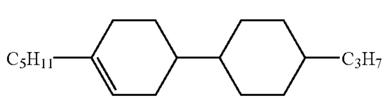 | 4 wt % |

-continued
(1-1702) 3 wt %
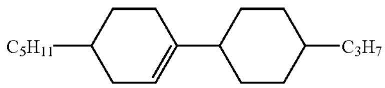
(1-1703) 3 wt %
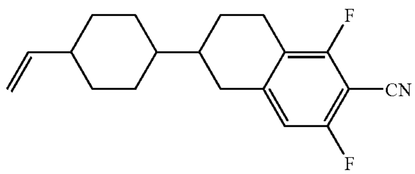
(1-1704) 3 wt %
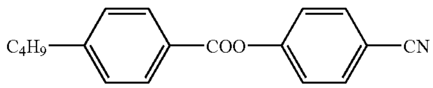
(1-1705) 3 wt %
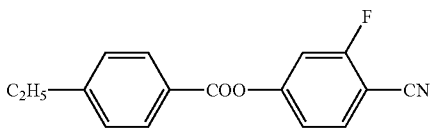
(1-1706) 4 wt %
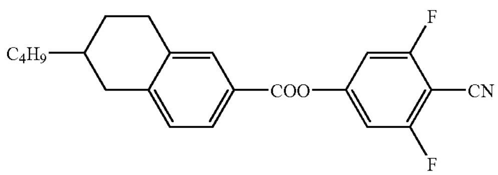
(1-1707) 3 wt %
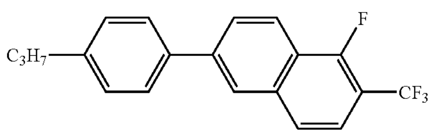
(1-1708) 18 wt %
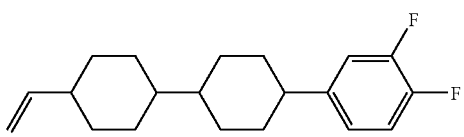
(1-1709) 17 wt %
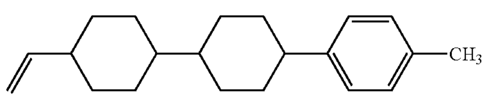
(1-1710) 17 wt %
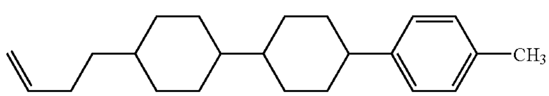
(1-1711) 4 wt %
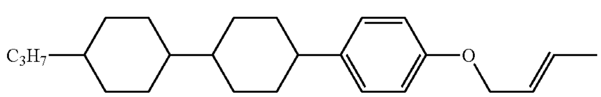
(1-1712) 7 wt %
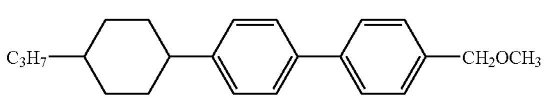
(1-1713) 4 wt %
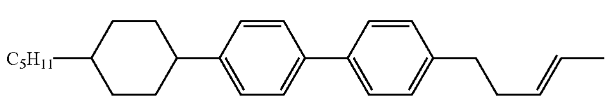
(1-1714) 5 wt %
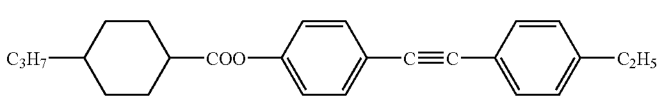

-continued
(1-1715) 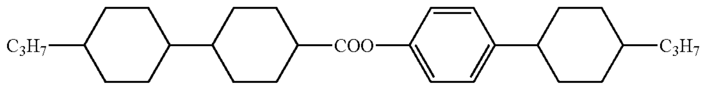 5 wt %
Examples of preferred composition: nematic liquid crystal composition (1-18)
(1-1801) 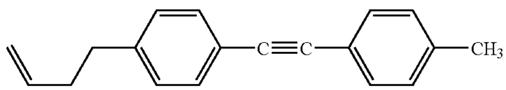 10 wt %
(1-1802) 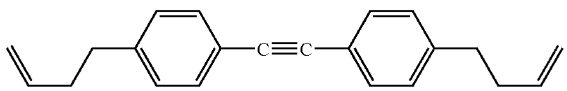 10 wt %
(1-1803) 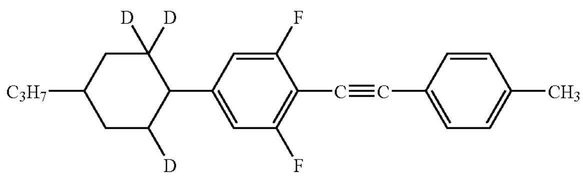 10 wt %
(1-1804) 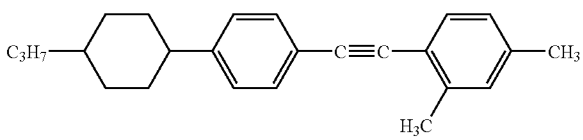 5 wt %
(1-1805) 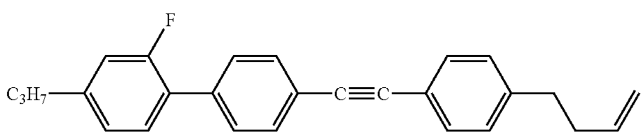 10 wt %
(1-1806) 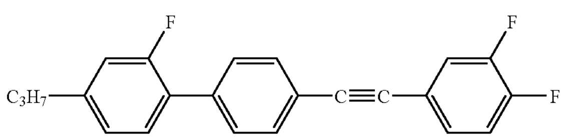 10 wt %
(1-1807) 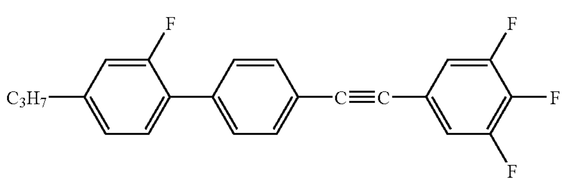 5 wt %
(1-1808) 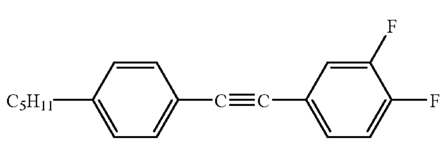 5 wt %
(1-1809) 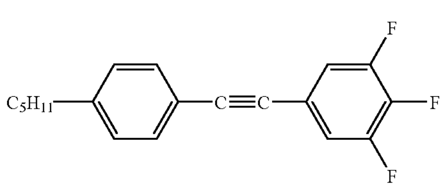 5 wt %

-continued
| | | |
|---|---|---|
| (1-1810) | 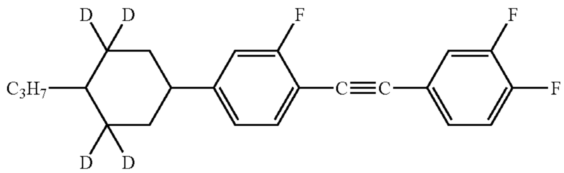 | 10 wt % |
| (1-1811) | 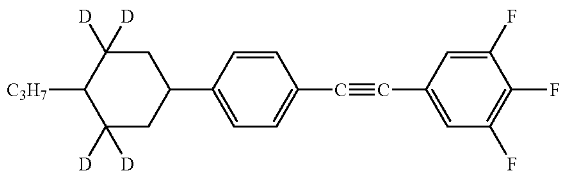 | 10 wt % |
| (1-1812) | 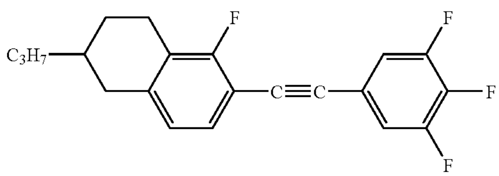 | 5 wt % |
| (1-1813) | 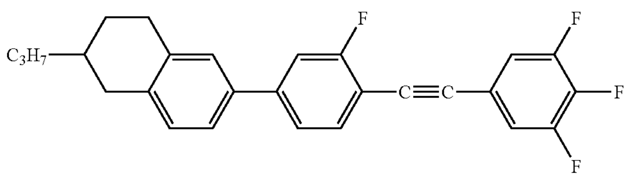 | 3 wt % |
| (1-1814) | 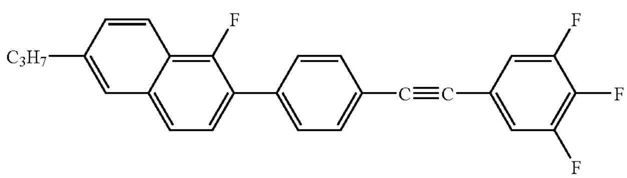 | 2 wt % |
Examples of preferred composition: nematic liquid crystal composition (1-19)
| | | |
|---|---|---|
| (1-1901) | 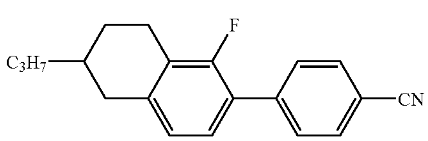 | 6 wt % |
| (1-1902) | 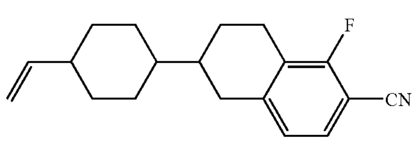 | 6 wt % |
| (1-1903) | 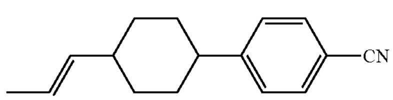 | 10 wt % |
| (1-1904) | 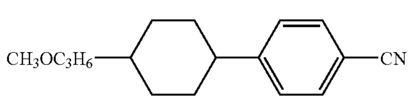 | 7 wt % |

-continued
| | | |
|---|---|---|
| (1-1905) | 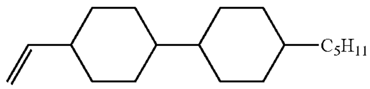 | 19 wt % |
| (1-1906) | 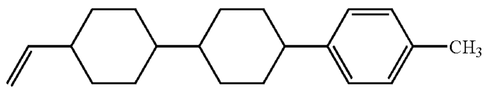 | 4 wt % |
| (1-1907) | 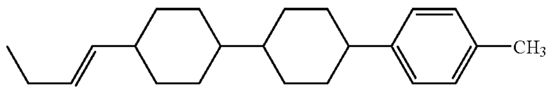 | 13 wt % |
| (1-1908) | 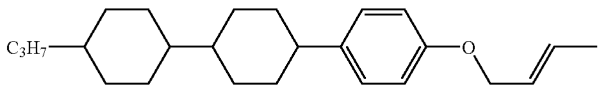 | 4 wt % |
| (1-1909) | 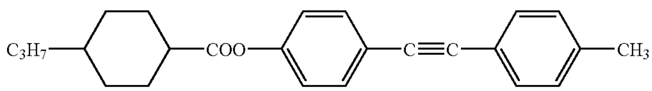 | 7 wt % |
| (1-1910) | 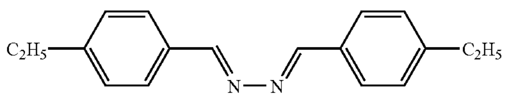 | 3 wt % |
| (1-1911) | 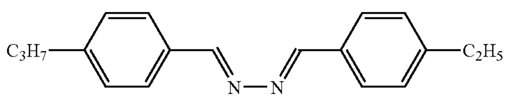 | 6 wt % |
| (1-1912) | 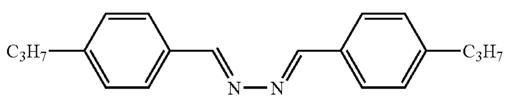 | 3 wt % |
| (1-1913) | 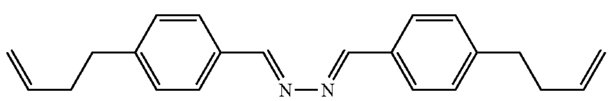 | 12 wt % |
Examples of preferred composition: nematic liquid crystal composition (1-20)
| | | |
|---|---|---|
| (1-2001) | 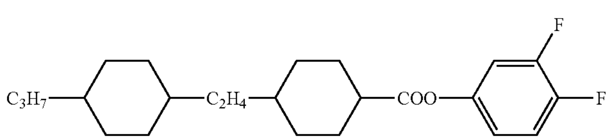 | 10 wt % |
| (1-2002) | 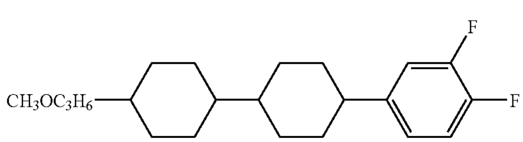 | 7 wt % |
| (1-2003) | 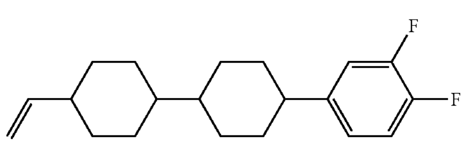 | 18 wt % |

-continued
| | | |
|---|---|---|
| (1-2004) | 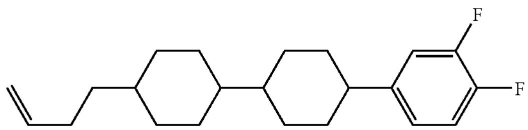 | 17 wt % |
| (1-2005) | 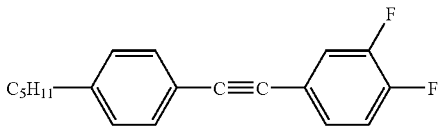 | 5 wt % |
| (1-2006) | 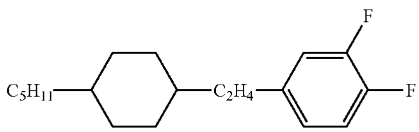 | 5 wt % |
| (1-2007) | 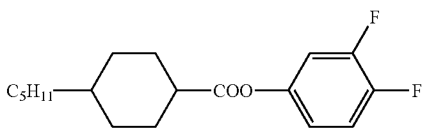 | 5 wt % |
| (1-2008) | 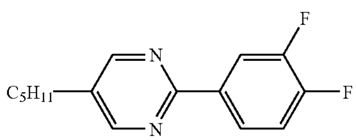 | 5 wt % |
| (1-2009) | 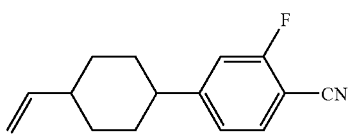 | 5 wt % |
| (1-2010) | 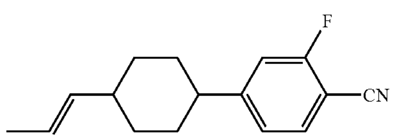 | 5 wt % |
| (1-2011) | 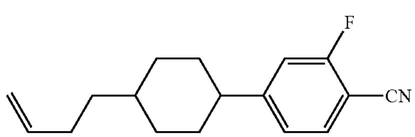 | 5 wt % |
| (1-2012) | 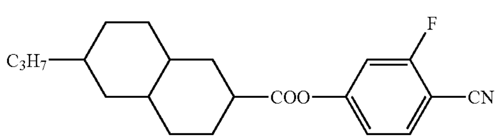 | 5 wt % |
| (1-2013) | 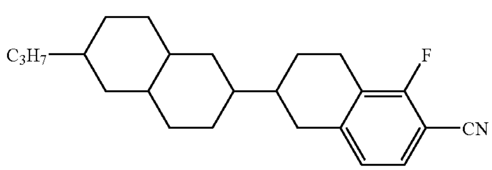 | 5 wt % |
| (1-2014) | 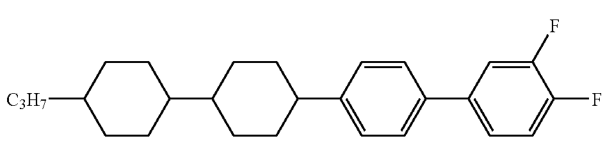 | 3 wt % |

Examples of preferred composition: nematic liquid crystal composition (1-21)
| | | |
|---|---|---|
| (1-2101) | 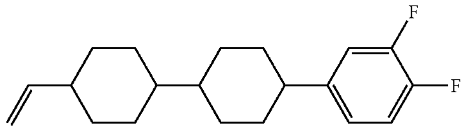 | 10 wt % |
| (1-2102) | 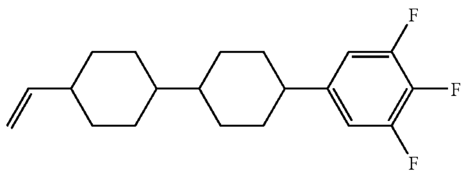 | 10 wt % |
| (1-2103) | 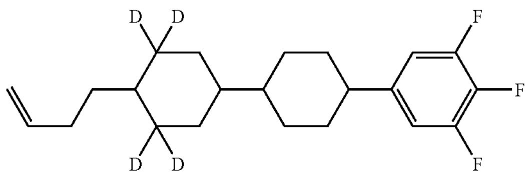 | 10 wt % |
| (1-2104) | 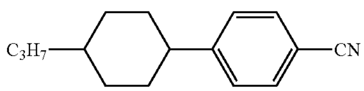 | 10 wt % |
| (1-2105) | 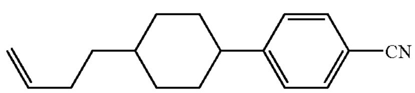 | 10 wt % |
| (1-2106) | 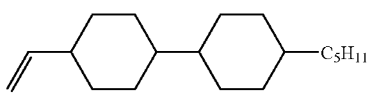 | 10 wt % |
| (1-2107) | 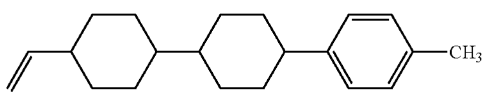 | 10 wt % |
| (1-2108) | 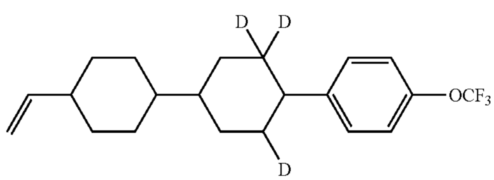 | 10 wt % |
| (1-2109) | 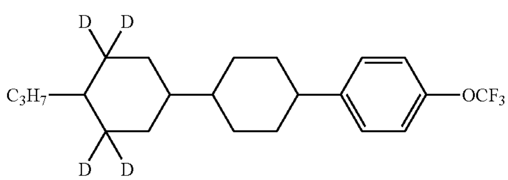 | 10 wt % |
| (1-2110) | 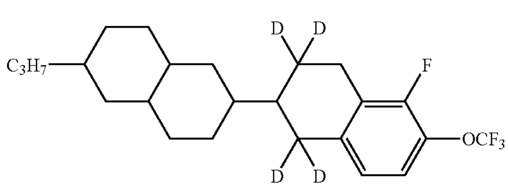 | 10 wt % |

Examples of preferred composition: nematic liquid crystal composition (1-22)
| | | |
|---|---|---|
| (1-2201) | 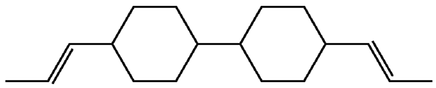 | 10 wt % |
| (1-2202) | 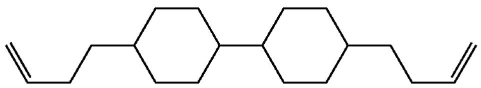 | 10 wt % |
| (1-2203) | 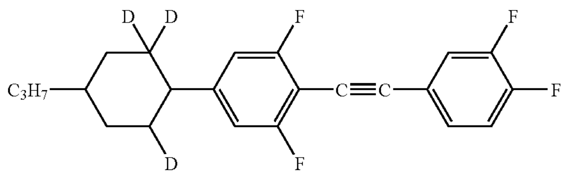 | 15 wt % |
| (1-2204) | 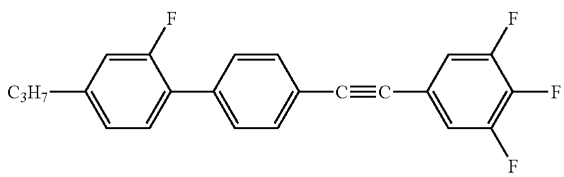 | 15 wt % |
| (1-2205) | 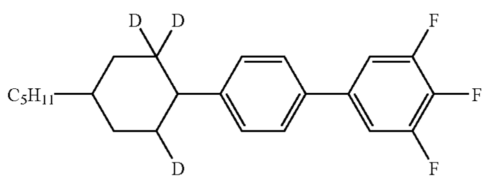 | 10 wt % |
| (1-2206) | 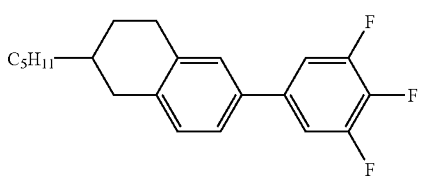 | 5 wt % |
| (1-2207) | 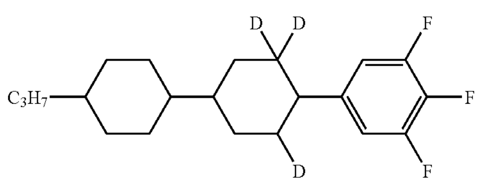 | 5 wt % |
| (1-2208) | 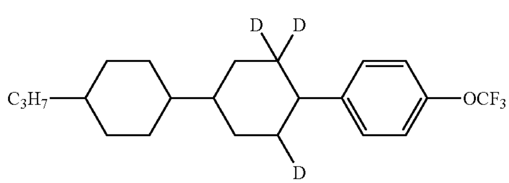 | 10 wt % |
| (1-2209) | 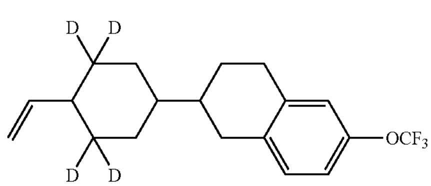 | 5 wt % |

-continued
| | | |
|---|---|---|
| (1-2210) | 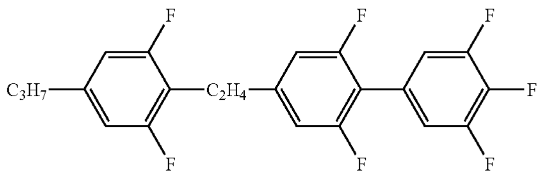 | 5 wt % |
| (1-2211) | 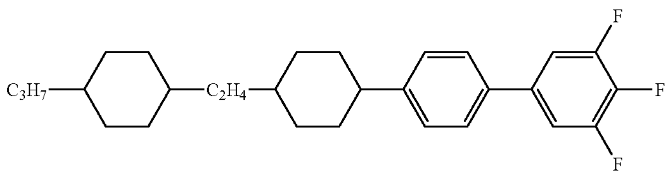 | 10 wt % |
Examples of preferred composition: nematic liquid crystal composition (1-23)
| | | |
|---|---|---|
| (1-2301) | 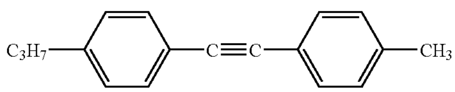 | 20 wt % |
| (1-2302) | 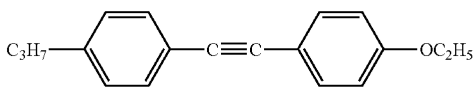 | 10 wt % |
| (1-2303) | 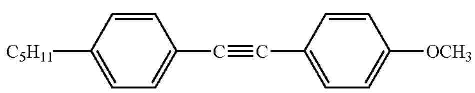 | 5 wt % |
| (1-2304) | 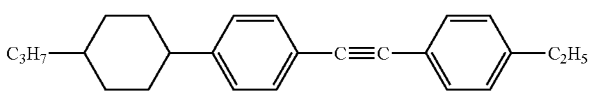 | 7 wt % |
| (1-2305) | 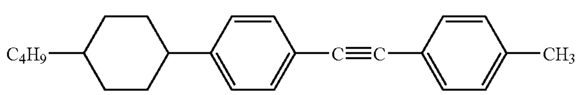 | 8 wt % |
| (1-2306) | 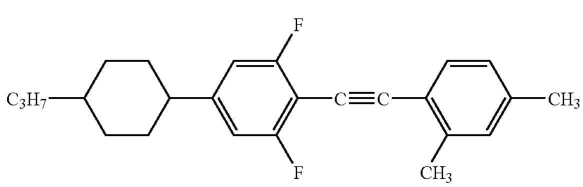 | 10 wt % |
| (1-2307) | 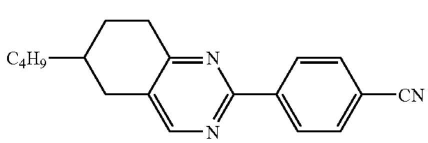 | 6 wt % |
| (1-2308) | 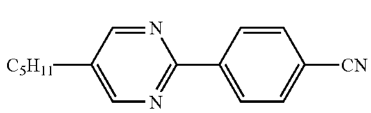 | 5 wt % |
| (1-2309) | 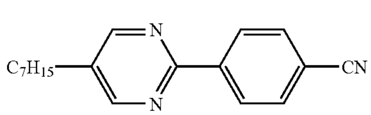 | 5 wt % |

-continued

| | | |
|---|---|---|
| (1-2310) | 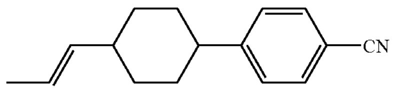 | 10 wt % |
| (1-2311) | 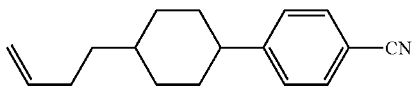 | 10 wt % |
| (1-2312) | 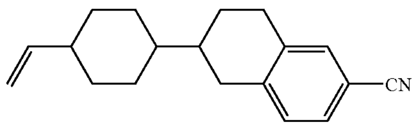 | 4 wt % |

The market of the liquid crystal display device is in the state of fierce price competition. To survive this competition, the liquid crystal material is required to be capable of easily optimize the display characteristics for various applications. Thus such systematized liquid crystal materials 2-bottle type composed of two kinds of liquid crystal material or 4-bottle type composed of four kinds of liquid crystal material. Representative characteristics thereof include the threshold voltage, the birefringent index and the nematic phase-isotropic liquid phase transition temperature. For example, when such a 2-bottle system is used that consists of a liquid crystal material having a higher threshold voltage and a liquid crystal material having a lower threshold voltage, which are identical with regards to other characteristics, requirements can be met more quickly at a lower cost by combining two kinds of liquid crystal materials in a proper proportion without restriction of the electronics components used in the drive circuit. The present invention is useful for this purpose, too, and allows it to use a mixture of the nematic liquid crystal compositions (1-01) to (1-23) and compositions obtained by substituting a part thereof. Such an application may be carried out, as a matter of course, including nematic liquid crystal compositions (3-01) to (3-38) of Examples to be described later.

EXAMPLES

The present invention will now be described in detail below by way of Examples, although it should be understood that the present invention is not limited to these Examples. In the following description of compositions of the Examples, "percentages" are by weight unless otherwise specified, while —$(CH_2)_2$— and —$C_2H_4$— have the same meaning and —$(CH_2)_4$ — and —$C_4H_8$— have the same meaning.

Physical properties of the liquid crystal composition and the display characteristics of the liquid crystal display device that employs the TN-LCD of the Examples are as follows.

$T_{N-I}$: Nematic phase-isotropic liquid phase transition temperature (° C.)

$T_{-N}$: Solid phase or smectic phase-nematic phase transition temperature (° C.)

Δ∈: Dielectric constant anisotropy at 20° C.

Δn: Birefringent index at 20° C.

η: Viscosity at 20° C. (cp)

Vth: Threshold voltage (V) at 20° C. when TN-LCD is constituted $V_1$: Applied voltage (V) at the light transmittance of 1% if where the light transmittance is 100% with no voltage applied at 20° C. when TN-LCD is constituted γ: Ratio of saturation voltage (Vsat) and Vth, namely sharpness at 20° C.

τr=τd: Period of time when the rise time τr if a predetermined voltage is applied starting from 0V and the decay time τd if the voltage is decreased from the predetermined voltage to zero equal to each other, at 20° C.

The liquid crystal display device having the STN-LCD display characteristics was made as follows. A chiral material S-811 (manufactured by Merc) was added to the liquid crystal composition, thereby preparing a mixed liquid crystal. An alignment film was formed by rubbing an organic film of Sun-Ever 610 (manufactured by Nissan Chemical Industries, Ltd.) onto an opposing planar transparent electrode, thereby to make STN-LCD display cell having a twist angle of 240 degrees. The mixed liquid crystal was poured into the cell, thereby to make the liquid crystal display device. The chiral material was added to the liquid crystal composition in such a proportion that the intrinsic helical pitch P of the mixed liquid crystal and the thickness d of the display cell satisfy the relations Δn·d=0.85 and d/P=0.50. Threshold voltage, sharpness, temperature dependence of the driving voltage and response speed of this mixed liquid crystal were measured.

Display characteristics of the STN-LCD having a twist angle of 240 degrees

Vth: Threshold voltage (V) at 20° C.

γ: Ratio of saturation voltage (Vsat) and Vth, namely sharpness at 20° C.

Δ(Vth)/Δ(T): Temperature dependence of the driving voltage

τr=τd: Response time when driven with duty ratio of 1/240

The liquid crystal display device having the IPS mode display characteristics was fabricated as follows. An alignment film was provided on a substrate whereon parallel chromium electrodes were formed at a space of 10 μm from each other. Also an alignment film was provided on a substrate having no electrode. These substrates were put together so as to form a cell having thickness of 4 μm and the liquid crystal was oriented in anti-parallel configuration. The cell was filled with the mixed liquid crystal thereby to constitute the liquid crystal display device. $V_{10}$, sharpness and response speed of this display apparatus were measured. Assume that light transmittance of this device when no voltage is applied ($T_0$) as 0%, assume the maximum light transmittance when the applied voltage is increased ($T_{100}$) to be 100%, assume the voltage that resulted in light transmittance of 50% as $V_{50}$, and assume the voltage that resulted in light transmittance of 10% as $V_{10}$.

Display characteristics of IPS mode $V_{10}$: Threshold voltage (V) at 20° C.

γ: Ratio of $V_{50}/V_{10}$, namely sharpness at 20° C.

τr=τd: Response time (msec)

Chemical stability of the composition was checked by heating acceleration test wherein an ampoule filled with 2 grams of the liquid crystal composition was subjected to substitution with nitrogen after evacuating the inside, before undergoing the test at 150° C. for one hour. Resistivity before the heating acceleration test, resistivity after heating acceleration test, voltage holding ratio before heating acceleration test and voltage holding ratio after heating acceleration test of the liquid crystal composition were measured.

One or plural kinds of compounds described in the Examples can be used in place of compounds represented by the general formulas (I-1) to (III-4) according to the desired purposes and applications. Specific compounds are represented by the form of the following examples.

Liquid Crystal Component A

Examples of the general formula (I-1) compound (2-1a): side chain group (I-6a), basic structure (I-11a), and polar group (I-71a)

Examples of the general formula (I-2) compound (2-2a): side chain group (I-6a), basic structure (I-21a), and polar group (I-72a)

Examples of the general formula (I-3) compound (2-3a): side chain group (I-6a), basic structure (I-31a), and polar group (I-72a)

Examples of the general formula (I-4) compound (2-4a): side chain group (I-6a), basic structure (I-41a), and polar group (I-72a)

Examples of the general formula (I-5) compound (2-5a): side chain group (I-6a), basic structure (I-51a), and polar group (I-73a)

Liquid Crystal Component B

Examples of the general formula (II-1) compound (2-1b): side chain group (I-6a), basic structure (II-1a), and polar group (II-5a)

Examples of the general formula (II-2) compound (2-2b): side chain group (I-6a), basic structure (II-2a), and polar group (II-5a)

Examples of the general formula (II-3) compound (2-3b): side chain group (I-6a), basic structure (II-3a), and polar group (II-5a)

Examples of the general formula (II-4) compound (2-4b): side chain group (I-6a), basic structure (II-4a), and polar group (II-5a)

Liquid Crystal Component C

Examples of the general formula (III-1) compound (2-1c): side chain group (III-5b), basic structure (III-1a), and side chain group (III-5b)

Examples of the general formula (III-2) compound (2-2c): side chain group (III-5b), basic structure (III-2a), and side chain group (III-5b)

Examples of the general formula (III-3) compound (2-3c): side chain group (III-5b), basic structure (III-3a), and side chain group (III-5b)

Examples of the general formula (III-4) compound (2-4c): side chain group (III-5b), basic structure (III-4a), and side chain group (III-5b)

Liquid Crystal Component A (2-1a)

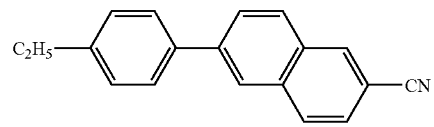

(2-2a)

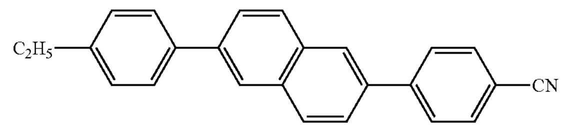

(2-3a)

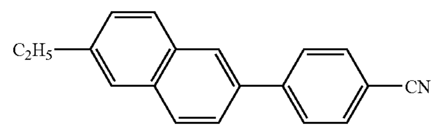

(2-4a)

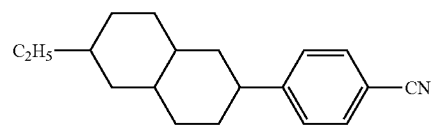

(2-5a)

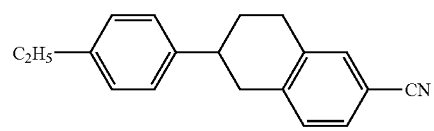

Liquid Crystal Component B (2-1b)

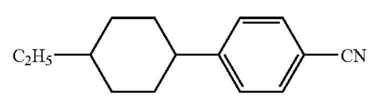

(2-2b)

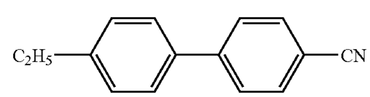

(2-3b)

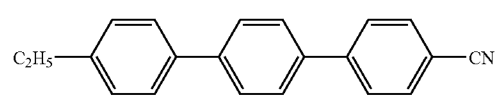

(2-4b)

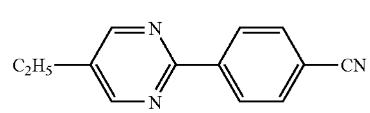

Liquid Crystal Component C (2-1c)

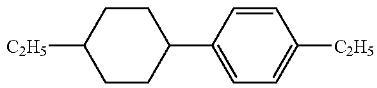

(2-2c)

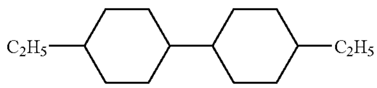

(2-3c)

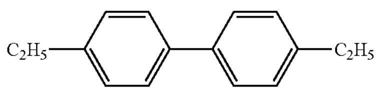

(2-4c)

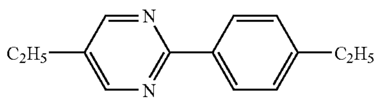

Example 1

A nematic liquid crystal composition (3-01) was prepared from

| | | |
|---|---|---|
| (3-0101) | 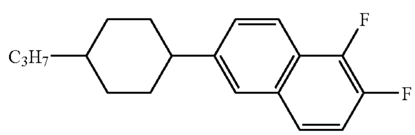 | 20 wt % |
| (3-0102) | 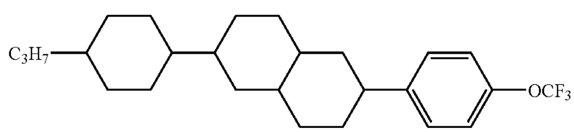 | 20 wt % |
| (3-0103) | 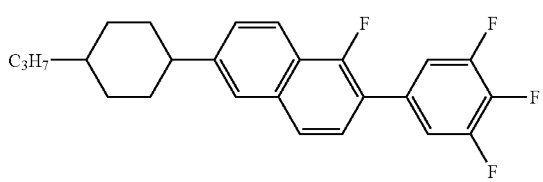 | 20 wt % |
| (3-0104) | 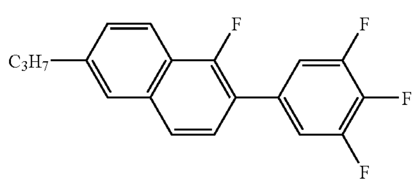 | 20 wt % |
| (3-0105) | 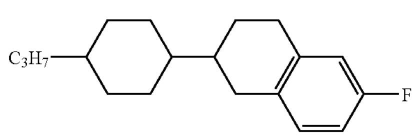 | 20 wt % |

and various properties of this composition were measured. The results are as follows.

Physical properties of liquid crystal composition $T_{N-I}$: 79.9° C.

$T_{\rightarrow N}$: −70.° C.

Δ∈: 9.8

Δn: 0.129

Reliability characteristics of liquid crystal composition

Resistivity before heating acceleration test: $1.3\times10^{13}$ Ω·cm

Resistivity after heating acceleration test: $7.0\times10^{12}$ Ω·cm

Voltage holding ratio before heating acceleration test: 99.5%

Voltage holding ratio after heating acceleration test: 98.6%

Display characteristics of the TN-LCD having a twist angle of 90 degrees (cell thickness 6 μm):

Vth: 1.30 V

γ: 1.140

The nematic liquid crystal composition is, despite of being composed of five kinds of components, capable of operating over a wide range of temperatures because $T_{N-I}$ is high and $T_{-N}$ is low, and has a low driving voltage compared to the value of dielectric constant anisotropy Δ∈, and is therefore capable of operating even for high resolution display corresponding to a large duty number. Also because this nematic liquid crystal composition has high resistivity and voltage holding ratio after heating acceleration test, it can be understood that high thermal stability is ensured. The active matrix liquid crystal display device that employs this composition as the basic constituent material has excellent characteristics with less leak current without occurrence of flicker.

Comparative Example 1

In order to demonstrate the superiority of the present invention, a mixed liquid crystal (b-01) made by substituting the liquid crystal component A of the nematic liquid crystal composition (3-01) described above with another compound. Specifically, the compound was replaced by a compound in which the naphthalene-2,6-diyl ring and tetrahydronaphthalene-2,6-diyl ring were substituted with a 1,4-phenylene group, and the decahydronaphthalene-2,6-diyl group is substituted with a 1,4cyclohexylene group. The results are as follows.

(b-0101)

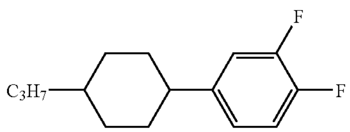

20 wt %

(b-0102)

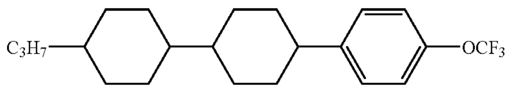

20 wt %

(b-0103)

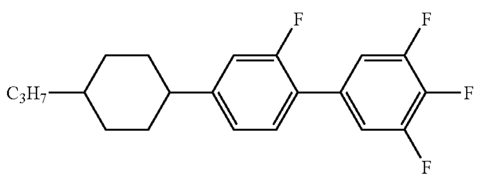

20 wt %

(b-0104)

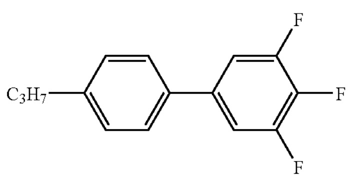

20 wt %

(b-0105)

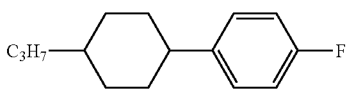

20 wt %

The mixed liquid crystal (b-01) is composed of the above compounds.

Physical properties of liquid crystal composition $T_{N-I}$: 0° C. or lower

Δ∈: Impossible to measure

Δn: Impossible to measure

η: Impossible to measure

Display characteristics of the TN-LCD having a twist angle of 90 degrees (cell thickness 6 μm)

Vth: Impossible to measure

γ: Impossible to measure

τr=τd: Impossible to measure

In contrast to the mixed liquid crystal (b-01) which has nematic phase at temperatures of 0° C. and lower and therefore cannot be used in an ordinary temperature range, the nematic liquid crystal composition (3-01) of the present invention proved to have high $T_{N-I}$ and a similar level of $T_{-N}$, and is therefore capable of operating over a wide range of temperatures with high co-solubility.

Example 2

A nematic liquid crystal composition (3-02) was prepared from (3-0201)

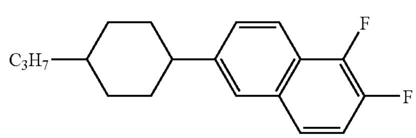

15 wt %

(3-0202)

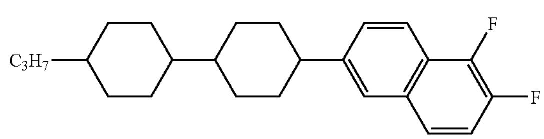

15 wt %

-continued

| | | |
|---|---|---|
| (3-0203) | 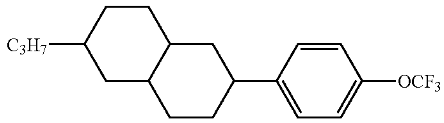 | 15 wt % |
| (3-0204) | 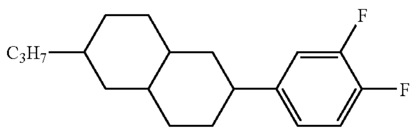 | 15 wt % |
| (3-0205) | 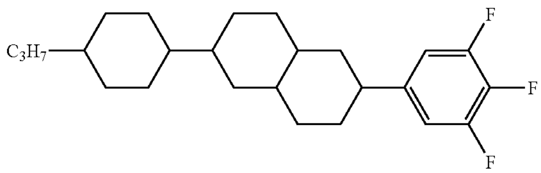 | 15 wt % |
| (3-0206) | 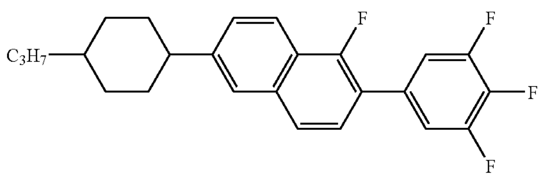 | 15 wt % |
| (3-0207) | 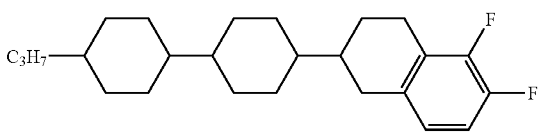 | 10 wt % |

and various properties of this composition were measured. The results are as follows.

Physical properties of the liquid crystal composition $T_{N\text{-}I}$: 119.2° C.

$T_{\rightarrow N}$: −70.° C.

Δ∈: 7.3

Δn: 0.104

Resistivity before heating acceleration test: $1.0\times10^{13}$ Ω·cm

Resistivity after heating acceleration test: $4.8\times10^{12}$ Ω·cm

Voltage holding ratio before heating acceleration test: 99.0%

Voltage holding ratio after heating acceleration test: 98.2%

Display characteristics of the TN-LCD having a twist angle of 90 degrees (cell thickness 6 μm):

Vth: 1.57 V

γ: 1.223

The nematic liquid crystal composition is, despite of being composed of seven kinds of components, capable of operating over a wide range of temperatures because $T_{N\text{-}I}$ is high and $T_{\text{-}N}$ is low, and has a low driving voltage compared to the value of dielectric constant anisotropy Δ∈, and is therefore capable of operating even for high resolution display corresponding to a large duty number. Also because this nematic liquid crystal composition has high resistivity and high voltage holding ratio after heating acceleration test, it can be understood that high thermal stability is ensured. The active matrix liquid crystal display device that employs this composition as the basic constituent material has excellent characteristics with less leak current without occurrence of flicker.

Example 3

A nematic liquid crystal composition (3-03) was prepared from

| | | |
|---|---|---|
| (3-0301) | 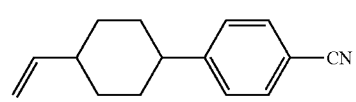 | 7 wt % |

-continued

| | | |
|---|---|---|
| (3-0302) | 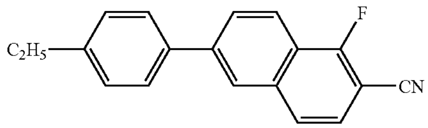 | 4 wt % |
| (3-0303) | 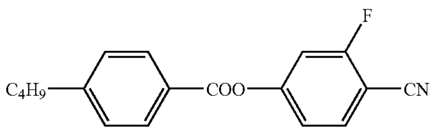 | 6 wt % |
| (3-0304) | 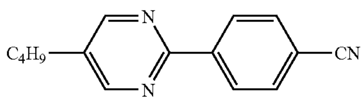 | 3 wt % |
| (3-0305) | 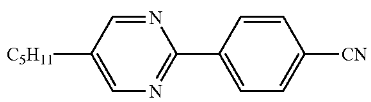 | 3 wt % |
| (3-0306) | 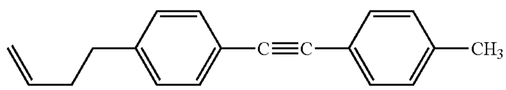 | 11 wt % |
| (3-0307) | 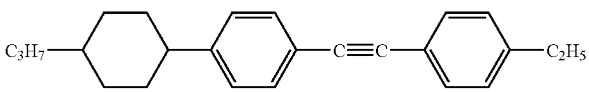 | 8 wt % |
| (3-0308) | 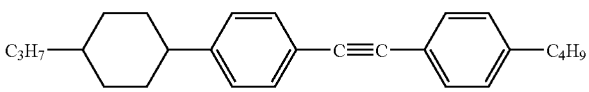 | 8 wt % |
| (3-0309) | 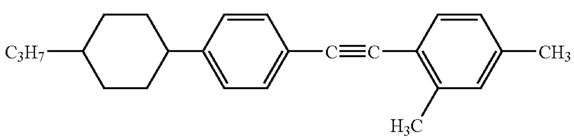 | 11 wt % |
| (3-0310) | 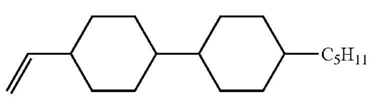 | 10 wt % |
| (3-0311) | 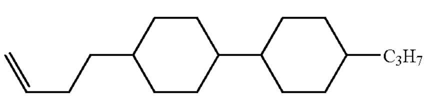 | 10 wt % |
| (3-0312) | 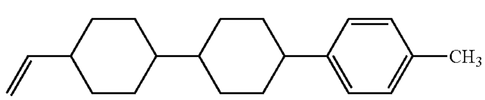 | 11 wt % |
| (3-0313) | 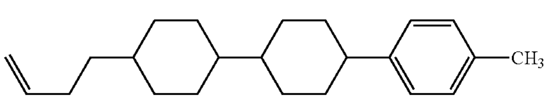 | 8 wt % |

and various properties of this composition were measured. The results are as follows.

$T_{N-I}$: 104.9° C.

$T_{\rightarrow N}$: −50.° C.

Vth: 2.09 V

γ: 1.15

Δ∈: 7.6

Δn: 0.168

η: 17.0 c.p.

The chiral material S-811 (manufactured by Merck) was added to this nematic liquid crystal composition, thereby preparing a mixed liquid crystal. An alignment film was formed by rubbing an organic film of Sun-Ever 610 (manufactured by Nissan Chemical Industries, Ltd.) onto an opposing planar transparent electrode, thereby to make STN-LCD display cell having a twist angle of 240 degrees. The mixed liquid crystal prepared as described above was poured into the cell, thereby to make a liquid crystal display device. Measurement of the display characteristics showed that the liquid crystal display device having temperature dependence of the driving voltage as low as 2.0 mV/° C. and STN-LCD display characteristics of excellent high-frequency time division characteristic was obtained. The chiral material was added to the liquid crystal composition in such a proportion that the intrinsic helical pitch P of the liquid crystal mixture and the thickness d of the display cell satisfy the relations Δ·d=0.85 and d/P=0.50. The STN-LCD was made in the same manner as described above.

Display characteristics of the STN-LCD having a twist angle of 240 degrees

Vth: 2.31 V

γ: 1.029

Δ(Vth)/Δ(T): 2.0 mV/° C. (T=5 to 40° C.)

τr=τd: 101 msec. (When driven with duty ratio of 1/240)

Comparative Example 2

In order to demonstrate the superiority of the present invention, a mixed liquid crystal (b-02) was made by substituting the liquid crystal component A of the nematic liquid crystal composition (3-03) described above with another compound. Specifically, the compound (3-03-02) was replaced by a compound represented by formula (b-0202) having excellent effects of decreasing the driving voltage and improving the temperature dependence of the driving voltage. The results are as follows.

| | | |
|---|---|---|
| (b-0201) | 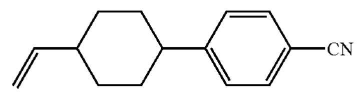 | 7 wt % |
| (b-0202) | 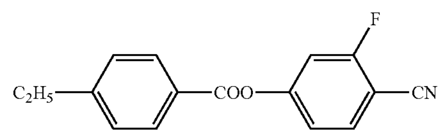 | 4 wt % |
| (b-0203) | 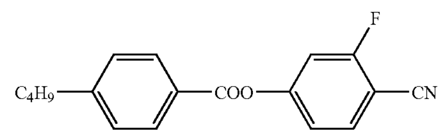 | 6 wt % |
| (b-0204) | 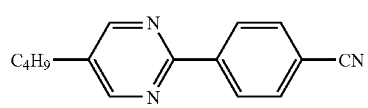 | 3 wt % |
| (b-0205) | 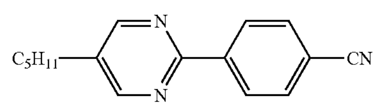 | 3 wt % |
| (b-0206) | 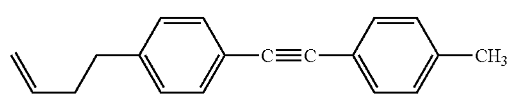 | 11 wt % |
| (b-0207) | 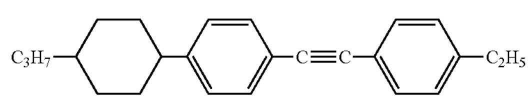 | 8 wt % |
| (b-0208) | 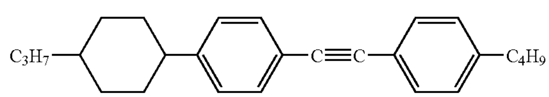 | 8 wt % |
| (b-0209) | 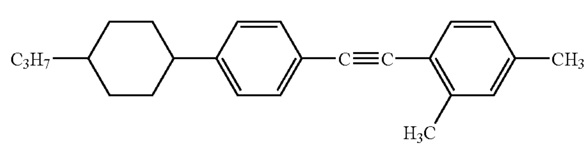 | 11 wt % |

-continued

| | | |
|---|---|---|
| (b-0210) | 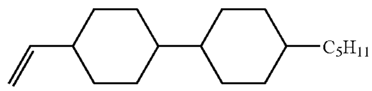 | 10 wt % |
| (b-0211) | 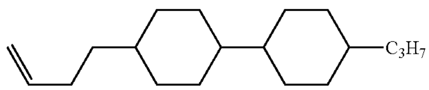 | 10 wt % |
| (b-0212) | 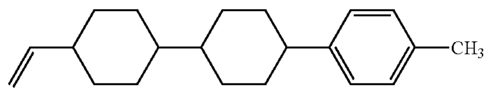 | 11 wt % |
| (b-0213) | 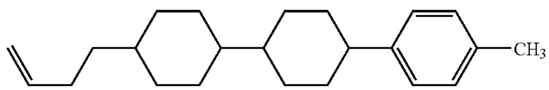 | 8 wt % |

$T_{N-I}$: 100.7° C.

$T_{\rightarrow N}$: −50.° C.

Vth: 2.08 V

Δ∈: 8.1

Δn: 0.165

η: 17.7 c.p.

In the same manner as in the case of the nematic liquid crystal composition (3-03), STN-LCD using the mixed liquid crystal (b-02) was prepared.

Display characteristics of the STN-LCD having a twist angle of 240 degrees

Vth: 2.31V

γ: 1.039

Δ(Vth)/Δ(T): 2.8 mV/° C. (T=5 to 40° C.)

τr=τd: 138. msec. (When driven with duty ratio of 1/240)

As is apparent from comparison between the characteristics, the liquid crystal composition of the present invention reduces the temperature dependency of the threshold voltage by about 30% due to the liquid crystal component A in a small amount such as 4%, and also reduces the response speed by about 40%. The nematic liquid crystal composition of the present invention exhibited more improved effects compared to comparative liquid crystals.

Example 4

A nematic liquid crystal composition (3-04) was prepared from

| | | |
|---|---|---|
| (3-0401) | 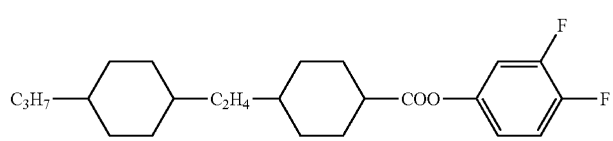 | 10 wt % |
| (3-0402) | 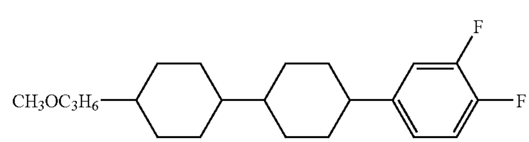 | 7 wt % |
| (3-0403) | 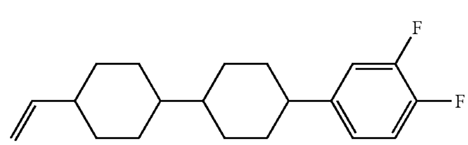 | 15 wt % |
| (3-0404) | 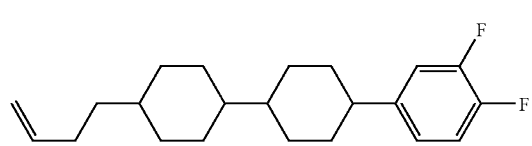 | 15 wt % |

-continued
| | | |
|---|---|---|
| (3-0405) | 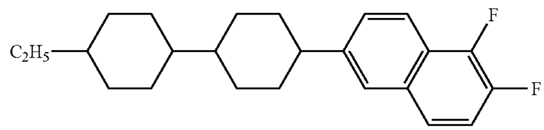 | 5 wt % |
| (3-0406) | 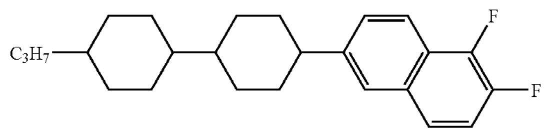 | 5 wt % |
| (3-0407) | 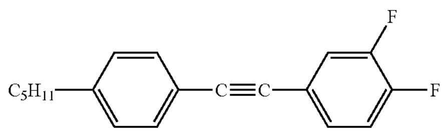 | 5 wt % |
| (3-0408) | 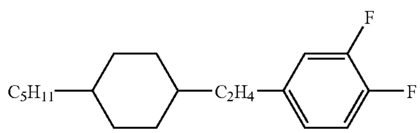 | 5 wt % |
| (3-0409) | 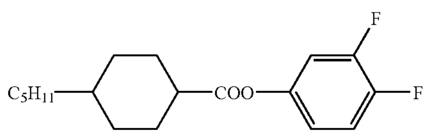 | 5 wt % |
| (3-0410) | 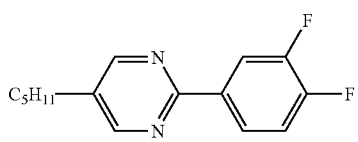 | 5 wt % |
| (3-0411) | 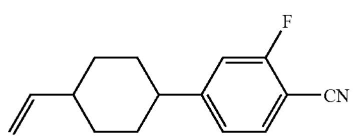 | 5 wt % |
| (3-0412) | 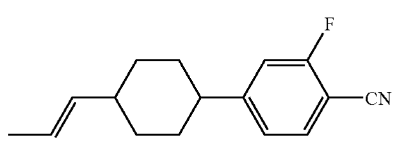 | 5 wt % |
| (3-0413) | 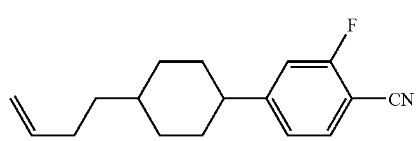 | 5 wt % |
| (3-0414) | 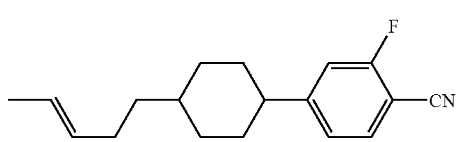 | 5 wt % |
| (3-0415) | 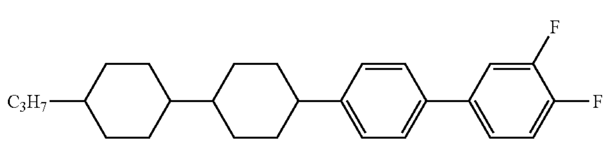 | 3 wt % | and various properties of this composition were measured. The results are as follows.

$T_{N-I}$: 66.6° C.

$T_{\rightarrow N}$: −30.° C.

Vth 1.42 V

Δ∈: 9.4

Δn: 0.097

In the same manner as in the case of the nematic liquid crystal composition (3-04), except that the compound (2-04-01) described below was used in place of the compound (3-0406) in the nematic liquid crystal composition (3-04) of this Example, a nematic liquid crystal composition (3-04-01) was prepared. Also in the same manner as in the case of the nematic liquid crystal composition (3-04), except that the respective compounds (2-04-02) to (2-04-22) described below were used in place of the compound (3-0406) in the nematic liquid crystal composition (3-04) of this Example, nematic liquid crystal compositions (3-04-02) to (3-04-22) were prepared. The display characteristics of these nematic liquid crystal compositions (3-04-01) to (3-04-22) showed good results, similar to this Example. Particularly, the nematic liquid crystal composition (3-04-08) was superior in response characteristics, while the nematic liquid crystal compositions (3-04-01), (3-04-03), (3-04-06), (3-04-11), (3-04-12), (3-04-14), (3-04-16), (3-04-19) and (3-04-22) exhibited the reduced driving voltage of about 1.2 V.

(2-04-01)

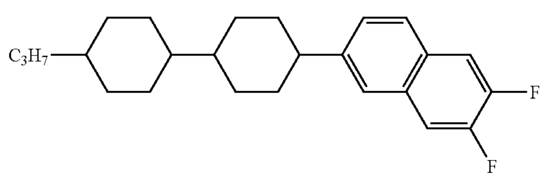

(2-04-02)

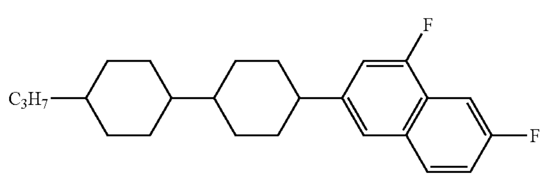

(2-04-03)

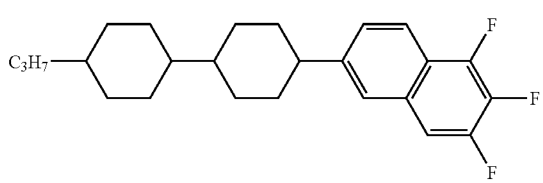

(2-04-04)

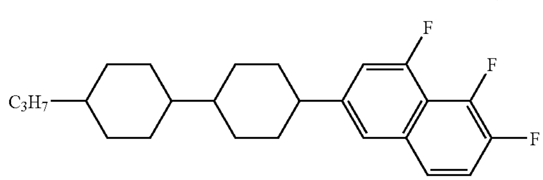

-continued (2-04-05)

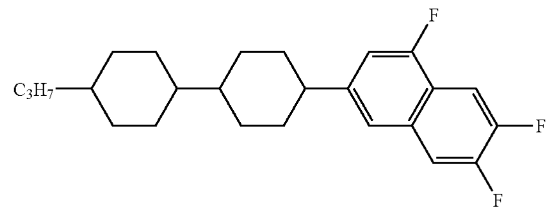

(2-04-06)

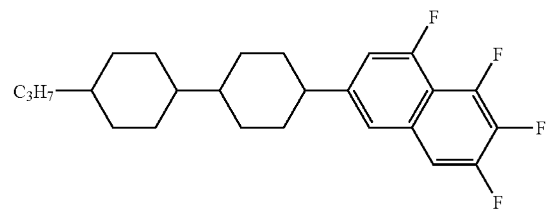

(2-04-07)

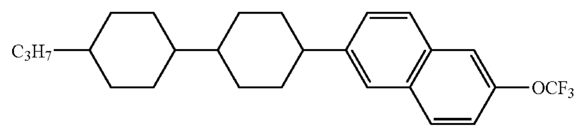

(2-04-08)

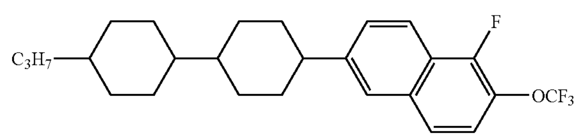

(2-04-09)

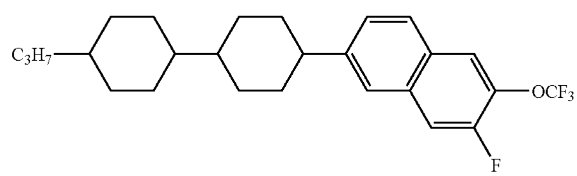

(2-04-10)

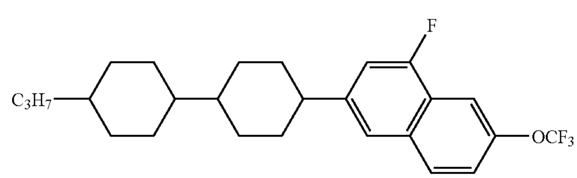

(2-04-11)

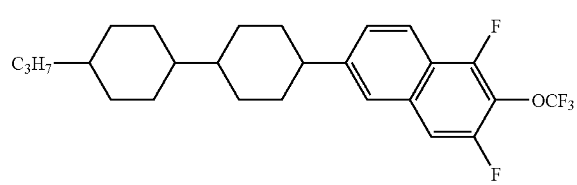

(2-04-12)

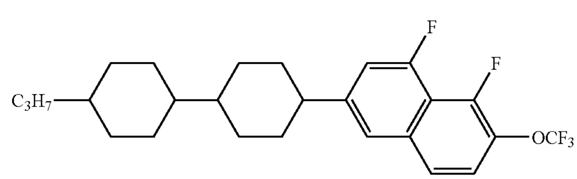

-continued
(2-04-13)
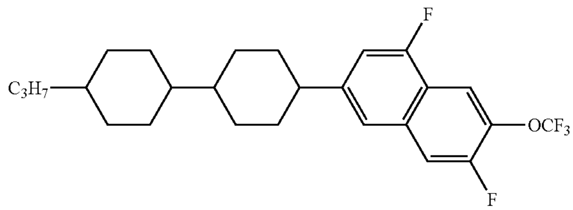
(2-04-14)
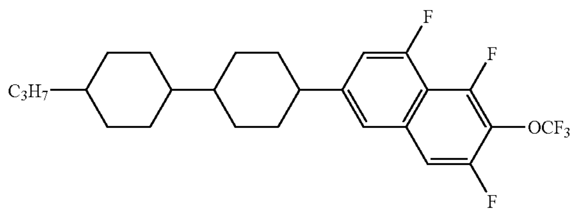
(2-04-15)
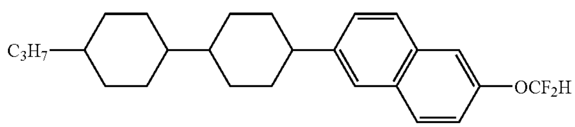
(2-04-16)
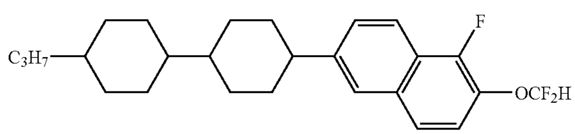
(2-04-17)
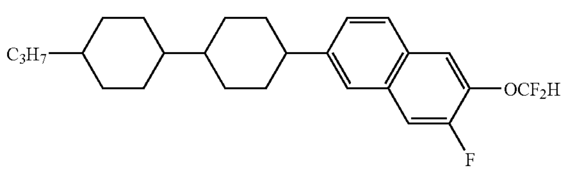
-continued
(2-04-18)
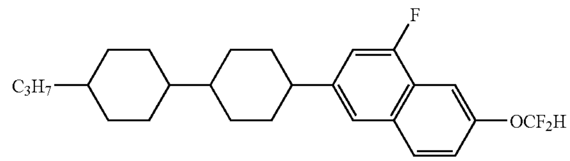
(2-04-19)
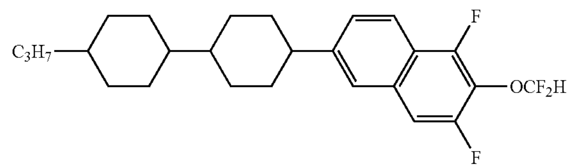
(2-04-20)
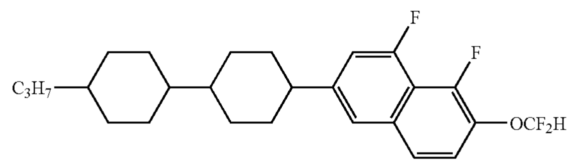
(2-04-21)
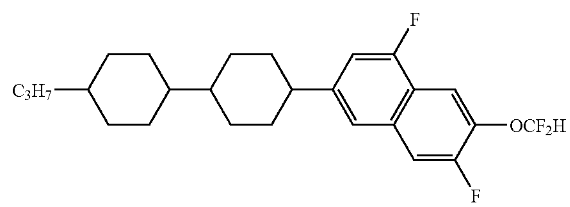
(2-04-22)
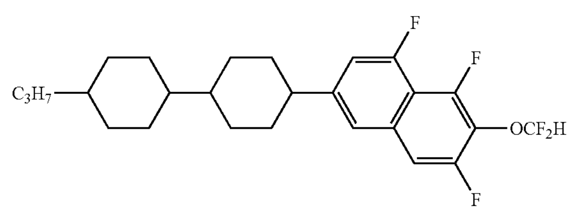
Example 5
A nematic liquid composition (3-05) was prepared from
| | | |
|---|---|---|
| (3-0501) | 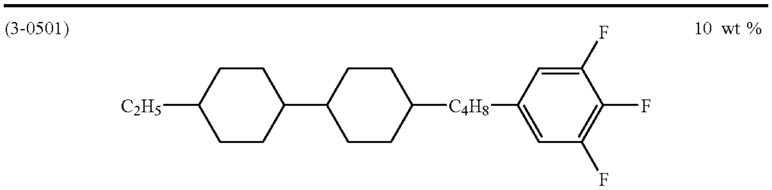 | 10 wt % |
| (3-0502) | 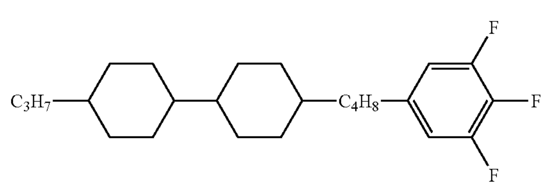 | 10 wt % |

-continued

| | | |
|---|---|---|
| (3-0503) | 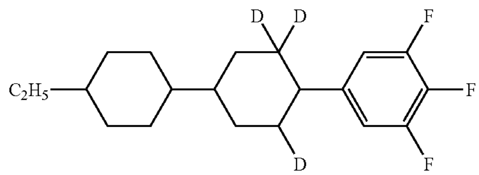 | 5 wt % |
| (3-0504) | 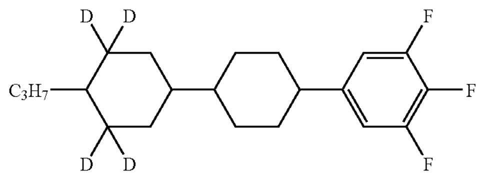 | 5 wt % |
| (3-0505) | 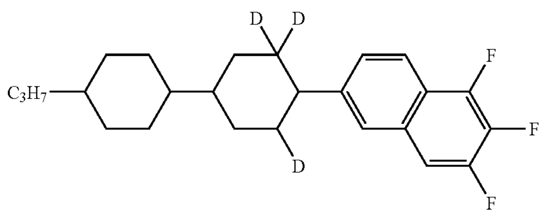 | 10 wt % |
| (3-0506) | 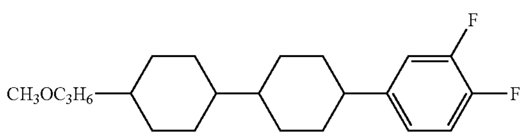 | 10 wt % |
| (3-0507) | 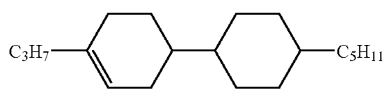 | 10 wt % |
| (3-0508) | 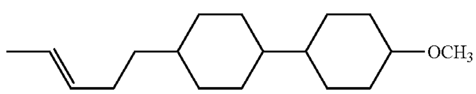 | 10 wt % |
| (3-0509) | 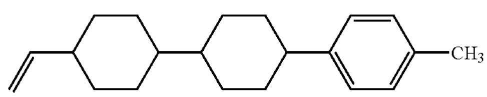 | 10 wt % |
| (3-0510) | 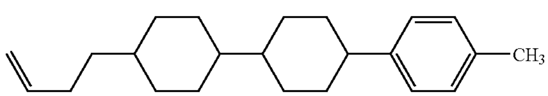 | 10 wt % |
| (3-0511) | 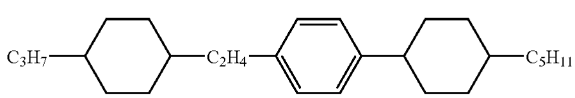 | 10 wt % |

and various properties of this composition were measured. The results are as follows. Because this nematic liquid crystal composition has high resistivity and high voltage holding ratio after heating acceleration test, it can be understood that high thermal stability is ensured. New nematic liquid crystal composition that employs this composition as the basic constituent material of the present invention was prepared and the active matrix liquid crystal display device that employs the liquid crystal composition was made. As a result, it has been confirmed that the device has excellent characteristics with less leak current without occurrence of flicker.

$T_{N\text{-}I}$: 103.7° C.

$T_{\rightarrow N}$: −70.° C.

Vth: 2.66 V

γ: 1.16

Δε: 4.1

Δn: 0.079

Resistivity before heating acceleration test: $1.1\times10^{13}$ Ω·cm

Resistivity after heating acceleration test: $7.3\times10^{12}$ Ω·cm

Voltage holding ratio before heating acceleration test: 99.0%

Voltage holding ratio after heating acceleration test: 98.8%

Example 6
A nematic liquid crystal composition (3-06) was prepared from
| | | |
|---|---|---|
| (3-0601) | 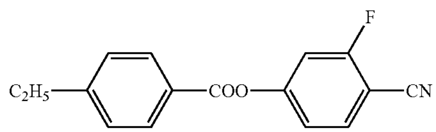 | 8 wt % |
| (3-0602) | 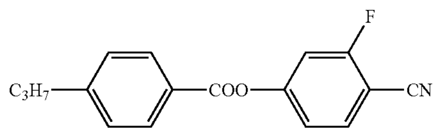 | 5 wt % |
| (3-0603) | 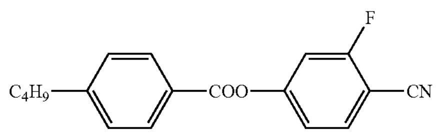 | 16 wt % |
| (3-0604) | 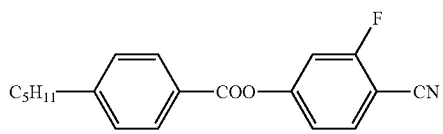 | 7 wt % |
| (3-0605) | 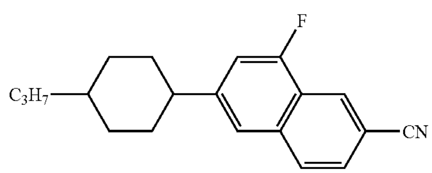 | 11 wt % |
| (3-0606) | 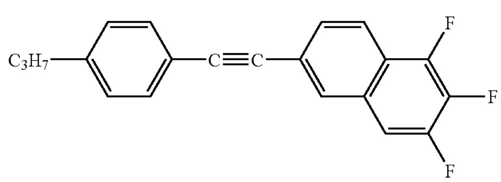 | 7 wt % |
| (3-0607) | 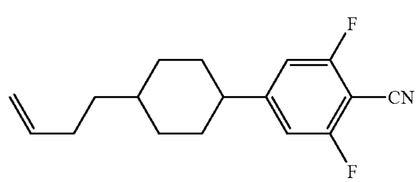 | 3 wt % |
| (3-0608) | 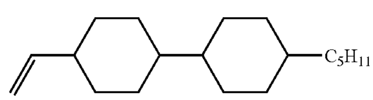 | 8 wt % |
| (3-0609) | 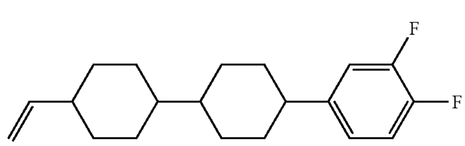 | 19 wt % |
| (3-0610) | 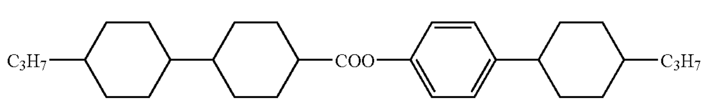 | 6 wt % |

-continued
| | | |
|---|---|---|
| (3-0611) | 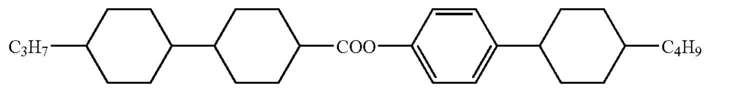 | 6 wt % |
| (3-0612) | 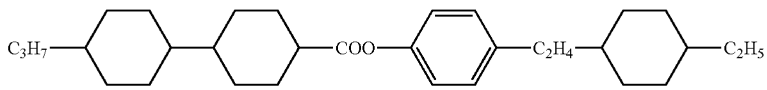 | 4 wt % |
and various properties of this composition were measured. The results are as follows.
$T_{N-I}$: 92.67° C.
$T_{\rightarrow N}$: −70.° C.
Vth: 0.88 V
Δ∈: 19.8
Δn 0.139
Display characteristics of the STN-LCD having a twist angle of 240 degrees
Vth: 0.93 V
γ: 1.021
Δ(Vth)/Δ(T): 1.9 mV/° C. (T=5 to 40° C.)
Example 7
A nematic liquid crystal composition (3-07) was prepared
| | | |
|---|---|---|
| (3-0701) | 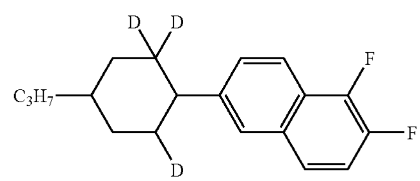 | 5 wt % |
| (3-0702) | 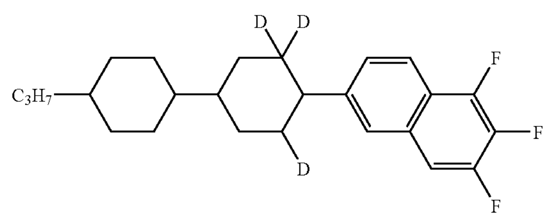 | 5 wt % |
| (3-0703) | 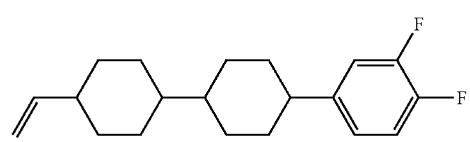 | 10 wt % |
| (3-0704) | 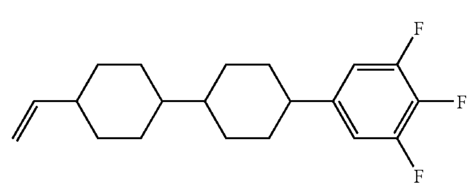 | 10 wt % |
| (3-0705) | 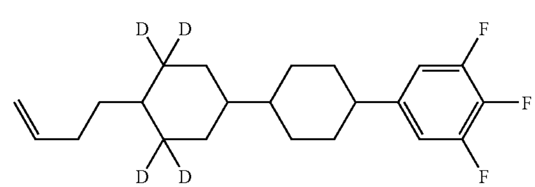 | 10 wt % |

-continued
| | | |
|---|---|---|
| (3-0706) | 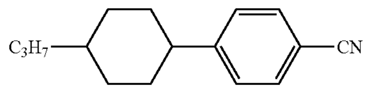 | 10 wt % |
| (3-0707) | 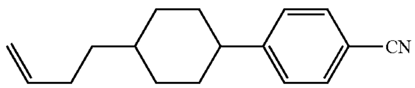 | 10 wt % |
| (3-0708) | 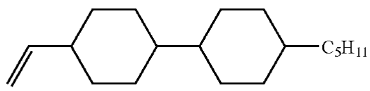 | 10 wt % |
| (3-0709) | 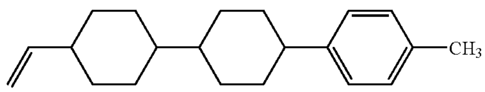 | 10 wt % |
| (3-0710) | 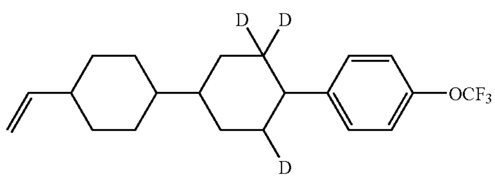 | 10 wt % |
| (3-0711) | 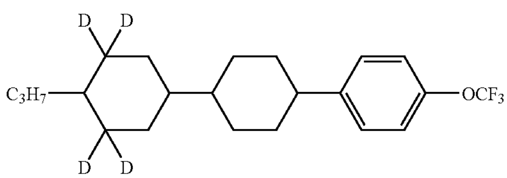 | 10 wt % |
and various properties of this composition were measured. The results are as follows.
$T_{N\text{-}I}$: 88.4° C.
$T_{\rightarrow N}$: −49.° C.
Vth: 1.81 V
Δn: 0.098
Example 8
A nematic liquid crystal composition (3-08) was prepared from
| | | |
|---|---|---|
| (3-0801) | 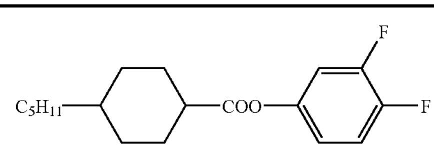 | 10 wt % |
| (3-0802) | 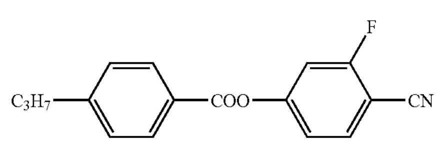 | 5 wt % |
| (3-0803) | 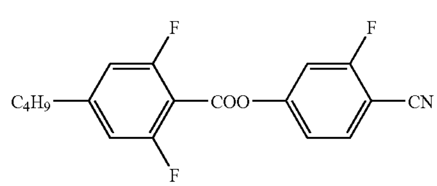 | 5 wt % |

-continued
| | | |
|---|---|---|
| (3-0804) | 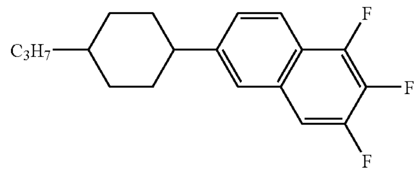 | 5 wt % |
| (3-0805) | 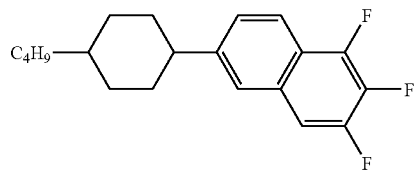 | 10 wt % |
| (3-0806) | 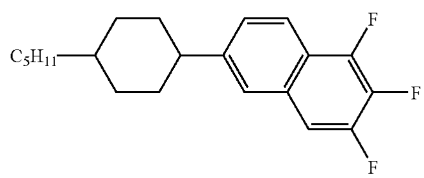 | 10 wt % |
| (3-0807) | 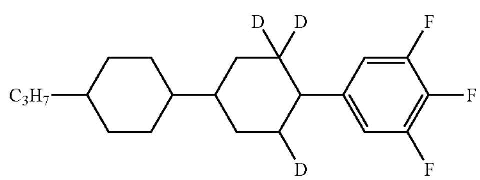 | 7 wt % |
| (3-0808) | 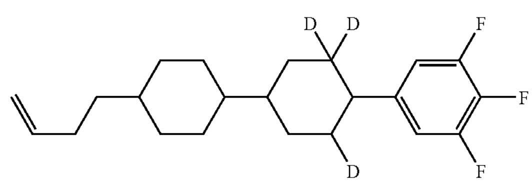 | 10 wt % |
| (3-0809) | 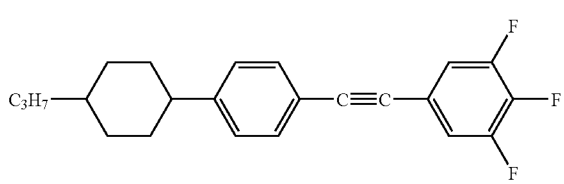 | 10 wt % |
| (3-0810) | 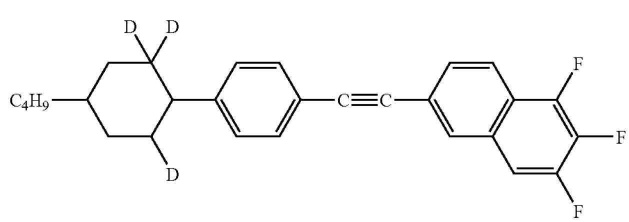 | 8 wt % |
| (3-0811) | 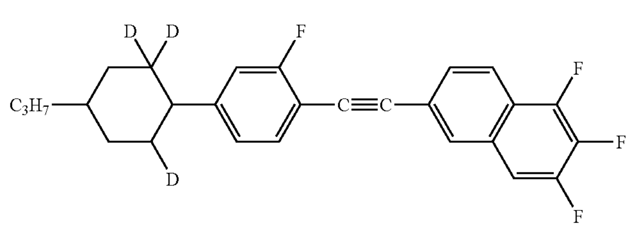 | 10 wt % |

-continued
| | | |
|---|---|---|
| (3-0812) | 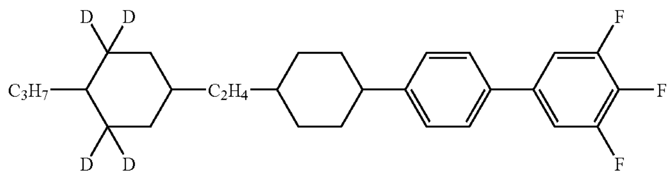 | 10 wt % |
and various properties of this composition were measured. The results are as follows.
$T_{N-I}$: 85.6° C.
$T_{\rightarrow N}$: −70.° C.
Vth: 1.07 V
γ: 1.15
Δ∈: 17.4
Δn: 0.143
Example 9
A nematic liquid crystal composition (3-09) was prepared from
| | | |
|---|---|---|
| (3-0901) | 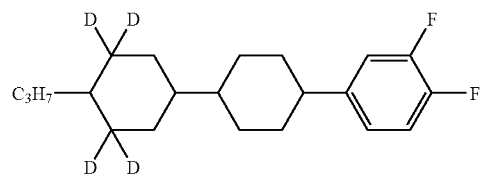 | 12 wt % |
| (3-0902) | 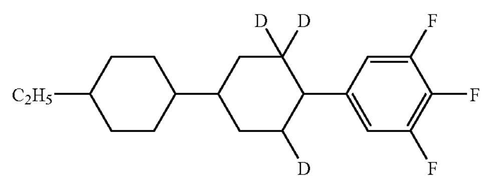 | 6 wt % |
| (3-0903) | 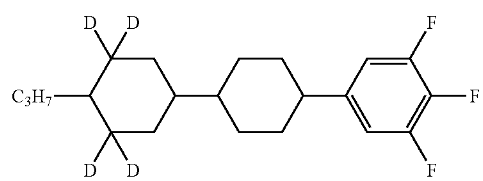 | 6 wt % |
| (3-0904) | 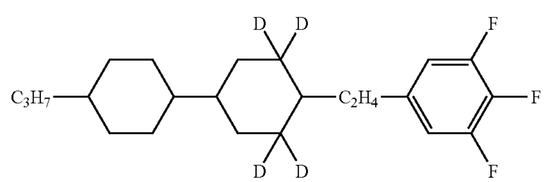 | 12 wt % |
| (3-0905) | 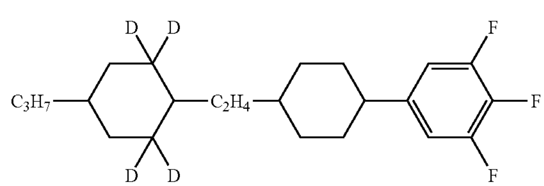 | 12 wt % |

-continued

| | | |
|---|---|---|
| (3-0906) | 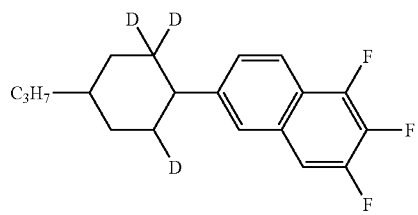 | 12 wt % |
| (3-0907) | 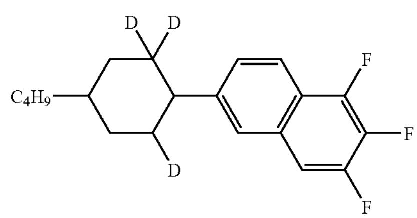 | 12 wt % |
| (3-0908) | 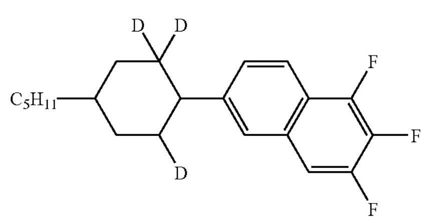 | 12 wt % |
| (3-09*09) | 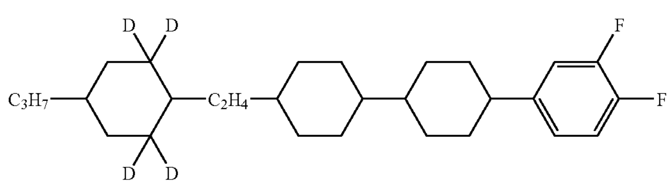 | 12 wt % |
| (3-0910) | 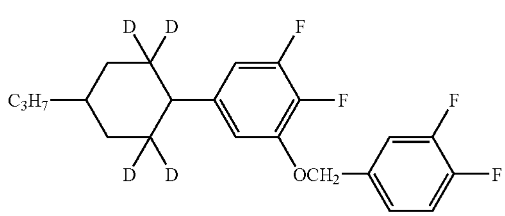 | 4 wt % |

and various properties of this composition were measured. The results are as follows. Because this nematic liquid crystal composition has high resistivity and high voltage holding ratio after heating acceleration test, it can be understood that high thermal stability is ensured. New nematic liquid crystal composition that employs this composition as the basic constituent material of the present invention was prepared and the active matrix liquid crystal display device that employs the liquid crystal composition was made. As a result, it has been confirmed that the device has excellent characteristics with less leak current without occurrence of flicker.

$T_{N-I}$: 84.5° C.

$T_{\rightarrow N}$: −70.° C.

Vth: 1.02 V

γ: 1.15

Δε: 9.6

Δn: 0.099

Resistivity before heating acceleration test: $5.0\times10^{12}$ Ω·cm

Resistivity after heating acceleration test: $2.1\times10^{12}$ Ω·cm

Voltage holding ratio before heating acceleration test: 98.8%

Voltage holding ratio after heating acceleration test: 98.5%

Example 10
A nematic liquid crystal composition (3-10) was prepared from
| | | |
|---|---|---|
| (3-1001) | 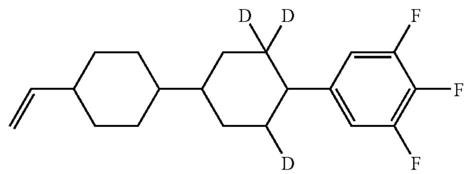 | 15 wt % |
| (3-1002) | 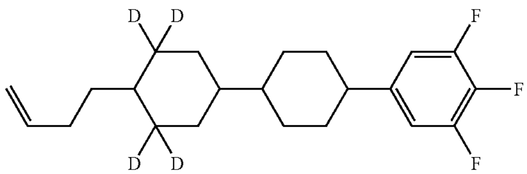 | 10 wt % |
| (3-1003) | 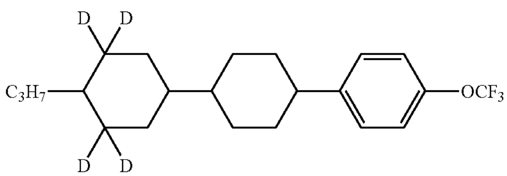 | 10 wt % |
| (3-1004) | 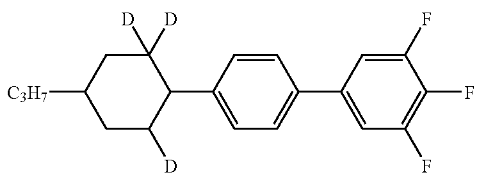 | 5 wt % |
| (3-1005) | 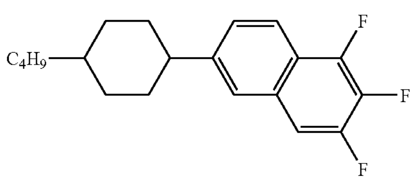 | 10 wt % |
| (3-1006) | 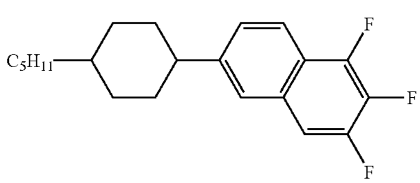 | 15 wt % |
| (3-1007) | 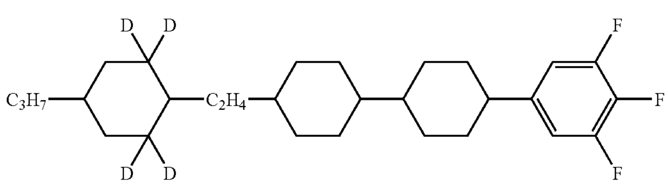 | 5 wt % |
| (3-1008) | 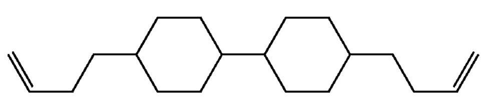 | 10 wt % |
| (3-1009) | 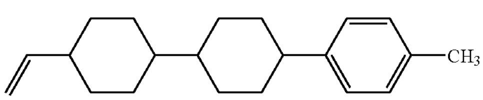 | 10 wt % |

-continued

| | | |
|---|---|---|
| (3-1010) | 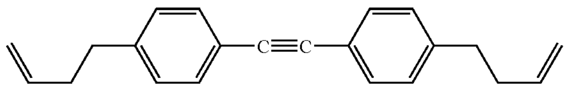 | 10 wt % |

and various properties of this composition were measured. The results are as follows. Because this nematic liquid crystal composition has high resistivity and high voltage holding ratio after heating acceleration test, it can be understood that high thermal stability is ensured. New nematic liquid crystal composition that employs this composition as the basic constituent material of the present invention was prepared and the active matrix liquid crystal display device that employs the liquid crystal composition was made. As a result, it has been confirmed that the device has excellent characteristics with less leak current without occurrence of flicker.

$T_{N\text{-}I}$: 87.5° C.

$T_{\rightarrow N}$: −70.° C.

Vth: 1.67 V

γ: 1.16

Δ∈: 7.1

Δn: 0.118

Resistivity before heating acceleration test: $3.8\times10^{13}$ Ω·cm

Resistivity after heating acceleration test: $9.7\times10^{12}$ Ω·cm

Voltage holding ratio before heating acceleration test: 99.1%

Voltage holding ratio after heating acceleration test: 98.8%

Example 11

A nematic liquid crystal composition (3-11) was prepared from

| | | |
|---|---|---|
| (3-1101) | 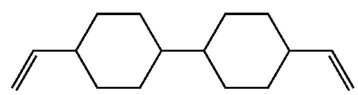 | 10 wt % |
| (3-1102) | 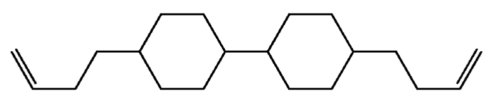 | 10 wt % |
| (3-1103) | 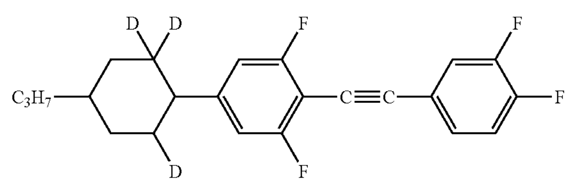 | 15 wt % |
| (3-1104) | 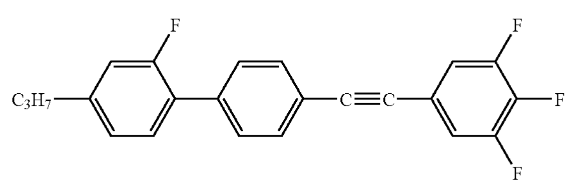 | 10 wt % |
| (3-1105) | 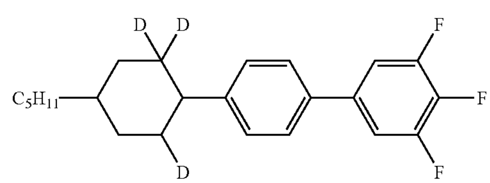 | 10 wt % |
| (3-1106) | 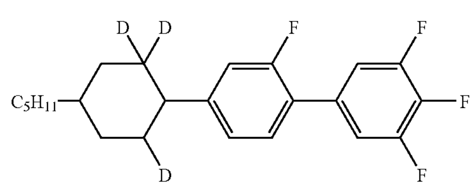 | 5 wt % |

-continued

| | | |
|---|---|---|
| (3-1107) | 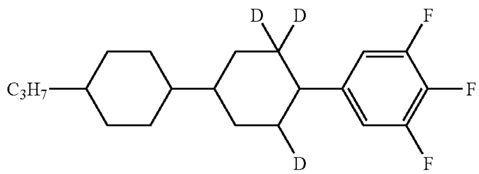 | 5 wt % |
| (3-1108) | 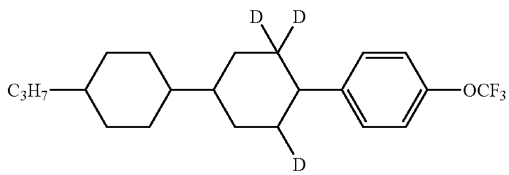 | 10 wt % |
| (3-1109) | 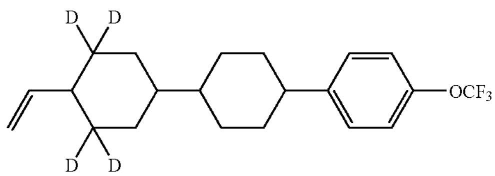 | 10 wt % |
| (3-1110) | 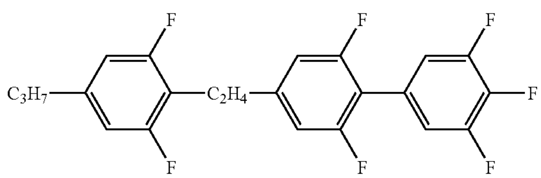 | 3 wt % |
| (3-1111) | 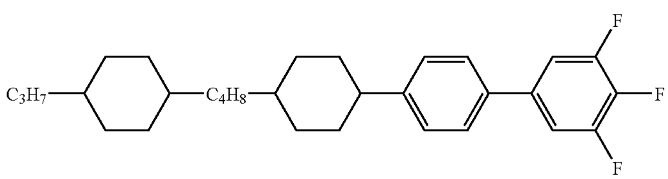 | 5 wt % |
| (3-1112) | 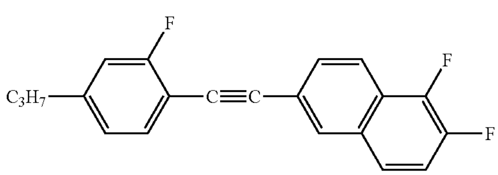 | 7 wt % |

and various properties of this composition were measured. The results are as follows. Because this nematic liquid crystal composition has high resistivity and high voltage holding ratio after heating acceleration test, it can be understood that high thermal stability is ensured. New nematic liquid crystal composition that employs this composition as the basic constituent material of the present invention was prepared and the active matrix liquid crystal display device that employs the liquid crystal composition was made. As a result, it has been confirmed that the device has excellent characteristics with less leak current without occurrence of flicker.

$T_{N-I}$: 80.0° C.

$T_{\rightarrow N}$: −70.° C.

Vth: 1.38 V

γ: 1.16

Δ∈: 9.3

Δn: 0.131

Resistivity before heating acceleration test: $2.2\times10^{13}$ Ω·cm

Resistivity after heating acceleration test: $8.3\times10^{12}$ Ω·cm

Voltage holding ratio before heating acceleration test: 99.0%

Voltage holding ratio after heating acceleration test: 98.5%

Example 12

A nematic liquid crystal composition (3-12) was prepared from

| | | |
|---|---|---|
| (3-1201) | 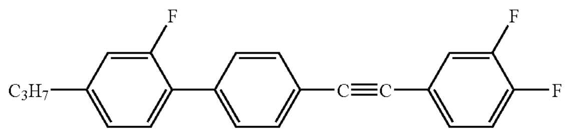 | 15 wt % |
| (3-1202) | 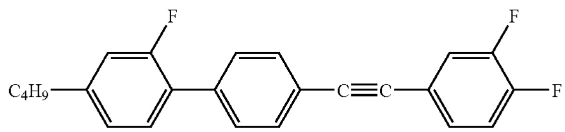 | 15 wt % |
| (3-1203) | 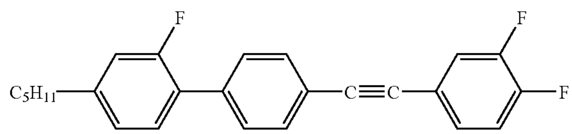 | 15 wt % |
| (3-1204) | 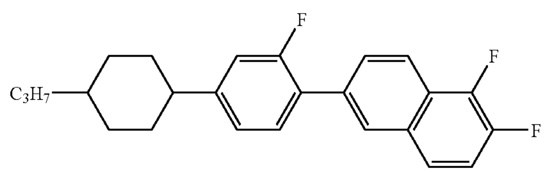 | 13 wt % |
| (3-1205) | 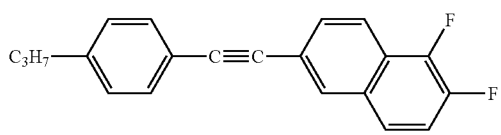 | 7 wt % |
| (3-1206) | 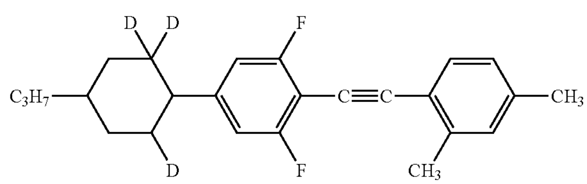 | 13 wt % |
| (3-1207) | 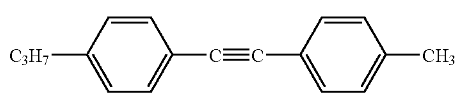 | 15 wt % |
| (3-1208) | 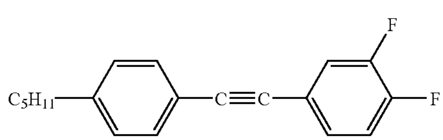 | 5 wt % |
| (3-1209) | 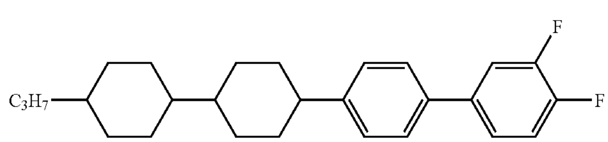 | 2 wt % |

and various properties of this composition were measured. The results are as follows. Because this nematic liquid crystal composition has high resistivity and high voltage holding ratio after heating acceleration test, it can be understood that high thermal stability is ensured. New nematic liquid crystal composition that employs this composition as the basic constituent material of the present invention was prepared. The resulting nematic liquid crystal composition can be utilized in the active matrix liquid crystal display device that employs the liquid crystal composition.

$T_{N-I}$: 106.4° C.

$T_{\rightarrow N}$: −20.° C.

Vth: 2.10 V

γ: 1.15

Δ∈: 8.1

Δn: 0.276

Resistivity before heating acceleration test: $6.5\times10^{12}$ Ω·cm

Resistivity after heating acceleration test: $1.2\times10^{12}$ Ω·cm

Voltage holding ratio before heating acceleration test: 98.8%

Voltage holding ratio after heating acceleration test: 98.0%

This nematic liquid crystal composition was used to make TN-LCD having cell thickness d of 1.8 μm and display characteristics thereof were measured. A liquid crystal display device having a threshold voltage of 1.79 V and a response speed of 2.4 msec. was obtained.

In the same manner as in the case of the nematic liquid crystal composition (3-12), except that the compound (2-12-01) described below was used in place of the compound (3-1205) in the nematic liquid crystal composition (3-12) of this Example, a nematic liquid crystal composition (3-12-01) was prepared. Also in the same manner as in the case of the nematic liquid crystal composition (3-12), except that the respective compounds (2-12-02) to (2-12-22) described below were used in place of the compound (3-1205) in the nematic liquid crystal composition (3-12) of this Example, nematic liquid crystal compositions (3-12-02) to (3-12-22) were prepared. The display characteristics of these nematic liquid crystal compositions (3-12-02) to (3-12-22) showed good results, similar to this Example.

(2-12-01)

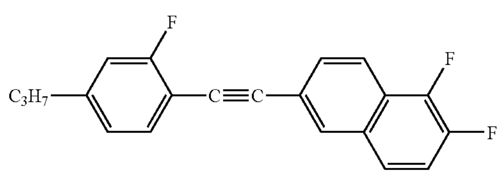

(2-12-02)

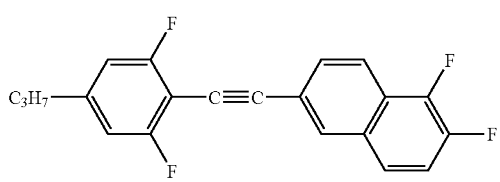

(2-12-03)

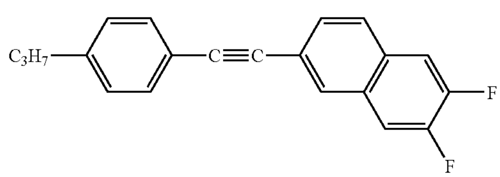

(2-12-04)

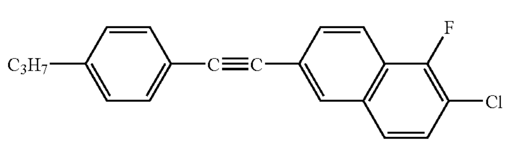

-continued (2-12-05)

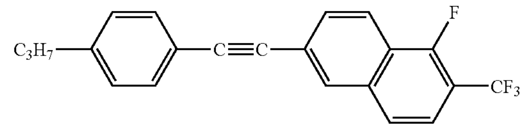

(2-12-06)

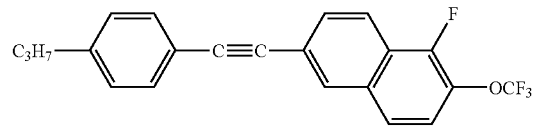

(2-12-07)

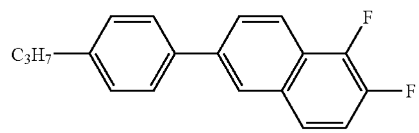

(2-12-08)

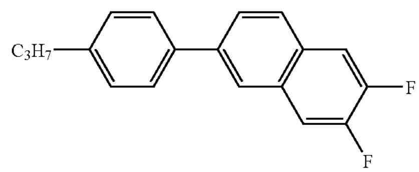

(2-12-09)

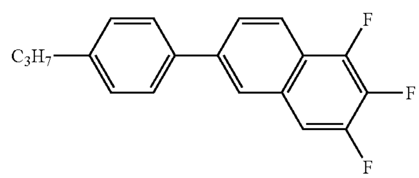

(2-12-10)

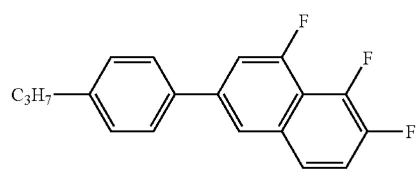

(2-12-11)

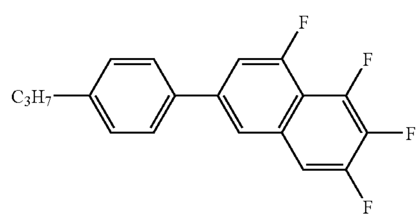

(2-12-12)

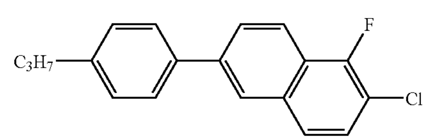

(2-12-13)

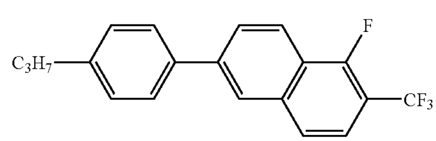

-continued
(2-12-14)
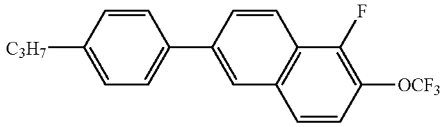
(2-12-15)
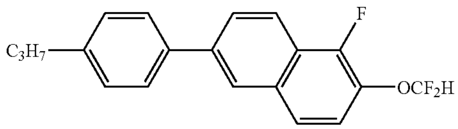
(2-12-16)
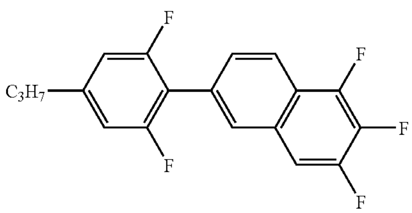
(2-12-17)
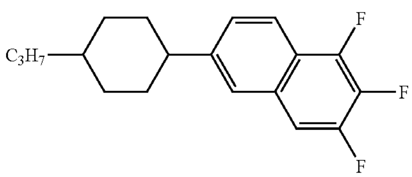
(2-12-18)
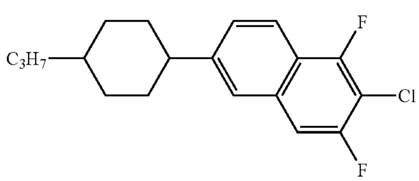
-continued
(2-12-19)
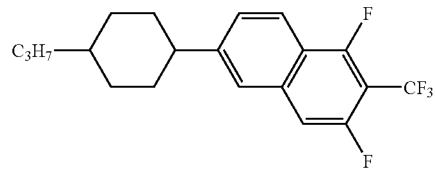
(2-12-20)
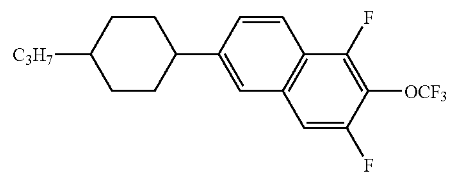
(2-12-21)
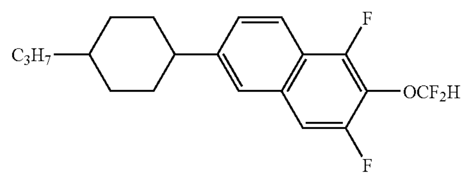
(2-12-22)
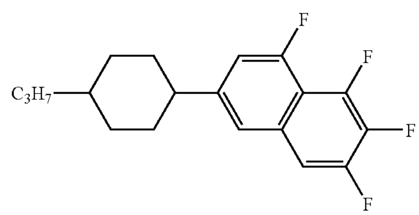
Example 13
A nematic liquid crystal composition (3-13) was prepared from
| | | |
|---|---|---|
| (3-1301) | 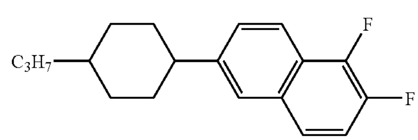 | 40 wt % |
| (3-1302) | 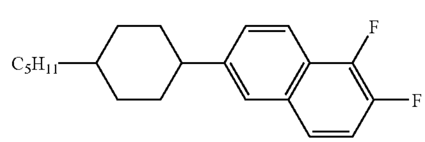 | 40 wt % |
| (3-1303) | 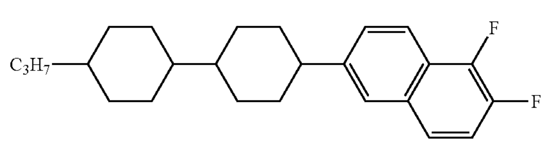 | 20 wt % | and various properties of this composition were measured. The results are as follows. Because this nematic liquid crystal composition has high resistivity and high voltage holding ratio after heating acceleration test, it can be understood that high thermal stability is ensured. New nematic liquid crystal composition that employs this composition as the basic constituent material of the present invention was prepared. The resulting nematic liquid crystal composition can be utilized in the active matrix liquid crystal display device that employs the liquid crystal composition.

$T_{N-I}$: 81.6° C.

$T_{\rightarrow N}$: −70.° C.

Vth: 1.79 V

γ: 1.18

Δ∈: 6.0

Δn: 0.123

Resistivity before heating acceleration test: $1.5\times10^{13}$ Ω·cm

Resistivity after heating acceleration test: $7.3\times10^{12}$ Ω·cm

Voltage holding ratio before heating acceleration test: 99.1%

Voltage holding ratio after heating acceleration test: 98.4%

Comparative Example 3

In order to demonstrate the superiority of the present invention, a mixed liquid crystal (b-03) made by substituting the liquid crystal component A of the nematic liquid crystal composition (3-13) described above with another compound. Specifically, the compound was replaced by a compound in which the partial structure of naphthalene-2,6-diyl is substituted with that of 1,4-phenylene. The results are as follows.

(b-0301)

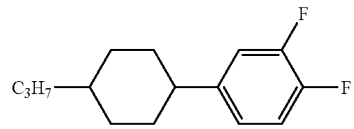

40 wt %

(b-0302)

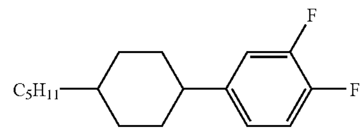

40 wt %

(b-0303)

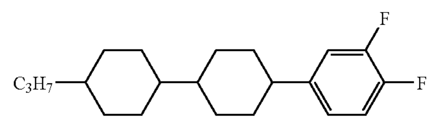

20 wt %

$T_{N-I}$: Room temperature or lower

Vth: Impossible to measure

γ: Impossible to measure

Δ∈: Impossible to measure

Δn: Impossible to measure

Example 14

A nematic liquid crystal composition (3-14) was prepared from (3-1401)

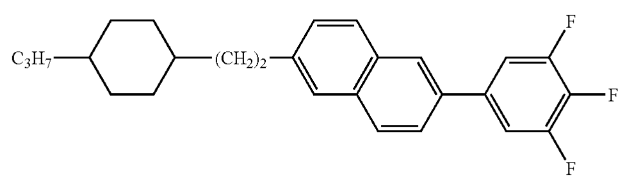

20 wt %

(3-1402)

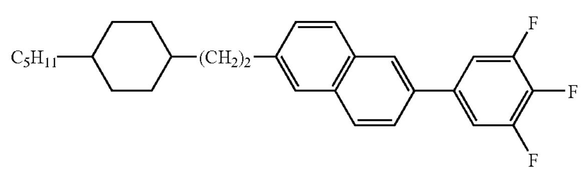

20 wt %

(3-1403)

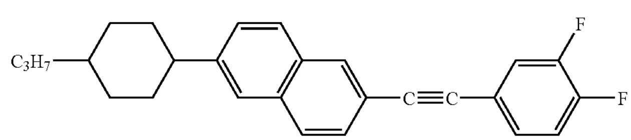

15 wt %

(3-1404)

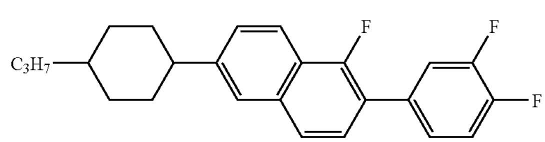

15 wt %

-continued

| | | |
|---|---|---|
| (3-1405) | 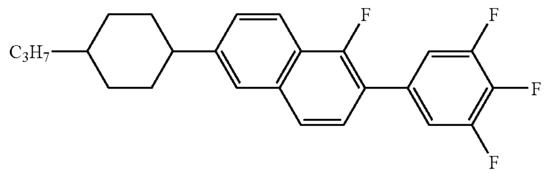 | 15 wt % |
| (3-1406) | 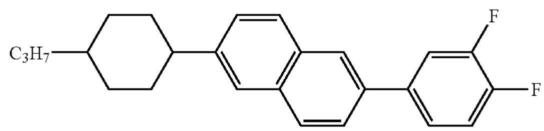 | 15 wt % |

and various properties of this composition were measured. The results are as follows.

Physical properties of the liquid crystal composition $T_{N-I}$: 168.8° C.

$T_{\rightarrow N}$: −40.° C.

Δε: 9.2

Δn: 0.229

Resistivity before heating acceleration test: $1.1\times10^{13}$ Ω·cm

Resistivity after heating acceleration test: $7.4\times10^{12}$ Ω·cm

Voltage holding ratio before heating acceleration test: 99.0%

Voltage holding ratio after heating acceleration test: 98.2%

Display characteristics of the TN-LCD having a twist angle of 90 degrees (cell thickness 6 μm):

Vth: 2.15 V

γ: 1.17

The nematic liquid crystal composition is capable of operating over a wide range of temperatures because $T_{N-I}$ is high and $T_{\rightarrow N}$ is low, and has a large Δn, and is therefore capable of improving response. Also because this nematic liquid crystal composition has high resistivity and high voltage holding ratio after heating acceleration test, it can be understood that high thermal stability is ensured. The active matrix liquid crystal display device that employs this composition as the basic constituent material has excellent characteristics with less leak current without occurrence of flicker.

This nematic liquid crystal composition was used to make TN-LCD (d·Δn=0.88) having cell thickness d of 3.8 μm and display characteristics thereof were measured. A liquid crystal display device having a threshold voltage of 1.91 V. Also the nematic liquid crystal composition was used to make TN-LCD (d·Δn=0.50) having cell thickness d of 2.2 μm and display characteristics thereof were measured. A liquid crystal display device having a threshold voltage of 1.82 V.

In the same manner as in the case of the nematic liquid crystal composition (3-14), except that the compound (2-14-01) described below was used in place of the compound (3-1406) in the nematic liquid crystal composition (3-14) of this Example, a nematic liquid crystal composition (3-14-01) was prepared. Also in the same manner as in the case of the nematic liquid crystal composition (3-14), except that the respective compounds (2-14-02) to (2-14-13) described below were used in place of the compound (3-1406) in the nematic liquid crystal composition (3-14) of this Example, nematic liquid crystal compositions (3-14-02) to (3-14-13) were prepared. Also in the same manner as in the case of the nematic liquid crystal composition (3-14), except that the respective compounds (214-14) to (2-14-26) described below were used in place of the compound (3-1405) in the nematic liquid crystal composition (3-14) of this Example, nematic liquid crystal compositions (3-14-14) to (3-14-26) were prepared.

The display characteristics of these nematic liquid crystal compositions (3-14-01) to (3-14-40) showed good results, similar to this Example. Particularly, the nematic liquid crystal composition (3-14-21) was superior in response characteristics, while the nematic liquid crystal compositions (3-14-17), (3-14-20), (3-14-23), (3-14-26) and (3-01-22) exhibited the reduced driving voltage of about 2.0 V.

(2-14-01)

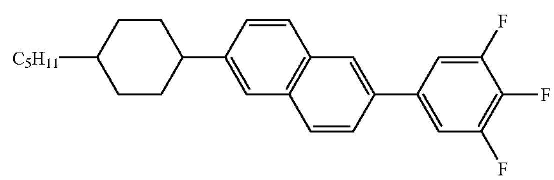

(2-14-02)

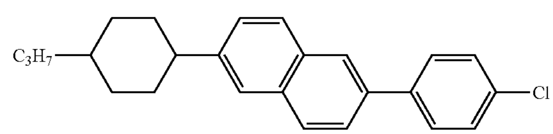

(2-14-03)

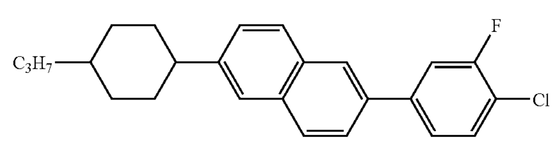

(2-14-04)

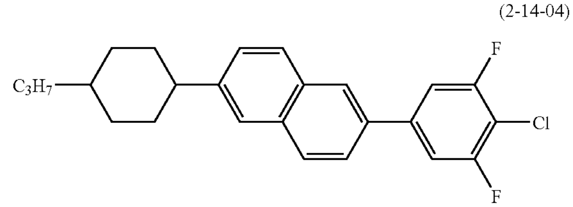

-continued
(2-14-05)
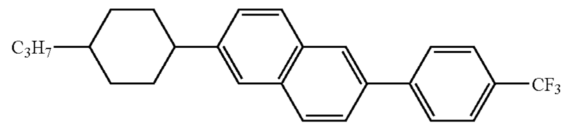
(2-14-06)
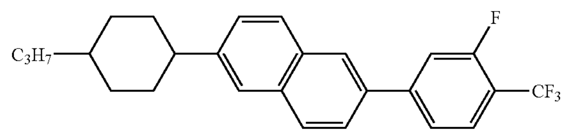
(2-14-07)
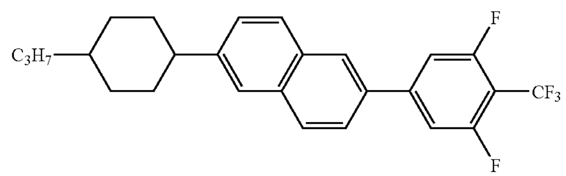
(2-14-08)
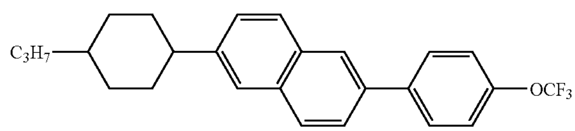
(2-14-09)
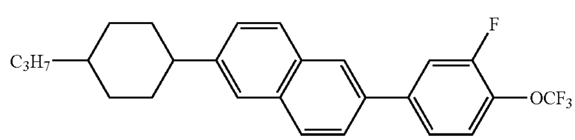
(2-14-10)
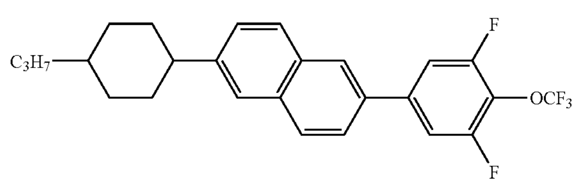
(2-14-11)
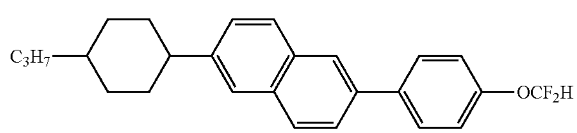
(2-14-12)
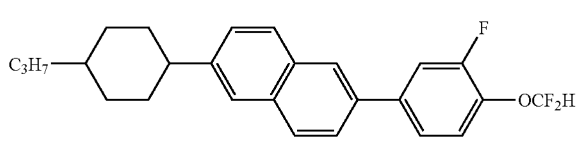
(2-14-13)
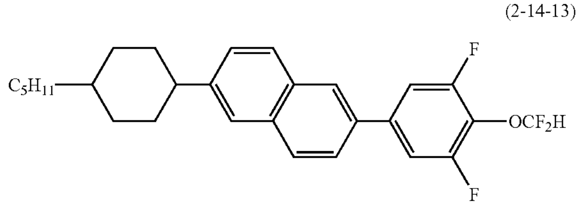
-continued
(2-14-14)
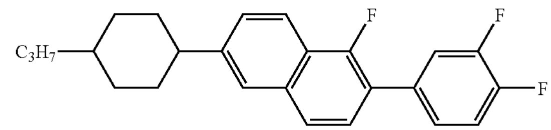
(2-14-15)
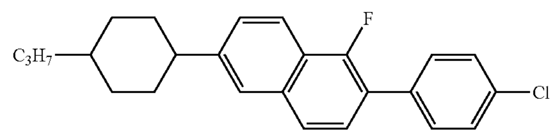
(2-14-16)
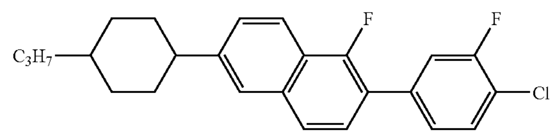
(2-14-17)
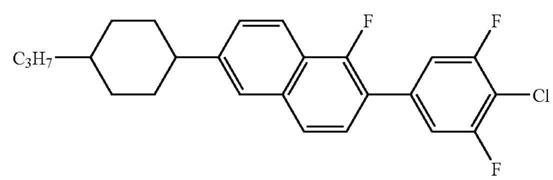
(2-14-18)
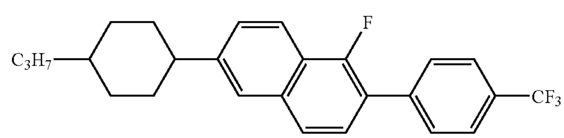
(2-14-19)
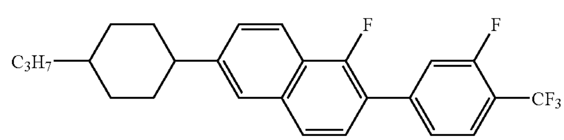
(2-14-20)
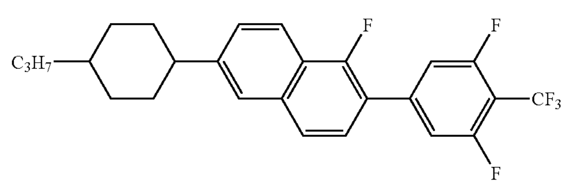
(2-14-21)
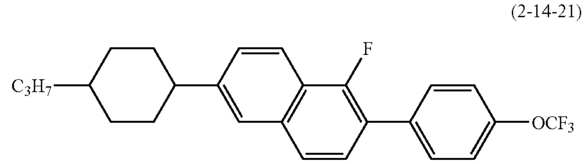
(2-14-22)
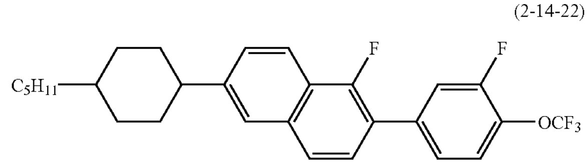

-continued (2-14-23)

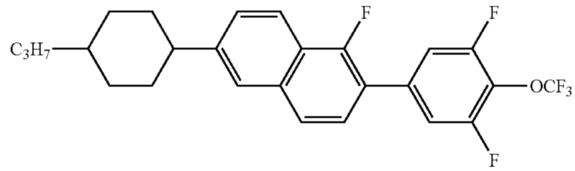

(2-14-24)

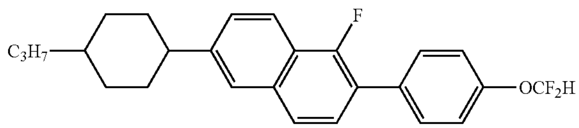

(2-14-25)

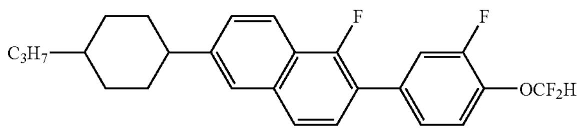

(2-14-26)

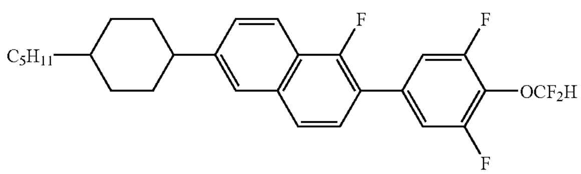

(2-14-27)

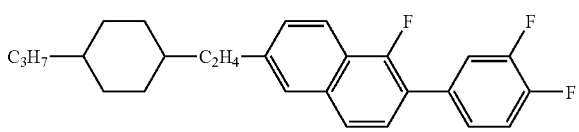

(2-14-28)

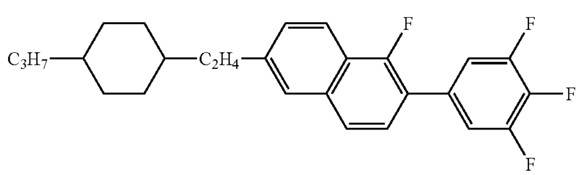

(2-14-29)

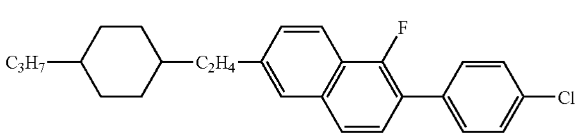

(2-14-30)

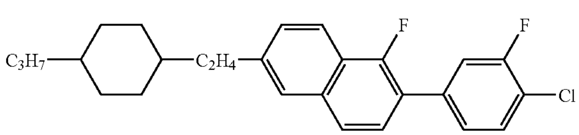

(2-14-31)

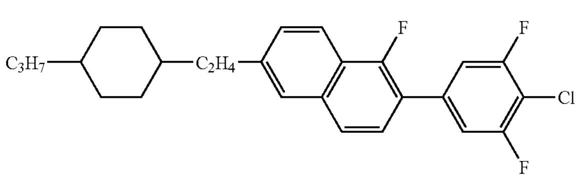

-continued (2-14-32)

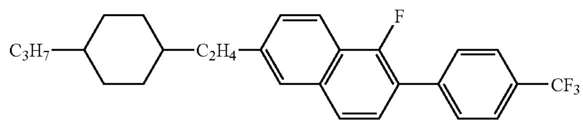

(2-14-33)

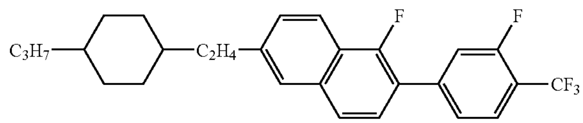

(2-14-34)

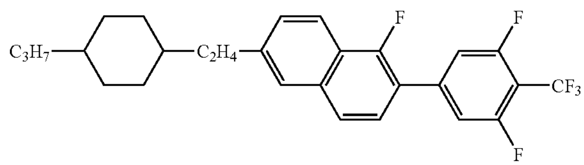

(2-14-35)

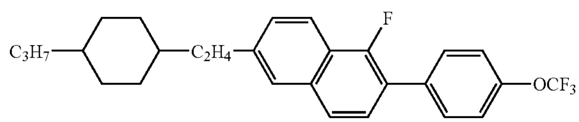

(2-14-36)

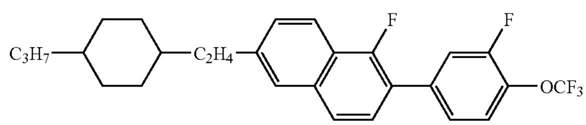

(2-14-37)

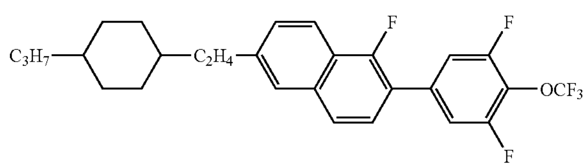

(2-14-38)

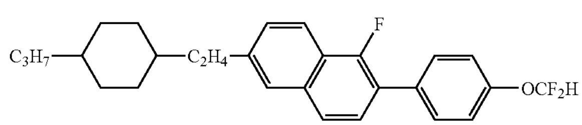

(2-14-39)

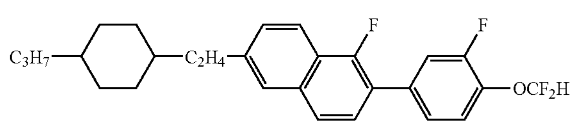

(2-14-40)

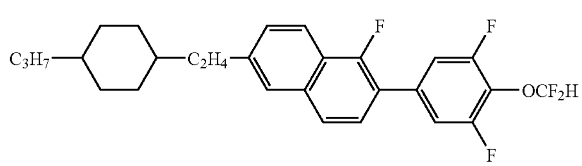

Comparative Example 4

In order to demonstrate the superiority of the present invention, a mixed liquid crystal (b-04) made by substituting the liquid crystal component A of the nematic liquid crystal composition (3-14) described above with another compound. Specifically, the compound was replaced by a compound in which the partial structure of naphthalene-2,6-diyl is substituted with that of 1,4-phenylene. The results are as follows.

(b-0401) 20 wt %

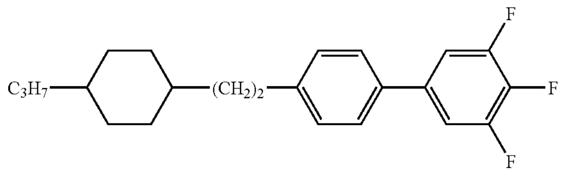

(b-0402) 20 wt %

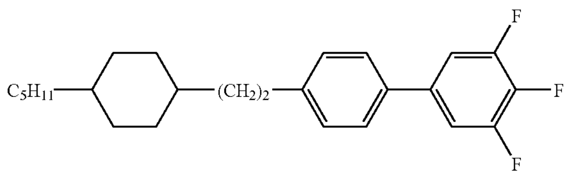

(b-0403) 15 wt %

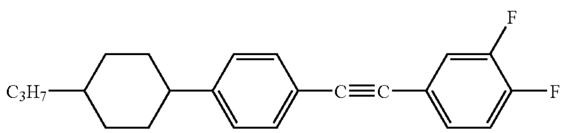

(b-0404) 15 wt %

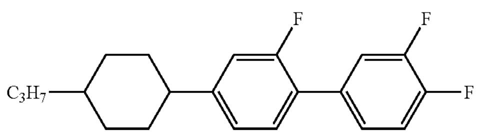

(b-0405) 15 wt %

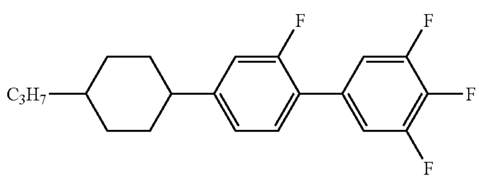

(b-0406) 15 wt %

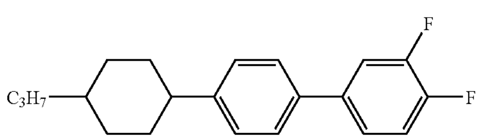

Physical properties of the liquid crystal composition $T_{N\text{-}I}$: 59.9° C.

$T_{\rightarrow N}$: −50.° C.

$\Delta\epsilon$: 7.12

$\Delta n$: 0.146

The nematic liquid crystal composition (3-14) of the present invention is capable of operating over a wide range of temperatures because $T_{N\text{-}I}$ is high and $T_{\text{-}N}$ is the same compared to the mixed liquid crystal (b-04), and also has a large $\Delta n$, and is therefore capable of improving response.

Example 15

A nematic liquid crystal composition (3-15) was prepared from (3-1501) 10 wt %

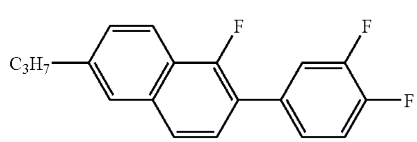

-continued

| | | |
|---|---|---|
| (3-1502) | 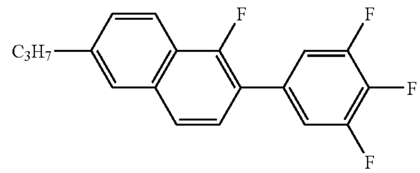 | 10 wt % |
| (3-1503) | 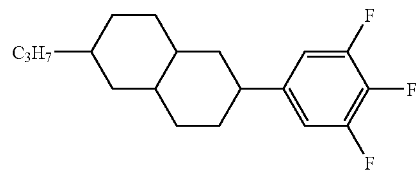 | 20 wt % |
| (3-1504) | 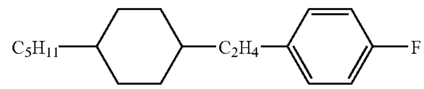 | 5 wt % |
| (3-1505) | 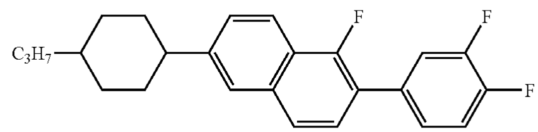 | 10 wt % |
| (3-1506) | 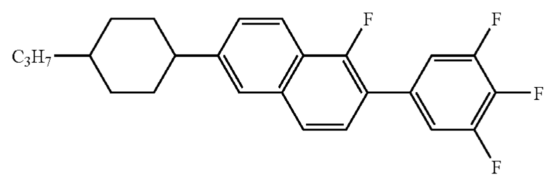 | 10 wt % |
| (3-1507) | 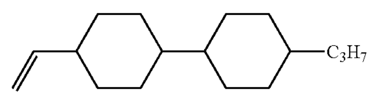 | 5 wt % |
| (3-1508) | 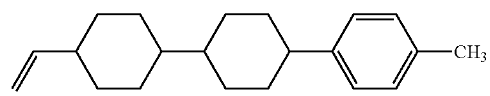 | 10 wt % |
| (3-1509) | 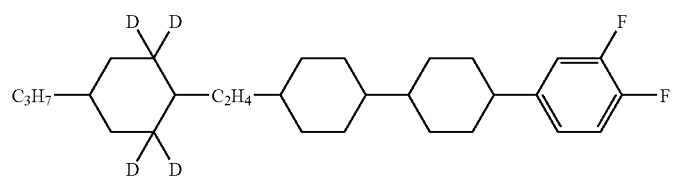 | 10 wt % |
| (3-1510) | 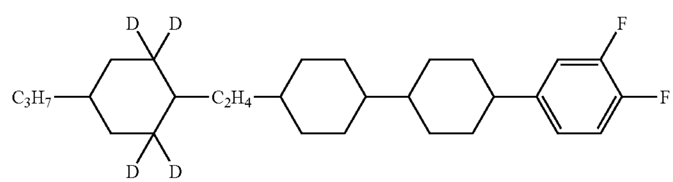 | 10 wt % |

and various properties of this composition were measured. The results are as follows.

Physical properties of the liquid crystal composition $T_{N\text{-}I}$: 88.1° C.

$T_{\rightarrow N}$: −70.° C.

Δ∈: 7.1

Δn 0.105

Reliability characteristics of liquid crystal composition

Resistivity before heating acceleration test: $1.0\times10^{13}$ Ω·cm

Resistivity after heating acceleration test: $7.4\times10^{12}$ Ω·cm

Voltage holding ratio before heating acceleration test: 99.0%

Voltage holding ratio after heating acceleration test: 98.7%

Display characteristics of the TN-LCD having a twist angle of 90 degrees (cell thickness 6 μm):
Vth: 1.56 V
γ: 1.23
Δr=Δd: 47. msec
Example 16
A nematic liquid crystal composition (3-16) was prepared from
| | | |
|---|---|---|
| (3-1601) | 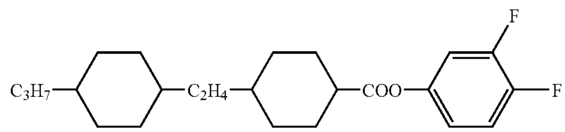 | 10 wt % |
| (3-1602) | 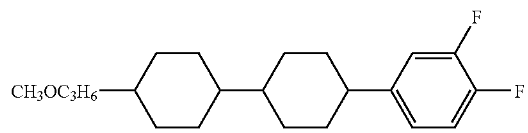 | 7 wt % |
| (3-1603) | 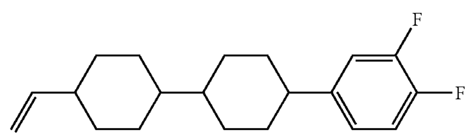 | 20 wt % |
| (3-1604) | 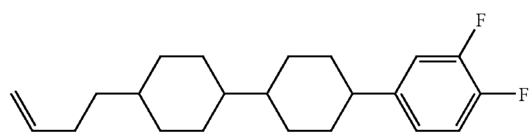 | 20 wt % |
| (3-1605) | 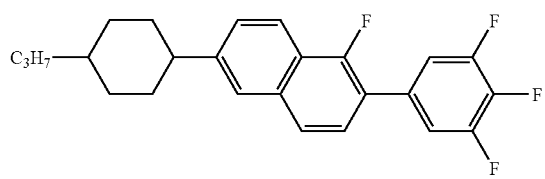 | 5 wt % |
| (3-1606) | 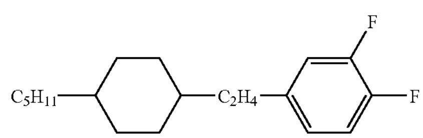 | 5 wt % |
| (3-1607) | 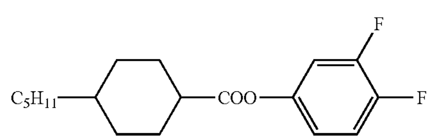 | 5 wt % |
| (3-1608) | 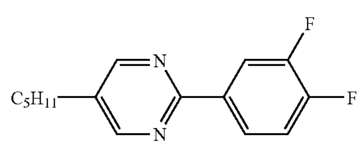 | 5 wt % |
| (3-1609) | 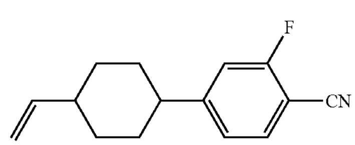 | 5 wt % |

-continued

| | | |
|---|---|---|
| (3-1610) | 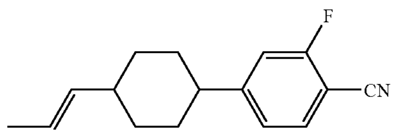 | 5 wt % |
| (3-1611) | 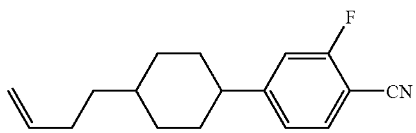 | 5 wt % |
| (3-1612) | 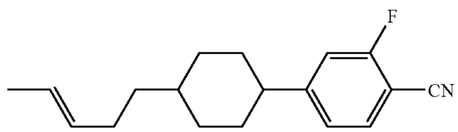 | 5 wt % |
| (3-1613) | 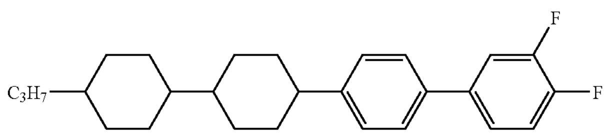 | 3 wt % |

and various properties of this composition were measured. The results are as follows.

Physical properties of the liquid crystal composition $T_{N-I}$: 71.1° C.

$T_{\rightarrow N}$: −30.° C.

Δ∈: 9.7

Δn: 0.094

Display characteristics of the TN-LCD having a twist angle of 90 degrees (cell thickness 8 μm):

Vth: 1.37 V

γ: 1.16

τr=τd: 44. msec

Example 17

A nematic liquid crystal composition (3-17) was prepared from

| | | |
|---|---|---|
| (3-1701) | 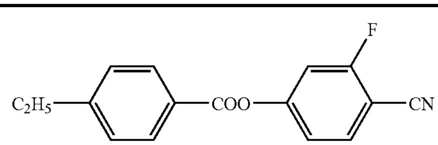 | 8 wt % |
| (3-1702) | 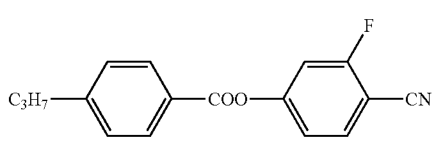 | 5 wt % |
| (3-1703) | 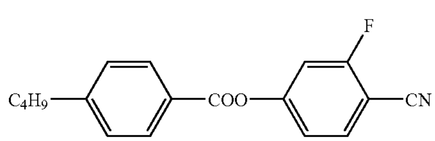 | 9 wt % |
| (3-1704) | 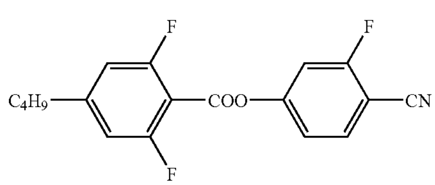 | 5 wt % |

-continued
(3-1705) 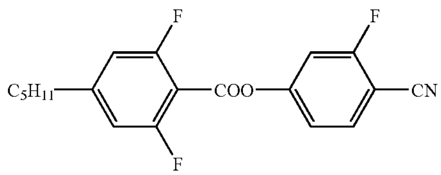
5 wt %
(3-1706) 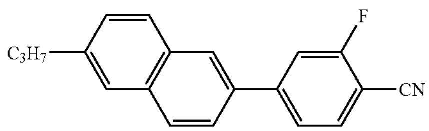
12 wt %
(3-1707) 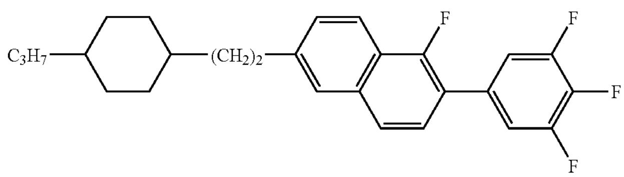
5 wt %
(3-1708) 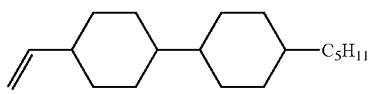
10 wt %
(3-1709) 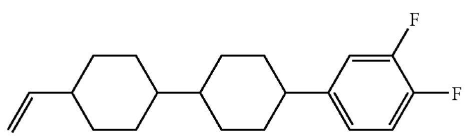
16 wt %
(3-1710) 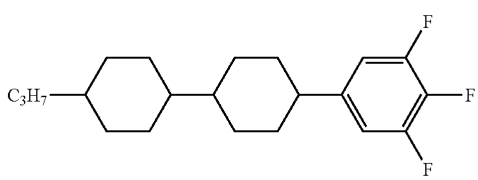
5 wt %
(3-1711) 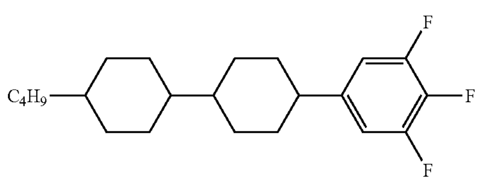
5 wt %
(3-1712) 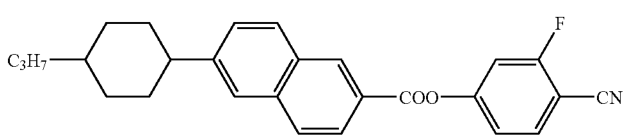
6 wt %
(3-1713) 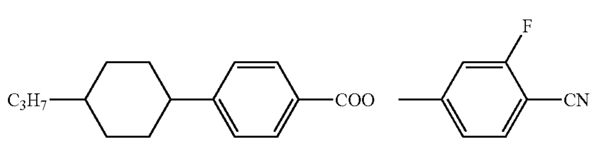
6 wt %
(3-1714) 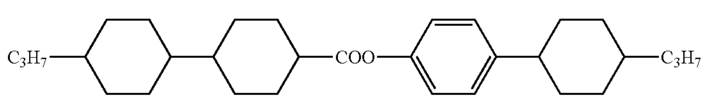
3 wt % and various properties of this composition were measured. The results are as follows.
Physical properties of the liquid crystal composition $T_{N-I}$: 80.0° C.
$T_{\rightarrow N}$–70.° C.
Δ∈: 20.2
Δn: 0.145
Display characteristics of the TN-LCD having a twist angle of 90 degrees (cell thickness 6 μm):
Vth: 0.91 V
Δ: 1.16
Example 18
A nematic liquid crystal composition (3-18) was prepared from
(3-1801) 12 wt %
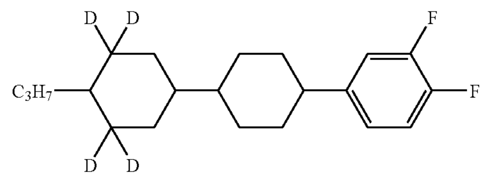
(3-1802) 6 wt %
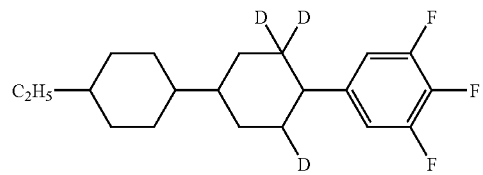
(3-1803) 6 wt %
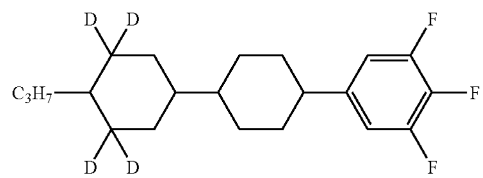
(3-1804) 12 wt %
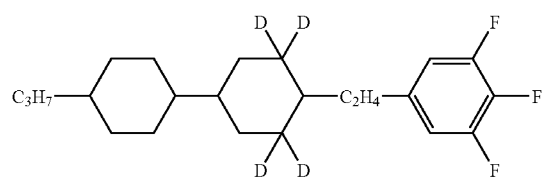
(3-1805) 12 wt %
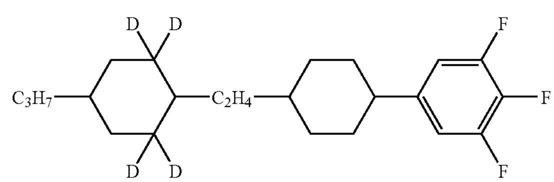
(3-1806) 12 wt %
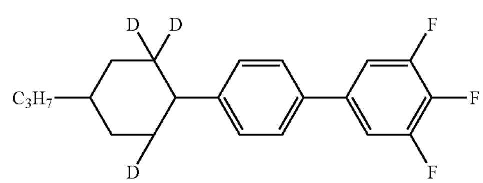
(3-1807) 12 wt %
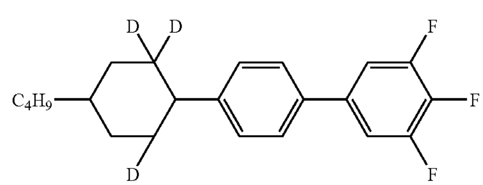

-continued (3-1808) 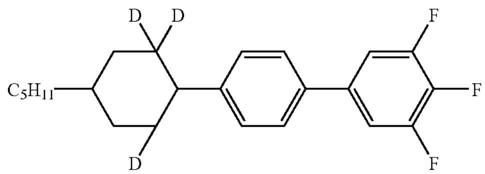 12 wt %

(3-1809) 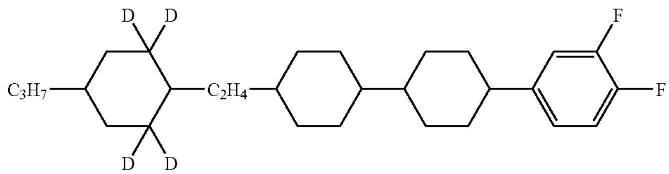 12 wt %

(3-1810) 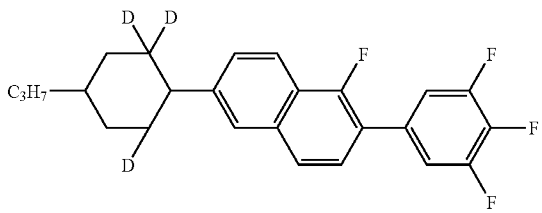 4 wt % and various properties of this composition were measured. The results are as follows.

Physical properties of the liquid crystal composition $T_{N-I}$: 99.5° C.

$T_{\rightarrow N}$: −70.° C.

Δ∈: 8.4

Δn: 0.099

Reliability characteristics of liquid crystal composition

Voltage holding ratio before heating acceleration test: 98.8%

Voltage holding ratio after heating acceleration test: 98.2%

Display characteristics of the TN-LCD having a twist angle of 90 degrees (cell thickness 6 μm):

Vth: 1.19 V

γ: 1.25

τr=τd: 49. msec

Example 19

A nematic liquid crystal composition (3-19) was prepared from (3-1901) 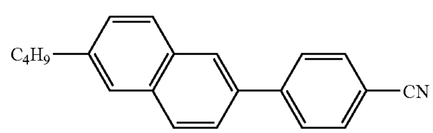 10 wt %

(3-1902) 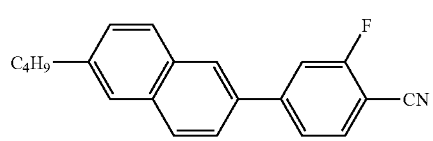 5 wt %

(3-1903) 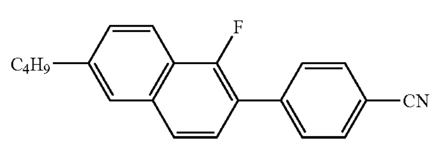 10 wt %

-continued
| | | |
|---|---|---|
| (3-1904) | 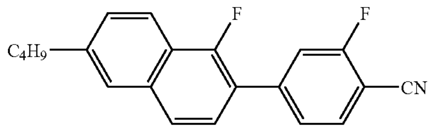 | 10 wt % |
| (3-1905) | 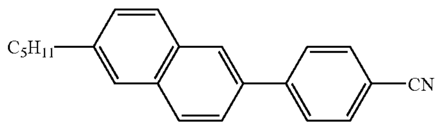 | 10 wt % |
| (3-1906) | 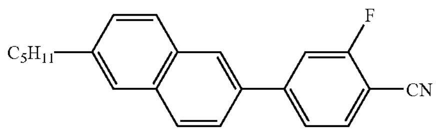 | 5 wt % |
| (3-1907) | 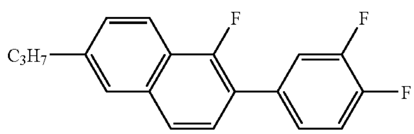 | 6 wt % |
| (3-1908) | 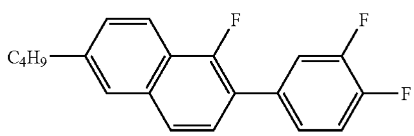 | 6 wt % |
| (3-1909) | 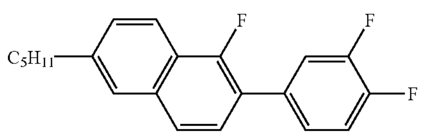 | 6 wt % |
| (3-1910) | 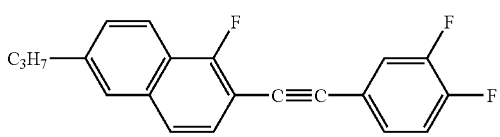 | 10 wt % |
| (3-1911) | 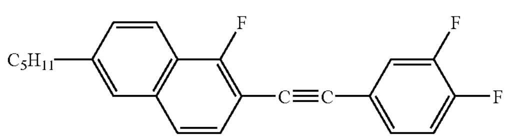 | 10 wt % |
| (3-1912) | 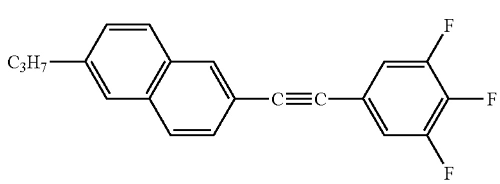 | 6 wt % |
| (3-1913) | 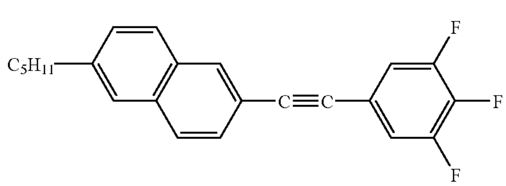 | 6 wt % | and various properties of this composition were measured. The results are as follows.

Physical properties of the liquid crystal composition $T_{N-I}$: 67.5° C.

$\Delta\epsilon$: 14.5

$\Delta n$ 0.262

Display characteristics of the TN-LCD having a twist angle of 90 degrees (cell thickness 8 μm):

Vth: 1.18 V

γ: 1.21

The nematic liquid crystal composition is capable of operating over a wide range of temperatures because $T_{N-I}$ is high compared to the comparative liquid crystal (b-05) described in Comparative Example 5 described below, and also has a large $\Delta n$, and is therefore capable of improving response. Also because this nematic liquid crystal composition has low Vth compared to the can be improved.

This nematic liquid crystal composition was used to make TN-LCD having cell thickness d of 1.9 μm and display characteristics thereof were measured. A liquid crystal display device having a threshold voltage of 0.97 V and a response speed of 4.6 msec.

In the same manner as in the case of the nematic liquid crystal composition (3-19), except that the compound (2-19-01) described below was used in place of the compound (3-1904) in the nematic liquid crystal composition (3-19) of this Example, a nematic liquid crystal composition (3-19-01) was prepared. Also in the same manner as in the case of the nematic liquid crystal composition (3-19), except that the respective compounds (2-19-02) to (2-19-16) described below were used in place of the compound (3-1904) in the nematic liquid crystal composition (3-19) of this Example, nematic liquid crystal compositions (3-19-02) to (3-19-16) were prepared. Also in the same manner as in the case of the nematic liquid crystal composition (3-19), except that the respective compounds (2-19-17) to (2-19-24) were used in place of the compound (3-1907) in the nematic liquid crystal composition (3-19) of this Example, nematic liquid crystal compositions (3-19-17) to (3-19-24) were prepared.

The display characteristics of these nematic liquid crystal compositions (3-19-01) to (3-19-24) showed good results, similar to this Example. Particularly, the nematic liquid crystal composition (3-19-11) was superior in response characteristics, while the nematic liquid crystal compositions (3-19-01), (3-19-04), (3-19-07), (3-19-10), (3-19-13), (3-19-16) and (3-19-21) exhibited the reduced driving voltage of about 0.95 V.

(2-19-01)

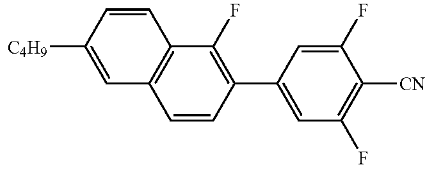

(2-19-02)

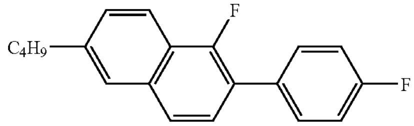

-continued (2-19-03)

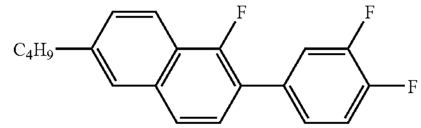

(2-19-04)

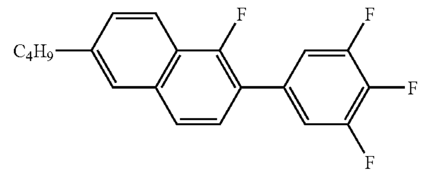

(2-19-05)

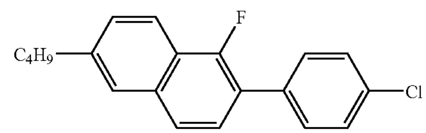

(2-19-06)

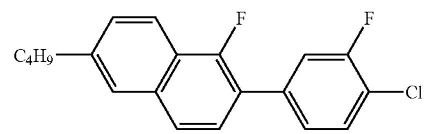

(2-19-07)

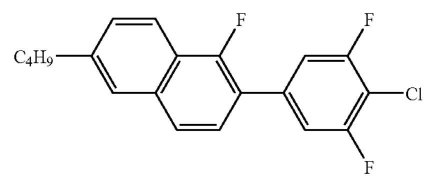

(2-19-08)

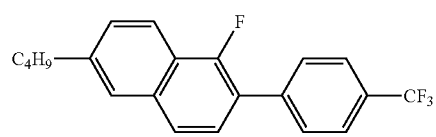

(2-19-09)

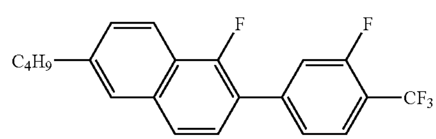

(2-19-10)

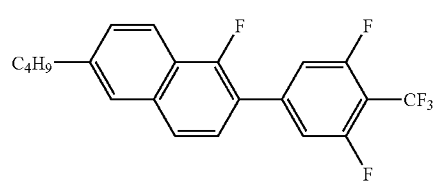

(2-19-11)

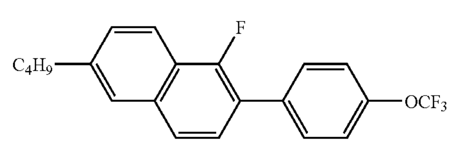

(2-19-12)

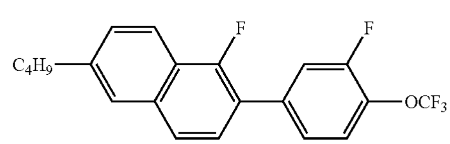

-continued (2-19-13)

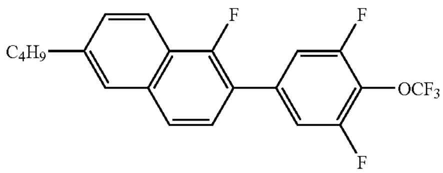

(2-19-14)

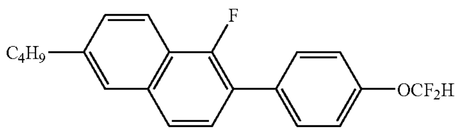

(2-19-15)

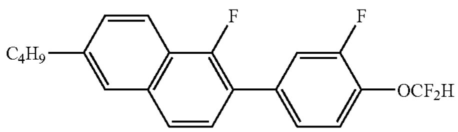

(2-19-16)

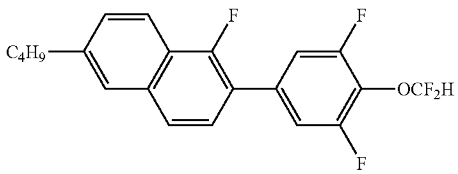

(2-19-17)

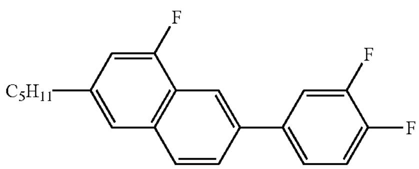

(2-19-18)

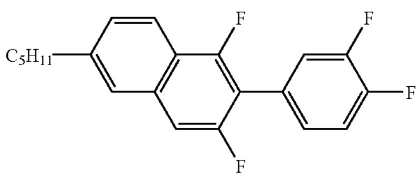

(2-19-19)

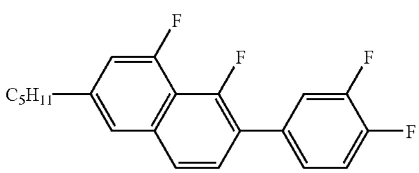

(2-19-20)

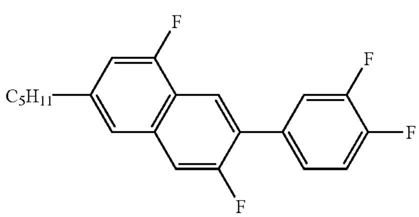

(2-19-21)

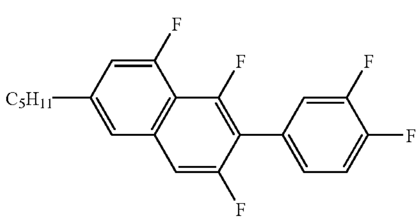

-continued (2-19-22)

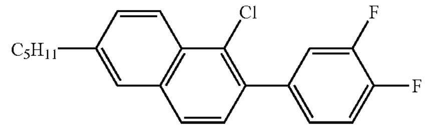

(2-19-23)

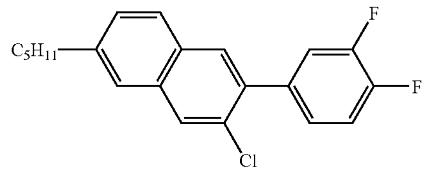

(2-19-24)

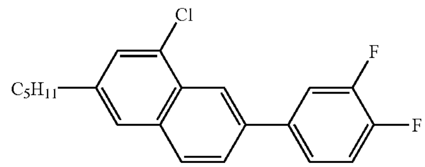

Comparative Example 5

In order to demonstrate the superiority of the present invention, a mixed liquid crystal (b-05) made by substituting the liquid crystal component A of the nematic liquid crystal composition (3-19) described above with another compound. Specifically, the compound was replaced by a compound in which the partial structure of naphthalene-2,6-diyl is substituted with that of 1,4-phenylene. The results are as follows.

| | | |
|---|---|---|
| (b-0501) | 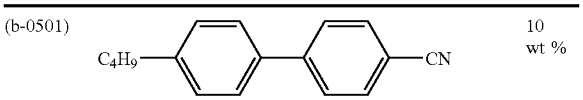 | 10 wt % |
| (b-0502) | 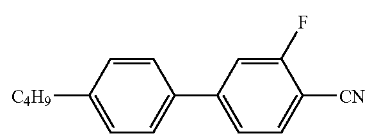 | 5 wt % |
| (b-0503) | 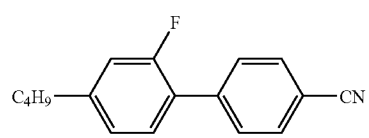 | 10 wt % |
| (b-0504) | 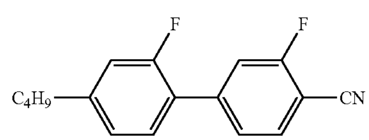 | 10 wt % |
| (b-0505) | 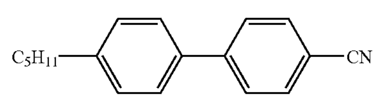 | 10 wt % |
| (b-0506) | 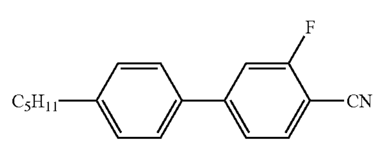 | 5 wt % |

-continued

| | | |
|---|---|---|
| (b-0507) | 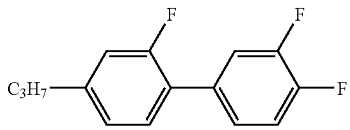 | 6 wt % |
| (b-0508) | 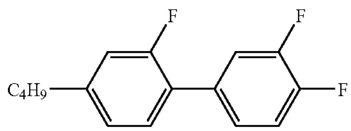 | 6 wt % |
| (b-0509) | 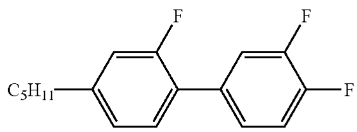 | 6 wt % |
| (b-0510) | 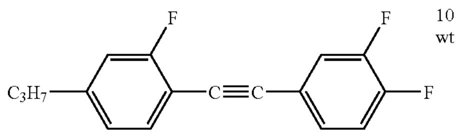 | 10 wt % |
| (b-0511) | 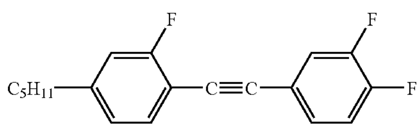 | 10 wt % |
| (b-0512) | 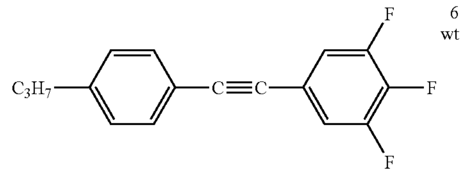 | 6 wt % |
| (b-0513) | 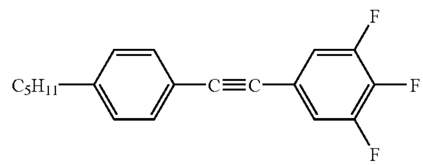 | 6 wt % |

Physical properties of the liquid crystal composition $T_{N-I}$: Room temperature or lower Δϵ: Impossible to measure Δn: Impossible to measure Display characteristics of the TN-LCD having a twist angle of 90 degrees (cell thickness 8 μm):

Vth: Impossible to measure

γ: Impossible to measure

Example 20

A nematic liquid crystal composition (3-20) was prepared from

| | | |
|---|---|---|
| (3-2001) | 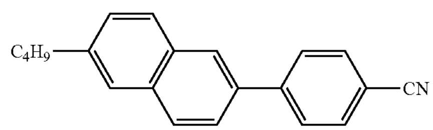 | 7 wt % |
| (3-2002) | 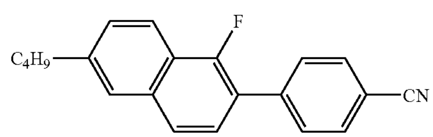 | 7 wt % |
| (3-2003) | 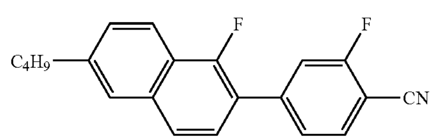 | 7 wt % |
| (3-2004) | 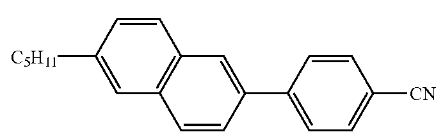 | 7 wt % |
| (3-2005) | 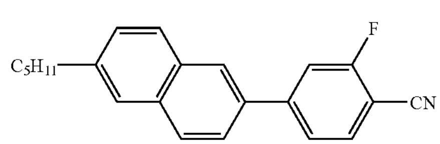 | 7 wt % |

-continued

| | | |
|---|---|---|
| (3-2006) | 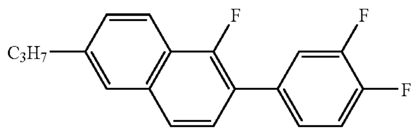 | 7 wt % |
| (3-2007) | 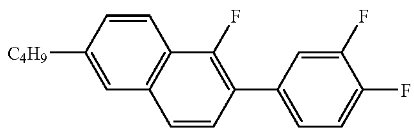 | 6 wt % |
| (3-2008) | 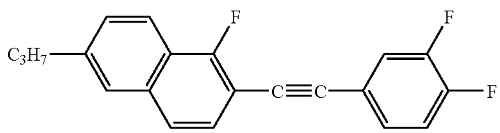 | 7 wt % |
| (3-2009) | 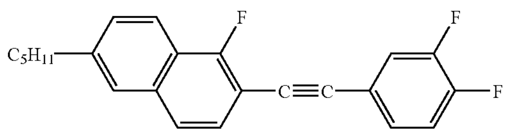 | 7 wt % |
| (3-2010) | 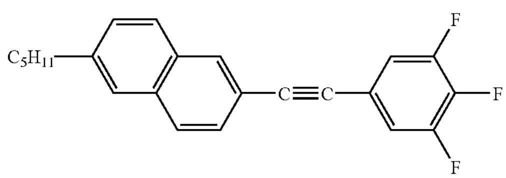 | 8 wt % |
| (3-2011) | 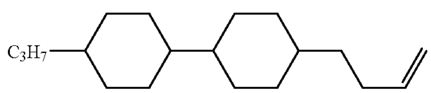 | 15 wt % |
| (3-2012) | 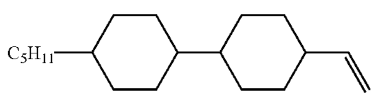 | 15 wt % |

and various properties of this composition were measured. The results are as follows.

Physical properties of the liquid crystal composition $T_{N-I}$: 68.7° C.

$\Delta\epsilon$: 10.3

$\Delta n$: 0.201

Display characteristics of the TN-LCD having a twist angle of 90 degrees (cell thickness 6 μm):

Vth: 1.32 V

γ: 1.14

τr=τd: 32.0 msec

This nematic liquid crystal composition shows a value of optical sharpness near 1.12 that is the limit of TN-LCD liquid crystal shown in the literature "High-speed Liquid Crystal Technology" (p. 63, CMC Publication). Thus it can be understood that this liquid crystal composition is useful for high-frequency multiplexing drive.

This nematic liquid crystal composition was used to make TN-LCD having cell thickness d of 2.5 μm and display characteristics thereof were measured. A liquid crystal display device having a threshold voltage of 1.19 V and a response speed of 2.8 msec. was obtained.

Example 21

A nematic liquid crystal composition (3-21) was prepared from

| | | |
|---|---|---|
| (3-2101) | 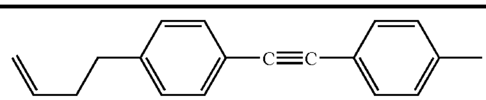 | 15 wt % |

-continued
| | | |
|---|---|---|
| (3-2102) | 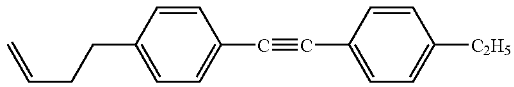 | 15 wt % |
| (3-2103) | 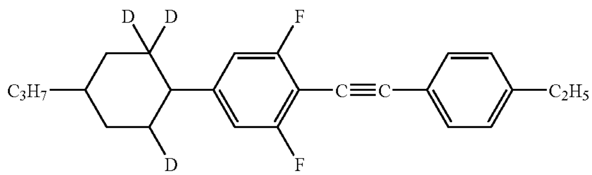 | 15 wt % |
| (3-2104) | 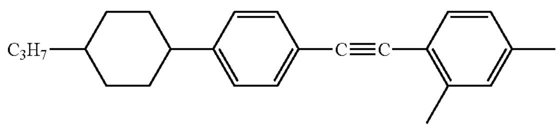 | 15 wt % |
| (3-2105) | 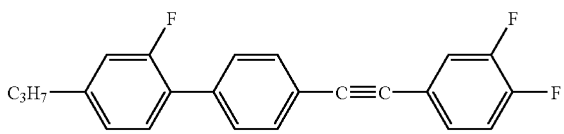 | 15 wt % |
| (3-2106) | 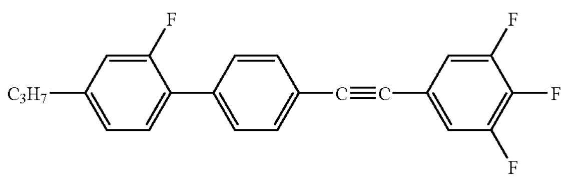 | 10 wt % |
| (3-2107) | 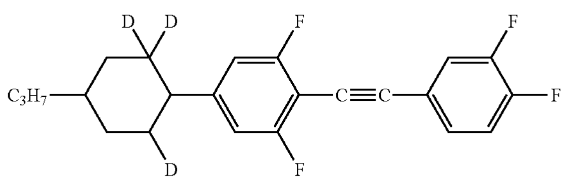 | 5 wt % |
| (3-2108) | 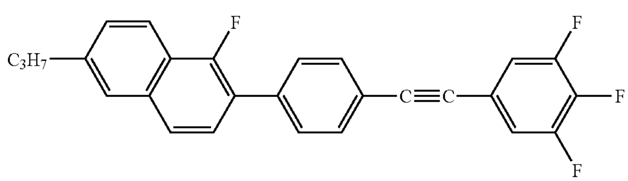 | 5 wt % |
| (3-2109) | 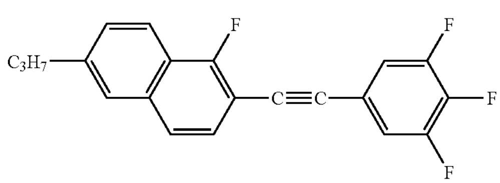 | 5 wt % |
and various properties of this composition were measured. The results are as follows.
Physical properties of the liquid crystal composition
$T_{N\text{-}I}$: 99.4° C.
$T_{\rightarrow N}$: −40.° C.
Δ∈: 7.2
Δn: 0.283
η: 29.5 cp
Reliability characteristics of liquid crystal composition
Resistivity before heating acceleration test: $4.2\times10^{12}$ Ω·cm Resistivity after heating acceleration test: $1.3\times10^{12}$ Ω·cm Voltage holding ratio before heating acceleration test: 98.5%

Voltage holding ratio after heating acceleration test: 97.9%

Display characteristics of the TN-LCD having a twist angle of 90 degrees (cell thickness 8 μm):

Vth: 2.14 V

γ: 1.14

τr=τd: 34.1 msec

This nematic liquid crystal composition is capable of operating over a wide range of temperatures because $T_{N-I}$ is high and $T_{-N}$ is low, and has such features as the capability to improve the response characteristic because the viscosity η is low or the value of Δn is larger in comparison to the viscosity η.

Also because this nematic liquid crystal composition has high resistivity and high voltage holding ratio after the heating acceleration test, it can be understood that high thermal stability is ensured. The active matrix liquid crystal display device that employs this composition as the basic constituent material has excellent characteristics with less leak current without occurrence of flicker.

This nematic liquid crystal composition further shows a value of optical sharpness near 1.12 that is the limit of TN-LCD liquid crystal shown in the literature "High-speed Liquid Crystal Technology" (p. 63, CMC Publication). Thus it can be understood that this liquid crystal composition is useful for high-frequency multiplexing drive.

This nematic liquid crystal composition was used to make TN-LCD having cell thickness d of 1.8 μm and display characteristics thereof were measured. A liquid crystal display device having a threshold voltage of 1.82 V and a response speed of 2.4 msec. was obtained.

In the same manner as in the case of the nematic liquid crystal composition (3-21), except that the compound (2-21-01) was used in place of the compound (3-2108) described below in the nematic liquid crystal composition (3-21) of this Example, a nematic liquid crystal composition (3-21-01) was prepared. Also in the same manner as in the case of the nematic liquid crystal composition (3-21), except that the respective compounds (2-21-02) to (2-21-21) described below were used in place of the compound (3-2108) in the nematic liquid crystal composition (3-21) of this Example, nematic liquid crystal compositions (3-21-02) to (3-21-21) were prepared. Also in the same manner as in the case of the nematic liquid crystal composition (3-21), except that the respective compounds (221-22) to (2-21-31) described below were used in place of the compound (3-2109) in the nematic liquid crystal composition (3-21) of this Example, nematic liquid crystal compositions (3-21-22) to (3-21-31) were prepared.

The display characteristics of these nematic liquid crystal compositions (3-21-01) to (3-21-31) showed good results, similar to this Example.

(2-21-01)

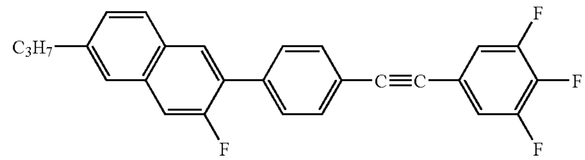

(2-21-02)

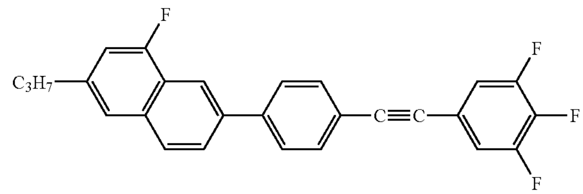

(2-21-03)

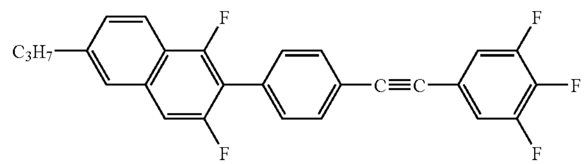

(2-21-04)

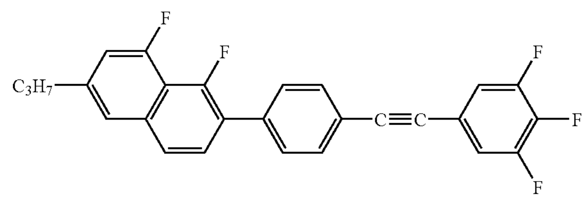

(2-21-05)

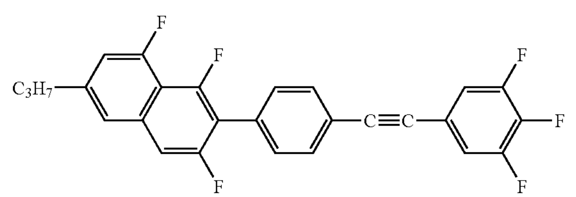

(2-21-06)

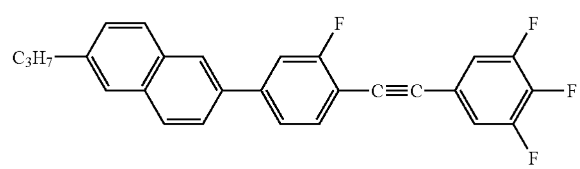

(2-21-07)

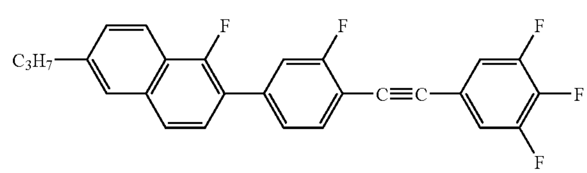

(2-21-08)

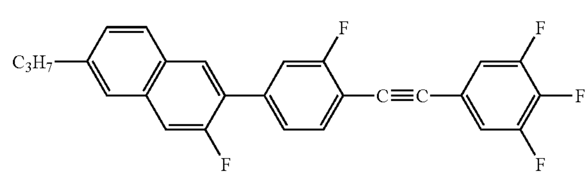

-continued
(2-21-09)
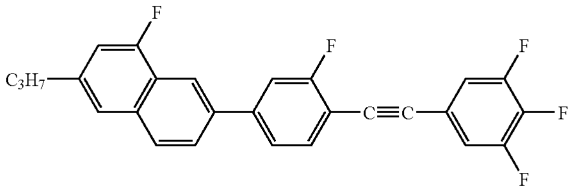
(2-21-10)
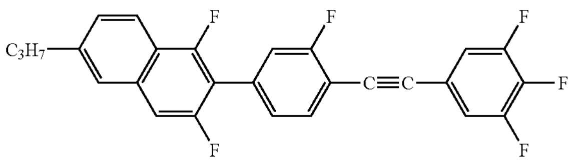
(2-21-11)
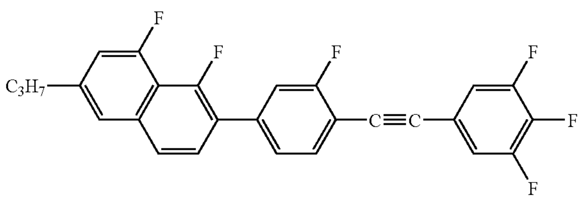
(2-21-12)
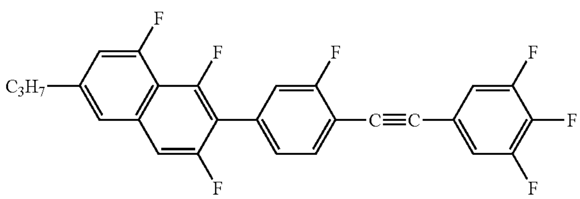
(2-21-13)
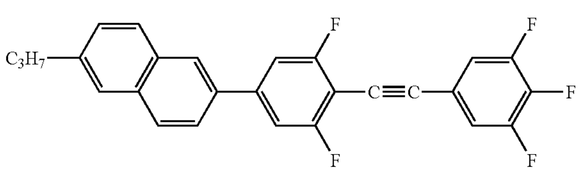
(2-21-14)
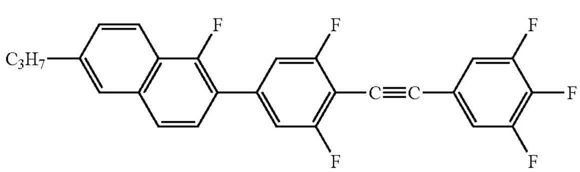
(2-21-15)
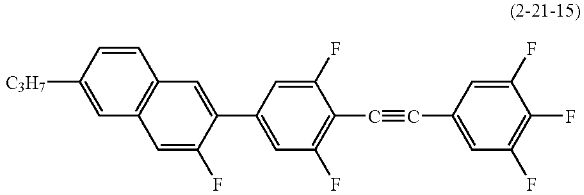
-continued
(2-21-16)
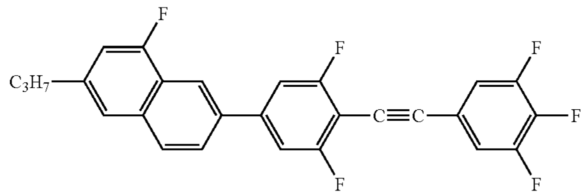
(2-21-17)
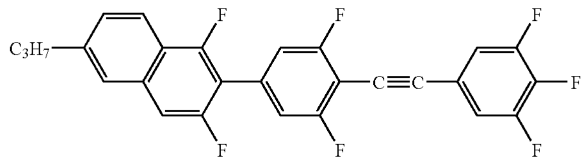
(2-21-18)
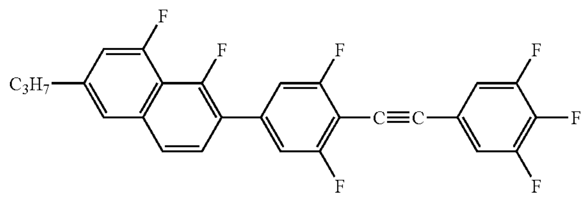
(2-21-19)
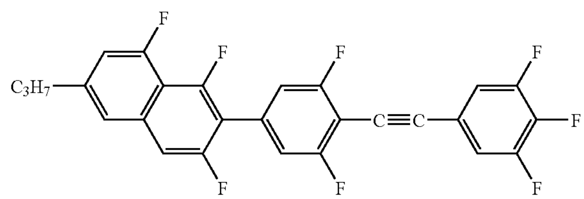
(2-21-20)
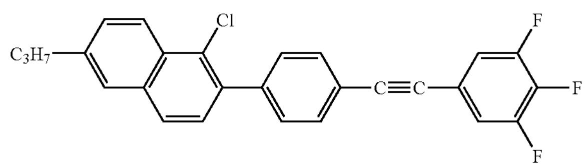
(2-21-21)
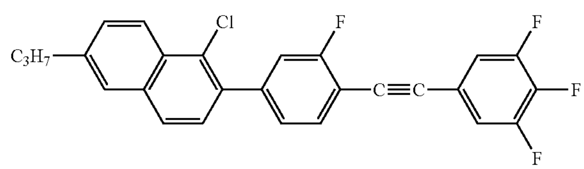
(2-21-22)
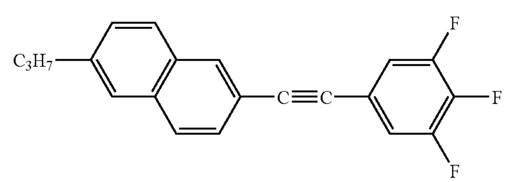
(2-21-23)
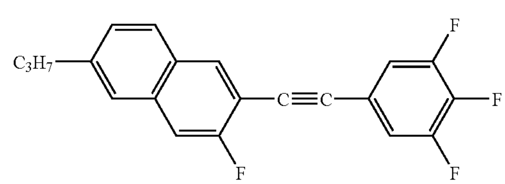

-continued
(2-21-24)
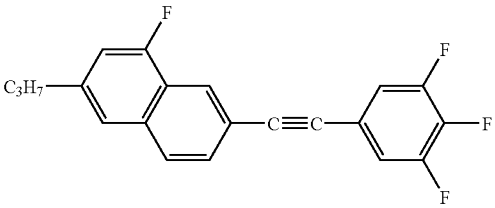
(2-21-25)
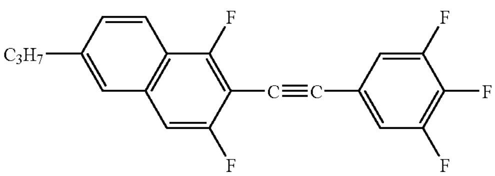
(2-21-26)
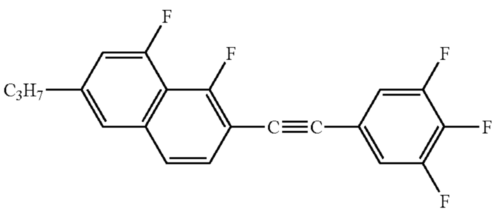
(2-21-27)
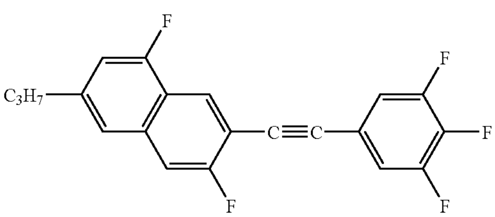
-continued
(2-21-28)
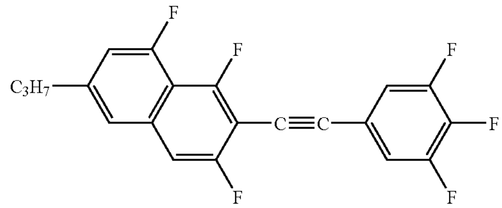
(2-21-29)
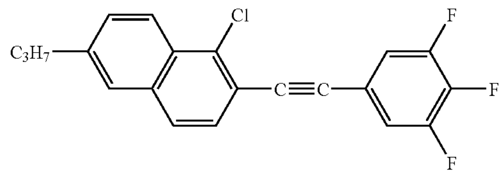
(2-21-30)
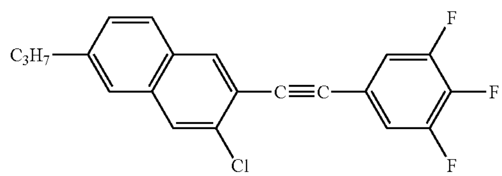
(2-21-31)
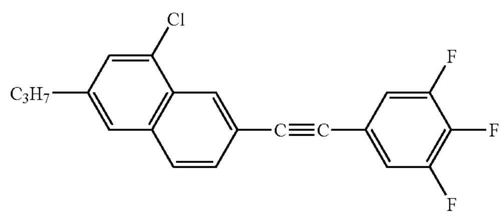
Example 22
A nematic liquid crystal composition (3-22) was prepared from
| | | |
|---|---|---|
| (3-2201) | 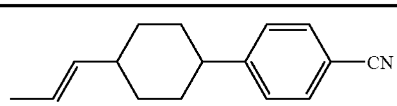 | 10 wt % |
| (3-2202) | 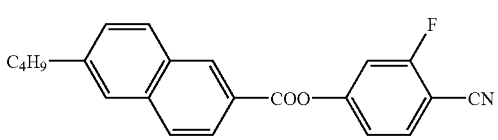 | 5 wt % |
| (3-2203) | 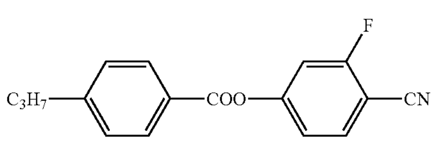 | 5 wt % |
| (3-2204) | 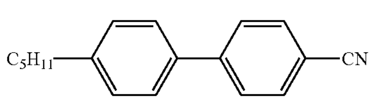 | 5 wt % |

-continued

| | | |
|---|---|---|
| (3-2205) | 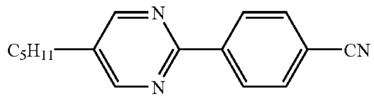 | 5 wt % |
| (3-2206) | 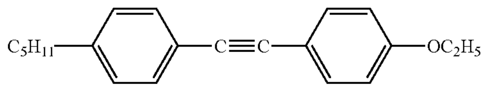 | 10 wt % |
| (3-2207) | 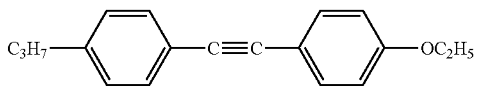 | 10 wt % |
| (3-2208) | 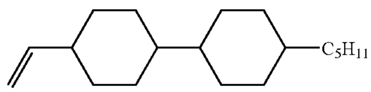 | 20 wt % |
| (3-2209) | 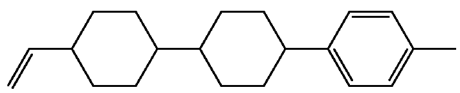 | 13 wt % |
| (3-2210) | 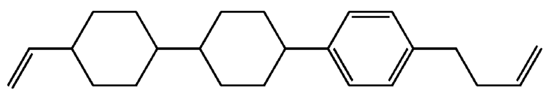 | 7 wt % |
| (3-2211) | 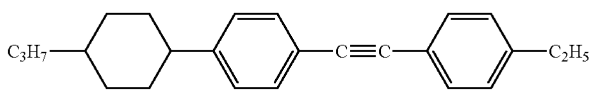 | 5 wt % |
| (3-2212) | 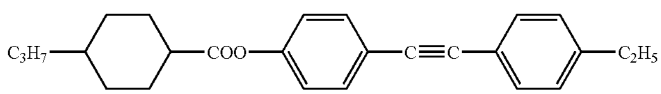 | 5 wt % |

and various properties of this composition were measured. The results are as follows.

Physical properties of the liquid crystal composition $T_{N\text{-}I}$: 89.4° C.

$T_{\rightarrow N}$: −70.° C.

Δ∈: 8.7

Δn: 0.166

Display characteristics of the TN-LCD having a twist angle of 90 degrees (cell thickness 6 μm):

Vth: 2.07 V

γ: 1.15

Display characteristics of the STN-LCD having a twist angle of 240 degrees

Vth: 2.35 V

γ: 1.028

Δ(Vth)/Δ(T): 2.8 mV/° C. (T=5 to 40° C.)

τr=τd: 88. msec. (When driven with duty ratio of 1/240)

In the same manner as in the case of the nematic liquid crystal composition (3-22), except that the compound (2-22-01) described below was used in place of the compound (3-2202) in the nematic liquid crystal composition (3-22) of this Example, a nematic liquid crystal composition (3-22-01) was prepared. Also in the same manner as in the case of the nematic liquid crystal composition (3-22), except that the respective compounds (2-22-02) to (2-22-10) were used in place of the compound (3-2202) in the nematic liquid crystal composition (3-22) of this Example, nematic liquid crystal compositions (3-22-02) to (3-22-10) were prepared.

The display characteristics of these nematic liquid crystal compositions (3-22-01) to (3-22-10) showed good results, similar to this Example. Particularly, the nematic liquid crystal compositions (3-22-04) to (3-22-07) exhibited the reduced driving voltage of about 1.8 V.

(2-22-01)

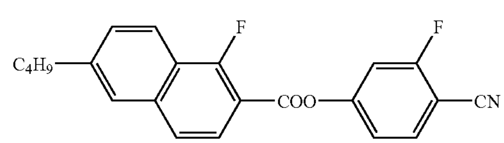

(2-22-02)

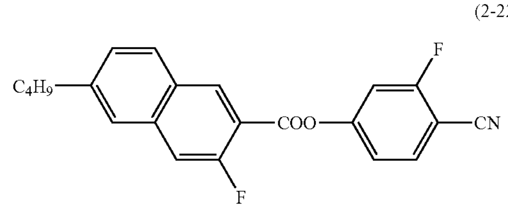

-continued
(2-22-03)
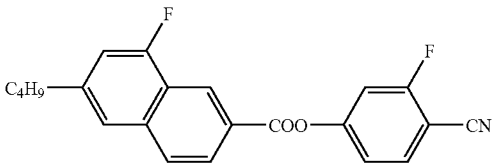
(2-22-04)
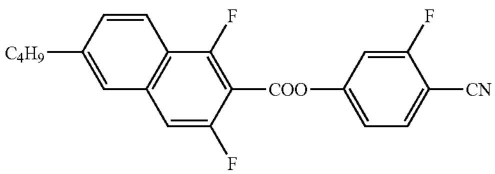
(2-22-05)
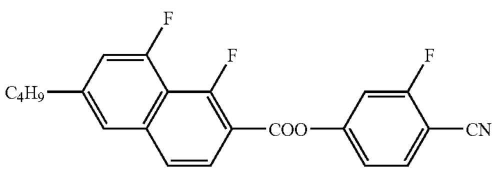
(2-22-06)
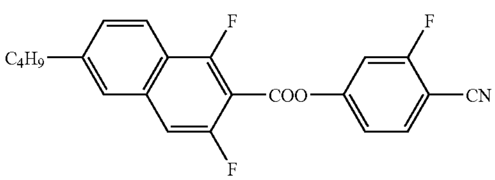
-continued
(2-22-07)
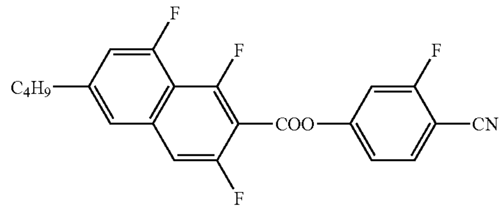
(2-22-08)
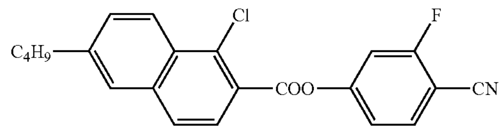
(2-22-09)
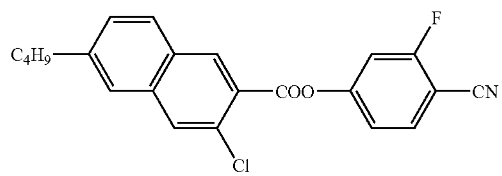
(2-22-10)
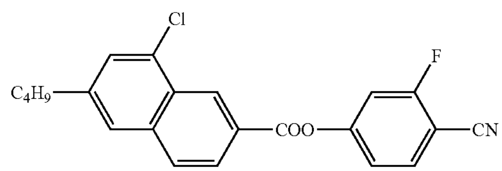
Example 23
A nematic liquid crystal composition (3-23) was prepared from
| | | |
|---|---|---|
| (3-2301) | 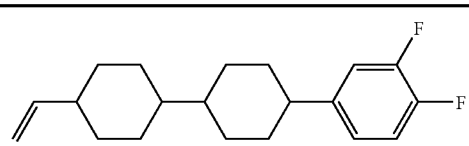 | 10 wt % |
| (3-2302) | 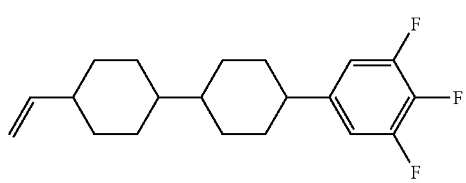 | 10 wt % |
| (3-2303) | 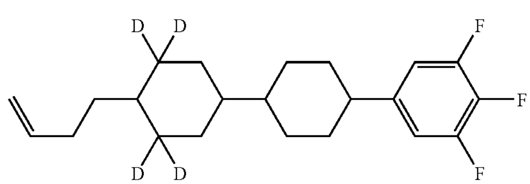 | 10 wt % |
| (3-2304) | 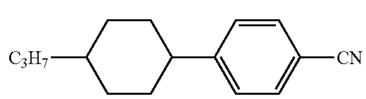 | 10 wt % |

-continued
| | | |
|---|---|---|
| (3-2305) | 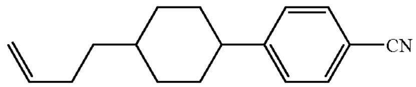 | 10 wt % |
| (3-2306) | 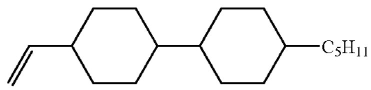 | 10 wt % |
| (3-2307) | 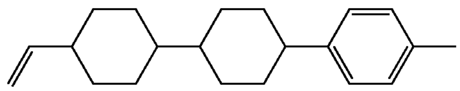 | 10 wt % |
| (3-2308) | 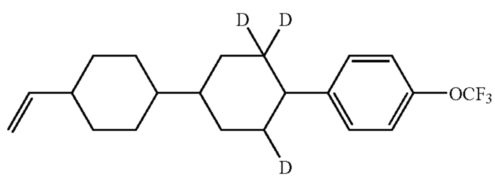 | 10 wt % |
| (3-2309) | 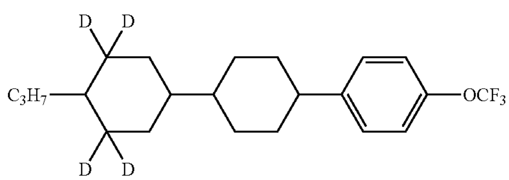 | 10 wt % |
| (3-2310) | 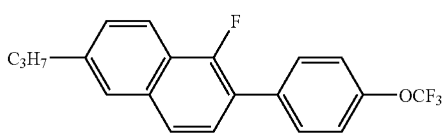 | 5 wt % |
| (3-2311) | 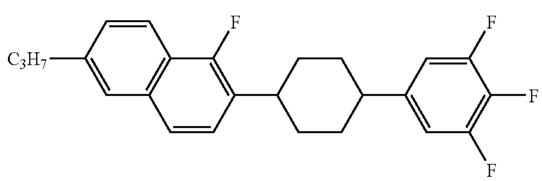 | 5 wt % |
and various properties of this composition were measured.
Example 24
A nematic liquid crystal composition (3-24) was prepared from
| | | |
|---|---|---|
| (3-2401) | 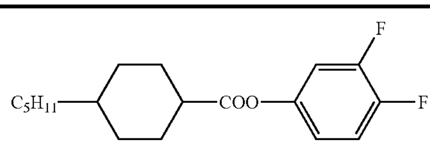 | 10 wt % |
| (3-2402) | 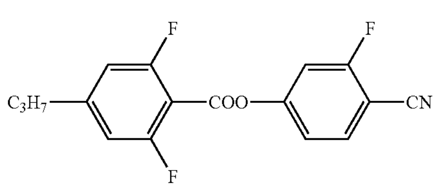 | 5 wt % |

-continued
(3-2403) 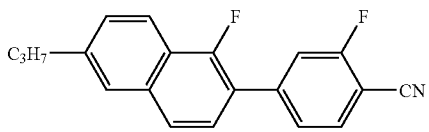 5 wt %
(3-2404) 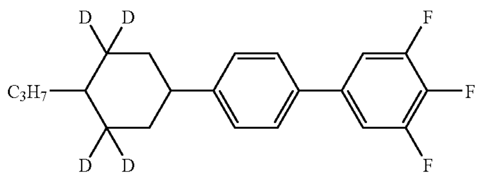 5 wt %
(3-2405) 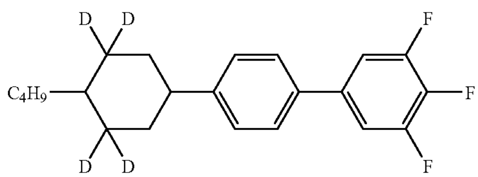 10 wt %
(3-2406) 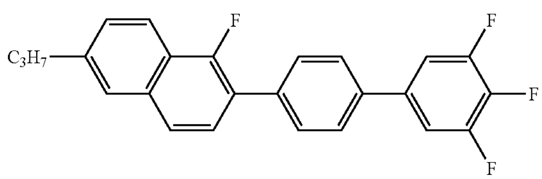 10 wt %
(3-2407) 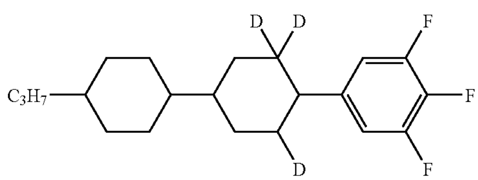 7 wt %
(3-2408) 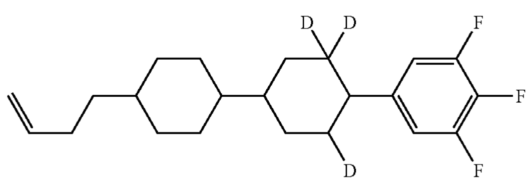 10 wt %
(3-2409) 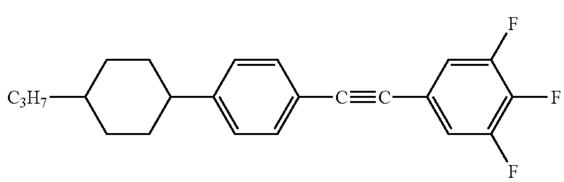 10 wt %
(3-2410) 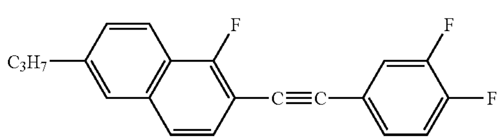 8 wt %
(3-2411) 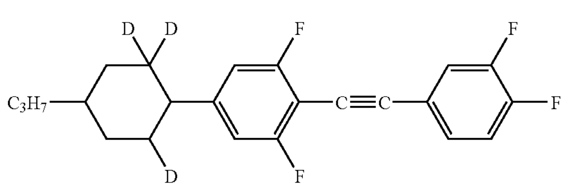 10 wt %

-continued

| | | |
|---|---|---|
| (3-2412) | 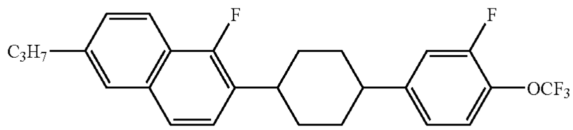 | 10 wt % |

and various properties of this composition were measured. The results are as follows.

Physical properties of the liquid crystal composition $T_{N\text{-}I}$: 74.1° C.

$T_{\rightarrow N}$: −70.° C.

Δ∈: 14.3

Δn: 0.151

Display characteristics of the TN-LCD having a twist angle of 90 degrees (cell thickness 6 μm):

Vth: 1.08 V

γ: 1.15

Example 25

A nematic liquid crystal composition (3-25) was prepared from

| | | |
|---|---|---|
| (3-2501) | 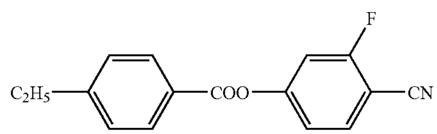 | 8 wt % |
| (3-2502) | 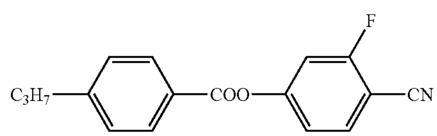 | 5 wt % |
| (3-2503) | 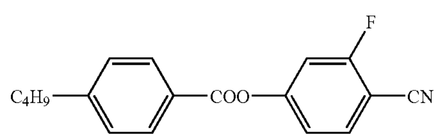 | 16 wt % |
| (3-2504) | 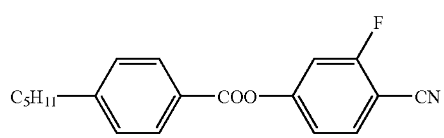 | 7 wt % |
| (3-2505) | 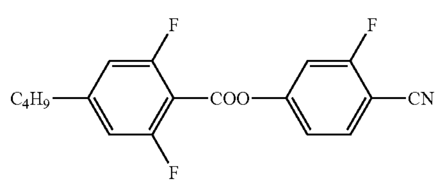 | 5 wt % |
| (3-2506) | 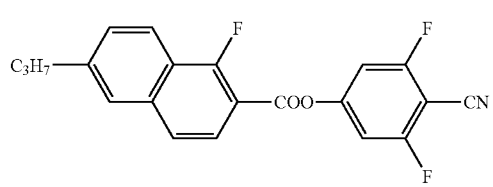 | 5 wt % |
| (3-2507) | 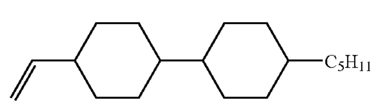 | 10 wt % |

-continued

| | | |
|---|---|---|
| (3-2508) | 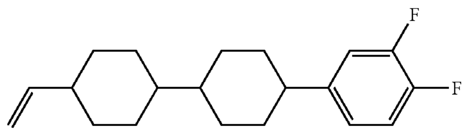 | 17 wt % |
| (3-2509) | 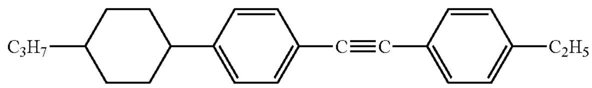 | 7 wt % |
| (3-2510) | 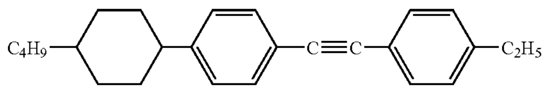 | 6 wt % |
| (3-2511) | 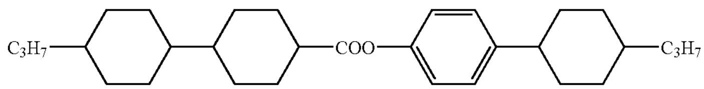 | 7 wt % |
| (3-2512) | 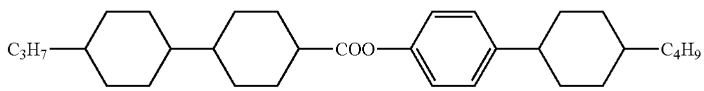 | 7 wt % |

and various properties of this composition were measured. The results are as follows.

Physical properties of the liquid crystal composition $T_{N\text{-}I}$: 92.1° C.

$T_{\rightarrow N}$: −41.° C.

Δ∈: 19.2

Δn: 0.145

Display characteristics of the TN-LCD having a twist angle of 90 degrees (cell thickness 6 μm):

Vth: 1.00 V

γ: 1.13

Display characteristics of the STN-LCD having a twist angle of 240 degrees

Vth: 1.08 V

γ: 1.036

This nematic liquid crystal composition shows a value of optical sharpness near 1.12 that is the limit of TN-LCD liquid crystal shown in the literature "High-speed Liquid Crystal Technology" (p. 63, CMC Publication). Thus it can be understood that this liquid crystal composition is useful for high-frequency multiplexing drive.

Example 26

A nematic liquid crystal composition (3-26) was prepared from

| | | |
|---|---|---|
| (3-2601) | 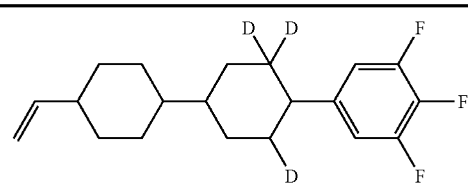 | 7 wt % |
| (3-2602) | 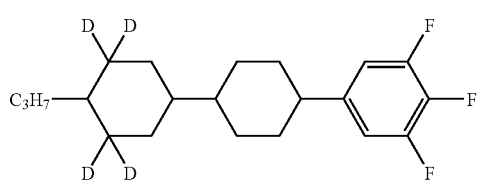 | 7 wt % |
| (3-2603) | 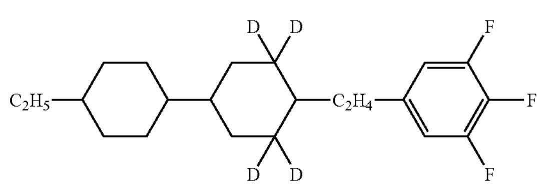 | 7 wt % |

-continued
(3-2604) 7 wt %
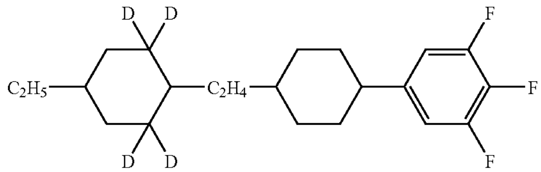
(3-2605) 13 wt %
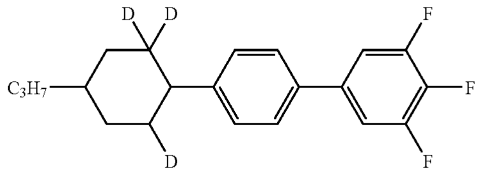
(3-2606) 8 wt %
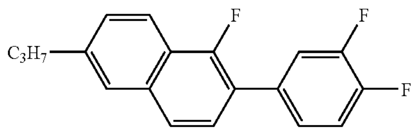
(3-2607) 7 wt %
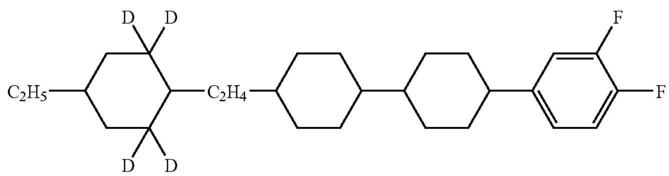
(3-2608) 7 wt %
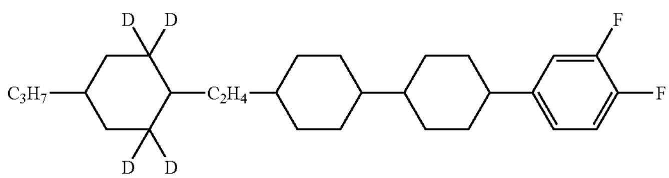
(3-2609) 6 wt %
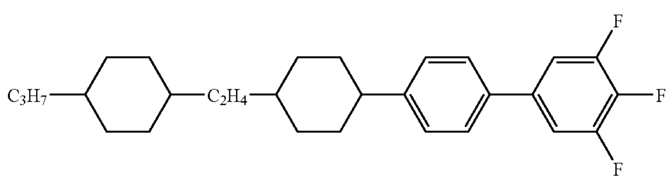
(3-2610) 10 wt %
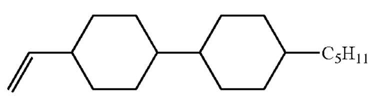
(3-2611) 14 wt %
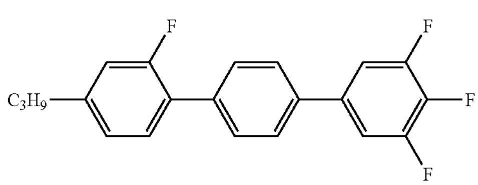
(3-2612) 7 wt %
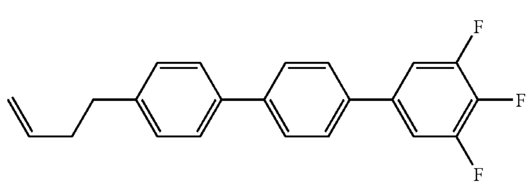

and various properties of this composition were measured. The results are as follows.

Physical properties of the liquid crystal composition $T_{N-I}$: 81.0° C.

$T_{\rightarrow N}$: −70.° C.

Δ∈: 8.6

Δn: 0.120

Reliability characteristics of liquid crystal composition

Resistivity before heating acceleration test: $2.0\times10^{13}$ Ω·cm

Resistivity after heating acceleration test: $6.3\times10^{12}$ Ω·cm

Voltage holding ratio before heating acceleration test: 99.2%

Voltage holding ratio after heating acceleration test: 98.6%

Display characteristics of the TN-LCD having a twist angle of 90 degrees (cell thickness 6 μm):

Vth: 1.44 V

γ: 1.15

Δr=Δd: 50. msec

This nematic liquid crystal composition is capable of operating over a wide range of temperatures because $T_{N-I}$ is high and $T_{-N}$ is low, and has such features as comparatively good response characteristic even at low driving voltage.

Also because this nematic liquid crystal composition has high resistivity and high voltage holding ratio after the heating acceleration test, it can be understood that high thermal stability is ensured. The active matrix liquid crystal display device that employs this composition as the basic constituent material has excellent characteristics with less leak current without occurrence of flicker.

Example 27

A nematic liquid crystal composition (3-27) was prepared from (3-2701) 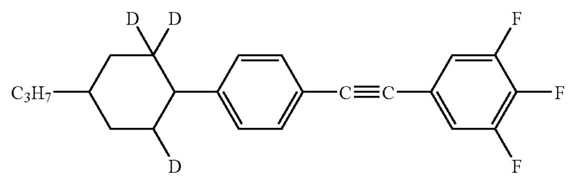 10 wt %

(3-2702) 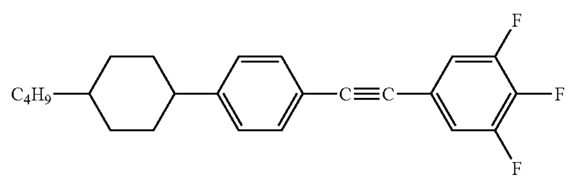 10 wt %

(3-2703) 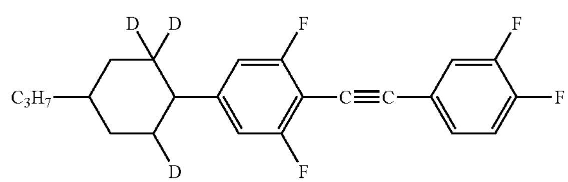 10 wt %

(3-2704) 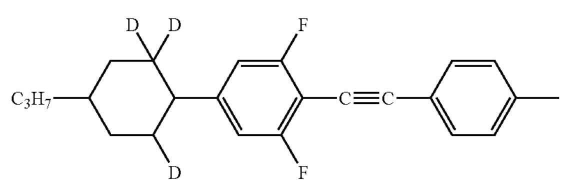 5 wt %

(3-2705) 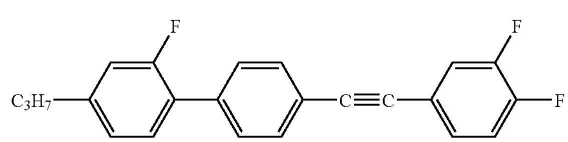 10 wt %

(3-2706) 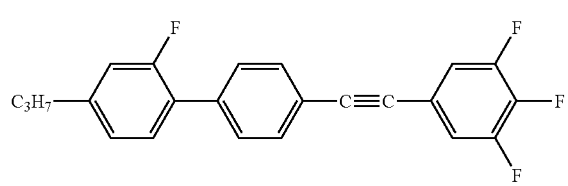 5 wt %

-continued

| | | |
|---|---|---|
| (3-2707) | 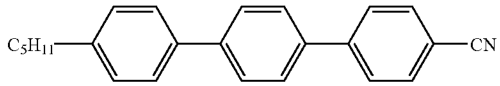 | 10 wt % |
| (3-2708) | 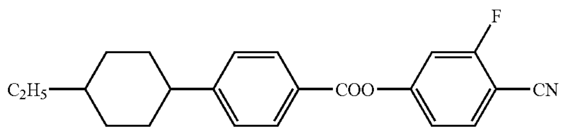 | 10 wt % |
| (3-2709) | 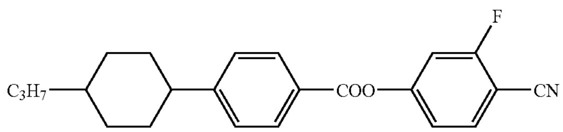 | 10 wt % |
| (3-2710) | 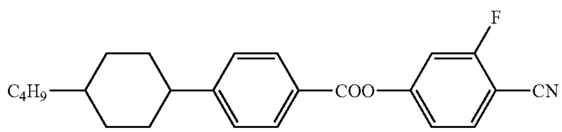 | 10 wt % |
| (3-2711) | 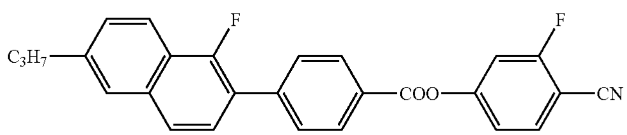 | 10 wt % |

and various properties of this composition were measured. The results are as follows.

Physical properties of the liquid crystal composition $T_{N-I}$: 164.1° C.

$T_{\rightarrow N}$: −50.° C.

Δ∈: 30.4

Δn: 0.254

Display characteristics of the TN-LCD having a twist angle of 90 degrees (cell thickness 8 μm):

Vth: 1.23 V

γ: 1.16

This nematic liquid crystal composition is capable of operating over a wide range of temperatures because $T_{N-I}$ is high and $T_{-N}$ is low.

Example 28

A nematic liquid crystal composition (3-28) was prepared from

| | | |
|---|---|---|
| (3-2801) | 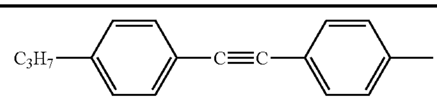 | 20 wt % |
| (3-2802) | 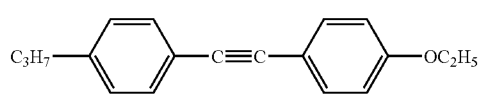 | 10 wt % |
| (3-2803) | 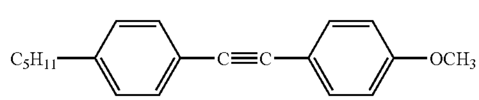 | 5 wt % |
| (3-2804) | 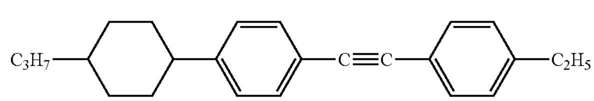 | 7 wt % |
| (3-2805) | 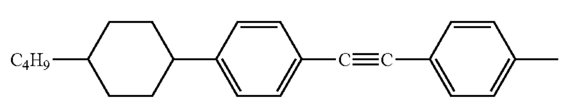 | 8 wt % |

-continued

| | | |
|---|---|---|
| (3-2806) | 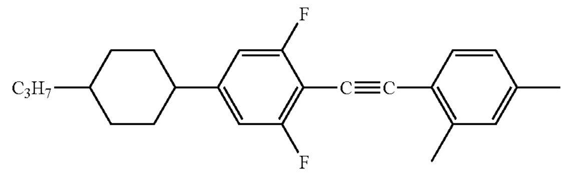 | 10 wt % |
| (3-2807) | 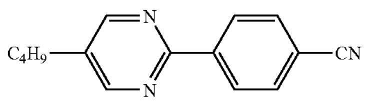 | 6 wt % |
| (3-2808) | 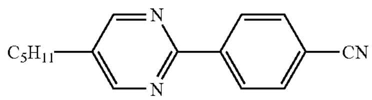 | 7 wt % |
| (3-2809) | 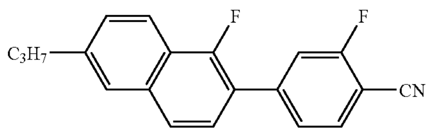 | 7 wt % |
| (3-2810) | 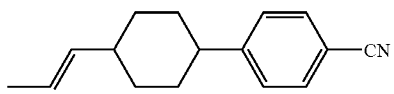 | 10 wt % |
| (3-2811) | 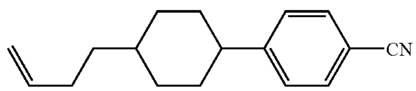 | 10 wt % |

and various properties of this composition were measured. The results are as follows.

Physical properties of the liquid crystal composition $T_{N\text{-}I}$: 72.1° C.

$T_{\rightarrow N}$: −70.° C.

Δ∈: 99

Δn: 0.228

Display characteristics of the TN-LCD having a twist angle of 90 degrees (cell thickness 8 μm):

Vth: 1.69 V

γ: 1.15

τr=τd: 34. msec

Example 29

A nematic liquid crystal composition (3-29) was prepared from

| | | |
|---|---|---|
| (3-2901) | 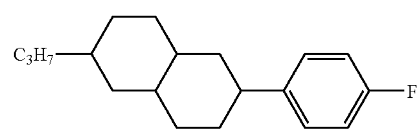 | 25 wt % |
| (3-2902) | 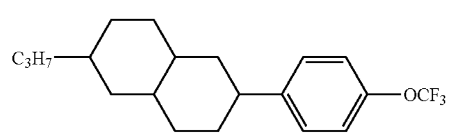 | 25 wt % |
| (3-2903) | 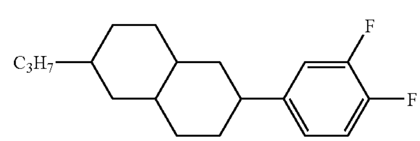 | 10 wt % |

-continued

| | | |
|---|---|---|
| (3-2904) | 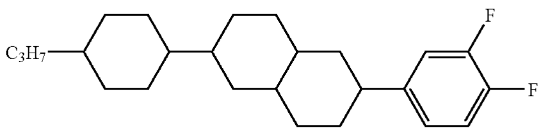 | 20 wt % |
| (3-2905) | 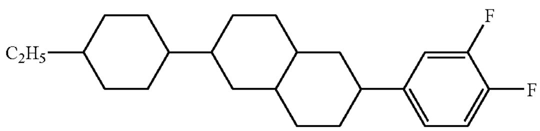 | 20 wt % |

and various properties of this composition were measured. The results are as follows.

Physical properties of the liquid crystal composition $T_{N-I}$: 83.5° C.

$T_{\rightarrow N}$: −70.° C.

Δ∈: 4.5

Δn: 0.073

Reliability characteristics of liquid crystal composition

Resistivity before heating acceleration test: $1.2\times10^{13}$ Ω·cm

Resistivity after heating acceleration test: $7.7\times10^{12}$ Ω·cm

Voltage holding ratio before heating acceleration test: 99.8%

Voltage holding ratio after heating acceleration test: 98.8%

Display characteristics of the TN-LCD having a twist angle of 90 degrees (cell thickness 6 μm):

Vth: 1.79 V

γ: 1.284

The nematic liquid crystal composition is, despite of being composed of five kinds of components, capable of operating over a wide range of temperatures because $T_{N-I}$ is high and $T_{-N}$ is low, and has a low driving voltage compared to the value of dielectric constant anisotropy Δ∈, and is therefore capable of operating even for high resolution display corresponding to a large duty number. Also because this nematic liquid crystal composition has high resistivity and voltage holding ratio after heating acceleration test, it can be understood that high thermal stability is ensured. The active matrix liquid crystal display device that employs this composition as the basic constituent material has excellent characteristics with less leak current without occurrence of flicker.

In the same manner as in the case of the nematic liquid crystal composition (3-29), except that the compound (2-29-01) described below was used in place of the compound (3-2903) in the nematic liquid crystal composition (3-29) of this Example, a nematic liquid crystal composition (3-29-01) was prepared. Also in the same manner as in the case of the nematic liquid crystal composition (3-29), except that the respective compounds (2-29-02) to (2-29-12) were used in place of the compound (3-2901) in the nematic liquid crystal composition (3-29) of this Example, nematic liquid crystal compositions (3-29-02) to (3-29-12) were prepared. Also in the same manner as in the case of the nematic liquid crystal composition (3-29), except that the respective compounds (2-29-13) to (2-29-15) were used in place of the compound (3-2903) in the nematic liquid crystal composition (3-29) of this Example, nematic liquid crystal compositions (3-29-13) to (3-29-25) were prepared.

The display characteristics of these nematic liquid crystal compositions (3-29-01) to (3-29-25) showed good results, similar to this Example. Particularly, the nematic liquid crystal compositions (3-29-01), (3-29-13), (3-29-16), (3-29-19), (3-29-22) and (3-29-25) exhibited the reduced driving voltage of about 1.5 V.

(2-29-01)

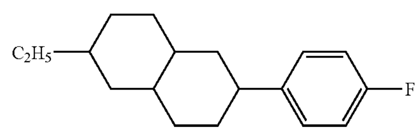

(2-29-02)

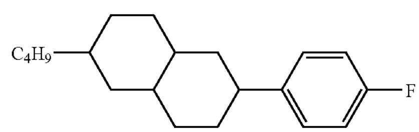

(2-29-03)

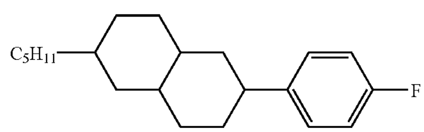

(2-29-04)

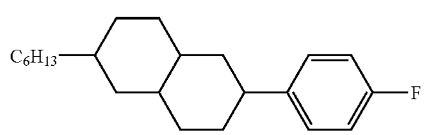

(2-29-05)

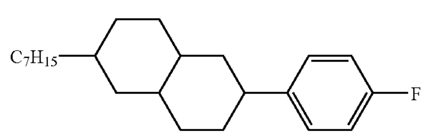

(2-29-06)

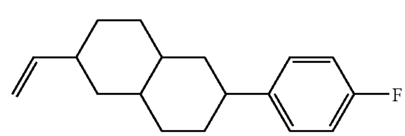

-continued (2-29-07)

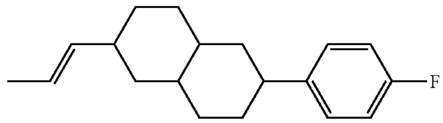

(2-29-08)

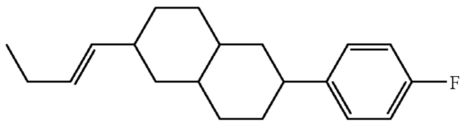

(2-29-09)

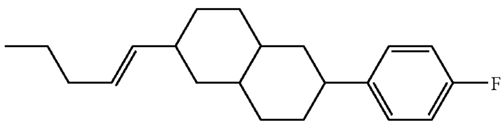

(2-29-10)

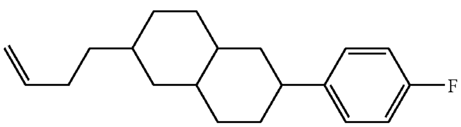

(2-29-11)

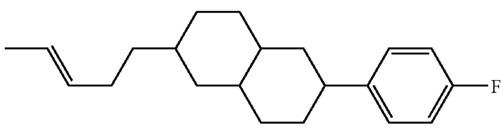

(2-29-12)

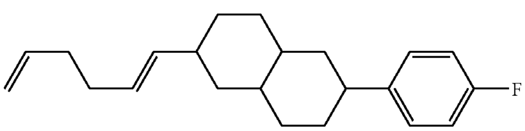

(2-29-13)

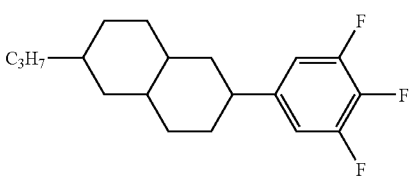

(2-29-14)

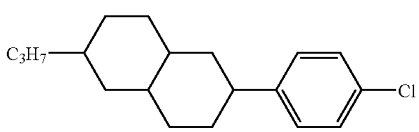

(2-29-15)

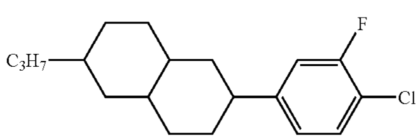

(2-29-16)

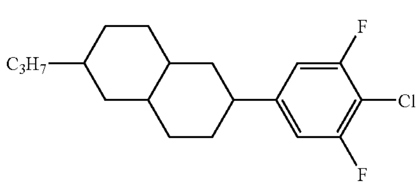

-continued (2-29-17)

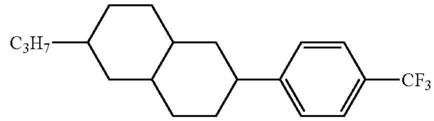

(2-29-18)

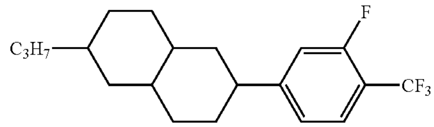

(2-29-19)

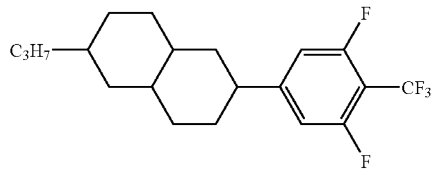

(2-29-20)

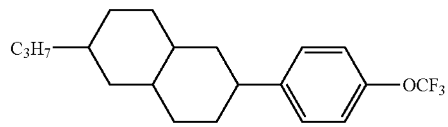

(2-29-21)

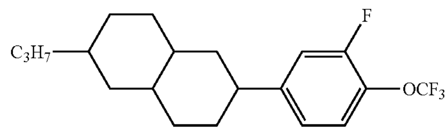

(2-29-22)

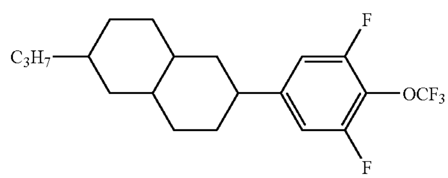

(2-29-23)

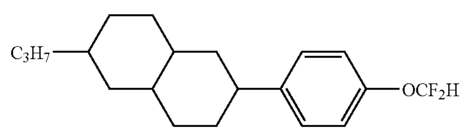

(2-29-24)

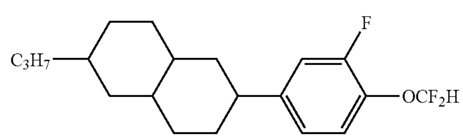

(2-29-25)

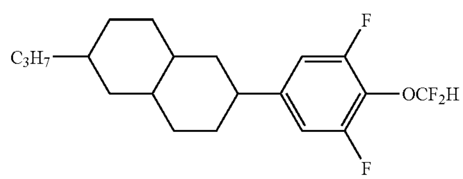

Comparative Example 6

In order to demonstrate the superiority of the present invention, a mixed liquid crystal (b-06) made by substituting the liquid crystal component A of the nematic liquid crystal composition (3-29) described above with another compound. Specifically, the compound was replaced by a compound in which the decahydronaphthalene-2,6-diyl group is substituted with the 1,4-cyclohexylene group. The results are as follows.

| | | |
|---|---|---|
| (b-0601) | 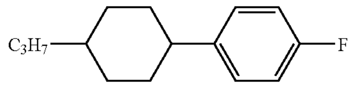 | 25 wt % |
| (b-0602) | 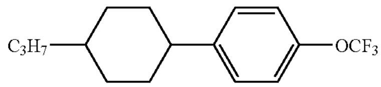 | 25 wt % |
| (b-0603) | 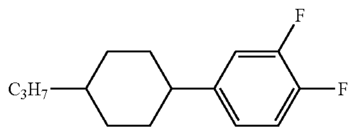 | 10 wt % |
| (b-0604) | 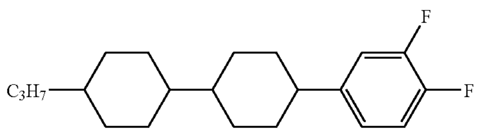 | 20 wt % |
| (b-0605) | 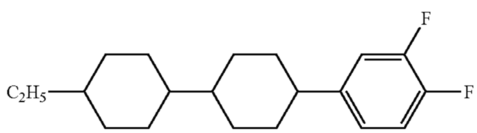 | 20 wt % |

The mixed liquid crystal (b-06) is composed of the components described above.

Physical properties of the liquid crystal composition $T_{N-I}$: −4° C.

Δ∈: Impossible to measure

Δn: Impossible to measure

η: Impossible to measure

Display characteristics of the TN-LCD having a twist angle of 90 degrees (cell thickness 6 μm):

Vth Impossible to measure

γ: Impossible to measure

τr=τd: Impossible to measure

Display characteristics of the STN-LCD having a twist angle of 240 degrees

Vth: Impossible to measure

γ: Impossible to measure

Δ(Vth)/Δ(T): Impossible to measure

τr=τd: Impossible to measure

The mixed liquid crystal (b-06) can not be used within a normal temperature range because it has a nematic phase at 0° C. or lower, wwhile the nematic liquid crystal composition (3-29) of the present invention has such a feature as to operate over a wide range of temperatures because $T_{N-I}$ is high and $T_{-N}$ is low, and has excellent co-solubility.

Example 30

A nematic liquid crystal composition (3-30) was prepared from

| | | |
|---|---|---|
| (3-3001) | 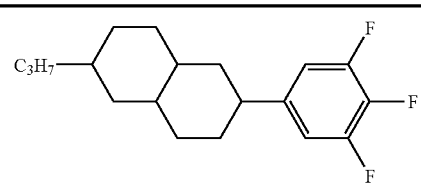 | 10 wt % |
| (3-3002) | 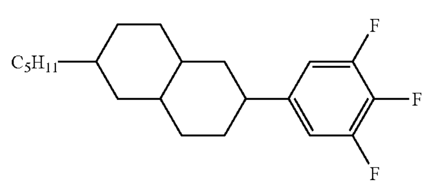 | 10 wt % |

-continued
| | | |
|---|---|---|
| (3-3003) | 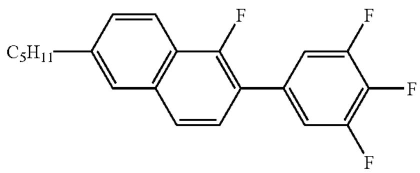 | 10 wt % |
| (3-3004) | 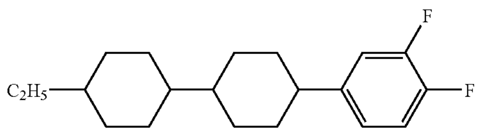 | 10 wt % |
| (3-3005) | 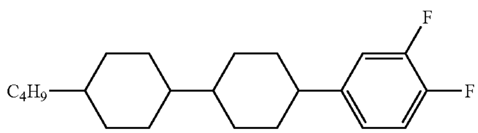 | 10 wt % |
| (3-3006) | 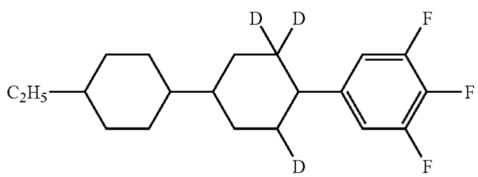 | 5 wt % |
| (3-3007) | 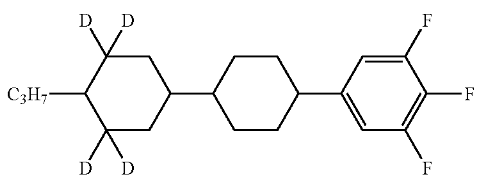 | 5 wt % |
| (3-3008) | 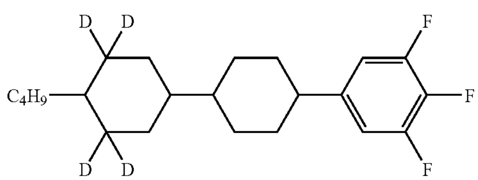 | 5 wt % |
| (3-3009) | 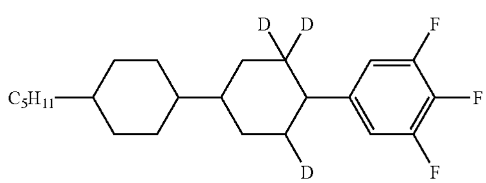 | 5 wt % |
| (3-3010) | 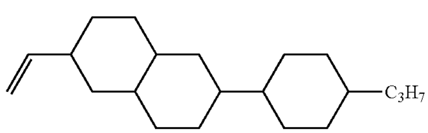 | 10 wt % |
| (3-3011) | 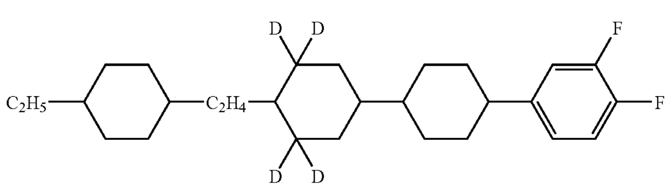 | 10 wt % |

-continued

| | | |
|---|---|---|
| (3-3012) | 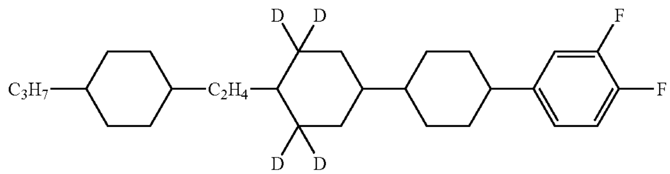 | 10 wt % |

and various properties of this composition were measured. The results are as follows.

Physical properties of the liquid crystal composition $T_{N\text{-}I}$: 95.0° C.

$T_{\rightarrow N}$: −70.° C.

Δ∈: 6.9

Δn: 0.080

Resistivity before heating acceleration test: $9.9\times10^{12}$ Ω·cm

Resistivity after heating acceleration test: $5.3\times10^{12}$ Ω·cm

Voltage holding ratio before heating acceleration test: 99.1%

Voltage holding ratio after heating acceleration test: 98.5%

Display characteristics of the TN-LCD having a twist angle of 90 degrees (cell thickness 6 μm):

Vth: 1.38 V

γ: 1.281

The nematic liquid crystal composition is capable of operating over a wide range of temperatures because $T_{N\text{-}I}$ is high and $T_{\text{-}N}$ is low, and has a low driving voltage compared to the value of dielectric constant anisotropy Δ∈, and is therefore capable of operating even for high resolution display corresponding to a large duty number. Also because this nematic liquid crystal composition has high resistivity and voltage holding ratio after heating acceleration test, it can be understood that high thermal stability is ensured. The active matrix liquid crystal display device that employs this composition as the basic constituent material has excellent characteristics with less leak current without occurrence of flicker.

Example 31

A nematic liquid crystal composition (3-31) was prepared from

| | | |
|---|---|---|
| (3-3101) | 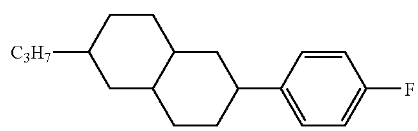 | 15 wt % |
| (3-3102) | 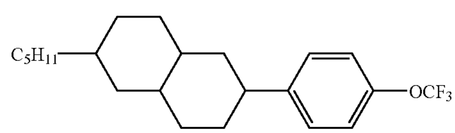 | 15 wt % |
| (3-3103) | 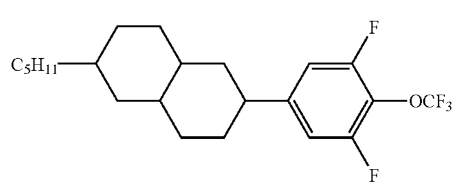 | 10 wt % |
| (3-3104) | 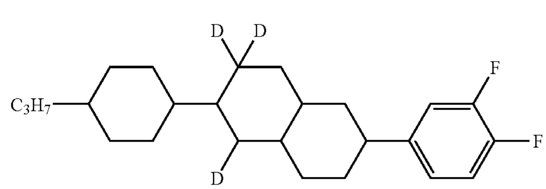 | 10 wt % |

-continued

| | | |
|---|---|---|
| (3-3105) | 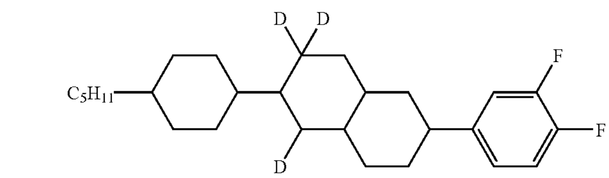 | 5 wt % |
| (3-3106) | 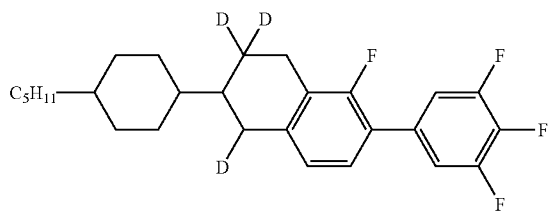 | 15 wt % |
| (3-3107) | 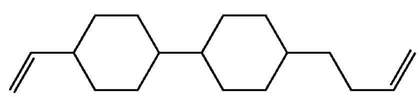 | 15 wt % |
| (3-3108) | 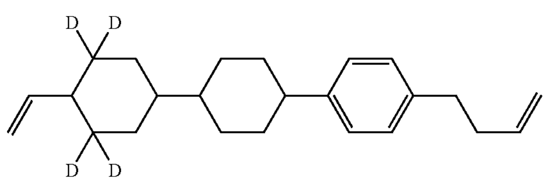 | 10 wt % |
| (3-3109) | 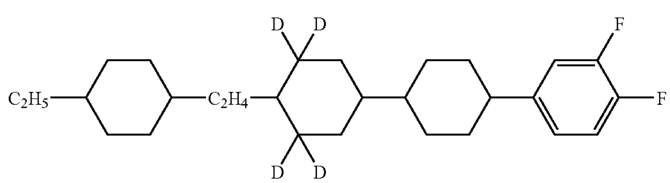 | 5 wt % |

and various properties of this composition were measured. The results are as follows.

Physical properties of the liquid crystal composition $T_{N\text{-}I}$: 86.2° C.

$T_{\rightarrow N}$: −70.° C.

Δ∈: 4.9

Δn: 0.089

η: 28.9 c.p.

Resistivity before heating acceleration test: $1.0\times10^{13}$ Ω·cm

Resistivity after heating acceleration test: $7.6\times10^{12}$ Ω·cm

Voltage holding ratio before heating acceleration test: 99.2%

Voltage holding ratio after heating acceleration test: 98.6%

Display characteristics of the TN-LCD having a twist angle of 90 degrees (cell thickness 6 μm):

Vth: 1.69 V

γ: 1.251

τr=τd: 42.1 msec

The nematic liquid crystal composition is capable of operating over a wide range of temperatures because $T_{N\text{-}I}$ is high and $T_{\text{-}N}$ is low, and has a low driving voltage compared to the value of dielectric constant anisotropy Δ∈, and is therefore capable of operating even for high resolution display corresponding to a large duty number. Also because this nematic liquid crystal composition has high resistivity and voltage holding ratio after heating acceleration test, it can be understood that high thermal stability is ensured. The active matrix liquid crystal display device that employs this composition as the basic constituent material has excellent characteristics with less leak current without occurrence of flicker.

Example 32
A nematic liquid crystal composition (3-32) was prepared from
| | | |
|---|---|---|
| (3-3201) | 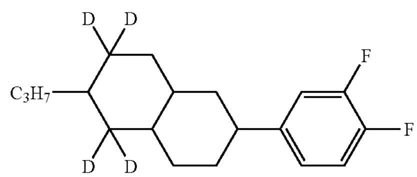 | 10 wt % |
| (3-3202) | 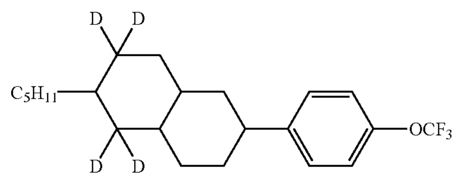 | 10 wt % |
| (3-3203) | 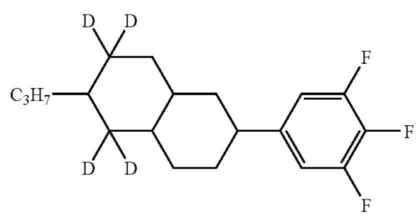 | 10 wt % |
| (3-3204) | 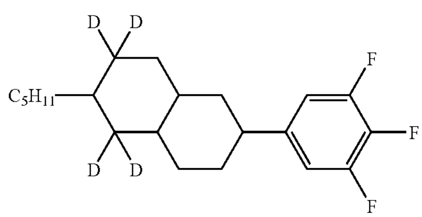 | 10 wt % |
| (3-3205) | 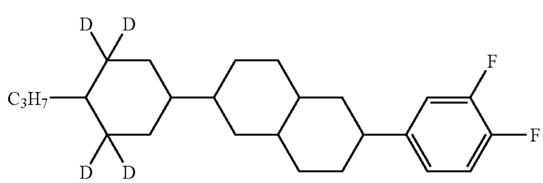 | 15 wt % |
| (3-3206) | 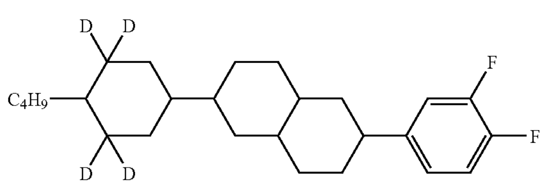 | 10 wt % |
| (3-3207) | 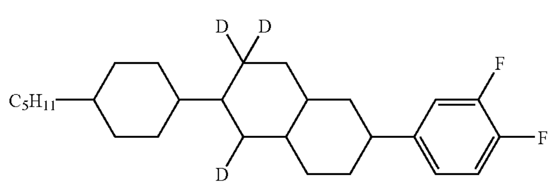 | 15 wt % |
| (3-3208) | 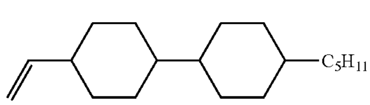 | 10 wt % |

-continued (3-3209) 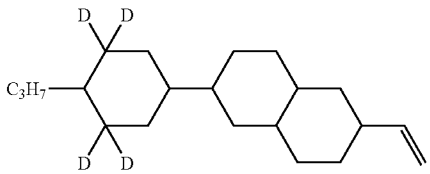 15 wt % and various properties of this composition were measured. The results are as follows.

Physical properties of the liquid crystal composition $T_{N-I}$: 86.3° C.

$T_{\to N}$: −70.° C.

Δ∈: 4.2

Δn: 0.067

Resistivity before heating acceleration test: $5.0\times10^{13}$ Ω·cm

Resistivity after heating acceleration test: $8.8\times10^{12}$ Ω·cm

Voltage holding ratio before heating acceleration test: 99.6%

Voltage holding ratio after heating acceleration test: 99.5%

Display characteristics of the TN-LCD having a twist angle of 90 degrees (cell thickness 6 μm):

Vth: 2.29 V

γ=1.284

The nematic liquid crystal composition is capable of operating over a wide range of temperatures because $T_{N-I}$ is high and $T_{-N}$ is low, and has a low driving voltage compared to the value of dielectric constant anisotropy Δ∈, and is therefore capable of operating even for high resolution display corresponding to a large duty number. Also because this nematic liquid crystal composition has high resistivity and voltage holding ratio after heating acceleration test, it can be understood that high thermal stability is ensured. The active matrix liquid crystal display device that employs this composition as the basic constituent material has excellent characteristics with less leak current without occurrence of flicker.

Example 33

A nematic liquid crystal composition (3-33) was prepared from (3-3301) 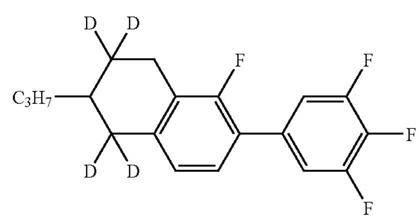 10 wt %

(3-3302) 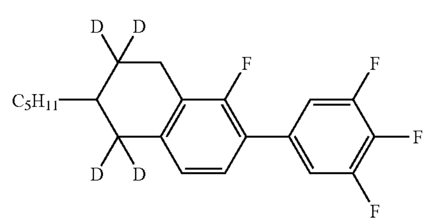 10 wt %

(3-3303) 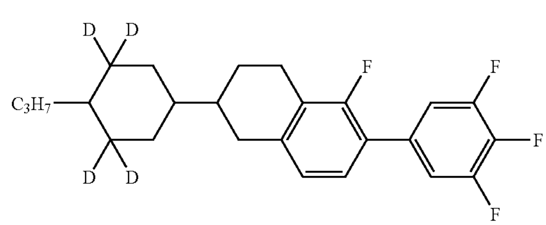 10 wt %

-continued
(3-3304) 5 wt %
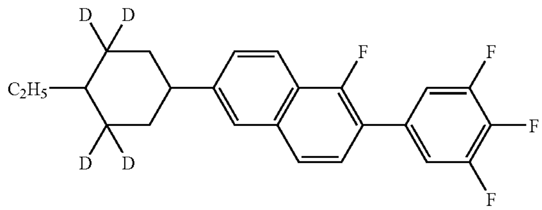
(3-3305) 10 wt %
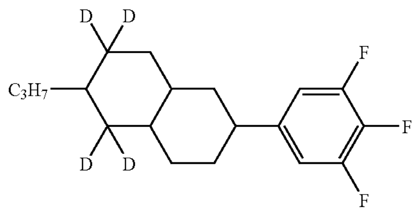
(3-3306) 10 wt %
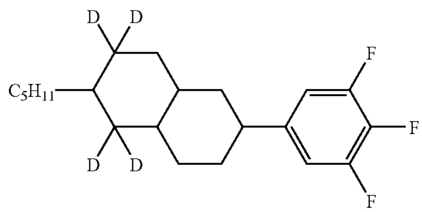
(3-3307) 10 wt %
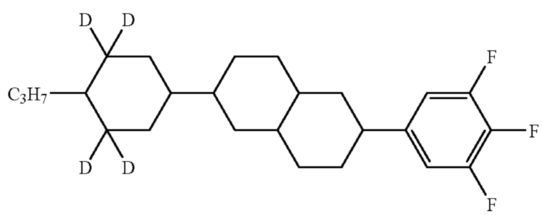
(3-3308) 10 wt %
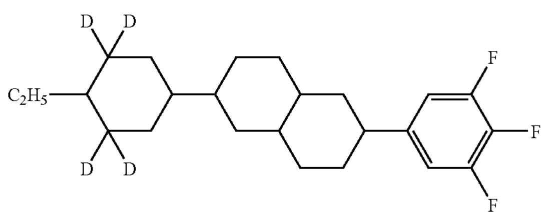
(3-3309) 10 wt %
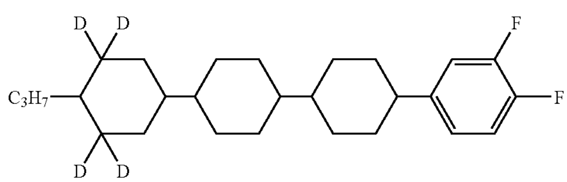
(3-3310) 15 wt %
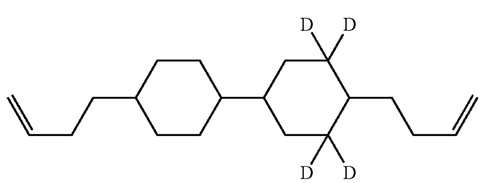
and various properties of this composition were measured. The results are as follows.
Physical properties of the liquid crystal composition
$T_{N\text{-}I}$: 71.4° C.
$T_{\rightarrow N}$: −70.° C.
$\Delta\epsilon$: 8.1
$\Delta n$: 0.089

Voltage holding ratio before heating acceleration test: 99.0%

Voltage holding ratio after heating acceleration test: 98.8%

Display characteristics of the TN-LCD having a twist angle of 90 degrees (cell thickness 6 μm):

Vth: 1.12 V

γ: 1.256

The nematic liquid crystal composition is capable of operating over a wide range of temperatures because $T_{N-I}$ is high and $T_{-N}$ is low, and has a low driving voltage compared to the value of dielectric constant anisotropy Δ∈, and is therefore capable of operating even for high resolution display corresponding to a large duty number. Also because this nematic liquid crystal composition has high resistivity and voltage holding ratio after heating acceleration test, it can be understood that high thermal stability is ensured. The active matrix liquid crystal display device that employs this composition as the basic constituent material has excellent characteristics with less leak current without occurrence of flicker.

The following nematic liquid compositions are prepared.

In the same manner as in the case of the nematic liquid crystal composition (3-33), except that the respective compounds (2-33-01) to (2-33-71) described below were used in place of the compound (3-3303) in the nematic liquid crystal composition (3-33) of this Example, nematic liquid crystal compositions (3-33-01) to (3-33-71) were prepared. The display characteristics of these nematic liquid crystal compositions (3-33-01) to (3-33-71) showed good results, similar to this Example.

(2-33-01)

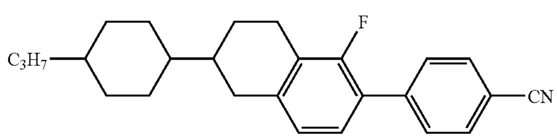

(2-33-02)

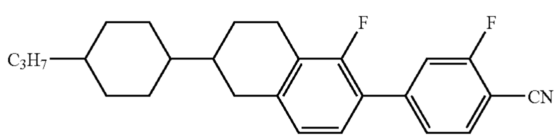

(2-33-03)

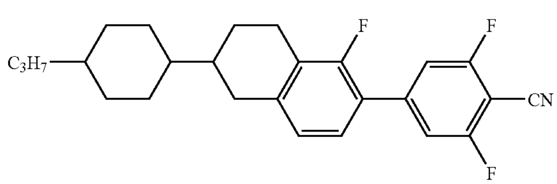

(2-33-04)

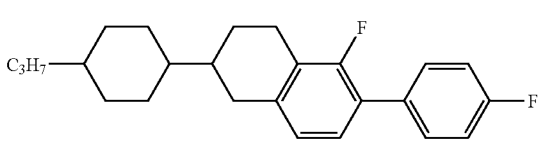

-continued (2-33-05)

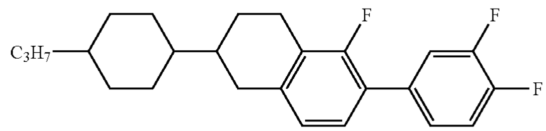

(2-33-06)

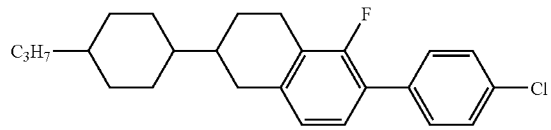

(2-33-07)

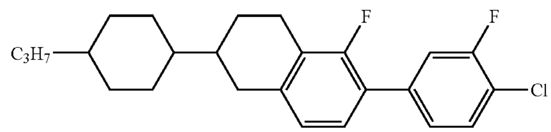

(2-33-08)

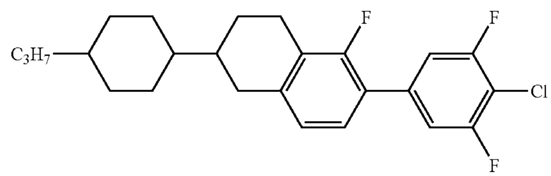

(2-33-09)

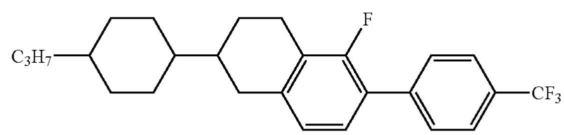

(2-33-10)

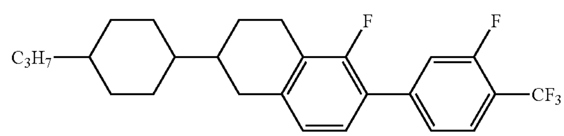

(2-33-11)

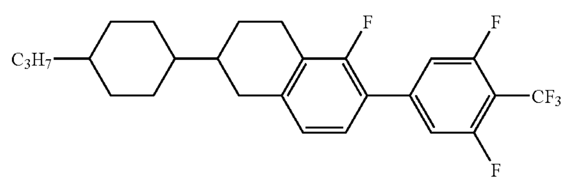

(2-33-12)

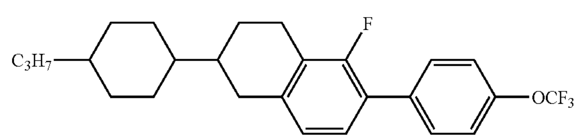

(2-33-13)

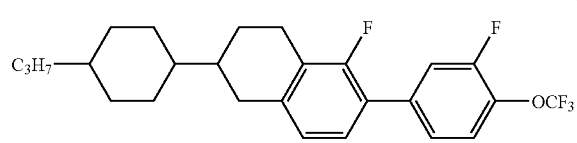

-continued
(2-33-14)
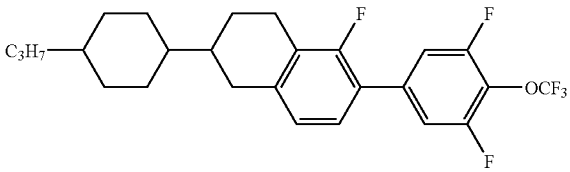
(2-33-15)
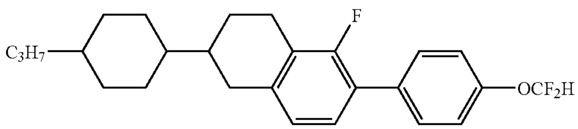
(2-33-16)
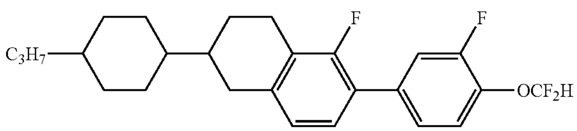
(2-33-17)
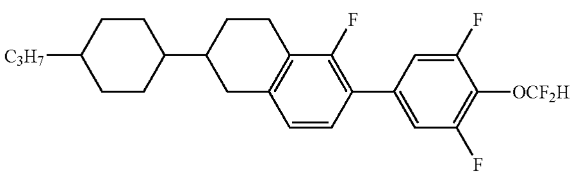
(2-33-18)
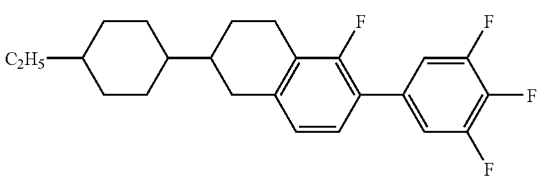
(2-33-19)
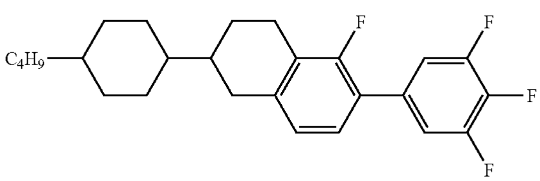
(2-33-20)
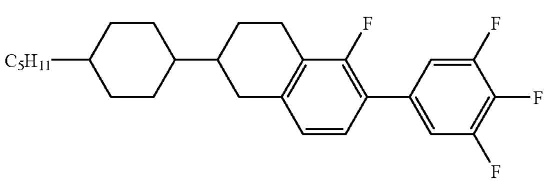
(2-33-21)
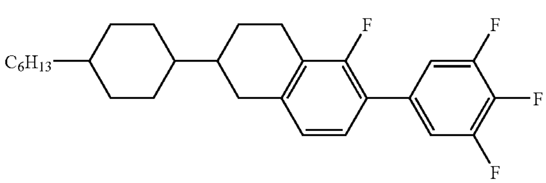
-continued
(2-33-22)
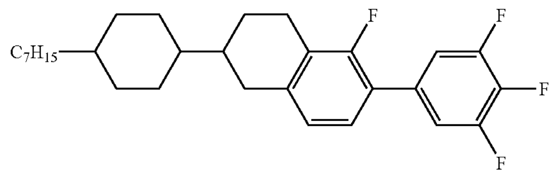
(2-33-23)
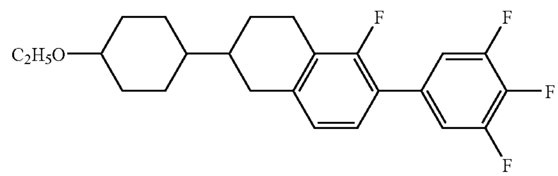
(2-33-24)
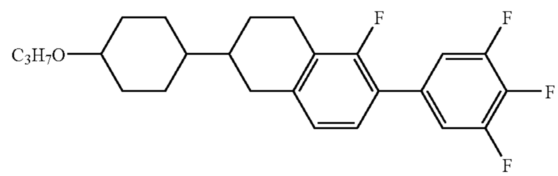
(2-33-25)
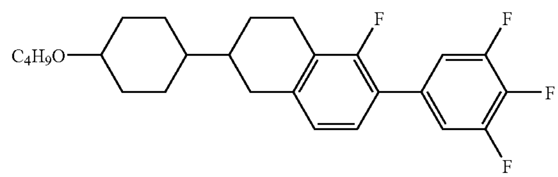
(2-33-26)
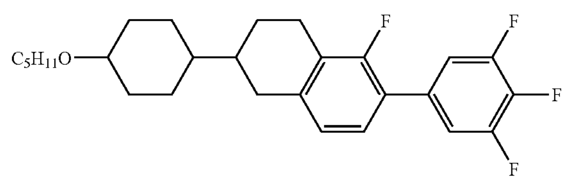
(2-33-27)
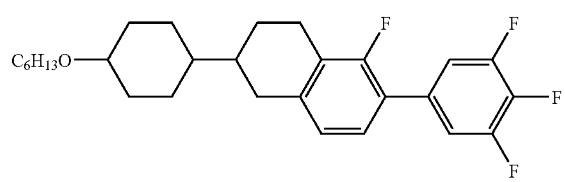
(2-33-28)
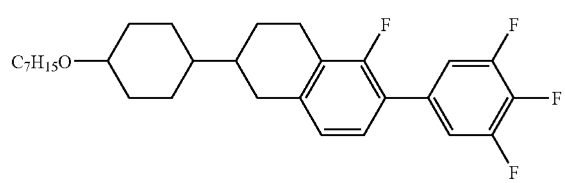
(2-33-29)
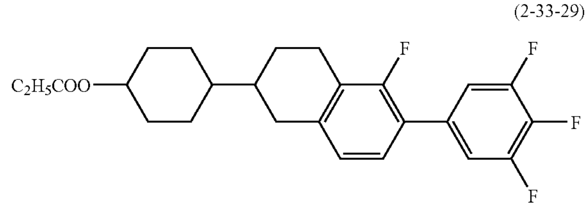

-continued
(2-33-30)
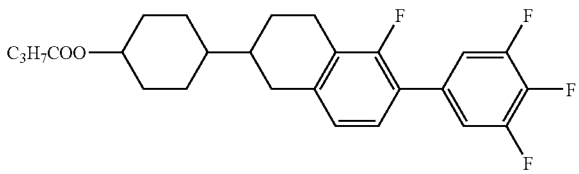
(2-33-31)
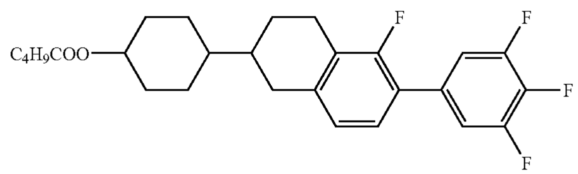
(2-33-32)
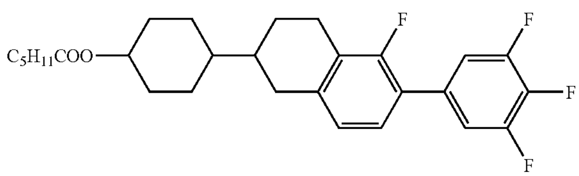
(2-33-33)
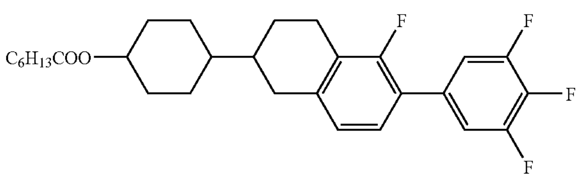
(2-33-34)
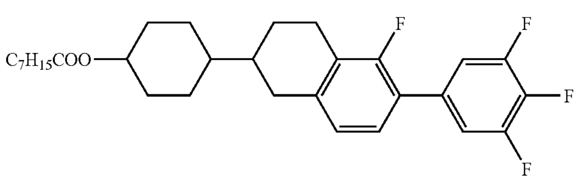
(2-33-35)
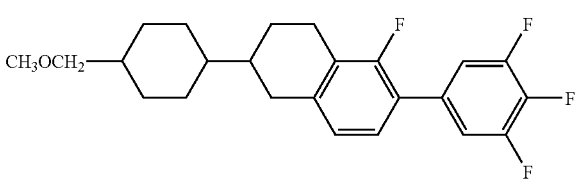
(2-33-36)
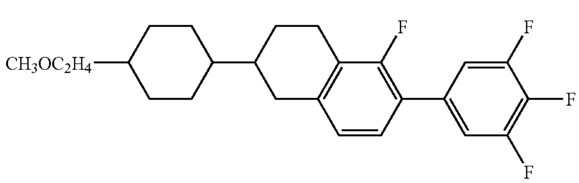
(2-33-37)
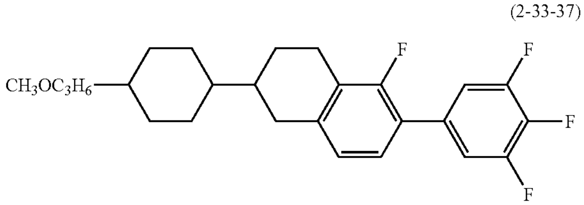
-continued
(2-33-38)
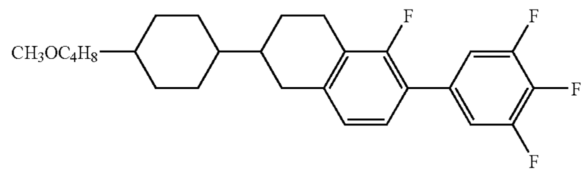
(2-33-39)
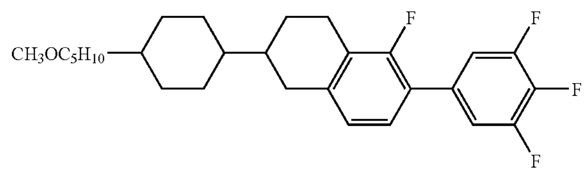
(2-33-40)
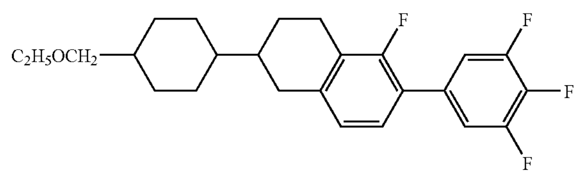
(2-33-41)
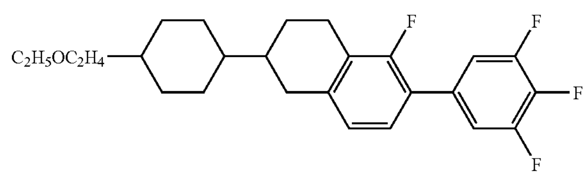
(2-33-42)
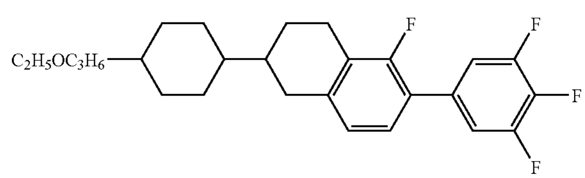
(2-33-43)
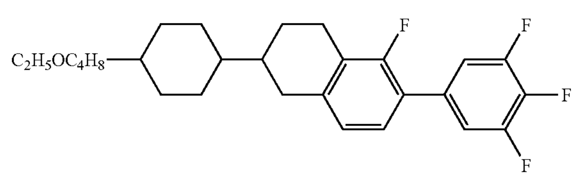
(2-33-44)
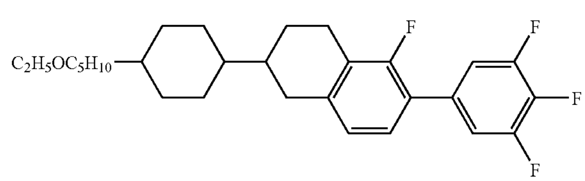
(2-33-45)
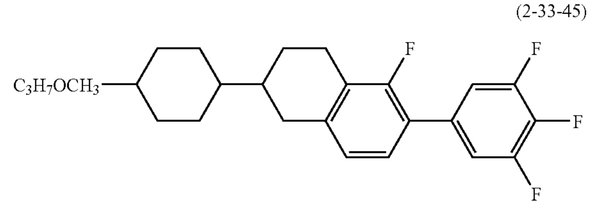

-continued
(2-33-46)
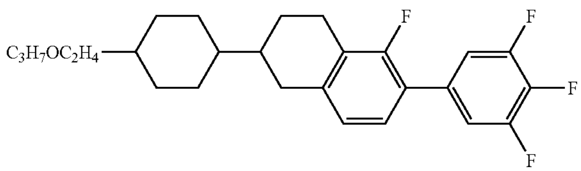
(2-33-47)
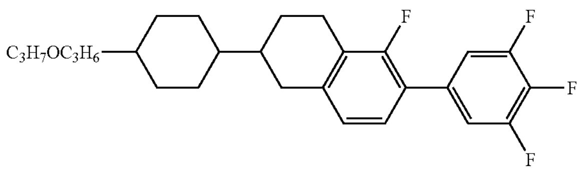
(2-33-48)
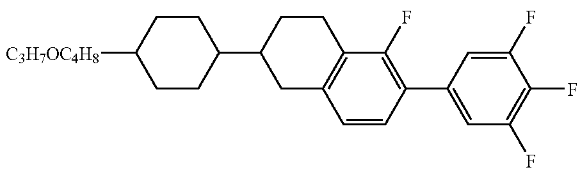
(2-33-49)
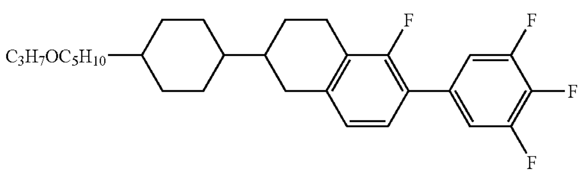
(2-33-50)
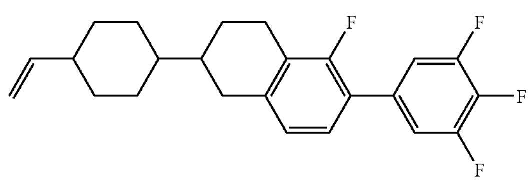
(2-33-51)
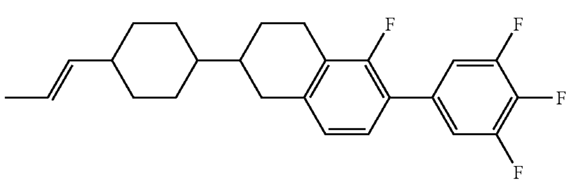
(2-33-52)
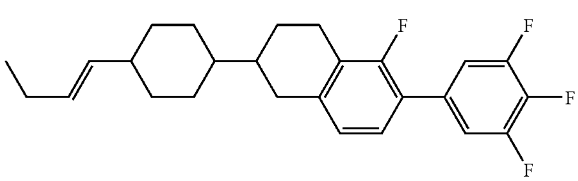
(2-33-53)
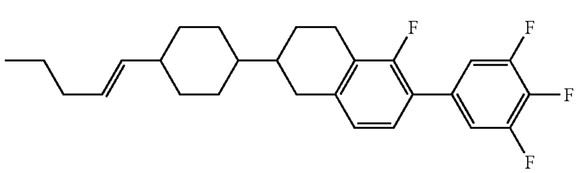
-continued
(2-33-54)
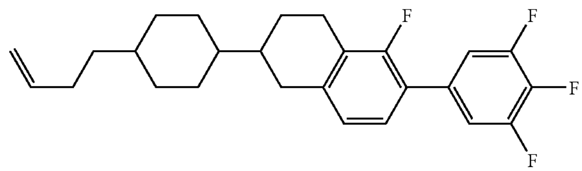
(2-33-55)
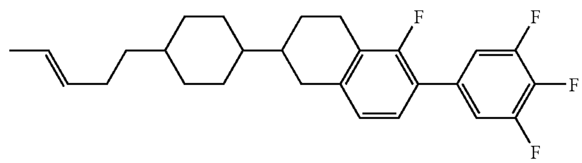
(2-33-56)
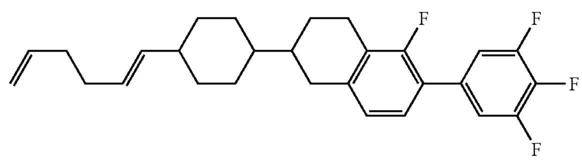
(2-33-57)
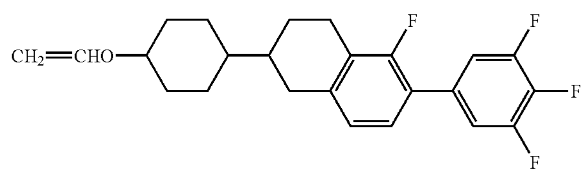
(2-33-58)
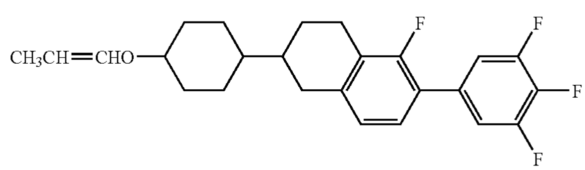
(2-33-59)
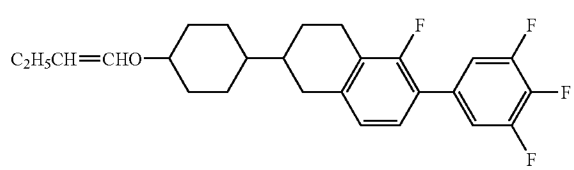
(2-33-60)
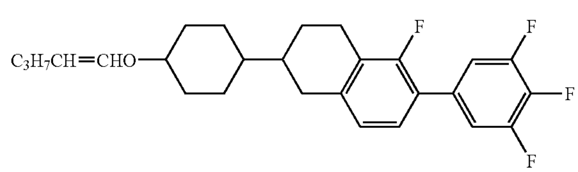
(2-33-61)
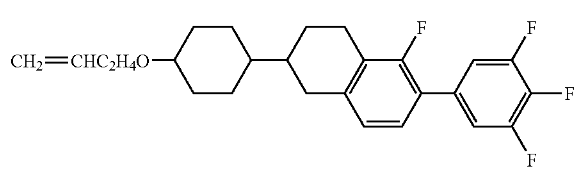

-continued
(2-33-62)
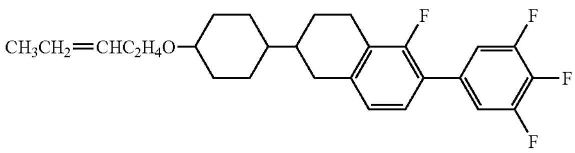
(2-33-63)
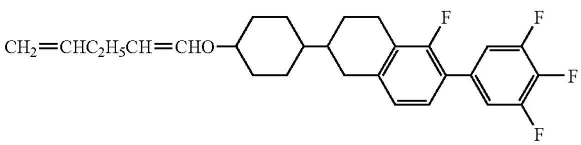
(2-33-64)
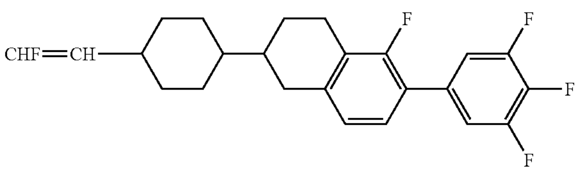
(2-33-65)
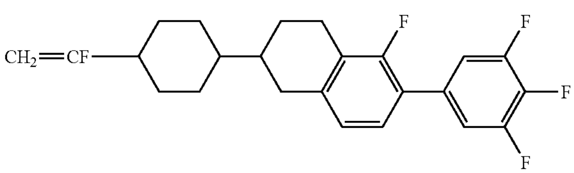
(2-33-66)
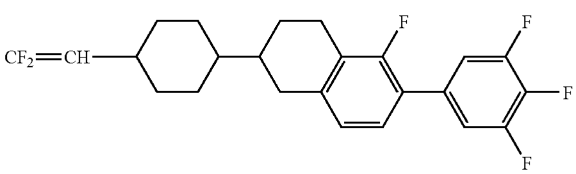
-continued
(2-33-67)
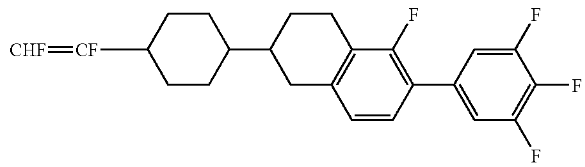
(2-33-68)
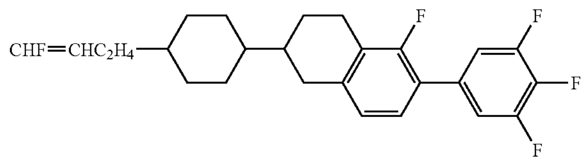
(2-33-69)
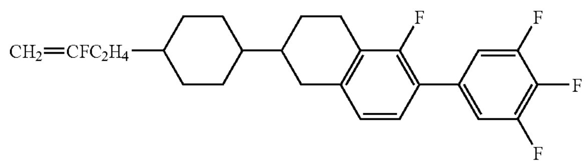
(2-33-70)
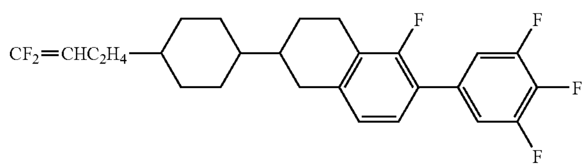
(2-33-71)
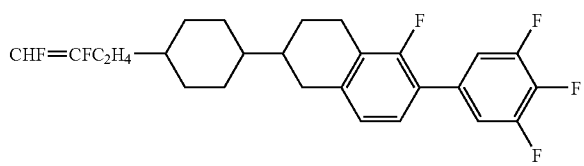
Example 34
A nematic liquid crystal composition (3-34) was prepared from
| | | |
|---|---|---|
| (3-3401) | 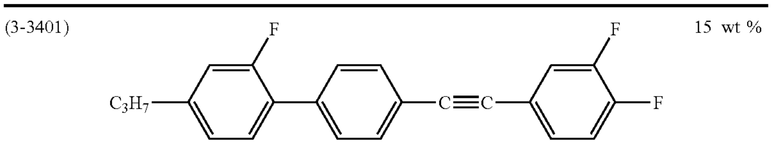 | 15 wt % |
| (3-3402) | 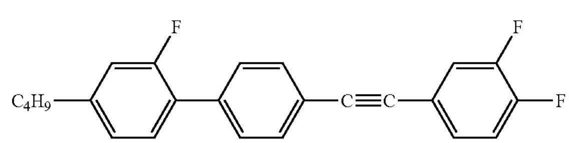 | 15 wt % |
| (3-3403) | 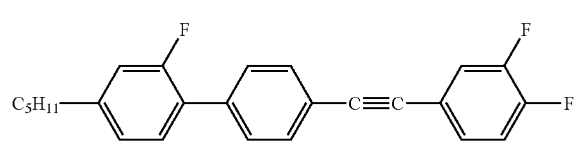 | 15 wt % |

-continued

| | | |
|---|---|---|
| (3-3404) | 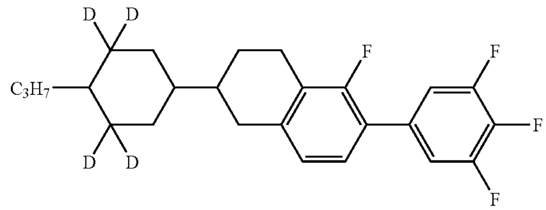 | 10 wt % |
| (3-3405) | 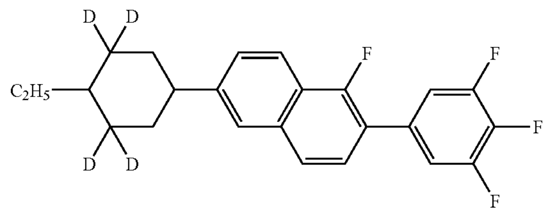 | 5 wt % |
| (3-3406) | 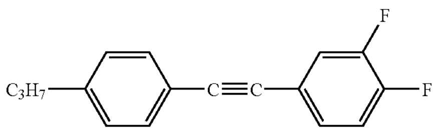 | 10 wt % |
| (3-3407) | 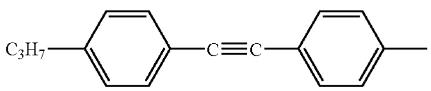 | 15 wt % |
| (3-3408) | 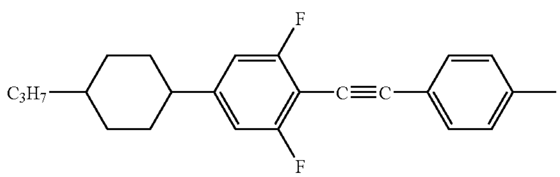 | 13 wt % |
| (3-3409) | 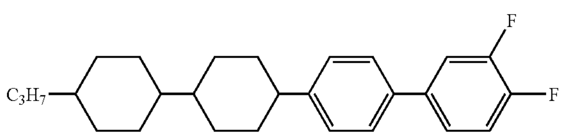 | 2 wt % |

and various properties of this composition were measured. The results are as follows.

Physical properties of the liquid crystal composition $T_{N-I}$: 100.2° C.

$T_{\to N}$: −40.° C.

Δ∈: 7.1

Δn: 0.268

Voltage holding ratio before heating acceleration test: 98.9%

Voltage holding ratio after heating acceleration test: 98.0%

Display characteristics of the TN-LCD having a twist angle of 90 degrees (cell thickness 6 μm):

Vth: 2.09 V

γ: 1.148

The nematic liquid crystal composition is capable of operating over a wide range of temperatures because $T_{N-I}$ is high and $T_{-N}$ is low, and also has a large value of Δn, and is therefore capable of improving the response speed. Also because this nematic liquid crystal composition has high resistivity and voltage holding ratio after heating acceleration test, it can be understood that high thermal stability is ensured. The active matrix liquid crystal display device that employs this composition as the basic constituent material has excellent characteristics with less leak current without occurrence of flicker.

This nematic liquid crystal composition shows a value of optical sharpness near 1.12 that is the limit of TN-LCD liquid crystal shown in the literature "High-speed Liquid Crystal Technology" (p. 63, CMC Publication). Thus it can be understood that this liquid crystal composition is useful for high-frequency multiplexing drive.

This nematic liquid crystal composition was used to make TN-LCD having cell thickness d of 1.9 μm and display characteristics thereof were measured. A liquid crystal display device having a threshold voltage of 1.67 V and a response speed of 2.6 msec. was obtained.

The following nematic liquid compositions are prepared.

In the same manner as in the case of the nematic liquid crystal composition (3-34), except that the respective compounds (2-34-01) to (2-34-38) were used in place of the compound (3-3404) in the nematic liquid crystal composition (3-34) of this Example, nematic liquid crystal compositions (3-34-01) to (3-34-38) were prepared. The display characteristics of these nematic liquid crystal compositions (3-34-01) to (3-34-38) showed good results, similar to this example.
(2-34-01)
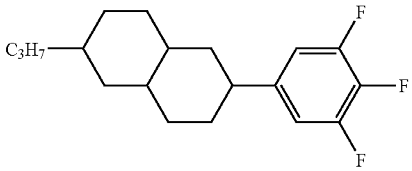
(2-34-02)
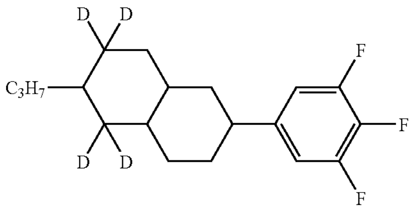
(2-34-03)
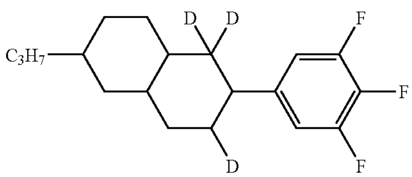
(2-34-04)
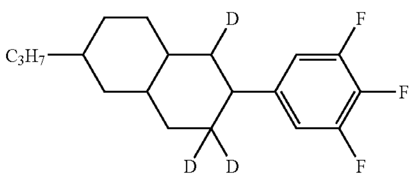
(2-34-05)
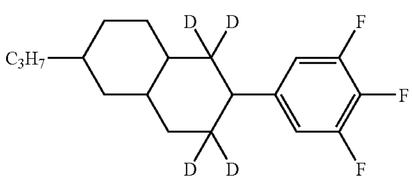
(2-34-06)
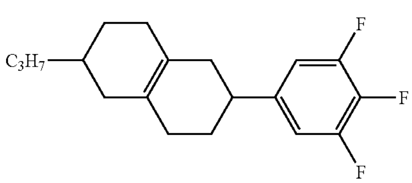
(2-34-07)
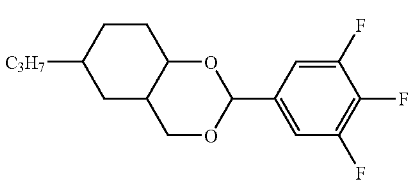
(2-34-08)
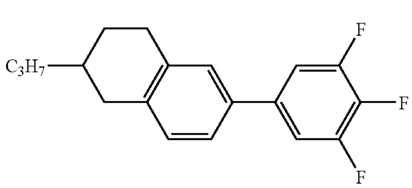
-continued
(2-34-09)
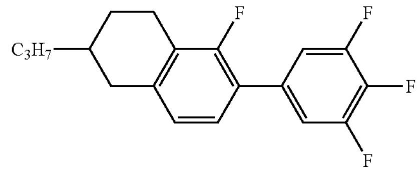
(2-34-10)
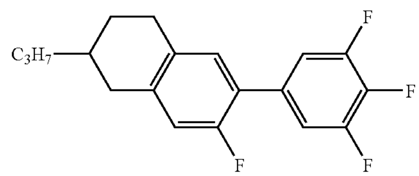
(2-34-11)
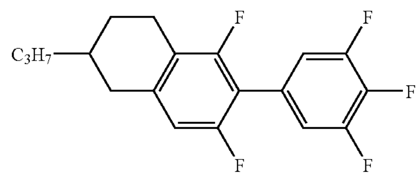
(2-34-12)
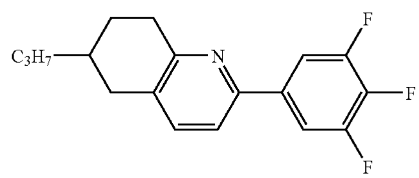
(2-34-13)
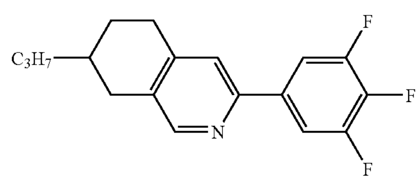
(2-34-14)
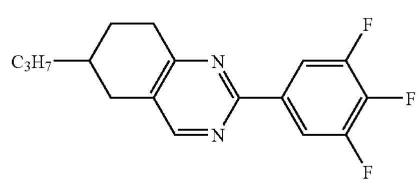
(2-34-15)
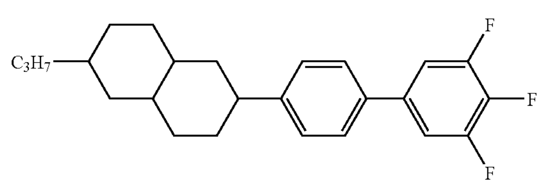
(2-34-16)
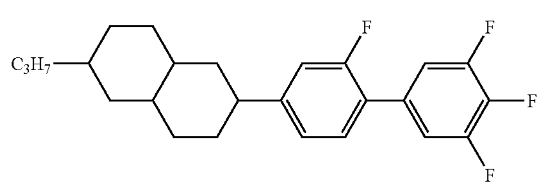

-continued
(2-34-17)
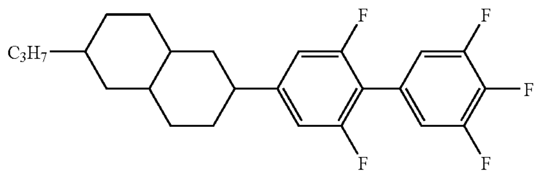
(2-34-18)
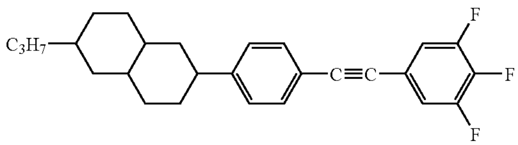
(2-34-19)
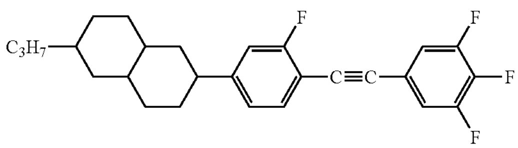
(2-34-20)
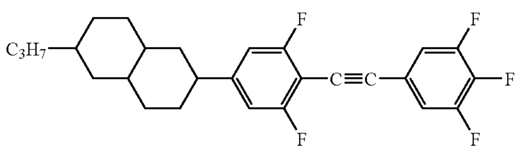
(2-34-21)
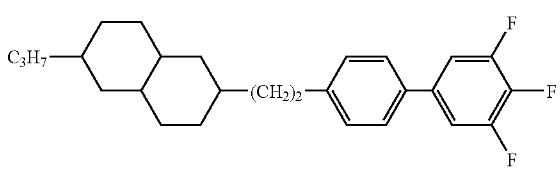
(2-34-22)
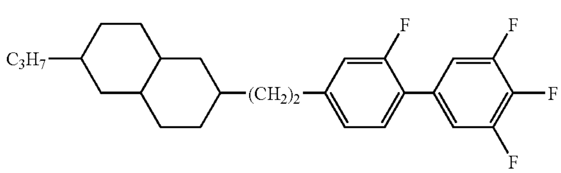
(2-34-23)
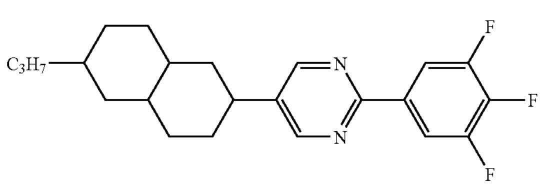
(2-34-24)
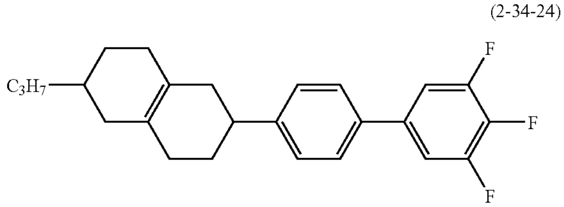
-continued
(2-34-25)
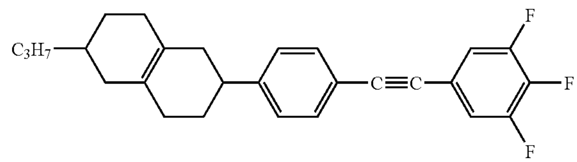
(2-34-26)
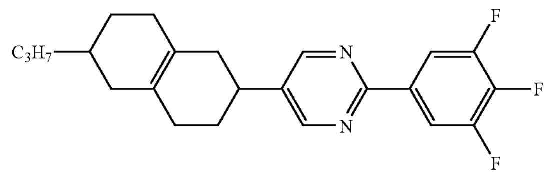
(2-34-27)
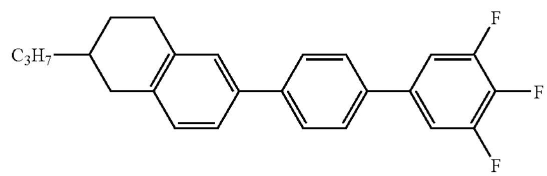
(2-34-28)
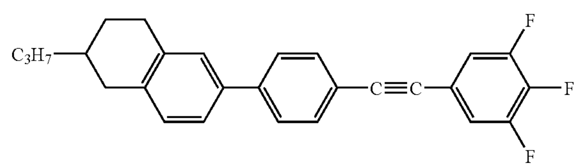
(2-34-29)
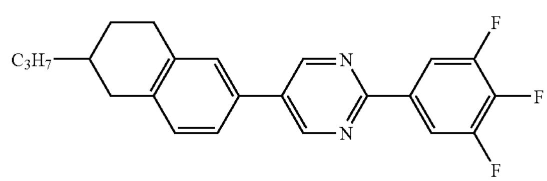
(2-34-30)
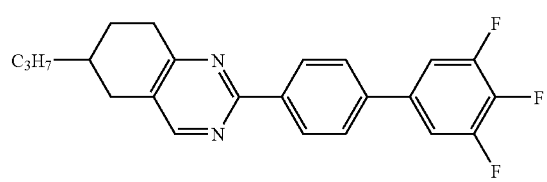
(2-34-31)
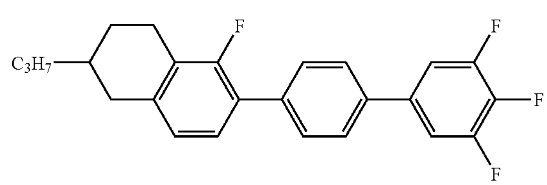
(2-34-32)
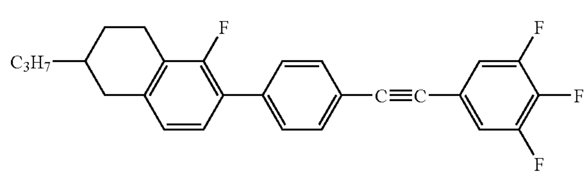

-continued
(2-34-33)
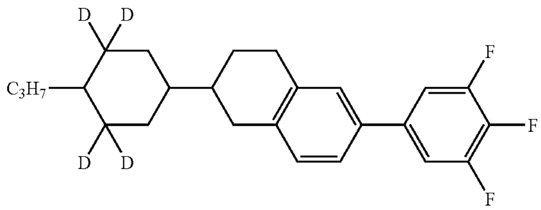
(2-34-34)
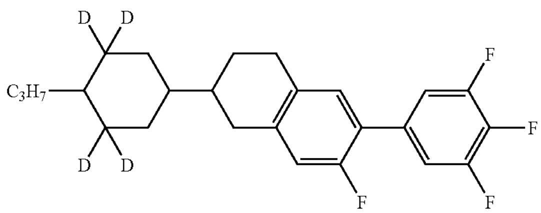
(2-34-35)
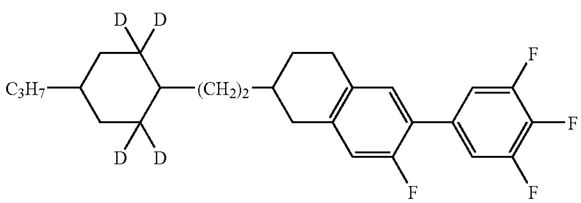
-continued
(2-34-36)
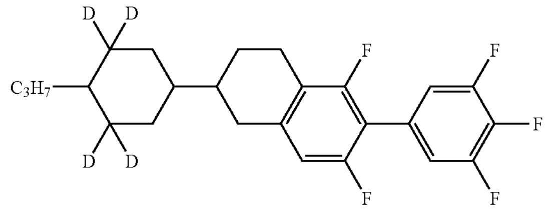
(2-34-37)
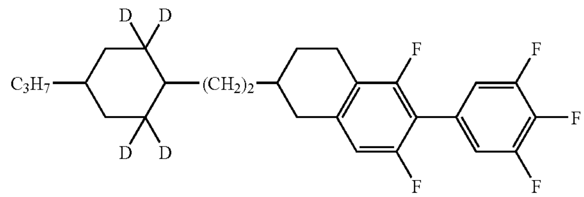
(2-34-38)
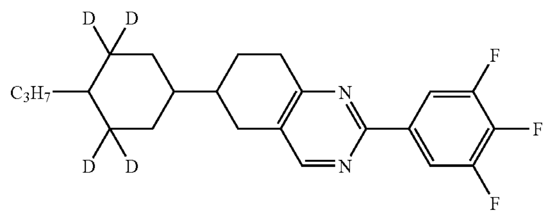
Example 35
A nematic liquid crystal composition (3-35) was prepared from
| | | |
|---|---|---|
| (3-3501) | 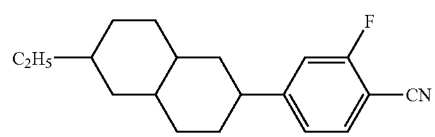 | 5 wt % |
| (3-3502) | 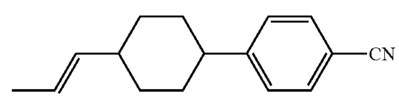 | 5 wt % |
| (3-3503) | 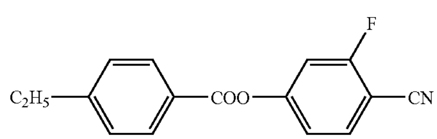 | 5 wt % |
| (3-3504) | 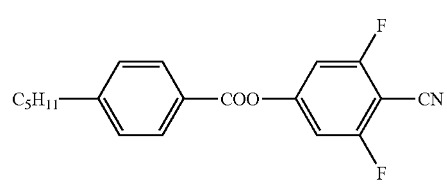 | 5 wt % |
| (3-3505) | 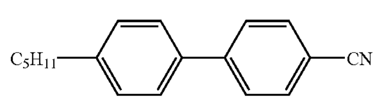 | 5 wt % |

-continued

| | | |
|---|---|---|
| (3-3506) | 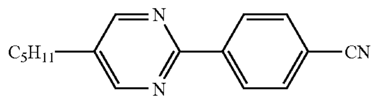 | 5 wt % |
| (3-3507) | 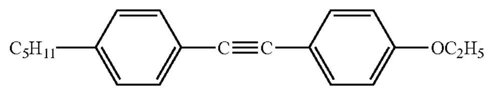 | 10 wt % |
| (3-3508) | 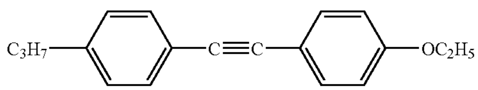 | 10 wt % |
| (3-3509) | 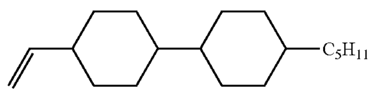 | 20 wt % |
| (3-3510) | 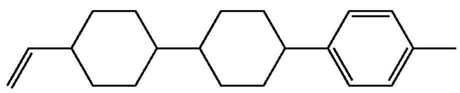 | 13 wt % |
| (3-3511) | 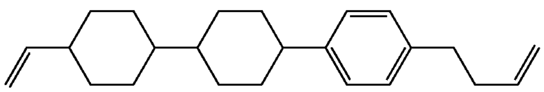 | 7 wt % |
| (3-3512) | 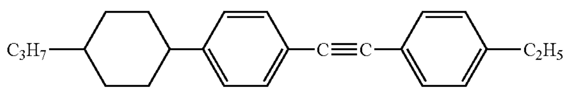 | 5 wt % |
| (3-3513) | 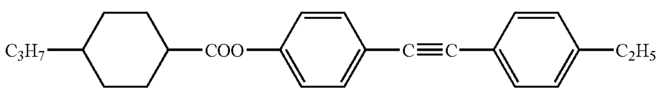 | 5 wt % |

and various properties of this composition were measured. The results are as follows.

Physical properties of the liquid crystal composition $T_{N-I}$: 87.5° C.

$T_{\to N}$: −70.° C.

Δ∈: 9.8

Δn: 0.162

Display characteristics of the TN-LCD having a twist angle of 90 degrees (cell thickness 6 μm):

Vth: 1.86 V

γ: 1.16

Display characteristics of the STN-LCD having a twist angle of 240 degrees

Vth: 1.99 V

γ: 1.021

Δ(Vth)/Δ(T): 2.2 mV/° C. (T=5 to 40° C.)

The STN liquid crystal display device having a twist angle of 240 degrees exhibited small concentration dependency of the driving voltage and fast response characteristics and also exhibited display characteristics which are superior in high-frequency time division characteristic due to sharpness.

The following nematic liquid compositions are prepared.

In the same manner as in the case of the nematic liquid crystal composition (3-35), except that the respective compounds (2-35-01) to (2-35-90) described were used in place of the compound (3-3501) in the nematic liquid crystal composition (3-35) of this Example, nematic liquid crystal compositions (3-35-01) to (3-35-90) were prepared. The display characteristics of these nematic liquid crystal compositions (3-35-01) to (3-35-90) showed good results, similar to this Example.

(2-35-01)

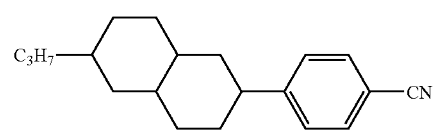

(2-35-02)

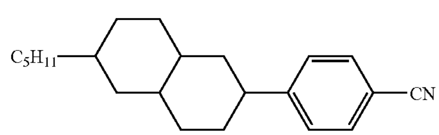

(2-35-03)

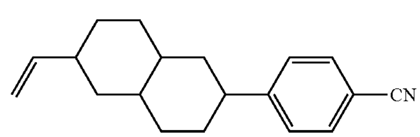

-continued
(2-35-04)
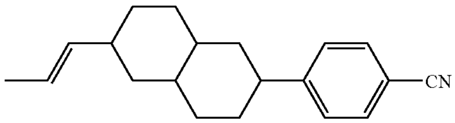
(2-35-05)
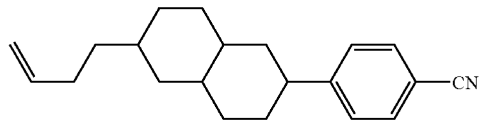
(2-35-06)
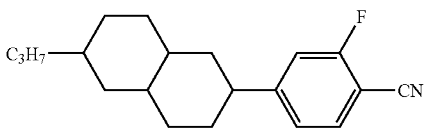
(2-35-07)
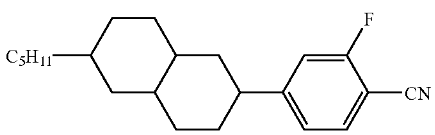
(2-35-08)
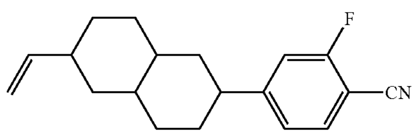
(2-35-09)
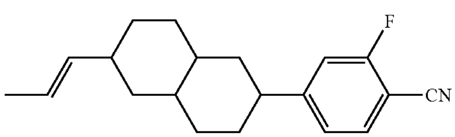
(2-35-10)
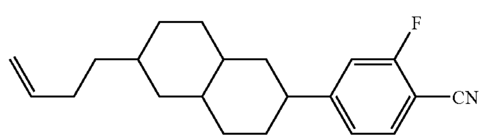
(2-35-11)
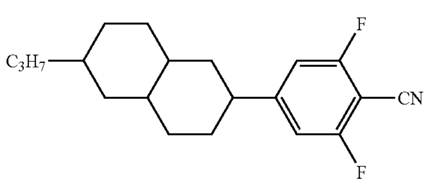
(2-35-12)
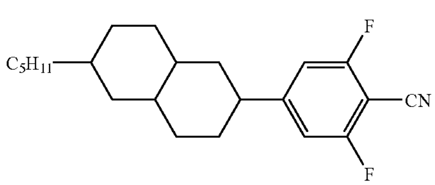
(2-35-13)
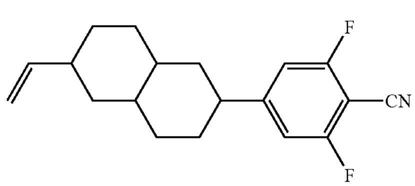
-continued
(2-35-14)
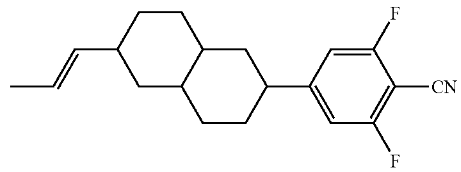
(2-35-15)
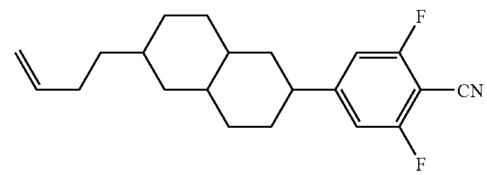
(2-35-16)
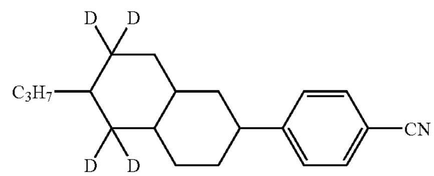
(2-35-17)
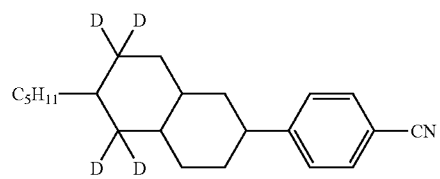
(2-35-18)
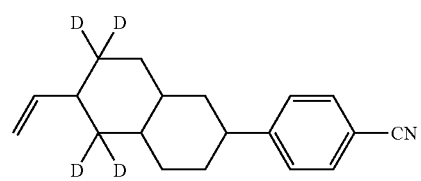
(2-35-19)
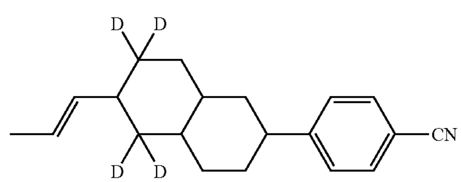
(2-35-20)
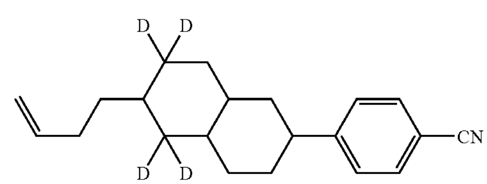
(2-35-21)
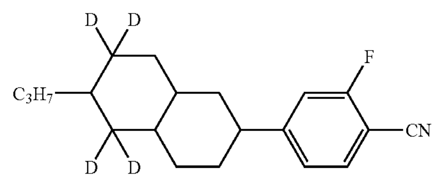

-continued
(2-35-22)
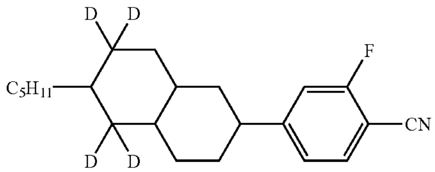
(2-35-23)
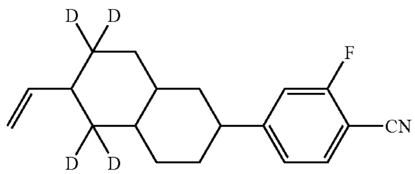
(2-35-24)
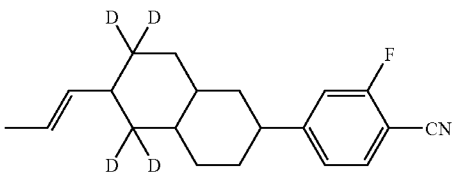
(2-35-25)
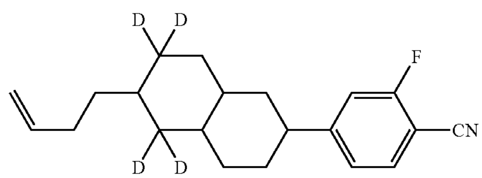
(2-35-26)
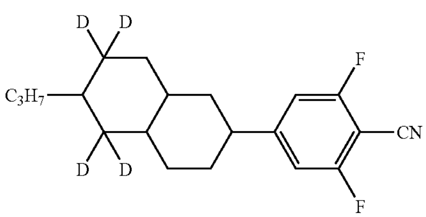
(2-35-27)
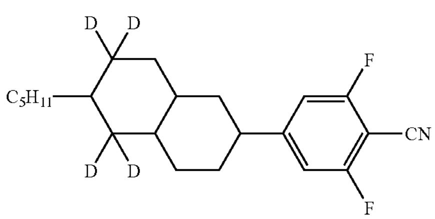
(2-35-28)
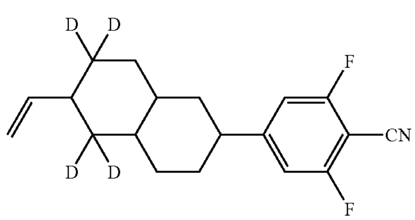
(2-35-29)
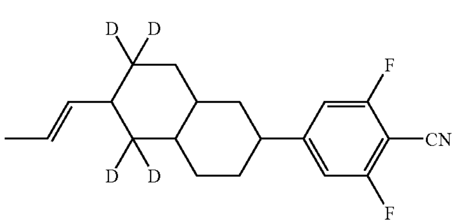
-continued
(2-35-30)
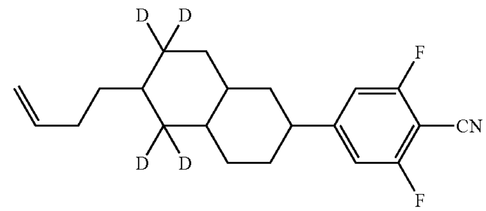
(2-35-31)
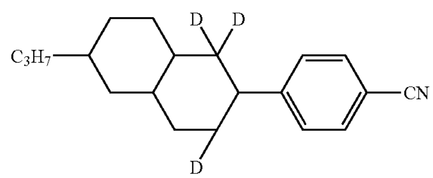
(2-35-32)
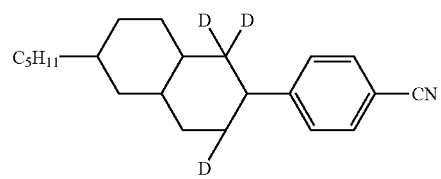
(2-35-33)
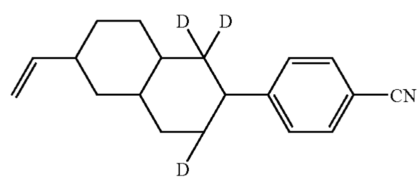
(2-35-35)
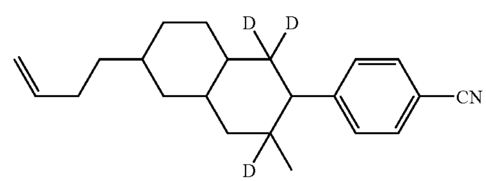
(2-35-36)
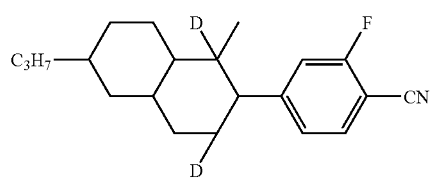
(2-35-37)
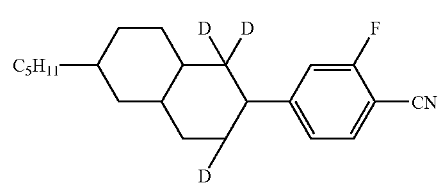
(2-35-38)
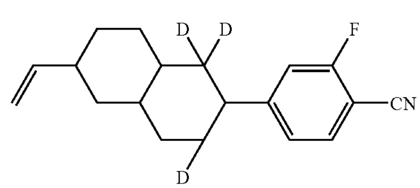

-continued
(2-35-39)
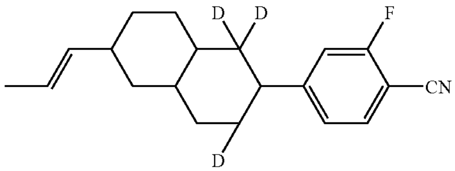
(2-35-40)
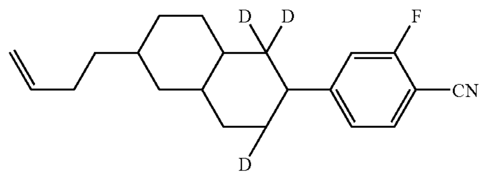
(2-35-41)
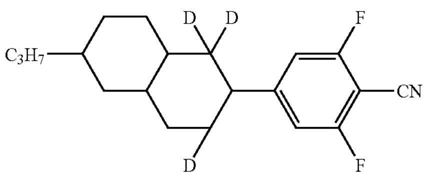
(2-35-42)
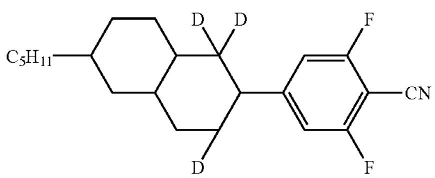
(2-35-43)
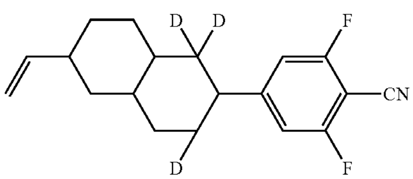
(2-35-44)
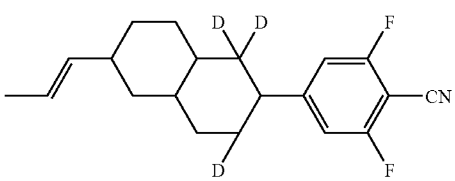
(2-35-45)
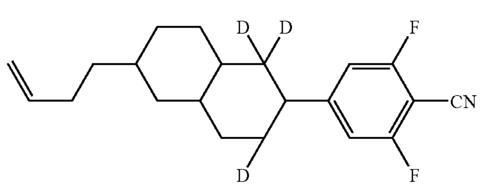
(2-35-46)
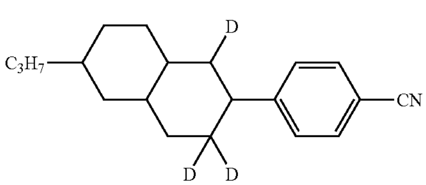
-continued
(2-35-47)
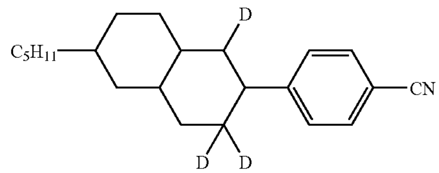
(2-35-48)
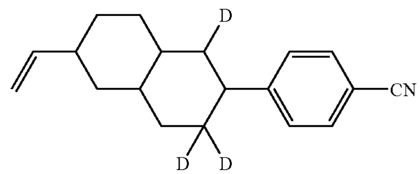
(2-35-49)
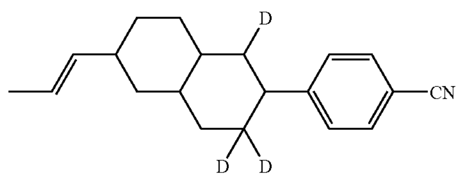
(2-35-50)
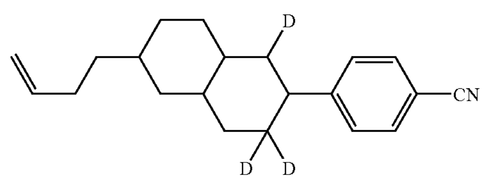
(2-35-51)
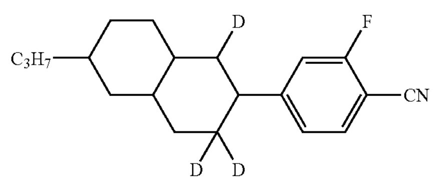
(2-35-52)
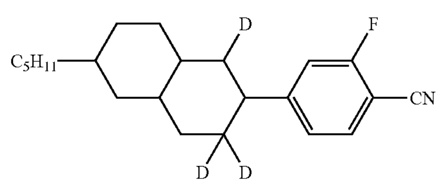
(2-35-53)
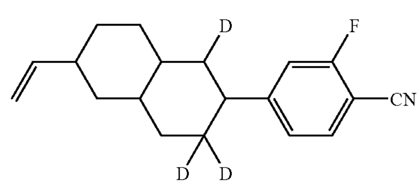
(2-35-54)
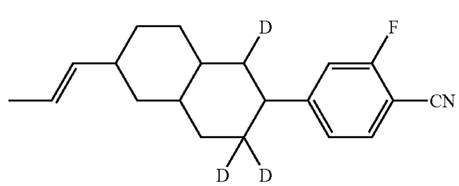

-continued
(2-35-55)
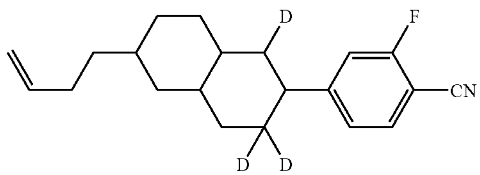
(2-35-56)
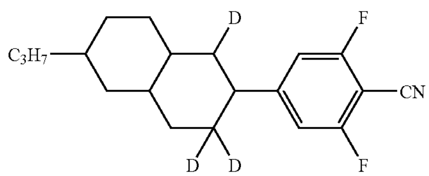
(2-35-57)
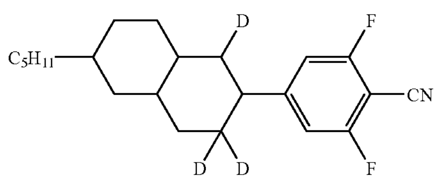
(2-35-58)
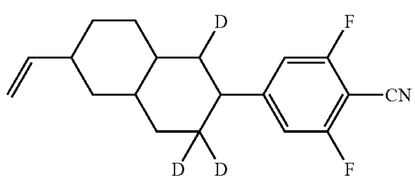
(2-35-59)
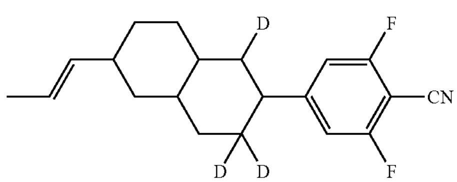
(2-35-60)
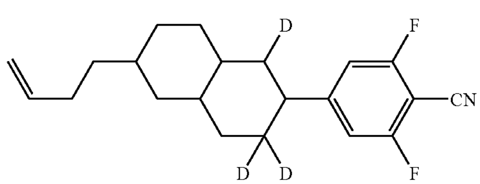
(2-35-61)
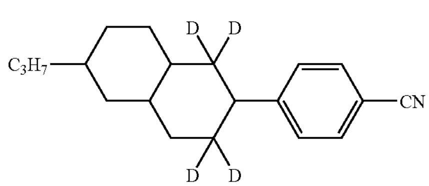
(2-35-62)
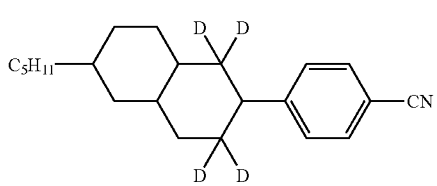
-continued
(2-35-63)
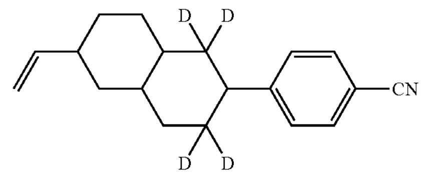
(2-35-64)
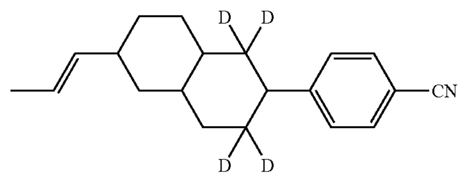
(2-35-65)
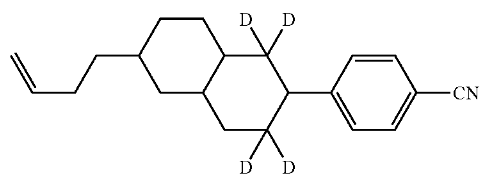
(2-35-66)
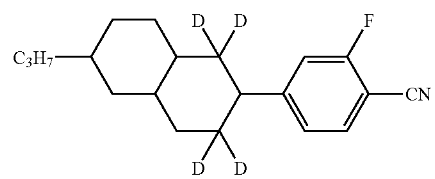
(2-35-67)
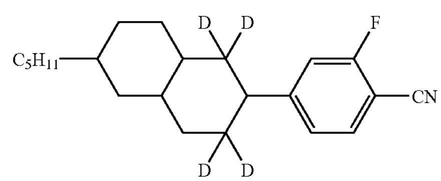
(2-35-68)
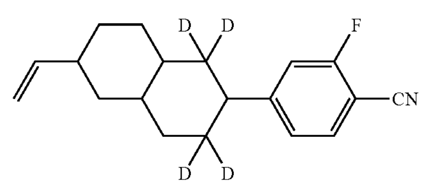
(2-35-69)
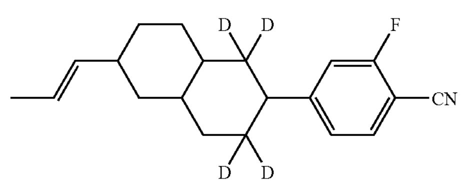
(2-35-70)
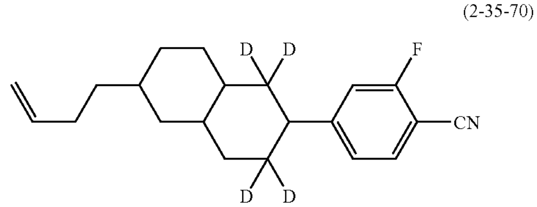

-continued
(2-35-71)
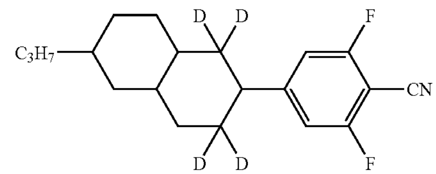
(2-35-72)
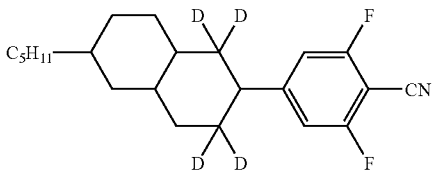
(2-35-73)
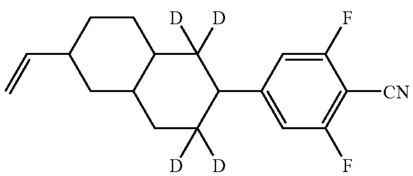
(2-35-74)
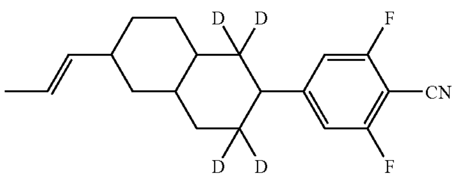
(2-35-75)
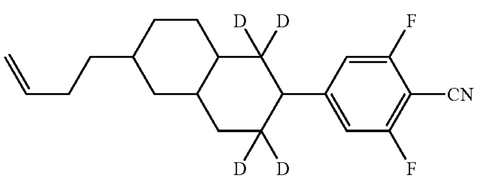
(2-35-76)
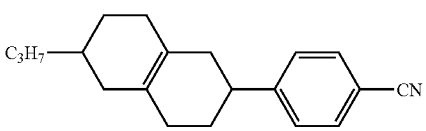
(2-35-77)
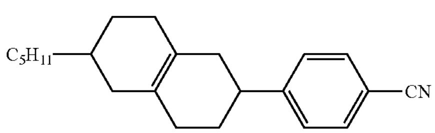
(2-35-78)
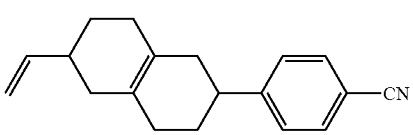
(2-35-79)
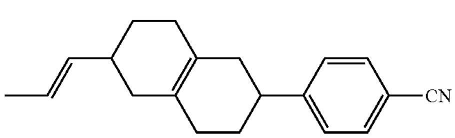
-continued
(2-35-80)
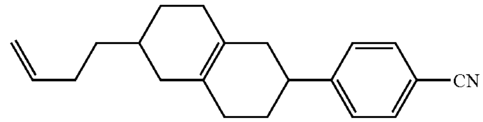
(2-35-81)
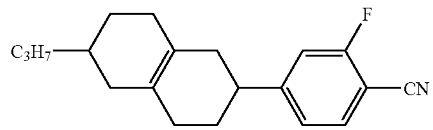
(2-35-82)
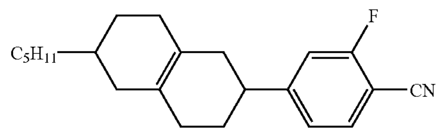
(2-35-83)
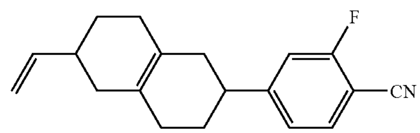
(2-35-84)
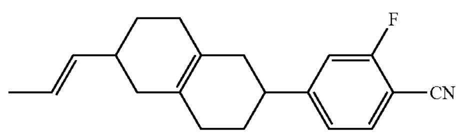
(2-35-85)
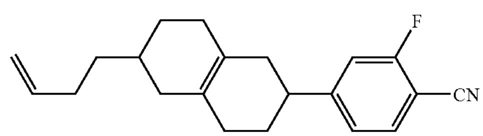
(2-35-86)
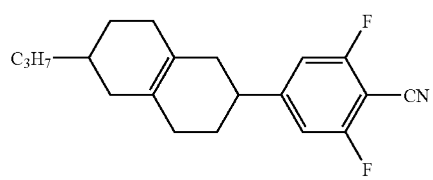
(2-35-87)
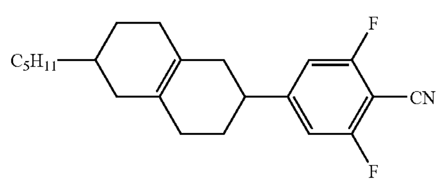
(2-35-88)
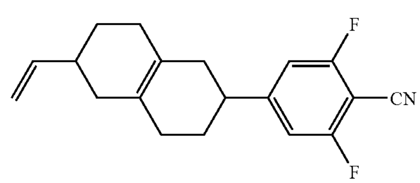

-continued
(2-35-89)
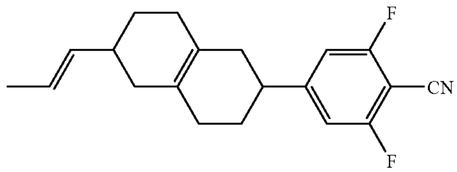
-continued
(2-35-90)
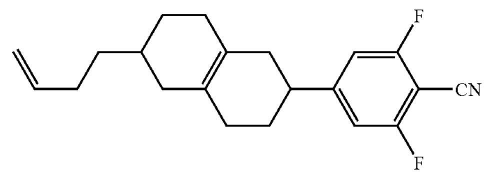
Example 36
A nematic liquid crystal composition (3-36) was prepared from
| | | |
|---|---|---|
| (3-3601) | 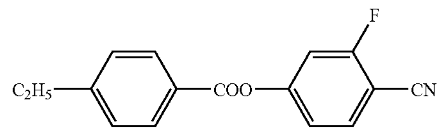 | 8 wt % |
| (3-3602) | 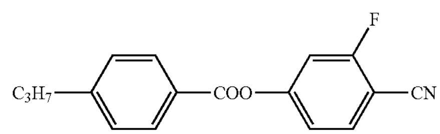 | 5 wt % |
| (3-3603) | 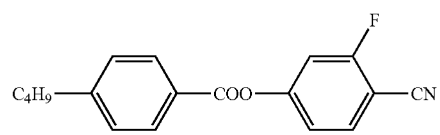 | 16 wt % |
| (3-3604) | 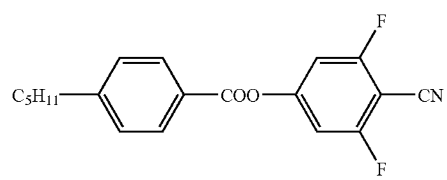 | 7 wt % |
| (3-3605) | 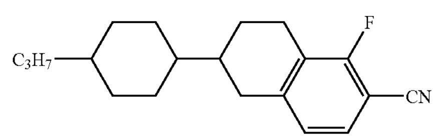 | 8 wt % |
| (3-3606) | 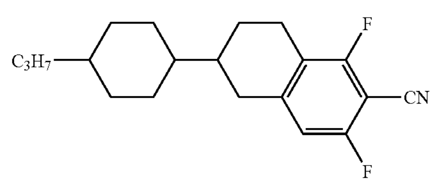 | 3 wt % |
| (3-3607) | 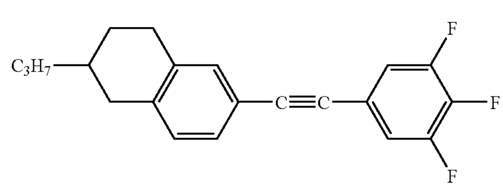 | 7 wt % |

-continued

| | | |
|---|---|---|
| (3-3608) | 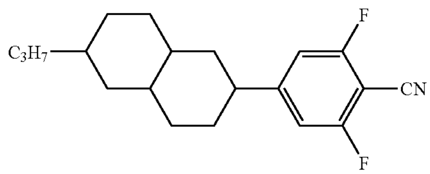 | 3 wt % |
| (3-3609) | 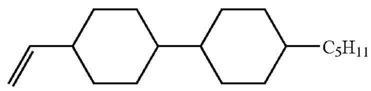 | 8 wt % |
| (3-3610) | 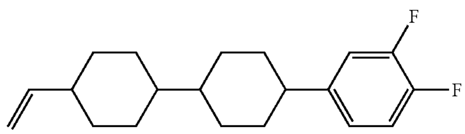 | 19 wt % |
| (3-3611) | 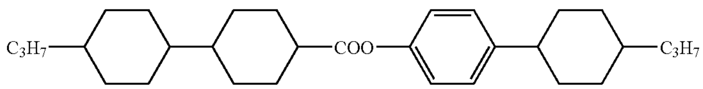 | 6 wt % |
| (3-3612) | 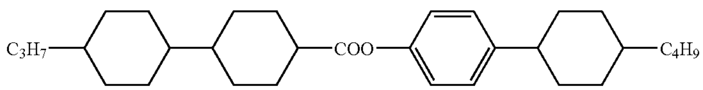 | 6 wt % |
| (3-3613) | 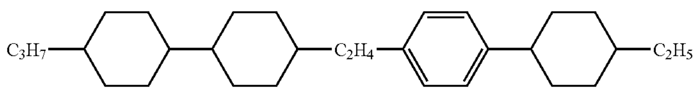 | 4 wt % |

and various properties of this composition were measured. The results are as follows.

Physical properties of the liquid crystal composition $T_{N-I}$: 84.5° C.

$T_{\rightarrow N}$: −70.° C.

Δ∈: 20.4

Δn: 0.133

Display characteristics of the TN-LCD having a twist angle of 90 degrees (cell thickness 6 μm):

Vth: 0.82 V

γ: 1.27

Display characteristics of the STN-LCD having a twist angle of 240 degrees

Vth: 1.90 V

γ: 1.018

Δ(Vth)/Δ(T) 1.5 mV/° C. (T=5 to 40° C.)

The STN liquid crystal display device having a twist angle of 240 degrees had a driving voltage of 1 V or less, and also exhibited small concentration dependency of the driving voltage, fast response characteristics, and display characteristic which are superior in high-frequency time division characteristic due to sharpness.

The following nematic liquid compositions are prepared.

In the same manner as in the case of the nematic liquid crystal composition (3-36), except that the respective compounds (2-36-01) to (2-36-90) described below were used in place of the compound (3-3607) in the nematic liquid crystal composition (3-36) of this Example, nematic liquid crystal compositions (3-36-01) to (3-36-90) were prepared. The display characteristics of these nematic liquid crystal compositions (3-36-01) to (3-36-90) showed good results, similar to this Example.

(2-36-01)

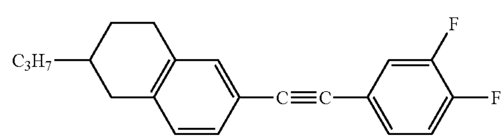

(2-36-02)

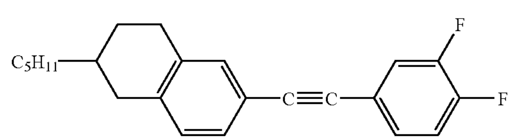

(2-36-03)

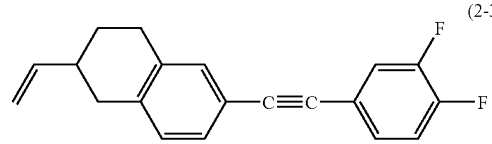

(2-36-04)

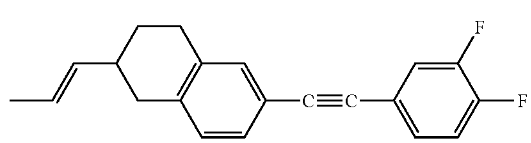

-continued
(2-36-05)
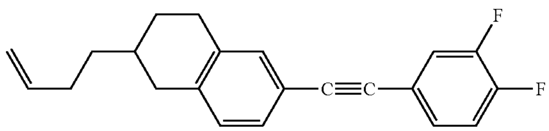
(2-36-06)
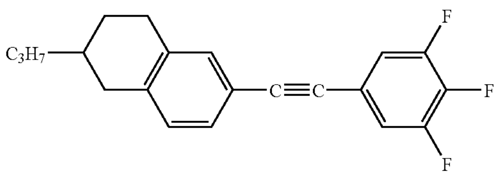
(2-36-07)
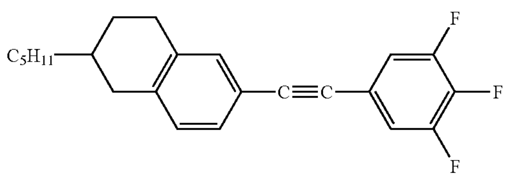
(2-36-08)
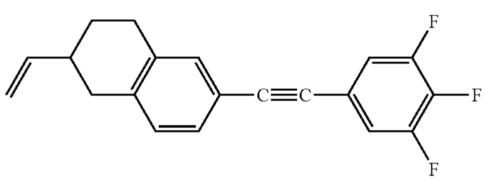
(2-36-09)
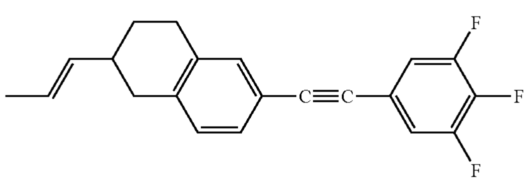
(2-36-10)
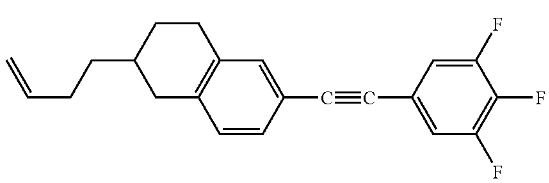
(2-36-11)
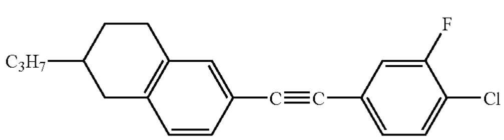
(2-36-12)
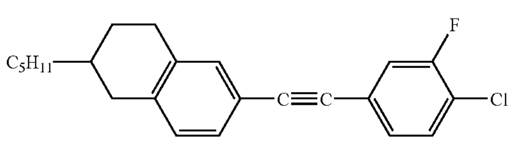
(2-36-13)
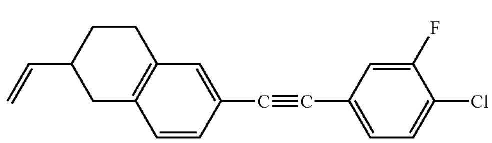
-continued
(2-36-14)
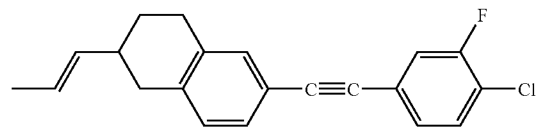
(2-36-15)
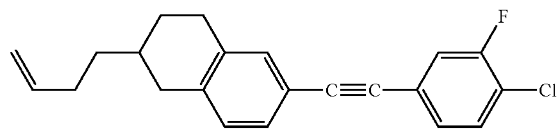
(2-36-16)
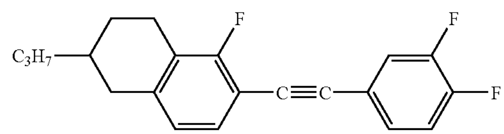
(2-36-17)
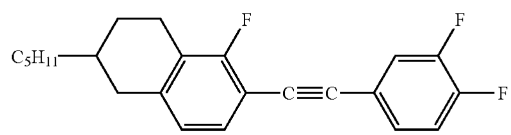
(2-36-18)
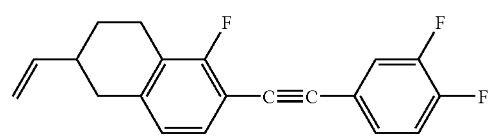
(2-36-19)
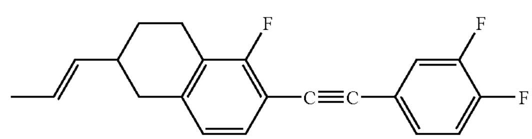
(2-36-20)
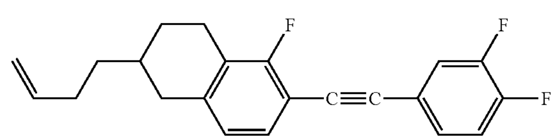
(2-36-21)
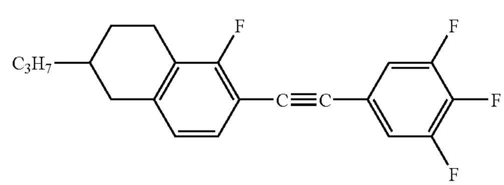
(2-36-22)
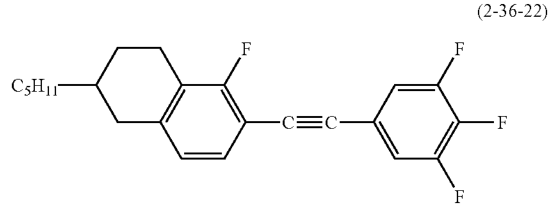

-continued
(2-36-23)
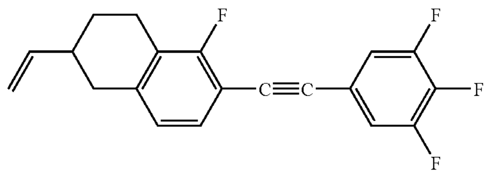
(2-36-24)
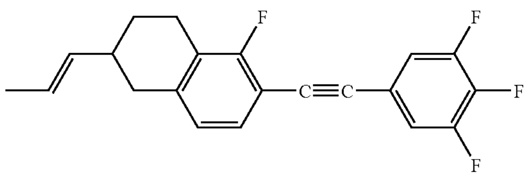
(2-36-25)
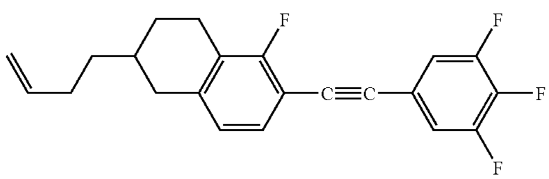
(2-36-26)
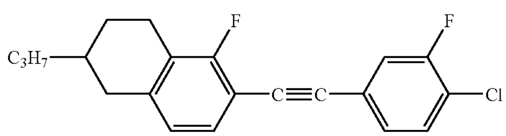
(2-36-27)
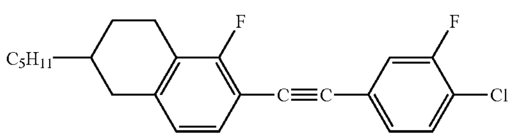
(2-36-28)
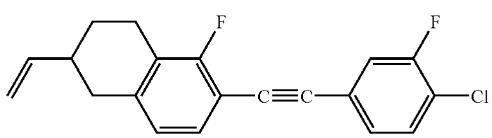
(2-36-29)
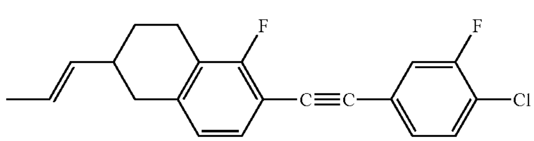
(2-36-30)
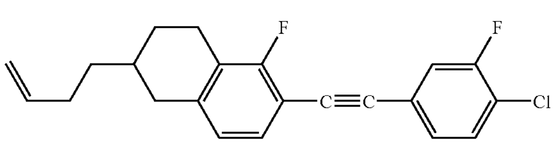
(2-36-31)
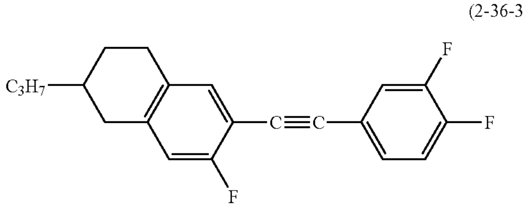
-continued
(2-36-32)
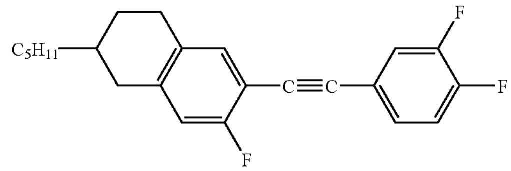
(2-36-33)
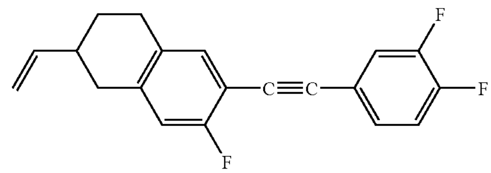
(2-36-34)
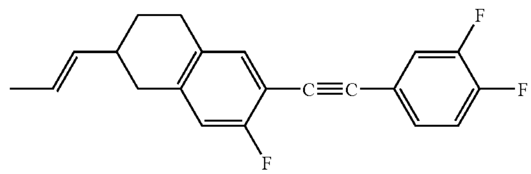
(2-36-35)
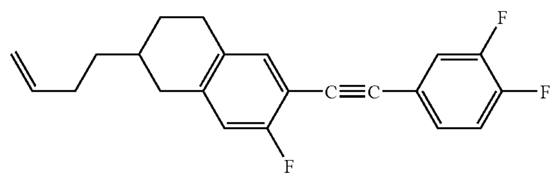
(2-36-36)
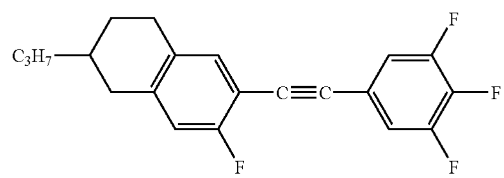
(2-36-37)
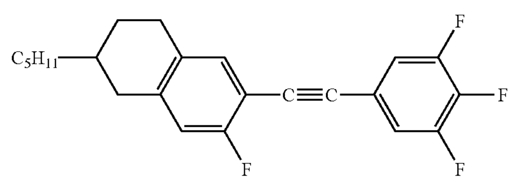
(2-36-38)
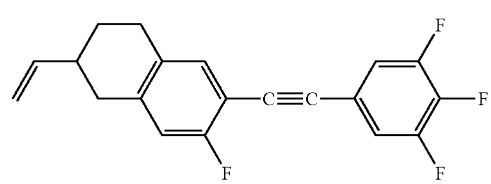
(2-36-39)
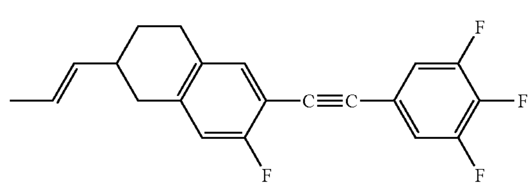

-continued
(2-36-40)
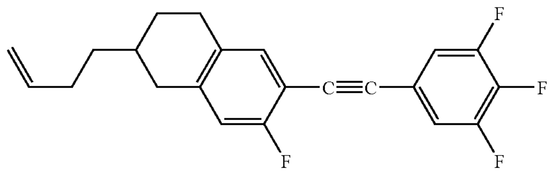
(2-36-41)
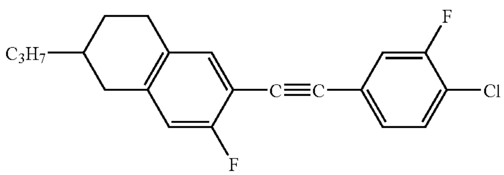
(2-36-42)
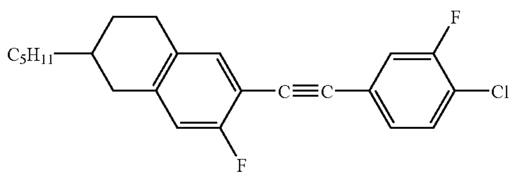
(2-36-43)
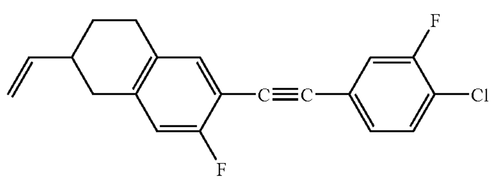
(2-36-44)
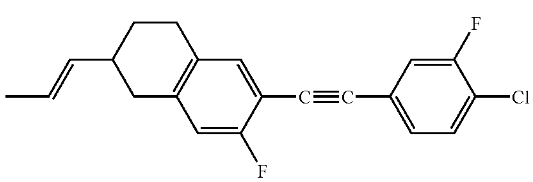
(2-36-45)
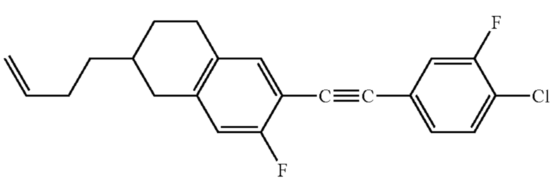
(2-36-46)
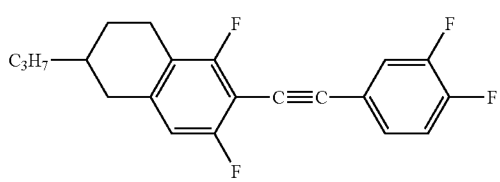
(2-36-47)
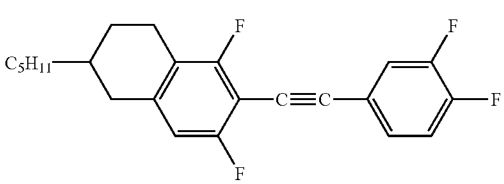
-continued
(2-36-48)
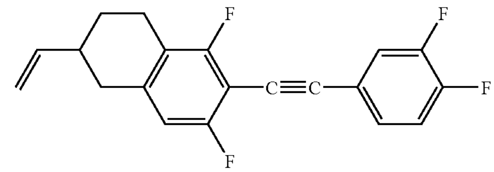
(2-36-49)
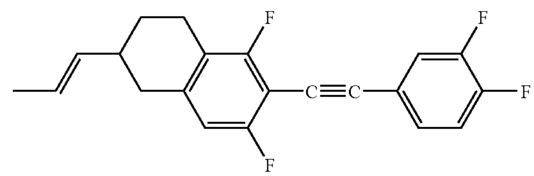
(2-36-50)
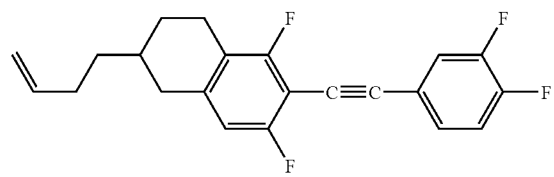
(2-36-51)
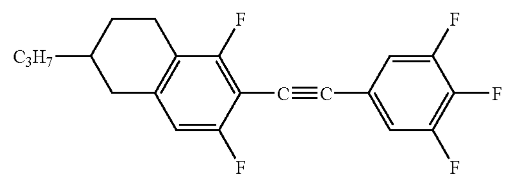
(2-36-52)
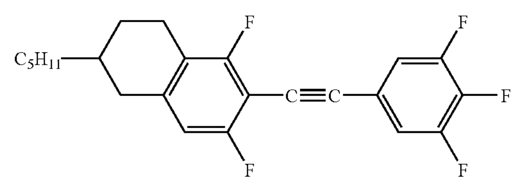
(2-36-53)
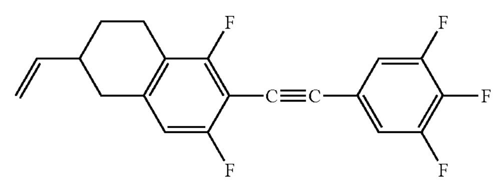
(2-36-54)
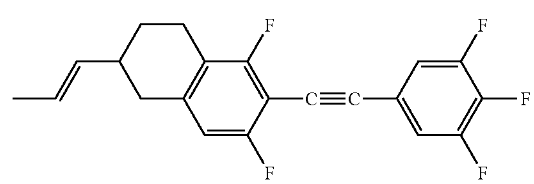
(2-36-55)
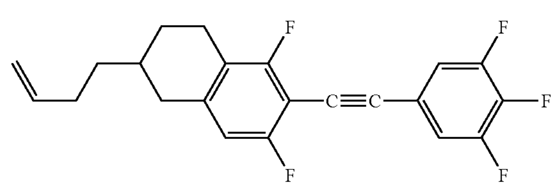

-continued
(2-36-56)
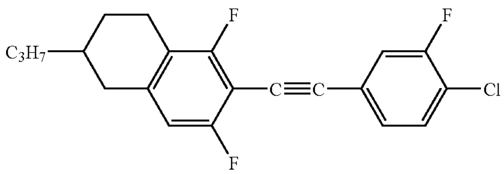
(2-36-57)
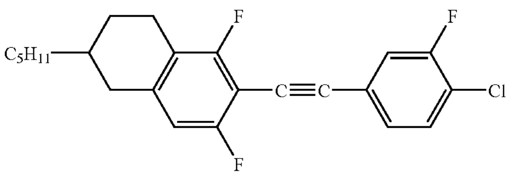
(2-36-58)
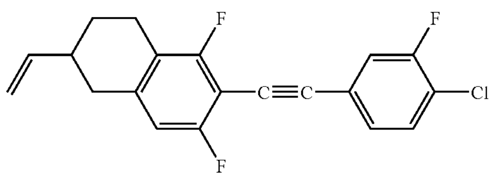
(2-36-59)
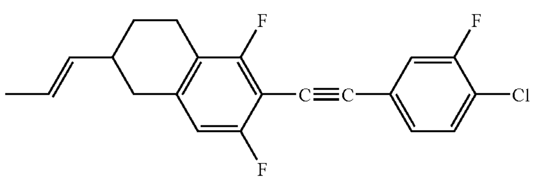
(2-36-60)
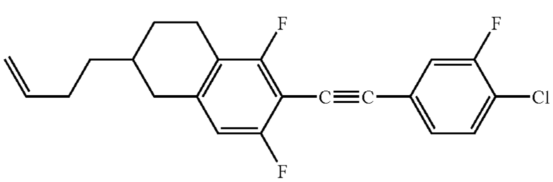
(2-36-61)
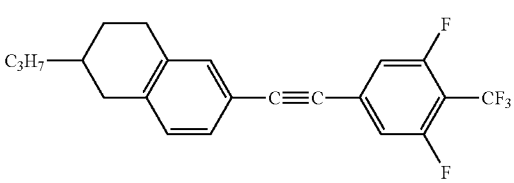
(2-36-62)
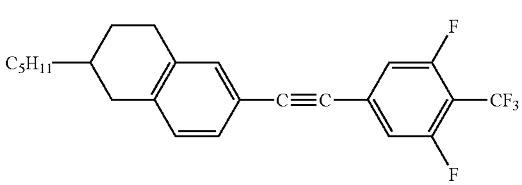
(2-36-63)
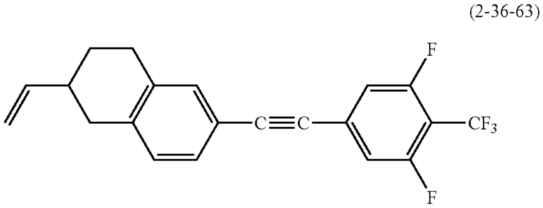
-continued
(2-36-64)
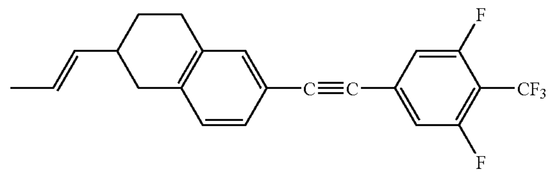
(2-36-65)
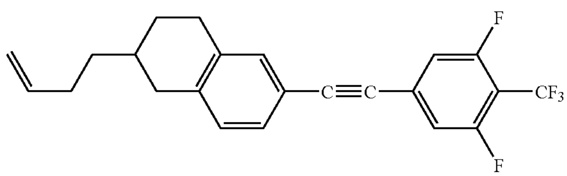
(2-36-66)
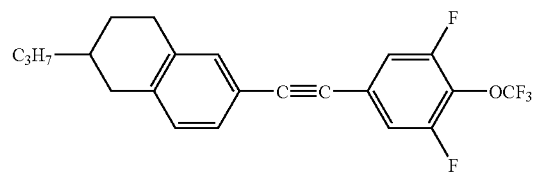
(2-36-67)
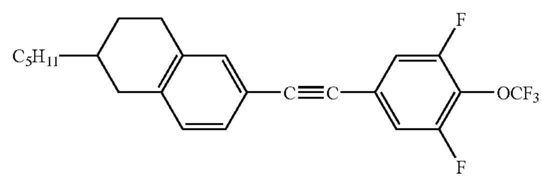
(2-36-68)
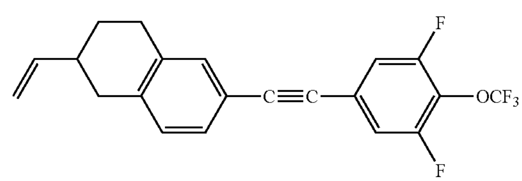
(2-36-69)
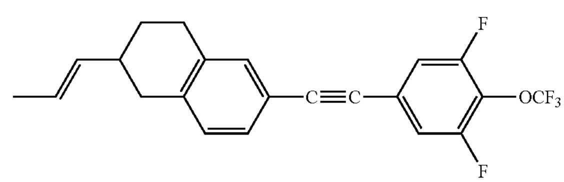
(2-36-70)
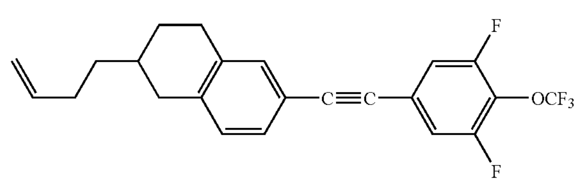
(2-36-71)
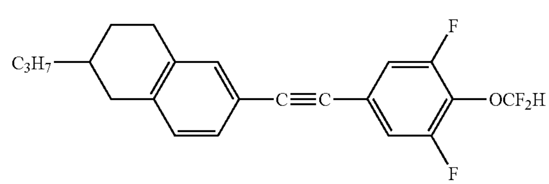

-continued
(2-36-72)
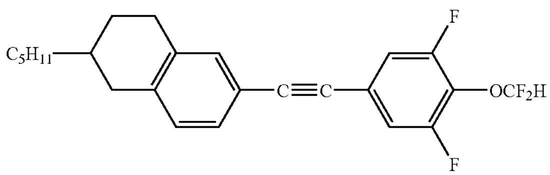
(2-36-73)
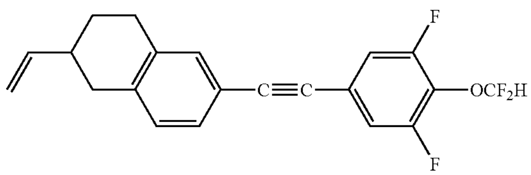
(2-36-74)
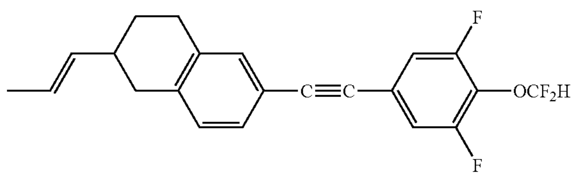
(2-36-75)
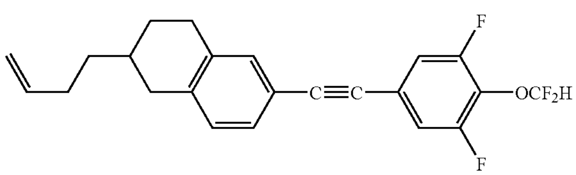
(2-36-76)
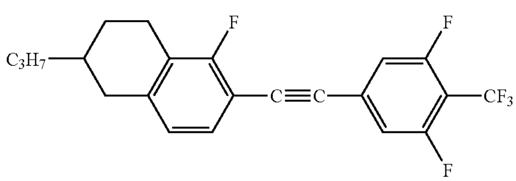
(2-36-77)
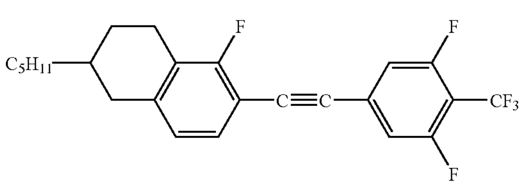
(2-36-78)
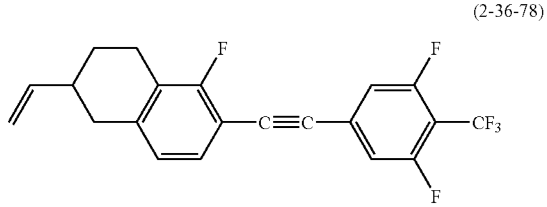
-continued
(2-36-79)
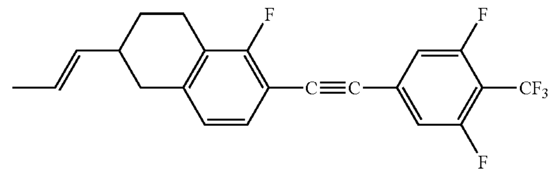
(2-36-80)
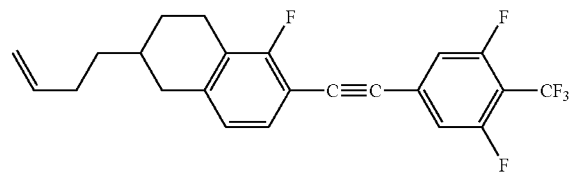
(2-36-81)
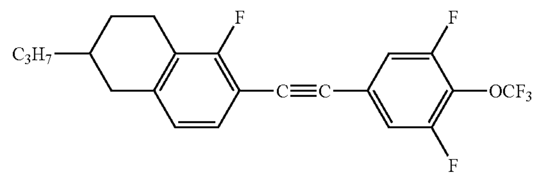
(2-36-82)
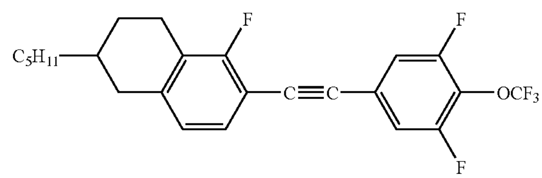
(2-36-83)
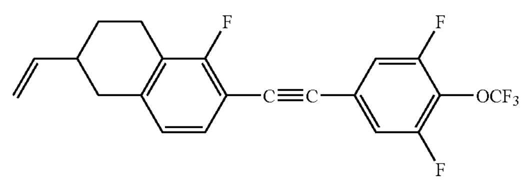
(2-36-84)
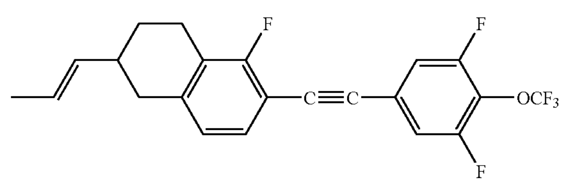
(2-36-85)
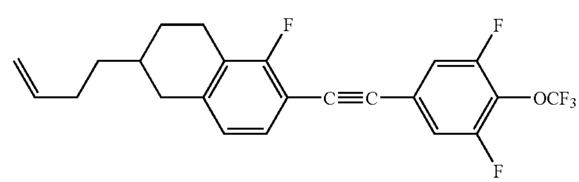
(2-36-86)
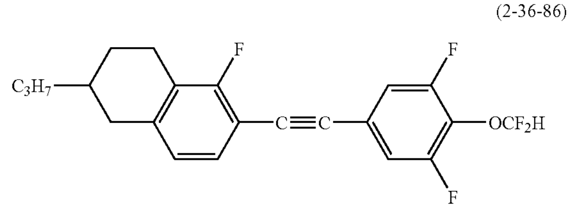

-continued
(2-36-87)
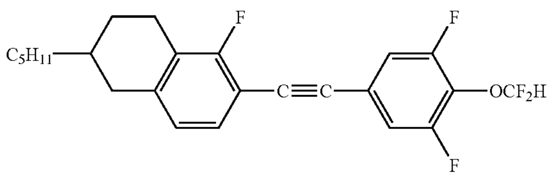
(2-36-88)
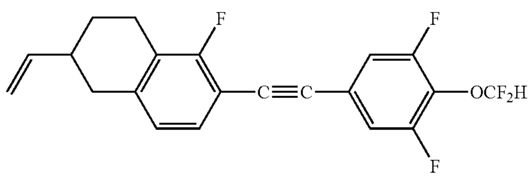
-continued
(2-36-89)
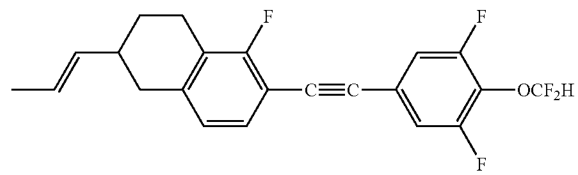
(2-36-90)
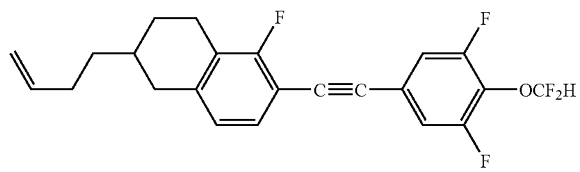
A nematic liquid crystal composition (3-37) was prepared from
| | | |
|---|---|---|
| (3-3701) | 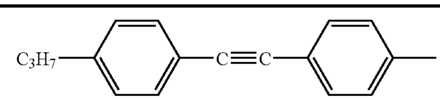 | 15 wt % |
| (3-3702) | 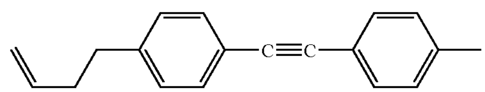 | 15 wt % |
| (3-3703) | 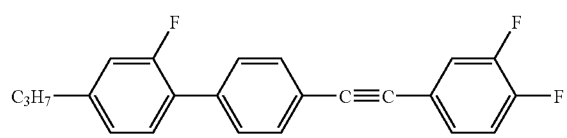 | 15 wt % |
| (3-3704) | 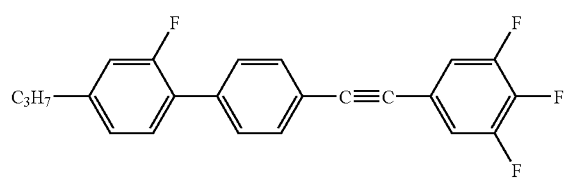 | 10 wt % |
| (3-3705) | 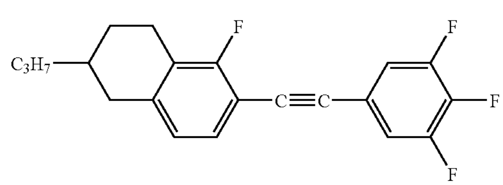 | 8 wt % |
| (3-3706) | 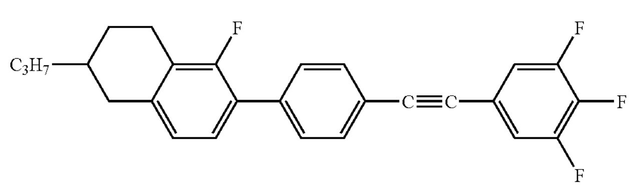 | 7 wt % |
| (3-3707) | 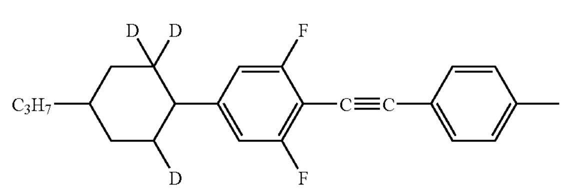 | 15 wt % |

-continued (3-3708) 15 wt %

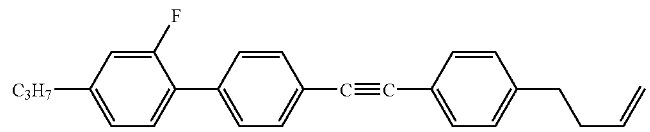

and various properties of this composition were measured. The results are as follows.

Physical properties of the liquid crystal composition $T_{N-I}$: 112.0° C.

$T_{\rightarrow N}$: −70.° C.

Δ∈: 10.0

Δn: 0.311

Display characteristics of the TN-LCD having a twist angle of 90 degrees (cell thickness 8 μm):

Vth 2.10 V

Δ(Vth)/Δ(T): 2.6 mV/° C. (T=0 to 50° C.)

The nematic liquid crystal composition is capable of operating over a wide range of temperatures because $T_{N-I}$ is high and $T_{-N}$ is low, and has large Δn compared to the value of viscosity η, and is therefore capable of improving the response characteristics. It also has a large dielectric constant anisotropy Δ∈ compared to the value of the viscosity η, and is therefore capable of improving the response characteristics even at a low driving voltage. Also because this nematic liquid crystal composition has high resistivity and voltage holding ratio after heating acceleration test, it can be understood that high thermal stability is ensured. The active matrix liquid crystal display device that employs this composition as the basic constituent material has excellent characteristics with less leak current without occurrence of flicker.

This nematic liquid crystal composition was used to make TN-LCD having cell thickness d of 1.6 μm and display characteristics thereof were measured. A liquid crystal display device having a threshold voltage of 1.48 V and a response speed of 1.6 msec. was obtained.

Example 38

A nematic liquid crystal composition (3-38) was prepared from (3-3801) 14 wt %

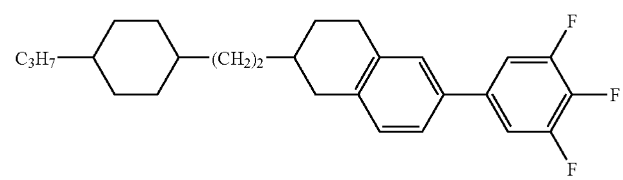

(3-3802) 14 wt %

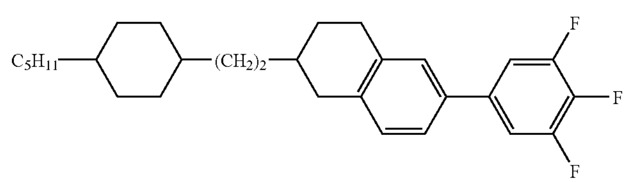

(3-3803) 10 wt %

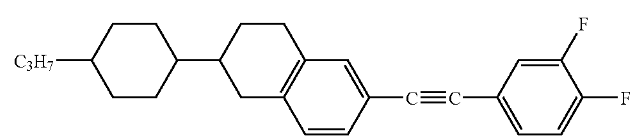

(3-3804) 11 wt %

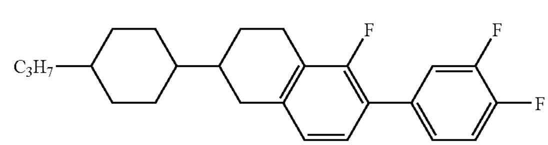

-continued

| | | |
|---|---|---|
| (3-3805) | 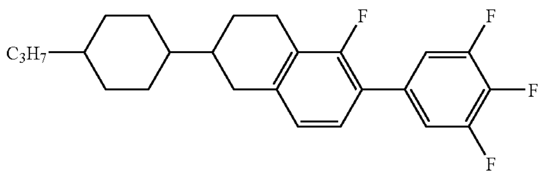 | 10 wt % |
| (3-3806) | 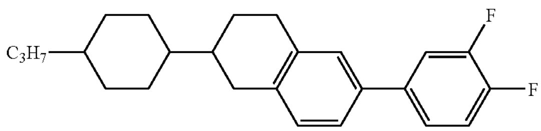 | 11 wt % |
| (3-3807) | 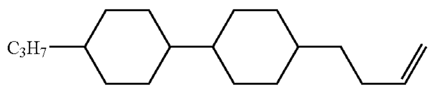 | 15 wt % |
| (3-3808) | 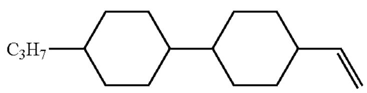 | 15 wt % |

and various properties of this composition were measured. The results are as follows.

Physical properties of the liquid crystal composition $T_{N\text{-}I}$: 115.0° C.

$T_{\rightarrow N}$: −70.°

Δ∈: 6.0

Δn: 0.142

Display characteristics of the TN-LCD having a twist angle of 90 degrees (cell thickness 6 μm)

Vth: 2.10 V

γ: 1.14

Display characteristics of the TN-LCD having a twist angle of 90 degrees (cell thickness 8 μm):

Vth: 2.30 V

γ: 1.033

Δ(Vth)/Δ(T): 2.0 mV/° C. (T=5 to 40° C.)

This nematic liquid crystal composition is capable of operating over a wide range of temperatures because $T_{N\text{-}I}$ is high and $T_{\text{-}N}$ is low. Also because this nematic liquid crystal composition has high resistivity and high voltage holding ratio after the heating acceleration test, it can be understood that high thermal stability is ensured. The active matrix liquid crystal display device that employs this composition as the basic constituent material has excellent characteristics with less leak current without occurrence of flicker. This nematic liquid crystal composition further shows a value of optical sharpness near 1.12 that is the limit of TN-LCD liquid crystal shown in the literature "High-speed Liquid Crystal Technology" (p. 63, CMC Publication). Thus it can be understood that this liquid crystal composition is useful for high-frequency multiplexing drive. The STN liquid crystal display device exhibited small concentration dependency of the driving voltage, fast response characteristics, and display characteristics which are superior in high-frequency time division characteristic due to sharpness.

Example 39

The following nematic liquid compositions are prepared.

In the same manner as in the case of the nematic liquid crystal composition (3-01), except that the respective compounds (2-01-01) to (2-01-20) described below were used in place of the compound (3-0105) in the nematic liquid crystal composition (3-01) of this Example, nematic liquid crystal compositions (3-01-01) to (3-01-20) were prepared.

The display characteristics of these nematic liquid crystal compositions (3-01-01) to (3-01-20) showed good results, similar to the nematic liquid crystal composition (3-01).

(2-01-01)

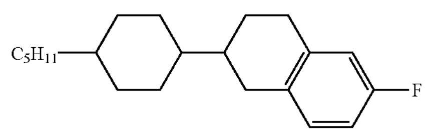

(2-01-02)

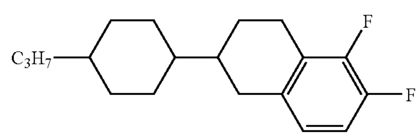

(2-01-03)

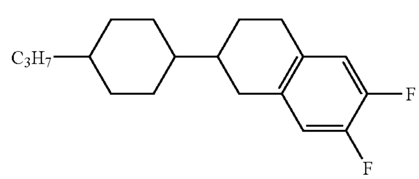

(2-01-04)

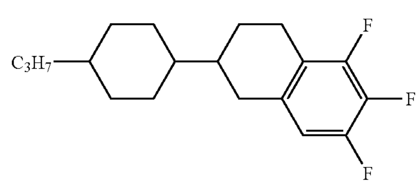

-continued (2-01-05)

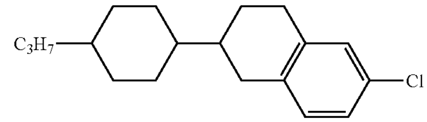

(2-01-06)

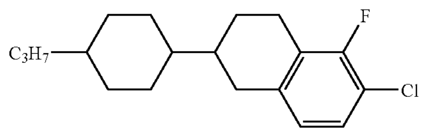

(2-01-07)

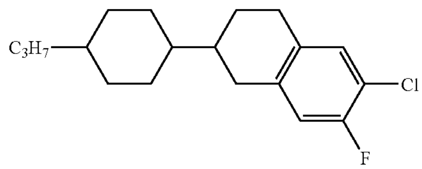

(2-01-08)

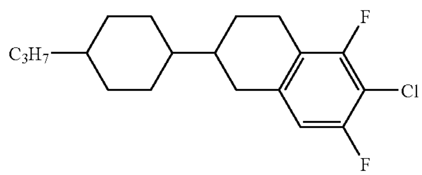

(2-01-09)

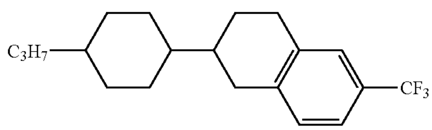

(2-01-10)

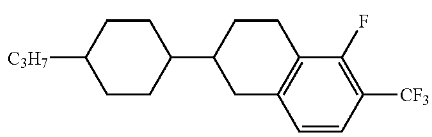

(2-01-11)

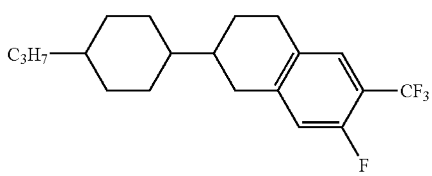

(2-01-12)

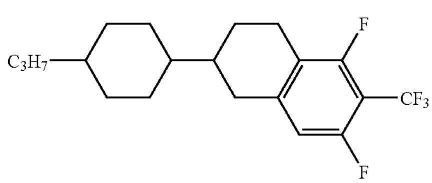

(2-01-13)

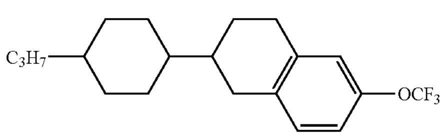

(2-01-14)

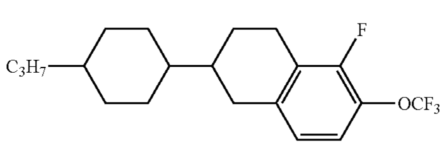

-continued (2-01-15)

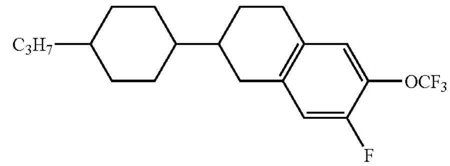

(2-01-16)

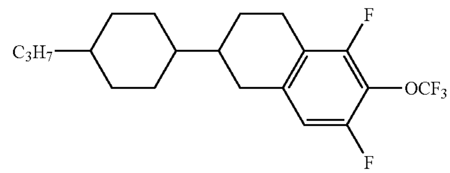

(2-01-17)

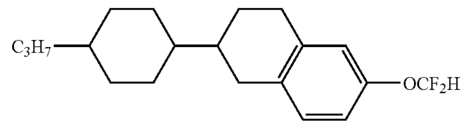

(2-01-18)

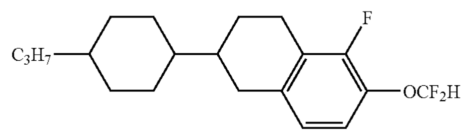

(2-01-19)

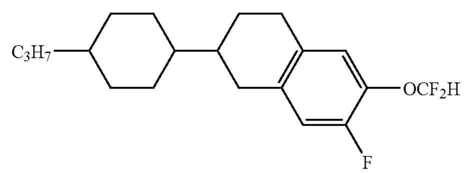

(2-01-20)

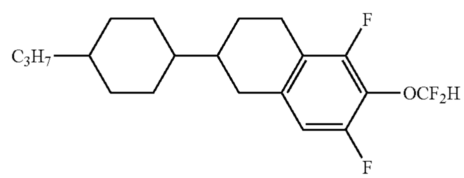

Example 40

The following nematic liquid compositions are prepared.

In the same manner as in the case of the nematic liquid crystal composition (3-02), except that the respective compounds (2-02-01) to (2-02-20) described below were used in place of the compound (3-0207) in the nematic liquid crystal composition (3-02) of this Example, nematic liquid crystal compositions (3-02-01) to (3-02-20) were prepared.

The display characteristics of these nematic liquid crystal compositions (3-02-01) to (3-02-20) showed good results, similar to the nematic liquid crystal composition (3-02).

(2-02-01)

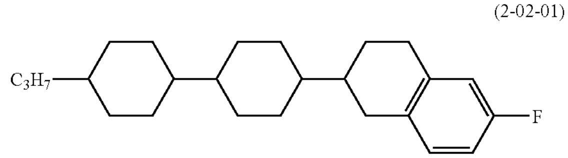

-continued
(2-02-02)
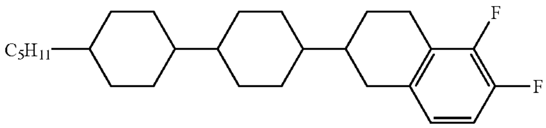
(2-02-03)
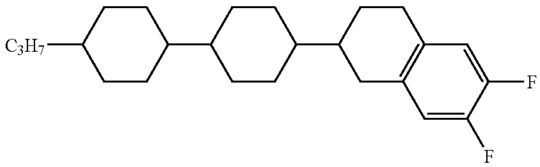
(2-02-04)
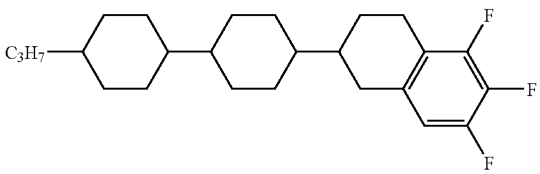
(2-02-05)
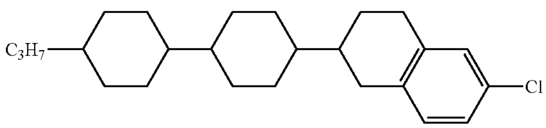
(2-02-06)
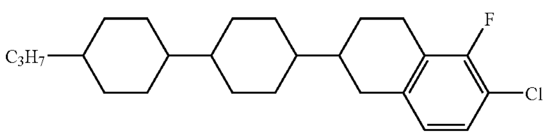
(2-02-07)
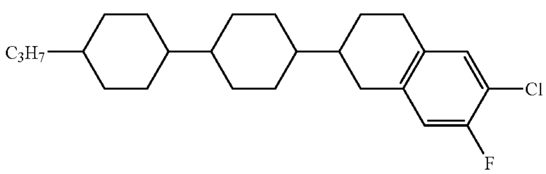
(2-02-08)
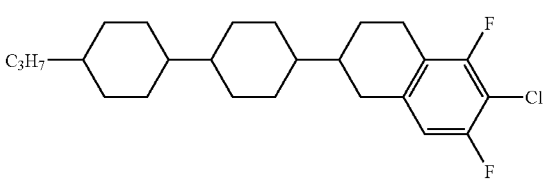
(2-02-09)
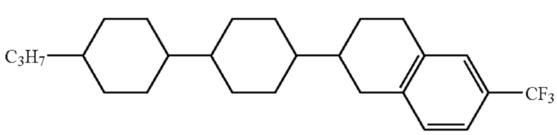
(2-02-10)
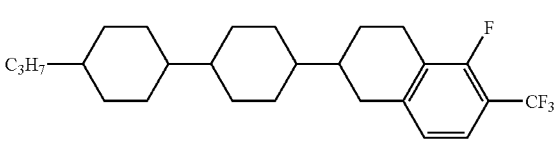
-continued
(2-02-11)
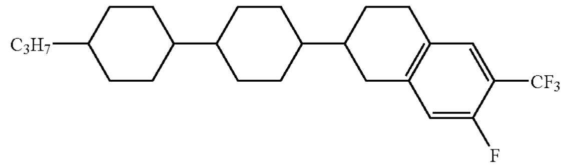
(2-02-12)
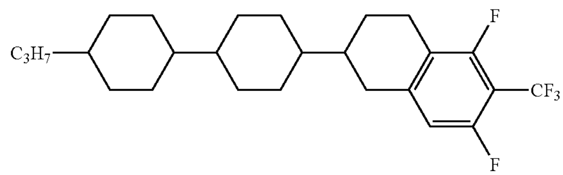
(2-02-13)
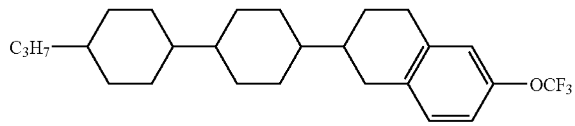
(2-02-14)
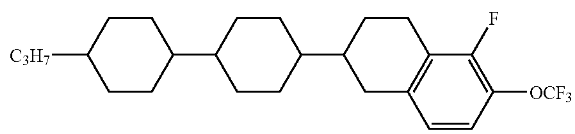
(2-02-15)
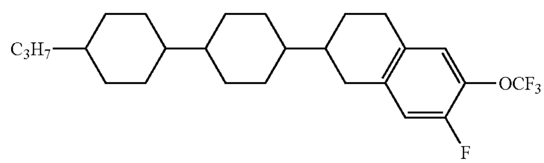
(2-02-16)
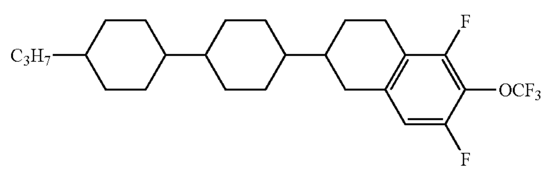
(2-02-17)
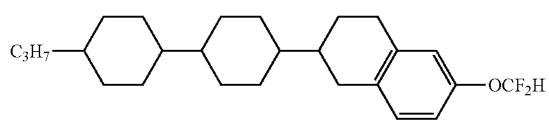
(2-02-18)
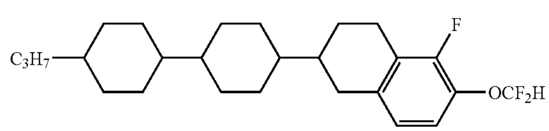
(2-02-19)
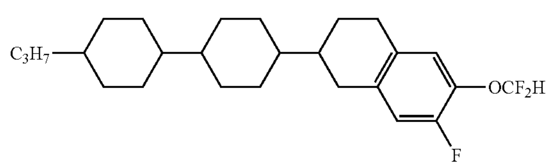

-continued (2-02-20)

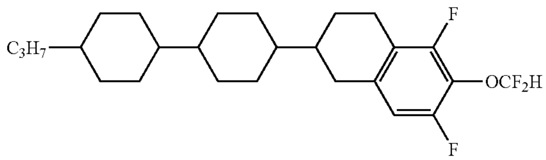

Example 41

The following nematic liquid compositions are prepared.

In the same manner as in the case of the nematic liquid crystal composition (3-36), except that the respective compounds (2-36-91) to (2-36-110) described below were used in place of the compound (3-3605) in the nematic liquid crystal composition (3-36) of this Example, nematic liquid crystal compositions (3-36-91) to (3-36-110) were prepared.

The display characteristics of these nematic liquid crystal compositions (3-36-91) to (3-36-110) showed good results, similar to the nematic liquid crystal composition (3-02).

(2-36-91)

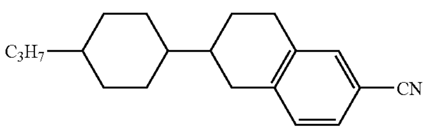

(2-36-92)

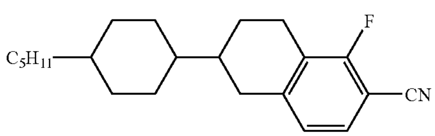

(2-36-93)

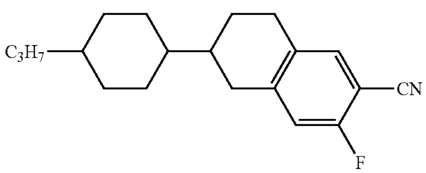

(2-36-94)

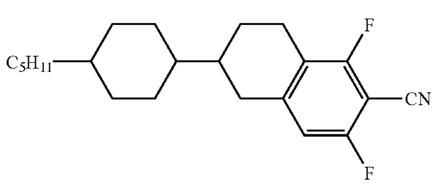

(2-36-95)

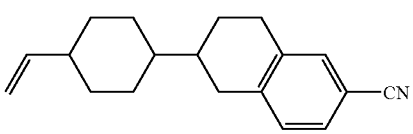

(2-36-96)

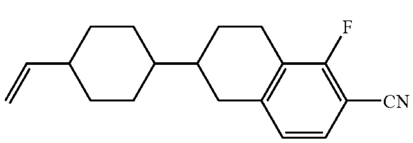

-continued (2-36-97)

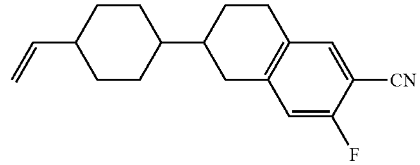

(2-36-98)

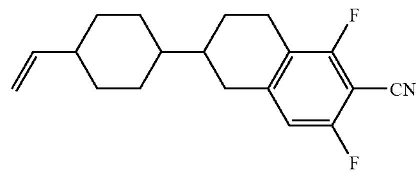

(2-36-99)

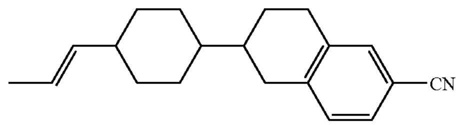

(2-36-100)

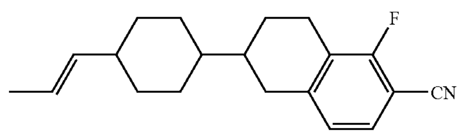

(2-36-101)

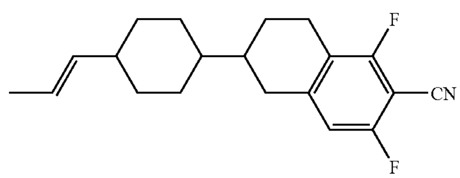

(2-36-102)

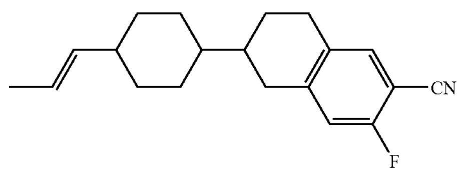

(2-36-103)

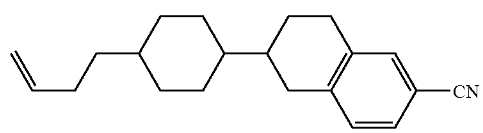

(2-36-104)

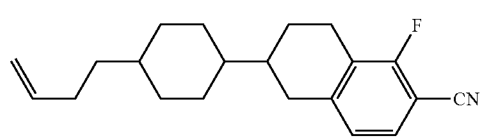

(2-36-105)

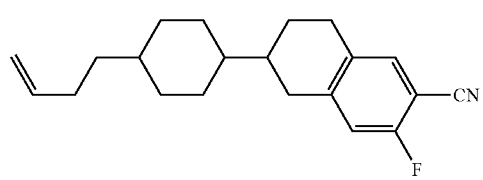

-continued (2-36-106)

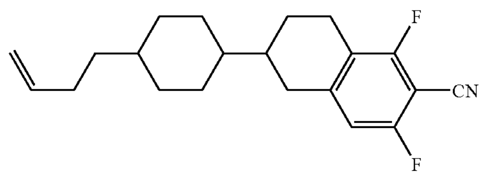

(2-36-107)

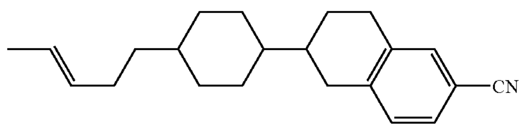

(2-36-108)

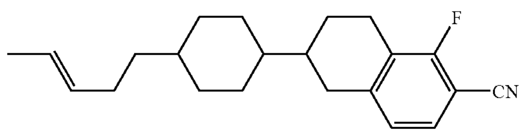

(2-36-109)

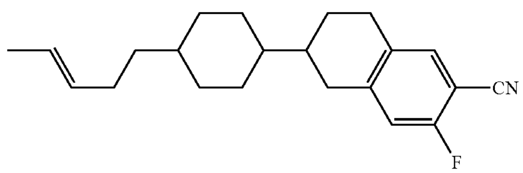

(2-36-110)

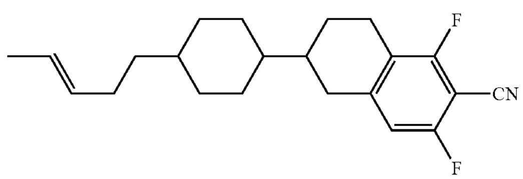

Example 42

The nematic liquid crystal compositions of the present invention (3-12), (3-14), (3-19) to (3-21), (3-27), (3-28), (3-34), (3-37), (1-09), (1-10), (1-18) and (1-23) can be used in light scattering type liquid crystal display. Application Examples will be described in detail below. It should be understood, however, that the present invention is not limited to these Examples.

A light modulation layer forming material of uniform solution was prepared by mixing 80% of the liquid crystal composition described above as the liquid crystal material, 13.86% of HX-220 (manufactured by Nippon Kayaku Co., Ltd.) as a polymer-forming compound, 5.94% of lauryl acrylate, and 0.2% of 2-hydroxy-2-methyl-1-phenylpropan-1-one as a polymerization initiator. An empty cell measuring 50×50 mm, that was formed by two ITO electrode glass substrates with spacers having mean particle size of 10 μm interposed therebetween, was filled with this light modulation layer forming material in vacuum at a temperature 10° C. higher than transition temperature of the uniform solution. This assembly was, with the temperature being kept 3° C. higher than transition temperature of the uniform solution, passed under a metal halide lamp (80 $W/m^2$) at a speed of 3.5 m/min, while irradiating with ultraviolet rays having energy density of 500 $mJ/cm^2$ to cure the polymer forming compound, thereby to make a liquid crystal device having a light modulation layer consisting of the liquid crystal material and a transparent solid substance. Cut surface of the cured material, that was formed between the substrates of the liquid crystal device thus obtained, was observed with a scanning electron microscope, and the transparent solid substance formed in three-dimensional network structure from a polymer was recognized.

The light scattering type liquid crystal display thus obtained operates in a wider temperature range than the light scattering type liquid crystal display of the prior art, shows response characteristic that is favorable for the display of moving pictures, and has high contrast and uniform display characteristics, indicating the usefulness for outdoor information panels such as sign board, display of clock, projection display apparatus and so on. Use of the nematic liquid crystal compositions (3-12), (3-14), (3-21), (3-34), (3-37), (1-09) and (1-18) is particularly useful for active addressing, use of the nematic liquid crystal compositions (3-38) and (I-23) is useful for multiplexing drive and use of the nematic liquid crystal compositions (3-14) and (3-27) is useful for high-temperature applications such as illumination apparatuses and laser addressing.

The nematic liquid crystal compositions of this Example are useful also for liquid crystal display of OCB or ECB mode, and the nematic liquid crystal compositions (3-12), (3-14), (3-21), (3-34), (3-37), (1-09) and (1-18) can be used also for active OCB.

Example 43

The nematic liquid crystal compositions of the present invention, particularly (3-12), (3-14), (3-21), (3-34) and (3-37) further have the following features. Measurement of chromatic dispersion of birefringent index of these nematic liquid crystal compositions showed greater dispersion between wavelength 650 nm and 400 nm, with values of 1.15 and greater in some compositions. Such a liquid crystal material shows greater phase difference due to the difference in the wavelength of light, and is therefore useful for the new reflective type color liquid crystal display device that is based on the birefringence of the liquid crystal and the retardation plate and provides color display without using color filters.

Example 44

The nematic liquid crystal compositions of the present invention, particularly (3-06) to (3-09), (3-19) and (3-23) to (3-25) further have the following features.

Assume the relaxation frequency given as $\omega d=2\times10^{12}\times S^{-}1.4031$ defined in terms of the liquid crystal constitution factor $S=(\eta\times\langle a\rangle^3)^{-1}$ (η represents the viscosity (in cp) of the liquid crystal composition and <a> represents the mean molecular length (in Å)), and assume that effective frequency F which acts on the liquid crystal display is determined by the frame frequency of the driving voltage applied to the liquid crystal composition or by the duty number. Then relation of inequality $1.0\times10^2\geqq\omega d/F\geqq5.0\times10^{-1}$ holds in the range of the operating temperatures. Thus it can be seen that the driving voltage does not vary in the range of frequencies that correspond to various time division schemes, or the driving voltage can be suppressed from increasing sharply in a low temperature region when the frequency of time division (duty number) increases. Such a characteristic is supposedly due to the molecular structure of decahydronaphthalene-2,6-diyl group. As a result, use of the liquid crystal composition of the present invention makes it possible to make a liquid crystal display device having improved display characteristics. Better drive characteristic and better display characteristics were obtained with TN-LCD type and STN-LCD type liquid crystal display devices that process particularly large amount of information.

Example 45
A nematic liquid crystal composition (3-39) was prepared from
| | | |
|---|---|---|
| (3-3901) | 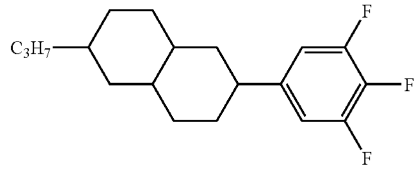 | 25 wt % |
| (3-3902) | 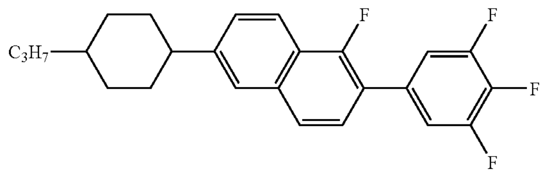 | 10 wt % |
| (3-3903) | 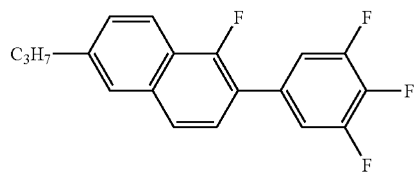 | 15 wt % |
| (3-3904) | 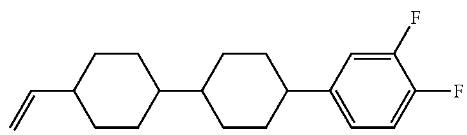 | 7.5 wt % |
| (3-3905) | 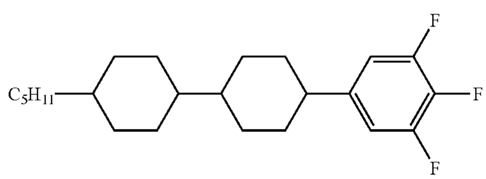 | 7.5 wt % |
| (3-3906) | 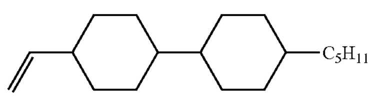 | 15 wt % |
| (3-3907) | 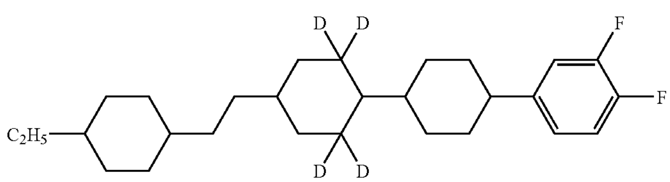 | 10 wt % |
| (3-3908) | 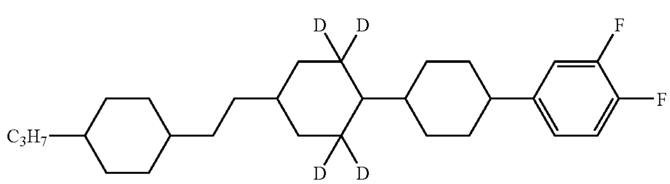 | 10 wt % |
and various properties of this composition were measured. The results are as follows.
Physical properties of the liquid crystal composition
$T_{N\text{-}I}$: 78.4° C.
$T_{\rightarrow}$: −70.° C.
$\Delta\in$: 7.7
$\Delta n$: 0.095

Display characteristics of the TN-LCD having a twist angle of 90 degrees (cell thickness 6 μm):

Vth: 1.24 V $V_1$: 2.47 V

γ: 1.27

τr=τd: 54.2 msec

In the nematic liquid crystal composition of this Example, applied voltage $V_1$ when the light transmittance is 1% has a small value of 2.47V, and the composition is most suitable for an active matrix liquid crystal display device of low driving voltage.

Example 46

A nematic liquid crystal composition (3-40) was prepared from

| | | |
|---|---|---|
| (3-4001) | 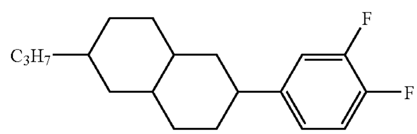 | 20 wt % |
| (3-4002) | 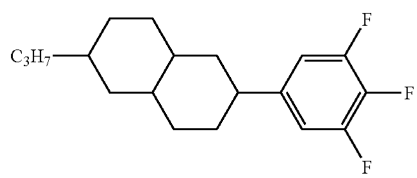 | 20 wt % |
| (3-4003) | 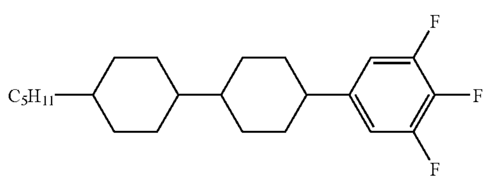 | 12 wt % |
| (3-4004) | 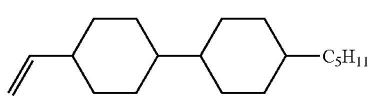 | 10 wt % |
| (3-4005) | 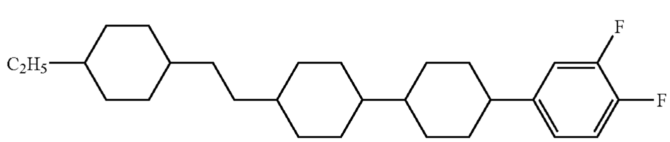 | 19 wt % |
| (3-4006) | 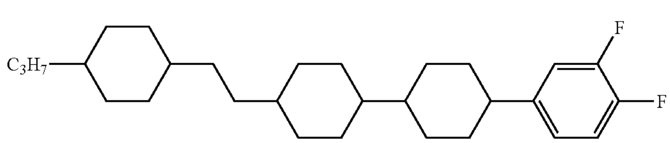 | 19 wt % |

and various properties of this composition were measured. The results are as follows.

Physical properties of liquid crystal composition

Physical properties of the liquid crystal composition $T_{N-I}$: 85.1° C.

$T_{\rightarrow N}$: −27.° C.

Δ∈: 4.4

Δn: 0.065

Display characteristics of the TN-LCD having a twist angle of 90 degrees (cell thickness 6 μm):

Vth: 1.65 V

γ: 1.284

τr=τd: 56.8 msec

IPS mode display characteristics (cell thickness 4 μm)

$V_{10}$: 2.96 V
γ: 1.80
τr=τd: 50 msec
This nematic liquid crystal composition is capable of operating over a wide range of temperatures because $T_{N\text{-}I}$ is high and $T_{\to N}$ is low, and has an advantage of fast response in the IPS mode.
Example 47
A nematic liquid crystal composition (3-41) was prepared from
| | | |
|---|---|---|
| (3-4101) | 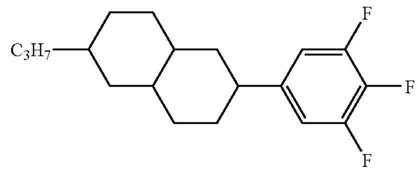 | 18 wt % |
| (3-4102) | 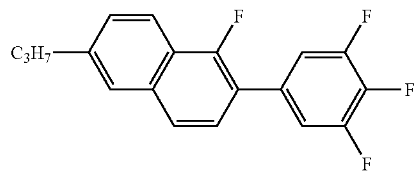 | 12 wt % |
| (3-4103) | 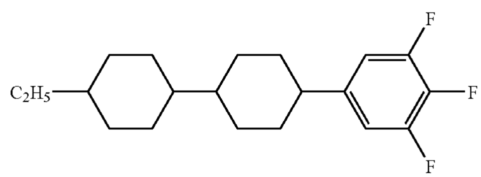 | 5 wt % |
| (3-4104) | 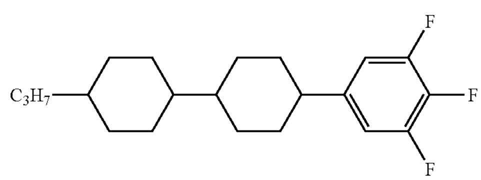 | 5 wt % |
| (3-4105) | 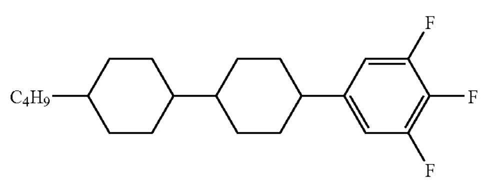 | 5 wt % |
| (3-4106) | 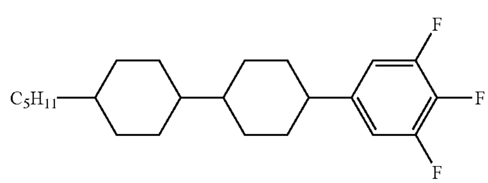 | 5 wt % |
| (3-4107) | 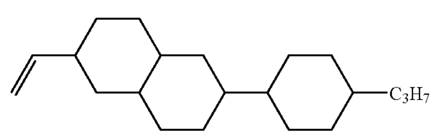 | 10 wt % |
| (3-4108) | 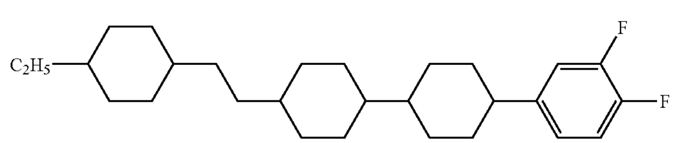 | 10 wt % |

-continued

| | | |
|---|---|---|
| (3-4109) | 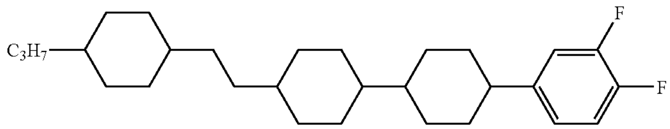 | 10 wt % |
| (3-4110) | 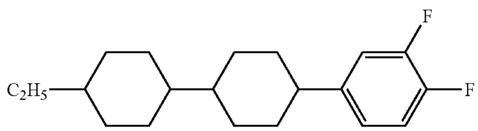 | 10 wt % |
| (3-4111) | 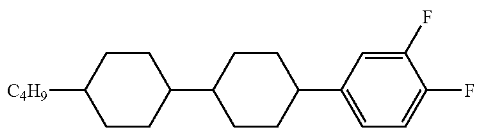 | 10 wt % |

and various properties of this composition were measured. The results are as follows.

Physical properties of liquid crystal composition

Physical properties of liquid crystal composition

Physical properties of the liquid crystal composition $T_{N-I}$: 95.1° C.

$T_{\to N}$: −70. ° C.

Δ∈: 6.8

Δn: 0.082

Display characteristics of the TN-LCD having a twist angle of 90 degrees (cell thickness 6 μm):

Vth 1.39 V

γ: 1.282

τr=τd: 66.9 msec.

IPS mode display characteristics (cell thickness 4 μm)

$V_{10}$: 2.32 V

γ: 1.78

τr=τd: 55 msec

This nematic liquid crystal composition is capable of operating over a wide range of temperatures because $T_{N-I}$ is high and $T_{-N}$ is low, and has such an advantage as fast response in the IPS mode.

Example 48

A nematic liquid crystal composition (3-42) was prepared from

| | | |
|---|---|---|
| (3-4201) | 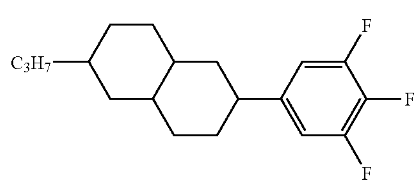 | 20 wt % |
| (3-4202) | 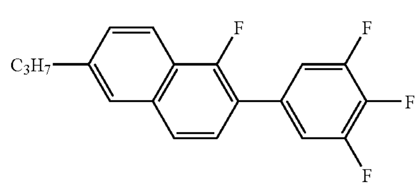 | 10 wt % |
| (3-4203) | 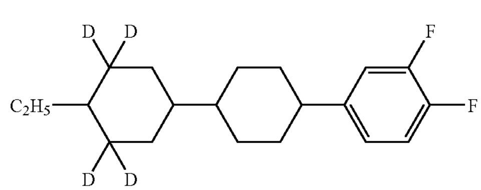 | 10 wt % |

-continued (3-4204) 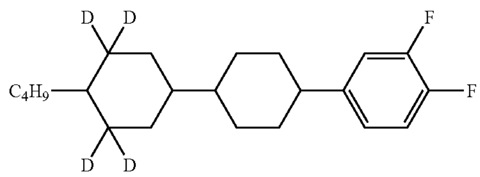 10 wt %

(3-4205) 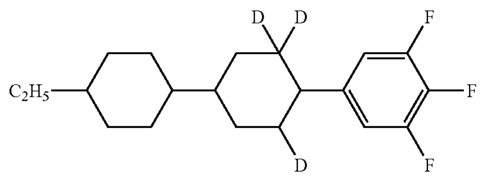 5 wt %

(3-4206) 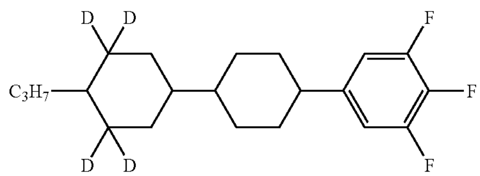 5 wt %

(3-4207) 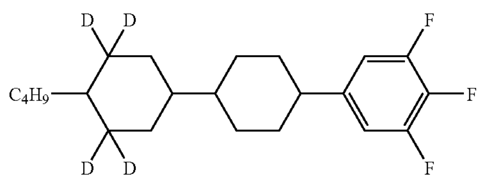 5 wt %

(3-4208) 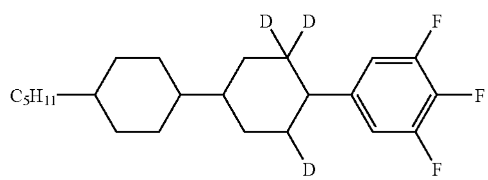 5 wt %

(3-4209) 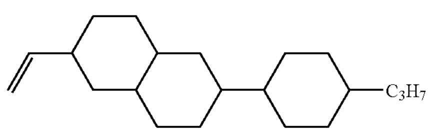 10 wt %

(3-4210) 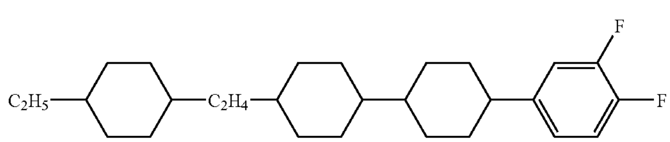 10 wt %

(3-4211) 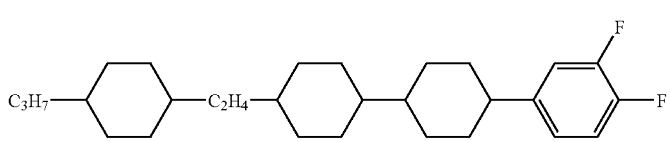 10 wt % and various properties of this composition were measured. The results are as follows. It was confirmed that the effects described above can be achieved also in this Example.

Physical properties of liquid crystal composition

Physical properties of the liquid crystal composition $T_{N-I}$: 95.0° C.

$T_{\rightarrow N}$: −70.° C.:

$\Delta\epsilon$: 6.9

$\Delta n$: 0.080

Display characteristics of the TN-LCD having a twist angle of 90 degrees (cell thickness 6 μm):

Vth: 1.38 V

γ: 1.28

τr=τd: 67.0 msec

IPS mode display characteristics (cell thickness 4 μm)

$V_{10}$: 2.3 V

γ: 1.77

τr=τd: 49.9 msec

INDUSTRIAL APPLICABILITY

The nematic liquid crystal compositions of the present invention include, as an essential component, the liquid crystal component A that consists of the compounds represented by the general formulas (I-1) to (I-5) and, when mixed in the liquid crystal composition, such effects as the extended range of operating temperatures of the liquid crystal display due to the improvements in the co-solubility and in the storage at low-temperatures, reduction in the driving voltage, improvement in the temperature dependence of the driving voltage and thereby achieving relatively fast response characteristic for a predetermined driving voltage. The design and temperature dependence of the birefringent index, dielectric constant anisotropy and elastic constant, light wavelength dependence of the birefringent index and frequency dependence of the dielectric constant anisotropy can also be improved. As a result, the nematic liquid crystal compositions of the present invention can be used in a liquid crystal display device of active matrix type, twisted nematic or super twisted nematic type. Also the present invention can provide a liquid crystal display element that provides color display by utilizing birefringence of the liquid crystal layer and retardation plate. Moreover, such an apparatus can be provided that is useful for light scattering type liquid crystal display having a light modulation layer which includes the liquid crystal material and the transparent solid substance.

What is claimed is:

1. A nematic liquid crystal composition comprising a liquid crystal component A composed of two or more kinds of compounds represented by two or three or more general formulas selected from the general formulas (I-1) to (I-5):

(I-1)

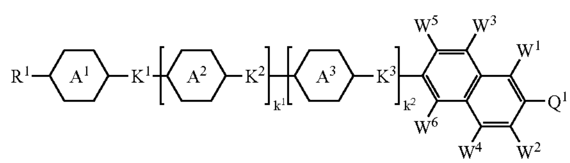

(I-2)

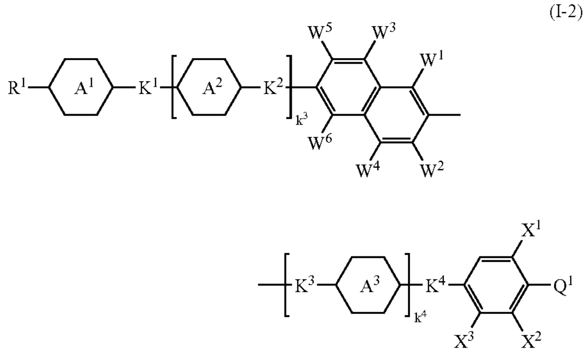

-continued (I-3)

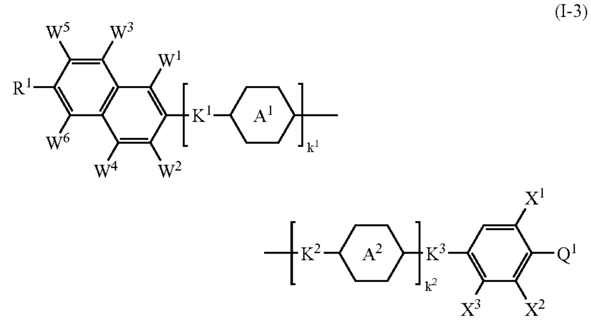

(I-4)

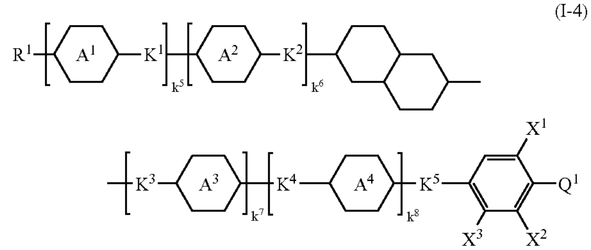

(I-5)

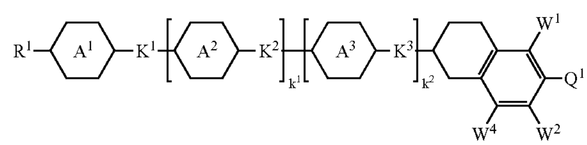

(wherein one, or two or more CH groups, which are present in a naphthalene-2,6-diyl ring, may be substituted with a N group, one, or two or more —$CH_2$— groups, which are present in a decahydronaphthalene-2,6-diyl ring, may be substituted with —$CF_2$—, one, or two or more —$CH_2$—$CH_2$— groups, which are present in said ring, may be substituted with —$CH_2O$—, —CH═CH—, —CH═CF—, —CF═CF—, —CH═N— or —CF═N—, one, or two or more >CH—$CH_2$— groups, which are present in said ring, may be substituted with >CH—O—, >C═CH—, >C═CF—, >C═N— or >N—$CH_2$—, a >CH—CH< group, which is present in the ring, may be substituted with >CH—CF<, >CF—CF<or >C═C<, and at least one C in said non-substituted or substituted ring may be substituted with Si;

$R^1$ each independently represents an alkyl group having 1 to 10 carbon atoms or an alkenyl group having 2 to 10 carbon atoms, said alkyl or alkenyl group can have one, or two or more F, Cl, CN, $CH_3$ or $CF_3$ as a non-substituent or substituent group, and one, or two or more $CH_2$ group, which are present in said alkyl or alkenyl group, may be substituted with O, CO or COO, while O atoms do not bond with each other directly;

$Q^1$ each independently represents F, Cl, $CF_3$, $OCF_3$, $OCF_2H$, $OCFH_2$, or NCS;

$X^1$ to $X^2$ each independently represents H, F, Cl, $CF_3$, $OCF_3$, or CN; $X^3$ each independently represents H, F, Cl, $CF_3$, $OCF_3$, CN, or $CH_3$;

$W^1$ to $W^6$ each independently represents H, F, Cl, $CF_3$, $OCF_3$, or CN, and also $W^4$ each independently represents $CH_3$;

$K^1$ to $K^5$ each independently represents, a single bond, —COO—, —OCO—, —$CH_2O$—, —$OCH_2$—, —CH═CH—, —CF═CF—, —C≡C—, —$(CH_2)_2$—, —$(CH_2)_4$—, —CH═CH—$(CH_2)_2$—, —$(CH_2)_2$—CH═CH—, —CH═N—, ═CH═N—N═CH—, or —N(O)═N—;

rings $A^1$ to $A^4$ each independently represents 1,4-phenylene, 2- or 3-fluoro-1,4-phenylene, 2,3-difluoro-1,4-phenylene, 3,5-difluoro-1,4-phenylene, 2- or 3-chloro-1,4-phenylene, 2,3-dichloro-1,4-phenylene, 3,5-dichloro-1,4-phenylene, pyrimidine-2,5-diyl, trans-1,4-cyclohexylene, trans-1,4-cyclohexenylene, trans-1,3-dioxane-2,5-diyl, trans-1-sila-1,4-cyclohexylene, trans-4-sila-1,4-cyclohexylene, naphthalene-2,6-diyl, 1,2,3,4-tetrahydronaphthalene-2,6-diyl, or decahydronaphthalene-2,6-diyl, and naphthalene-2,6-diyl and 1,2,3,4-tetrahydronaphthalene-2,6-diyl can have one, or two or more F, Cl, $CF_3$, $OCF_3$ or $CH_3$ as a non-substituent or substituent group;

one, or two or more hydrogen atoms, which are present in a naphthalene-2,6-diyl ring, a 1,2,3,4-tetrahydronaphthalene-2,6-diyl ring, a decahydronaphthalene-2,6-diyl ring, a side chain group $R^1$, a polar group $Q^1$, linking groups $K^1$ to $K^5$ and rings $A^1$ to $A^4$, may be substituted with a deuterium atom;

$k^1$ to $k^8$ each independently represents 0 or 1, $k^3+k^4$ is 0 or 1, and $k^5+k^6+k^7+k^8$ is 0, 1 or 2; and atoms, which constitute the compounds of the general formulas (I-1) to (I-5), may be substituted with isotope atoms thereof); 0 to 99.9% by weight of a liquid crystal component B composed of a compound having a dielectric constant anisotropy of +2 or more as a liquid crystal component excluding the compounds of the general formulas (I-1) to (I-5); and 0 to 85% by weight of a liquid crystal component C composed of a compound having a dielectric constant anisotropy within a range from −10 to +2; the sum total of said liquid crystal component B and said liquid crystal component C being within a range from 0 to 99.9% by weight.

2. A nematic liquid crystal composition according to claim 1, wherein said liquid crystal component A satisfies at least one of the following conditions:

(i) said liquid crystal component A contains one, or two or more kinds of compounds selected from compounds represented by the general formula (I-1) and one, or two or more kinds of compounds selected from compounds represented by the general formula (I-2), the content of said selected compounds in said liquid crystal component A being within a range from 5 to 100% by weight;

(ii) said liquid crystal component A contains one, or two or more kinds of compounds selected from compounds represented by the general formula (I-1) and one, or two or more kinds of compounds selected from compounds represented by the general formula (I-3), the content of said selected compounds in said liquid crystal component A being within a range from 5 to 100% by weight;

(iii) said liquid crystal component A contains one, or two or more kinds of compounds selected from compounds represented by the general formula (I-1) and one, or two or more kinds of compounds selected from compounds represented by the general formula (I-4), the content of said selected compounds in said liquid crystal component A being within a range from 5 to 100% by weight;

(iv) said liquid crystal component A contains one, or two or more kinds of compounds selected from compounds represented by the general formula (I-1) and one, or two or more kinds of compounds selected from compounds represented by the general formula (I-5), the content of said selected compounds in said liquid crystal component A being within a range from 5 to 100% by weight;

(v) said liquid crystal component A contains one, or two or more kinds of compounds selected from compounds represented by the general formula (I-2) and one, or two or more kinds of compounds selected from compounds represented by the general formula (I-3), the content of said selected compounds in said liquid crystal component A being within a range from 5 to 100% by weight;

(vi) said liquid crystal component A contains one, or two or more kinds of compounds selected from compounds represented by the general formula (I-2) and one, or two or more kinds of compounds selected from compounds represented by the general formula (I-4), the content of said selected compounds in said liquid crystal component A being within a range from 5 to 100% by weight;

(vii) said liquid crystal component A contains one, or two or more kinds of compounds selected from compounds represented by the general formula (I-2) and one, or two or more kinds of compounds selected from compounds represented by the general formula (I-5), the content of said selected compounds in said liquid crystal component A being within a range from 5 to 100% by weight;

(viii) said liquid crystal component A contains one, or two or more kinds of compounds selected from compounds represented by the general formula (I-3) and one, or two or more kinds of compounds selected from compounds represented by the general formula (I-4), the content of said selected compounds in said liquid crystal component A being within a range from 5 to 100% by weight;

(ix) said liquid crystal component A contains one, or two or more kinds of compounds selected from compounds represented by the general formula (I-3) and one, or two or more kinds of compounds selected from compounds represented by the general formula (I-5), the content of said selected compounds in said liquid crystal component A being within a range from 5 to 100% by weight;

(x) said liquid crystal component A contains one, or two or more kinds of compounds selected from compounds represented by the general formula (I-4) and one, or two or more kinds of compounds selected from compounds represented by the general formula (I-5), the content of said selected compounds in said liquid crystal component A being within a range from 5 to 100% by weight;

(xi) said liquid crystal component A contains one, or two or more kinds of compounds selected from compounds represented by the general formula (I-1), one, or two or more kinds of compounds selected from compounds represented by the general formula (I-2) and one, or two or more kinds of compounds selected from compounds represented by the general formula (I-3), the content of said selected compounds in said liquid crystal component A being within a range from 5 to 100% by weight;

(xii) said liquid crystal component A contains one, or two or more kinds of compounds selected from compounds represented by the general formula (I-1), one, or two or more kinds of compounds selected from compounds represented by the general formula (I-2) and one, or two or more kinds of compounds selected from compounds represented by the general formula (I-4), the content of said selected compounds in said liquid crystal component A being within a range from 5 to 100% by weight;

(xiii) said liquid crystal component A contains one, or two or more kinds of compounds selected from compounds represented by the general formula (I-1), one, or two or more kinds of compounds selected from compounds represented by the general formula (I-2) and one, or two or more kinds of compounds selected from compounds represented by the general formula (I-5), the content of said selected compounds in said liquid crystal component A being within a range from 5 to 100% by weight;

(xiv) said liquid crystal component A contains one, or two or more kinds of compounds selected from compounds represented by the general formula (I-1), one, or two or more kinds of compounds selected from compounds represented by the general formula (I-3) and one, or two or more kinds of compounds selected from compounds represented by the general formula (I-4), the content of said selected compounds in said liquid crystal component A being within a range from 5 to 100% by weight;

(xv) said liquid crystal component A contains one, or two or more kinds of compounds selected from compounds represented by the general formula (I-1), one, or two or more kinds of compounds selected from compounds represented by the general formula (I-3) and one, or two or more kinds of compounds selected from compounds represented by the general formula (I-5), the content of said selected compounds in said liquid crystal component A being within a range from 5 to 100% by weight;

(xvi) said liquid crystal component A contains one, or two or more kinds of compounds selected from compounds represented by the general formula (I-1), one, or two or more kinds of compounds selected from compounds represented by the general formula (I-4) and one, or two or more kinds of compounds selected from compounds represented by the general formula (I-5), the content of said selected compounds in said liquid crystal component A being within a range from 5 to 100% by weight;

(xvii) said liquid crystal component A contains one, or two or more kinds of compounds selected from compounds represented by the general formula (I-2), one, or two or more kinds of compounds selected from compounds represented by the general formula (I-3) and one, or two or more kinds of compounds selected from compounds represented by the general formula (I-4), the content of said selected compounds in said liquid crystal component A being within a range from 5 to 100% by weight;

(xviii) said liquid crystal component A contains one, or two or more kinds of compounds selected from compounds represented by the general formula (I-2), one, or two or more kinds of compounds selected from compounds represented by the general formula (I-3) and one, or two or more kinds of compounds selected from compounds represented by the general formula (I-5), the content of said selected compounds in said liquid crystal component A being within a range from 5 to 100% by weight;

(xix) said liquid crystal component A contains one, or two or more kinds of compounds selected from compounds represented by the general formula (I-2), one, or two or more kinds of compounds selected from compounds represented by the general formula (I-4) and one, or two or more kinds of compounds selected from compounds represented by the general formula (I-5), the content of said selected compounds in said liquid crystal component A being within a range from 5 to 100% by weight;

(xx) said liquid crystal component A contains one, or two or more kinds of compounds selected from compounds represented by the general formula (I-3), one, or two or more kinds of compounds selected from compounds represented by the general formula (I-4) and one, or two or more kinds of compounds selected from compounds represented by the general formula (I-5), the content of said selected compounds in said liquid crystal component A being within a range from 5 to 100% by weight;

(xxi) said liquid crystal component A contains one, or two or more kinds of compounds selected from compounds represented by the general formula (I-1), one, or two or more kinds of compounds selected from compounds represented by the general formula (I-2), one, or two or more kinds of compounds selected from compounds represented by the general formula (I-3) and one, or two or more kinds of compounds selected from compounds represented by the general formula (I-4), the content of said selected compounds in said liquid crystal component A being within a range from 5 to 100% by weight;

(xxii) said liquid crystal component A contains one, or two or more kinds of compounds selected from compounds represented by the general formula (I-1), one, or two or more kinds of compounds selected from compounds represented by the general formula (I-2), one, or two or more kinds of compounds selected from compounds represented by the general formula (I-3) and one, or two or more kinds of compounds selected from compounds represented by the general formula (I-5), the content of said selected compounds in said liquid crystal component A being within a range from 5 to 100% by weight;

(xxiii) said liquid crystal component A contains one, or two or more kinds of compounds selected from compounds represented by the general formula (I-1), one, or two or more kinds of compounds selected from compounds represented by the general formula (I-2), one, or two or more kinds of compounds selected from compounds represented by the general formula (I-4) and one, or two or more kinds of compounds selected from compounds represented by the general formula (I-5), the content of said selected compounds in said liquid crystal component A being within a range from 5 to 100% by weight;

(xxiv) said liquid crystal component A contains one, or two or more kinds of compounds selected from compounds represented by the general formula (I-1), one, or two or more kinds of compounds selected from compounds represented by the general formula (I-3), one, or two or more kinds of compounds selected from compounds represented by the general formula (I-4) and one, or two or more kinds of compounds selected from compounds represented by the general formula (I-5), the content of said selected compounds in said liquid crystal component A being within a range from 5 to 100% by weight;

(xxv) said liquid crystal component A contains one, or two or more kinds of compounds selected from compounds represented by the general formula (I-2), one, or two or more kinds of compounds selected from compounds represented by the general formula (I-3), one, or two or more kinds of compounds selected from compounds represented by the general formula (I-4) and one, or two or more kinds of compounds selected from compounds represented by the general formula (I-5), the content of said selected compounds in said liquid crystal component A being within a range from 5 to 100% by weight;

(xxvi) said liquid crystal component A contains one, or two or more kinds of compounds selected from compounds represented by the general formula (I-1), one, or two or more kinds of compounds selected from compounds represented by the general formula (I-2), one, or two or more kinds of compounds selected from compounds represented by the general formula (I-3), one, or two or more kinds of compounds selected from compounds represented by the general formula (I-4) and one, or two or more kinds of compounds selected from compounds represented by the general formula (I-5), the content of said selected compounds in said liquid crystal component A being within a range from 10 to 100% by weight;

(xxvii) said liquid crystal component A contains one, or two or more kinds of compounds selected from compounds represented by the general formula (I-1), the content of said selected compounds in said liquid crystal component A being within a range from 5 to 100% by weight;

(xxviii) said liquid crystal component A contains one, or two or more kinds of compounds selected from compounds represented by the general formula (I-2), the content of said selected compounds in said liquid crystal component A being within a range from 5 to 100% by weight;

(xxix) said liquid crystal component A contains one, or two or more kinds of compounds selected from compounds represented by the general formula (I-3), the content of said selected compounds in said liquid crystal component A being within a range from 5 to 100% by weight;

(xxx) said liquid crystal component A contains one, or two or more kinds of compounds selected from compounds represented by the general formula (I-4), the content of said selected compounds in said liquid crystal component A being within a range from 5 to 100% by weight; and (xxxi) said liquid crystal component A contains one, or two or more kinds of compounds selected from compounds represented by the general formula (I-5), the content of said selected compounds in said liquid crystal component A being within a range from 5 to 100% by weight.

3. A nematic liquid crystal composition according to claim 1, wherein said liquid crystal component A contains one to twenty kinds of compounds selected from one, two, or three or more sub-groups among the following sub-groups (1-ai) to (1-avii), the content of said compounds being within a range from 10 to 100% by weight:

(I-ai) compound in which $R^1$ is an alkyl or alkenyl group having 2 to 7 carbon atoms, (I-aii) compound in which $Q^1$ is F, Cl, $CF_3$, $OCF_3$, or $OCF_2$, (I-aiii) compound in which $K^1$ to $K^5$ represent —$(CH_2)_2$—, —COO—, or —C≡C—, (I-aiv) compound in which rings $A^1$ to $A^4$ represent trans-1,4-cyclohexylene, 1,4-phenylene, 3-fluoro-1,4-phenylene, or 3,5-difluoro-1,4-phenylene, and (I-av) compound in which one, or two or more hydrogen atoms, which are present in naphthalene-2,6-diyl ring, a 1,2,3,4-tetrahydronaphthalene-2,6-diyl ring, a decahydronaphthalene-2,6-diyl ring, a side chain group $R^1$, a polar group $Q^1$, linking groups $K^1$ to $K^5$ and rings $A^1$ to $A^4$, are substituted with deuterium atoms, in the general formulas (I-1) to (I-5);

(I-avi) compound in which $W^1$ to $W^3$ represent H, F, Cl, $CF_3$, or $OCF_3$ in the general formulas (I-1) to (I-3) and (I-5); and (I-avii) compound in which $X^1$ and $X^2$ represent H, F, Cl, $CF_3$, or $OCF_3$ in the general formulas (I-2) to (I-4).

4. A nematic liquid crystal composition according to claim 1, wherein said liquid crystal component A contains one to twenty kinds of compounds selected from one, two, or three or more sub-groups among the following sub-groups (I-bi) to (I-bvii), the content of said compounds being within a range from 5 to 100% by weight:

(I-bi) compound in which $k^1=k^2=0$, the ring $A^1$ is trans-1,4-cyclohexylene, 1,4-phenylene, 3-fluoro-1,4-phenylene, 3,5-difluoro-1,4-phenylene, naphthalene-2,6-diyl, 1,2,3,4-tetrahydronaphthalene-2,6-diyl, or decahydronaphthalene-2,6-diyl, $K^1$ is a single bond, —$(CH_2)_2$—, —COO—, or —C≡C—, and (I-bii) compound in which $k^1=1$, $k^2=0$, rings $A^1$ and $A^2$ represent trans-1,4-cyclohexylene, 1,4-phenylene, 3-fluoro-1,4-phenylene, 3,5-difluoro-1,4-phenylene, naphthalene-2,6-diyl, 1,2,3,4-tetrahydronaphthalene-2,6-diyl, or decahydronaphthalene-2,6-diyl, $K^1$ is a single bond, —$(CH_2)_2$—, —COO—, or —C≡C—, $K^1$ and $K^2$ represent a single bond, —$(CH_2)_2$—, —COO—, or —C≡C—, in the general formula (I-1) in which $R^1$ is an alkyl or alkenyl group having 2 to 7 carbon atoms, $Q^1$ is F, Cl, $CF_3$, or $OCF_3$, and $W^1$ to $W^3$ each represents H, F, Cl, $CF_3$, or $OCF_3$;

(I-biii) compound in which $k^3=k^4=0$, the ring $A^1$ is trans-1,4-cyclohexylene, 1,4-phenylene, 3-fluoro-1,4-phenylene, or 3,5-difluoro-1,4-phenylene, and $K^1$ and $K^4$ represent a single bond, —$(CH_2)_2$—, —COO—, or —C≡C—, in the general formula (I-2) in which $R^1$ is an alkyl or alkenyl group having 2 to 7 carbon atoms, $Q^1$ is F, Cl, $CF_3$, $OCF_3$, or CN, $X^1$ and $X^2$ represent H, F, Cl, $CF_3$, or $OCF_3$, and $W^1$ to $W^3$ represent H, F, Cl, $CF_3$, or $OCF_3$;

(I-biv) compound in which $k^1=k^2=0$, $K^3$ is a single bond, —COO—, or —C≡C—, and (I-bv) compound in which $k^1=1$, $k^2=0$, the ring $A^1$ is 1,4-phenylene, 3-fluoro-1,4-phenylene, or a 3,5-difluoro-1,4-phenylene, $K^1$ and $K^3$ represent —COO— or —C≡C—, in the general formula (I-3) in which $R^1$ is an alkyl or alkenyl group having 2 to 7 carbon atoms, $Q^1$ is F, Cl, $CF_3$, $OCF_3$, or C, $X^1$ and $X^2$ represent H, F, Cl, $CF_3$, or $OCF_3$, and $W^1$ to $W^3$ represent H, F, Cl, $CF_3$, or $OCF_3$;

(I-bvi) compound in which $k^5=k^6=k^7=k^8=0$, $K^5$ is a single bond, —$(CH_2)_2$—, —$(CH_2)_4$—, —COO—, or —C≡C—, (I-bvii) compound in which $k^5=1$, $k^6=k^7=k^8=0$, the ring $A^1$ is trans-1,4-cyclohexylene, 1,4-phenylene, 3-fluoro- 1,4-phenylene, or 3,5-difluoro-1,4-phenylene, $K^1$ and $K^5$ represent a single bond, —$(CH_2)_2$—, —COO—, or —C≡C—, (I-bviii) compound in which $k^7$=1, $k^5$=$k^6$=$k^8$=0, the ring $A^3$ is trans-1,4-cyclohexylene, 1,4-phenylene, 3-fluoro-1,4-phenylene, or 3,5-difluoro-1,4-phenylene, $K^3$ and $K^5$ represent a single bond, —$(CH_2)_2$—, —COO—, or —C≡C—, and (I-bix) compound in which the decahydronaphthalene-2,6-diyl ring has at least one substituent among substituents —$CF_2$—, —$CH_2$—O—, —CH═CH—, —CH═CF—, —CF═CF—, —CH═N—, —CF═N—, >CH—O—, >C═CH—, >C═CF—, >C═N—, >N—$CH_2$—, >CH—CF<, >CF—CF<, >C═C<, and Si, in the general formula (I-4) in which $R^1$ is an alkyl or alkenyl group having 2 to 7 carbon atoms, $Q^1$ is F, Cl, $CF_3$, $OCF_3$, and $X^1$ and $X^2$ represent H, F, Cl, $CF_3$, $OCF_3$; and (I-bx) compound in which $k^1$=$k^2$=0, the ring $A^1$ is trans-1,4-cyclohexylene, 1,4-phenylene, 3-fluoro-1,4-phenylene, 3,5-difluoro-1,4-phenylene, naphthalene-2,6-diyl, 1,2,3,4-tetrahydronaphthalene-2,6-diyl, or decahydronaphthalene-2,6-diyl, $K^1$ is a single bond, —$(CH_2)_2$—, —$(CH_2)_4$—, or —COO—, and (I-bxi) compound in which $k^1$=1, $k^2$=0, rings $A^1$ and $A^2$ represent trans-1,4-cyclohexylene, 1,4-phenylene, 3-fluoro-1,4-phenylene, 3,5-difluoro-1,4-phenylene, naphthalene-2,6-diyl, 1,2,3,4-tetrahydronaphthalene-2,6-diyl, or decahydronaphthalene-2,6-diyl, and $K^1$ and $K^2$each represents a single bond, —$(CH_2)_2$—, —$(CH_2)_4$—, or —COO—, in the general formula (I-5) in which $R^1$ is an alkyl or alkenyl group having 2 to 7 carbon atoms, $Q^1$ is F, Cl, $CF_3$, or $OCF_3$, and $W^1$ and $W^2$ represent H, F, Cl, $CF_3$, or $OCF_3$.

5. A nematic liquid crystal composition according to claim 1, wherein said liquid crystal component B contains one, or two or more kinds of compounds selected from the group of compounds represented by the general formulas (II-1) to (II-4):

(II-1)

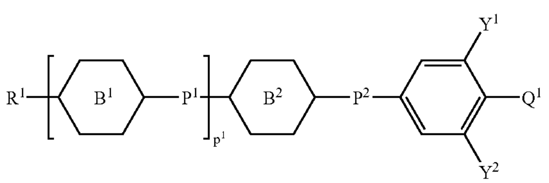

(II-2)

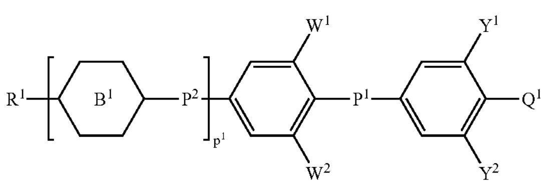

(II-3)

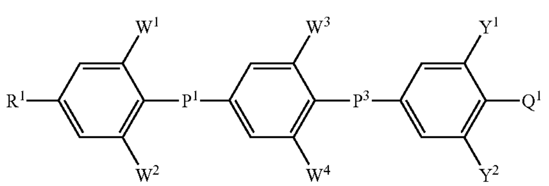

-continued (II-4)

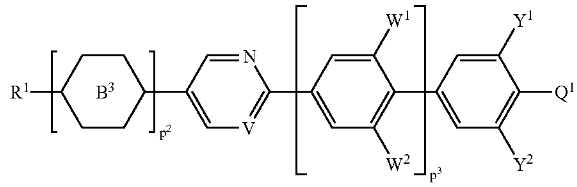

(wherein R1 each independently represents an alkyl group having 1 to 10 carbon atoms or an alkenyl group having 2 to 10 carbon atoms, said alkyl or alkenyl group can have one, or two or more F, Cl, CN, $CH_3$ or $CF_3$ as a non-substituent or substituent group, and one, or two or more $CH_2$ group, which are present in said alkyl or alkenyl group, may be substituted with O, CO or COO, while O atoms do not bond with each other directly;

$Q^1$ each independently represents F, Cl, $CF_3$, $OCF_3$, $OCF_2H$, $OCFH_2$, NCS, or CN;

$W^1$ to $W^4$ each independently represents H, F, Cl, $CF_3$, $OCF_3$, or CN, and also $W^4$ each independently represents $CH_3$;

$Y^1$ and $Y^2$ each independently represents H, F, Cl, or $OCF_3$;

V represents CH or N;

$p^1$ to $p^3$ each independently represents, a single bond, —COO—, —OCO—, —$CH_2$O—, —$OCH_2$—, —$(CH_2)_2$—, —$(CH_2)_4$—, —CH═CH—$(CH_2)_2$—, —$(CH_2)_2$—CH═CH—, —CH═N—, ═CH═N—N═CH—, or —N(O)═N—, and $p^1$ and $p^3$ each independently represents —CH═CH—, —CF═CF—, or C⌊C—;

rings $B^1$ to $B^3$ each independently represents trans-1,4-cyclohexylene, trans-1,4-cyclohexenylene, trans-1,3-dioxane-2,5-diyl, trans-1-sila-1,4-cyclohexylene, or trans-4-sila-1,4-cyclohexylene, and the ring $B^3$ may also be 1,4-phenylene, 2- or 3-fluoro-1,4-phenylene, 3,5-difluoro-1,4-phenylene, 2- or 3-chloro-1,4-phenylene, 2,3-dichloro-1,4-phenylene, or 3,5-dichloro-1,4-phenylene;

one, or two or more hydrogen atoms, which are present in a side chain group $R^1$, a polar group $Q^1$, linking groups $P^1$ to $P^3$ and rings $B^1$ to $B^3$, may be substituted with a deuterium atom;

$p^1$ to $p^3$ each independently represents 0 or 1, and $p^2$+$p^3$ is 0 or 1; and atoms, which constitute the compounds of the general formulas (II-1) to (II-4), may be substituted with isotope atoms thereof).

6. A hematic liquid crystal composition according to claim 5, wherein said liquid crystal component B contains one to twenty knids of compounds selected from one, two, or three or more sub-groups among the following sub-groups (II-ai) to (II-zxii), the content of said compounds being within a range from 10 to 100% by weight:

(II-ai) compounds in which $R^1$ is an alkyl or alkenyl group having 2 to 5 carbon atoms, in the general formulas (II-1) to (II-4);

(II-aii) compounds in which $Q^1$ is F, Cl, or —$OCF_3$, in the general formulas (II-1) to (II-4);

(II-aiii) compounds in which $Q^1$ is —$(CH_2)_2$— or —$(CH_2)_4$—, in the general formula (II-1);

(II-aiv) compound in which $p^1$ is 1, in the general formula (II-1);

(II-av) compound in which at least one of $Y^1$, $Y^2$, $W^1$ and $W^2$ is F, in the general formula (II-2);

(II-avi) compound in which $p^1$ is 1 and $P^1$ is —C≡C—, in the general formula (II-2);

(II-avii) compound in which $P^2$ is a single bond or —$(CH_2)_2$— and $P^1$ is —COO—, in the general formula (II-2);

(II-aviii) compound in which at least one of $Y^1$, $Y^2$, and $W^1$ to $W^4$ is F, in the general formula (II-3);

(II-aix) compound in which $P^3$ is —C≡C—, in the general formula (II-3);

(II-ax) compound in which $P^1$ is a single bond or —C≡C— and $P^3$ is —COO—, in the general formula (II-3);

(II-axi) compound represented by the general formula (II-4); and (II-axii) compound in which at least one of rings $B^1$ to $B^3$ is substituted with a deuterium atom if the rings $B^1$ to $B^3$ represent trans-1,4-cyclohexylene, in the general formulas (II-1), (II-2) and (II-4).

7. A nematic liquid crystal composition according to claim 5, wherein said liquid crystal component B contains one to twenty kinds of compounds selected from one, two, or three or more sub-groups among the following sub-groups (II-bi) to (II-bviii), the content of said compounds being within a range from 10 to 100% by weight:

(II-bi) compound in which $R^1$ is an alkyl or alkenyl group having 2 to 5 carbon atoms, $p^1$ is 0, and $Q^1$ is —CN, in the general formula (II-1);

(II-bii) compound in which $R^1$ is an alkyl or alkenyl group having 2 to 5 carbon atoms, $p^1$ is 1, $Q^1$ is F or —CN, and Y1 and Y2 represent H or F, in the general formula (II-1);

(II-biii) compound in which $R^1$ is an alkyl or alkenyl group having 2 to 5 carbon atoms, $p^1$ is 0, $Q^1$ is —CN, and $Y^1$, $Y^2$, $W^1$ and $W^2$ represent H or F, in the general formula (II-2);

(II-biv) compound in which $R^1$ is an alkyl or alkenyl group having 2 to 5 carbon atoms, $p^1$ is 1, $P^2$ is a single bond, —$(CH_2)_2$—, or —COO—, $P^1$ is a single bond, —COO—, or —C≡C—, $Q^1$ is F or —CN, and $Y^1$, $Y^2$, $W^1$ and $W^2$ represent H or F, in the general formula (II-2);

(II-bv) compound in which $R^1$ is an alkyl or alkenyl group having 2 to 5 carbon atoms, and one of $P_1$ and $P^3$ is a single bond and other one is a single bond, —COO—, or —C≡C—, in the general formula (II-3);

(II-bvi) compound in which $R^1$ is an alkyl or alkenyl group having 2 to 5 carbon atoms, and $Y^1$, $Y^2$ and $W^1$ to $W^4$ represent H or F, in the general formula (II-3);

(II-bvii) compound in which $R^1$ is an alkyl or alkenyl group having 2 to 7 carbon atoms, and $p^2+p^{3=0}$, in the general formula (II-4); and (II-bviii) compounds of the general formulas (II-1) to (II-2) in which at least one hydrogen atom of rings $B^1$ and $B^2$ is substituted with a deuterium atom if rings $B^1$ and $B^2$ represent trans-1,4-cyclohexylene.

8. A nematic liquid crystal composition according to claim 5, wherein said liquid crystal component B contains one to twenty kinds of compounds selected from one, two, or three or more sub-groups among the following sub-groups (II-ci) to (II-civ), the content of said compounds being within a range from 10 to 100% by weight:

(II-ci) compound in which $R^1$ is an alkyl or alkenyl group having 2 to 5 carbon atoms, $p^1$ is 1, one of $P^1$ and $P^2$ is a single bond and other one is a single bond, —COO—, —$(CH^2)_2$—, or —$(CH_2)_4$, $Q^1$ is F, Cl, $CF_3$, $OCF_3$, or $OCF_2H$, and one, or two or more of $Y^1$ and $Y^2$ represent F, in the general formula (II-1);

(II-cii) compound in which $R^1$ is an alkyl or alkenyl group having 2 to 5 carbon atoms, $p^1$ is 1, $P^2$ is a single bond, —$(CH_2)_2$—, or —COO—, $P_1$ is a single bond, —COO—, or —C≡C—, $Q^1$ is F, Cl, $CF_3$, $OCF_3$, or $OCF_2H$, one, or two or more of $Y^1$ and $Y^2$ represent F, and $W^1$ and $W^2$ represent H or F, in the general formula (II-2);

(II-ciii) compound in which $R^1$ is an alkyl or alkenyl group having 2 to 5 carbon atoms, one of $P^1$ and $P^3$ is a single bond and the other one is a single bond, —COO—, or —C≡C—, $Q^1$ is F, Cl, $CF_3$, $OCF_3$, or $OCF_2H$, one, or two or more of $Y^1$ and $Y^2$ represent F, and $W^1$ to $W^4$ represent H or at least one of them is F, in the general formula (II-3); and (II-civ) compound of the general formulas (II-1) and (II-2) in which at least three hydrogen atoms of rings $B^1$ and $B^2$ are substituted with a deuterium atom if rings $B^1$ and $B^2$ represent trans-1,4-cyclohexylene.

9. A nematic liquid crystal composition according to claim 1, wherein said liquid crystal component C contains compounds selected from the group of compounds represented by the general formulas (III-1) to (III-4):

(III-1)

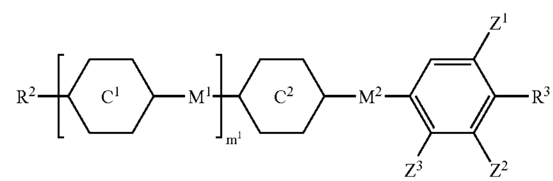

(III-2)

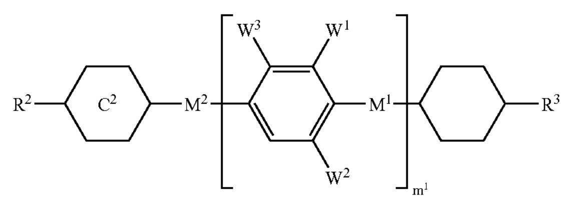

(III-3)

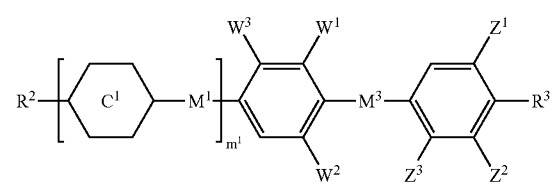

(III-4)

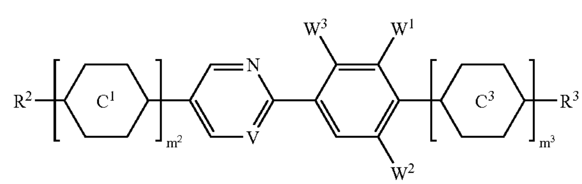

(wherein $W^1$ to $W^3$ each independently represents H, F, Cl, $CF_3$, $OCF_3$, or CN;

V represents CH or N;

$R^2$ and $R^3$ each independently represents an alkyl or alkoxy group having 1 to 10 carbon atoms or an alkenyl or alkenyloxy group having 2 to 10 carbon atoms, said alkyl, alkoxy, alkenyl or alkenyloxy group can have one, or two or more F, Cl, CN, $CH_3$ or $CF_3$ as a non-substituent or substituent group, and one, or two or more $CH_2$ group, which are present in said alkyl, alkoxy, alkenyl or alkenyloxy group, may be substituted with O, CO or COO, while O atoms do not bond with each other directly;

$Z^1$ to $Z^3$ each independently represents H, F, Cl, $CF_3$, $OCF_3$, or CN, and $Z^3$ each independently represents —$CH_3$;

$M^1$ to $M^3$ each independently represents, a single bond, —COO—, —OCO—, —$CH_2O$—, —$OCH_2$ —$(CH_2)_2$—, —$(CH_2)_4$—, —CH═CH— $(CH_2)_2$—, —$(CH_2)_2$—CH═CH—, —CH═N—, ═CH═N— N═CH—, or —N(O)═N—, and $M^1$ and $M^3$ each independently represents —CH═CH—, —CF═CF—, or C—C—;

rings $C^1$ to $C^3$ each independently represents trans-1,4-cyclohexylene, trans-1,4-cyclohexenylene, trans-1,3-dioxane-2,5-diyl, trans-1-sila-1,4-cyclohexylene, trans-4-sila-1,4-cyclohexylene, naphthalene-2,6-diyl, 1,2,3,4-tetrahydronaphthalene-2,6-diyl, or decahydronaphthalene-2,6-diyl, naphthalene-2,6-diyl and 1,2,3,4-tetrahydronaphthalene-2,6-diyl can have one, or two or more F, Cl, $CF_3$, $OCF_3$ or $CH_3$ as a non-substituent or substituent group, and rings $C^1$ and $C^3$ may also be 1,4-phenylene, 2- or 3-fluoro-1,4-phenylene, 2,3-difluoro-1,4-phenylene, 3,5-difluoro-1,4-phenylene, 2- or 3-chloro-1,4-phenylene, 2,3-dichloro-1,4-phenylene, or 3,5-dichloro-1,4-phenylene;

one, or two or more hydrogen atoms, which are present in side chain groups $R^2$ and $R^3$, linking groups $M^1$ to $M^3$ and rings $C^1$ to $C^3$, may be substituted with a deuterium atom;

$m^1$ to $m^3$ each independently represents 0 or 1, and $m^2+m^3$ is 0 or 1; and atoms, which constitute the compounds of the general formulas (III-1) to (III-4), may be substituted with isotope atoms thereof).

10. A nematic liquid crystal composition according to claim 9, wherein said liquid crystal component C satisfies at least one of the following conditions:

(i) said liquid crystal component C contains one, or two or more kinds of compounds selected from compounds represented by the general formula (E-1), the content of said selected compounds in said liquid crystal component C being within a range from 5 to 100% by weight;

(ii) said liquid crystal component C contains one, or two or more kinds of compounds selected from compounds represented by the general formula (III-2), the content of said selected compounds in said liquid crystal component C being within a range from 5 to 100% by weight;

(iii) said liquid crystal component C contains one, or two or more kinds of compounds selected from compounds represented by the general formula (III-3), the content of said selected compounds in said liquid crystal component C being within a range from 5 to 100% by weight;

(iv) said liquid crystal component C contains one, or two or more kinds of compounds selected from the compounds represented by the general formula (III-4), the content of said selected compounds in said liquid crystal component C being within a range from 5 to 100% by weight;

(v) said liquid crystal component C contains one, or two or more kinds of compounds selected from compounds represented by the general formula (III-1) and one, or two or more kinds of compounds selected from compounds represented by the general formula (III-2), the content of said selected compounds in said liquid crystal component C being within a range from 5 to 100% by weight;

(vi) said liquid crystal component C contains one, or two or more kinds of compounds selected from compounds represented by the general formula (III-1) and one, or two or more kinds of compounds selected from compounds represented by the general formula (III-3), the content of said selected compounds in said liquid crystal component C being within a range from 5 to 100% by weight;

(vii) said liquid crystal component C contains one, or two or more kinds of compounds selected from compounds represented by the general formula (III-1) and one, or two or more kinds of compounds selected from compounds represented by the general formula (III-4), the content of said selected compounds in said liquid crystal component C being within a range from 5 to 100% by weight;

(viii) said liquid crystal component C contains one, or two or more kinds of compounds selected from compounds represented by the general formula (III-2) and one, or two or more kinds of compounds selected from compounds represented by the general formula (III-3), the content of said selected compounds in said liquid crystal component C being within a range from 5 to 100% by weight;

(ix) said liquid crystal component C contains one, or two or more kinds of compounds selected from compounds represented by the general formula (III-2) and one, or two or more kinds of compounds selected from compounds represented by the general formula (III-4), the content of said selected compounds in said liquid crystal component C being within a range from 5 to 100% by weight;

(x) said liquid crystal component C contains one, or two or more kinds of compounds selected from compounds represented by the general formula (III-3) and one, or two or more kinds of compounds selected from compounds represented by the general formula (III-4), the content of said selected compounds in said liquid crystal component C being within a range from 5 to 100% by weight;

(xi) said liquid crystal component C contains one, or two or more kinds of compounds selected from compounds represented by the general formula (III-1), one, or two or more kinds of compounds selected from compounds represented by the general formula (III-2) and one, or two or more kinds of compounds selected from compounds represented by the general formula (III-3), the content of said selected compounds in said liquid crystal component C being within a range from 5 to 100% by weight;

(xii) said liquid crystal component C contains one, or two or more kinds of compounds selected from compounds represented by the general formula (III-1), one, or two or more kinds of compounds selected from compounds represented by the general formula (III-2) and one, or two or more kinds of compounds selected from compounds represented by the general formula (III-4), the content of said selected compounds in said liquid crystal component C being within a range from 5 to 100% by weight;

(xiii) said liquid crystal component C contains one, or two or more kinds of compounds selected from compounds represented by the general formula (III-1), one, or two or more kinds of compounds selected from compounds represented by the general formula (III-3) and one, or two or more kinds of compounds selected from compounds represented by the general formula (III-4), the content of said selected compounds in said liquid crystal component C being within a range from 5 to 100% by weight;

(xiv) said liquid crystal component C contains one, or two or more kinds of compounds selected from compounds represented by the general formula (III-2), one, or two or more kinds of compounds selected from compounds represented by the general formula (III-3) and one, or two or more kinds of compounds selected from compounds represented by the general formula (III-4), the content of said selected compounds in said liquid crystal component C being within a range from 5 to 100% by weight;

(xv) said liquid crystal component C contains one, or two or more kinds of compounds selected from compounds represented by the general formula (III-1), one, or two or more kinds of compounds selected from compounds represented by the general formula (III-2), one, or two or more kinds of compounds selected from compounds represented by the general formula (III-3) and one, or two or more kinds of compounds selected from compounds represented by the general formula (III-4), the content of said selected compounds in said liquid crystal component C being within a range from 5 to 100% by weight.

11. A nematic liquid crystal composition according to claim 9, wherein said liquid crystal component C contains one to twenty kinds of compounds selected from one, two, or three or more sub-groups among the following sub-groups (III-ai) to (III-axii), the content of said compounds being within a range from 10 to$_2$ 100% by weight:

(III-ai) compounds in which R is an alkenyl group having 2 to 5 carbon atoms, in the general formulas (III-1) to (III-4);

(III-aii) compounds in which $R^3$ is a straight-chain alkenyl or alkenyloxy group having 2 to 7 carbon atoms, in the general formula (III-1) to (III-4);

(III-aiii) compounds in which $m^1$ is 0 and $M^2$ is a single bond or —$(CH_2)_2$—, in the general formula (III-1);

(III-aiv) compound in which $m^1$ is 1, in the general formula (III-1);

(III-av) compound represented by the general formula (III-2);

(III-avi) compound in which at least one of $Z^1$, $Z^2$ and $W^1$ to $W^3$ is F, in the general formula (III-3);

(III-avii) compound in which $Z^3$ is F or —$CH_3$, in the general formula (III-3); (III-aviii) compound in which $m^1$ is 0 and $M^3$ is a single bond, in the general formula (III-3);

(III-aix) compound in which $m^1$ is 1, $M^1$ is a single bond, —OCO—, —$CH_2O$—, —$OCH_2$—, —$(CH_2)_2$—, —$(CH_2)_4$—, —CH═CH—$(CH_2)_2$—, —$(CH_2)_2$—CH═CH—, —CH═N—, —CH═N—N═CH—, —N(O)═N—, —CH═CH—, or —CF═CF—, in the general formula (III-3);

(III-ax) compound in which $M^1$ is COO— or —C≡C— and $M^3$ is —OCO—, —$CH_2O$—, —$OCH_2$—, —$(CH_2)_2$—, —$(CH_2)_4$—, —CH═CH—$(CH_2)_2$—, —$(CH_2)_2$—CH═CH—, —CH═N—, —CH═N—N═CH—, —N(O)═N—, —CH═CH—, —CF═CF—, or —C≡C—, in the general formula (III-3);

(III-axi) compound represented by the general formula (III-4); and (III-axii) compounds in which at least one hydrogen atom of rings $C^1$ to $C^3$ is substituted with a deuterium atom if rings $C^1$ to $C^3$ represent trans-1,4-cyclohexylene, in the general formulas (III-1) to (III-4).

12. A nematic liquid crystal composition according to claim 9, wherein said liquid crystal component C contains one to twenty kinds of compounds selected from one, two, or three or more sub-groups among the following sub-groups (II-bi) to (III-bix), the content of said compounds being within a range from 10 to 100% by weight:

(III-bi) compound in which $R^2$ is an alkyl group having 1 to 5 carbon atoms or an alkenyl group having 2 to 5 carbon atoms, $R^3$ is an alkyl or alkoxy group having 1 to 5 carbon atoms, or an alkenyl or alkenyloxy group having 2 to 5 carbon atoms, $m^1$ is 0, and $M^2$ is a single bond, —COO—, or —$(CH_2)_2$, in the general formula (III-1);

(III-bii) compound in which $R^2$ is an alkyl group having 1 to 5 carbon atoms or an alkenyl group having 2 to 5 carbon atoms, $R^3$ is an alkyl or alkoxy group having 1 to 5 carbon atoms, or an alkenyl or alkenyloxy group having 2 to 5 carbon atoms, $m^1$ is 1, the ring $C^1$ is trans-1,4-cyclohexylene, and one of $M^1$ and $M^2$ is a single bond and other one is a single bond, —COO—, or a —$(CH_2)_2$—, in the general formula (III-1);

(III-biii) compound in which $R^2$ is an alkyl group having 1 to 5 carbon atoms or an alkenyl group having 2 to 5 carbon atoms, $R^3$ is an alkyl or alkoxy group having 1 to 5 carbon atoms, or an alkenyl or alkenyloxy group having 2 to 5 carbon atoms, the ring $C^2$ is trans-1,4-cyclohexylene or trans-1,4-cyclohexenylene, $m^1$ is 0, and $M^2$ is a single bond, —COO—, or —$(CH_2)_2$—, in the general formula (III-2);

(III-biv) compound in which $R^2$ is an alkyl group having 1 to 5 carbon atoms or an alkenyl group having 2 to 5 carbon atoms, $R^3$ is an alkyl or alkoxy group having 1 to 5 carbon atoms, or an alkenyl or alkenyloxy group having 2 to 5 carbon atoms, the ring $C^2$ is trans-1,4-cyclohexylene or trans-1,4-cyclohexenylene, $m^1$ is 1, and one of $M^1$ and $M^2$ is a single bond, in the general formula (III-2);

(III-bv) compound in which $R^2$ is an alkyl group having 1 to 5 carbon atoms or an alkenyl group having 2 to 5 carbon atoms, $R^3$ is an alkyl or alkoxy group having 1 to 5 carbon atoms, or an alkenyl or alkenyloxy group having 2 to 5 carbon atoms, $m^1$ is 0, and $M^3$ is a single bond, —C≡C—, or —CH═N—N═CH—, in the general formula (III-3);

(III-bvi) compound in which $R^2$ is an alkyl group having 1 to 5 carbon atoms or an alkenyl group having 2 to 5 carbon atoms, $R^3$ is an alkyl or alkoxy group having 1 to 5 carbon atoms, or an alkenyl or alkenyloxy group having 2 to 5 carbon atoms, $m^1$ is 1, $M^1$ is a single bond, —$(CH_2)_2$—, —COO—, or —C≡C—, and $M^2$ is a single bond, —COO—, or —C≡C—, in the general formula (III-3);

(III-bvii) compound in which $R^2$ is an alkyl group having 1 to 5 carbon atoms or an alkenyl group having 2 to 5 carbon atoms, $R^3$ is an alkyl or alkoxy group having 1 to 5 carbon atoms, or an alkenyl or alkenyloxy group having 2 to 5 carbon atoms, $m^1$ is 1, one of $M^1$ and $M^3$ is a single bond and other one is a single bond or —C≡C—, and at least one of $W^1$ and $W^2$ is F, in the general formula (III-3);

(III-bviii) compound in which $R^2$ is an alkyl group having 1 to 5 carbon atoms or an alkenyl group having 2 to 5 carbon atoms, $R^3$ is an alkyl or alkoxy group having 1 to 5 carbon atoms, or an alkenyl or alkenyloxy group having 2 to 5 carbon atoms, and any one of $Z^2$ and $Z^3$ is substituted with F or $CH_3$, in the general formula (III-3); and (III-bix) compound in which $R^2$ is an alkyl group having 1 to 5 carbon atoms or an alkenyl group having 2 to 5 carbon atoms, $R^3$ is an alkyl or alkyloxy group having 1 to 5 carbon atoms, or an alkenyl or alkenyloxy group having 2 to 5 carbon atoms, and $m^2+m^3=0$, in the general formula (III-4).

13. A nematic liquid crystal composition according to claim 1, wherein said liquid crystal composition contains one, or two or more kinds of core-structure compounds which have four six-membered rings and a liquid crystal phase-isotropic liquid phase transition temperature of 100° C. or higher.

14. A nematic liquid crystal composition according to claim 1, wherein said liquid crystal composition has a dielectric constant anisotropy within a range from 2 to 40, a birefringent index within a range from 0.02 to 0.40, a nematic phase-isotropic liquid phase transfer temperature within a range from 5° to 180° C. or higher, and a crystal phase-, smectic phase- or glass phase-nematic phase transfer temperature within a range from −200 to 0° C.

15. A nematic liquid crystal composition according to claim 1, wherein said liquid crystal composition contains a compound having an optically active group capable of securing an induced helical pitch within a range from 0.5 to 1000 μm.

16. An active matrix, twisted nematic or super twisted nematic liquid display device using the nematic liquid crystal composition of claim 1.

17. A light scattering type liquid display device comprising a light modulation layer which contains the liquid crystal composition of claim 1 and a transparent solid substance.

18. A light scattering type liquid display device according to claim 17, wherein said liquid crystal composition formed a continuous layer in said light modulation layer and said transparent solid substance formed a uniform three-dimensional network in said continuous layer.

19. A nematic liquid crystal composition comprising a liquid crystal component A composed of one kind of compound represented by a general formula selected from the general formulas (I-1) to (I-5):

(I-1)

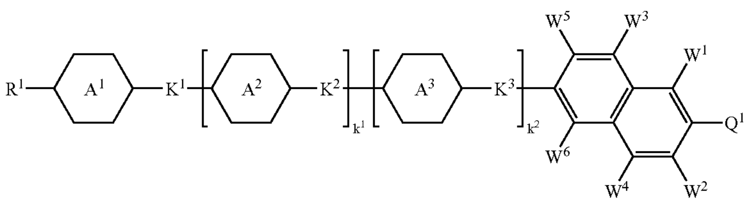

(I-2)

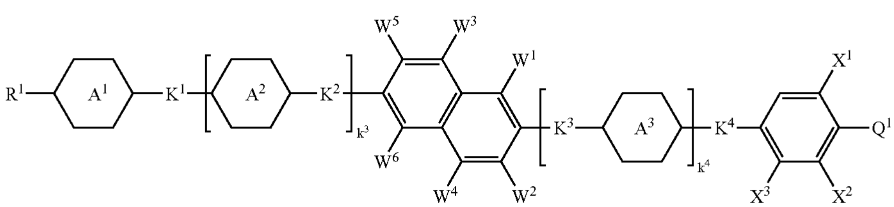

(I-3)

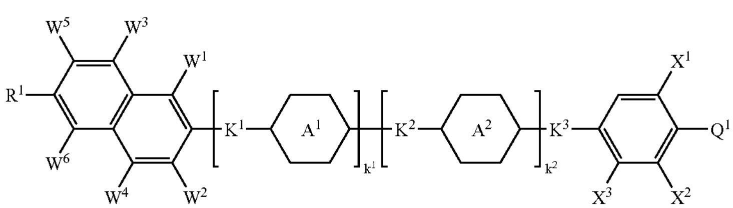

(I-4)

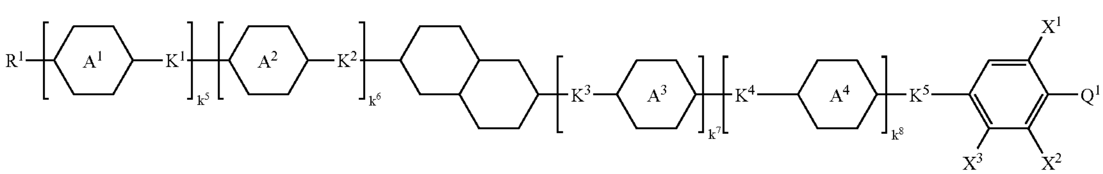

-continued (I-5)

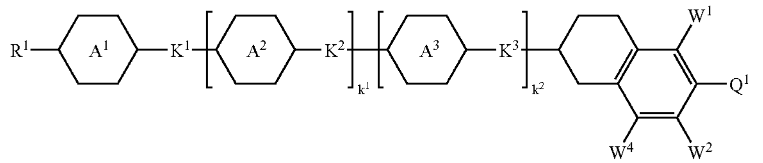

(wherein one, or two or more CH groups, which are present in a naphthalene-2,6-diyl ring, may be substituted with a N group, one, or two or more —$CH_2$— groups, which are present in a decahydronaphthalene-2,6-diyl ring, may be substituted with —$CF_2$—, one, or two or more —$CH_2$—$CH_2$— groups, which are present in said ring, may be substituted with —$CH_2O$—, —CH═CH—, —CH—CF—, —CF═CF—, —CH═N— or —CF═N—, one, or two or more >CH—$CH_2$— groups, which are present in said ring, may be substituted with >CH—O—, >C═CH—, >C═CF—, >C═N— or .N—$CH_2$—, a >CH—CH< group, which is present in the ring, may be substituted with >CH—CF<, >CF—CF<or >C—C<, and at least one C in said non-substituted or substituted ring may be substituted with Si;

$R^1$ each independently represents an alkyl group having 1 to 10 carbon atoms or an alkenyl group having 2 to 10 carbon atoms, said alkyl or alkenyl group can have one, or two or more F, Cl, CN, $CH_3$ or $CF_3$ as a non-substituent or substituent group, and one, or two or more $CH_2$ groups may be substituted with O, CO or COO, while O atoms do not bond with each other directly;

$Q^1$ each independently represents F, Cl, $CF_3$, $OCF_3$, $OCF_2H$, $OCFH_2$, NCS, or CN;

$X^1$ to $X^2$ each independently represents H, F, Cl, $CF_3$, $OCF_3$, or CN; $X^3$ each independently represents H, F, Cl, $CF_3$, $OCF_3$, CN, or $CH_3$;

$W^1$ to $W^6$ each independently represents H, F, Cl, $CF_3$, $OCF_3$, or CN, and also $W^4$ each independently represents $CH_3$, and at least one of $W^1$ to $W^6$ is F, Cl, $CF_3$, $OCF_3$, or CN;

$K^1$ to $K^5$ each independently represents, a single bond, —COO—, OCO—, —$CH_2O$—, —CH═CH—, —CF═CF—, ═C≡C—, —$(CH_2)_2$—, —$(CH_2)_4$—, —CH═CH—$(CH_2)_2$—, —$(CH_2)_2$—CH═CH—, —CH═N—, ═CH═N═N—CH—, or —N(O)═N—;

rings $A^1$ to $A^4$ each independently represents 1,4-phenylene, 2- or 3-fluor-1,4-phenylene, 2,3-difluoro-1,4-phenylene, 3,5-difluoro-1,4-phenylene, 2- or 3-chloro-1,4-phenylene, 2,3-dichloro-1,4-phenylene, 3,5-dichloro-1,4-phenylene, pyrimidine-2,5-diyl, trans-1,4-cyclohexylene, trans-1,4-cyclohexenylene, trans-1,3-dioxane-2,5-diyl, trans-1-sila-1,4-cyclohexylene, trans-4-sila-1,4-cyclohexylene, naphthalene-2,6-diyl, 1,2,3,4-tetrahydronaphthalene-2,6-diyl, or decahydronaphthalene-2,6-diyl, and naphthalene-2,6-diyl and 1,2,3,4-tetrahydronaphthalene-2,6-diyl can have one, or two or more F, Cl, $CF_3$ or $CH_3$ as a non-substituent or substituent group;

one, or two or more hydrogen atoms, which are presetn in a naphthalene-2,6-diyl ring, a 1,2,3,4-tetrahydronaphthalene-2,6-diyl ring, a decahydronaphthalene-2,6-diyl ring a side chain group $R^1$, a polar group $Q^1$, linking groups $K^1$ to $K^5$ and rings $A^1$ to $A^4$, may be substituted with a deuterium atom;

$k^1$ to $k^8$ each independently represents 0 or 1, $k^3+k^4$ is 0 or 1, and $k^5+k^6+k^7+k^8$ is 0, 1 or 2; and atoms, which constitute the compounds of the general formulas (I-1) to (I-5), may be substituted with isotope atoms thereof; 0 to 99.9% by weight of a liquid crystal component B composed of a compound having a dielectric constant anisotropy of +2 or more as a liquid crystal component excluding the compounds of the general formulas (I-1) to (I-5); and 0 to 85% by weight of a liquid crystal component C composed of a compound having a dielectric constant anisotropy within a range from −10 to +2; the sum total of said liquid crystal component B and said liquid crystal component C being within a range from 0 to 99.9% by weight.

* * * * *